(12) United States Patent
Lu et al.

(10) Patent No.: US 7,440,448 B1
(45) Date of Patent: Oct. 21, 2008

(54) SYSTEMS AND METHODS FOR UPGRADEABLE SCALABLE SWITCHING

(76) Inventors: Haw-minn Lu, 10733 Calston Way, San Diego, CA (US) 92126; Alan Huang, 682 Sixteenth Ave., Menlo Park, CA (US) 94025

( * ) Notice: Subject to any disclaimer, the term of this patent is extended or adjusted under 35 U.S.C. 154(b) by 811 days.

(21) Appl. No.: 10/786,874

(22) Filed: Feb. 24, 2004

Related U.S. Application Data

(63) Continuation-in-part of application No. 10/074,174, filed on Feb. 10, 2002, now Pat. No. 7,123,612, and a continuation-in-part of application No. 10/075,086, filed on Feb. 10, 2002, now Pat. No. 7,075,942, and a continuation-in-part of application No. 09/897,263, filed on Jul. 2, 2001, now Pat. No. 6,901,071.

(60) Provisional application No. 60/450,133, filed on Feb. 25, 2003.

(51) Int. Cl.
*H04L 12/50* (2006.01)

(52) U.S. Cl. ..................................... 370/380

(58) Field of Classification Search ................ 370/254, 370/380, 388, 422, 255; 340/359; 714/4
See application file for complete search history.

(56) References Cited

U.S. PATENT DOCUMENTS

| 5,841,775 | A | 11/1998 | Huang |
| 6,049,542 | A | 4/2000 | Prasad |
| 6,784,802 | B1 * | 8/2004 | Stanescu .................... 340/687 |
| 7,123,612 | B2 * | 10/2006 | Lu .............................. 370/388 |
| 2002/0004390 | A1 * | 1/2002 | Cutaia et al. ................ 455/424 |

OTHER PUBLICATIONS

Patel, et al., "Performance of processor-memory interconnections for multiprocessors", IEEE Transactions on Computers, Oct. 1981, pp. 771-780, vol. 30, No. 10, IEEE, US.

Goke, et al., "Banyan Network for partitioning multiprocessor systems," First Annual International Symposium on Computer Architecture, Dec. 1973, pp. 21-28, ACM Press, US.

Kumar, et al., "Augmented shuffle-exchange multistage interconnection networks". Computer, Jun. 1987, pp. 30-40, vol. 20, No. 6, IEEE, US.

Adams, et al., "The Extra Stage Cube: A Fault-Tolerant Interconnection Network for Supersystems," IEEE Transactions on Computers, May 1982, pp. 443-454, vol. 31, No. 5, IEEE, US.

(Continued)

*Primary Examiner*—Chirag G Shah
*Assistant Examiner*—Yong Zhou

(57) ABSTRACT

The creation of a variety of upgradeable scalable switching networks are set forth including multistage switching networks as well as novel multidirectional architectures. Systems and methods exploiting the properties such as fault tolerance, upgradeability with out service disruption and path redundancy are incorporated into a variety of systems. A wide range of methods for upgrading and reconfiguration the scalable switching networks are presented including manifestations of implementations of said networks and said methods. Methods for designing new upgradeable scalable switching and the novel architectures derived thereof including architectures built from the redundant blocking compenstated cyclic group networks are set forth.

21 Claims, 191 Drawing Sheets

OTHER PUBLICATIONS

Benes, Permutation Groups, Complexes, and Rearrangeable Connecting Networks, Bell System Telephone Journal, Jul. 1964, pp. 1619-1640, vol. 44, AT&T, US.

Hamid, et al., "A new fast control mechanism for Benes rearrangable interconnection network useful for supersystems," Transactions of the Institute of Electronics, Information and Communication Engineers, Oct. 1987, p. 997-1008, vol. E70, No. 10, IEICE, Japan.

Dudgeon, et al., "Multidimensional Signal Processing,"1984, pp. 60-111, Prentice Hall, Englewood Cliffs, New Jersey.

Oppenhiem, et al., "Digital Signal Processing," 1975, pp. 284-328, Prentice Hall, Englewood Cliffs, New Jersey.

Cizek, et al. "Tradeoff Between Cost and Reliability in Packet Switching MultiStage Interconnection Networks," AFRICON '92 Proceedings., 3rd AFRICON Conference, Sep. 22-24, 1992, pp. 365-368, IEEE, South Africa (Reprinted US).

Agrawal, "Testing and Fault-Tolerance of Multistage Interconnection Networks," computer, Apr. 1982, pp. 41-53, vol. 15, No. 4, IEEE, US.

Bhuyan, et al., "Design and Performance of Generalized Interconnection Networks." IEEE Tranactions on Computers, Dec. 1983, pp. 1081-1090, vol. 32, No. 12, IEEE, US.

Blake, et al., "Multistage Interconnection Network Reliability," IEEE Transactions on Computers, Nov. 1989, pp. 1600-1603, vol. 38, No. 11, IEEE, US.

Chin, et al., "Packet Switching Networks for Multiprocessors and Data Flow Computers," IEEE Transactions on Computers, Nov. 1984, pp., 991-1003, vol. 33, No. 11, IEEE, US.

Kumar, et al., "Failure Dependent Performance Analysis of a Fault-Tolerant Multistage Interconnection Network," IEEE Transactions on Computers, Dec. 1989, pp. 1703-1713, vol. 38, No. 12, IEEE, US.

Tzeng, et al., "Realizing Fault-Tolerant Interconnection Network via Chaining," IEEE Transactions on Computers, Apr. 1988, pp. 458-462, vol. 37, No. 4, IEEE, US.

Varma, et al.; "Fault-Tolerant Routing in Multistage Interconnection Networks," IEEE Transactions on Computers, Mar. 1989, pp. 385-393, vol. 38, No. 3, IEEE, US.

* cited by examiner

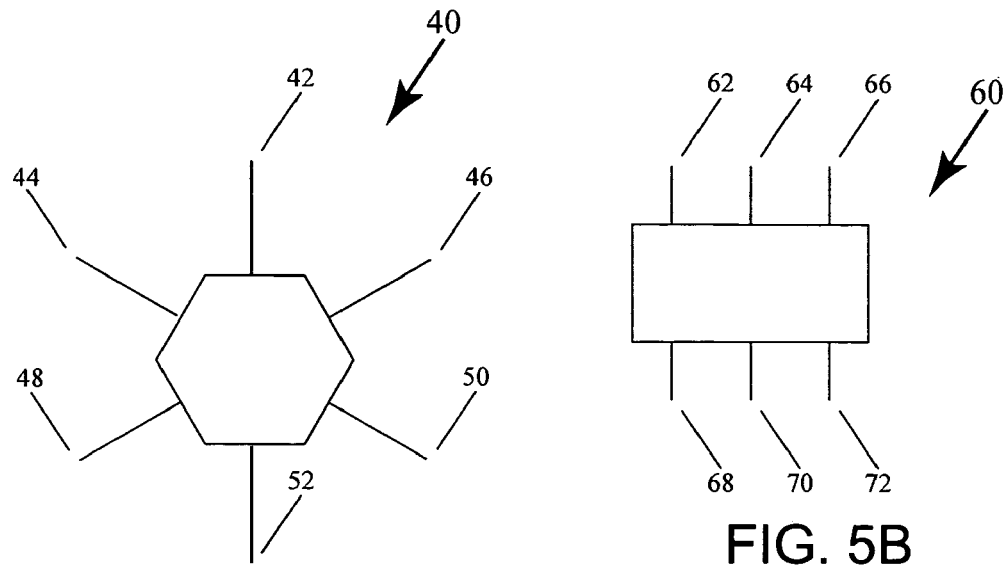
FIG. 5A
FIG. 5B
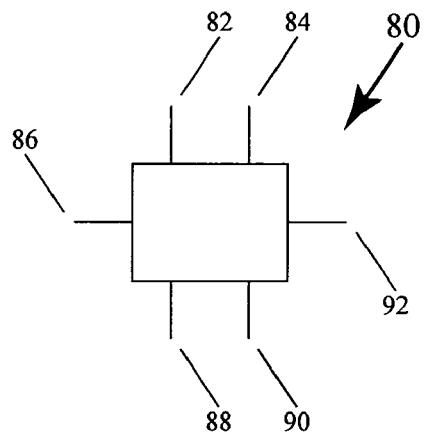
FIG. 5C
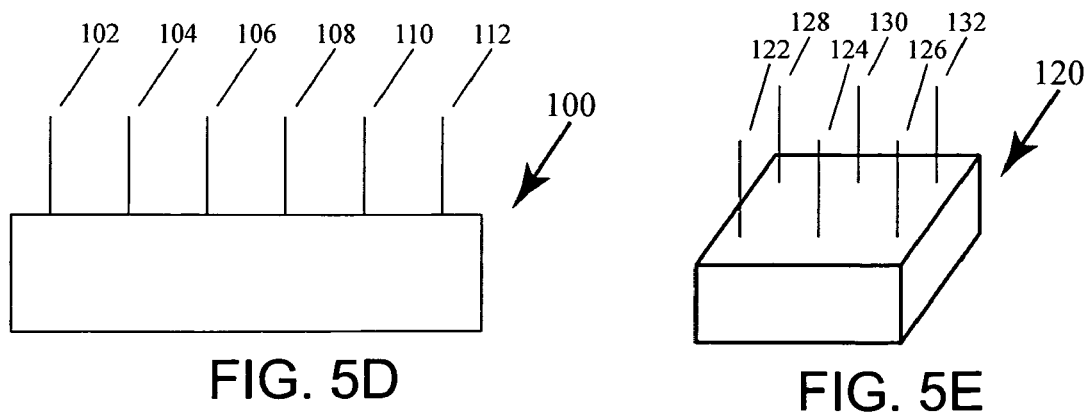
FIG. 5D
FIG. 5E

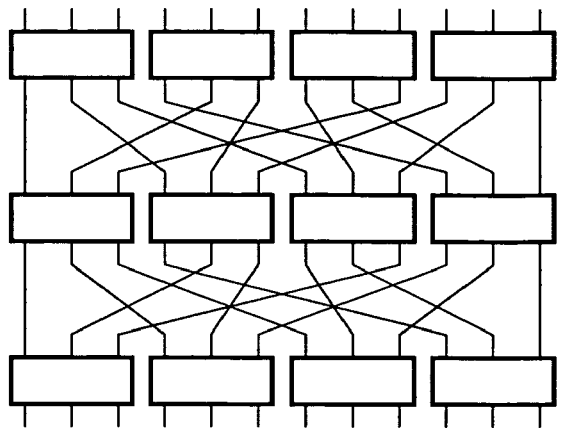
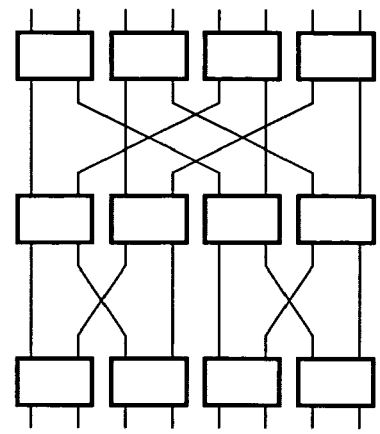
FIG. 21A        FIG. 21B
```
0  1  2  3  4  5  6  7  8  9 10 11
↓  ↓  ↓  ↓  ↓  ↓  ↓  ↓  ↓  ↓  ↓  ↓
0  3  6  9  1  4  7 10  2  5  8 11
```
FIG. 22A
```
0  1  2  3  4  5  6  7        0  1  2  3  4  5  6  7
↓  ↓  ↓  ↓  ↓  ↓  ↓  ↓        ↓  ↓  ↓  ↓  ↓  ↓  ↓  ↓
0  4  2  6  1  5  3  7        0  2  1  3  4  6  5  7
```
FIG. 22B        FIG. 22C (0,0) (1,0) (2,0) (3,0) (4,0) (5,0) (6,0) (7,0) (8,0) (9,0) (10,0) (11,0)
 ↓    ↓    ↓    ↓    ↓    ↓    ↓    ↓    ↓    ↓    ↓     ↓
(0,0) (3,0) (6,0) (9,0) (1,0) (4,0) (7,0) (10,0) (2,0) (5,0) (8,0) (11,0)

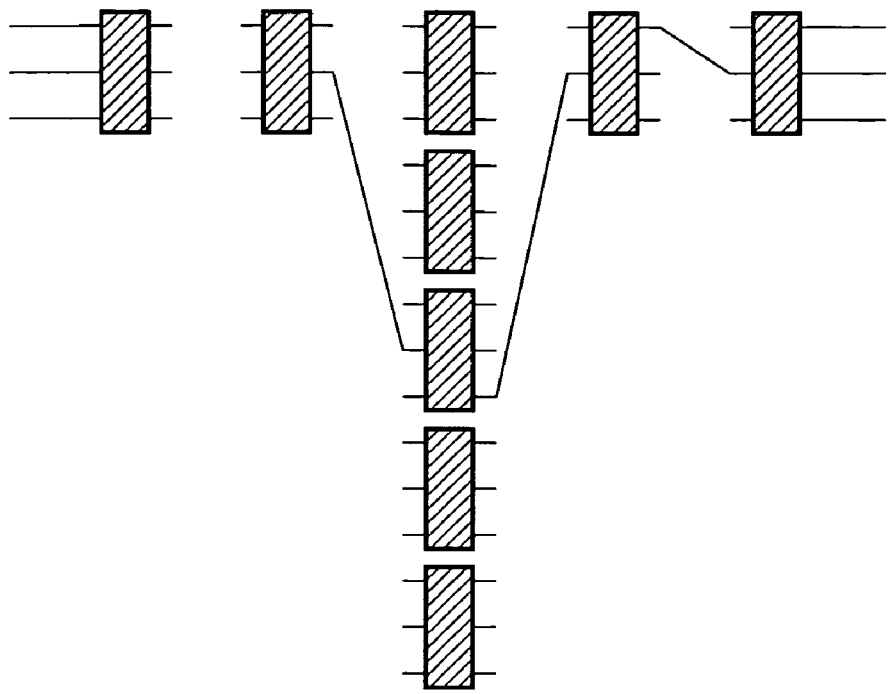
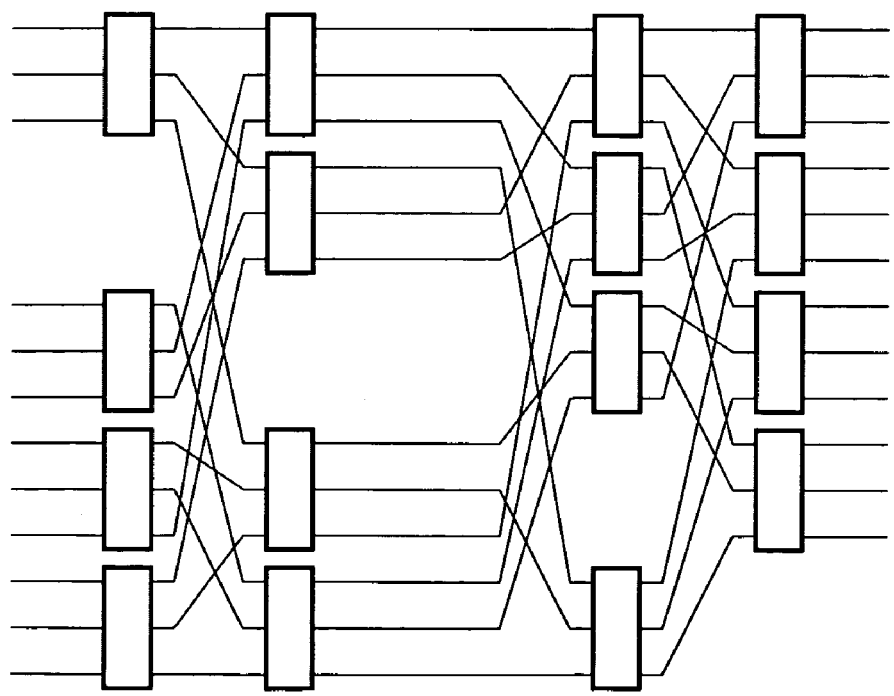
FIG. 51C

FIG. 59H
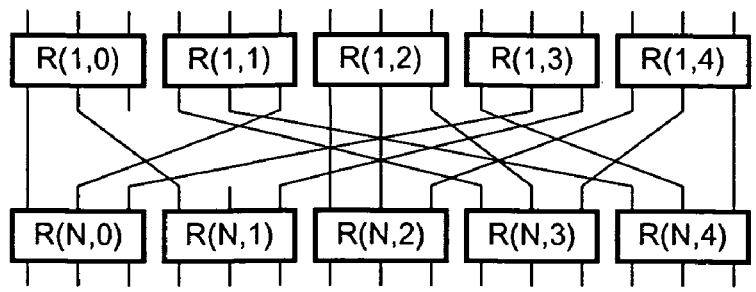
FIG. 59I
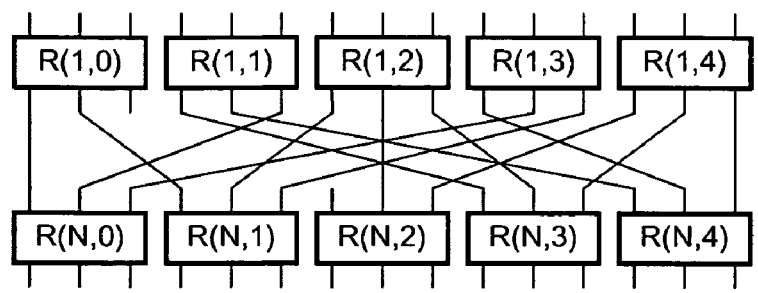
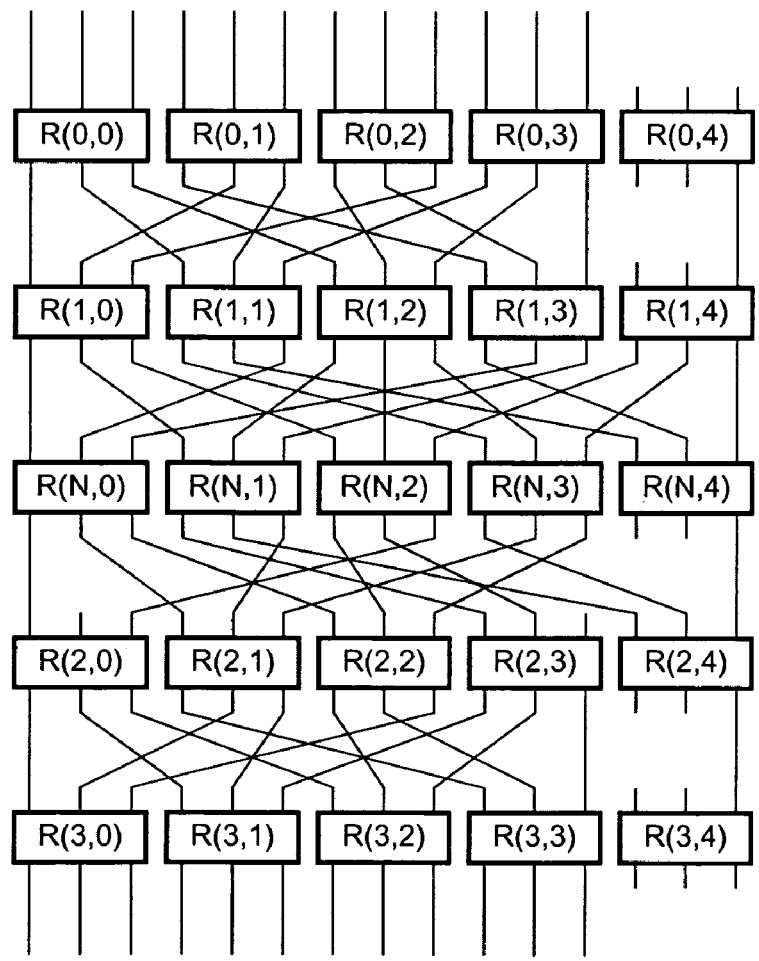
FIG. 59J

```
repeat until done {
    determine next connection to be established;
    if a completely new connection is to be made between two vacant ports {
        indicate both port lights with "connect";
        wait until technician has made the connection;
        verify correct connection is made, otherwise indicate "error" on both ports;
    } else {
        if connection needs to be broken select a port to disconnect {
            indicate the light for desired port to "disconnect";
            wait until technician has disconnected the connector;
            if technician disconnected wrong port indicate "error" at the port disconnected;
        }
        if connection can be made {
            indicate port light to be connected with "connect";
            wait until technician has made the connection;
            verify correct connection is made, otherwise indicate "error" on that port;
        }
    }
}
```

FIG. 94

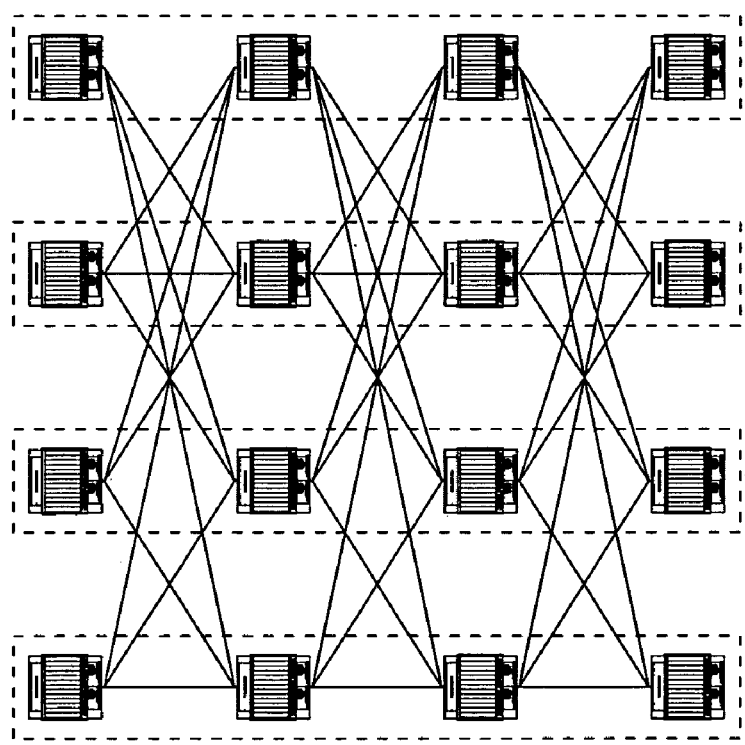

SYSTEMS AND METHODS FOR UPGRADEABLE SCALABLE SWITCHING

RELATED APPLICATIONS INFORMATION

This application claims priority under 35 U.S.C. § 119 to U.S. Provisional Patent Application Ser. No. 60/450,133 entitled, "Systems and Methods for Upgradeable Scalable Switching and its Applications," filed on Feb. 25, 2003, which is incorporated herein by reference in its entirety as if set forth in full. This application is also a continuation-in-part of U.S. patent Ser. No. 09/897,263 U.S. Pat. No. 6,901,071, entitled "Row Upgrade for a Scalable Switching Network," filed Jul. 2, 2001 issued on May 31, 2005, which is incorporated herein by reference in its entirety as if set forth in full. This application is also a continuation-in-part of U.S. patent Ser. No. 10/074,174 U.S. Pat. No. 7,123,612 entitled, "Width Upgrade for a Scalable Switching Network," filed Feb. 10, 2002 issued on Oct. 17, 2006, which is incorporated herein by reference in its entirety as if set forth in full. This application is also a continuation-in-part of U.S. patent Ser. No. 10/075,086 U.S. Pat. No. 7,075,942, entitled, "Fanout Upgrade for a Scalable Switching Network," filed Feb. 10, 2002 issued on Jul. 11, 2006, which is incorporated herein by reference in its entirety as if set forth in full.

BACKGROUND OF THE INVENTION

1. Field of the Inventions

The field of invention relate generally to communications switching networks and more particularly to systems and methods for designing, utilizing and upgrading scalable switching networks.

2. Background Information

Switching networks with regular structure have been explored for many years. Conspicuous among them are the so-called fixed radix networks, which typically comprise n stages of $r^n$ switching elements with each switching element having a fanin and fanout of r, where r is the radix. The majority of past research has been focused on radix two networks that is where r=2. Coke and Lipovski in "Banyan Network for Partitioning Multiprocessor Systems," proposed the Banyan network illustrated in FIG. 1B and extended to other radixes such as a radix three network illustrated in FIG. 1C. This network actually finds its origin in the design of fast Fourier Transforms where it is also often termed a butterfly network. Patel in "Performance of Processor-Memory Interconnections for Multiprocessors" proposed the delta network shown in FIG. 1D. The network shown in FIG. 1E is often called a crossover network. Lawrie in "Parallel Processing with a Perfect Shuffle," uses the network shown in FIG. 1F, known as a perfect shuffle, which is often termed in the art as an Omega network. A nameless radix two network can be found in the bit order preserving fast Fourier transform architecture described in Oppenheim and Schaefer's text, *Digital Signal Processing*. This network is shown in FIG. 1G and is referred to as a BOP network for the purpose of this disclosure.

These traditional radix networks offer functional connectivity, but lack redundancy and fault tolerance. Many methods and architectures have been developed to extend fixed radix networks to add redundancy and fault tolerance. Hamid, Shiratori and Noguchi in "A new fast control mechanism for Benes rearrangeable interconnection network useful for supersystems," extend the delta network with a second delta network into an architecture first suggested by Benes in "Permutation Groups, Complexes, and Rearrangeable Connecting Networks," as shown in FIG. 2A. This can be reconfigured to show two Banyan networks coupled together as shown in FIG. 2B.

Further, Adams and Siegel in "The Extra Stage Cube: A Fault-Tolerant Interconnection Network for Supersystems," teach the extra stage cube which resembles a Banyan network in FIG. 2C with an extra stage. Through the use of multiplexers 16 and demultiplexers 14, stage 10 and stage 12 can individually be enabled or bypassed giving fault tolerance to the entire network.

Kumar and Reddy in "Augmented shuffle-exchange multistage interconnection networks", add fault tolerance and path redundancy to a Banyan network offering additional lateral paths for signals to travel which is depicted in FIG. 2D, This augmented shuffle-exchange network (ASEN) increases fault tolerance and path redundancy at the expense of increased path blocking.

Another technique for augmenting fixed radix network designs is by overlaying a second network onto a preexisting design. By this method, the fault tolerance of a network can be increased. The simplest technique is dilation, which is simply the overlaying of the same network on itself. FIG. 3A shows a Banyan network like that depicted in FIG. 1B overlaid on top of a second identical Banyan network. In the traditional design, the external ports are not augmented in the process. However, some designs do incorporate it as shown in FIG. 3B. In either case, the resultant network does increase the ability to tolerate a failure in an internal connection, but fails to compensate for any potential failure in a switching element.

This dilation technique is further refined by overlaying an upside-down version of the same network on top of itself. FIG. 4A depicts a Banyan network like that of FIG. 1B except upside-down. Often in this technique, the connections depicted by the dotted lines are often considered overly redundant and are omitted. The result is the network shown in FIG. 4B. Once again the external ports are usually not augmented, but can be. This new network does compensate for failures in switching elements.

A final extension of multistage interconnection design is the seldom used multidimensional version of the multistage interconnection network. Though not well known in switching applications, multidimensional interconnections are frequently used in signal processing. Specifically, in the design of fast Fourier transforms (FFT) multistage interconnection networks are used. Since fixed radix networks, in particular the butterfly/Banyan, are the essential building blocks of the FFT. Multidimensional extensions of the butterfly are the essential building blocks of multidimensional FFT. This is discussed in great detail in any standard multidimensional signal processing text such as Dudgeon and Mersereau's *Multidimensional Signal Processing*.

SUMMARY OF INVENTION

In this disclosure, a switching network and systems comprising such a network are set forth. Basic building blocks can be constructed through modification of known networks such as the Banyan, Crossover, Delta and other networks. Additionally, these modified networks can inherit beneficial network properties in their topology by utilizing additional switching stages and for utilizing the interstage interconnection (ISIC) networks described as a single stage interconnection network in Huang in U.S. Pat. No. 5,841,775. In particular, many of these networks have the desirable scalability, fault-tolerance and upgradeability properties.

The redundant blocking compensated cyclic group (RB-CCG) networks and hybrids form the basic building blocks of more elaborate switching networks. One such class of networks is those formed from the Cartesian product of two switching networks. The Cartesian product of two switching networks can reduce the distance of the average connection between stages as compared to a similarly equipped "flat" switching network.

Another class of networks that can be formed from the basic building block networks is the overlaid network where two or more network topologies are overlaid to form an elaborate multidirection network. In such an overlaid network the average latency between two external ports can be reduced.

When properly designed, these networks offer an extra measure of fault tolerance. With the addition of multiplexer/demultiplexer combinations, the fault tolerance of the network can be extended completely to all switching elements within the switching networks.

Furthermore, routing of the RBCCG network in particular can be implemented using routing protocols and table look ups, but for some applications such as in very high performance small footprint applications, a formulaic routing method is required. Each element in an RBCCG network can route a packet based on the packet destination and the location of the switching element.

The switching networks with sufficient fault tolerance described in this disclosure and in Huang can be upgraded and/or reconfigured in a manner as to maintain full connectivity throughout the upgrade or reconfiguration process. Many examples are given including a basic stage upgrade, width upgrade, a fanout upgrade, and a simultaneous stage and width downgrade. In addition to these examples, five examples are given great in detail, including simultaneous stage and width upgrade, multiple row upgrade, simultaneous width and fanout upgrade, simultaneous fanout upgrade and width downgrade, and simultaneous width upgrade and architecture reconfiguration. Furthermore, the upgrading of the hybrid, Cartesian product and overlaid networks are described.

The methods of implementing a scalable switching network with upgrade capabilities are given with embodiments where software is used to assist a technician in upgrading a scalable switching network. In another embodiment, software coupled to indicator lights guide a technician in upgrading a scalable switching network. In another embodiment, a robotic instrument performs an upgrade using a patch panel. In another embodiment, switching elements are equipped with latched switches which enable a network to be laid out prior to an upgrade. In another embodiment, prefabricated interconnection can be inserted into a special interconnection box.

Uses of the scalable switching network are given. One use is to replace the infrastructure of a metropolitan point of presence. A smaller application is as the communications backbone of computational servers, network storage, or other services. Another use is to replace the peripheral bus of a computer. Another use is to replace the system bus on a computer.

Although the present invention has been described below in terms of specific embodiments, it is anticipated that alteration and modifications thereof will no doubt become apparent to those skilled in the art. It is therefore intended that the following be interpreted as covering all such alterations and modifications as falling within the true spirit and scope of the invention.

DESCRIPTION OF DRAWINGS

FIG. 5A and FIG. 5B show how arbitrary ports on a switching element can be logically labeled as top and bottom ports.

FIG. 5C shows further how arbitrary ports on a switching element can be logically labeled as top, bottom, left an right ports.

FIG. 5D and FIG. 5E show how one-dimensional ports on a switching element can be logically labeled as two-dimensional ports.

FIG. 17A and FIG. 17B show the interconnection mappings between each stage of the two RBCCG network, respectively.

FIG. 17C shows the composite interconnection mappings between any two stages of the Cartesian product RBBCG network.

FIG. 21A shows a 24 port RBCCG network.

FIG. 21B shows a 16-port Banyan network.

FIG. 22A shows the interconnection mapping between each stage of the RBCCG network.

FIG. 22B shows the interconnection mapping between the top and middle stages of the Banyan network.

FIG. 22C shows the interconnection mapping between the middle and bottom stages of the Banyan network.

FIG. 22D shows the interconnection mapping between the top and middle stages of the RBCCG/Banyan Cartesian product network.

FIG. 22E shows the interconnection mapping between the middle and bottom stages of the RBCCG/Banyan Cartesian product network.

FIG. 51C depicts the result of the downgrade process.

FIG. 56 shows the 30-port post-reconfiguration RBCCG multistage switching network which the network shown in FIG. 55 is to be upgraded to.

FIG. 59A, FIG. 59B, FIG. 59C, FIG. 59D, FIG. 59E, FIG. 59F, FIG. 59G, FIG. 59H and FIG. 59I show the ISIC network between stages R(1,*) and R(N,*) being rewired into a post-reconfiguration CGISIC network by moving the connection from top port 1 of switching element R(N,1) to top port 0 of switching element R(N,4); moving the connection from top port 0 of switching element R(N,3) to top port 1 of switching element R(N,4); moving the connection from bottom port 2 of switching element R(1,1) to bottom port 2 of switching element R(1,3); moving the connection from bottom port 1 of switching element R(1,0) to bottom port 2 of switching element R(1,1); moving the connection from top port 0 of switching element R(N,1) to top port 0 of switching element R(N,3); adding a connection between top port 0 of switching element R(N,1) and bottom port 1 of switching element R(1, 0); moving the connection from bottom port 1 of switching element R(1,3) to bottom port 2 of switching element R(1,2); moving the connection from bottom port 2 of switching element R(1,0) to bottom port 1 of switching element R(1,3); and moving the connection from top port 0 of switching element R(N,2) to top port 1 of switching element R(N,1), respectively.

FIG. 59J shows a partially upgraded 30 port RBCCG multistage switching network with a completed rewire of the ISIC network between stages R(1,*) and R(N,*) after adding a connection between top port 0 of switching element R(N,2) and bottom port 2 of switching element R(1,0).

FIG. 64 shows the 24-port post-reconfiguration RBCCG multistage switching network which the network shown in FIG. 63 is to be upgraded to.

Figure 65:
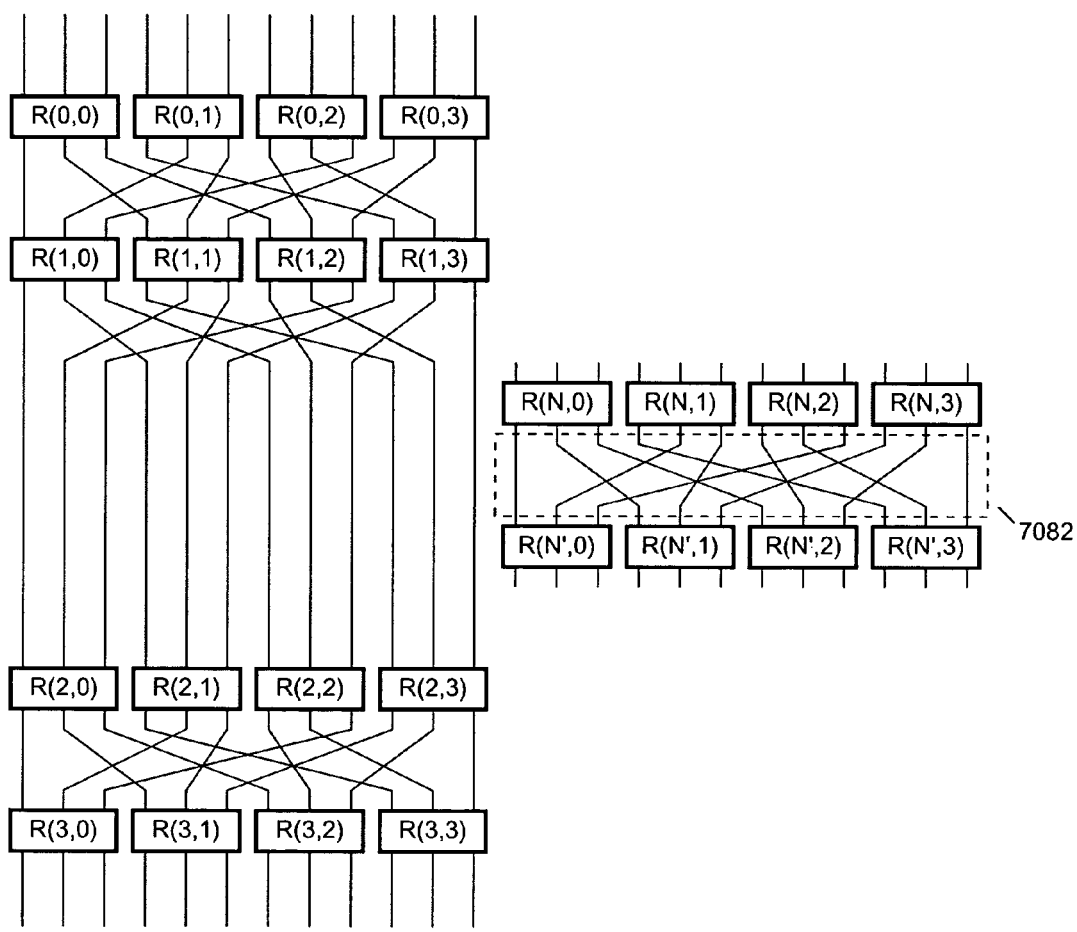

FIG. 65 shows the result of the non-disruptive addition of connections: bottom port 2 of switching element R(N,3) to top port 2 of switching element R(N',3), bottom port 1 of switching element R(N,3) to top port 2 of switching element R(N',2), bottom port 0 of switching element R(N,3) to top port 2 of switching element R(N',1), bottom port 2 of switching element R(N,2) to top port 2 of switching element R(N', 0), bottom port 1 of switching element R(N,2) to top port 1 of switching element R(N',3), bottom port 0 of switching element R(N,2) to top port 1 of switching element R(N',2), bottom port 2 of switching element R(N,1) to top port 1 of switching element R(N',1), bottom port 1 of switching element R(N,1) to top port 1 of switching element R(N',0), bottom port 0 of switching element R(N,1) to top port 0 of switching element R(N',3), bottom port 2 of switching element R(N,0) to top port 0 of switching element R(N',2), bottom port 1 of switching element R(N,0) to top port 0 of switching element R(N',1), and bottom port 0 of switching element R(N,0) to top port 0 of switching element R(N',0).

FIG. 66A, FIG. 66B, FIG. 66C, FIG. 66D, FIG. 66E, FIG. 66F, FIG. 66G, FIG. 66H, FIG. 66I, FIG. 66J, FIG. 66K and FIG. 66L show the new stage of switching elements being inserted by moving the connection from bottom port 0 of switching element R(1,0) to bottom port 0 of switching element R(N',0) and adding a connection between bottom port 0 of switching element R(1,0) and top port 0 of switching element R(N,0); moving the connection from bottom port 1 of switching element R(1,0) to bottom port 0 of switching element R(N',1) and adding a connection between bottom port 1 of switching element R(1,0) and top port 0 of switching element R(N,1); moving the connection from bottom port 2 of switching element R(1,0) to bottom port 0 of switching element R(N',2) and adding a connection between bottom port 2 of switching element R(1,0) and top port 0 of switching element R(N,2); moving the connection from bottom port 0 of switching element R(1,1) to bottom port 0 of switching element R(N',3) and adding a connection between bottom port 0 of switching element R(1,1) and top port 0 of switching element R(N,3); moving the connection from bottom port 1 of switching element R(1,1) to bottom port 1 of switching element R(N',0) and adding a connection between bottom port 1 of switching element R(1,1) and top port 1 of switching element R(N,0); moving the connection from bottom port 2 of switching element R(1,1) to bottom port 1 of switching element R(N',1) and adding a connection between bottom port 2 of switching element R(1,1) and top port 1 of switching element R(N,1); moving the connection from bottom port 0 of switching element R(1,2) to bottom port 1 of switching element R(N',2) and adding a connection between bottom port 0 of switching element R(1,2) and top port 1 of switching element R(N,2); moving the connection from bottom port 1 of switching element R(1,2) to bottom port 1 of switching element R(N',3) and adding a connection between bottom port 1 of switching element R(1,2) and top port 1 of switching element R(N,3); moving the connection from bottom port 2 of switching element R(1,2) to bottom port 2 of switching element R(N',0) and adding a connection between bottom port 2 of switching element R(1,2) and top port 2 of switching element R(N,0); moving the connection from bottom port 0 of switching element R(1,3) to bottom port 2 of switching element R(N',1) and adding a connection between bottom port 0 of switching element R(1,3) and top port 2 of switching element R(N,1); moving the connection from bottom port 1 of switching element R(1,3) to bottom port 2 of switching element R(N',2) and adding a connection between bottom port 1 of switching element R(1,3) and top port 2 of switching element R(N,2); and moving the connection from bottom port 2 of switching element R(1,3) to bottom port 2 of switching element R(N',3) and adding a connection between bottom port 2 of switching element R(1,3) and top port 2 of switching element R(N,3), respectively.

Figure 66A:
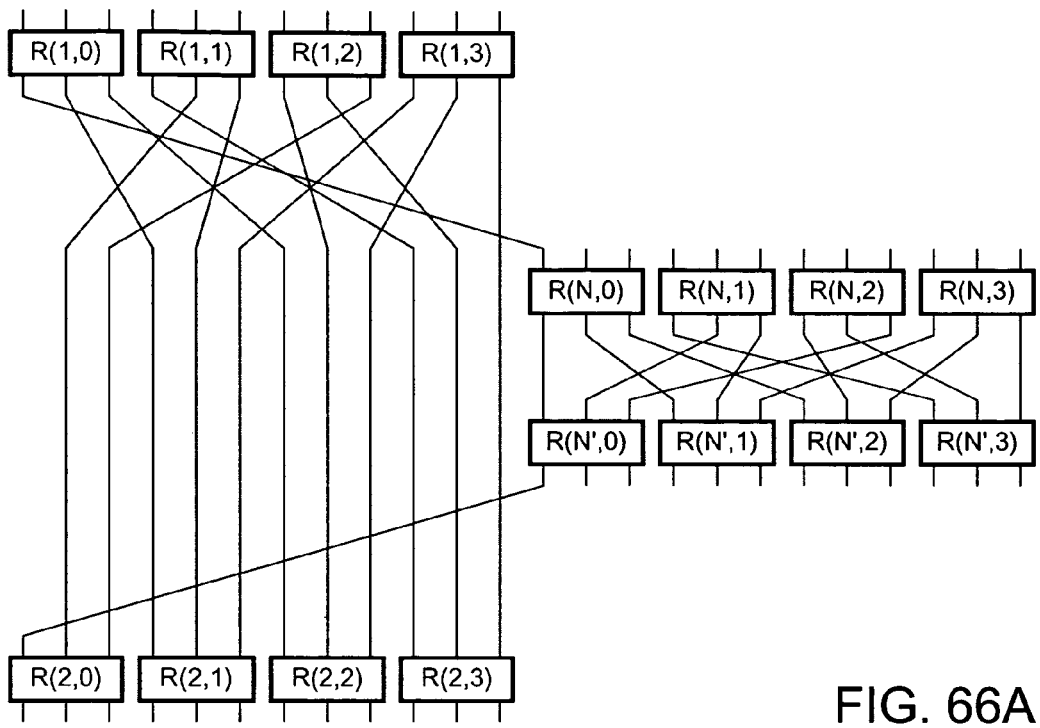
Figure 66B:
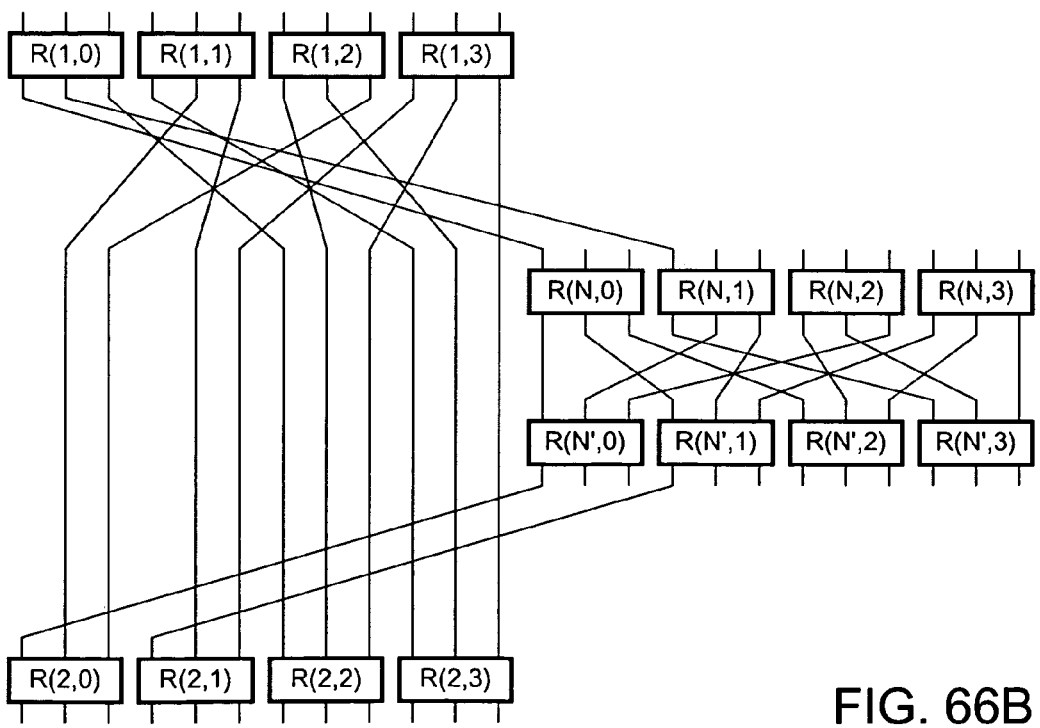
Figure 66C:
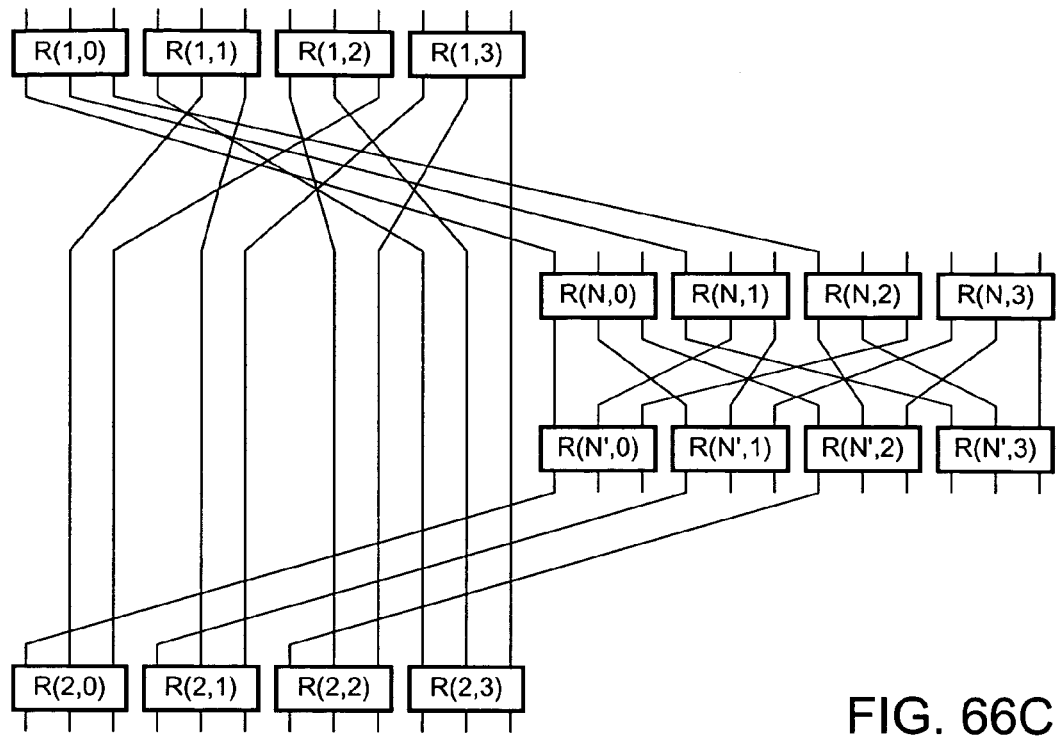
Figure 66D:
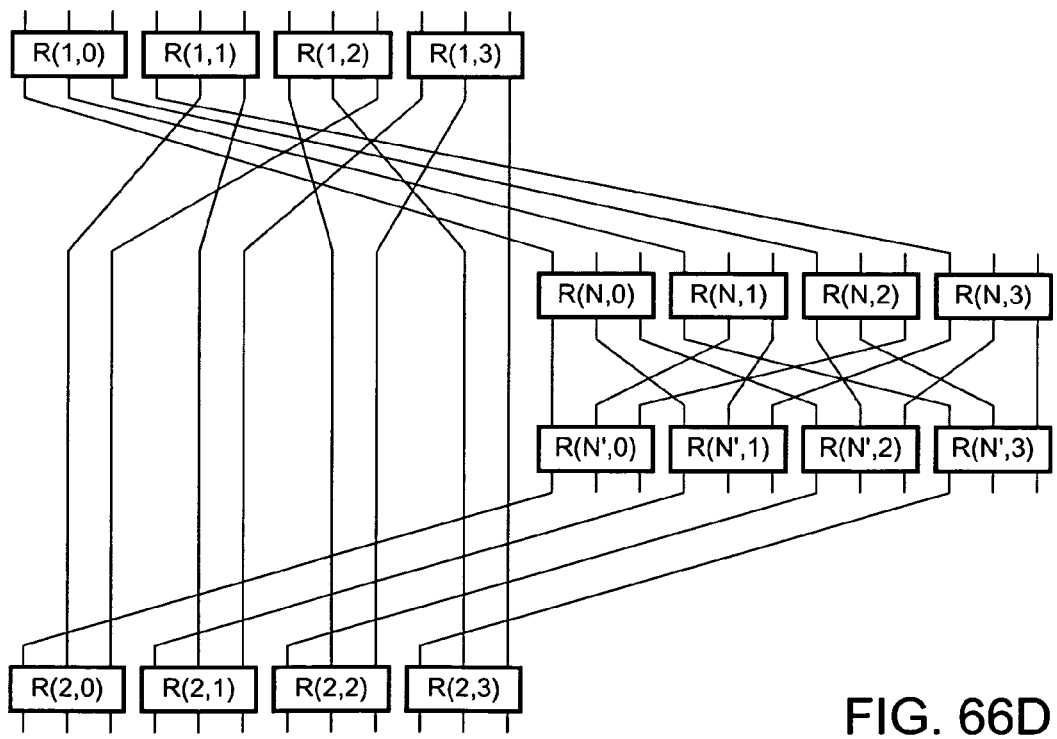
Figure 66E:
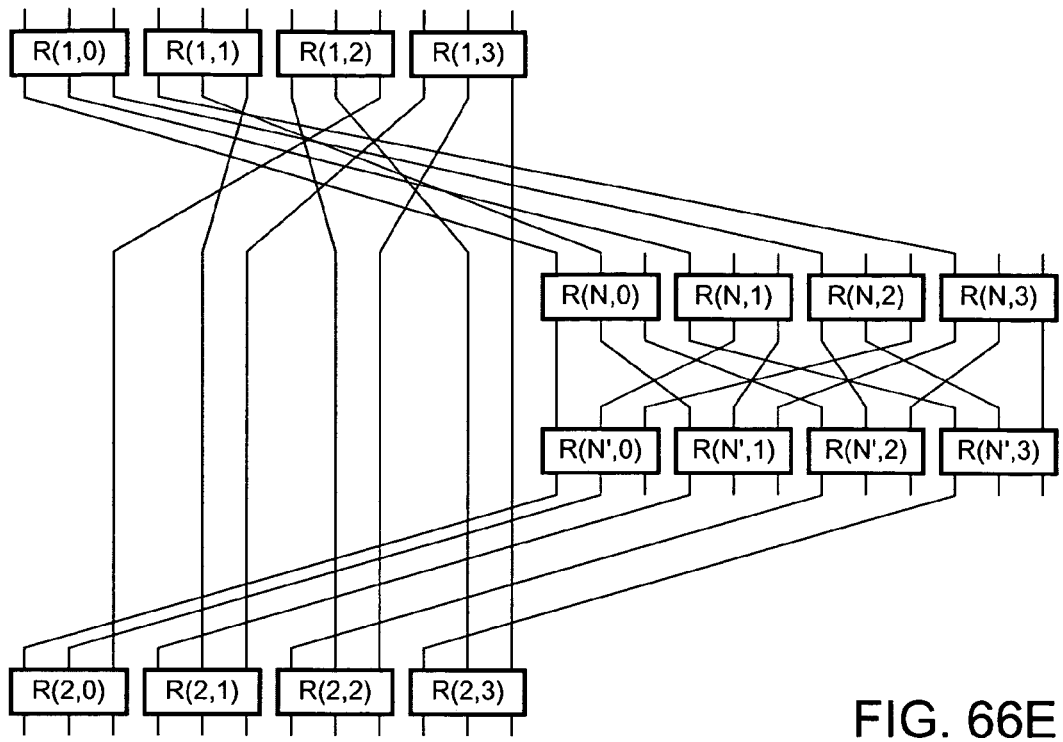
Figure 66F:
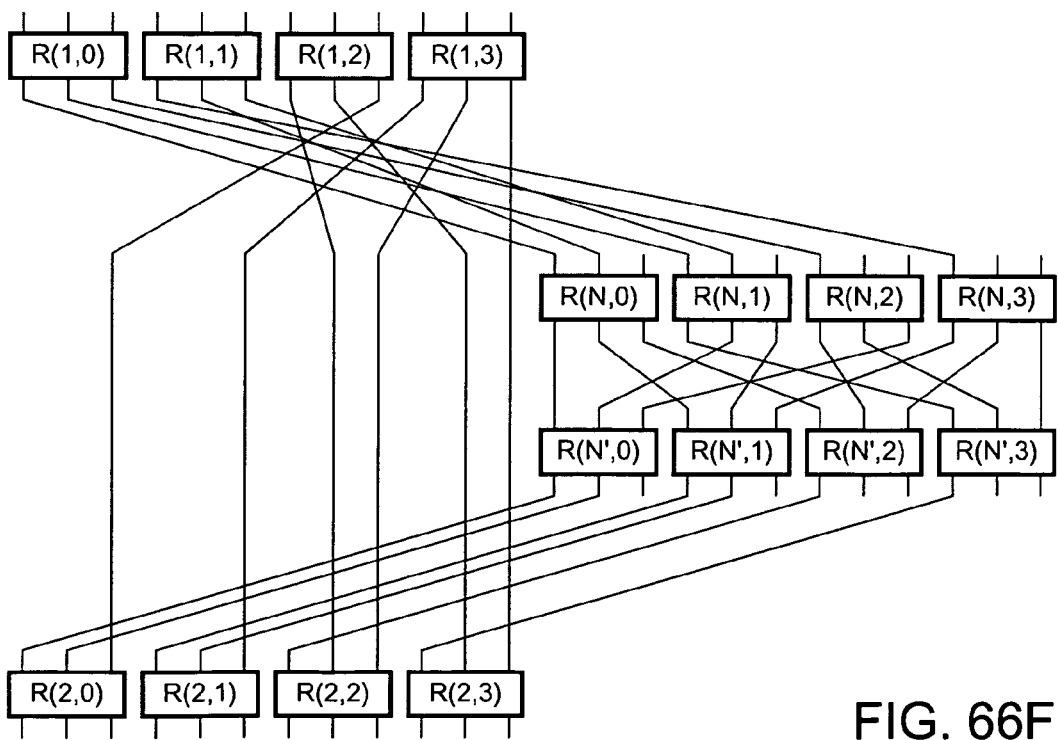
Figure 66G:
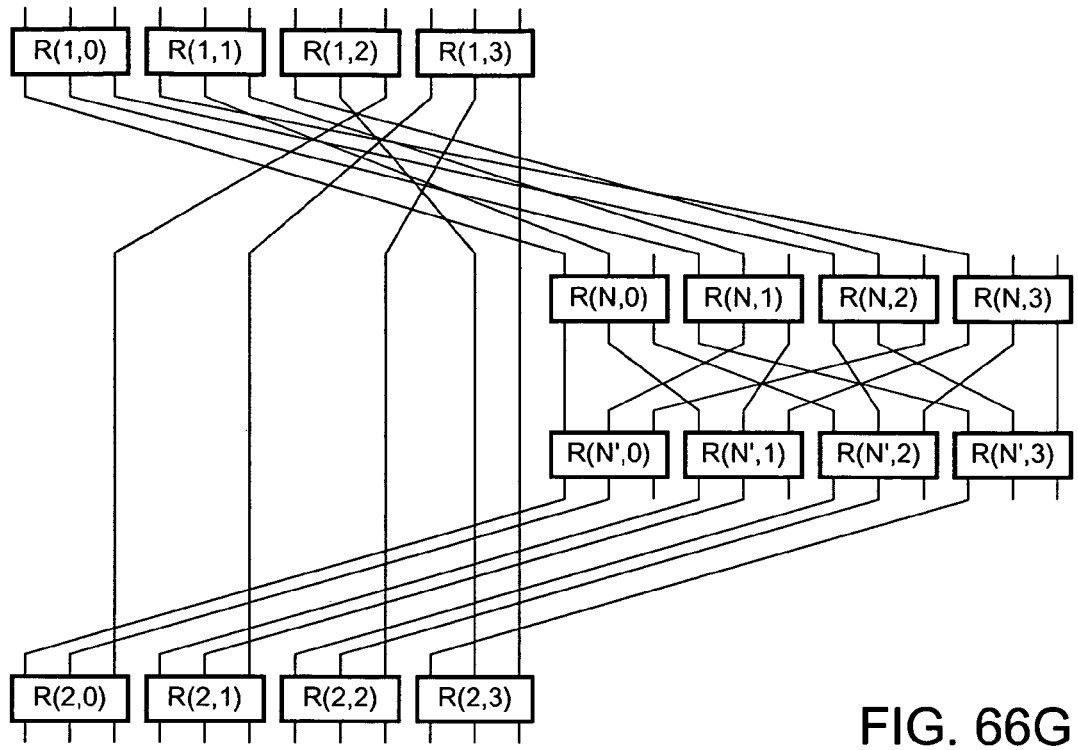
Figure 66H:
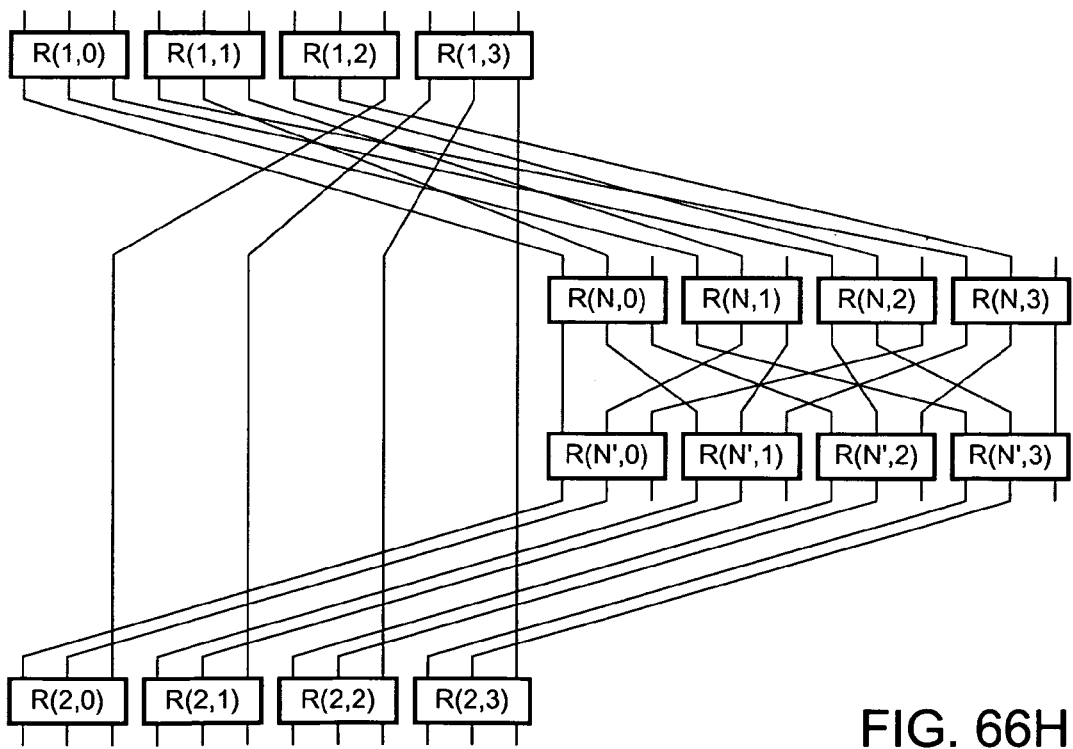
Figure 66I:
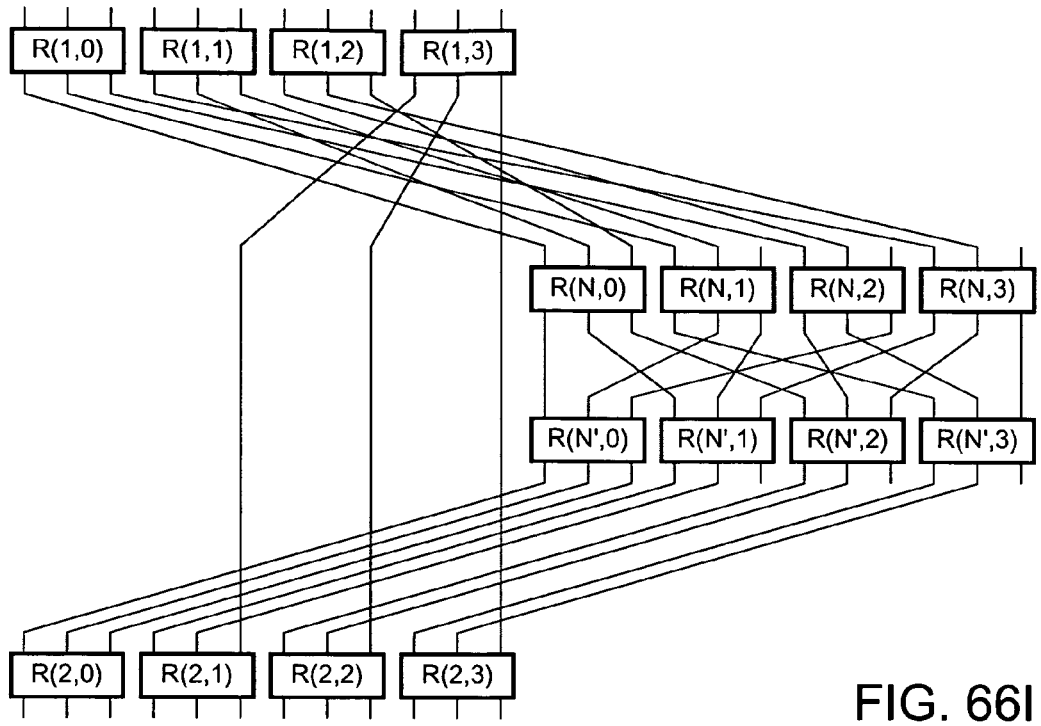
Figure 66J:
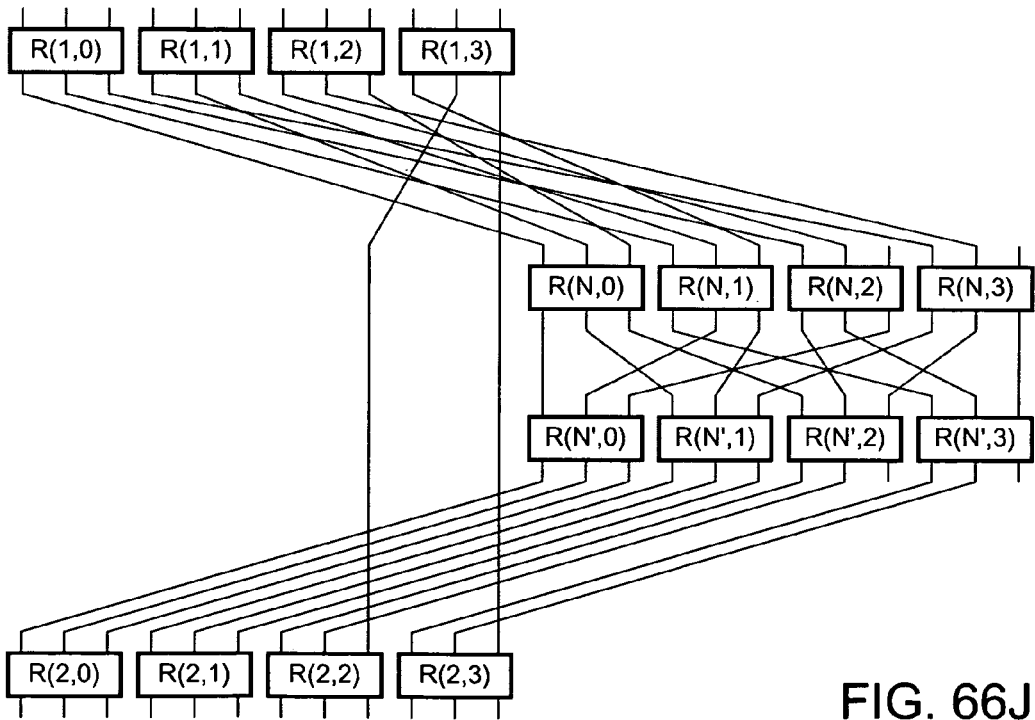
Figure 66K:
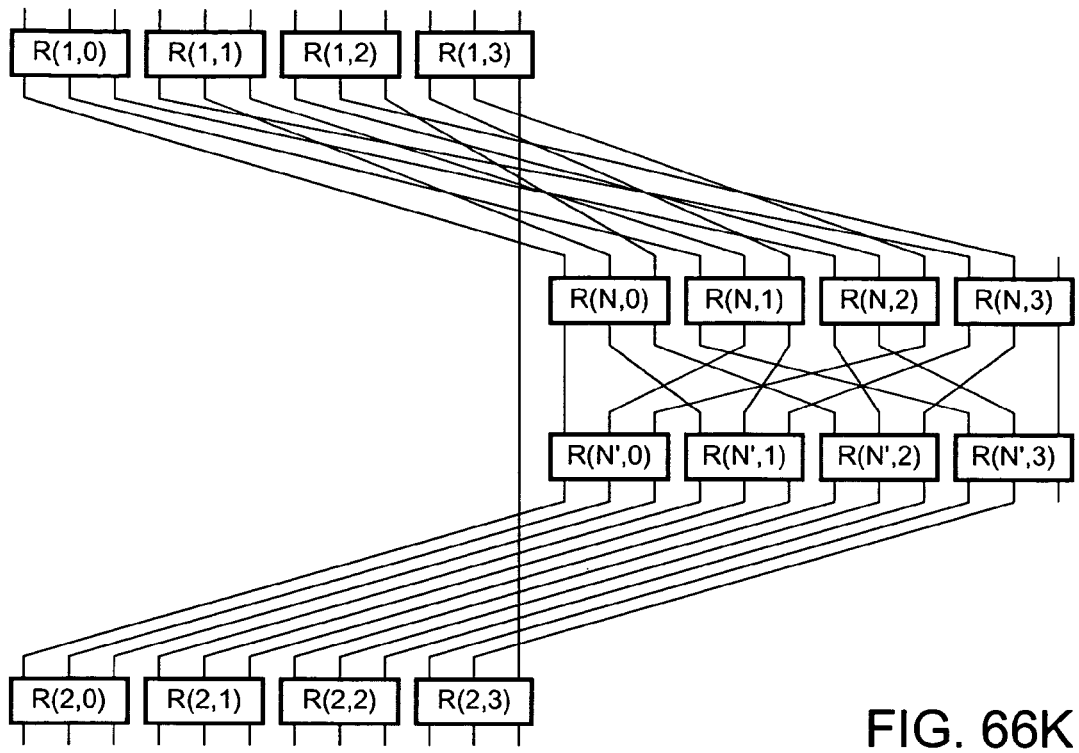
Figure 66L:
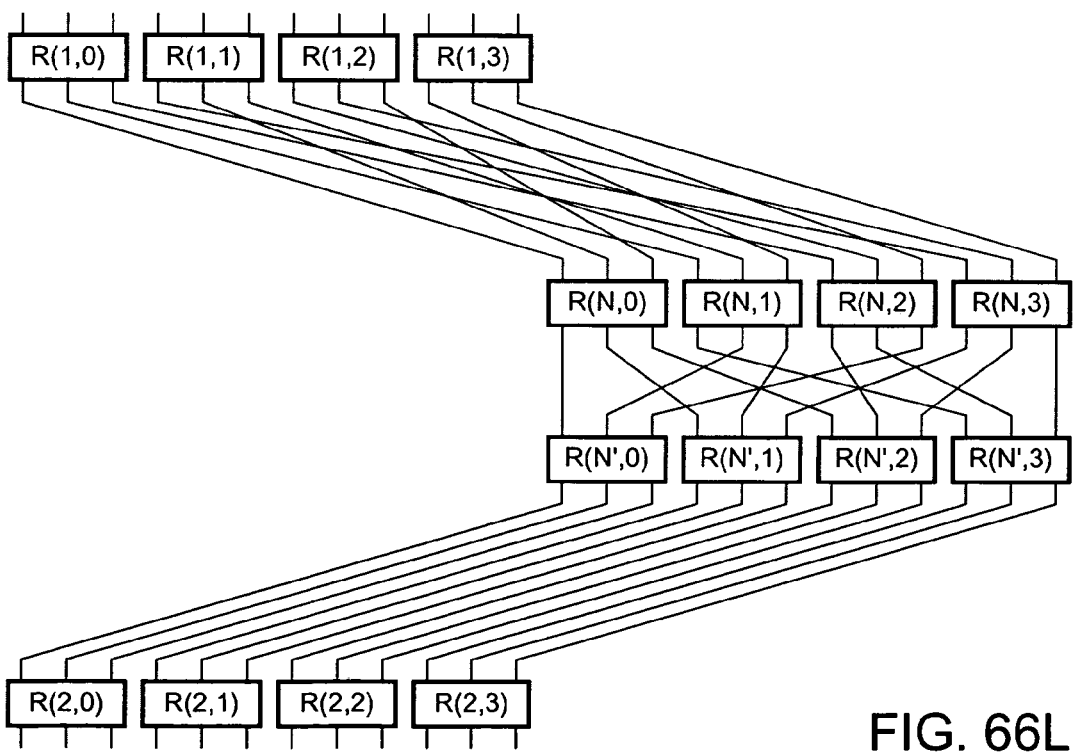
Figure 66M:
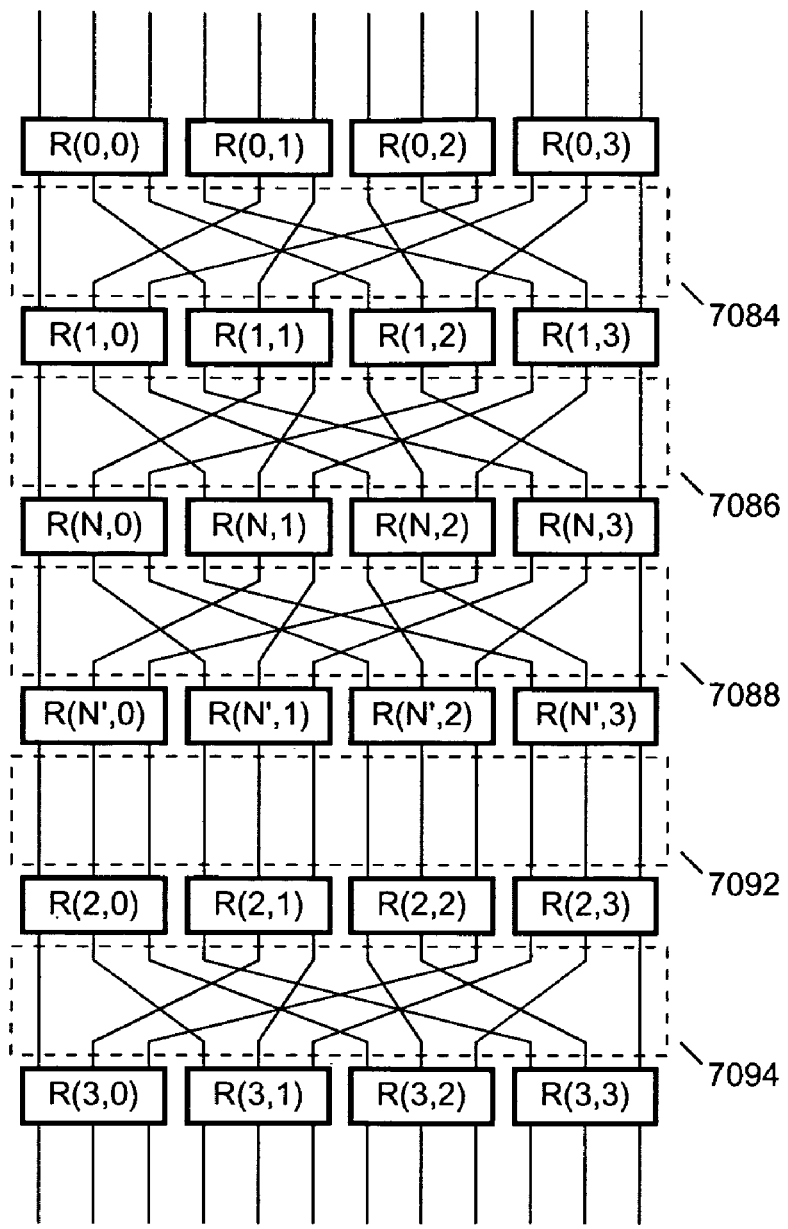

FIG. 66M shows the 24 port RBCCG multistage switching network with the insertion of the two new stages completed.

FIG. 67A, FIG. 67B, FIG. 67C, FIG. 67D, FIG. 67E, FIG. 67F, FIG. 67G, FIG. 67H and FIG. 67I show the ISIC network between stages R(N',*) and R(2,*) being rewired into post-reconfiguration CGISIC network by swapping top ports 0 and 1 of switching element R(2,2); swapping top ports 2 and 1 of switching element R(2,1); disconnecting bottom port 1 of switching element R(N',3) and moving the connection from bottom port 2 of switching element R(N',2) to bottom port 1 of switching element R(N',3); moving the connection from bottom port 2 of switching element R(N',0) to bottom port 2 of switching element R(N',2); moving the connection from top port 0 of switching element R(2,2) to top port 1 of switching element R(2,3); adding a connection between top port 0 of switching element R(2,2) and bottom port 2 of switching element R(N',0); disconnecting bottom port 0 of switching element R(N',3) and moving the connection from bottom port 1 of switching element R(N',1) to bottom port 0 of switching element R(N',3); moving the connection from bottom port 1 of switching element R(N',0) to bottom port 1 of switching element R(N',1); and moving the connection from top port 0 of switching element R(2,1) to top port 0 of switching element R(2,3), respectively.

Figure 67A:
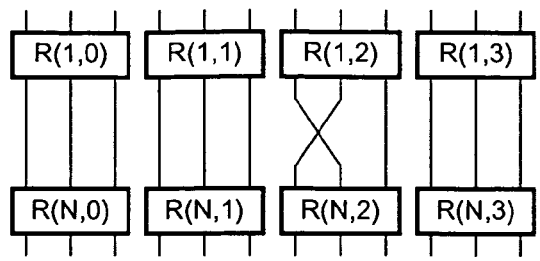
Figure 67B:
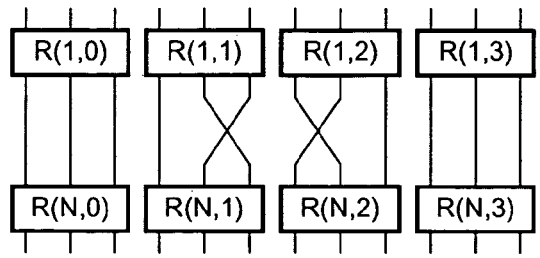
Figure 67C:
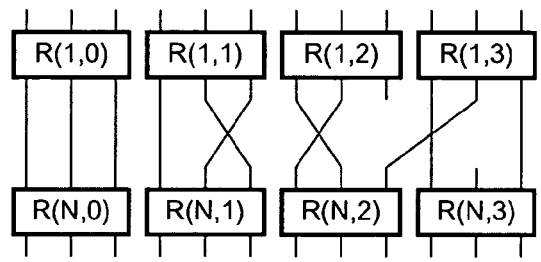
Figure 67D:
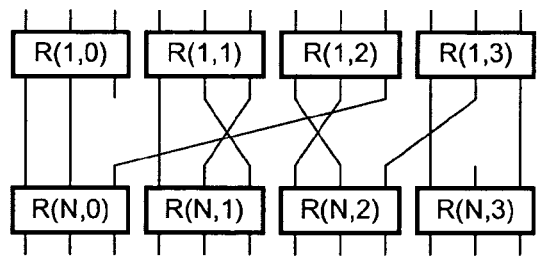
Figure 67E:
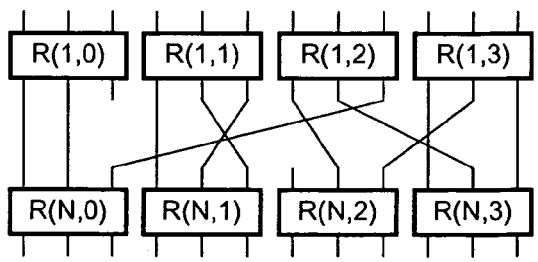
Figure 67F:
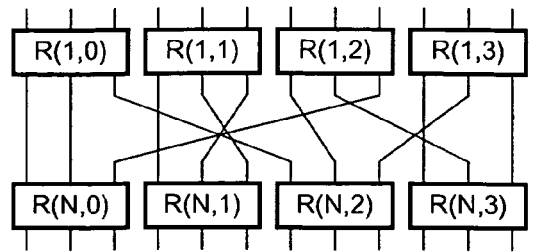
Figure 67G:
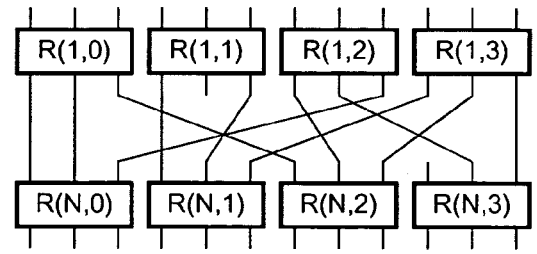
Figure 67H:
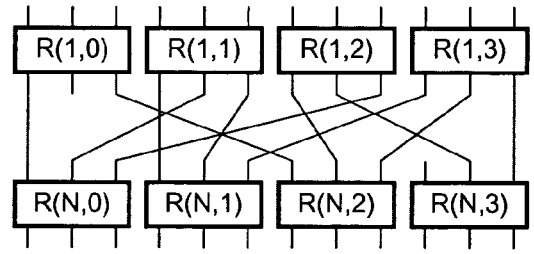
Figure 67I:
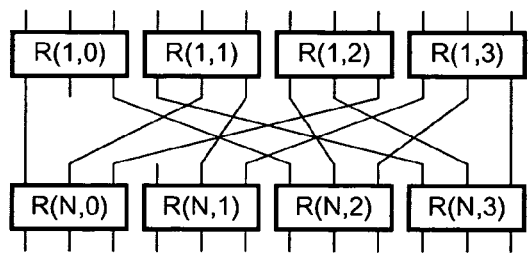
Figure 67J:
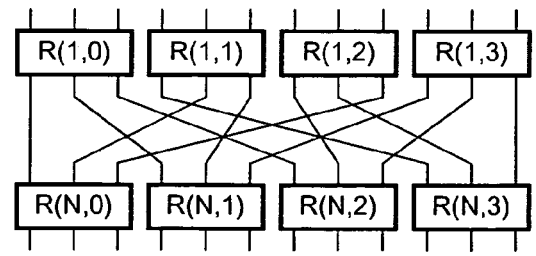

FIG. 67J shows a partially upgraded 24 port RBCCG multistage switching network with a completed rewire of the ISIC network between stages R(N',*) and R(2,*) after adding a connection between top port 0 of switching element R(2,1) and bottom port 1 of switching element R(N',0).

Figure 68:
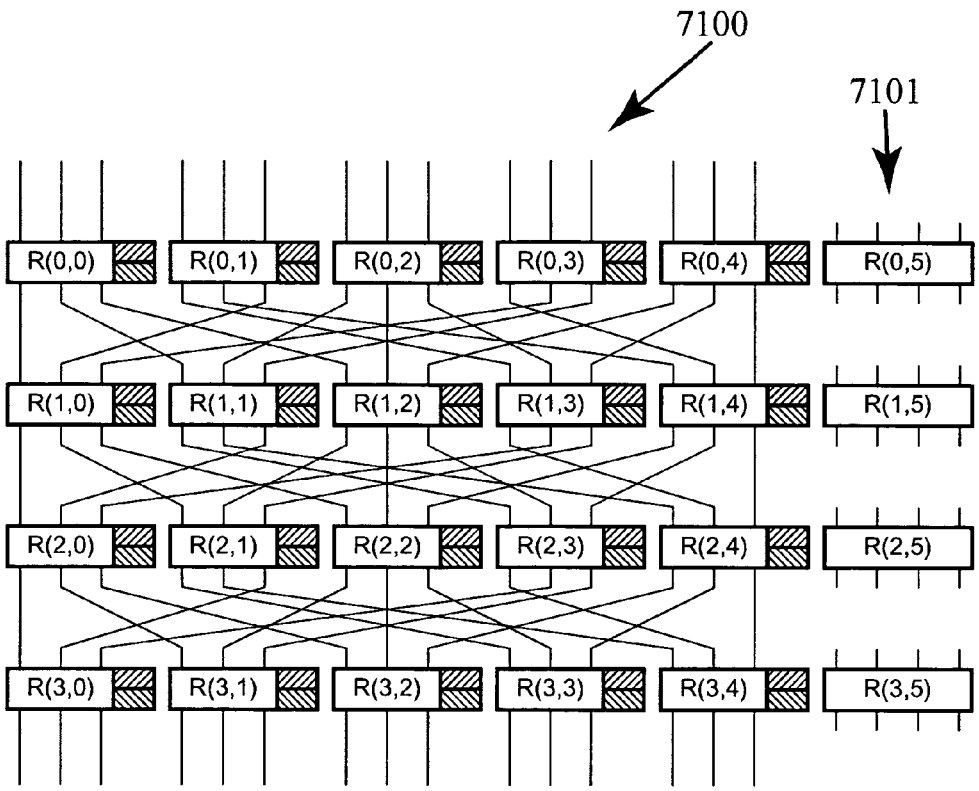

FIG. 68 shows a 30-port RBCCG multistage switching network. This architecture is to be upgraded to a 48-port RBCCG multistage switching network with the addition of an extra switching element per stage and expansion of the fanout.

Figure 69:
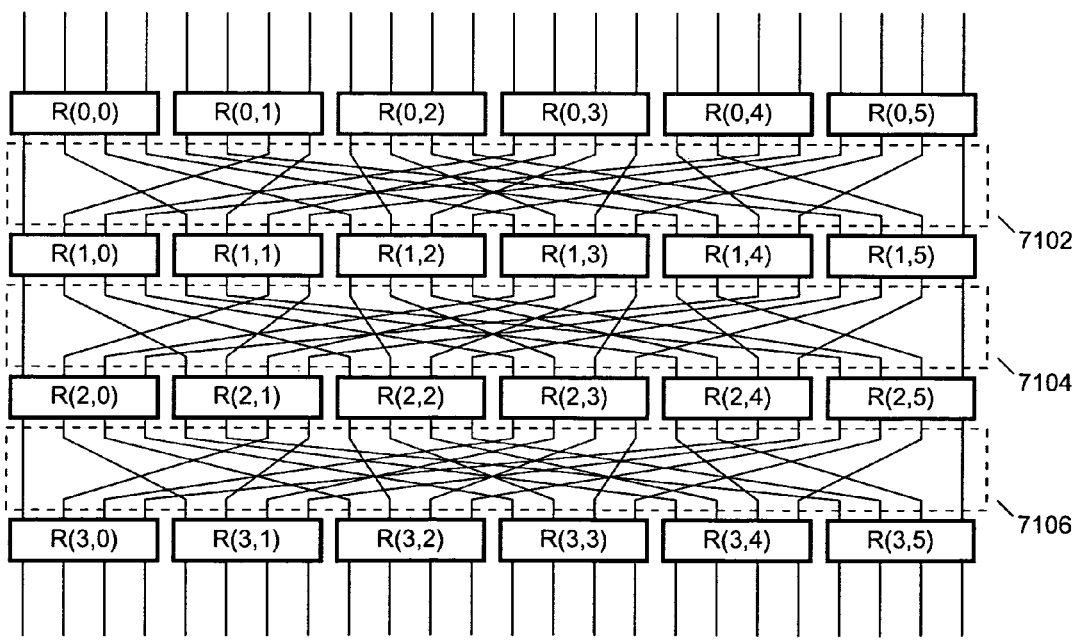

FIG. 69 shows the 48-port post-reconfiguration RBCCG multistage switching network which the network shown in FIG. 68 is to be upgraded to.

Figure 70:
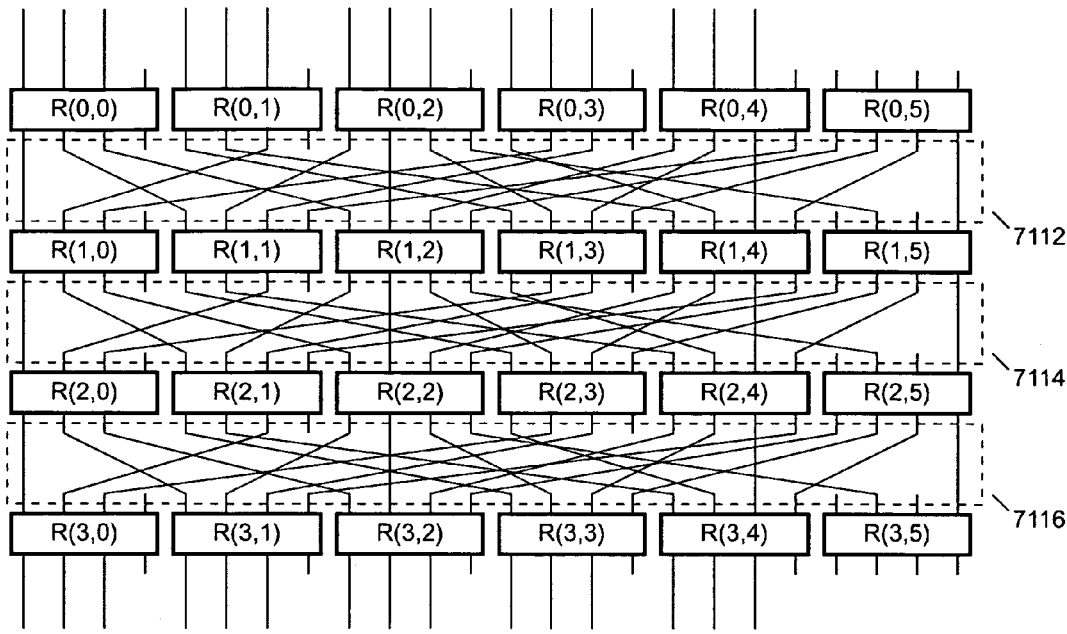

FIG. 70 shows the result of the non-disruptive addition of connections: bottom port 3 of switching element R(0,5) to top port 3 of switching element R(1,5), bottom port 2 of switching element R(0,5) to top port 3 of switching element R(1,4), bottom port 1 of switching element R(0,5) to top port 3 of switching element R(1,3), bottom port 0 of switching element R(0,5) to top port 3 of switching element R(1,2), bottom port 3 of switching element R(0,4) to top port 3 of switching element R(1,1), bottom port 3 of switching element R(0,2) to top port 1 of switching element R(1,5), bottom port 3 of switching element R(1,5) to top port 3 of switching element R(2,5), bottom port 2 of switching element R(1,5) to top port 3 of switching element R(2,4), bottom port 1 of switching element R(1,5) to top port 3 of switching element R(2,3), bottom port 0 of switching element R(1,5) to top port 3 of switching element R(2,2), bottom port 3 of switching element R(1,4) to top port 3 of switching element R(2,1), bottom port 3 of switching element R(1,2) to top port 1 of switching element R(2,5), bottom port 3 of switching element R(2,5) to top port 3 of switching element R(3,5), bottom port 2 of switching element R(2,5) to top port 3 of switching element R(3,4), bottom port 1 of switching element R(2,5) to top port 3 of switching element R(3,3), bottom port 0 of switching element R(2,5) to top port 3 of switching element R(3,2), bottom port 3 of switching element R(2,4) to top port 3 of switching element R(3,1), and bottom port 3 of switching element R(2,2) to top port 1 of switching element R(3,5).

FIG. 71A, FIG. 71B, FIG. 71C, FIG. 71D, FIG. 71E, FIG. 71F, FIG. 71G, FIG. 71H, FIG. 71I, FIG. 71J, FIG. 71K, FIG. 71L and FIG. 71M show the ISIC network between stages R(1,*) and R(2,*) being rewired into post-reconfiguration CGISIC network by moving the connection from top port 2 of switching element R(2,3) to top port 2 of switching element R(2,5); adding a connection between bottom port 3 of switching element R(1,3) and top port 2 of switching element R(2,3); moving the connection from bottom port 0 of switching element R(1,2) to bottom port 3 of switching element R(1,1); moving the connection from top port 0 of switching element R(2,4) to top port 0 of switching element R(2,5); moving the connection from top port 0 of switching element R(2,3) to top port 0 of switching element R(2,4); adding a connection between top port 0 of switching element R(2,3) and bottom port 3 of switching element R(1,0); moving the connection from top port 2 of switching element R(2,4) to top port 3 of switching element R(2,0); moving the connection from top port 2 of switching element R(2,2) to top port 2 of switching element R(2,4); moving the connection from top port 2 of switching element R(2,1) to top port 2 of switching element R(2,2); moving the connection from top port 2 of switching element R(2,0) to top port 2 of switching element R(2,1); moving the connection from top port 1 of switching element R(2,4) to top port 2 of switching element R(2,0); moving the connection from top port 1 of switching element R(2,3) to top port 1 of switching element R(2,4); and moving the connection from top port 1 of switching element R(2,2) to top port 1 of switching element R(2,3), respectively.

Figure 71A:
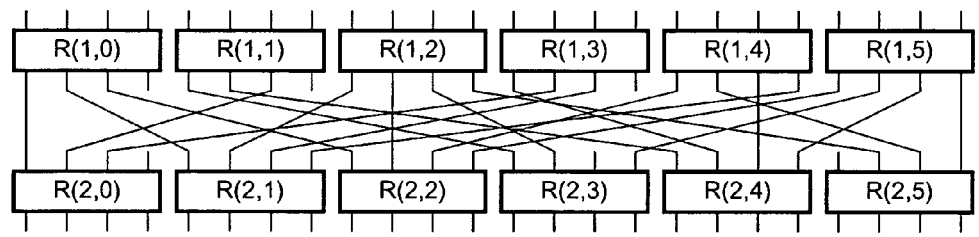
Figure 71B:
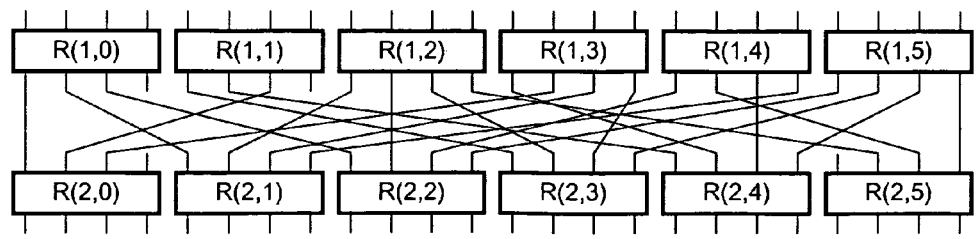
Figure 71C:
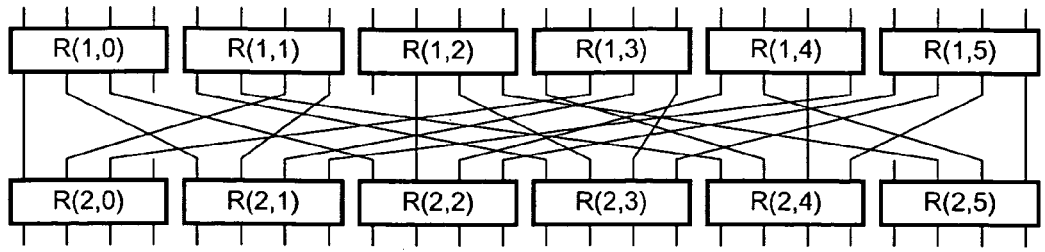
Figure 71D:
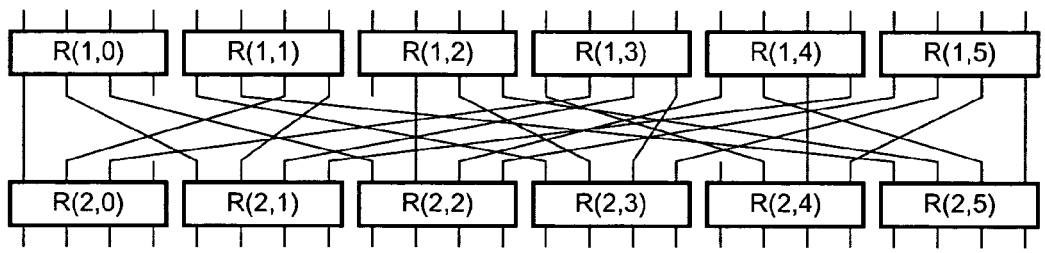
Figure 71E:
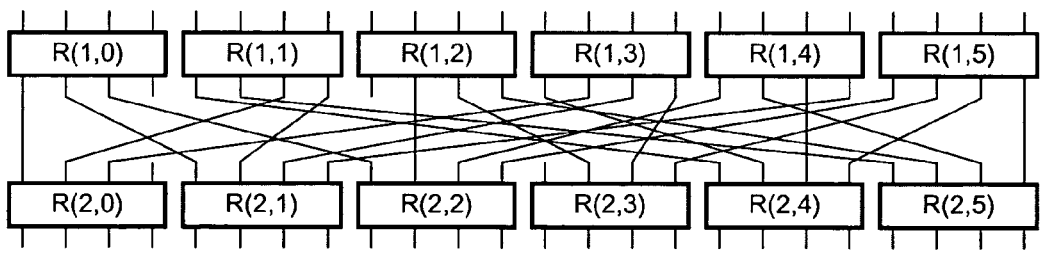
Figure 71F:
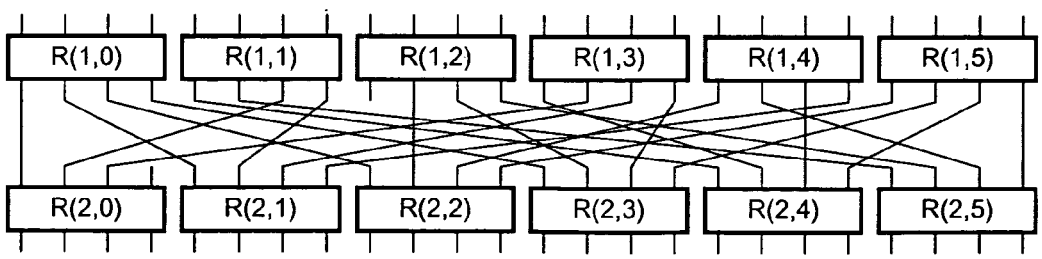
Figure 71G:
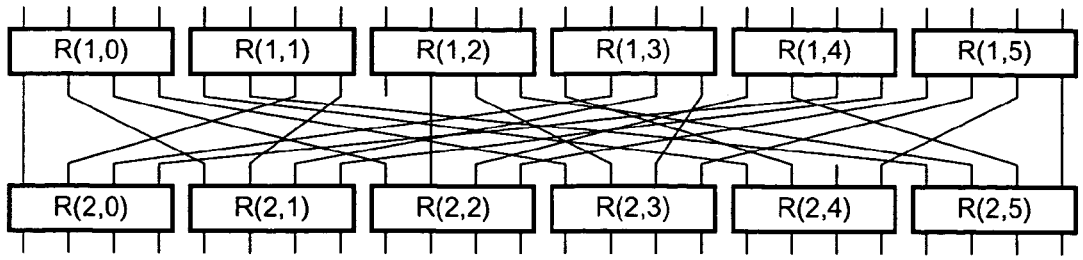
Figure 71H:
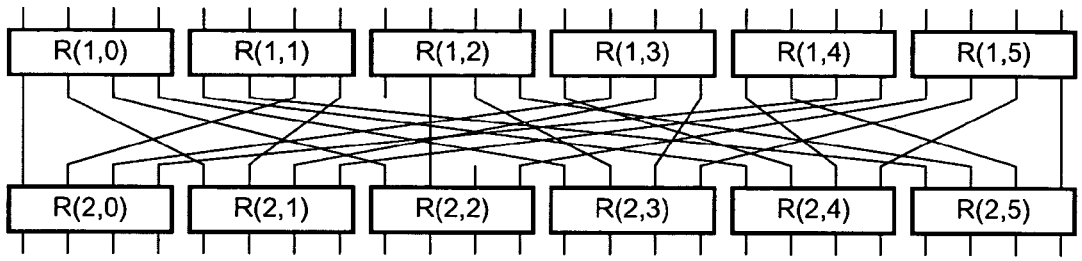
Figure 71I:
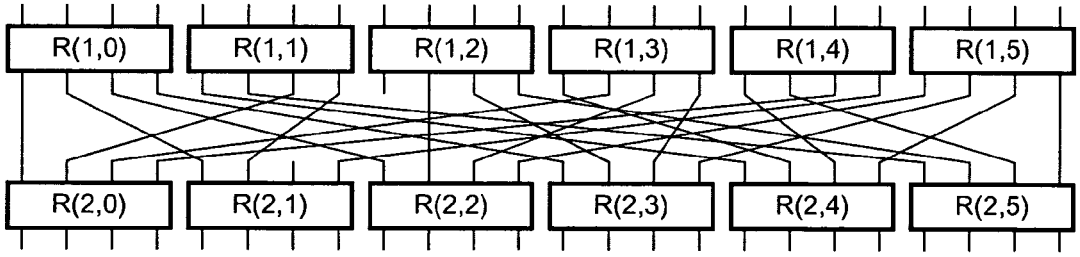
Figure 71J:
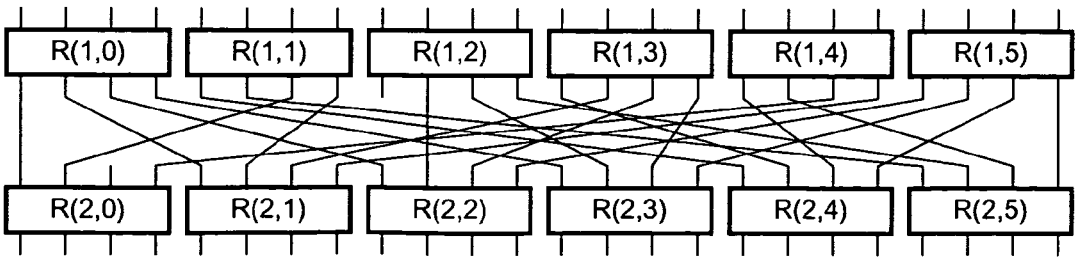
Figure 71K:
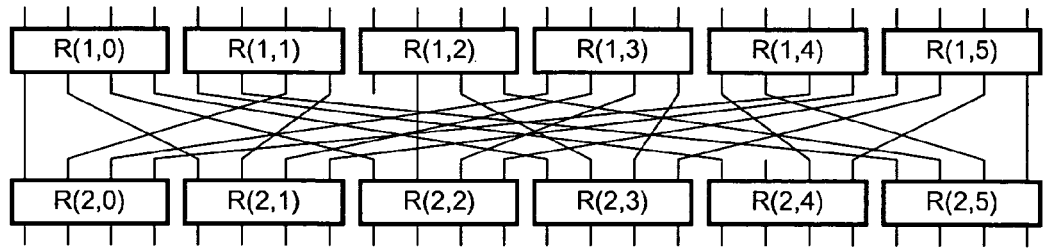
Figure 71L:
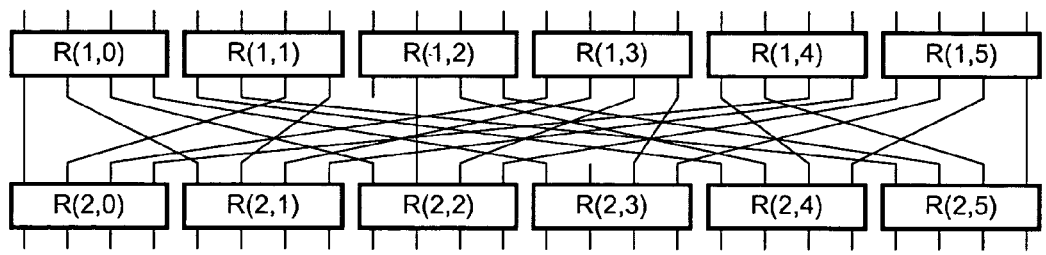
Figure 71M:
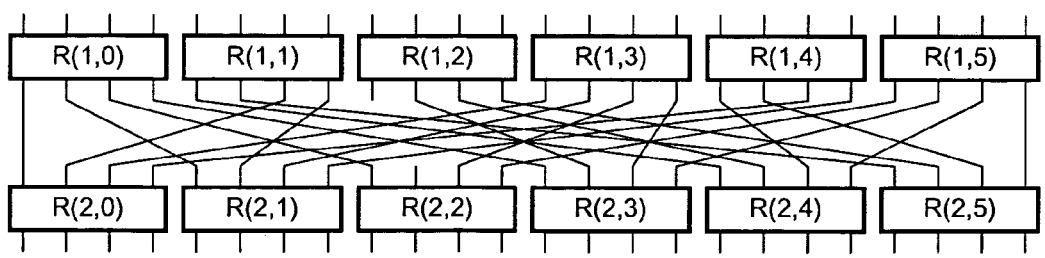
Figure 71N:
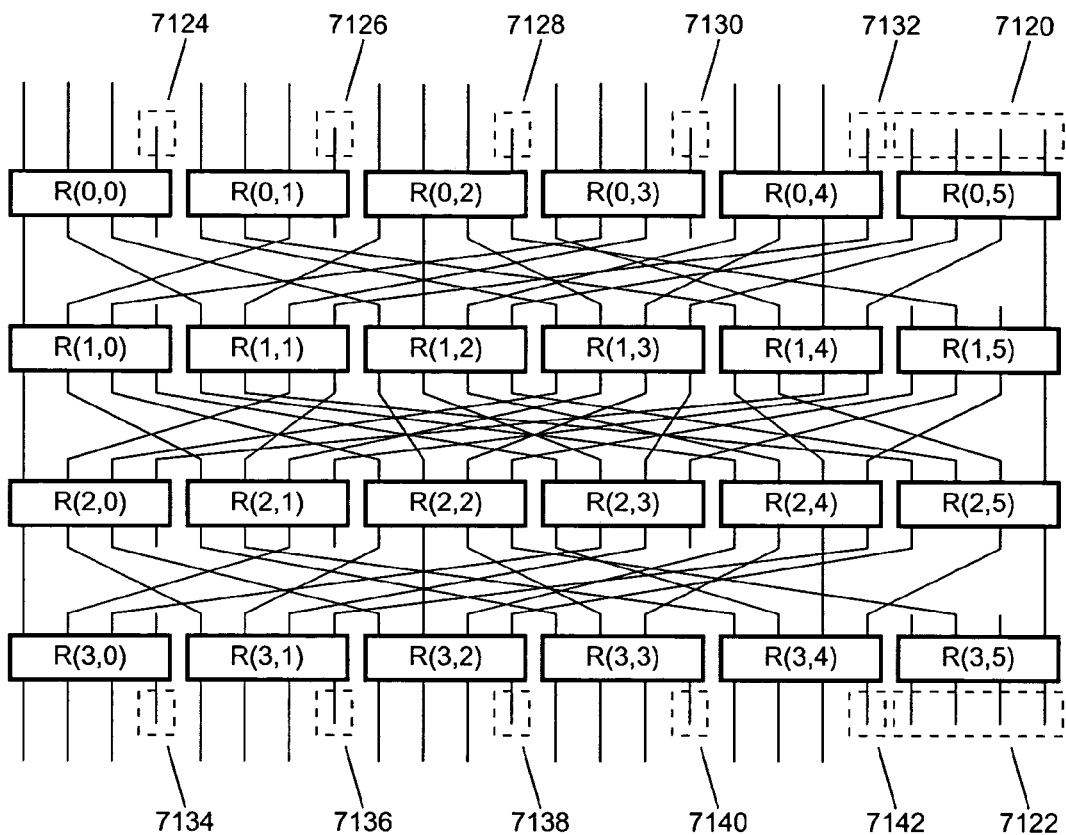

FIG. 71N shows a partially upgraded 30 port RBCCG multistage switching network with a completed rewire of the ISIC network between stages R(1,*) and R(2,*) after adding a connection between top port 1 of switching element R(2,2) and bottom port 0 of switching element R(1,2).

FIG. 72A, FIG. 72B, FIG. 72C, FIG. 72D, FIG. 72E, FIG. 72F, FIG. 72G, FIG. 72H, FIG. 72I, FIG. 72J, FIG. 72K, FIG. 72L and FIG. 72M show the ISIC network between stages R(0,*) and R(1,*) being rewired into a post-reconfiguration CGISIC network by swapping bottom ports 1 and 0 of switching element R(0,1); swapping bottom ports 1 and 0 of switching element R(0,2); swapping bottom ports 2 and 1 of switching element R(0,2); swapping bottom ports 1 and 0 of switching element R(0,3); swapping bottom ports 2 and 1 of switching element R(0,3); swapping bottom ports 2 and 0 of switching element R(0,4); moving the connection from top port 2 of switching element R(1,3) to top port 2 of switching element R(1,5); adding a connection between bottom port 3 of switching element R(0,3) and top port 2 of switching element R(1,3); moving the connection from bottom port 2 of switching element R(0,2) to bottom port 3 of switching element R(0,1); moving the connection from top port 0 of switching element R(1,3) to top port 0 of switching element R(1,5); adding a connection between top port 0 of switching element R(1,3) and bottom port 3 of switching element R(0,0); moving the connection from bottom port 2 of switching element R(0,3) to bottom port 2 of switching element R(0,2); and moving the connection from bottom port 2 of switching element R(0,4) to bottom port 2 of switching element R(0,3), respectively.

Figure 72A:
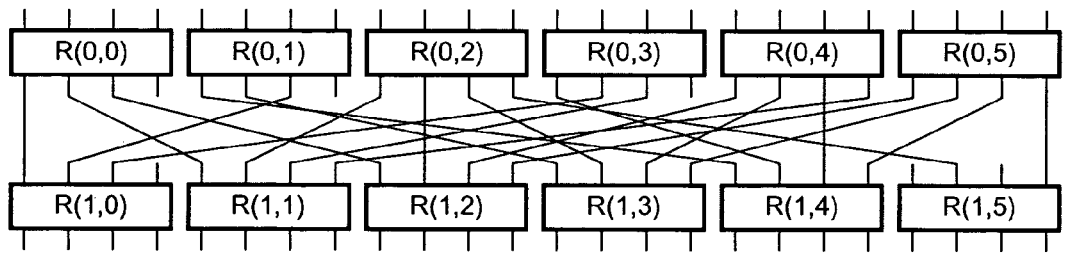
Figure 72B:
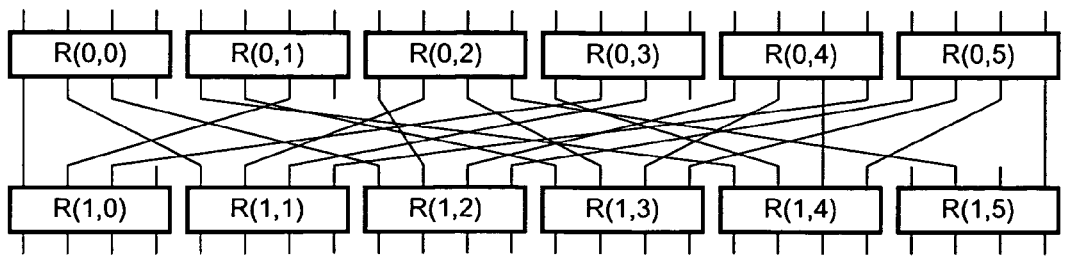
Figure 72C:
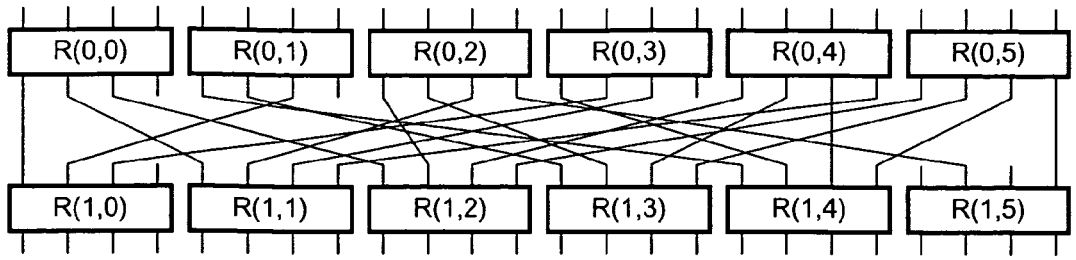
Figure 72D:
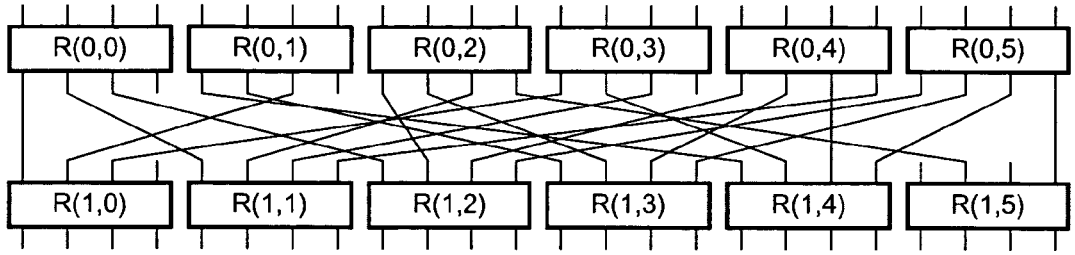
Figure 72E:
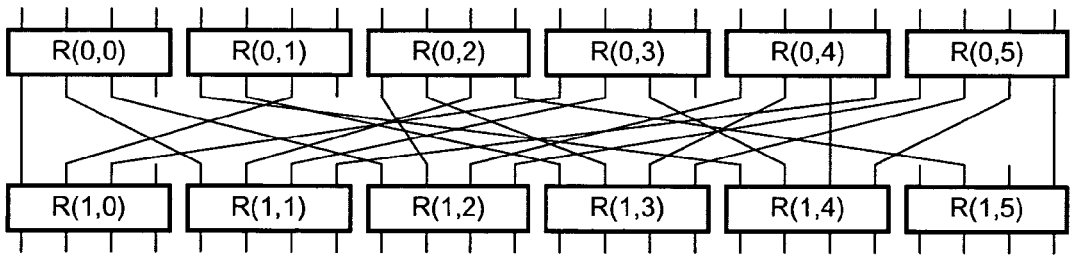
Figure 72F:
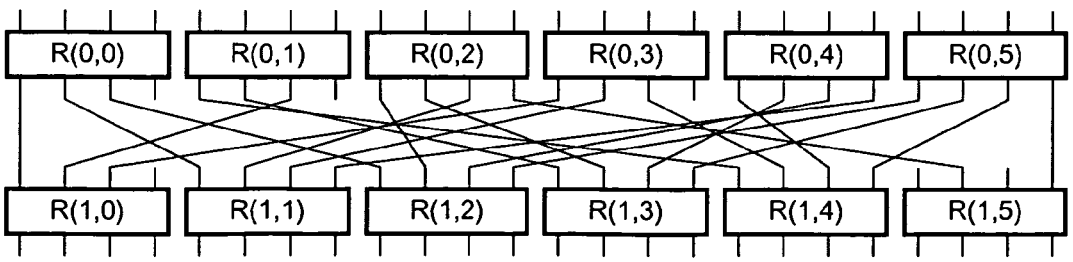
Figure 72G:
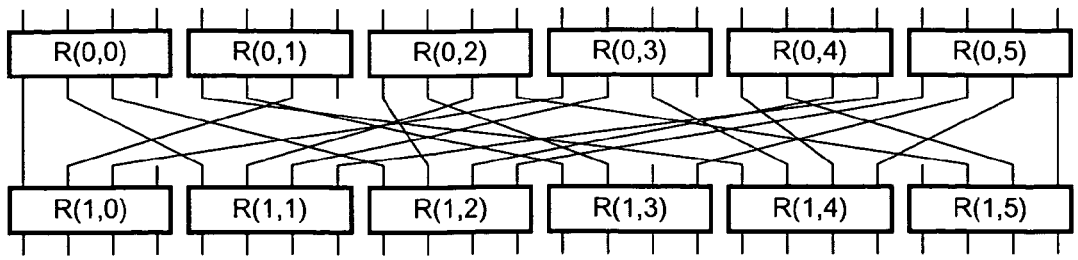
Figure 72H:
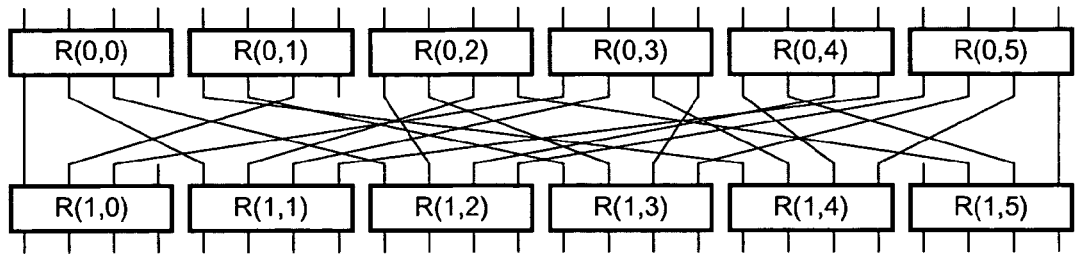
Figure 72I:
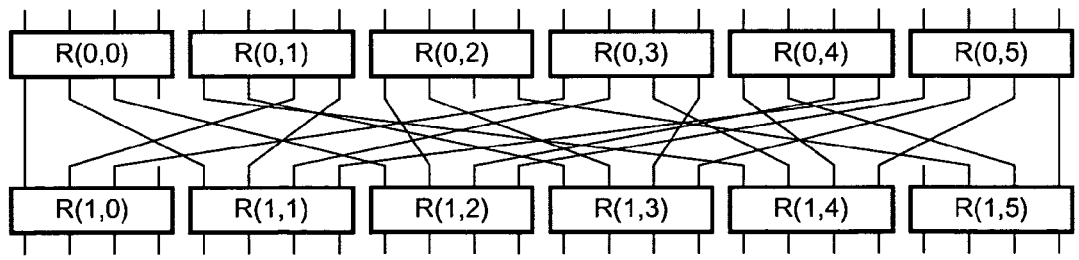
Figure 72J:
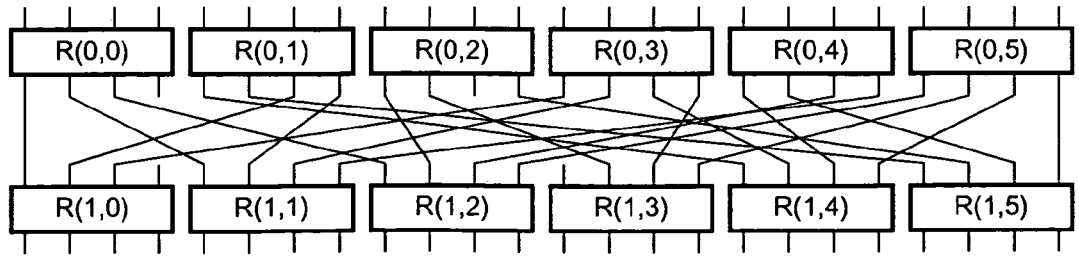
Figure 72K:
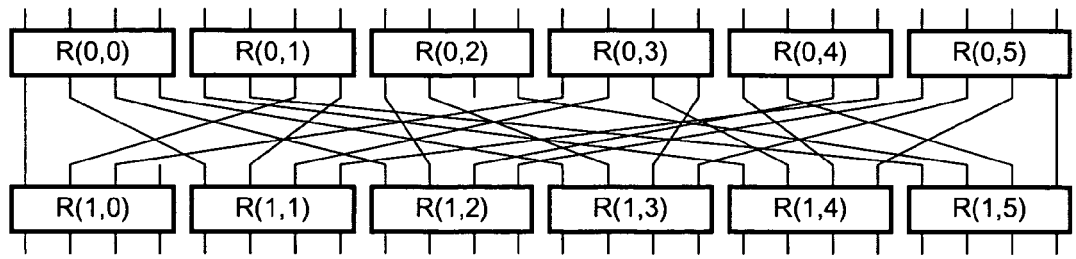
Figure 72L:
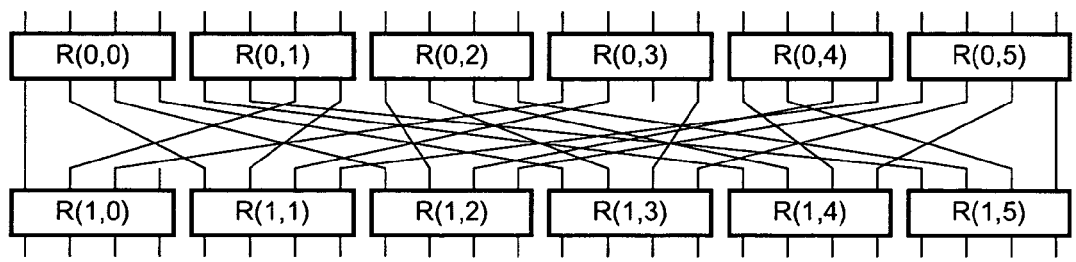
Figure 72M:
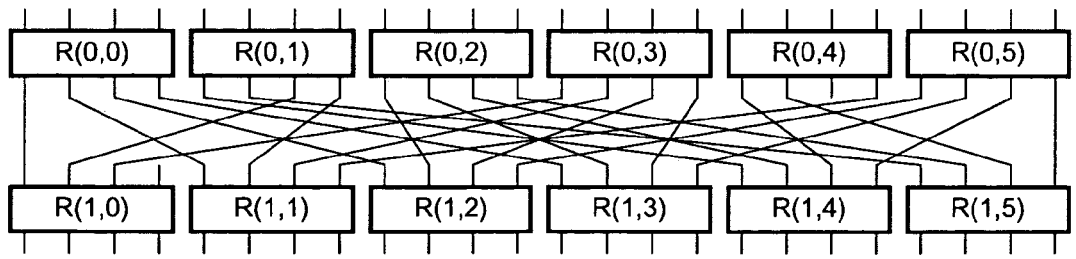
Figure 72N:
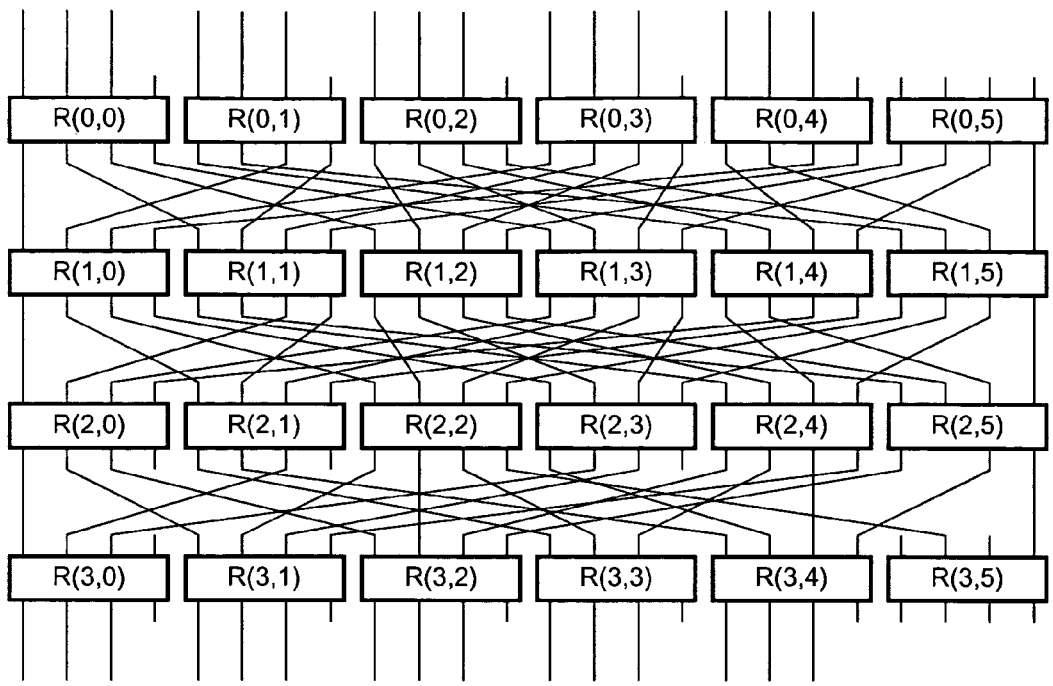

FIG. 72N shows a partially upgraded 30 port RBCCG multistage switching network with a completed rewire of the ISIC network between stages R(0,*) and R(1,*) after adding a connection between bottom port 2 of switching element R(0,4) and top port 3 of switching element R(1,0).

Figure 72O:
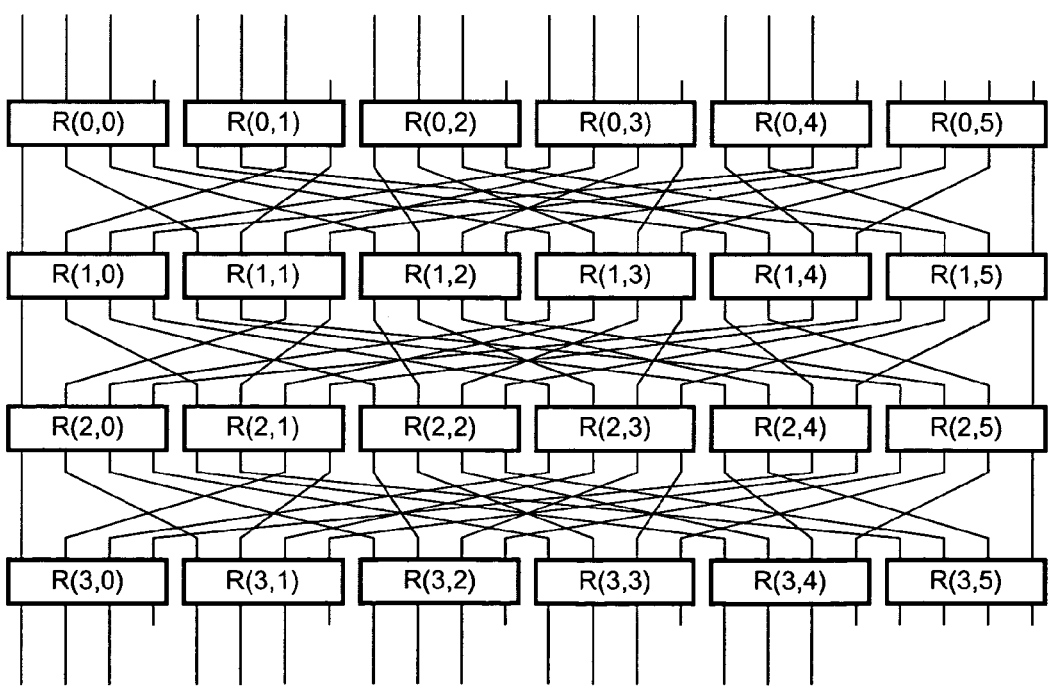

FIG. 72O shows a partially upgraded 30 port RBCCG multistage switching network with a completed reconfigure of the ISIC network between stages R(2,*) and R(3,*)

Figure 73:
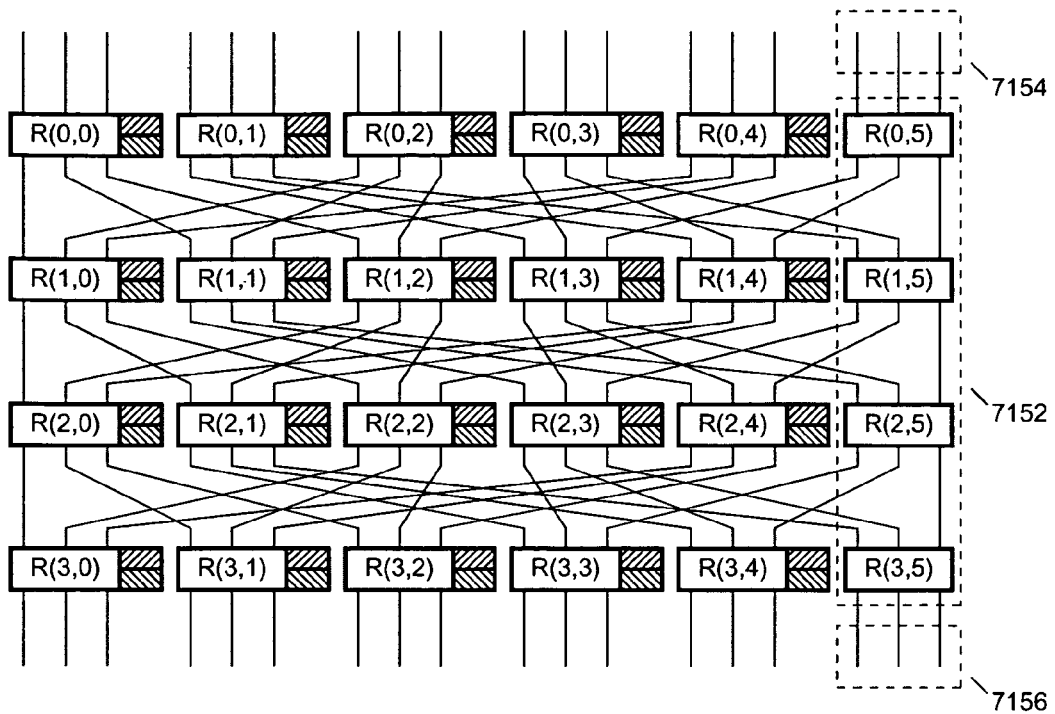

FIG. 73 shows a 36-port RBCCG multistage switching network. This architecture is to be converted to a 40-port RBCCG multistage switching network with the removal of a switching element per stage and expansion of the fanout.

Figure 74:
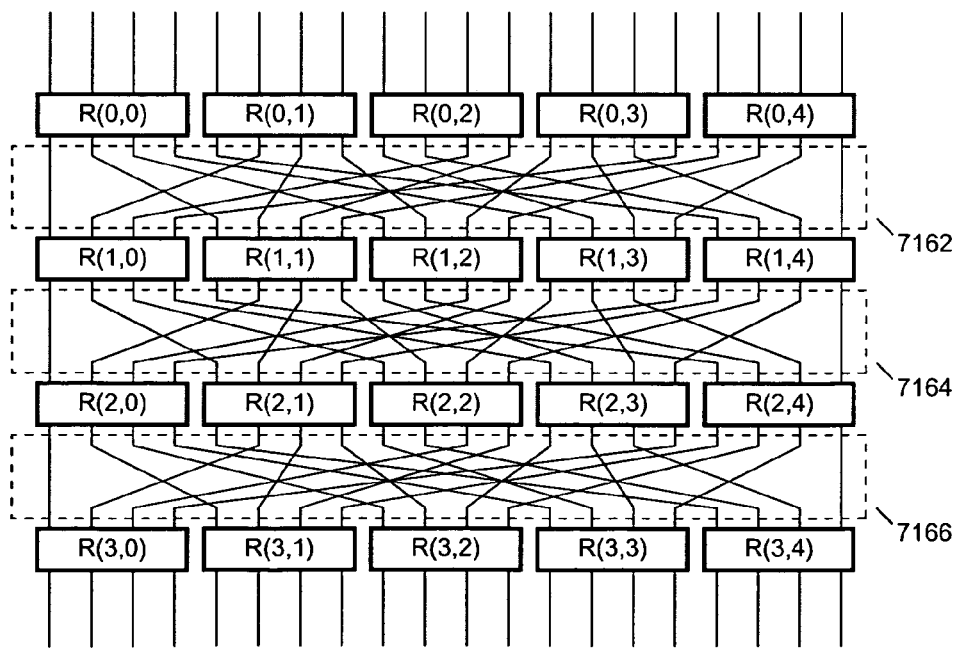

FIG. 74 shows the 40-port post-reconfiguration RBCCG multistage switching network which the network shown in FIG. 73 is to be converted to.

Figure 75:
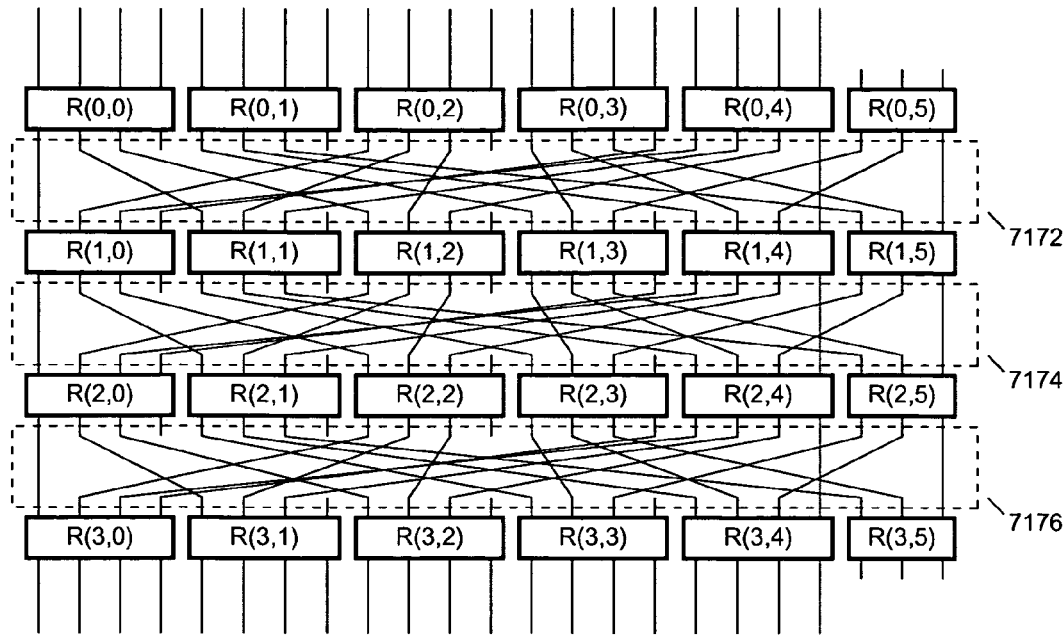

FIG. 75 shows the result of the non-disruptive addition of connections: bottom port 3 of switching element R(0,4) to top port 3 of switching element R(1,4), bottom port 3 of switching element R(0,3) to top port 3 of switching element R(1,0), bottom port 3 of switching element R(1,4) to top port 3 of switching element R(2,4), bottom port 3 of switching element R(1,3) to top port 3 of switching element R(2,0), bottom port 3 of switching element R(2,4) to top port 3 of switching element R(3,4), and bottom port 3 of switching element R(2,3) to top port 3 of switching element R(3,0).

FIG. 76A, FIG. 76B, FIG. 76C, FIG. 76D, FIG. 76E, FIG. 76F, FIG. 76G, FIG. 76H, FIG. 76I, FIG. 76J, FIG. 76K, FIG. 76L, FIG. 76M and FIG. 76N show the ISIC network stages R(1,*) and R(2,*) being rewired into a post-reconfiguration CGISIC network by moving the connection from top port 2 of switching element R(2,0) to top port 3 of switching element R(2,1); moving the connection from bottom port 1 of switching element R(1,4) to bottom port 3 of switching element R(1,2); adding a connection between bottom port 1 of switching element R(1,4) and top port 3 of switching element R(2,2); moving the connection from top port 2 of switching element R(2,2) to top port 3 of switching element R(2,3); moving the connection from top port 1 of switching element R(2,3) to top port 2 of switching element R(2,2); moving the connection from bottom port 2 of switching element R(1,2) to bottom port 3 of switching element R(1,1); adding a connection between bottom port 2 of switching element R(1,2) and top port 2 of switching element R(2,0); moving the connection from top port 1 of switching element R(2,0) to top port 1 of switching element R(2,3); moving the connection from bottom port 0 of switching element R(1,1) to bottom port 3 of switching element R(1,0); moving the connection from bottom port 1 of switching element R(1,1) to bottom port 0 of switching element R(1,1); adding a connection between bottom port 1 of switching element R(1,1) and top port 1 of switching element R(2,0); disconnecting top port 2 of switching element R(2,4) and moving the connection from top port 1 of switching element R(2,5) to top port 2 of switching element R(2,4); disconnecting top port 1 of switching element R(2,4) and moving the connection from top port 1 of switching element R(2,1) to top port 1 of switching element R(2,4); and moving the connection from bottom port 0 of switching element R(1,5) to bottom port 1 of switching element R(1,3), respectively.

Figure 76A:
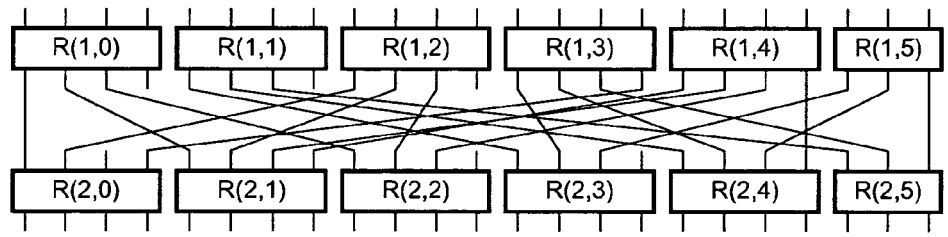
Figure 76B:
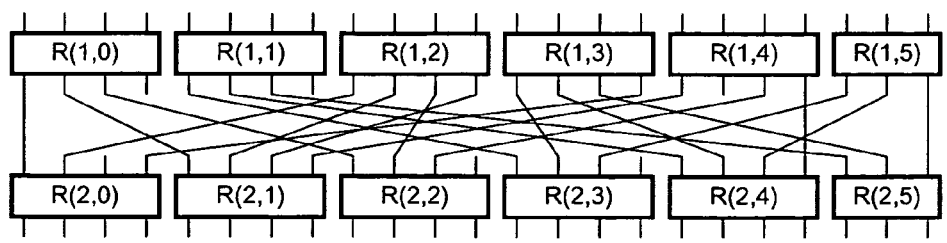
Figure 76C:
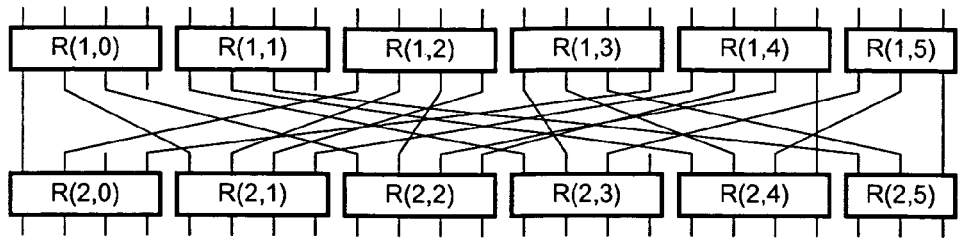
Figure 76D:
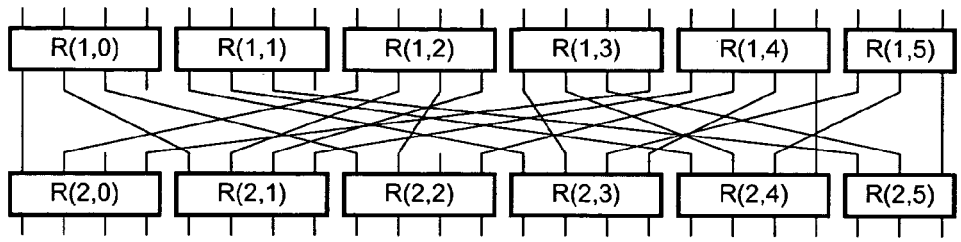
Figure 76E:
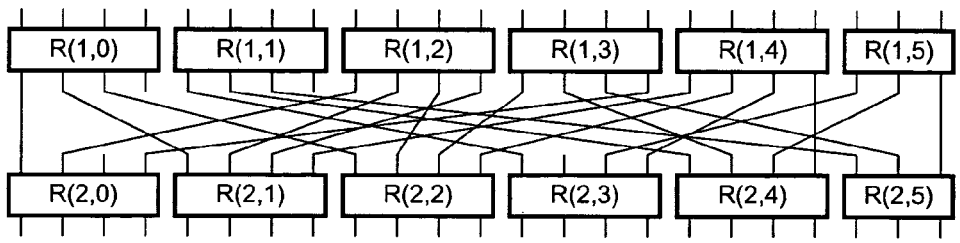
Figure 76F:
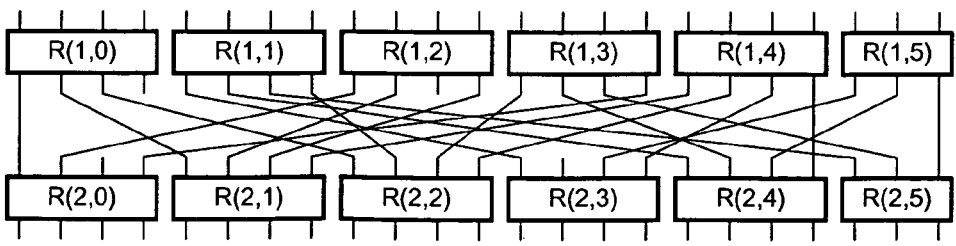
Figure 76G:
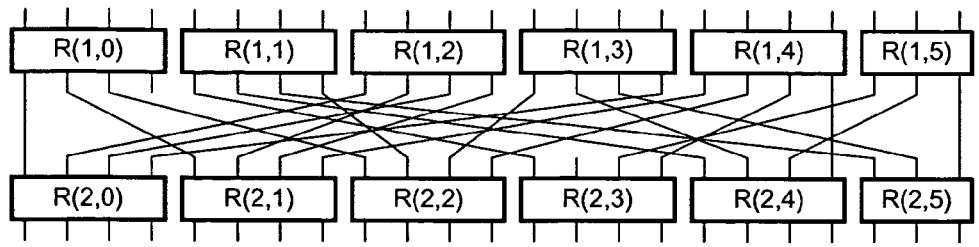
Figure 76H:
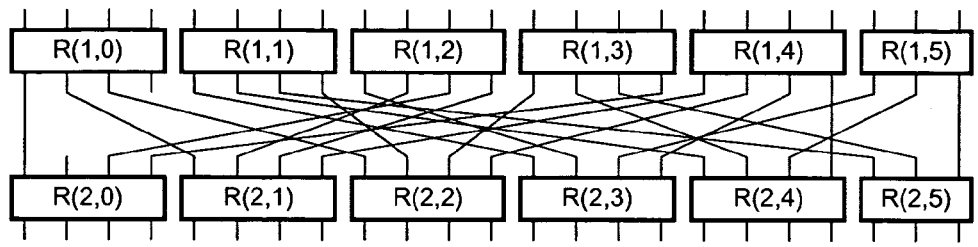
Figure 76I:
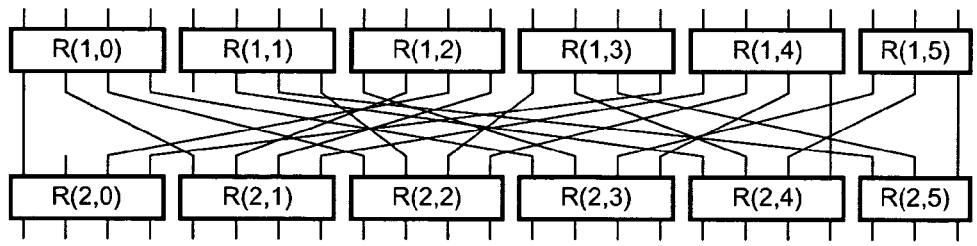
Figure 76J:
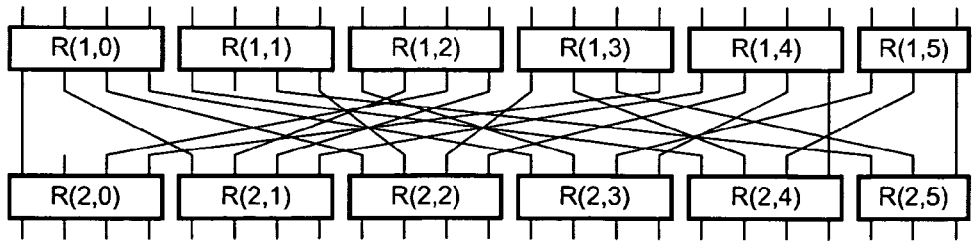
Figure 76K:
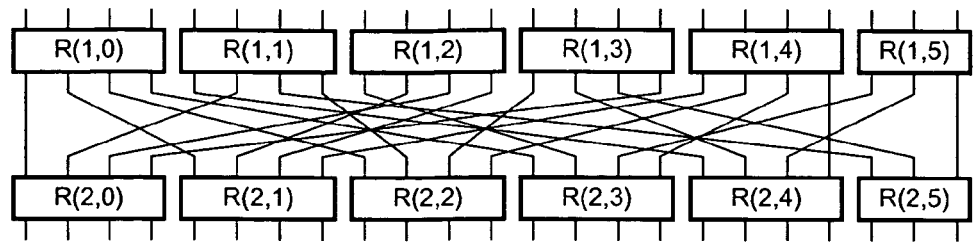
Figure 76L:
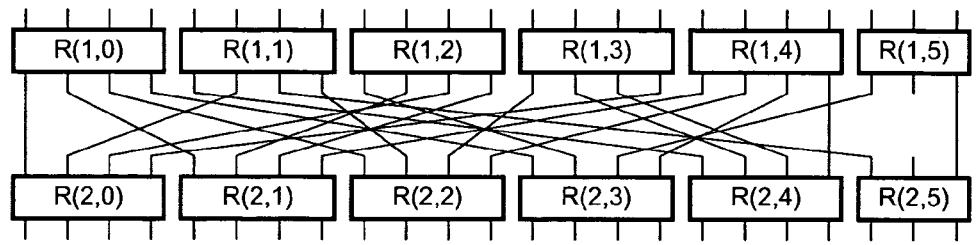
Figure 76M:
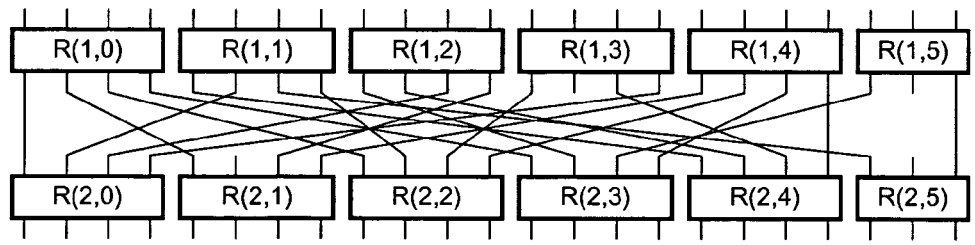
Figure 76N:
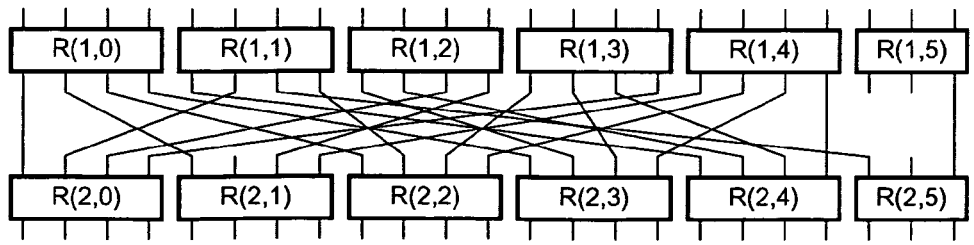
Figure 76O:
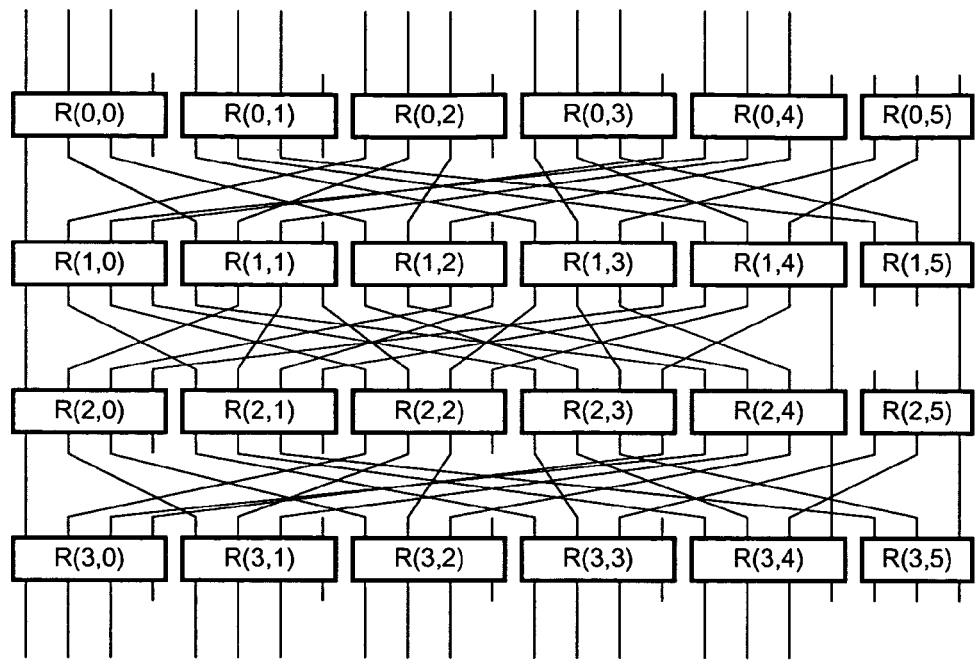

FIG. 76O shows a partially upgraded 40 port RBCCG multistage switching network with a completed rewire of the ISIC network between stages R(1,*) and R(2,*) after moving the connection from top port 0 of switching element R(2,5) to top port 1 of switching element R(2,1).

FIG. 77A, FIG. 77B, FIG. 77C, FIG. 77D, FIG. 77E, FIG. 77F, FIG. 77G, FIG. 77H, FIG. 77I, FIG. 77J, FIG. 77K, FIG. 77L, FIG. 77M, FIG. 77N, FIG. 77O, FIG. 77P, FIG. 77Q, FIG. 77R, FIG. 77S and FIG. 77T show the connections between stages R(0,*) and R(1,*) being rewired into a post-reconfiguration CGISIC network by swapping bottom ports 1 and 0 of switching element R(0,1); swapping bottom ports 0 and 2 of switching element R(0,2); swapping bottom ports 1 and 3 of switching element R(0,2); swapping bottom ports 0 and 1 of switching element R(0,3); swapping bottom ports 0 and 2 of switching element R(0,3); swapping bottom ports 1 and 0 of switching element R(0,4); swapping bottom ports 2 and 1 of switching element R(0,4); swapping top ports 1 and 2 of switching element R(1,4); swapping top ports 1 and 2 of switching element R(1,3); swapping top ports 2 and 3 of switching element R(1,2); swapping top ports 2 and 3 of switching element R(1,1); swapping top ports 1 and 2 of switching element R(1,1); swapping top ports 1 and 2 of switching element R(1,0); moving the connection from top port 1 of switching element R(1,0) to top port 3 of switching element R(1,3); moving the connection from top port 1 of switching element R(1,5) to top port 2 of switching element R(1,2); moving the connection from bottom port 1 of switching element R(0,5) to bottom port 1 of switching element R(0,2); moving the connection from bottom port 0 of switching element R(0,2) to bottom port 3 of switching element R(0,1); moving the connection from bottom port 1 of switching element R(0,1) to bottom port 3 of switching element R(0,0); adding a connection between bottom port 1 of switching element R(0,1) and top port 1 of switching element R(1,0); and moving the connection from bottom port 0 of switching element R(0,5) to bottom port 0 of switching element R(0,2), respectively.

Figure 77A:
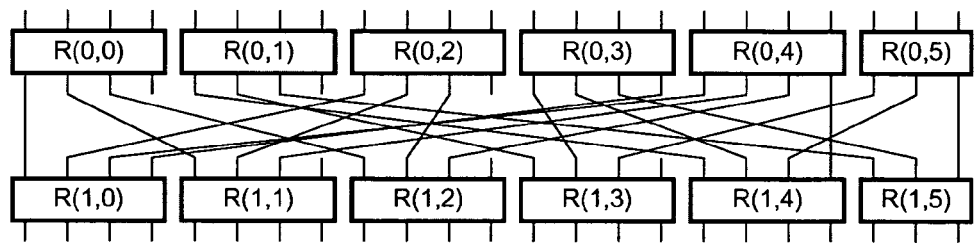
Figure 77B:
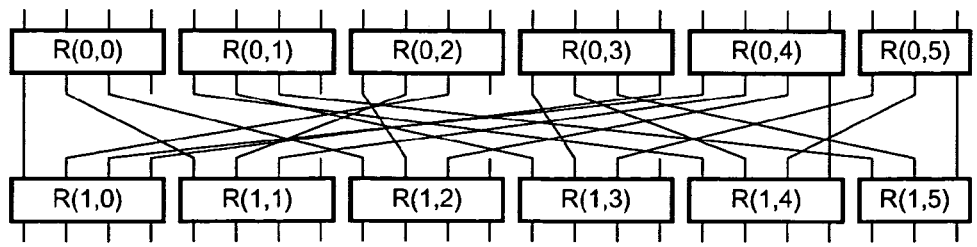
Figure 77C:
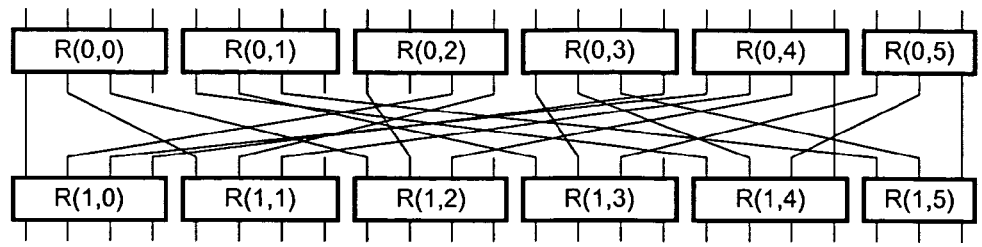
Figure 77D:
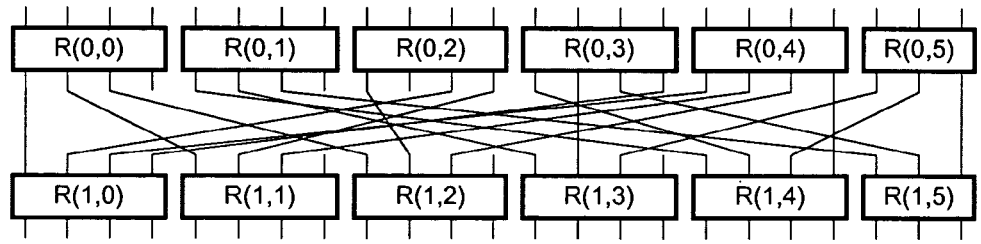
Figure 77E:
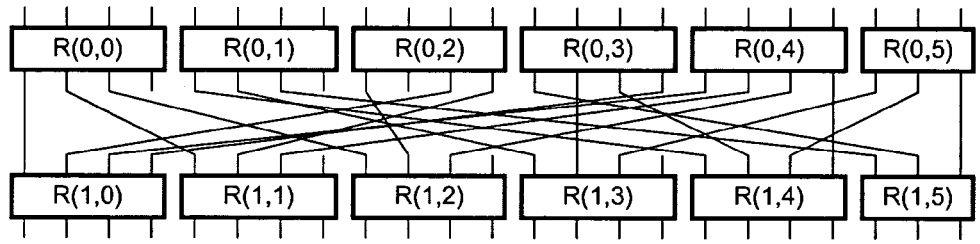
Figure 77F:
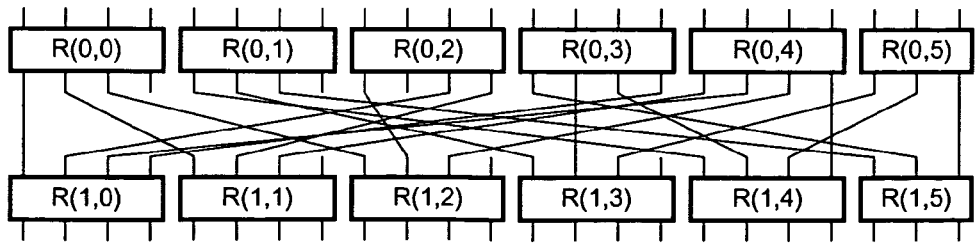
Figure 77G:
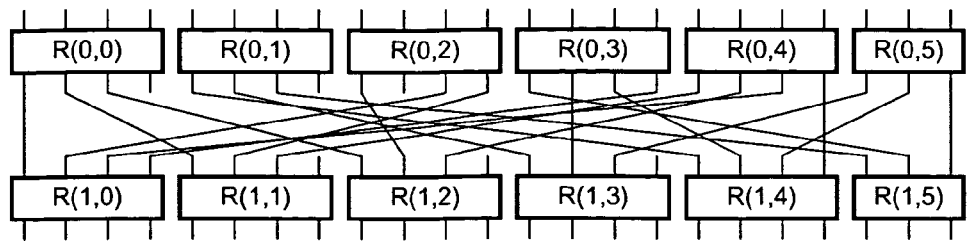
Figure 77H:
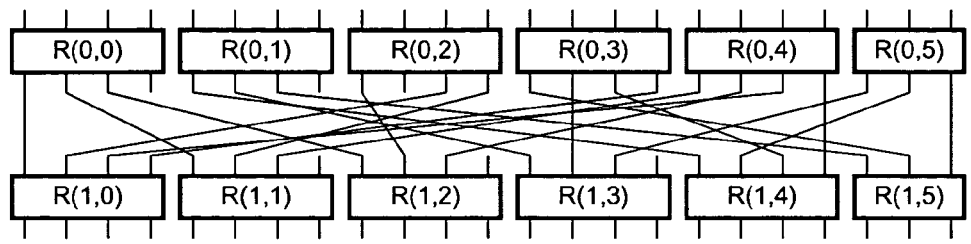
Figure 77I:
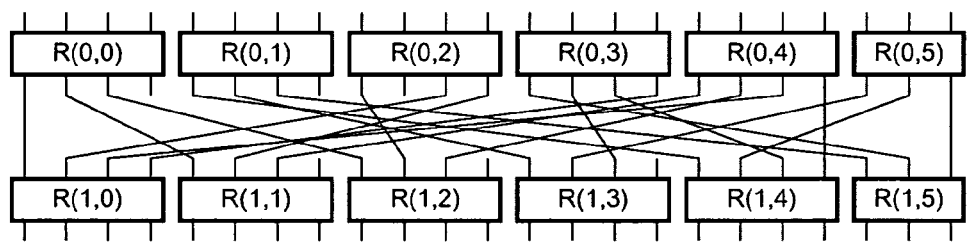
Figure 77J:
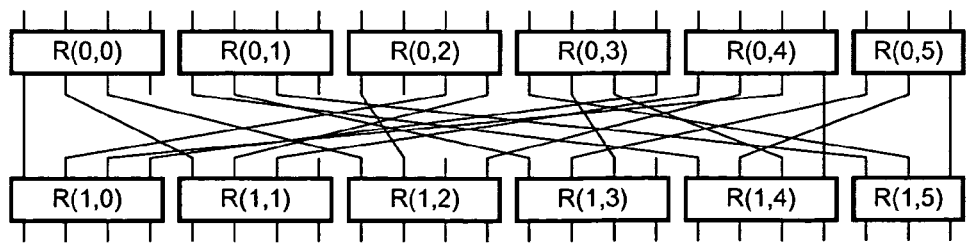
Figure 77K:
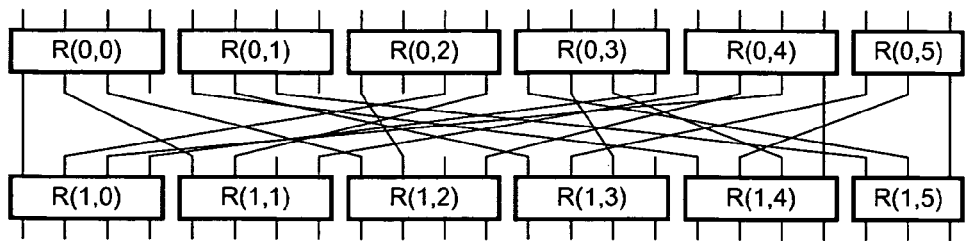
Figure 77L:
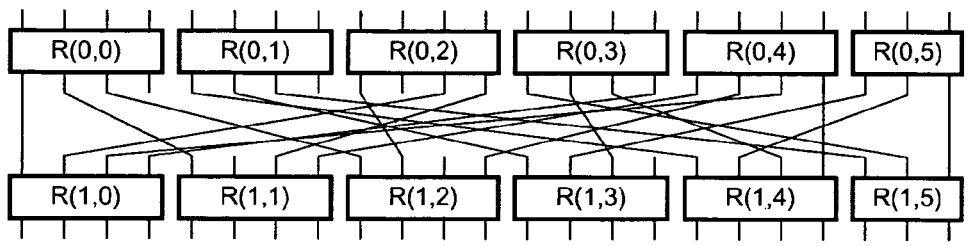
Figure 77M:
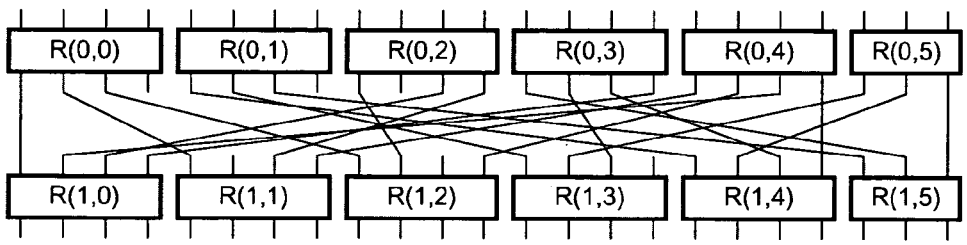
Figure 77N:
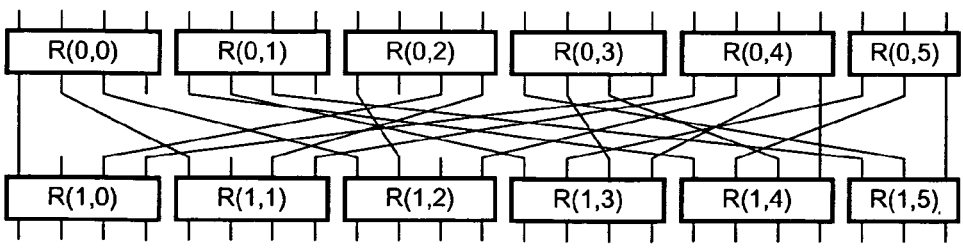
Figure 77O:
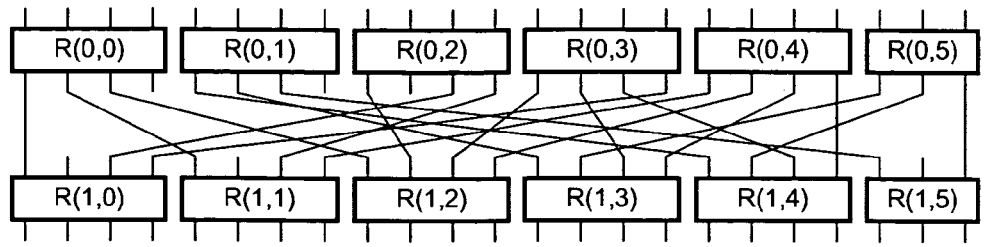
Figure 77P:
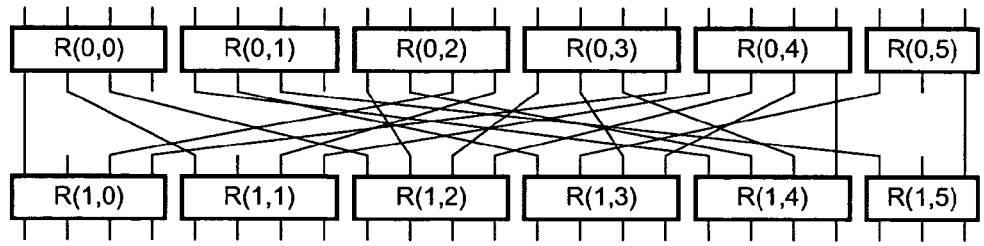
Figure 77Q:
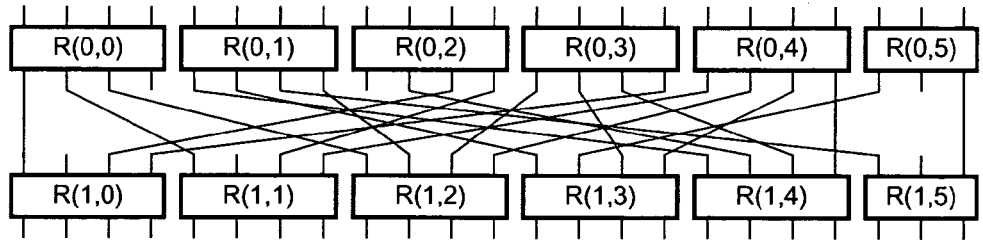
Figure 77R:
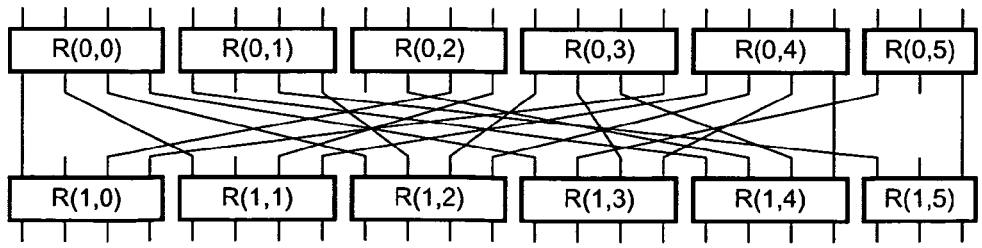
Figure 77S:
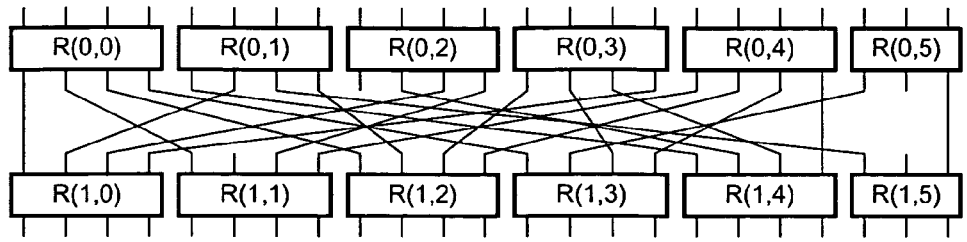
Figure 77T:
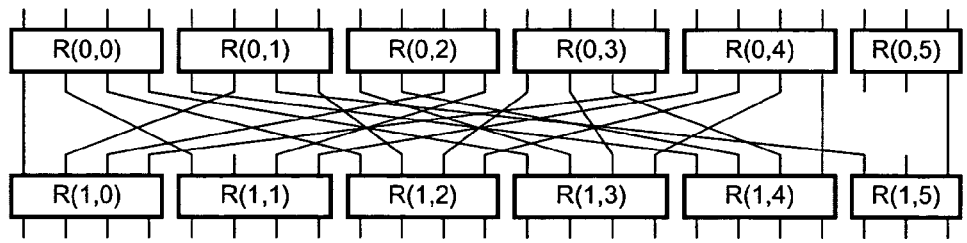
Figure 77U:
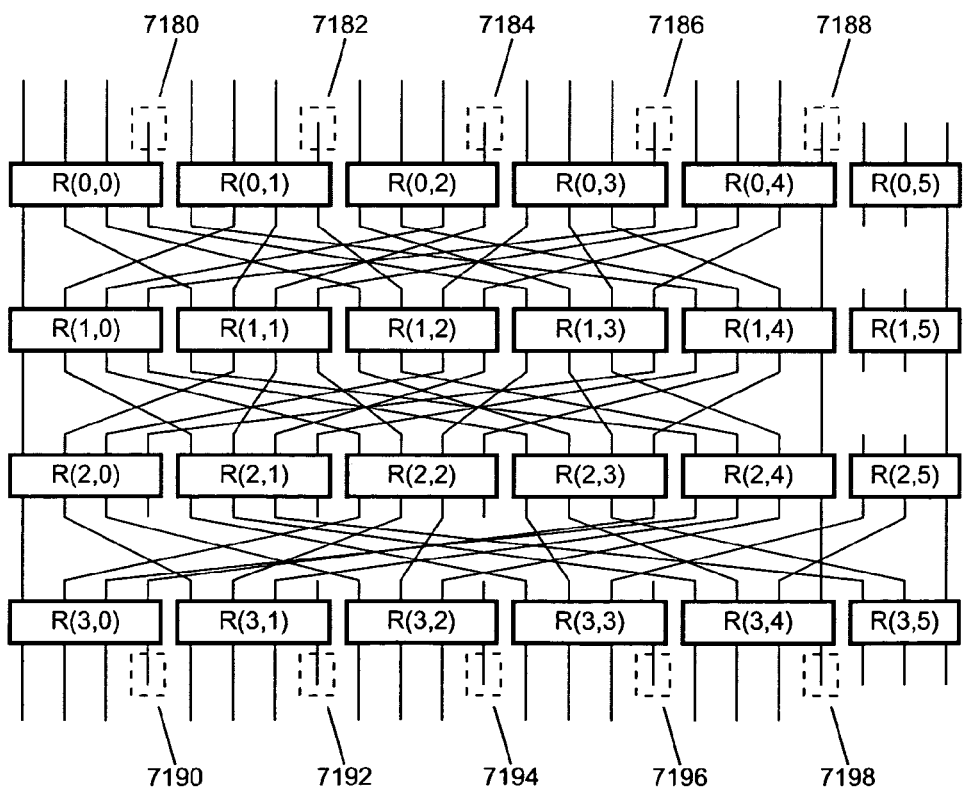

FIG. 77U shows a partially upgraded 40 port RBCCG multistage switching network with a completed rewire of the ISIC network between stages R(0,*) and R(1,*) after moving the connection from top port 0 of switching element R(1,5) to top port 1 of switching element R(1,1).

Figure 77V:
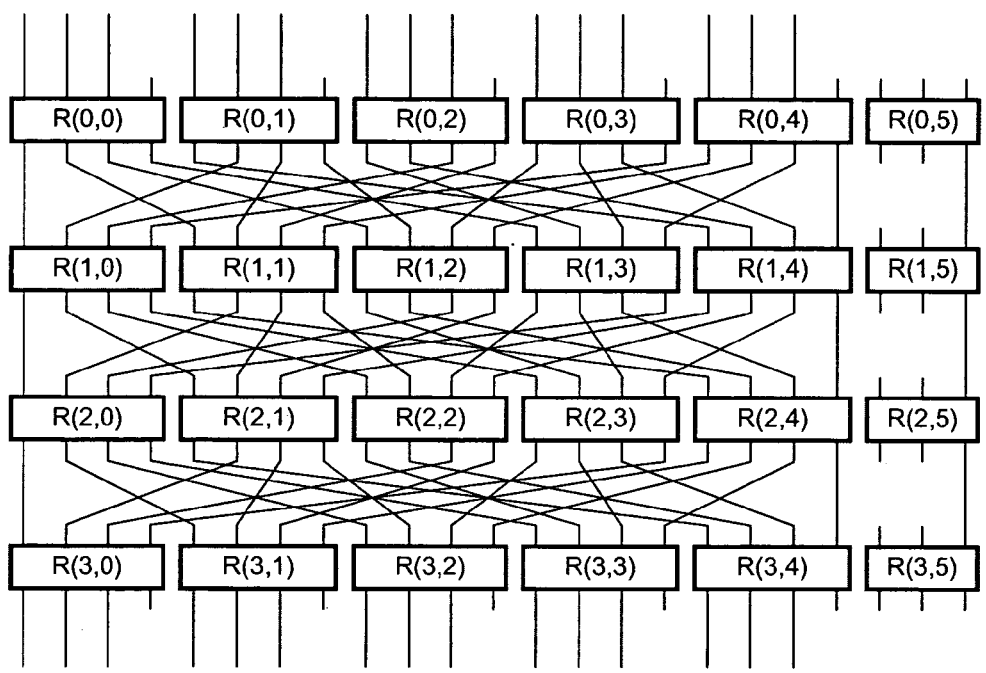

FIG. 77V shows an upgraded 40 port RBCCG multistage switching network with a completed reconfigure of the ISIC network between stages R(2,*) and R(3,*)

Figure 78:
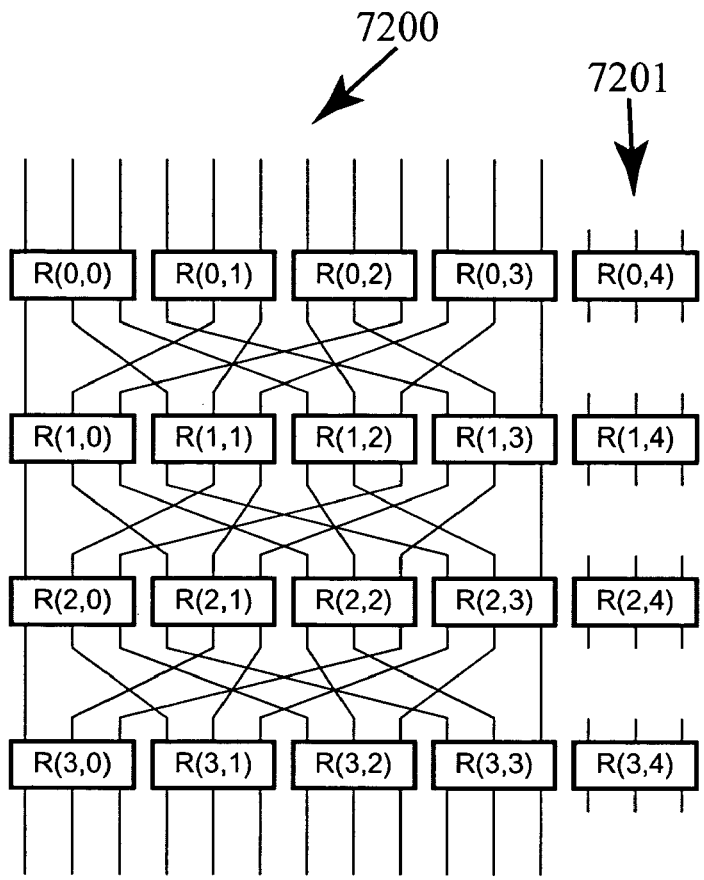

FIG. 78 shows a 24-port RBCCG multistage switching network. This architecture is to be converted to a 30-port shifted RBCCG multistage switching network with the addition of an extra switching element per stage.

Figure 79:
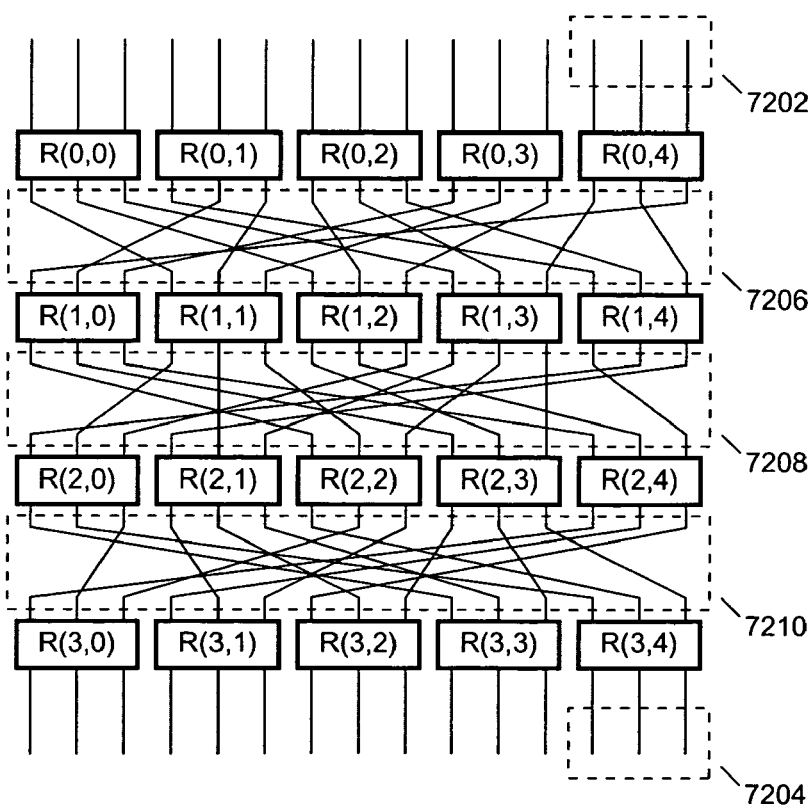

FIG. 79 shows the 30-port post-reconfiguration RBCCG multistage switching network which the network shown in FIG. 78 is to be converted to.

Figure 80:
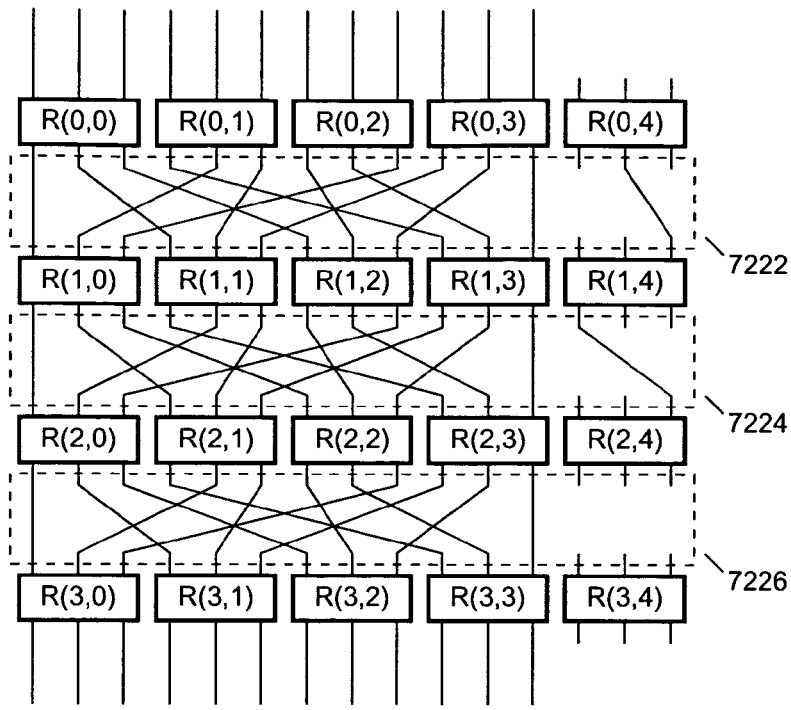

FIG. 80 shows the result of the non-disruptive addition of connections: bottom port 1 of switching element R(0,4) to top port 2 of switching element R(1,4); and bottom port 0 of switching element R(1,4) to top port 2 of switching element R(2,4).

FIG. 81A, FIG. 81B, FIG. 81C and FIG. 81D show the connections between stages R(1,*) and R(2,*) being relabeled in accord with its corresponding ISIC network in the post-reconfiguration architecture by swapping bottom ports 2 and 0 of switching element R(1,0); swapping bottom ports 1 and 0 of switching element R(1,1); swapping bottom ports 2 and 1 of switching element R(1,1); and swapping bottom ports 1 and 0 of switching element R(1,2), respectively.

FIG. 81E, FIG. 81F, FIG. 81G, FIG. 81H, FIG. 81I, FIG. 81J and FIG. 81K show the connections between stages R(2,*) and R(3,*) being relabeled in accord with its corresponding ISIC network in the post-reconfiguration architecture by swapping bottom ports 0 and 2 of switching element R(2,0); swapping bottom ports 0 and 2 of switching element R(2,1); swapping bottom ports 2 and 1 of switching element R(2,2); swapping bottom ports 1 and 0 of switching element R(2,3); swapping bottom ports 2 and 1 of switching element R(2,3); swapping top ports 0 and 1 of switching element R(3,3); and swapping top ports 0 and 1 of switching element R(3,0), respectively.

Figure 81A:
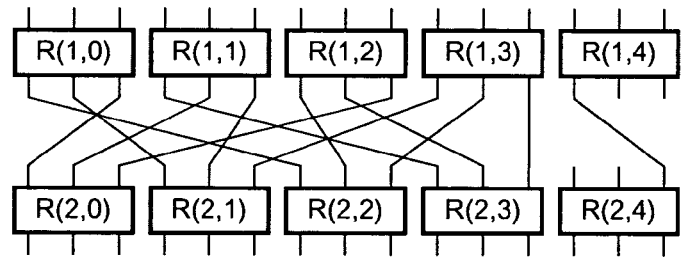
Figure 81B:
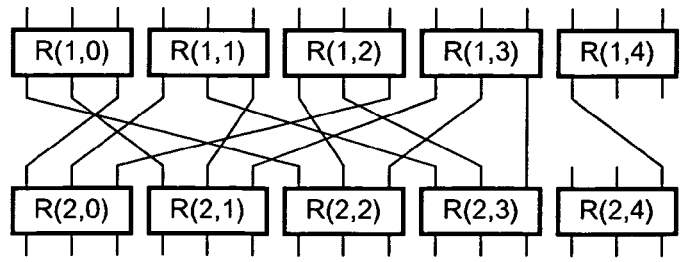
Figure 81C:
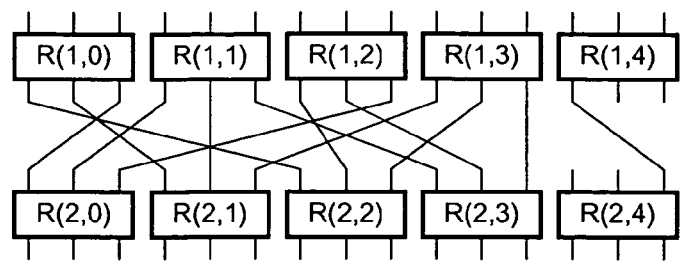
Figure 81D:
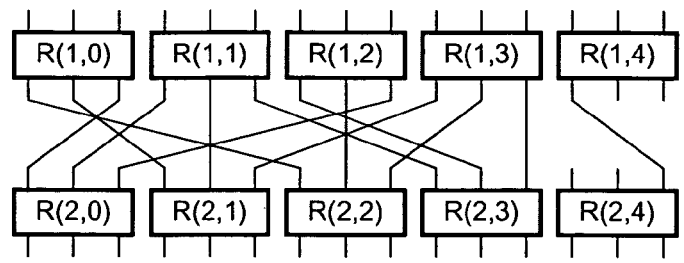
Figure 81E:
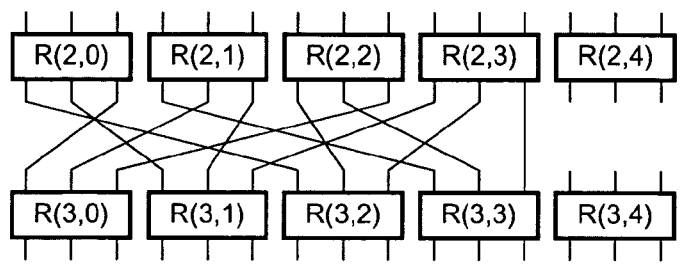
Figure 81F:
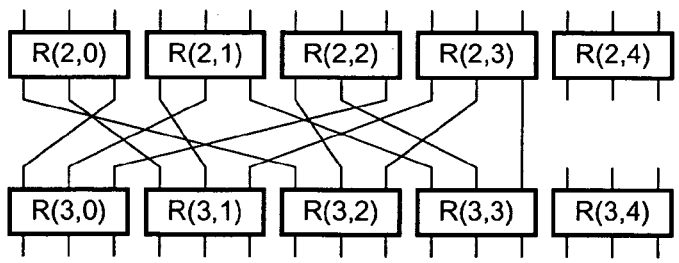
Figure 81G:
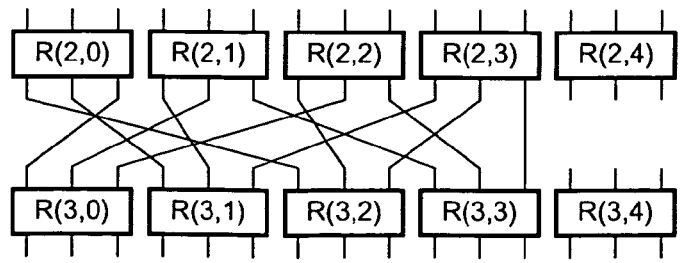
Figure 81H:
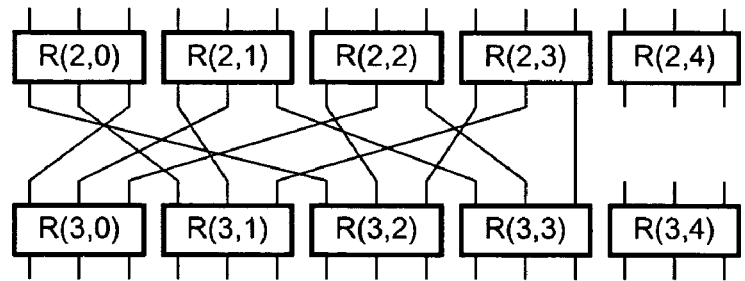
Figure 81I:
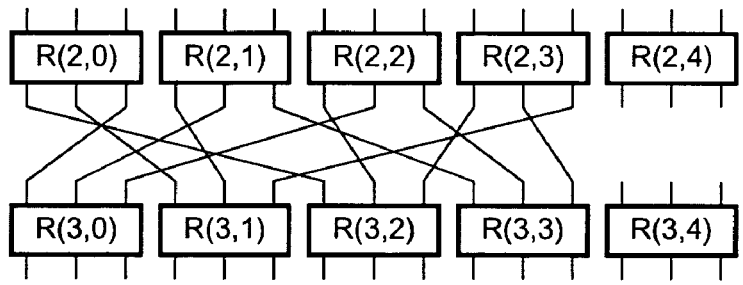
Figure 81J:
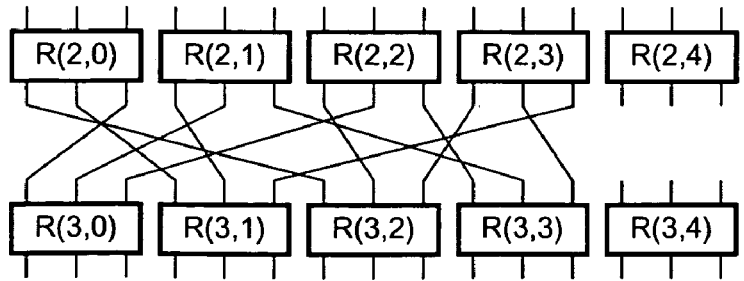
Figure 81K:
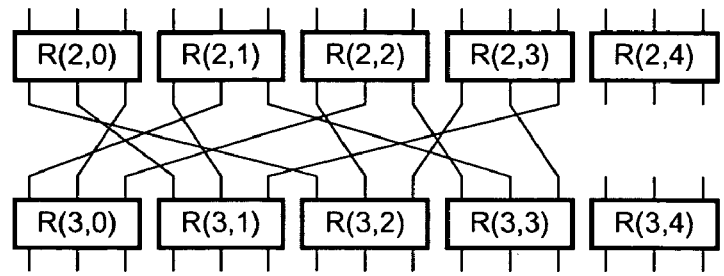
Figure 81L:
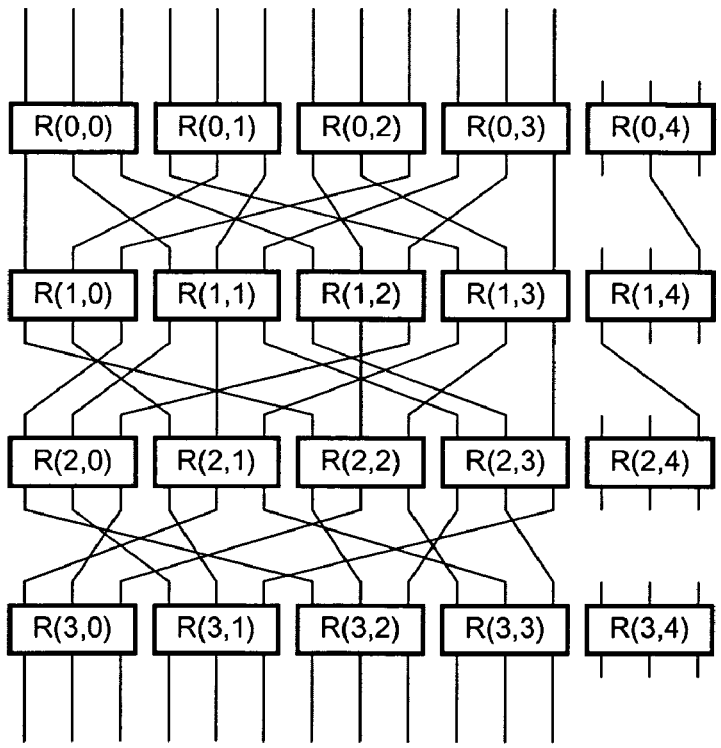

FIG. 81L shows a partially relabeled 30 port shifted RBCCG multistage switching network.

FIG. 82A, FIG. 82B, FIG. 82C, FIG. 82D, FIG. 82E, FIG. 82F, FIG. 82G, FIG. 82H, FIG. 82I, FIG. 82J, FIG. 82K, FIG. 82L, FIG. 82M, FIG. 82N, FIG. 82O, FIG. 82P, FIG. 82Q, FIG. 82R, FIG. 82S, FIG. 82T, FIG. 82U, FIG. 82V, FIG. 82W and FIG. 82X show the all the ISIC networks being reconfigured into the post-reconfiguration architecture by moving the connection from bottom port 1 of switching element R(1,0) to bottom port 2 of switching element R(1,4); moving the connection from top port 1 of switching element R(2,2) to top port 1 of switching element R(2,4); moving the connection from bottom port 0 of switching element R(0,0) to bottom port 2 of switching element R(0,4); moving the connection from bottom port 0 of switching element R(2,0) to bottom port 2 of switching element R(2,4); moving the connection from top port 2 of switching element R(3,1) to top port 2 of switching element R(3,4); moving the connection from top port 1 of switching element R(3,2) to top port 1 of switching element R(3,4); moving the connection from top port 0 of switching element R(2,3) to top port 1 of switching element R(2,2); moving the connection from top port 2 of switching element R(1,0) to top port 1 of switching element R(1,4); moving the connection from bottom port 2 of switching element R(0,3) to bottom port 0 of switching element R(0,4); moving the connection from top port 0 of switching element R(1,3) to top port 0 of switching element R(1,4); adding a connection between top port 0 of switching element R(2,3) and bottom port 1 of switching element R(1,0); moving the connection from bottom port 1 of switching element R(2,1) to bottom port 0 of switching element R(2,4); moving the connection from bottom port 2 of switching element R(1,0) to bottom port 1 of switching element R(1,4); adding a connection between top port 0 of switching element R(2,4) and bottom port 2 of switching element R(1,0); moving the connection from bottom port 1 of switching element R(0,3) to bottom port 2 of switching element R(0,3); adding a connection between top port 1 of switching element R(3,2) and bottom port 1 of switching element R(2,1); moving the connection from top port 0 of switching element R(3,3) to top port 2 of switching element R(3,1); adding a connection between top port 0 of switching element R(3,3) and bottom port 0 of switching element R(2,0); moving the connection from bottom port 0 of switching element R(0,3) to bottom port 1 of switching element R(0,3); adding a connection between bottom port 0 of switching element R(0,3) and top port 2 of switching element R(1,0); moving the connection from top port 0 of switching element R(1,2) to top port 0 of switching element R(1,3); moving the connection from bottom port 1 of switching element R(2,0) to bottom port 1 of switching element R(2,4); moving the connection from top port 0 of switching element R(1,1) to top port 0 of switching element R(1,2); and adding a connection between top port 0 of switching element R(3,4) and bottom port 1 of switching element R(2,0), respectively.

Figure 82B:
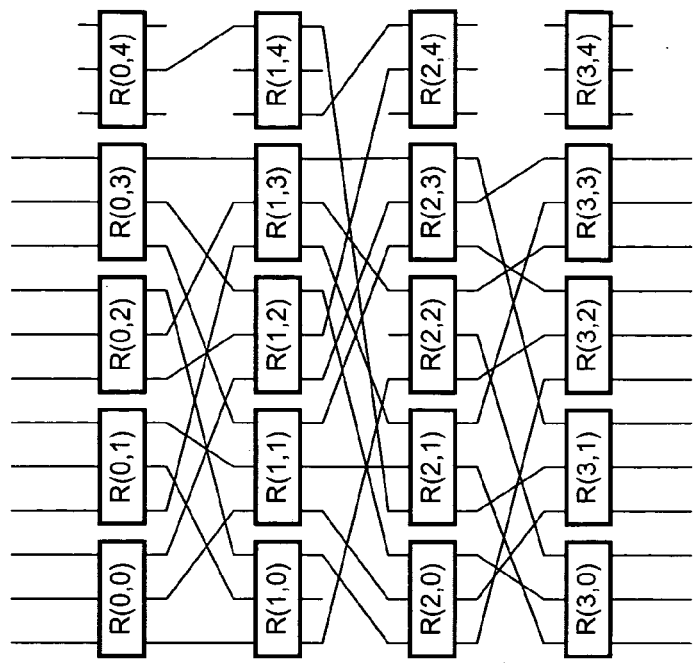
Figure 82A:
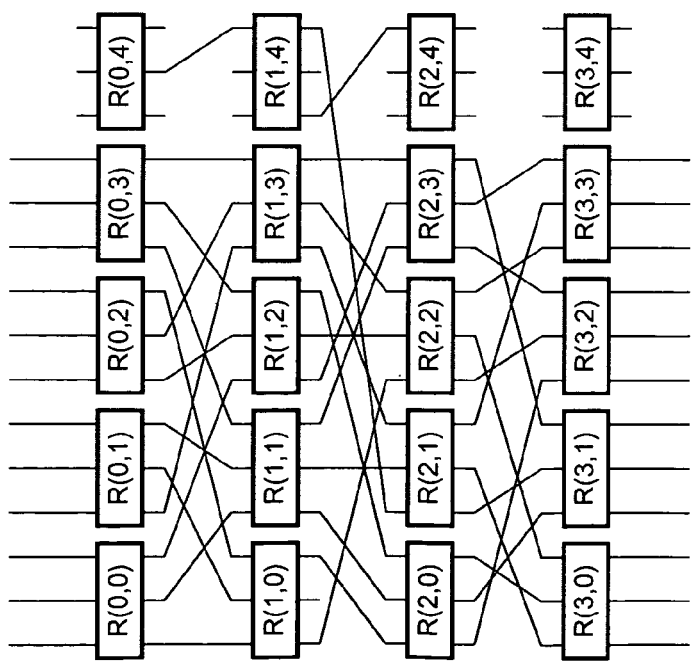
Figure 82D:
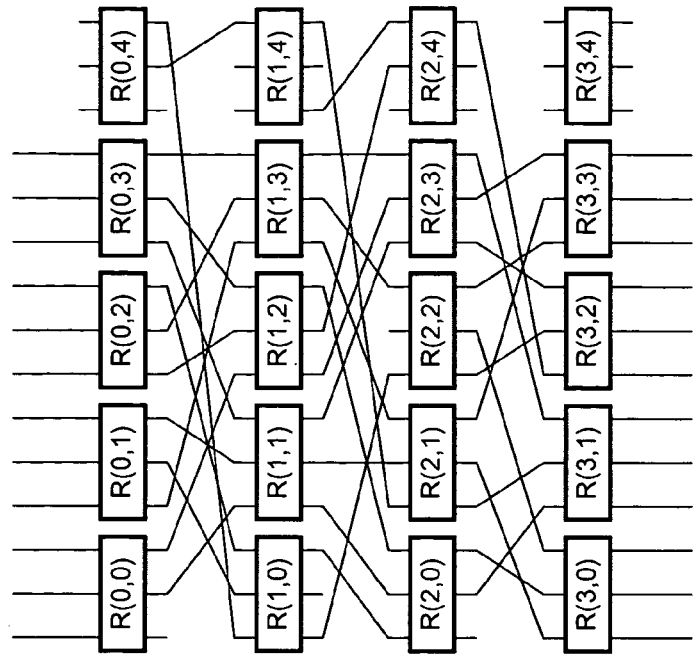
Figure 82C:
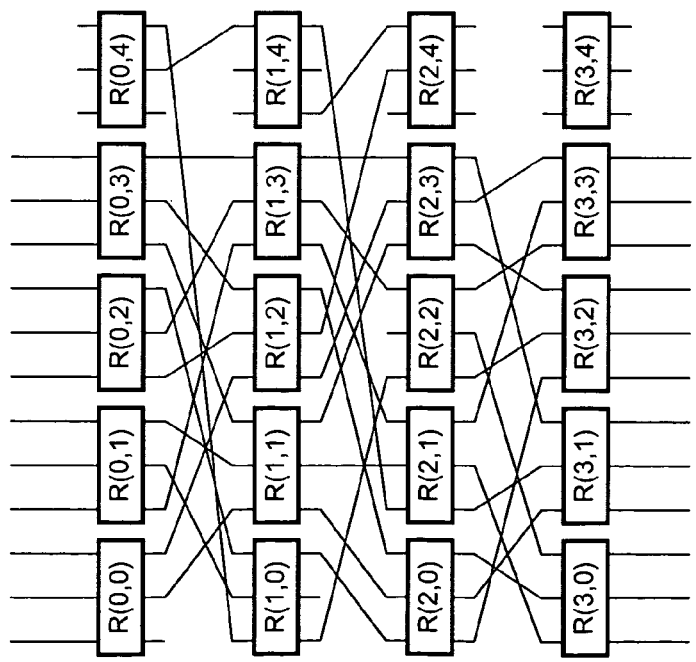
Figure 82F:
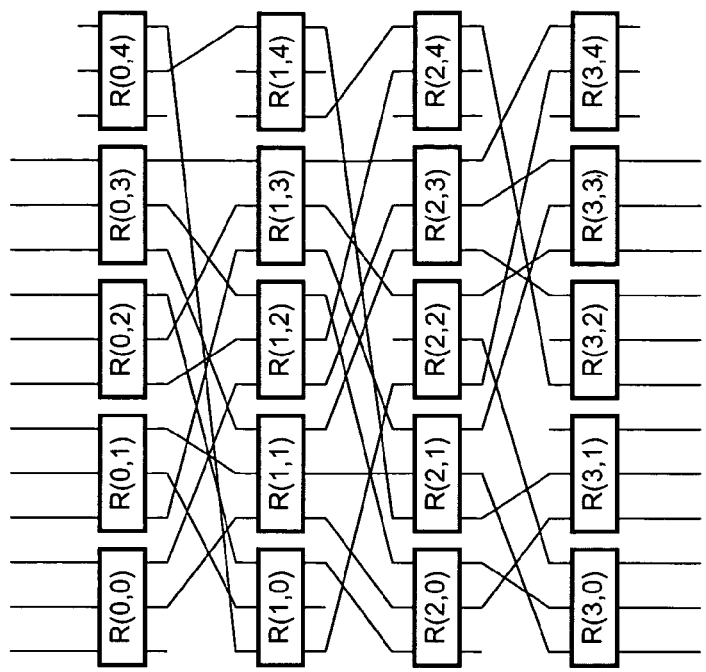
Figure 82E:
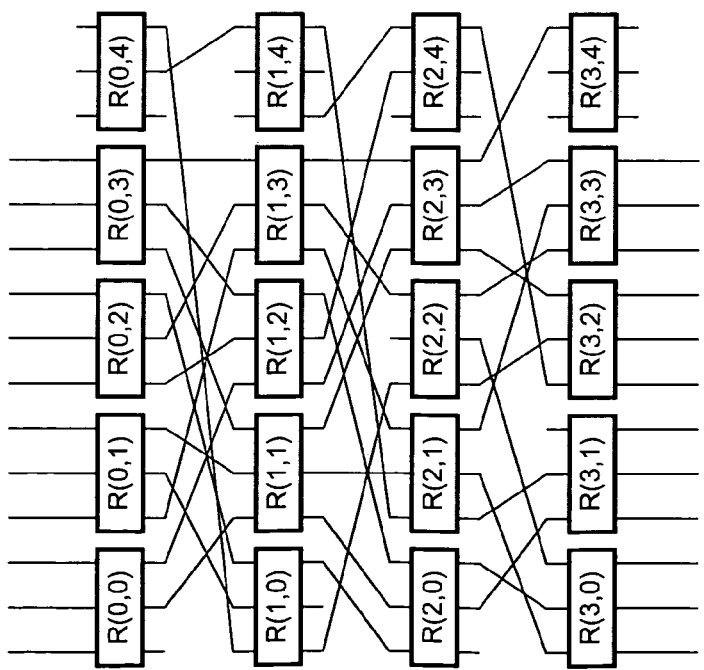
Figure 82H:
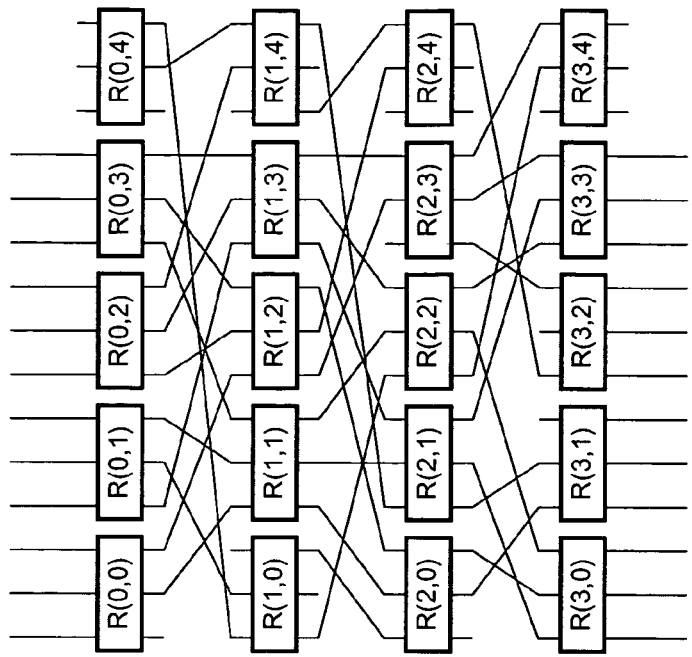
Figure 82G:
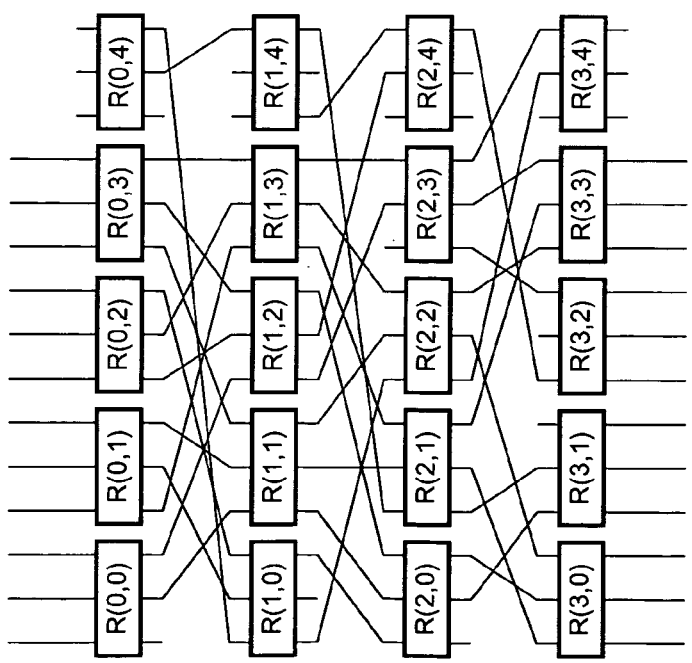
Figure 82J:
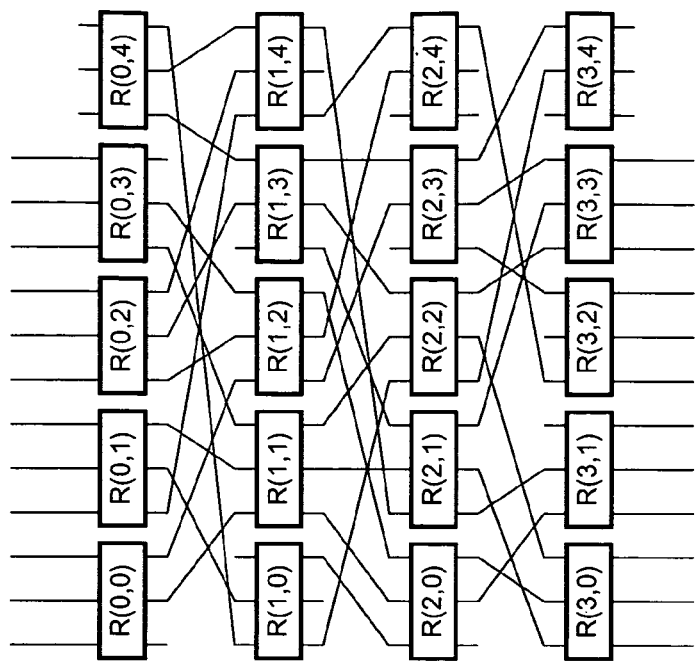
Figure 82I:
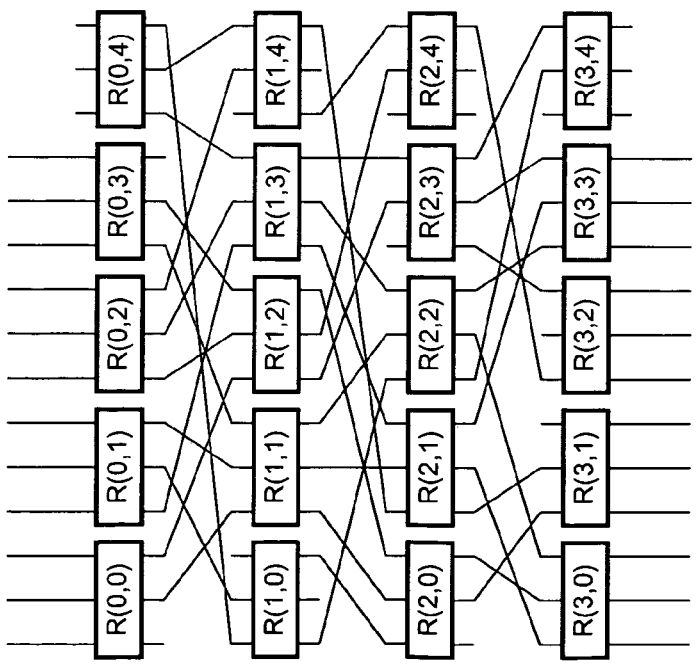
Figure 82L:
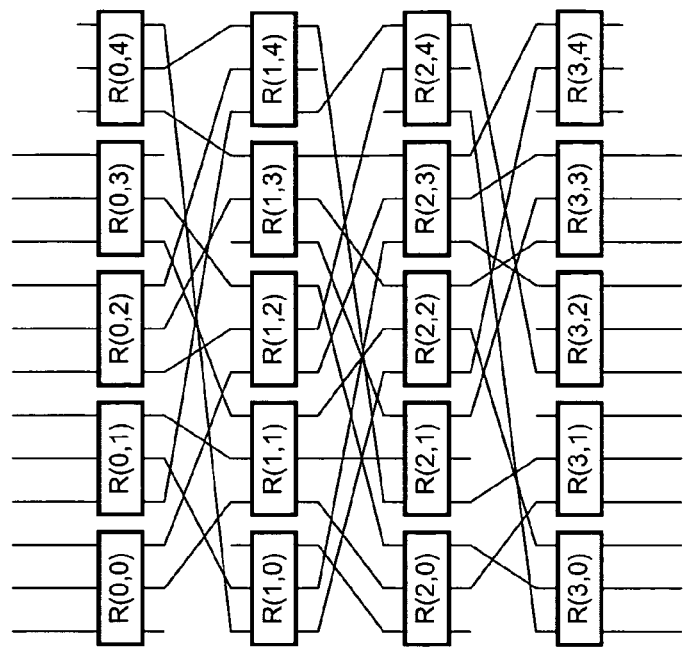
Figure 82K:
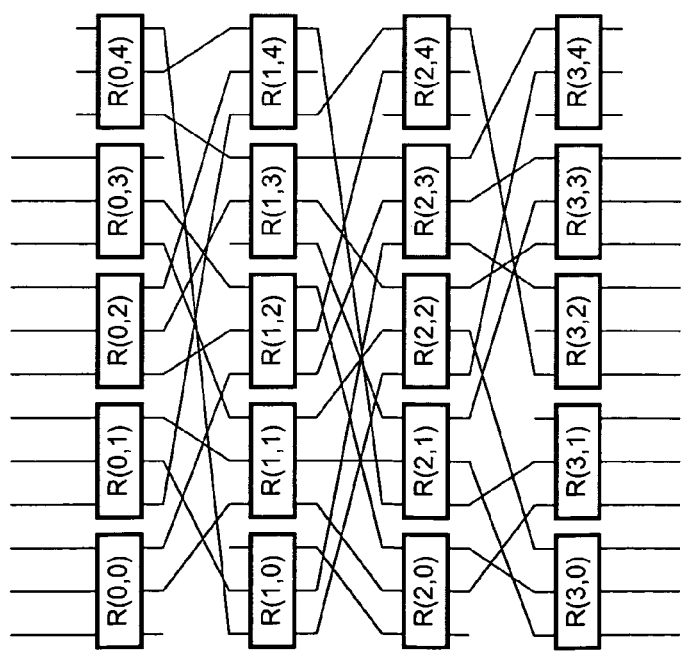
Figure 82N:
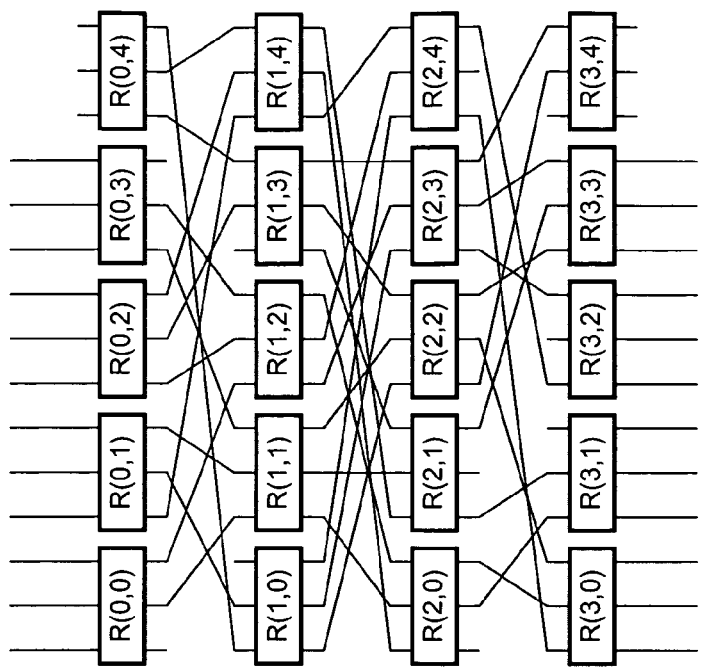
Figure 82M:
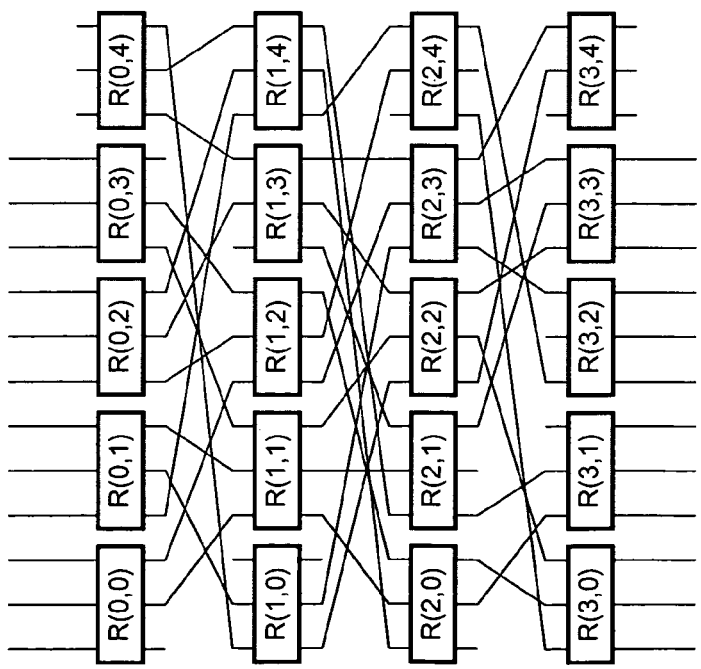
Figure 82P:
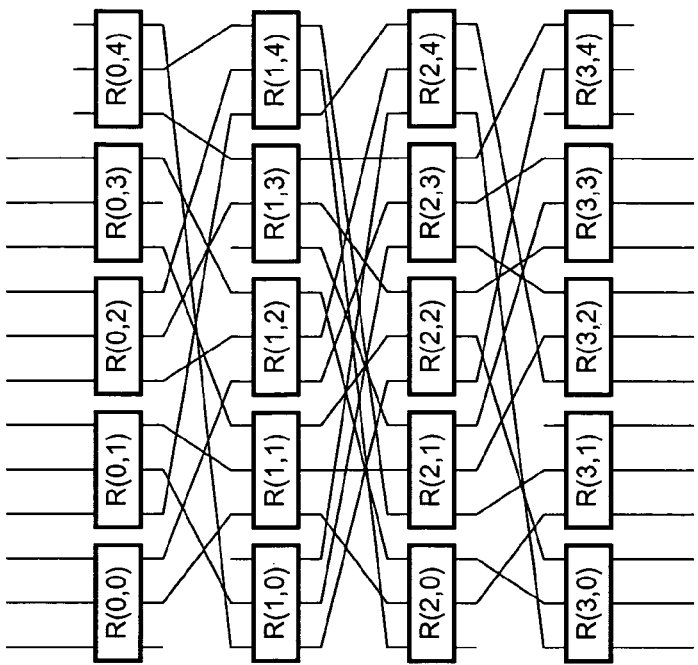
Figure 82O:
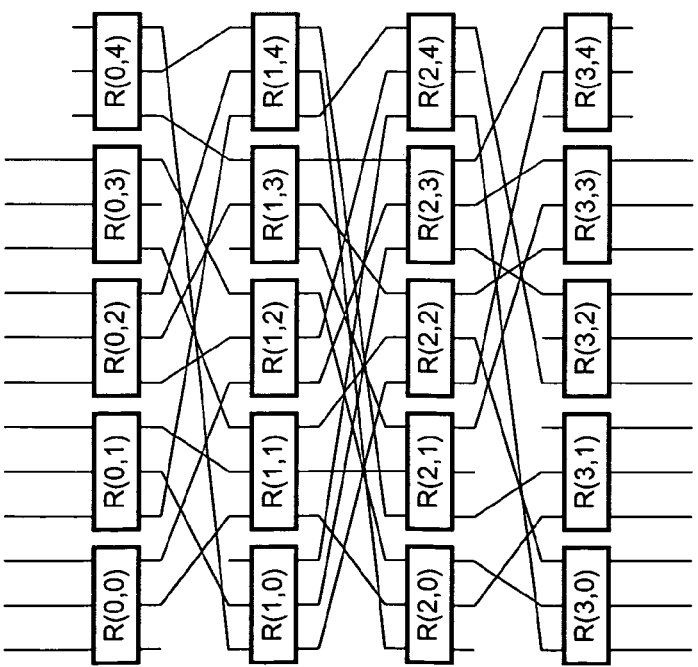
Figure 82R:
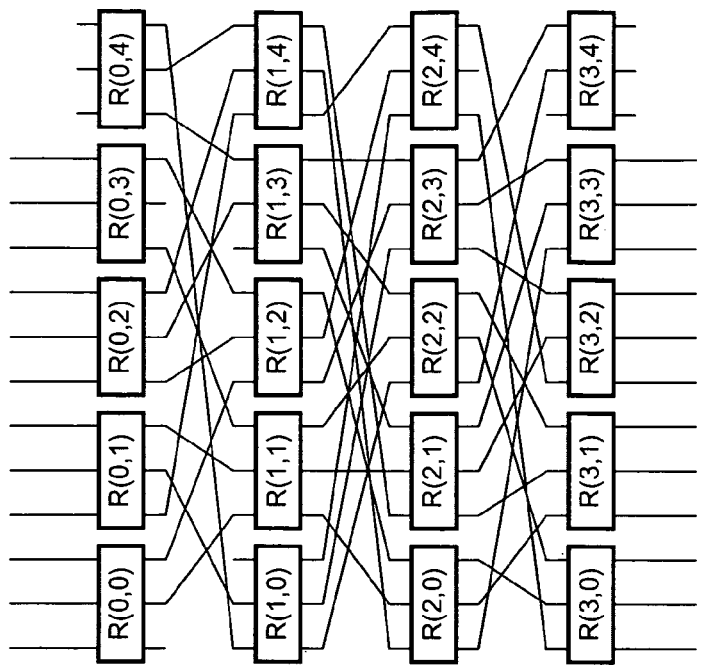
Figure 82Q:
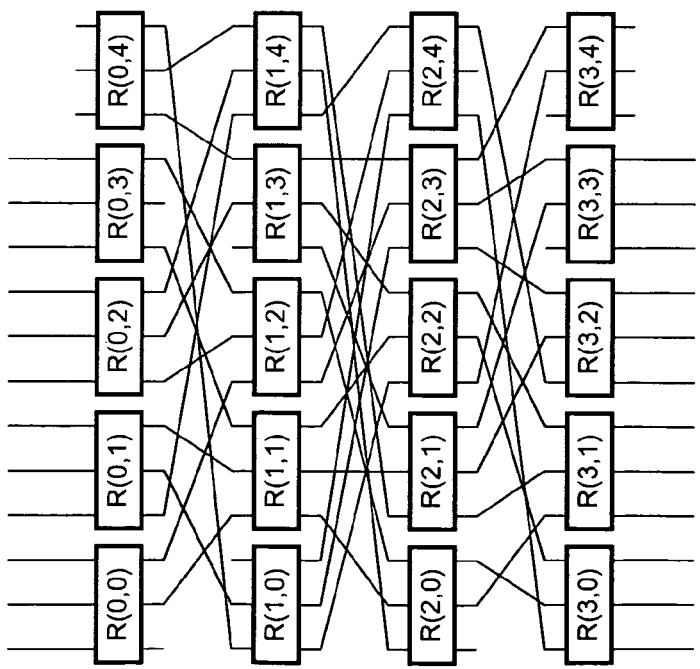
Figure 82T:
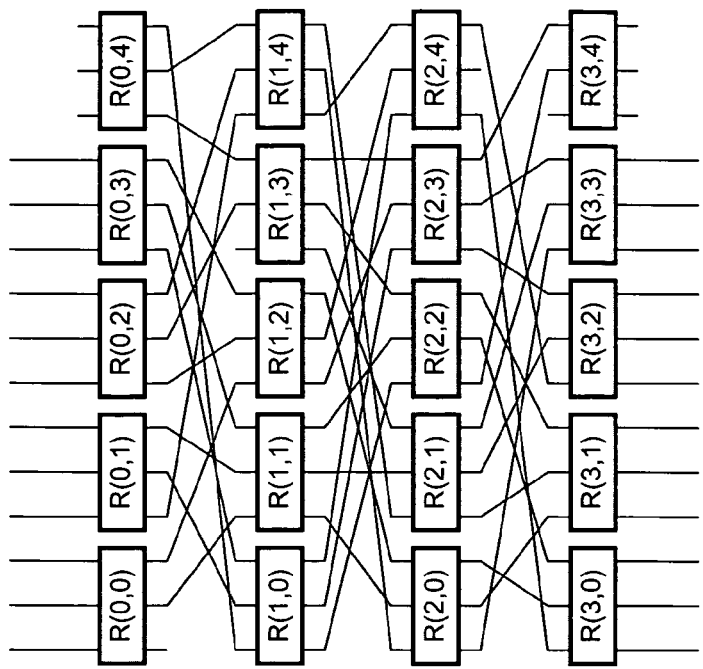
Figure 82S:
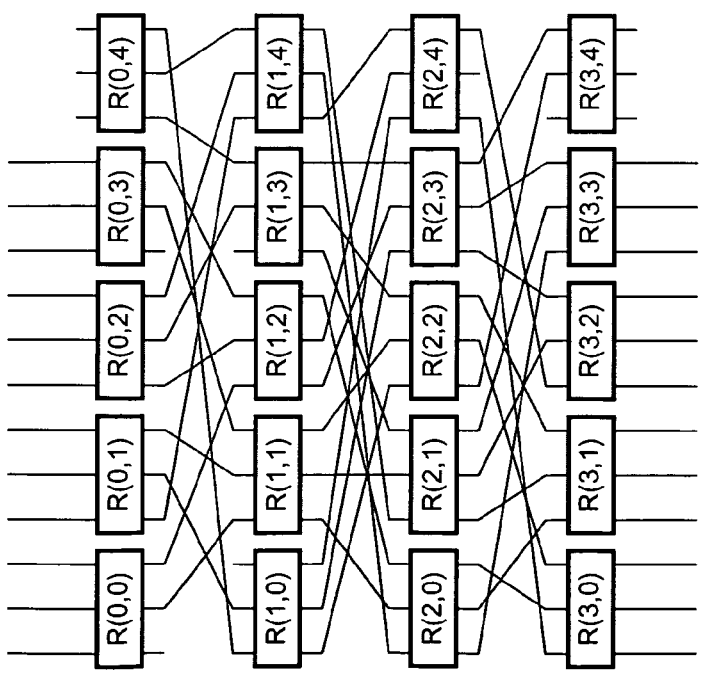
Figure 82V:
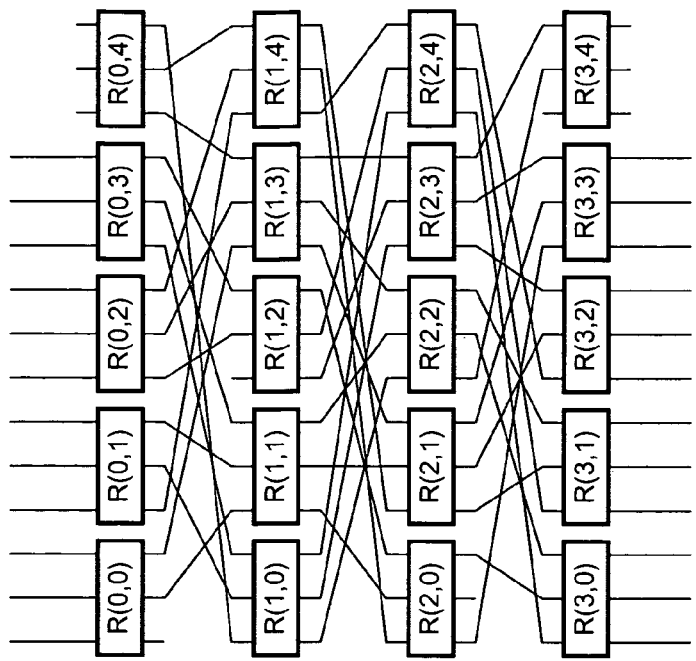
Figure 82U:
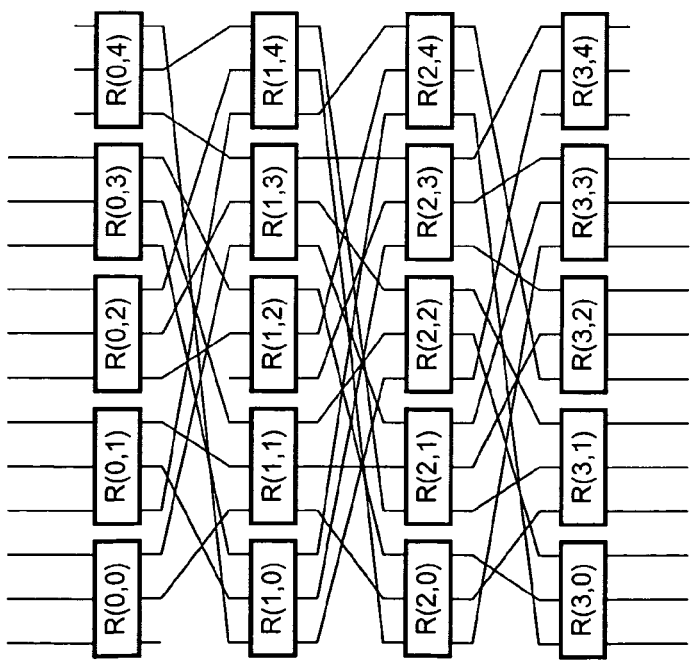
Figure 82X:
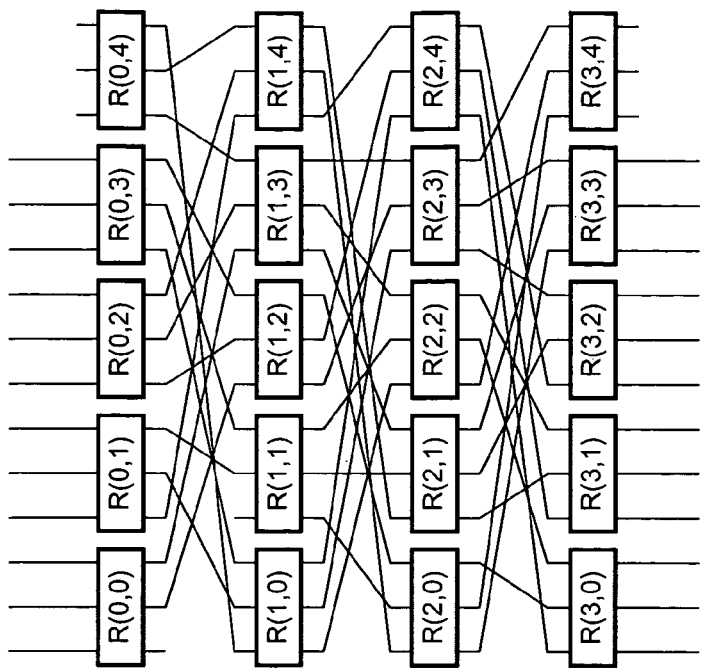
Figure 82W:
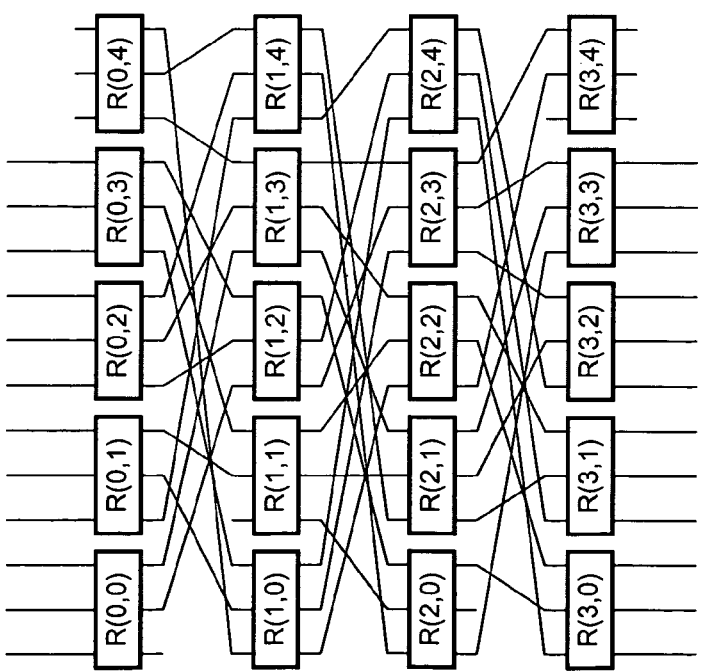
Figure 82Y:
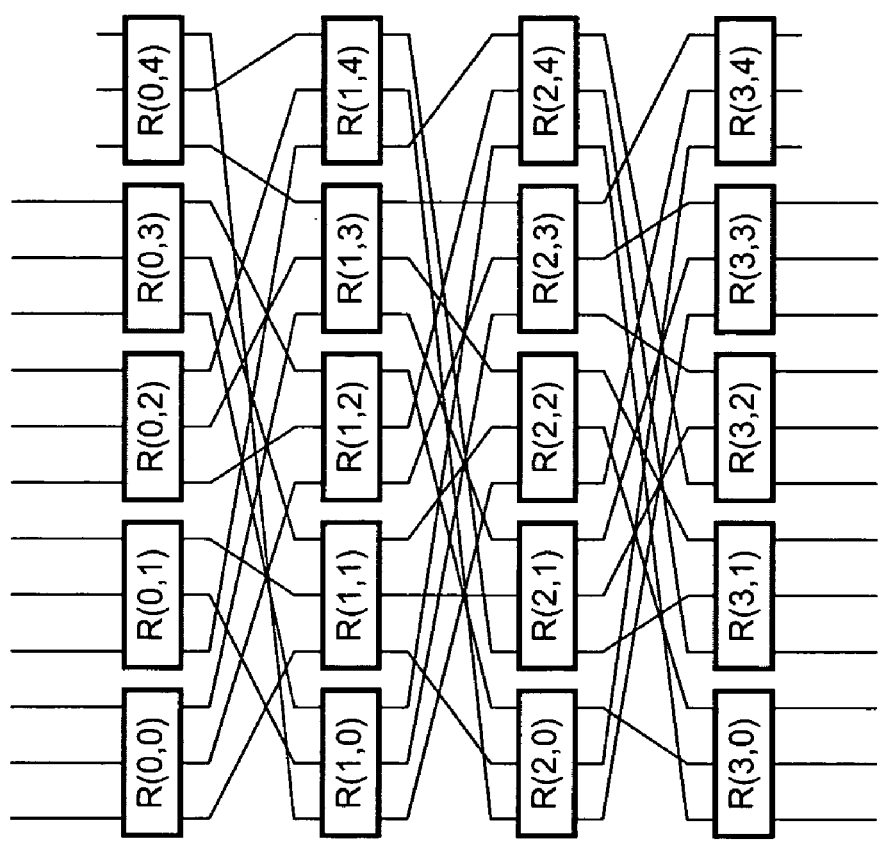

FIG. 82Y shows an upgraded 30 port shifted RBCCG multistage switching network, adding a connection between top port 0 of switching element R(1,1) and bottom port 0 of switching element R(0,0).

Figure 83:
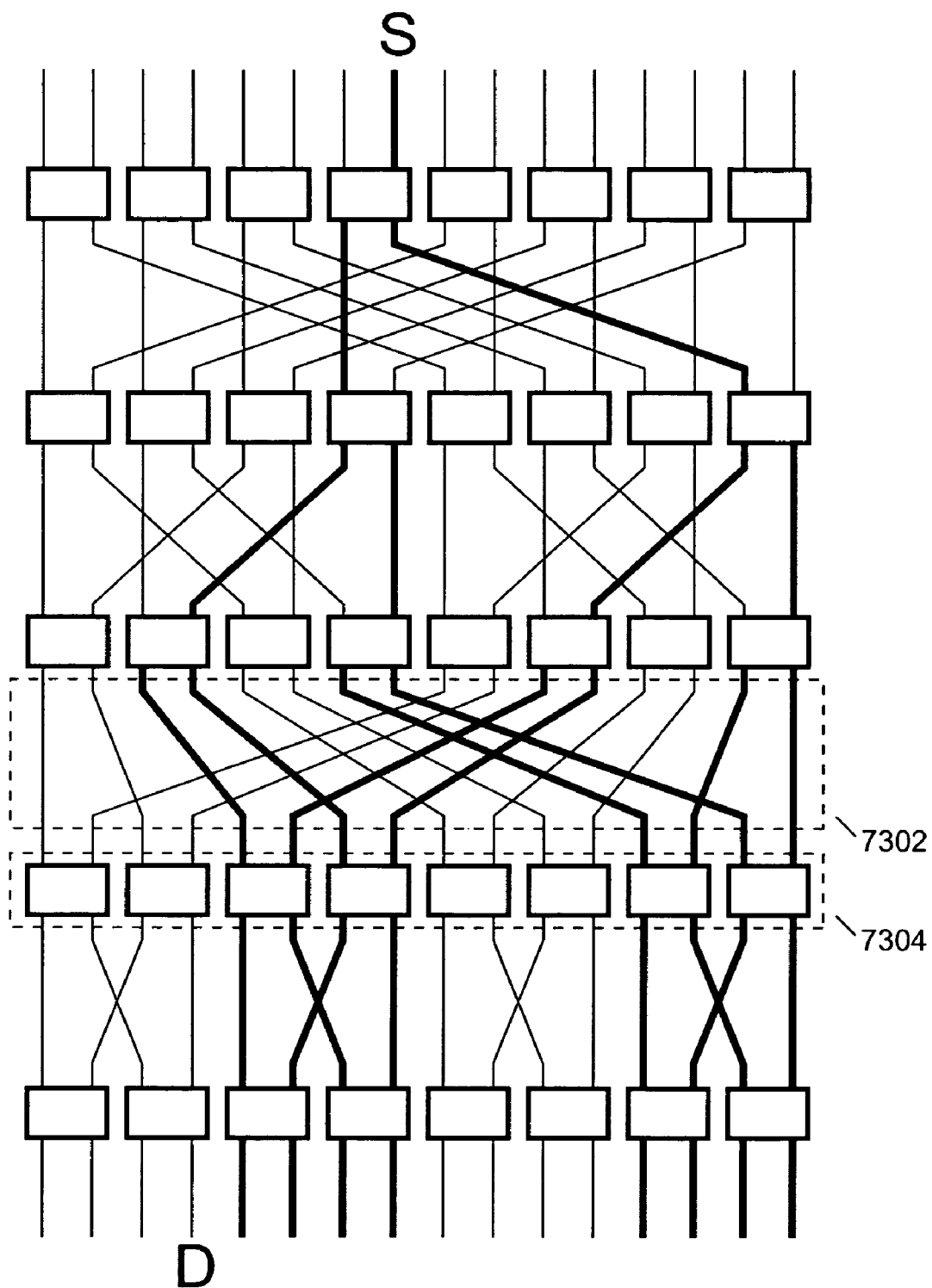

FIG. 83 shows how the internal insertion of a GCISIC into a Banyan network can destroy functional connectivity.

FIG. 84A, FIG. 84B, FIG. 84C and FIG. 84D show the process of stage upgrades for hybrid architectures.

Figure 85A:
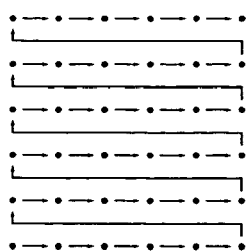
Figure 85B:
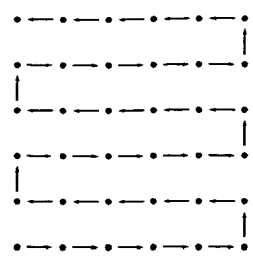
Figure 85C:
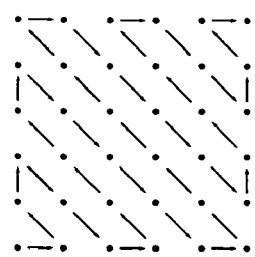

FIGS. 85A, 85B and 85C show systematic scanning methods of raster scanning, serpentine scanning and zig-zag scanning, respectively, which can be used with a two-dimensional (or higher dimensional) multistage switching network.

Figure 86A:
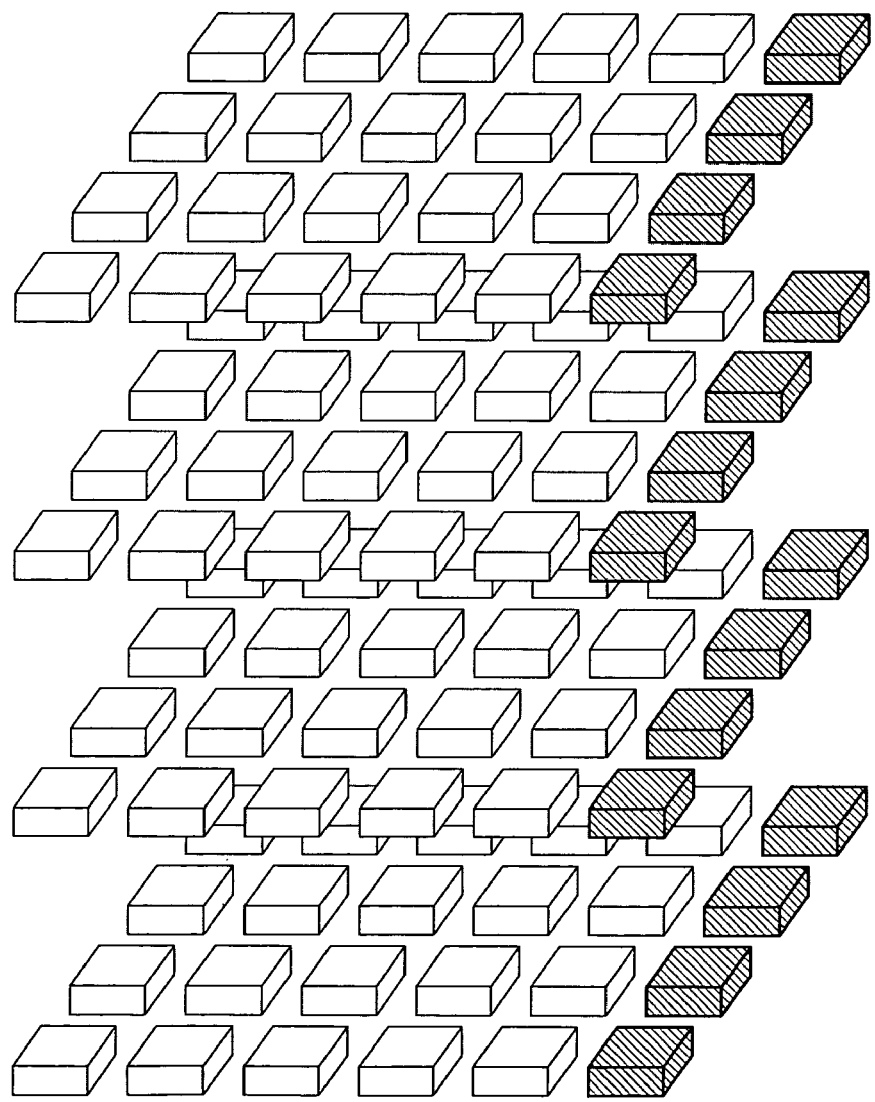

FIG. 86A shows a two-dimensional RBCCG network expanded in width by the addition of a "planar column" of switching elements.

Figure 86B:
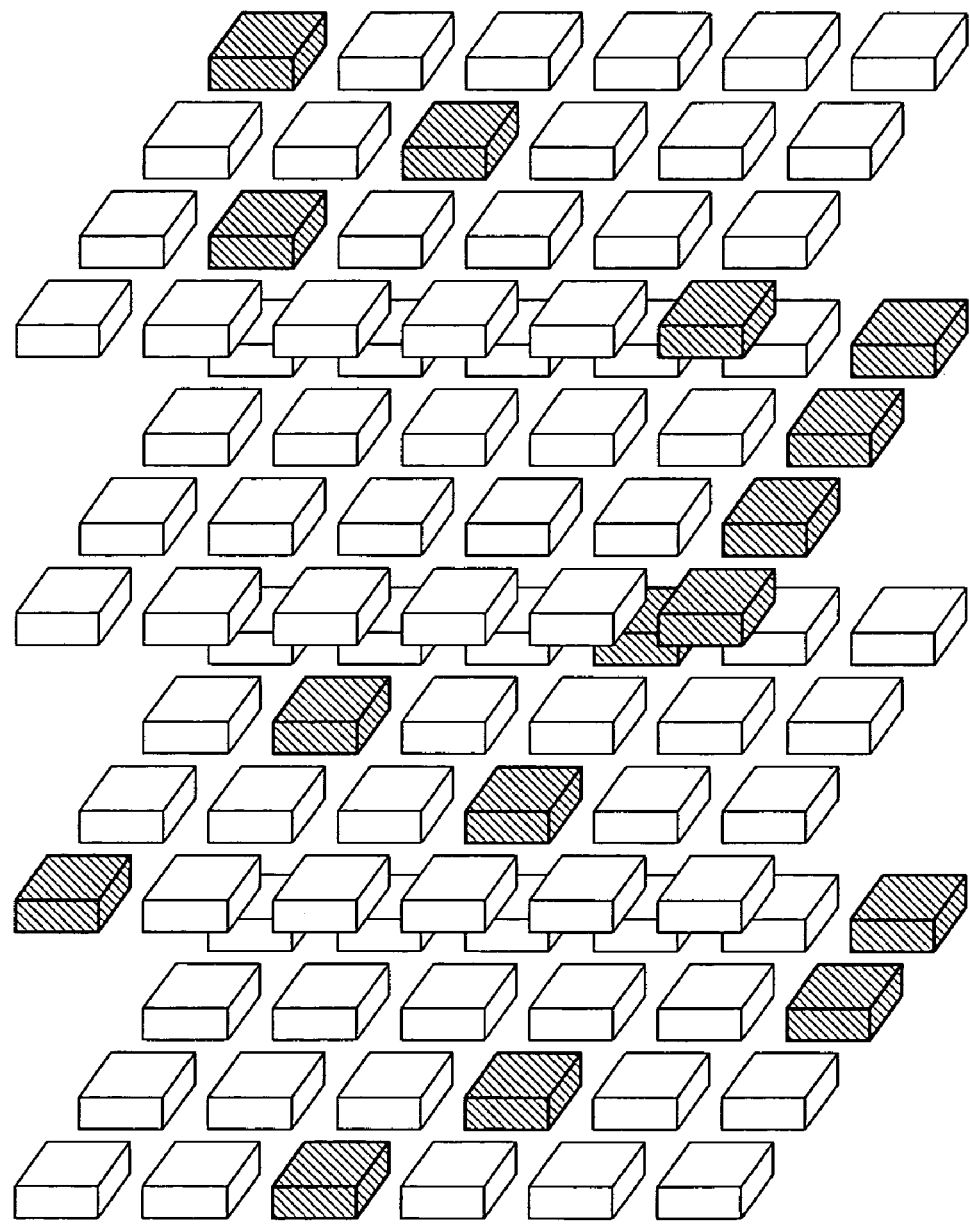

FIG. 86B shows a two-dimensional RBCCG network expanded in width by the addition of switching elements in arbitrary positions.

Figure 86C:
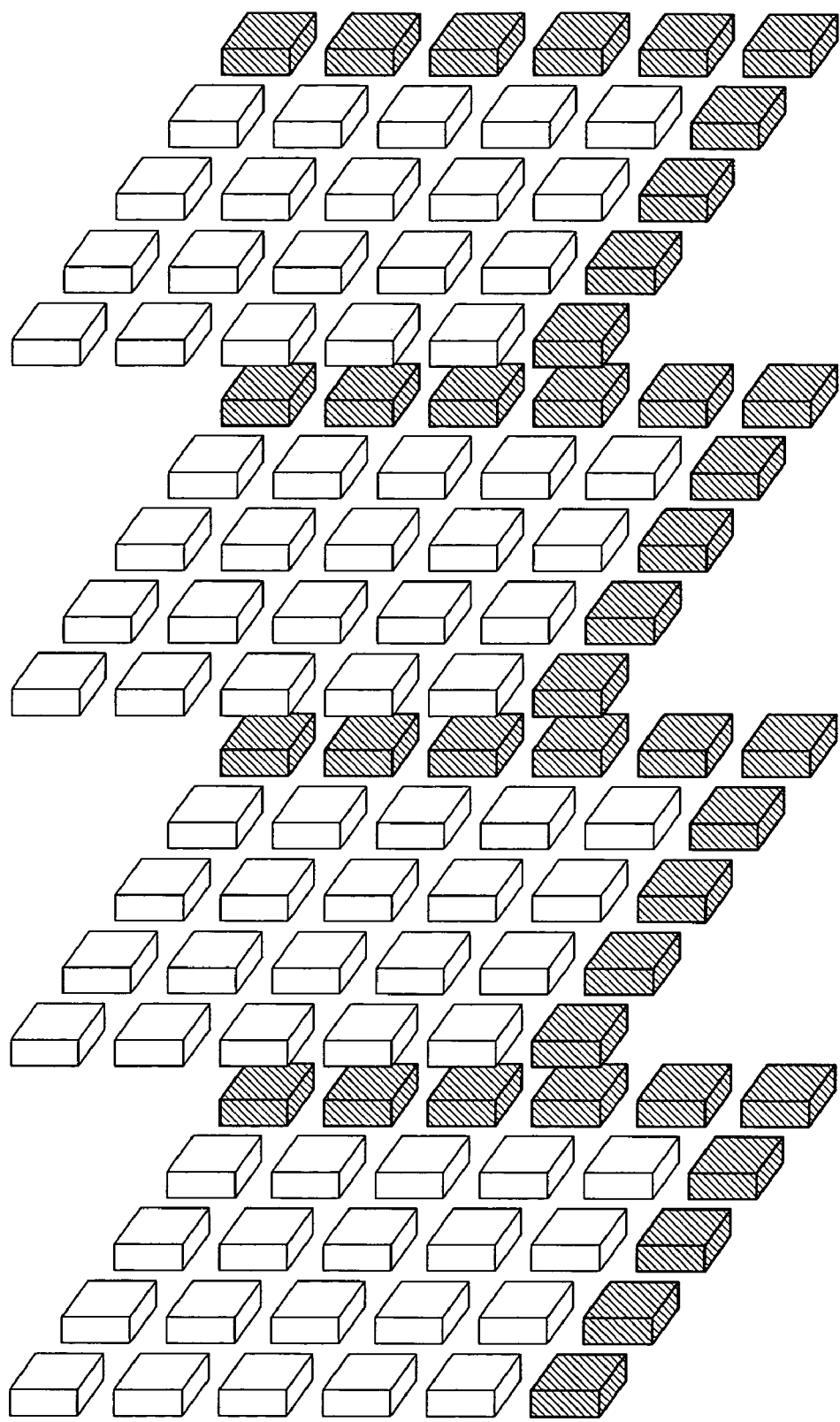

FIG. 86C shows a two-dimensional RBCCG network expanded in both "widths" by the addition of two perpendicular "planar columns" of switching elements.

Figure 86D:
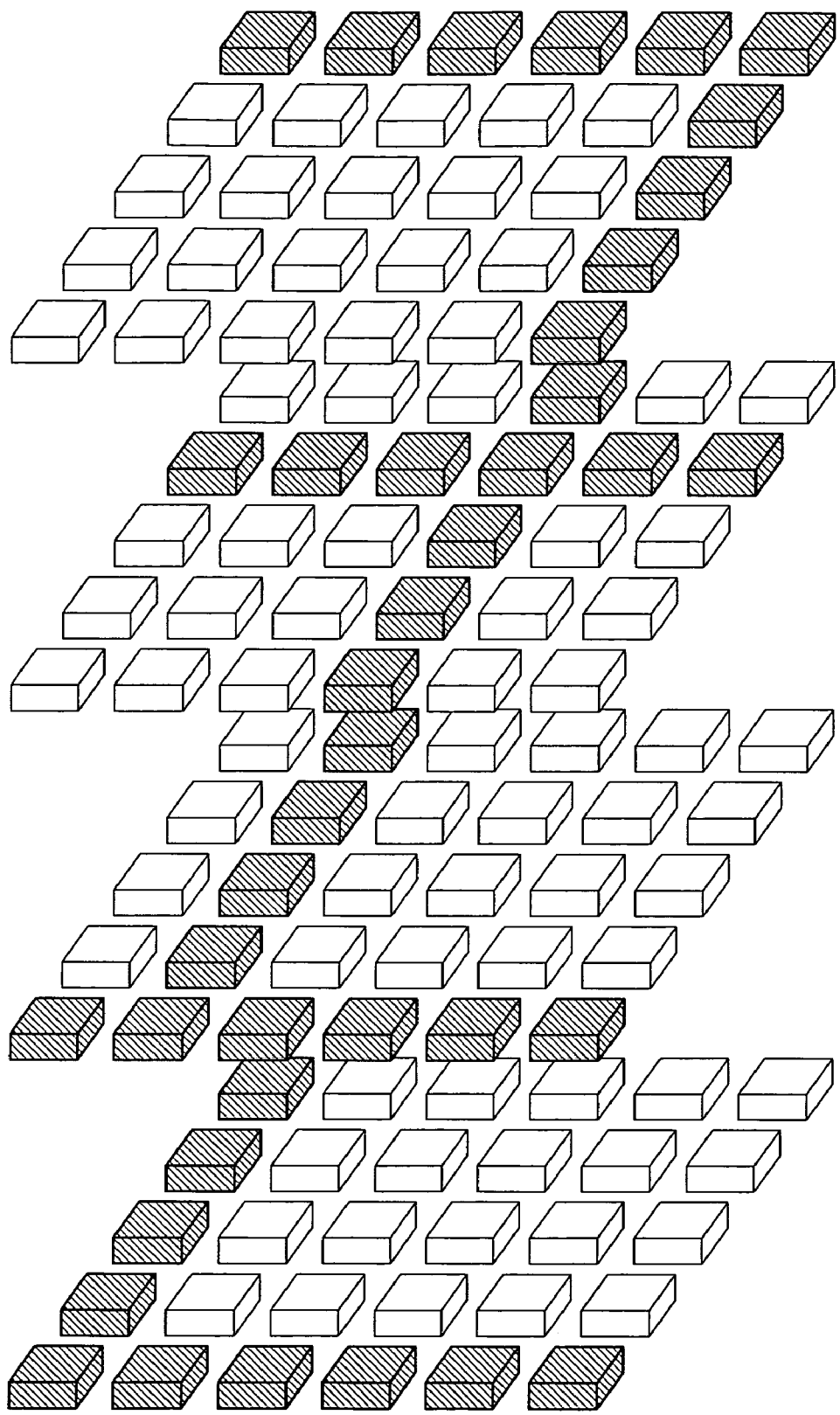

FIG. 86D shows a two-dimensional RBCCG network expanded in both "widths" by the addition of switching elements in arbitrary positions.

Figure 87A:
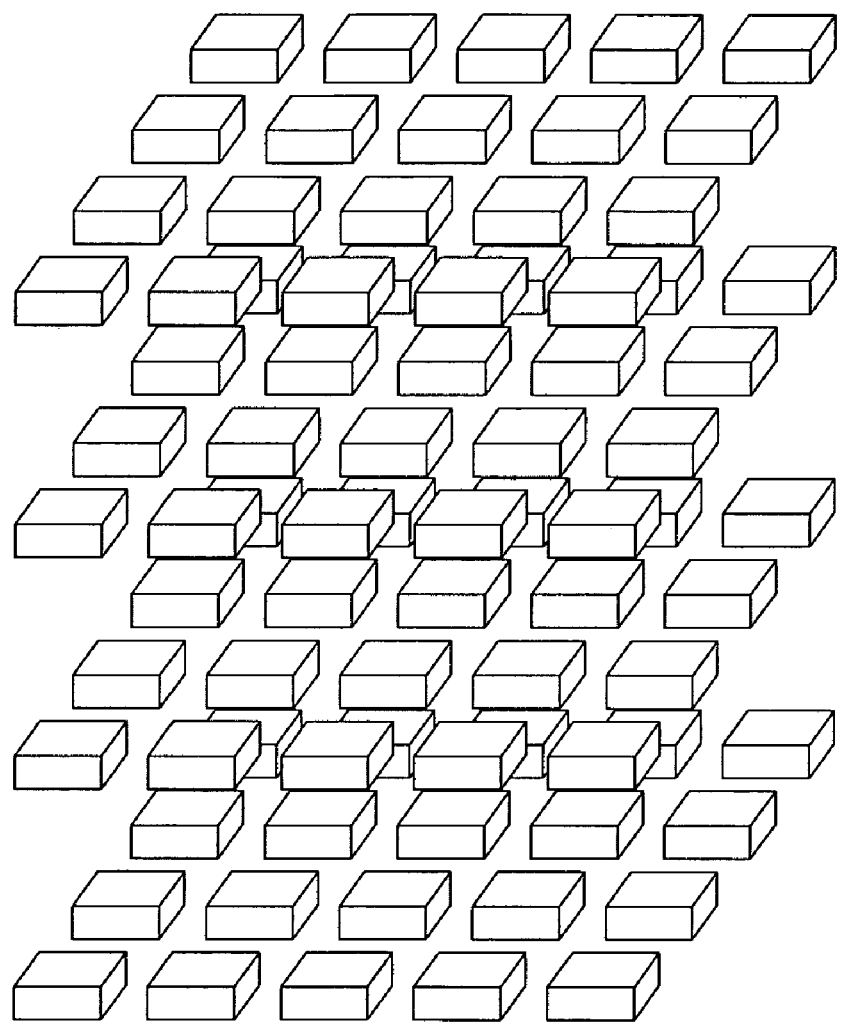
Figure 87B:
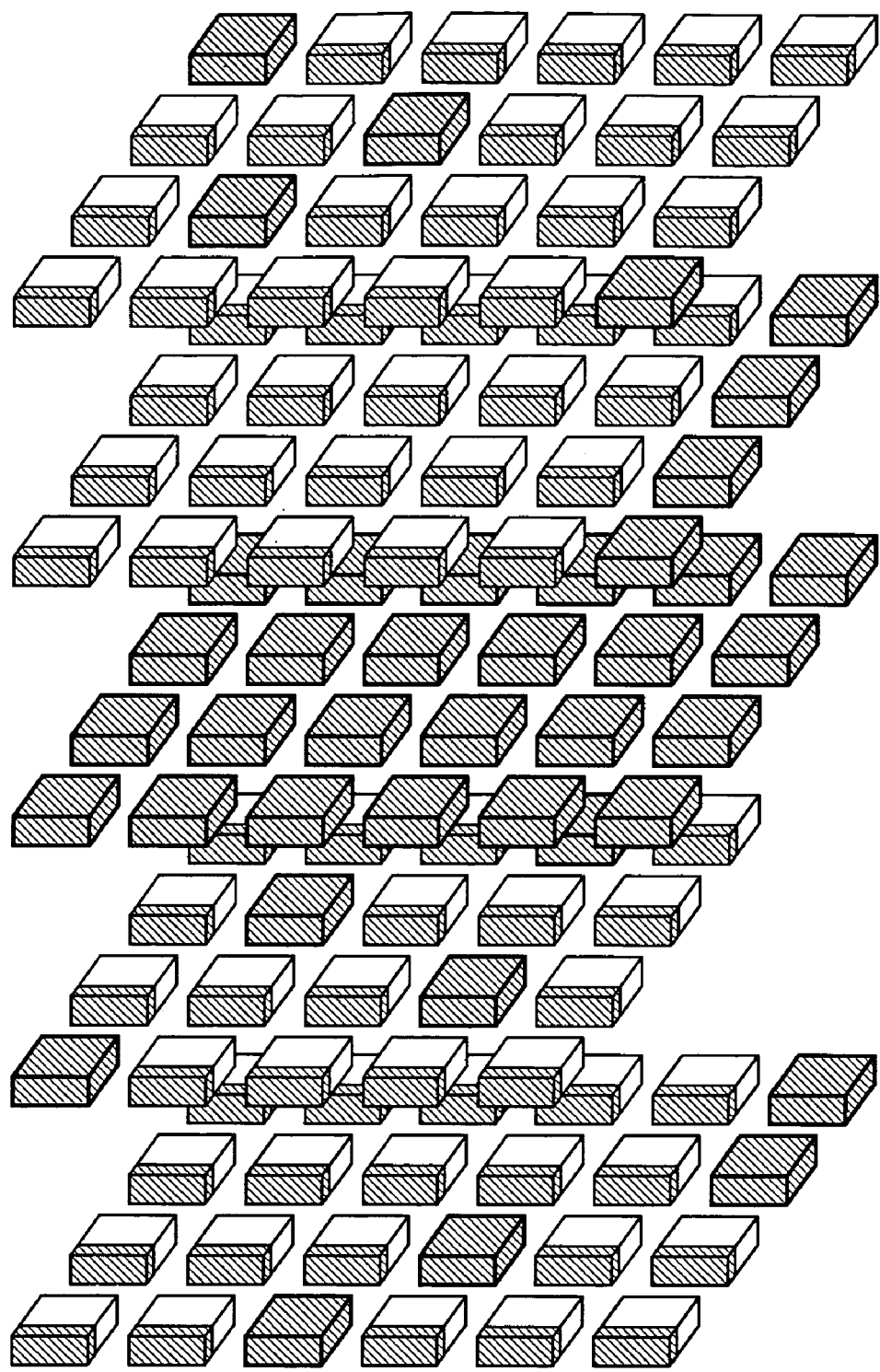

FIG. 87A and FIG. 87B shows a simultaneous upgrade in fan-out, width and height.

FIG. 88A, FIG. 88B, FIG. 88C, FIG. 88D, FIG. 88E, and FIG. 88F show an upgrade by increasing the width of an overlaid double RBCCG network.

FIG. 89A, FIG. 89B, FIG. 89C, FIG. 89D, FIG. 89E, and FIG. 89F show a fan-out upgrade of an overlaid double RBCCG network.

FIG. 90A, FIG. 90B, FIG. 90C, and FIG. 90D show an architectural conversion of the fan-out in one direction to fan-out in the perpendicular direction of an overlaid double RBCCG network.

Figure 91:
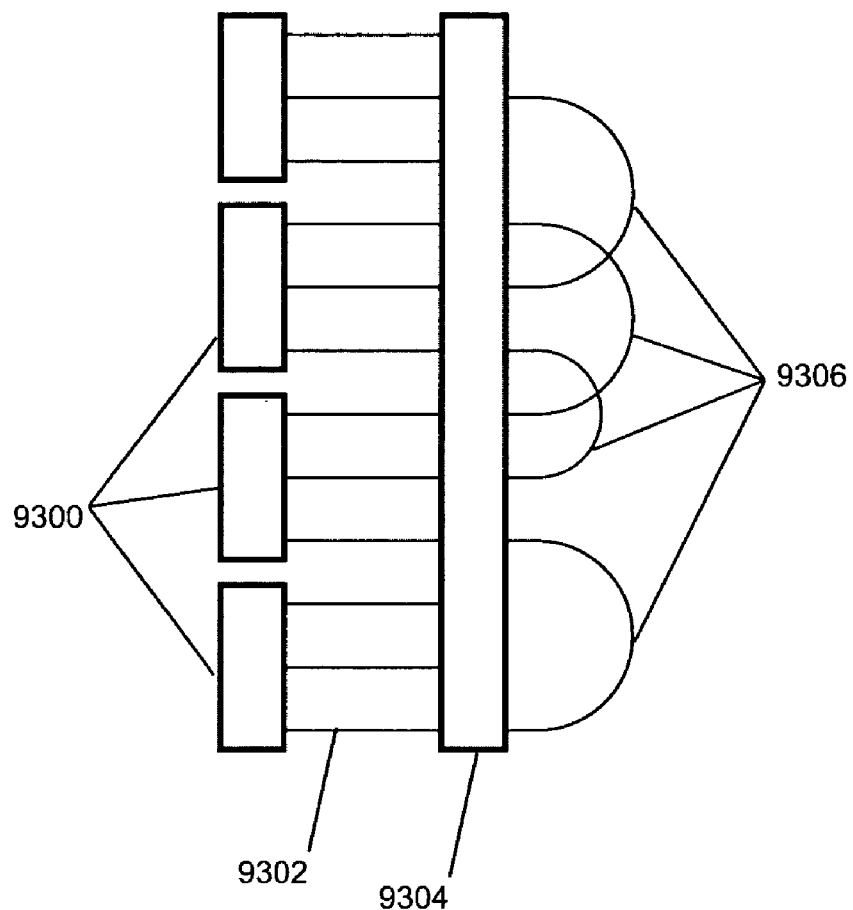

FIG. 91 shows a practical implementation of scalable switching network whereby switching elements are connected to a patch panel and the connections are completed through a series of jumper cables.

Figure 92:
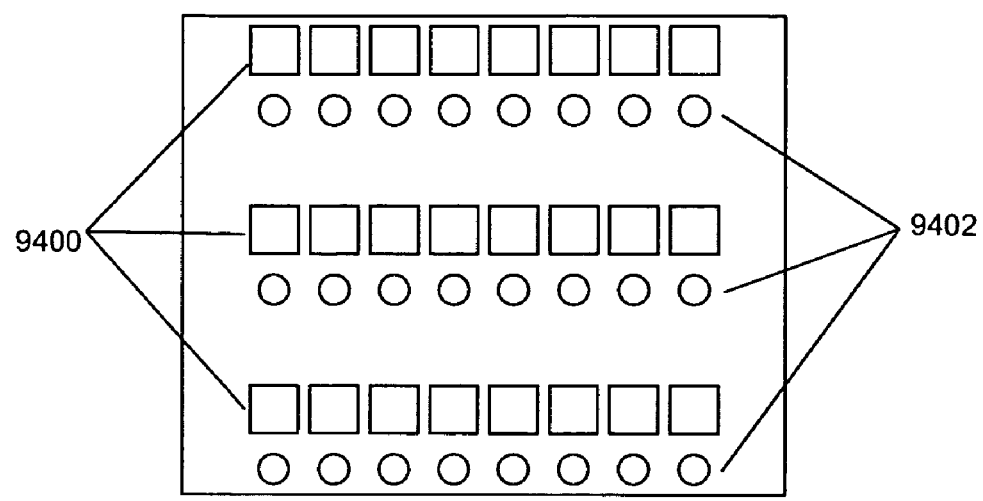

FIG. 92 shows a typical patch panel augmented by indicator lights.

Figure 93:
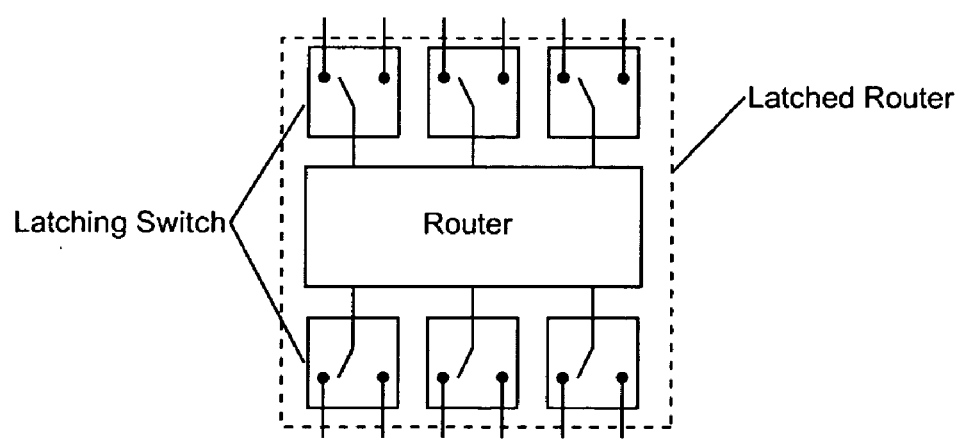

FIG. 93 shows a switching element with latching switches attached to the ports and alternatively shows an embodiment of a "latched router."

FIG. 94 is a pseudocode description of a method to guide a technician through a manual upgrade process using indicators.

Figure 95A:
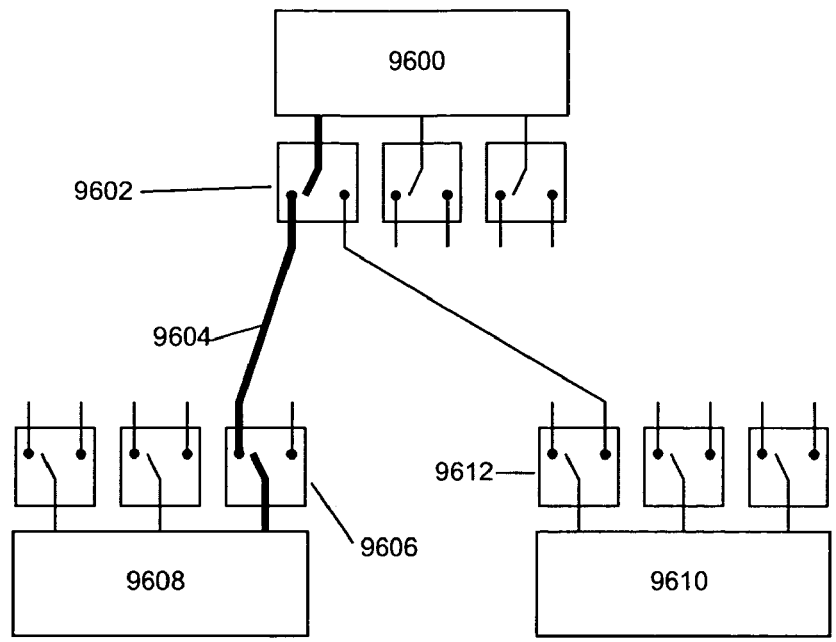
Figure 95B:
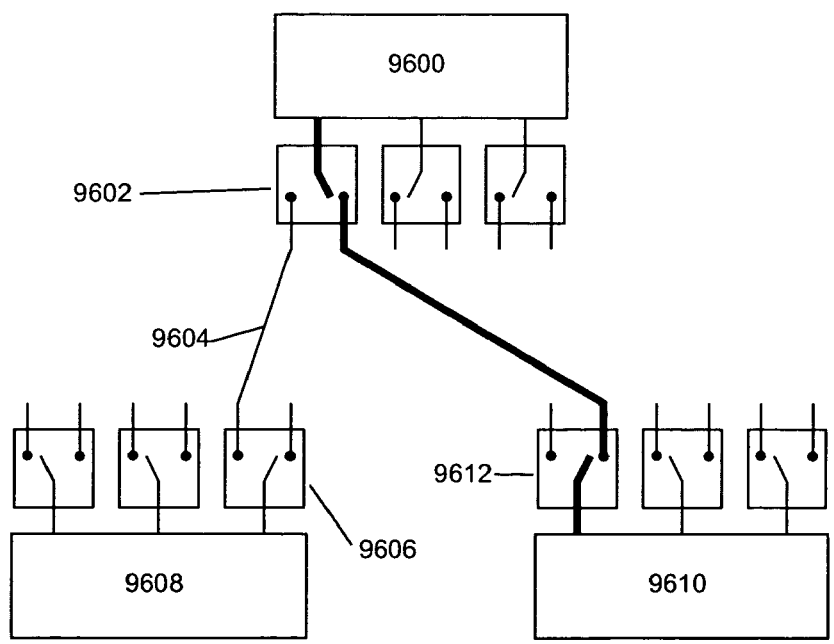

FIG. 95A and FIG. 95B show how latching switches are used to redirect traffic.

Figure 96:
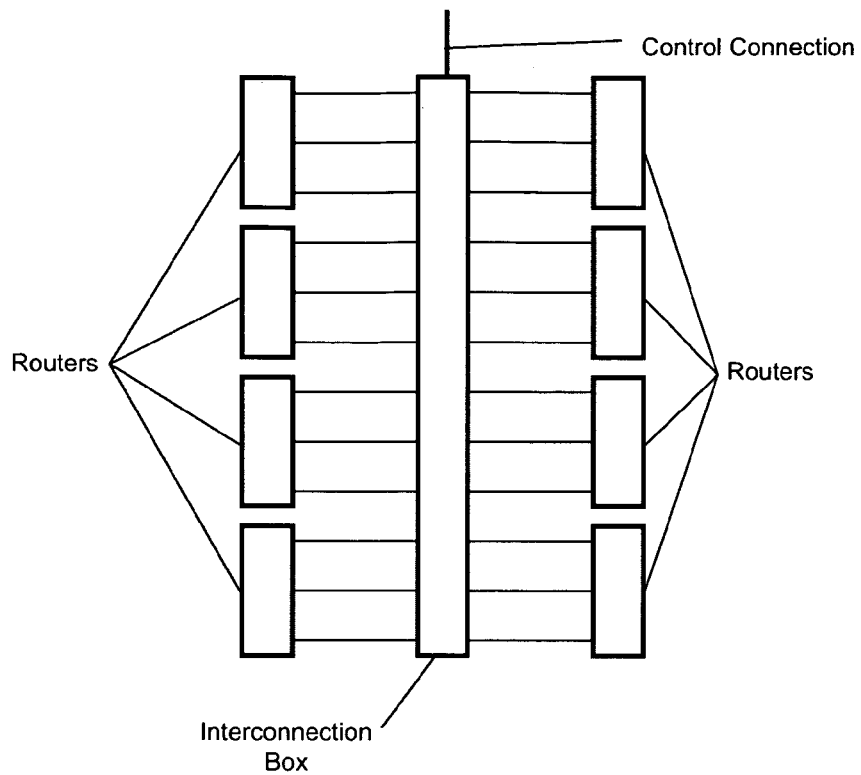

FIG. 96 shows a practical implementation of a scalable switching network whereby switching elements are connected through to an interconnection box.

Figure 97:
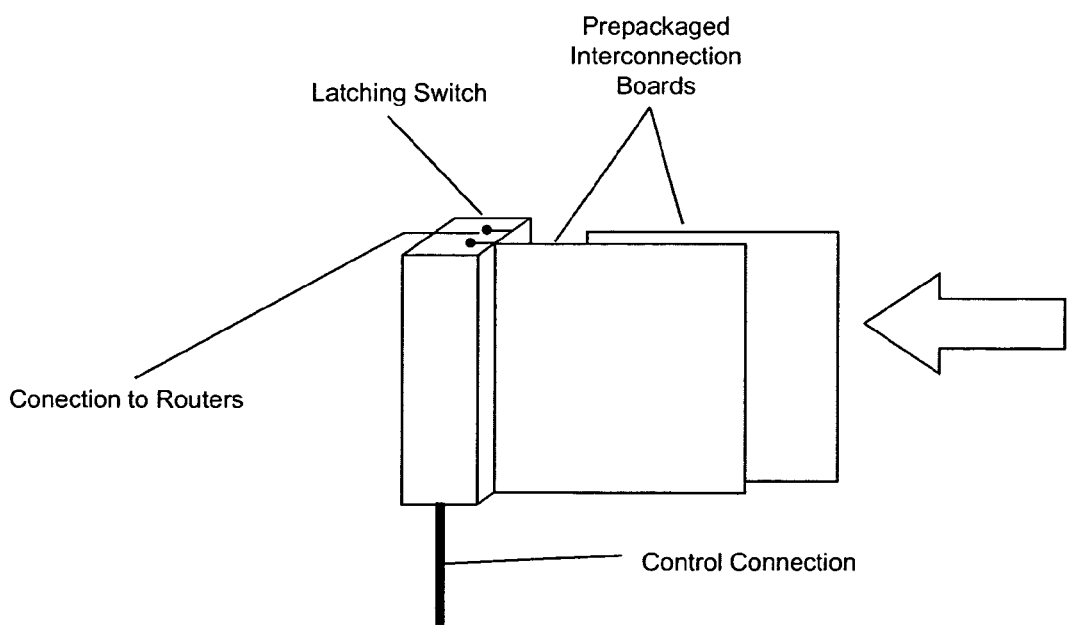

FIG. 97 shows a schematic of an interconnection box, which is designed to have prepackaged interconnection boards to facilitate the upgrade process.

Figure 98:
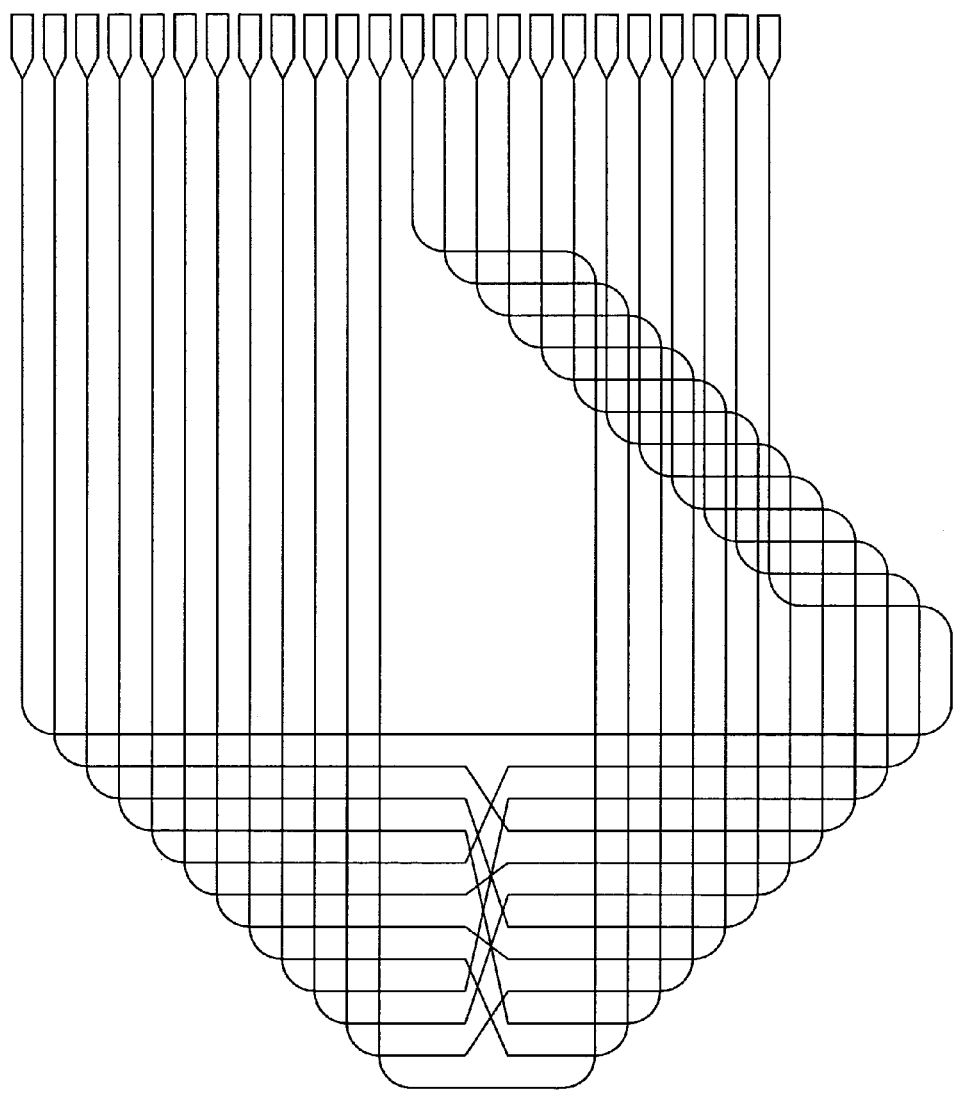

FIG. 98 shows an embodiment of a interconnection board.

Figure 99:
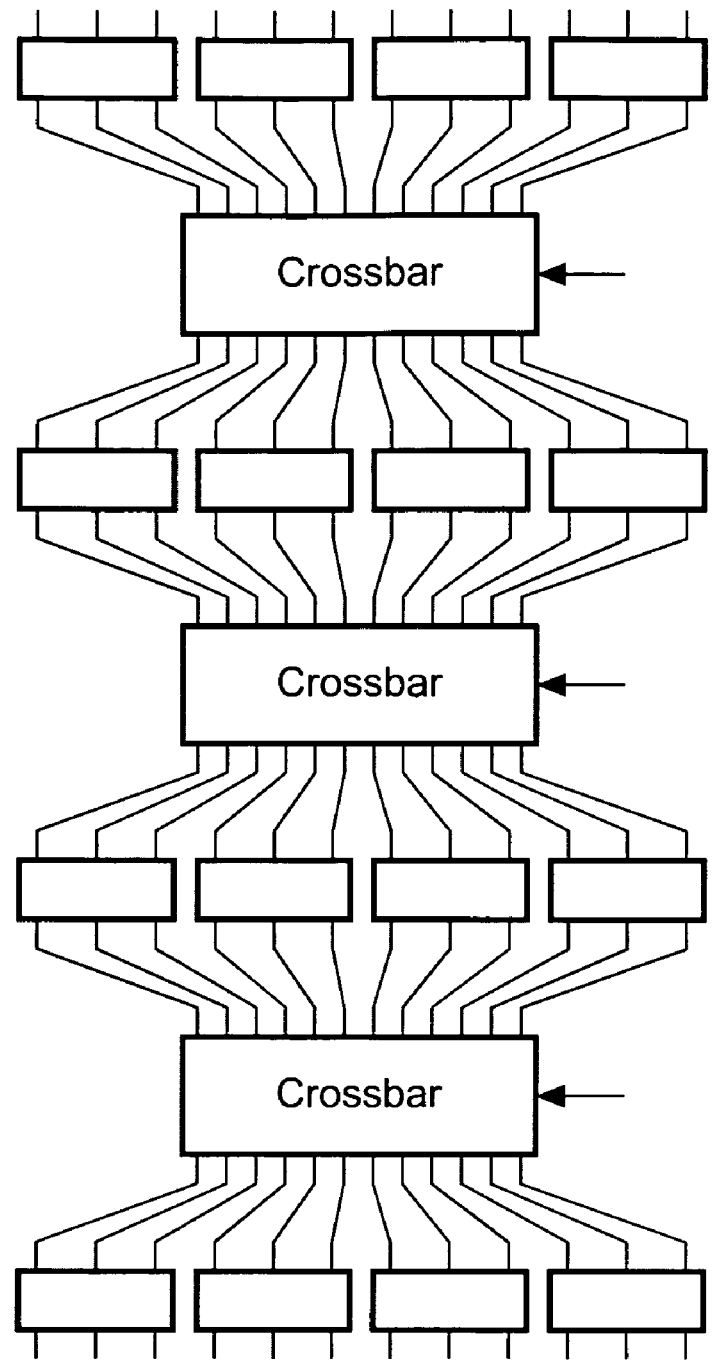

FIG. 99 shows an embodiment of electronically controlled interconnections using an optical crossbar.

Figure 100A:
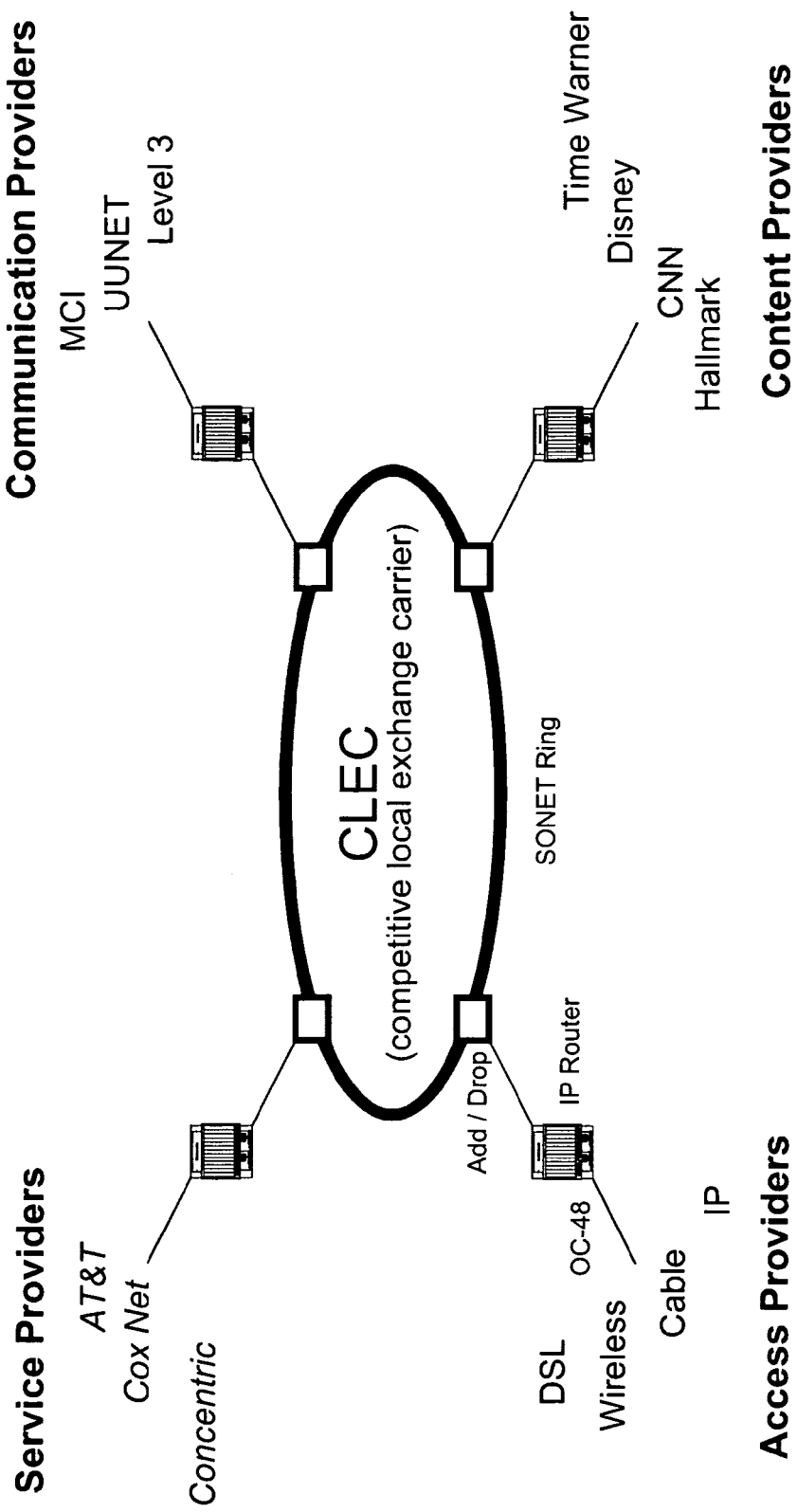

FIG. 100A shows a typical modern implementation of a metropolitan area switching network.

Figure 100B:
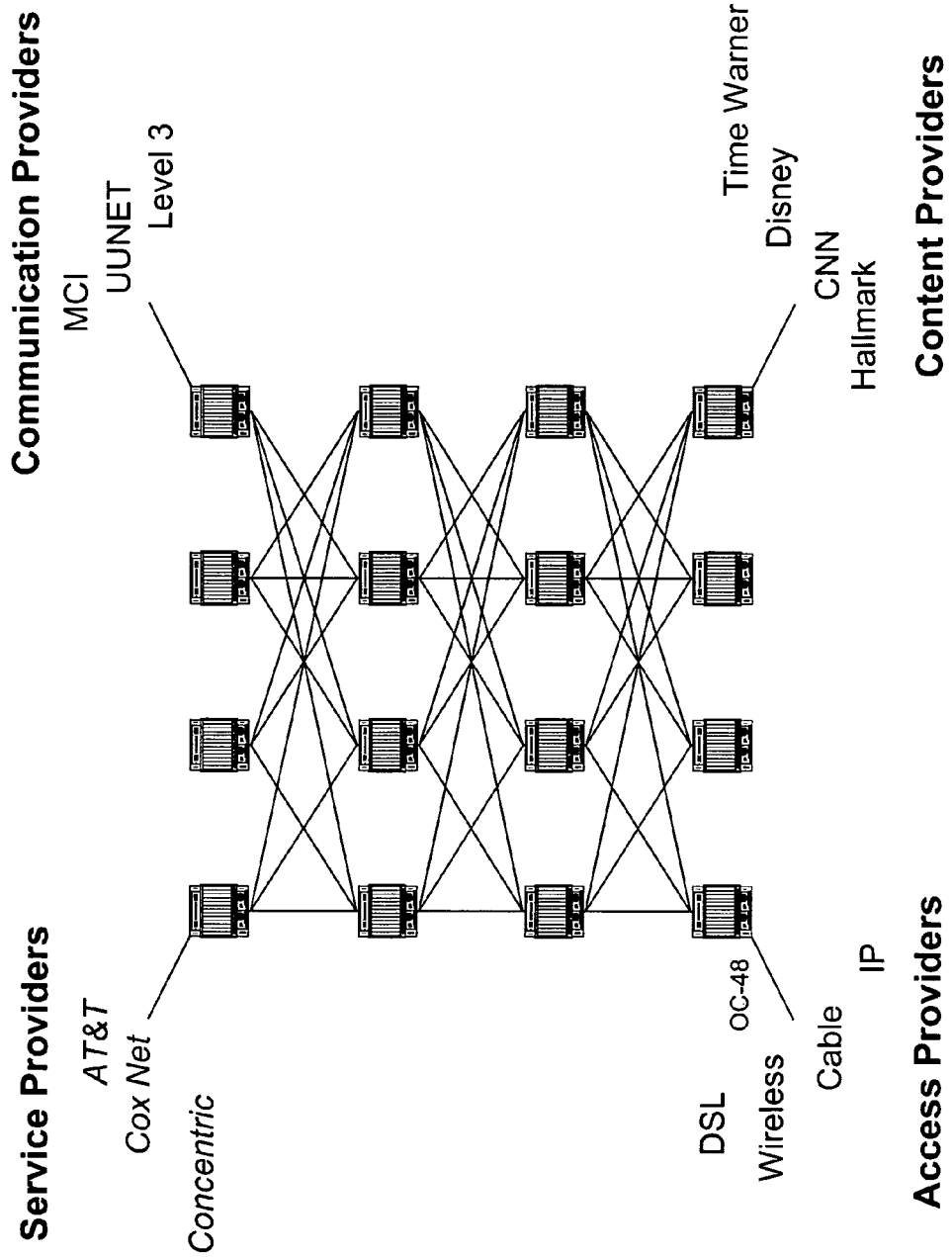

FIG. 100B shows a proposed implementation of a metropolitan area switching network using scalable switching networks as the core infrastructure.

FIG. 100C shows a detailed view of the RBCCG network at the heart of a metropolitan area switching network.

Figure 101:
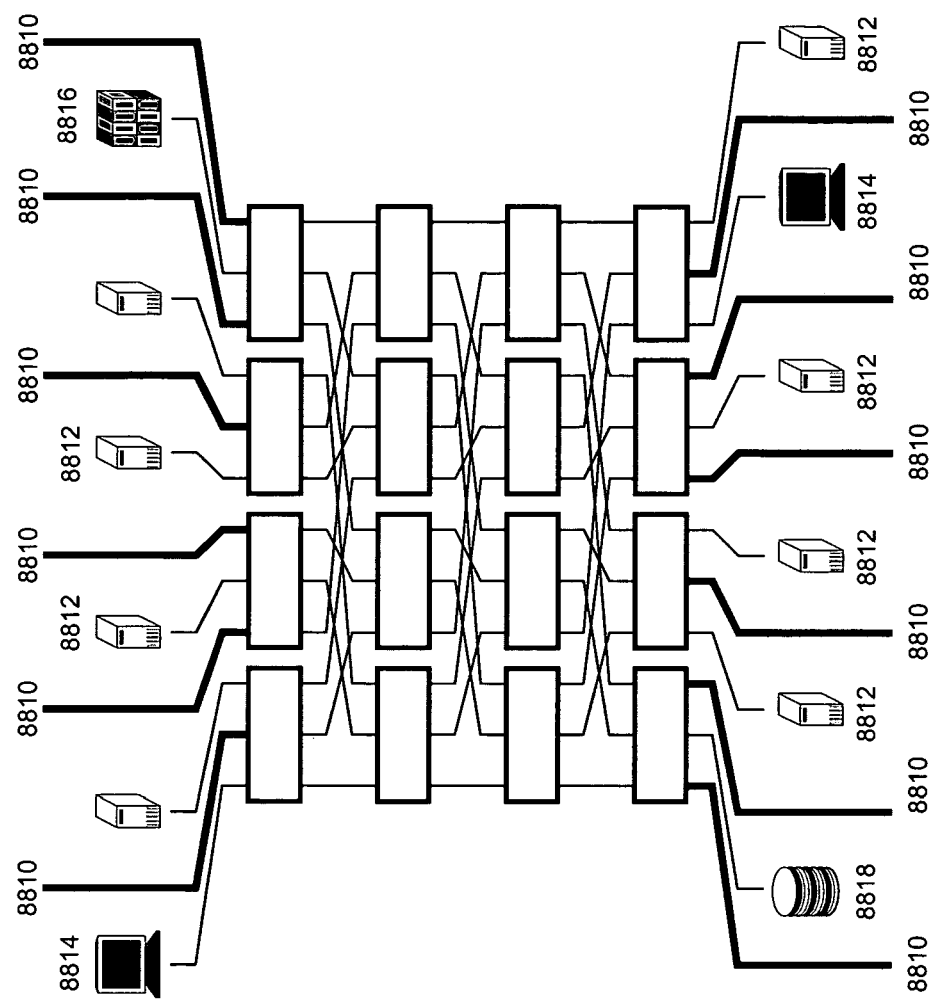

FIG. 101 shows a deployment of a complex of servers and services using a scalable switching network.

Figure 102A:
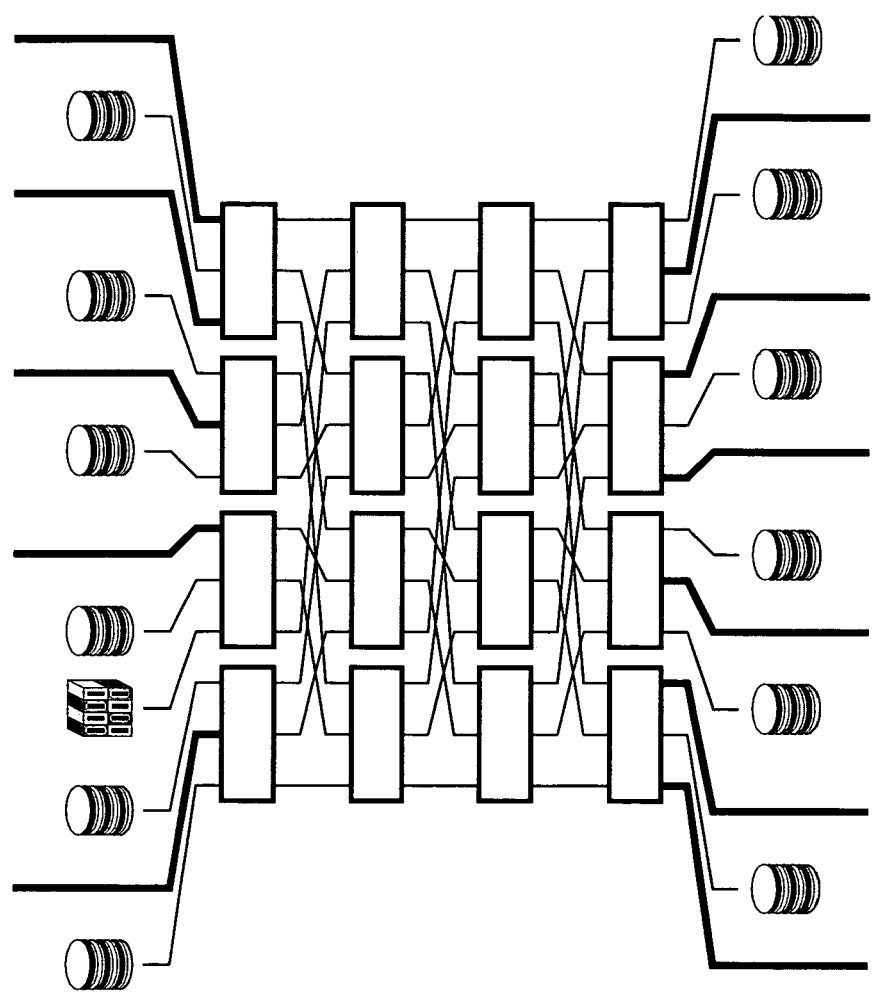

FIG. 102A shows a deployment of a networked attached storage (NAS) unit using a scalable switching network.

Figure 102B:
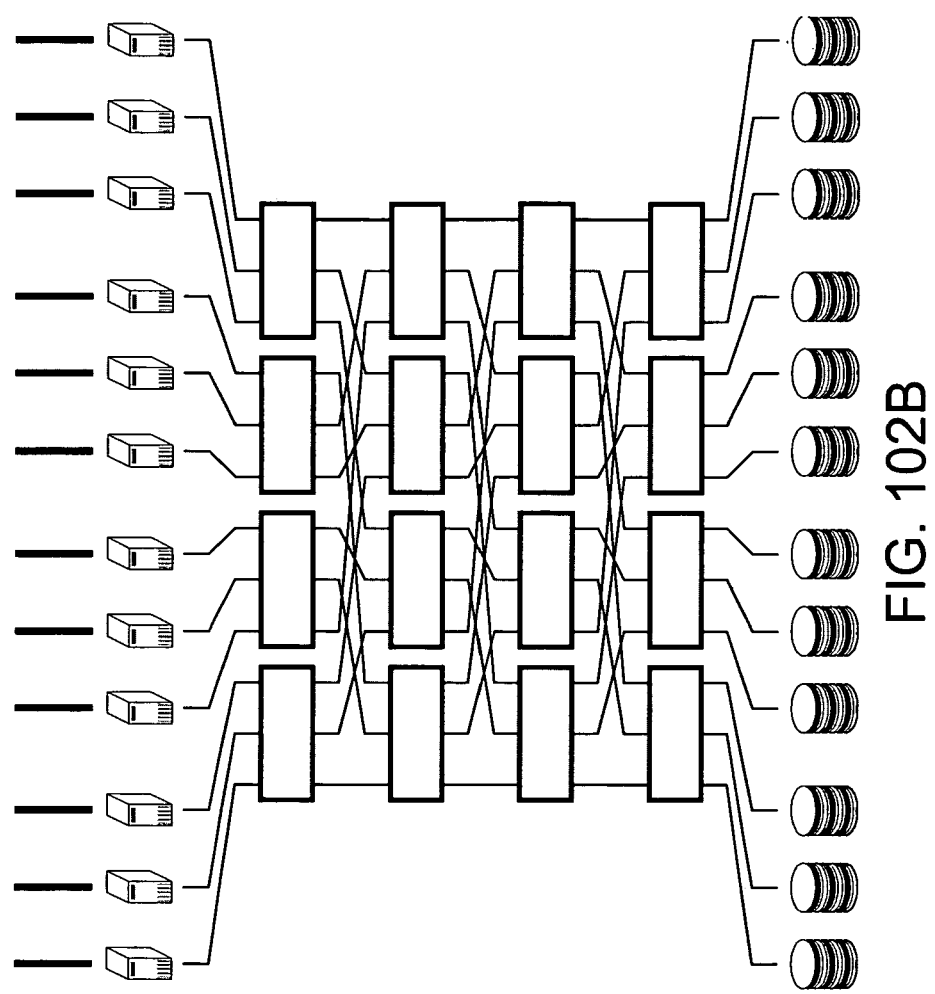

FIG. 102B shows a deployment of a storage area network (SAN) using a scalable switching network.

Figure 102C:
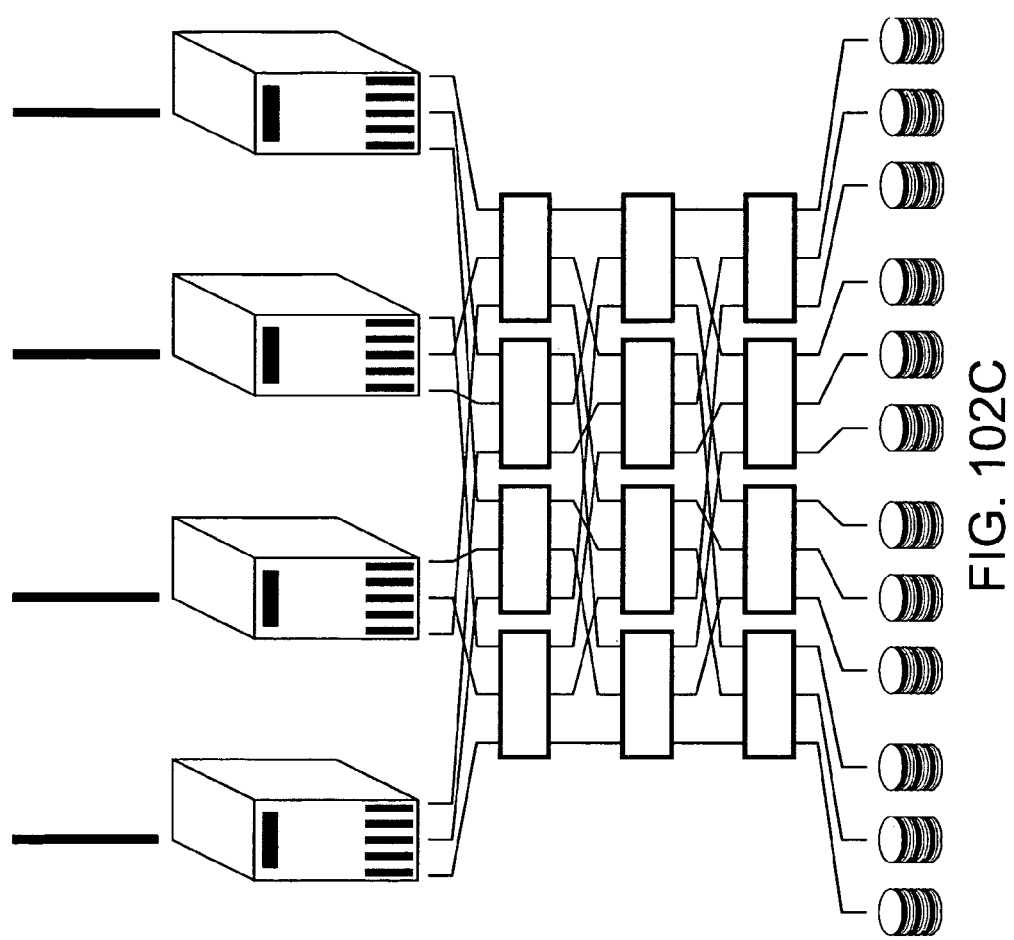

FIG. 102C shows a deployment of a storage area network (SAN) using a scalable switching network employing large gateway servers.

Figure 103:
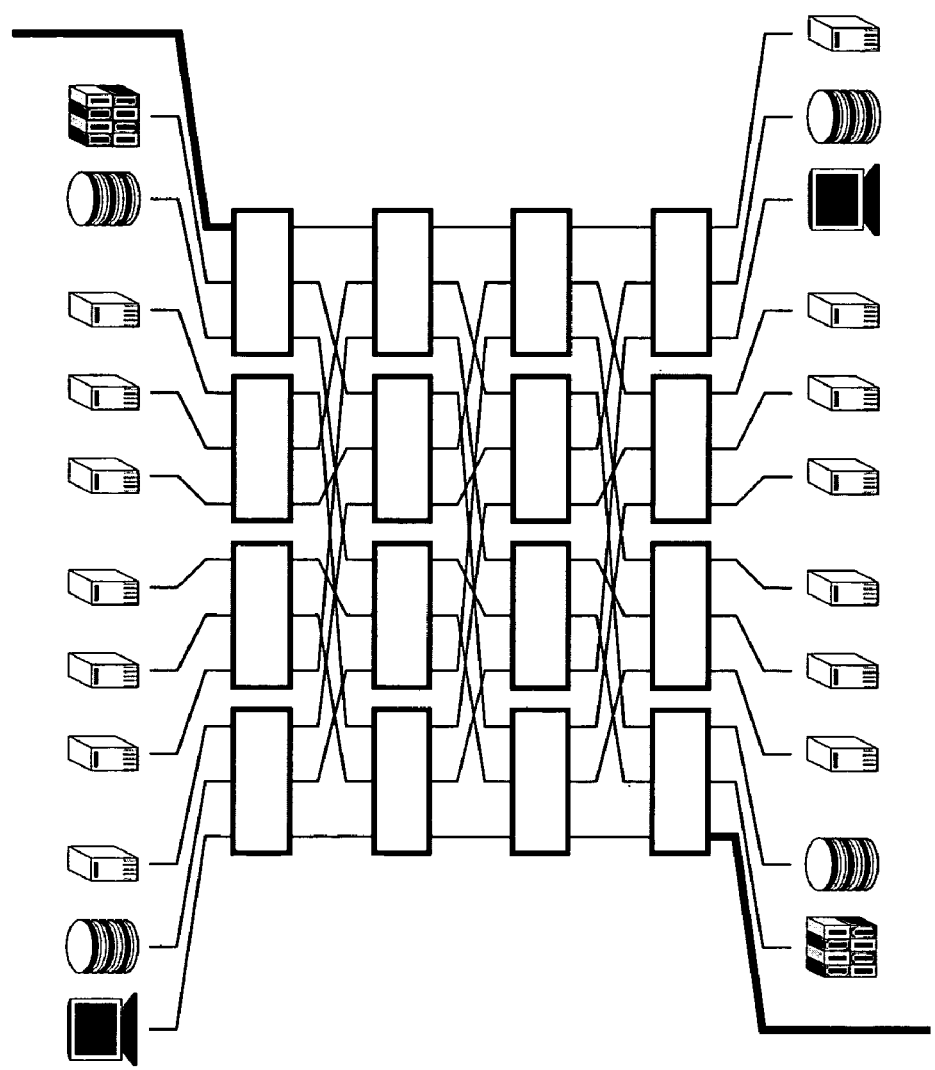

FIG. 103 shows a deployment of processor cluster such as Beowulf using a scalable switching network.

Figure 104A:
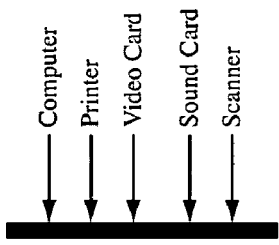

FIG. 104A shows a typical implementation of a peripheral bus for a computer.

Figure 104B:
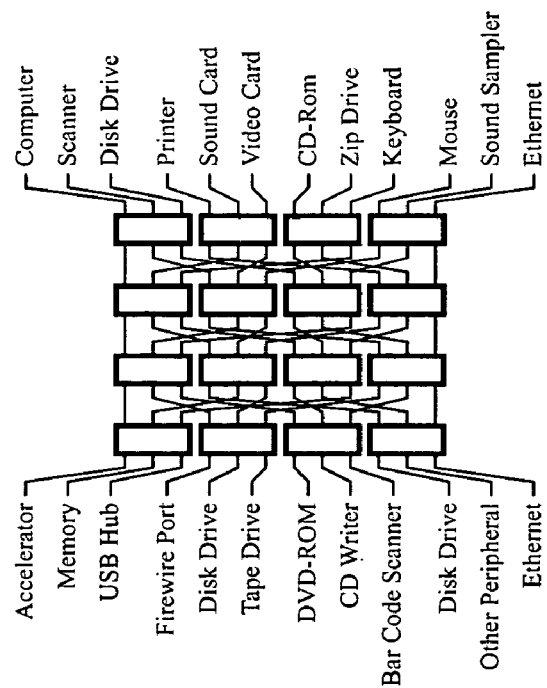

FIG. 104B shows an architecture were the peripheral bus is replaced by a scalable switching network.

Figure 105A:
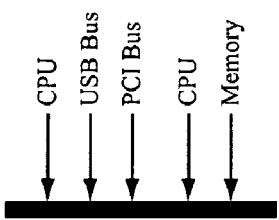

FIG. 105A shows a typical implementation of a system bus internal to a computer.

Figure 105B:
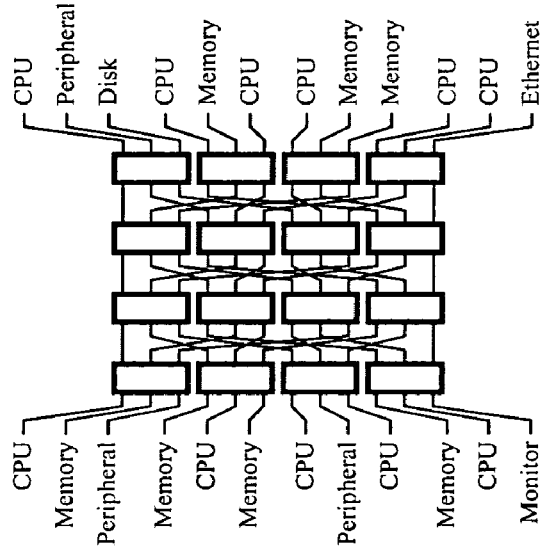

FIG. 105B shows an architecture were the peripheral bus and the system bus is replaced by a scalable switching network.

DETAILED DESCRIPTION OF THE INVENTION

Switching elements are any type of device configured to relay traffic through different paths depending on the destination address of the traffic. Depending on the context, the switching elements as well as the systems and methods recited within this disclosure, operate with both circuit switched networks, packet switched networks, and networks comprising circuit switched elements and packet switched elements. The switching elements include but aren't limited to routers and switches, such as an Asynchronous Transfer Mode (ATM) switch or Ethernet switch. A switching element comprises ports which are an interface by which traffic is allowed to flow.

Some switching elements can further have the capability of expanding in the number of ports. In some embodiments, the switching elements can have the number of ports expanded without requiring the switching element to be powered off and in fact, the switching elements can even relay traffic during the expansion process, known as a hot upgrade.

For example, a router often comprises a central networking processor and a plurality of line cards. The router is designed to allow line cards to be added and removed while the router is in operation. Line cards comprise at least one port. Therefore, the number of ports on this type of router can be changed while the router is in operation.

In discussing switching elements a distinction is drawn between a physical layout and a logical layout. In FIG. 5A, a switching element is depicted as having six ports 42, 44, 46, 48, 50, and 52. These ports can physically be accessed anywhere on the switching element; for example, it is common for switches to have all their ports located in the rear. Regardless of the physical layout, ports on a switching element can be logically located. For example, ports can be logically defined as a top port or a bottom port. In another logical embodiment, the same switching element can have ports logically defined as a top port, bottom port, left port or right port. For example, switching element 40 can logically be defined to look like switching element 60 in FIG. 5B, by logically mapping ports 42, 44, and 46 to top ports 62, 64, and 66, respectively and ports 48, 50, and 52 to bottom ports 68, 70, and 72. In another logical embodiment, switching element 40 can logically be defined to look like switching element 80 in FIG. 5C, by logically mapping port 42 to top port 82, port 44 to top port 84, port 46 to left port 86, port 48 to bottom port 88, port 50 to bottom port 90, and port 52 to bottom port 92.

The mapping of physical to logical ports can be used to give multidimensional characteristics to a switching element. FIG. 5D shows a switching element 100 having ports 102, 104, 106, 108, 110, and 112, representing top ports 0, 1, 2, 3, 4, and 5. By mapping top ports 0, 1, 2, 3, 4, and 5 to top ports (0,0), (0,1), (0,2), (1,0), (1,1) and (1,2) as indicated in FIG. 5E by ports 122, 124, 126, 128, 130, and 132, respectively, the resultant logical switching element 120 exhibits two-dimensional characteristics. By extension, two dimensional local mapping can apply to defining bottom ports, left ports, right ports, front ports, and back ports. Clearly, logical mapping can result in higher dimensional characteristics of a switching element.

Figure 6A:
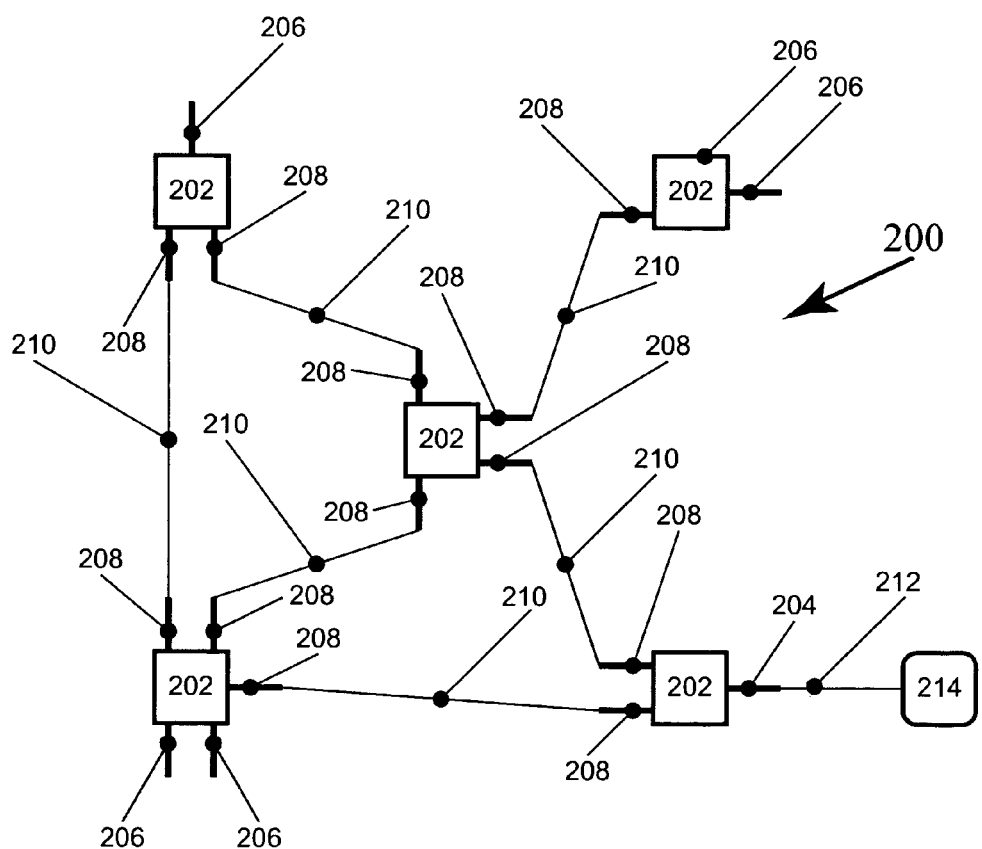
FIG. 6A defines basic terminology used relating to switching networks

In describing a switching network, several terms are used in this disclosure. In addressing any switching network, an external port to a switching network is a port of a switching element which is intended to be connected to a device not part of the switching network. Likewise, an internal port to a switching network is a port of a switching element which is intended to be connected to another switching element within. Similarly, an external connection is a connection between a switching element of the switching network and a potential external device and an internal connection is a connection between two or more switching elements within the switching network. For example, in FIG. 6A, switching network 200 comprises a plurality of switching elements 202, where some of the switching elements 202 have external ports 206 and 204 and internal ports 208. Conversely, some of the switching elements 202 only have internal ports. In this example, there is a plurality of internal connections 210 and an external connection 212. An external port 204 need not be connected to an external device 214 as long as the port is intended to be connected to an external device. Furthermore, if the switching network is reconfigured, expanded or modified, an external port can be made converted to an internal port by simply connecting it to another switching element within the switching network. Likewise, an internal port can be made available to an external device thereby redefining the role to an external port. The distinction between internal and external is not intended to be a constraining property of the port, but merely as a logical allocation.

A switching network is termed functionally connected if for every pair of external ports, there is a path connecting them. For example, in FIG. 6B, switching network 220 is functionally connected. Every pair of external ports can be connected through switching network 220. For example, external ports 222 and 224 can be connected through path 226.

Figure 6C:
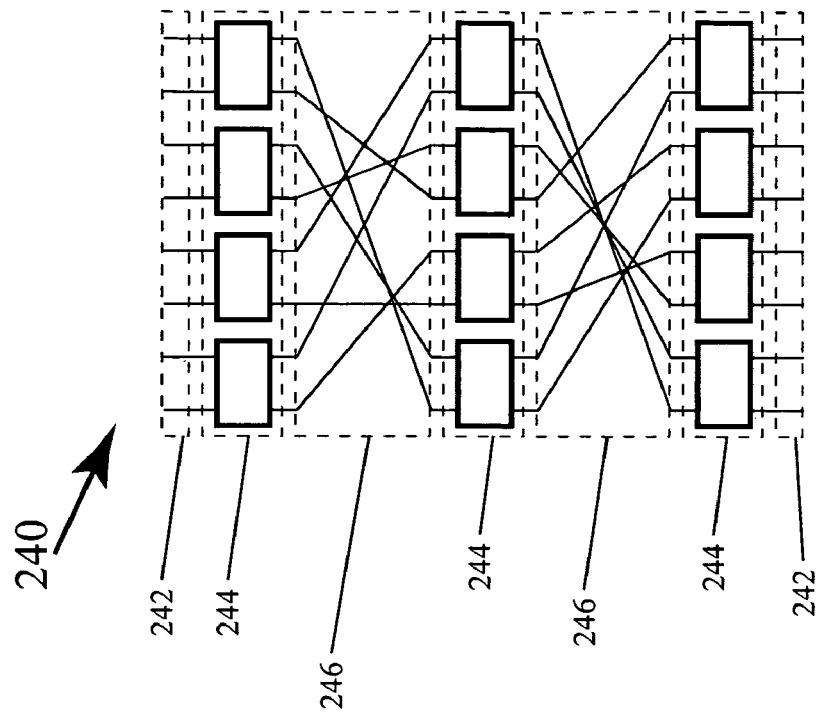
FIG. 6C defines various parts of a multistage switching network.
Figure 6B:
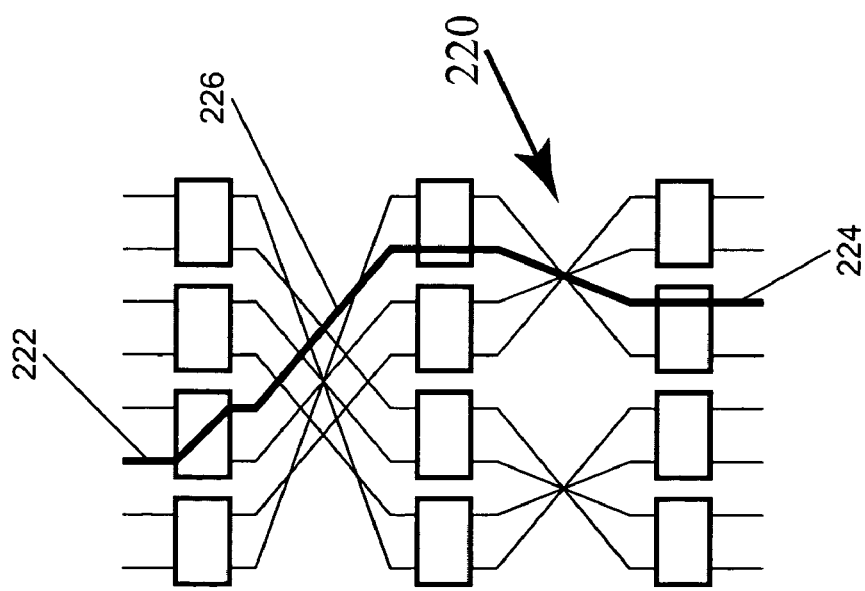
FIG. 6B defines the concept of functionally connected

In FIG. 6C, the specific case of a multistage switching network 240, the network typically comprises a layer of external ports 242, two or more stages of switching elements 244, and an inter-stage interconnection (ISIC) network 246 connecting two adjacent stages comprising all connections between the two adjacent stages. In such referring to such a network, the number of stages is referred to as the height, H. In a one-dimensional stage, the width is referred to as the width, W.

Figure 7A:
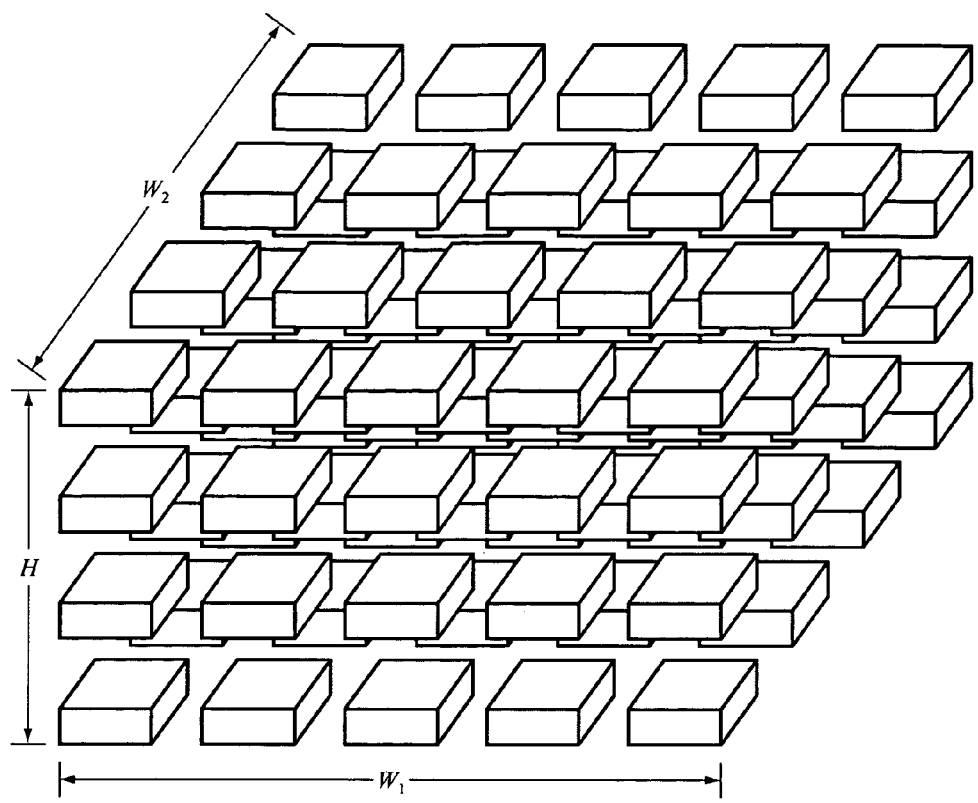
FIG. 7A shows a three dimensional layout of switching elements with height of H and widths of $W_1$ and $W_2$.
Figure 7B:
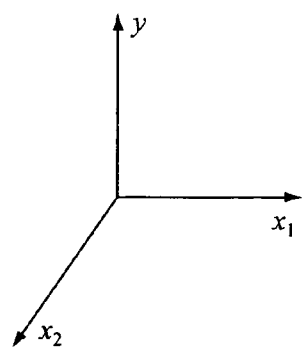
FIG. 7B shows the coordinate axis labeling for the given two-dimensional multistage interconnection network.

In higher dimensional stages, a width is ascribed to each coordinate axis. For example, FIG. 7A shows a multistage switching network with two-dimensional stages. It has H stages and is referred to as having a height of H. For ease of notation, the direction perpendicular to the stages (i.e. the direction traversed in order to count the number of stages) is referred to as the y axis, and each direction the stages occupy are referred to as the $x_i$ direction. In the example of FIG. 7A, each stage has widths of $W_1$ in the $x_1$ direction and $W_2$ in the $x_2$ direction as further depicted in FIG. 7B.

Figure 7C:
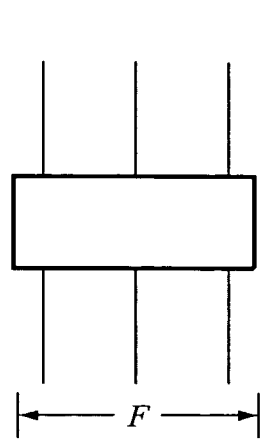
FIG. 7C shows the definition of the fanout variable F.
Figure 7D:
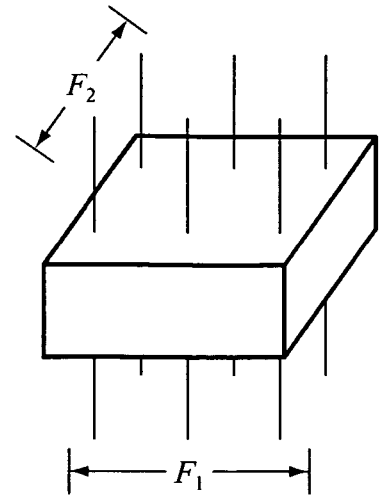
FIG. 7D shows the definition of the fanout variables $F_1$ and $F_2$ for the given two-dimensional multistage interconnection network.

The port width of a switching element is referred to in this disclosure as the fanout. This definition coincides historically with the definition of fanout in multistage interconnection networks. However, in practice, switching elements can include bidirectional ports; that is, traffic is allowed to flow in and out of each port, so this definition of fanout can differ from some meanings in the art. FIG. 7C depicts a switching element with a fanout of F; it has F top ports and F bottom ports. Similarly, if a stage of a multistage switching network is multidimensional, it can have various fanouts. For example, FIG. 7D shows a two-dimensional switching element with fanouts of $F_1$ in the $x_1$ direction and $F_2$ in the $x_2$ direction.

Figure 8A:
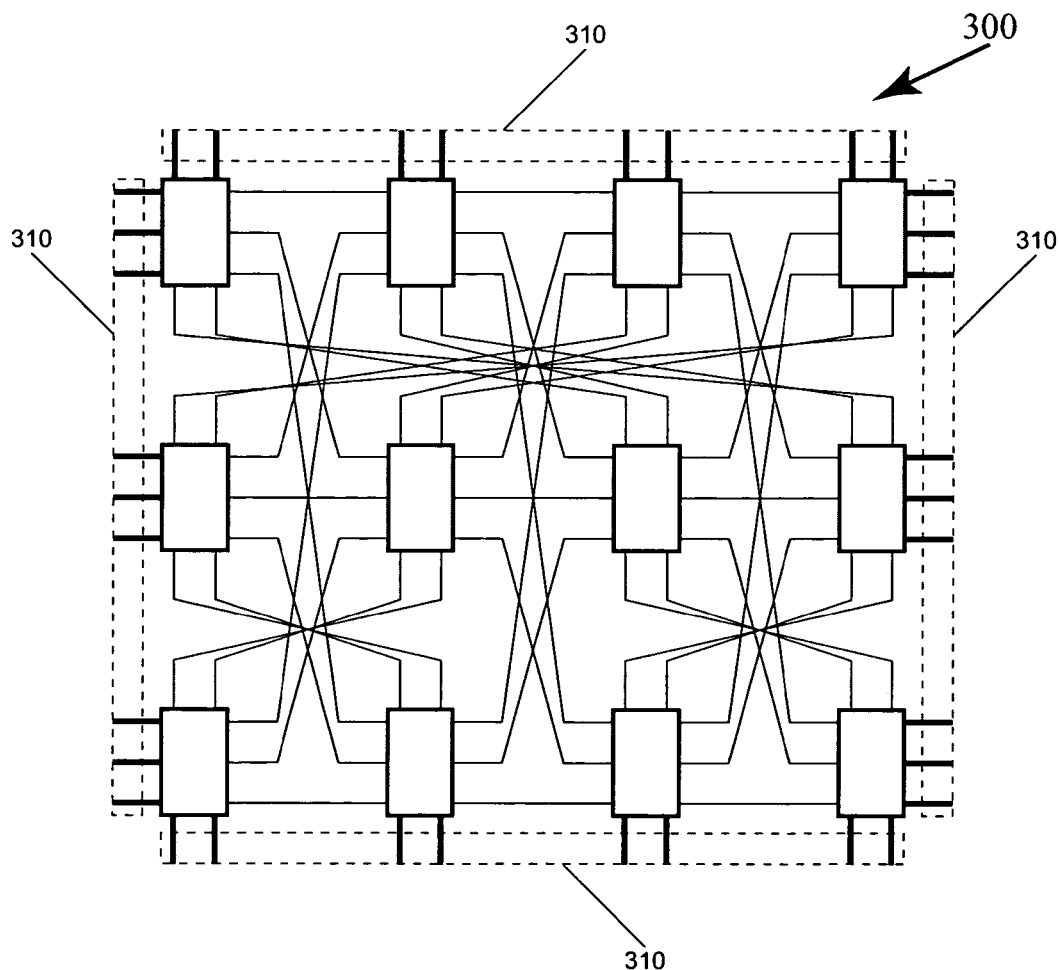
FIG. 8A, FIG. 8B and FIG. 8C defines various parts of an overlaid switching network.
Figure 8B:
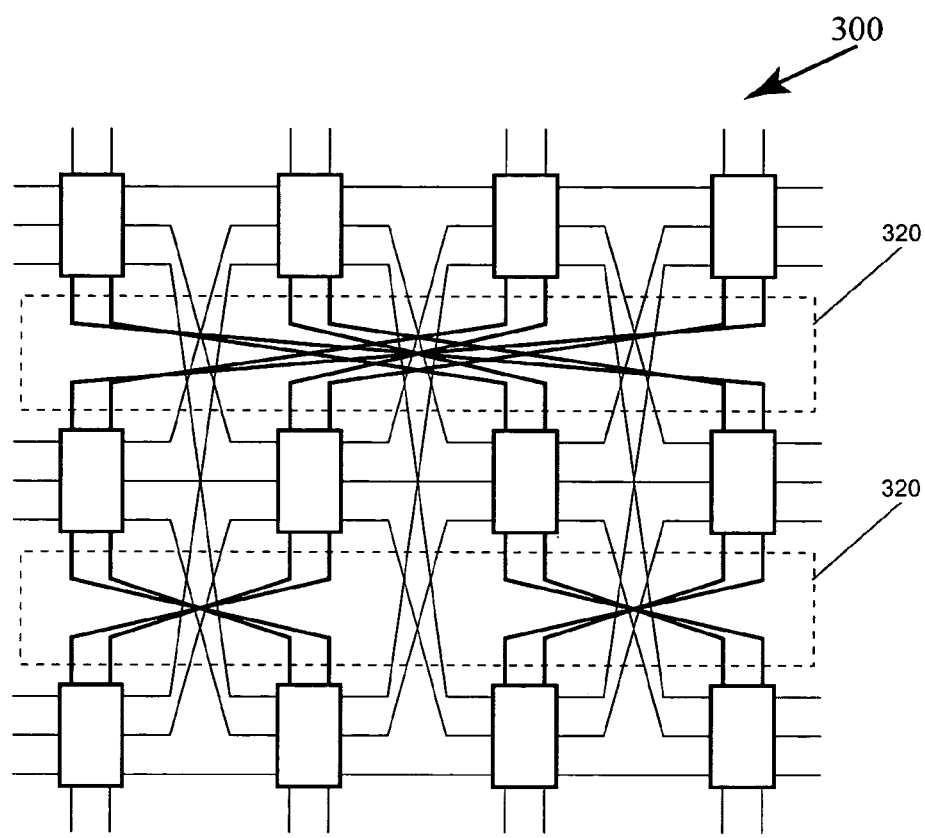
Figure 8C:
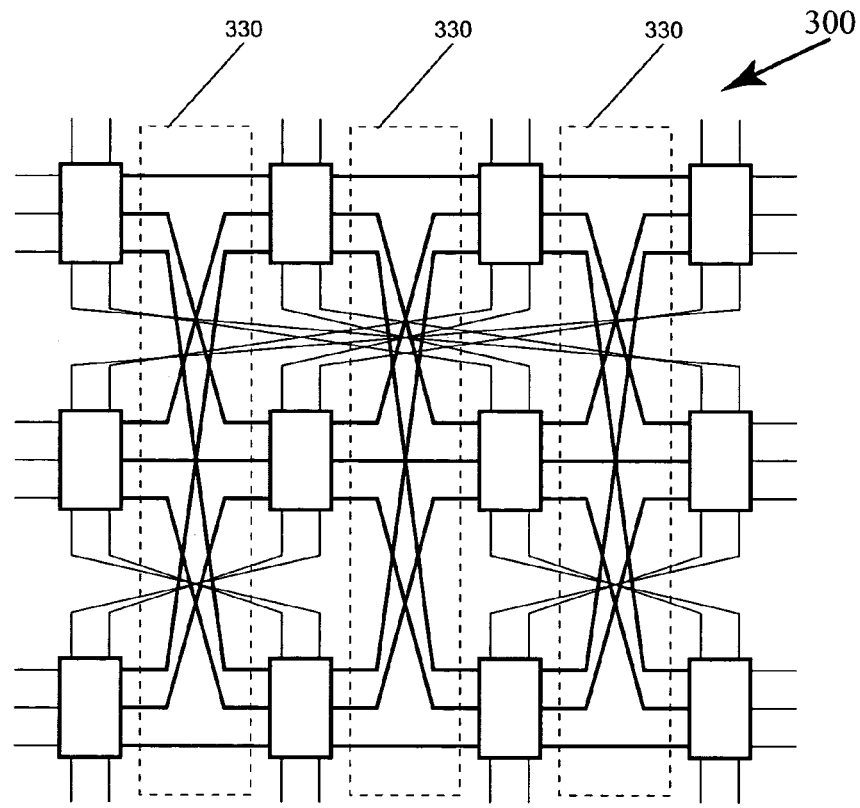

FIG. 8A, FIG. 8B and FIG. 8C depict an overlaid switching network 300 which is described in detail below, with external ports 310. It can be described in terms of rows and columns. Between rows can be an inter-row interconnection (IRIC) network 320 as indicated in FIG. 8B. Between the columns can be an inter-column interconnection (ICIC) network 330 as indicated in FIG. 8C.

As a convention in the diagrams, items are generally counted starting with 0 from top to bottom, left to right and, in the case of three dimensional drawings, front to back. For example, the stages of a multistage switching networks are numbered from top to bottom from 0 to H−1 with stage 0 at the top and the ports on the switching elements are numbered from left to right from 0 to F−1 with port 0 leftmost. Furthermore, the switching elements are numbered from left to right from 0 to W−1.

On occasion, it is convenient to refer to a port as belonging to a stage or ISIC network, that is a port belongs to a stage if it belongs to a switching element belonging to the stage. A port belongs to an ISIC network if it is a top port and the top ports of the stage to which it belongs is coupled to the ISIC network. Conversely, if the port is a bottom port, it belongs to an ISIC network if the bottom ports of the stage to which it belongs is coupled to the ISIC network. One should not note by this convention a port need not be connected to belong to an ISIC network.

Figure 9:
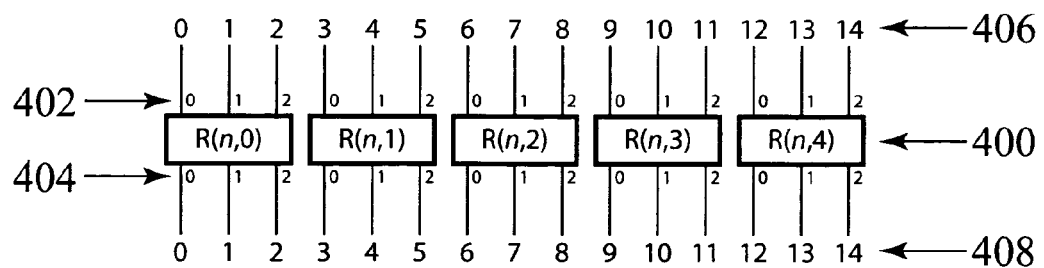
FIG. 9 shows the relationship between the numbering of the ports for each switching element and the number of ports for an entire row.

It is often convenient to number these ports from 0 to W×F−1. Notationally, each switching element can be labeled as R(n,w) indicating it is w+1 switching elements from the leftmost switching element in stage n+1. FIG. 9 depicts stage n+1 of switching elements, indicated as stage 400. In this example, F=3 and W=5 so the bottom and top ports for each switching element are numbered from 0 to 2, as indicated by 402 for the top ports and 404 for the bottom ports. If referring to the top ports and bottom ports of the stage, they are numbered from 0 to 14 as indicated by 406 and 408, respectively. Mathematically, the relationship is a simple equation, for instance, top port 2 of switching element R(n,4) would be top port 4F+2 of stage n. In discussion of higher dimensional switching networks, this concept can be extended to numbering of all ports of a two-dimensional stage. For instance, bottom port (1,3) of switching element R(n,2,3) would be bottom port ($2F_1+1,3F_2+3$) of the ISIC network.

Figure 10:
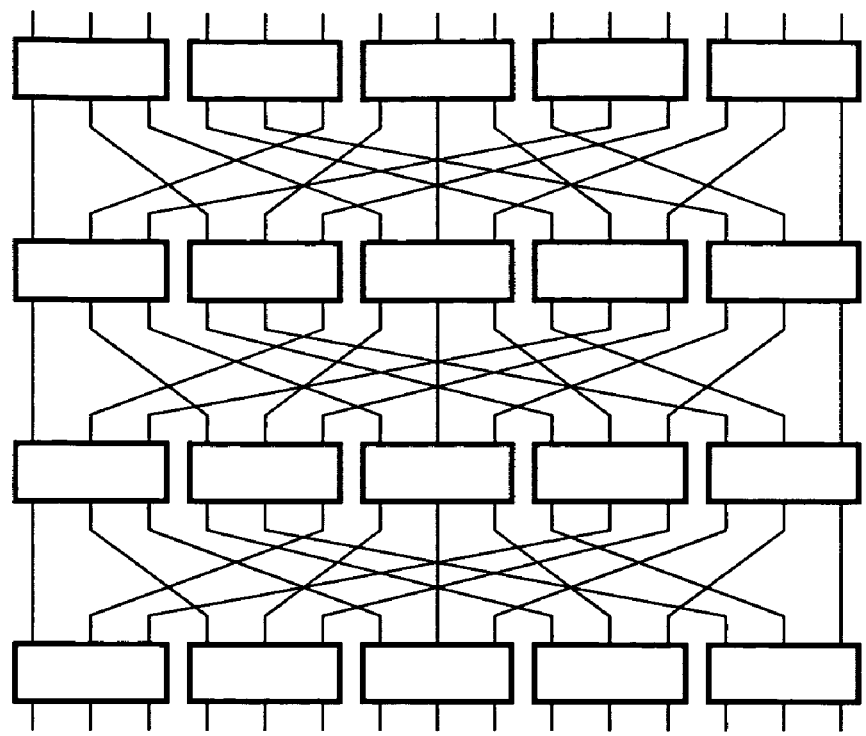
FIG. 10 shows a 30-port RBCCG network with 4 layers and width of 5 switching elements and per switching element fanout of 3.

By way of specific example, many of the switching networks described are redundant blocking compensated cyclic group (RBCCG) networks as described by Huang in U.S. Pat. No. 5,841,775; therefore, U.S. Pat. No. 5,841,775, entitled "Scalable Switching Networks," issued on Nov. 24, 1998 is incorporated herein by reference in its entirely as if set forth in full. Specifically, balanced RBCCG networks which have a stride value equal to the fanout such as the one depicted in FIG. 10 are used. The balanced RBCCG network depicted in FIG. 10 has a fanout of 3, a stride of 3, height of 4 and a width of 5. Each ISIC network in a balanced RBCCG is referred to as a cyclic group ISIC (CGISIC) network.

Though the RBCCG switching networks offer a wide variety of advantages over the fixed radix switching networks, the fixed radix switching networks have been more extensively studied and are considered more traditional. The methods described here utilize the advantages of the CGISIC networks in conjunction to augment the properties of the traditional multistage switching networks. Though this method is described for augmenting a fixed radix switching network, it can be applied to any multistage switching network.

Figure 12:
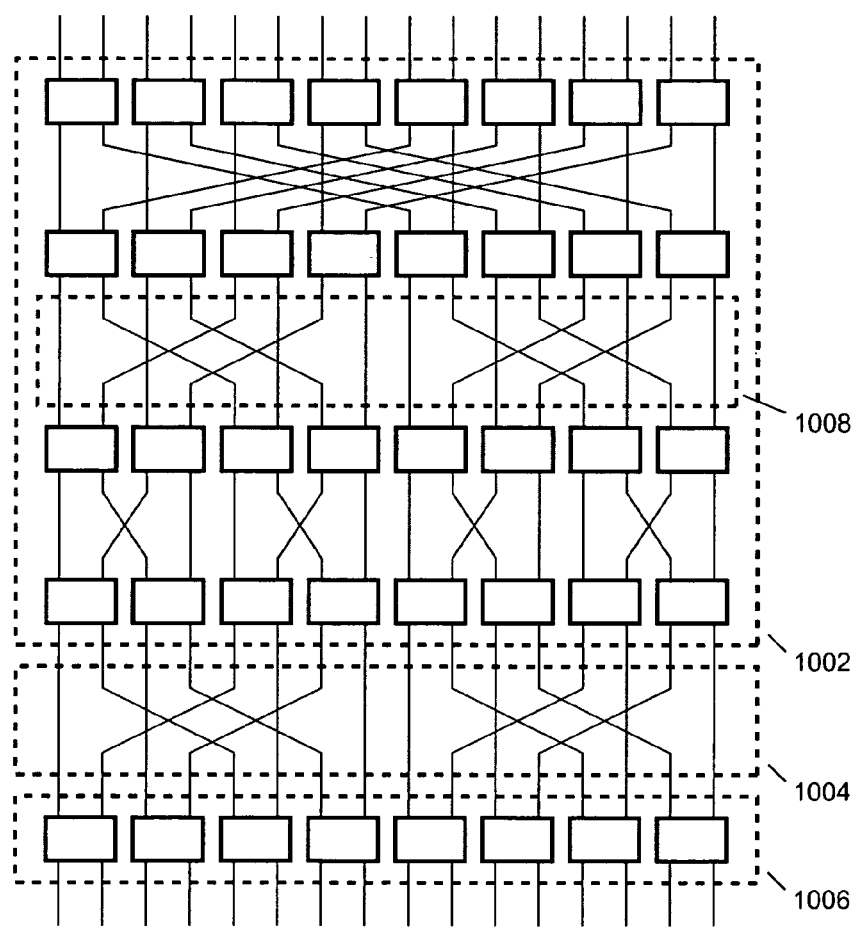
FIG. 12 shows a 32-port Banyan network with an extra stage comprising an extra Banyan stage at the bottom of the network.

One embodiment of a multistage switching network augmentation method is the insertion of an extra stage. FIG. 12 shows a network comprising a Banyan network 1002, an extra stage 1006 connected with ISIC network 1004, which in this case is identical to the ISIC network 1008 between the second and third stages of Banyan network. Since the Banyan network is functionally connected, the network depicted in FIG. 12 is also functionally connected with fault tolerance derived from redundant paths much in the same way as an RBCCG switching network. It falls short however in that the type of stages are not interchangeable, and the addition of new stages can not necessarily be made arbitrarily. The addition of a stage in the wrong position (or the wrong type of ISIC network) can yield a network which not only lacks fault tolerance, but may not be functionally connected.

Figure 11A:
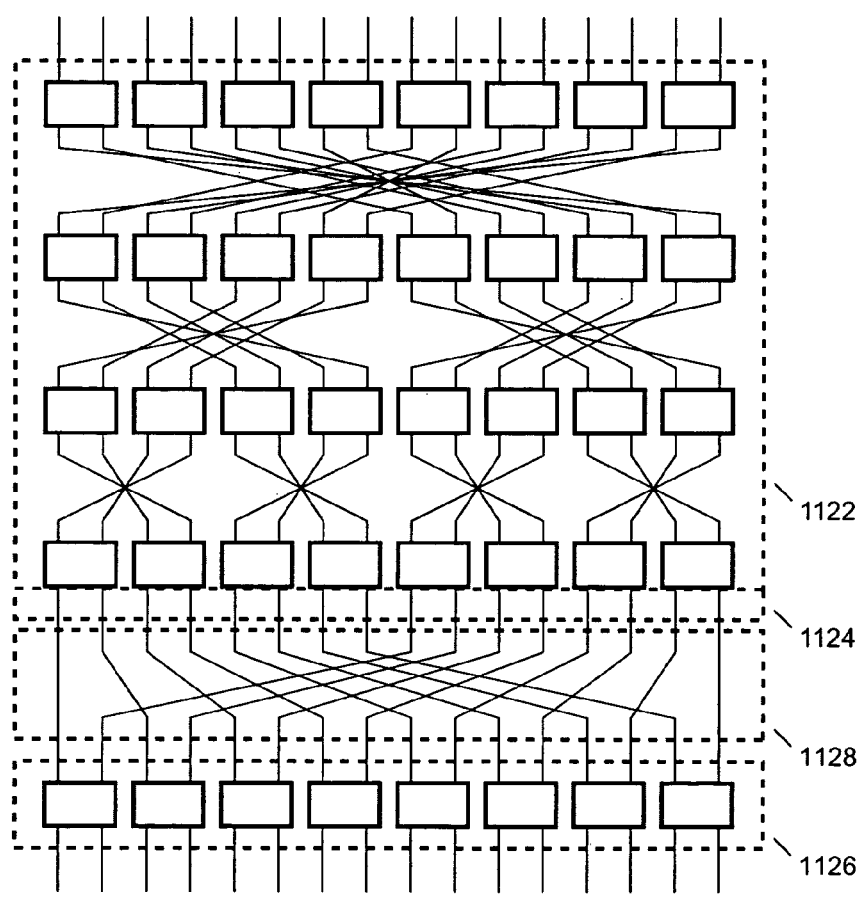
FIG. 11A shows a typical switching network with an extra stage inserted below a traditional multistage switching network.
Figure 11B:
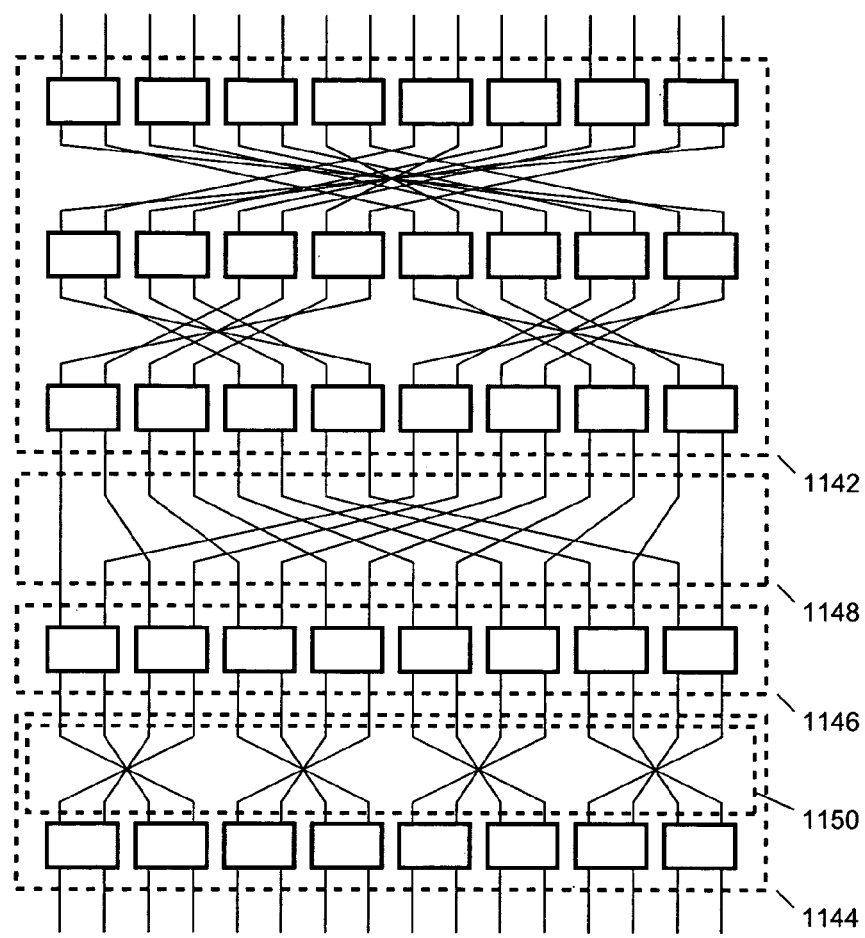
FIG. 11B shows a typical switching network with an extra stage inserted inside a traditional multistage switching network.

The shortcoming of arbitrary stage augmentation yields the following refinement to the multistage switching network augmentation method: the insertion of an extra stage with a CGISIC network. As depicted in FIG. 11A, a multistage switching network 1122 is connected through one set of its external ports 1124 to another stage of switching elements 1126, by a CGISIC network 1128. In an alternate embodiment depicted in FIG. 11B, the same multistage switching network 1122 depicted in FIG. 11A is divided into two pieces 1142 and 1144, ISIC network 1150 is preserved with piece 1144. Equivalently, the multistage switching network could have been divided so ISIC network 1150 is preserved with piece 1142. A new stage 1146 is attached to piece 1142 through CGISIC network 1148, and to piece 1144 through ISIC 1150. Generally, the internal insertion depicted in FIG. 11B is less desirable than the external insertion depicted in FIG. 11A as an architectural design. Often times, the multistage switching network is available as a complete unit whereby the internal connections can not be broken. Furthermore, unlike the external insertion depicted in FIG. 11A, the connectivity of the network can be detrimentally impacted to the point of no longer being functionally connected, especially if the initial multistage switching network is a radix two network, whereas with an external insertion, the resulting network is guaranteed to be functionally connected if the initial multistage switching network is functionally connected. Furthermore, with an internal insertion, any calculation-based routing can be severely impacted, whereas with an external insertion calculation-based routing of the multistage switching network can be used in combination with the calculation-based routing of a CGISIC network described below.

Due to the symmetry of the topologies given above, an inverted CGISIC network could be used in place of the CGISIC networks 1128 or 1148 in FIG. 11A and FIG. 11B, respectively. Once this extra stage is added, fault tolerance is either established or increased. Additional stages can be added or the architecture can be converted to another switching network in a manner to avoid disruption of service as described below.

The following eight exemplars are products of eight embodiments of the augmentation method described above.

Figure 13A:
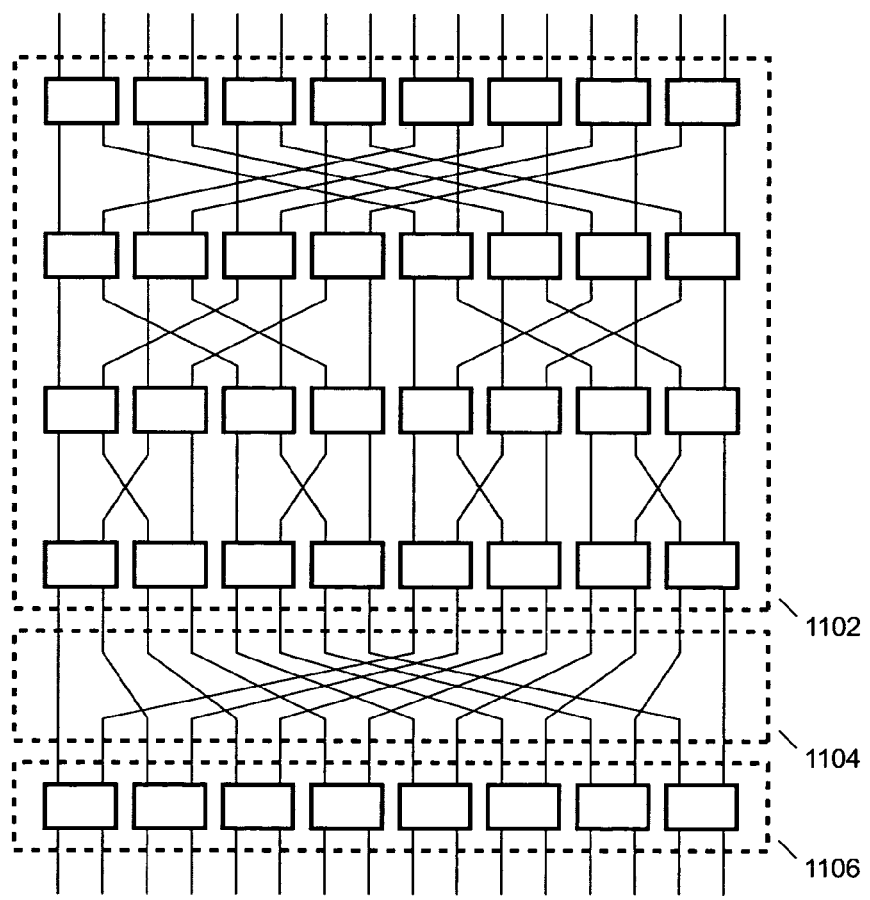
FIG. 13A shows a 32-port Banyan network augmented with an extra CGISIC network stage at the bottom of the network.
Figure 13B:
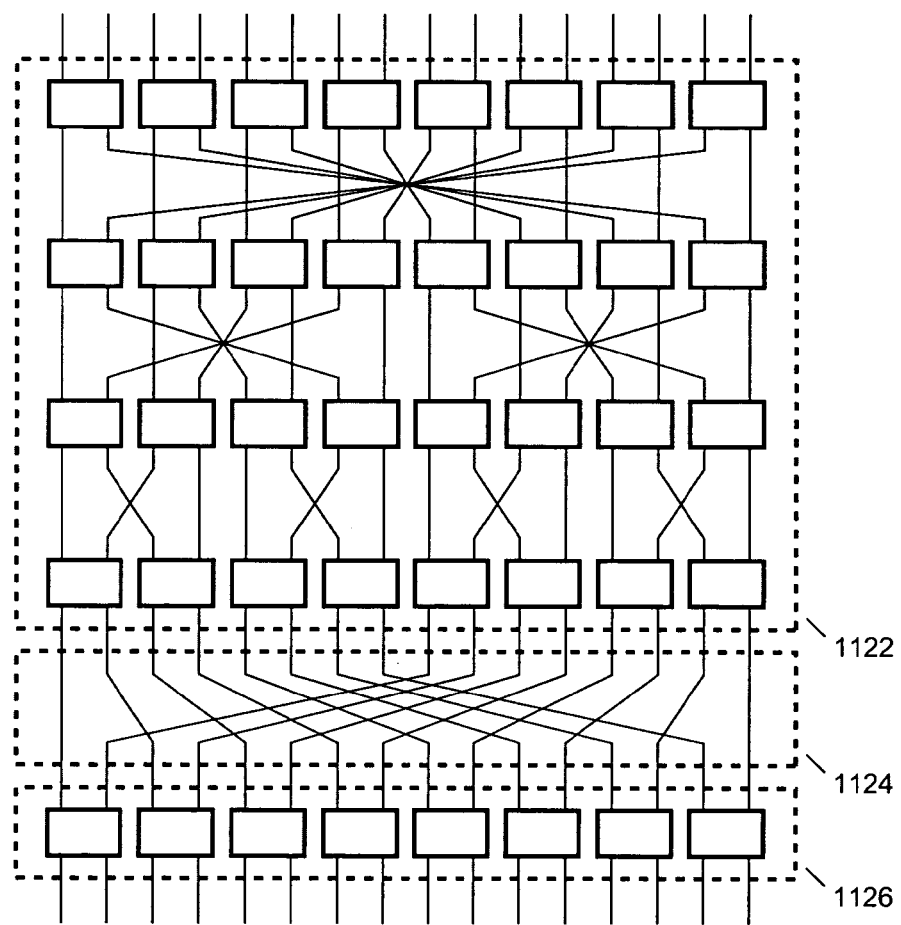
FIG. 13B shows a 32-port crossover network augmented with an extra CGISIC network stage at the bottom of the network.
Figure 13C:
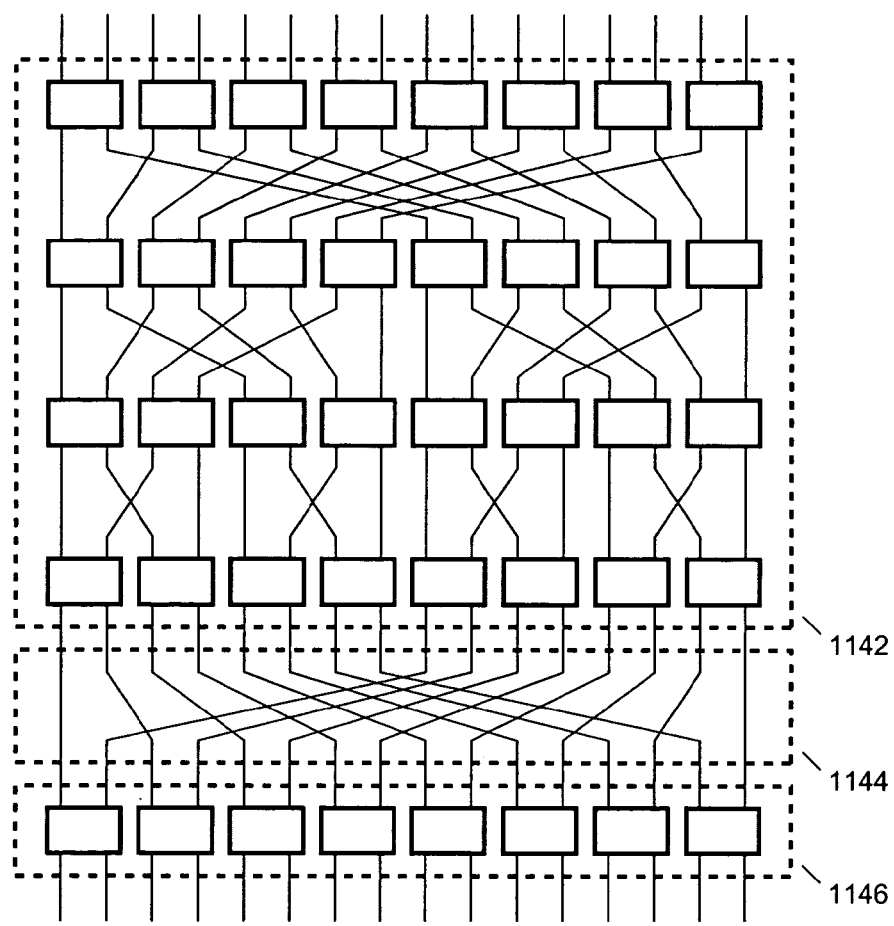
FIG. 13C shows a 32-port delta network augmented with an extra CGISIC network stage at the bottom of the network.
Figure 13D:
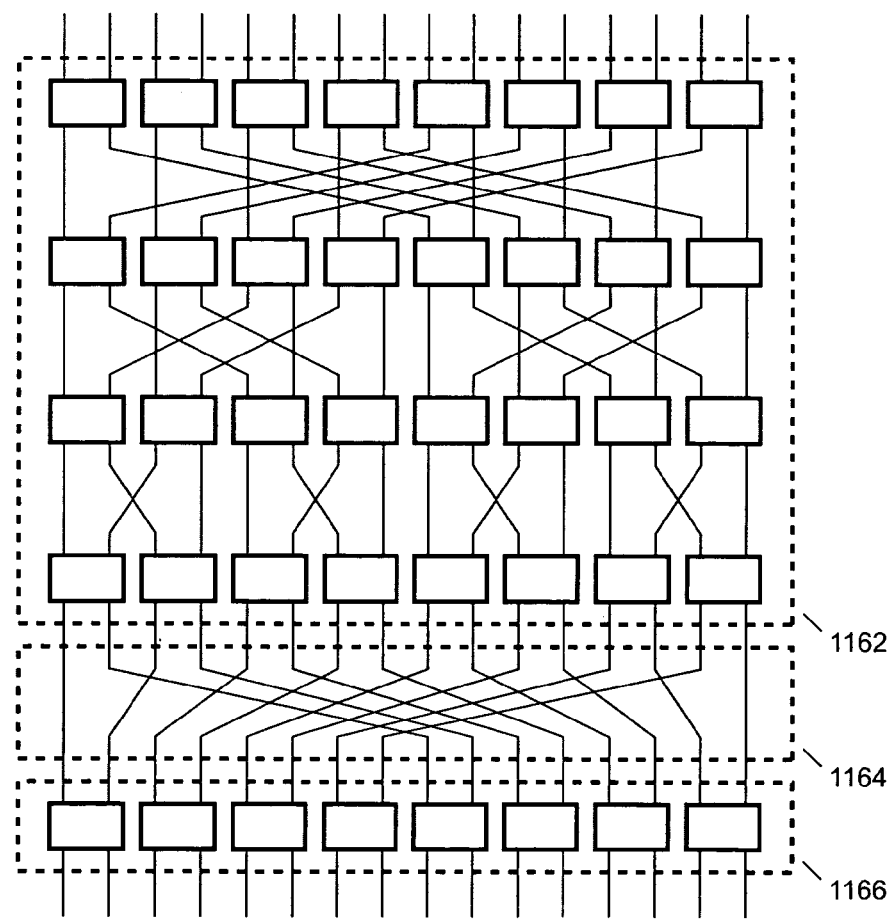
FIG. 13D shows a 32-port Banyan network augmented with an extra inverted CGISIC network stage at the bottom of the network.
Figure 13E:
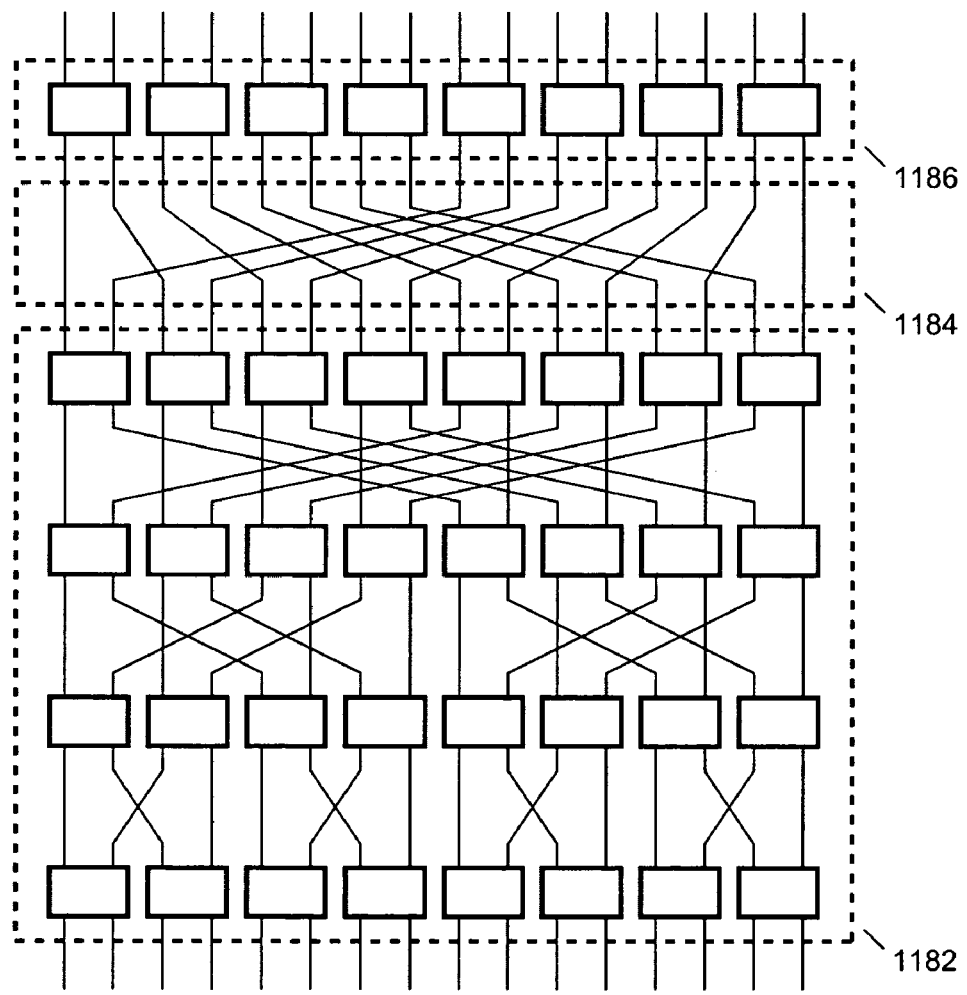
FIG. 13E shows a 32-port Banyan network augmented with an extra CGISIC network stage at the top of the network.
Figure 13F:
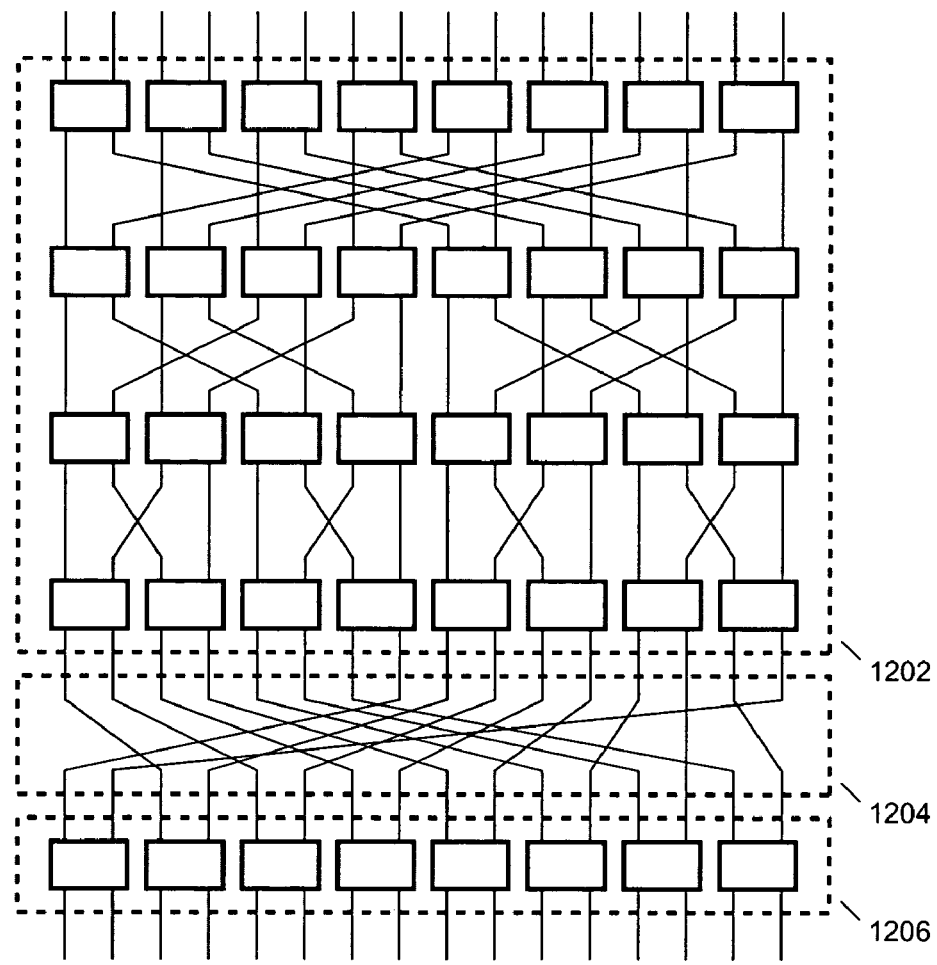
FIG. 13F shows a 32-port Banyan network augmented with an extra asymmetric CGISIC network stage at the bottom of the network.
Figure 13G:
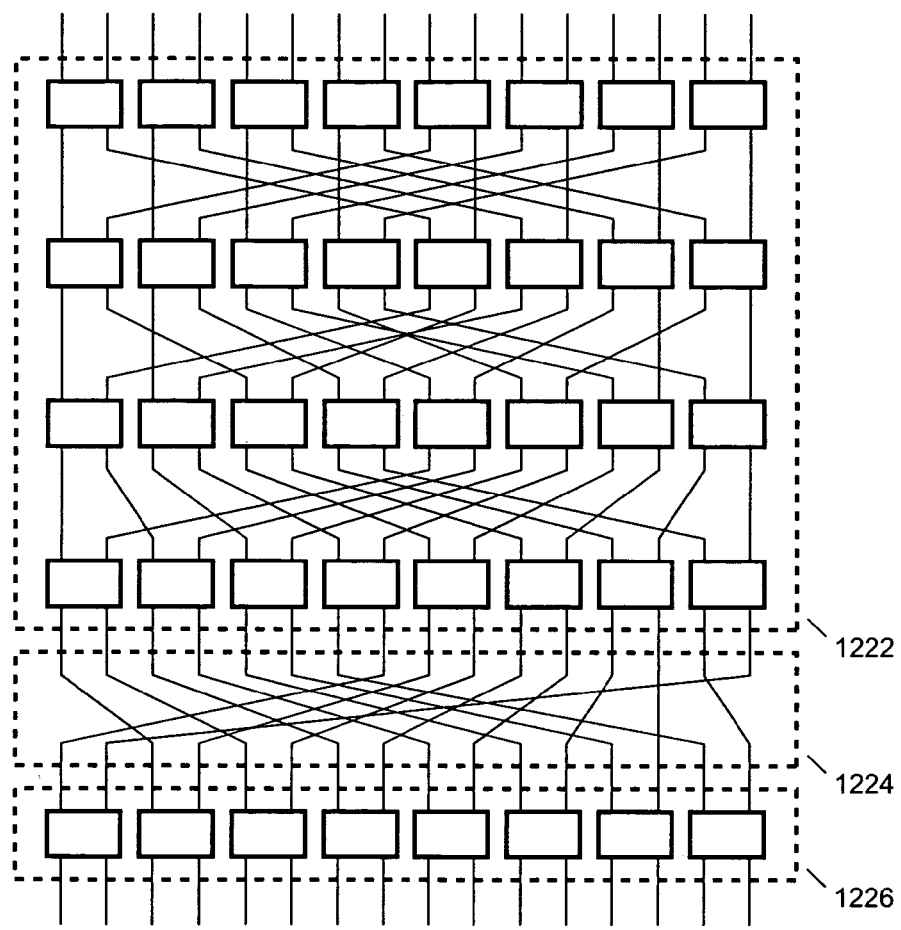
FIG. 13G shows a 32-port fast Fourier transform derived network augmented with an extra asymmetric CGISIC network stage at the bottom of the network.

The first example, depicted in FIG. 13A, shows a 32-port switching network comprising a Banyan network 1102, an extra stage 1104 and a CGISIC network 1106. The second example, depicted in FIG. 13B, shows a 32-port switching network comprising a crossover network 1122, an extra stage 1124 and a CGISIC network 1126. The third example, depicted in FIG. 13C, shows a 32-port switching network comprising a delta network 1142, an extra stage 1144 and a CGISIC network 1146. The fourth example, depicted in FIG. 13D, shows a 32-port switching network comprising a Banyan network 1162, an extra stage 1164 and an inverted (upside-down) CGISIC network 1166. It should be noted that the orientation of the ISIC network 1166 does not affect the positive properties of the hybrid architecture. The fifth example, depicted in FIG. 13E, shows a 32-port switching network comprising a Banyan network 1182, an extra stage 1184 and a CGISIC network 1186. This example differs from the example depicted in FIG. 13A in that the extra stage is attached to the top of the network rather than the bottom. It should be noted that whether the placement of the extra stage is at the top or bottom of the network does not affect the positive properties of the hybrid architecture. The sixth example, depicted in FIG. 13F shows a 32-port switching network comprising a Banyan network 1202, an extra stage 1204 and a CGISIC network 1206 generated from a variant of the standard group generator. This network differs from that of FIG. 13A in that the ISIC network 1206 utilizes a different generator than that of CGISIC network 1106. The seventh example depicted in FIG. 13G, shows a 32-port switching network comprising a BOP network 1222, an extra stage 1224 and a CGISIC network 1226 generated from a variant of the standard group generator. ISIC network 1226 uses the same generator as that of the ISIC network 1206.

Figure 1A:
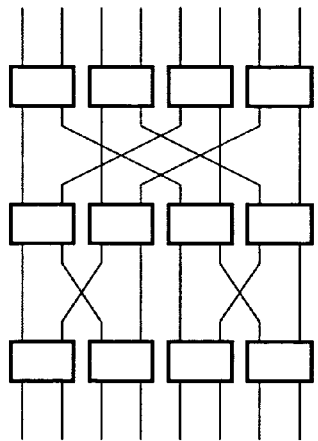
FIG. 1A shows a 16-port binary Banyan multistage switching network with three rows.
Figure 1B:
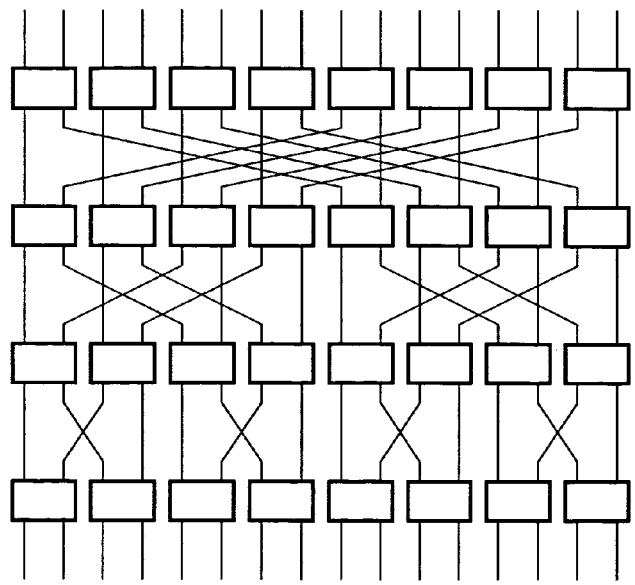
FIG. 1B shows a 32-port Banyan multistage switching network with three four rows.
Figure 1C:
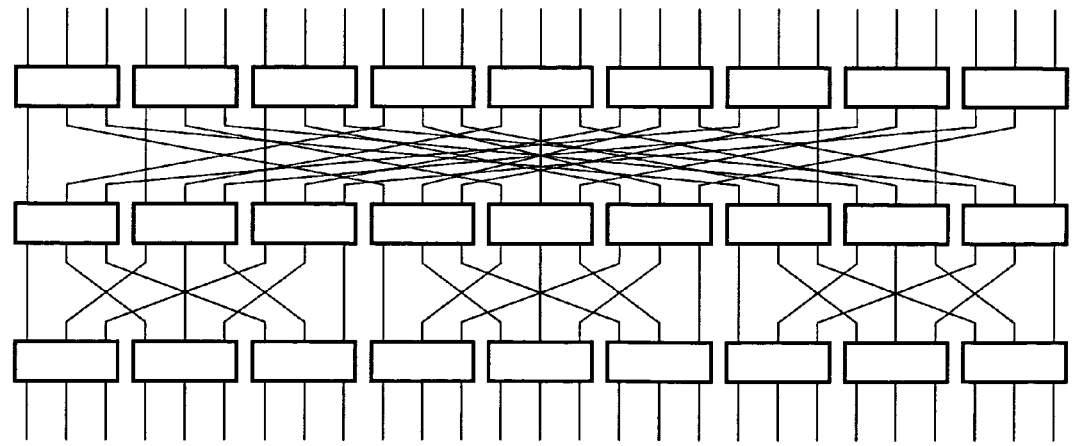
FIG. 1C shows a 54-port trinary Banyan multistage switching network with three rows.
Figure 1D:
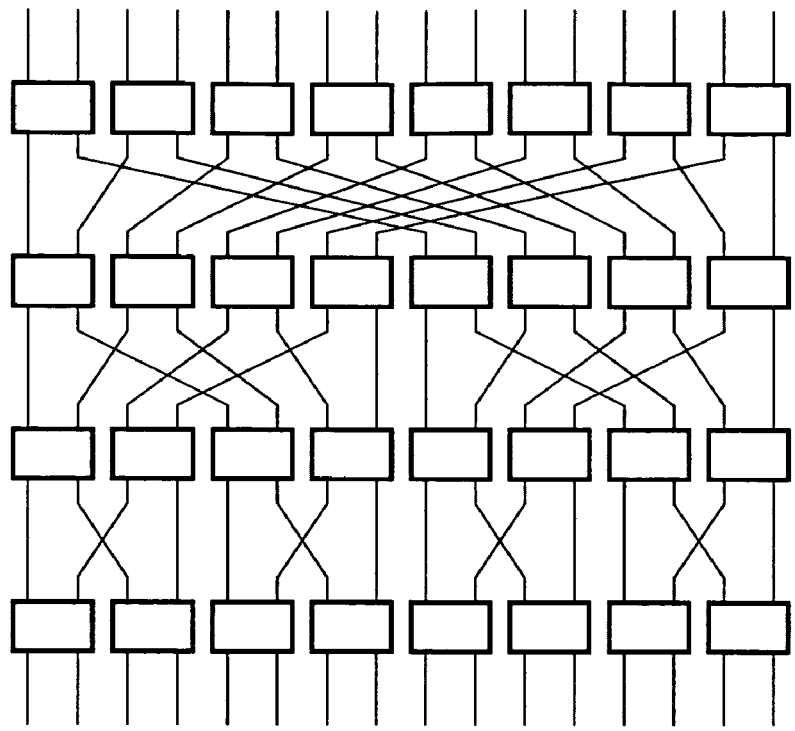
FIG. 1D shows a 32-port delta multistage switching network with three four rows.
Figure 1E:
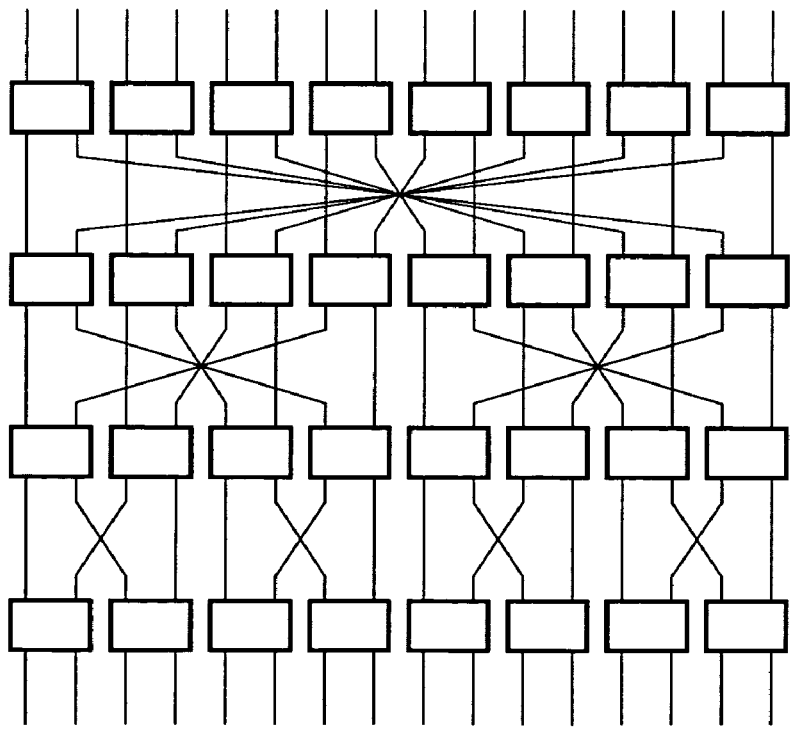
FIG. 1E shows a 32-port crossover multistage switching network with three four rows.
Figure 1F:
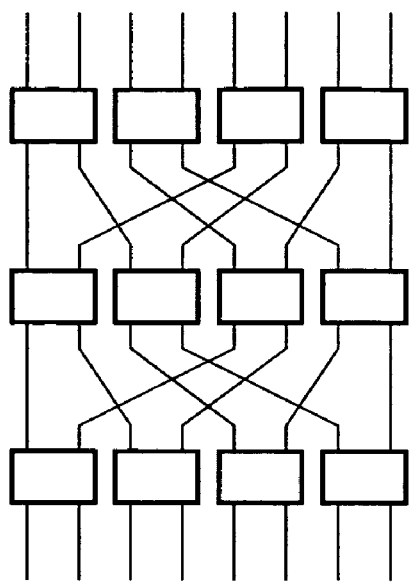
FIG. 1F shows a 32-port omega multistage switching network with three four rows.
Figure 1G:
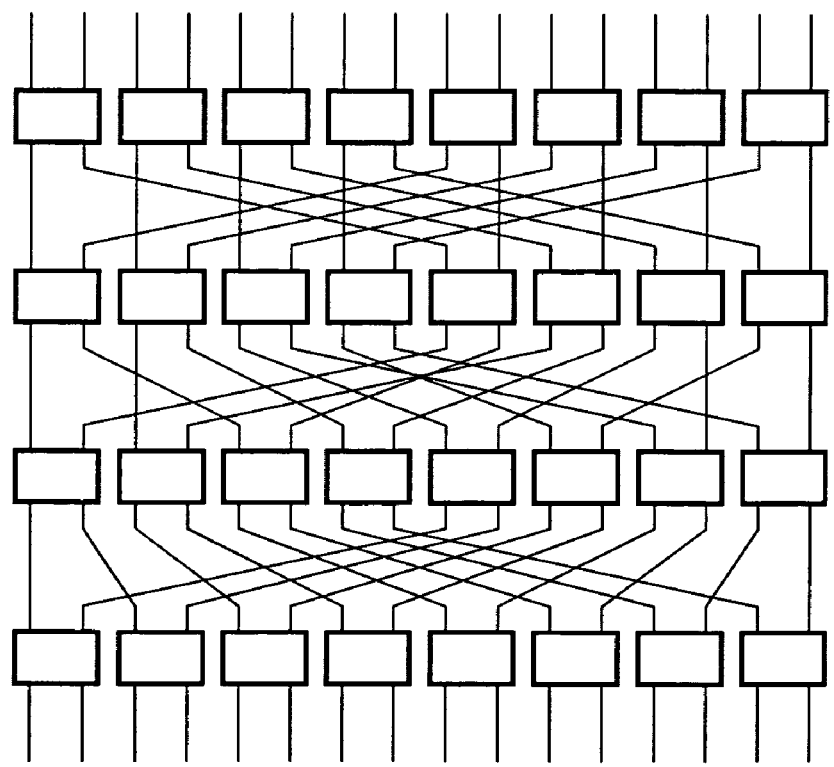
FIG. 1G shows a 32-port BOP multistage switching network with three four rows.
Figure 2A:
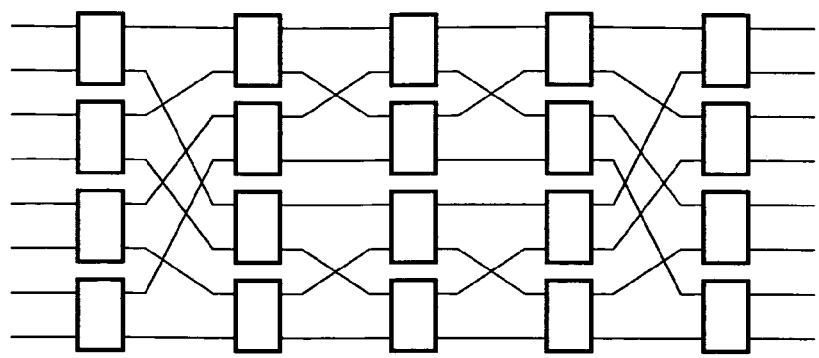
FIG. 2A shows a 16-port Benes network.
Figure 2B:
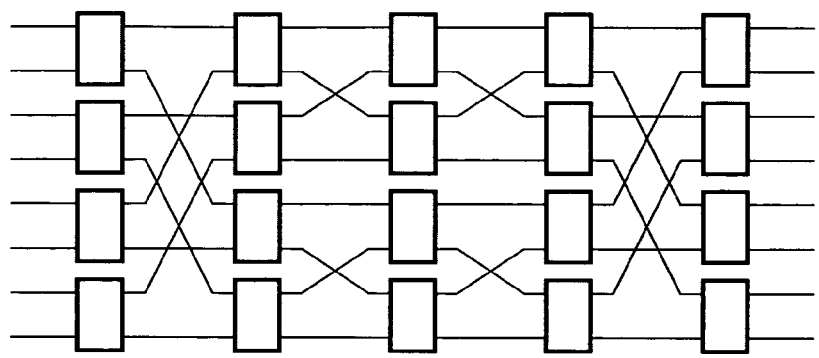
FIG. 2B shows a reconfigured 16-port Benes network that comprises two Banyan networks.
Figure 2C:
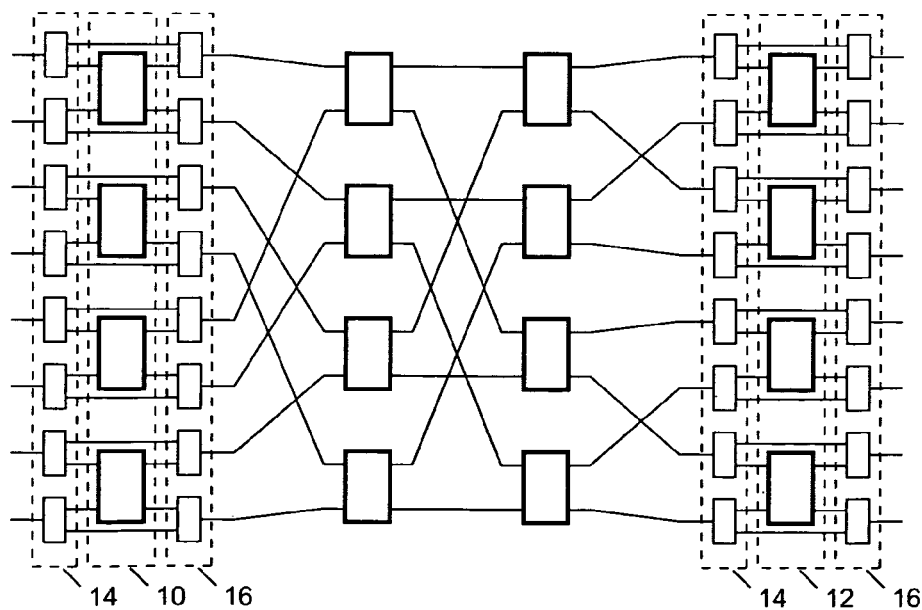
FIG. 2C shows an 16-port extra stage cube network.
Figure 2D:
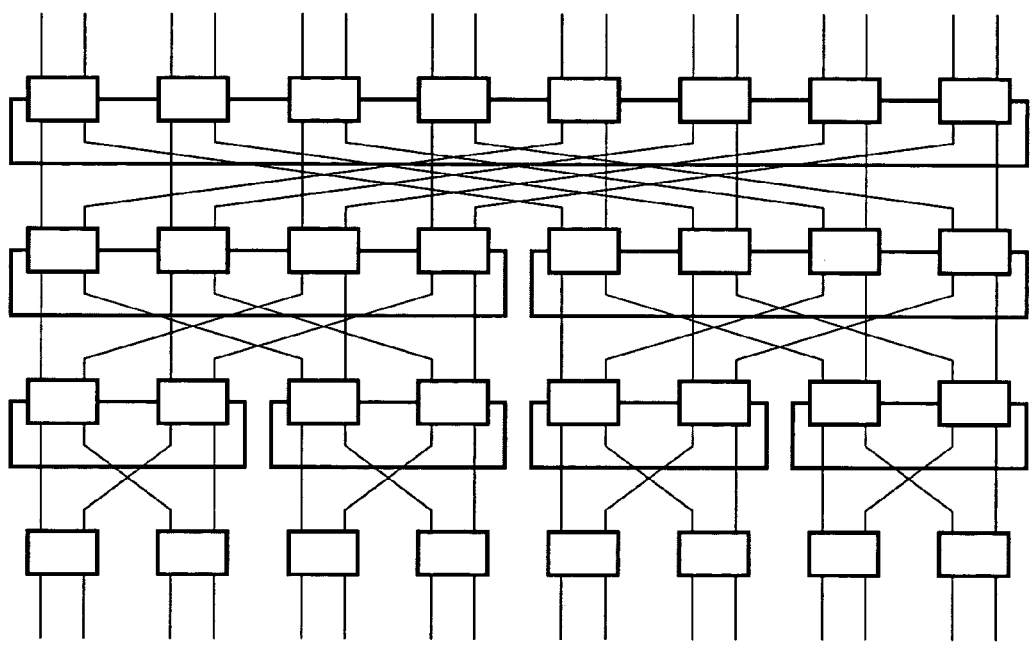
FIG. 2D shows a 32-port augmented shuffle-exchange network.
Figure 3A:
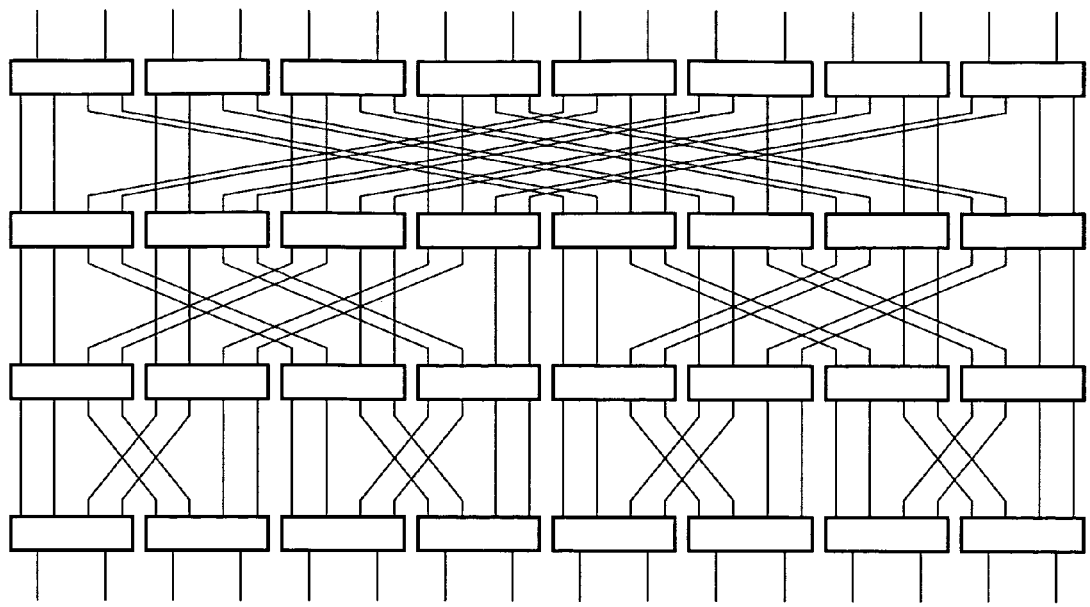
FIG. 3A shows a dilated Banyan network.
Figure 3B:
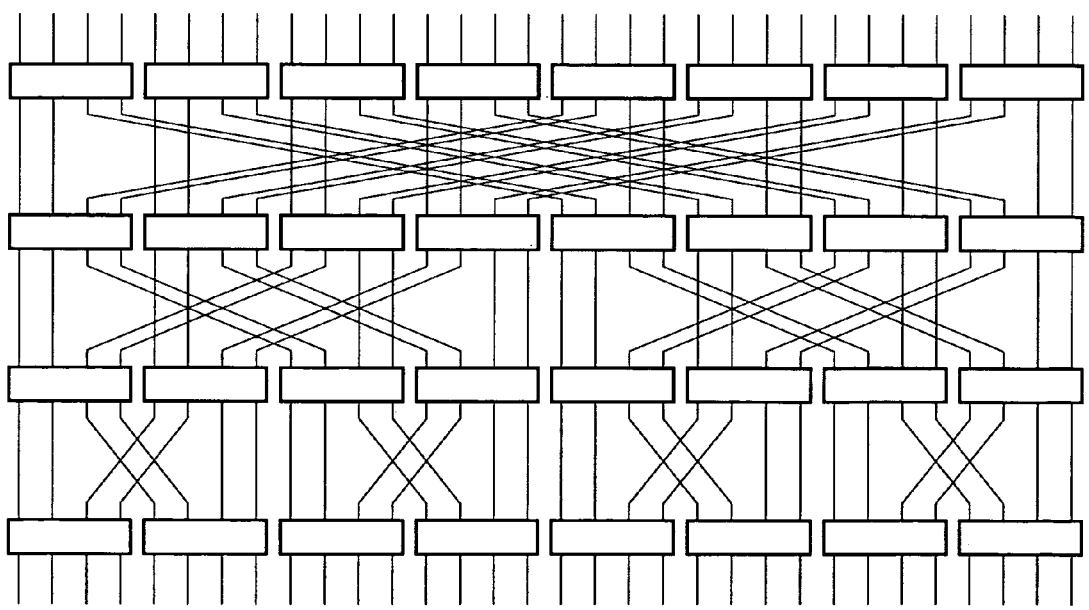
FIG. 3B shows a dilated Banyan network with 32 external ports added.
Figure 4A:
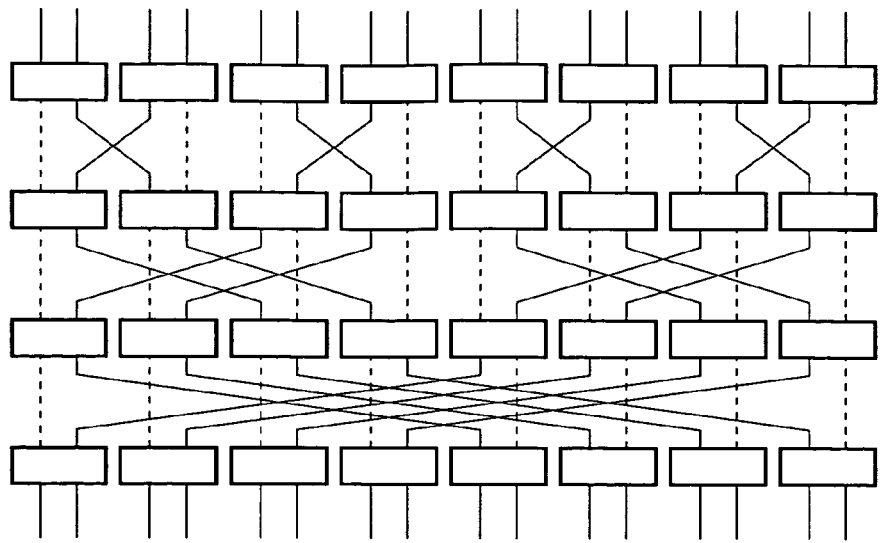
FIG. 4A shows an inverted 32-port Banyan network.
Figure 4B:
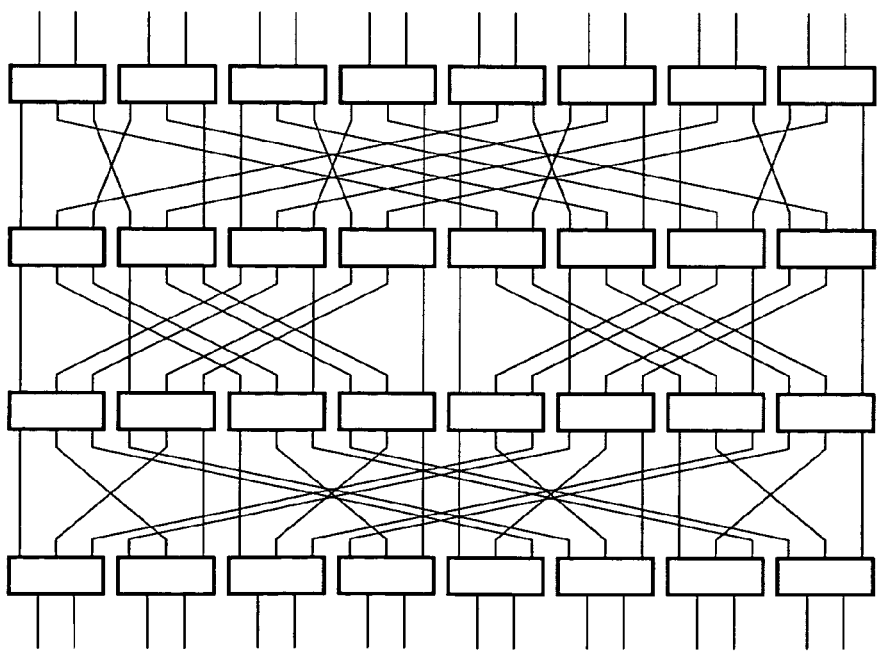
FIG. 4B shows a Banyan network overlaid on an inverted Banyan network.
Figure 13H:
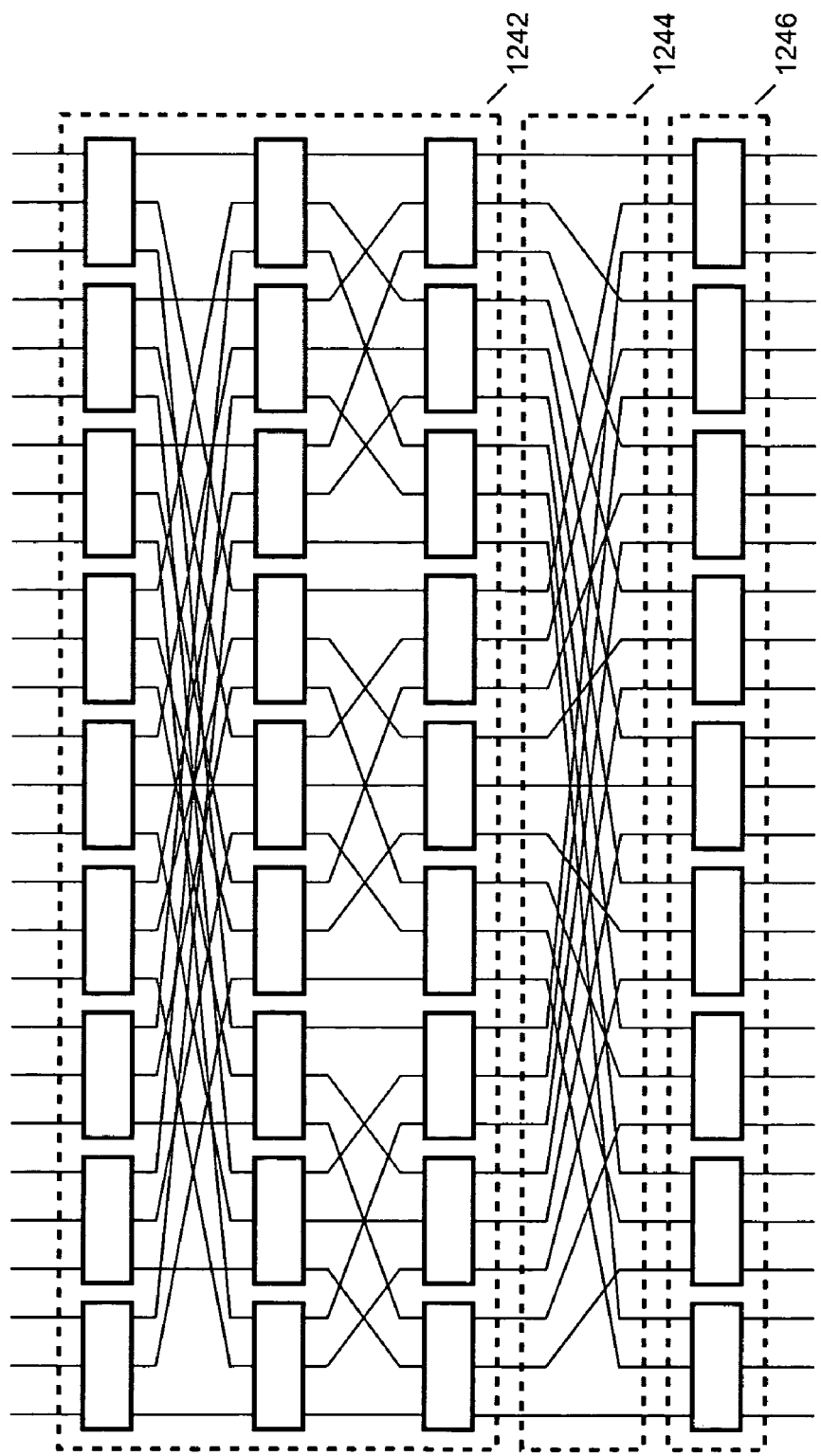
FIG. 13H shows a 54-port trinary Banyan network augmented with an extra trinary CGISIC network stage at the bottom of the network.

Finally, the eighth example depicted in FIG. 13H, shows a 54-port switching network comprising a trinary Banyan network 1242 like the one shown in FIG. 1C, an extra stage 1244 and a CGISIC network 1246 designed for switching elements of fanout of three.

An extra stage augmentation of fixed radix switching networks yields networks whose width is constrained to a power of the radix which typically is the fanout of each switching element. For example, FIGS. 13A-13G still have a width which is a power of two, although, they are no longer confined to a height which is radix-based logarithm of the width (i.e. $\log_F W$). Additional methods to augment many of the traditional multistage switching network architectures are given in the forthcoming examples.

Figure 14A:
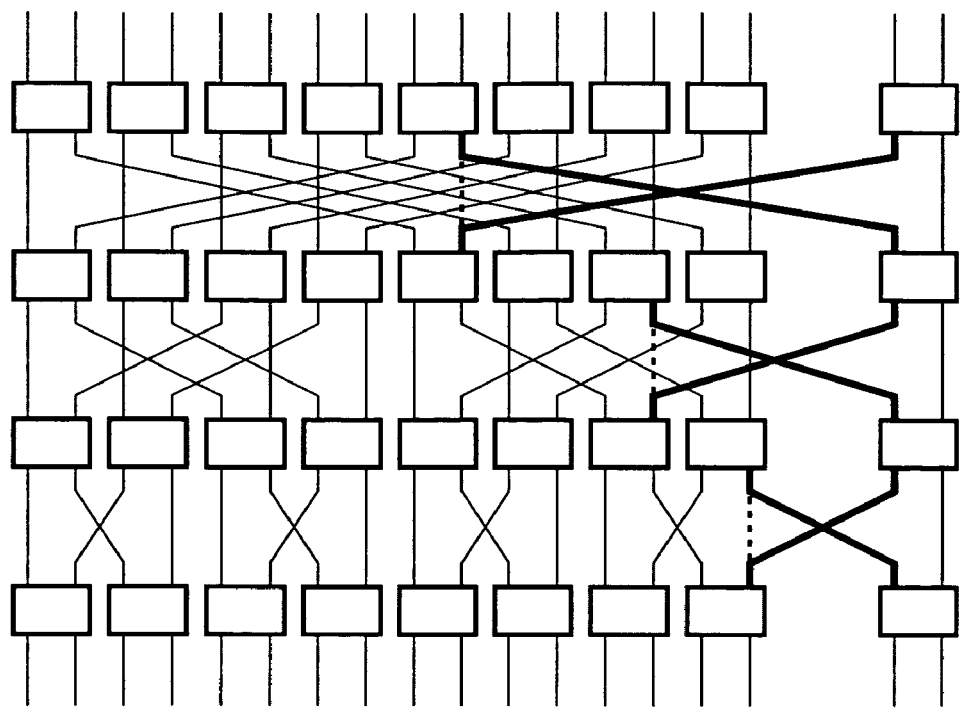
FIG. 14A and FIG. 14B shows an augmentation to the traditional Banyan network by addition of a single column.
Figure 14B:
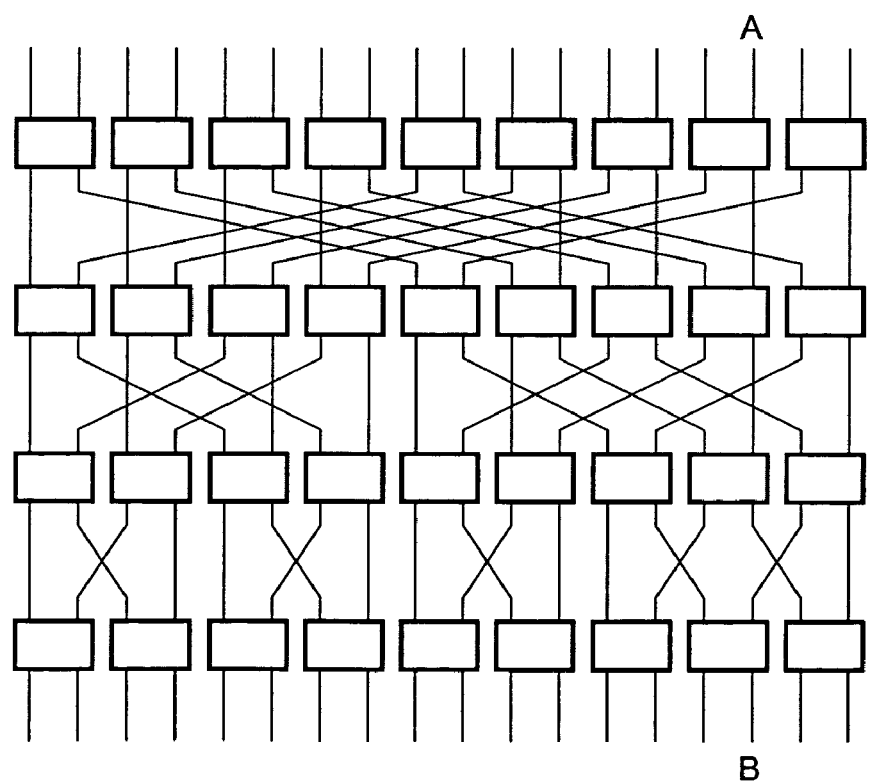

FIG. 14A shows a creation of a 36-port architecture from a standard 32-port Banyan network. The 8th column is duplicated into a 9th column adjacent to the original Banyan network. The new connections shown in bold can be connected to the original Banyan network. The dotted lines indicate connections that broken to accommodate the new connections. The result of this "last column" duplication is shown in FIG. 14B. It stands to reason that since the original Banyan network is functionally connected, the addition of an extra column would leave some inputs unable to communicate to some outputs. For example, there is no path between external port A to external port B.

Figure 14C:
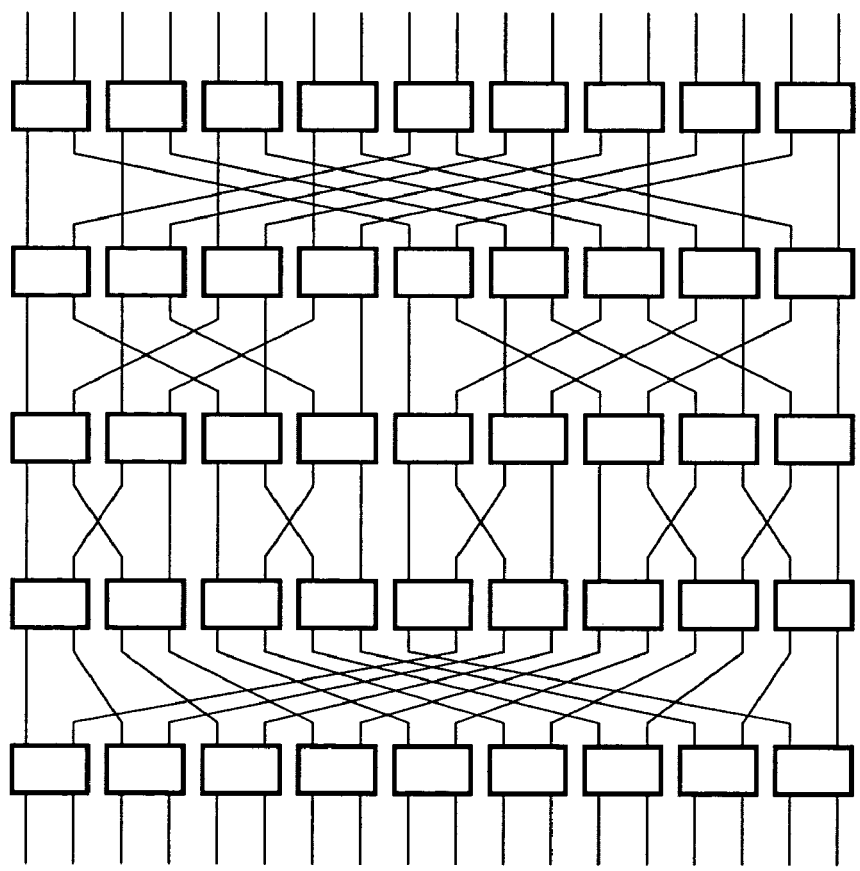
FIG. 14C shows the same augmented Banyan further augmented with an extra inverted CGISIC network stage at the bottom of the network.

The augmentation of the network in FIG. 14B, with an extra stage connected by a CGISIC network shown in FIG. 14C not only reestablishes functionally connectivity between external ports, but also introduces some redundant paths between some external ports.

Another method to vary a Banyan network is to adjust the "stride" of the stages. In a traditional 32-port Banyan network, in the topmost ISIC network, one connection per switching element strides to the 4th switching elements in the following stage. In the second topmost ISIC network the stride is two. In the bottommost ISIC network, the stride is one. Normally, the stride is a power of the fanout.

Figure 14E:
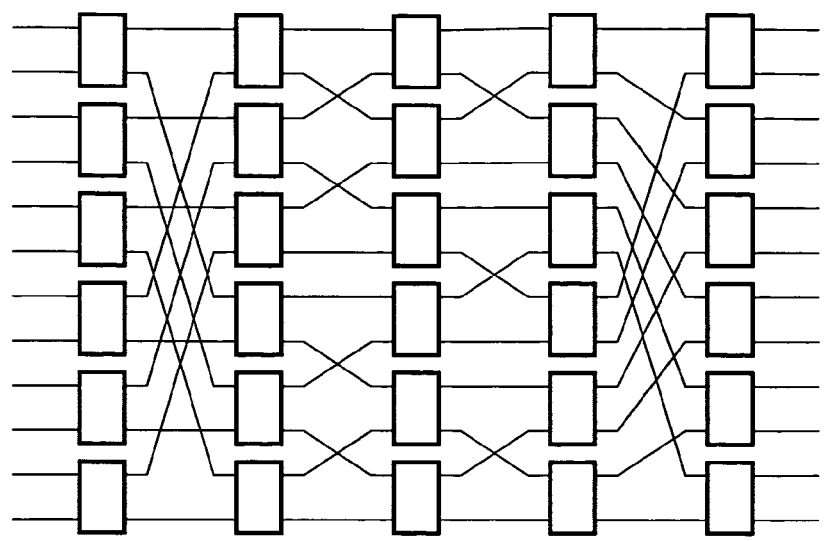
FIG. 14E shows the altered Banyan network further augmented with an extra inverted CGISIC network stage at the bottom of the network.
Figure 14D:
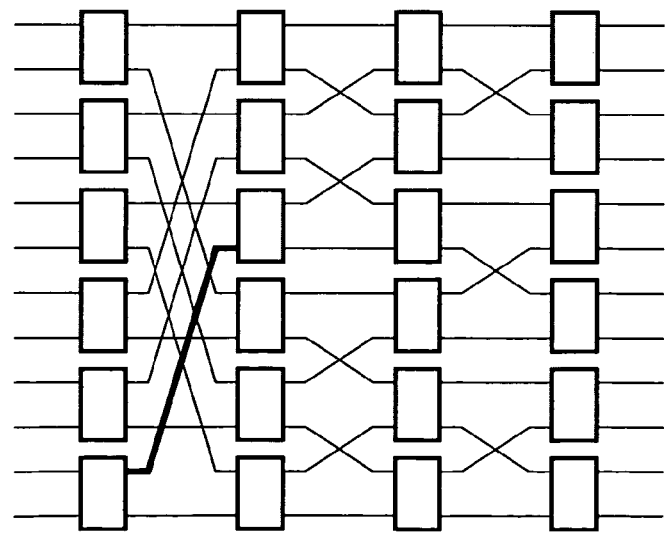
FIG. 14D shows an altered Banyan network where a non-traditional. "stride" value is used.

FIG. 14D shows a non-traditional stride length in the topmost ISIC network. The bold connection shows an example of a connection with a stride of three. The second ISIC is augmented by the same kind of "column" augmentation shown in FIG. 14A. The resultant network is a load balanced functionally connected switching network with some fault tolerance. FIG. 14E shows the network of FIG. 14D augmented by an extra stage connected with a CGISIC network, which bolsters the fault tolerance and permits the network to be further upgraded without disruption of service.

Figure 15A:
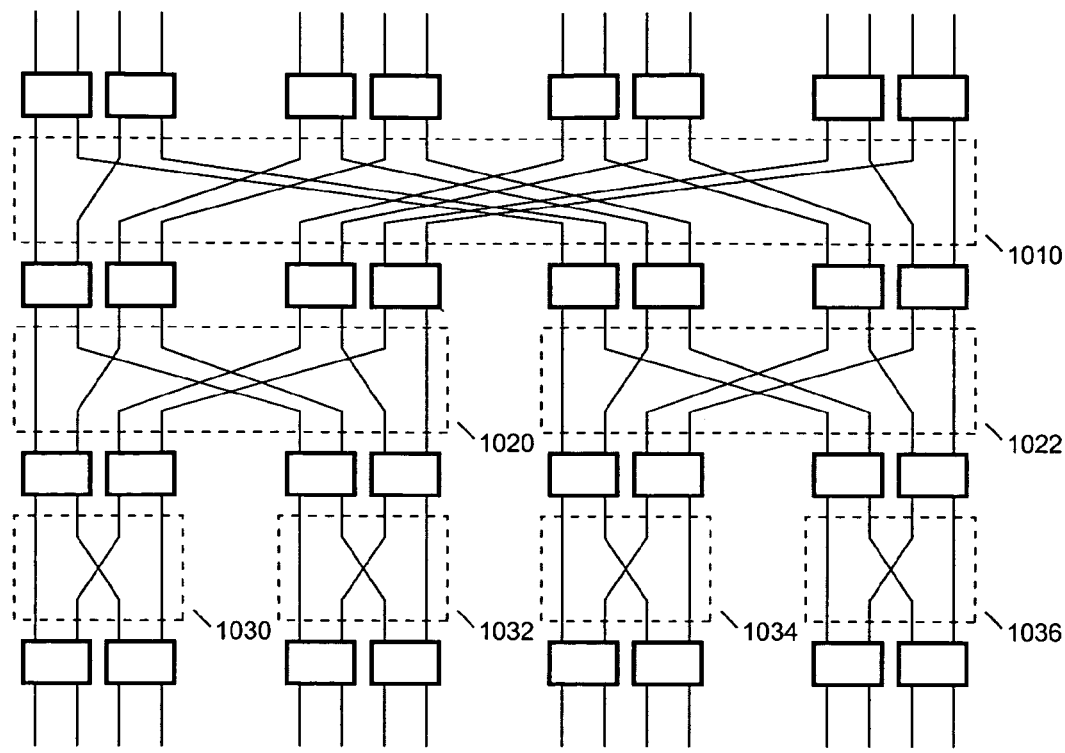
FIG. 15A shows a 32-port delta network.

FIG. 15A shows a delta network. It should be noted that in the delta network, the ISIC networks comprise inverted CGISIC networks. ISIC network 1010 is identical to an inverted CGISIC. ISIC networks 1020 and 1022 are identical to an inverted CGISIC network of a switching network of width 4. ISIC networks 1030, 1032, 1034, and 1036 are identical to an inverted CGISIC network of a switching network of width 2. One method of altering the delta network is to either reduce or increase the width, and to substitute an inverted CQISIC network of the appropriate width to compensate for the change in width.

Figure 15B:
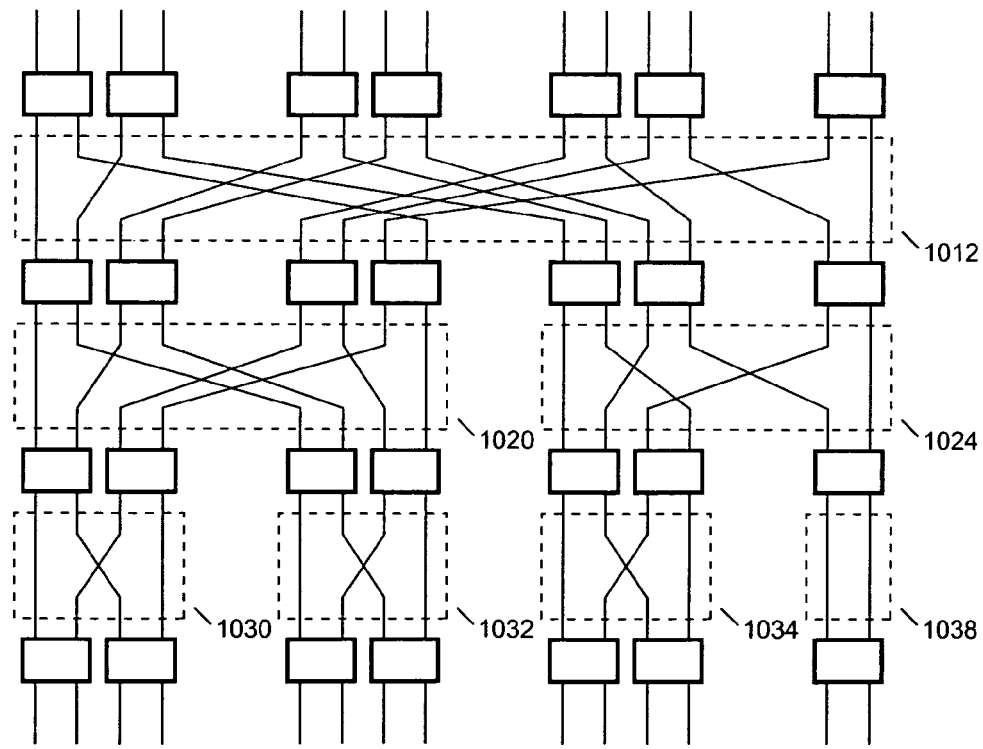
FIG. 15B shows a delta network modified to 28-ports.

For example, FIG. 15B is a modified delta network of width 7. ISIC network 1010 of FIG. 15A is replaced by an inverted CGISIC network 1012 of width 7. ISIC network 1022 of FIG. 15A is replaced by an inverted CGISIC network 1024 of width 3. ISIC network 1036 of FIG. 15A is replaced by an inverted CGISIC network 1038 of width 1.

Figure 15C:
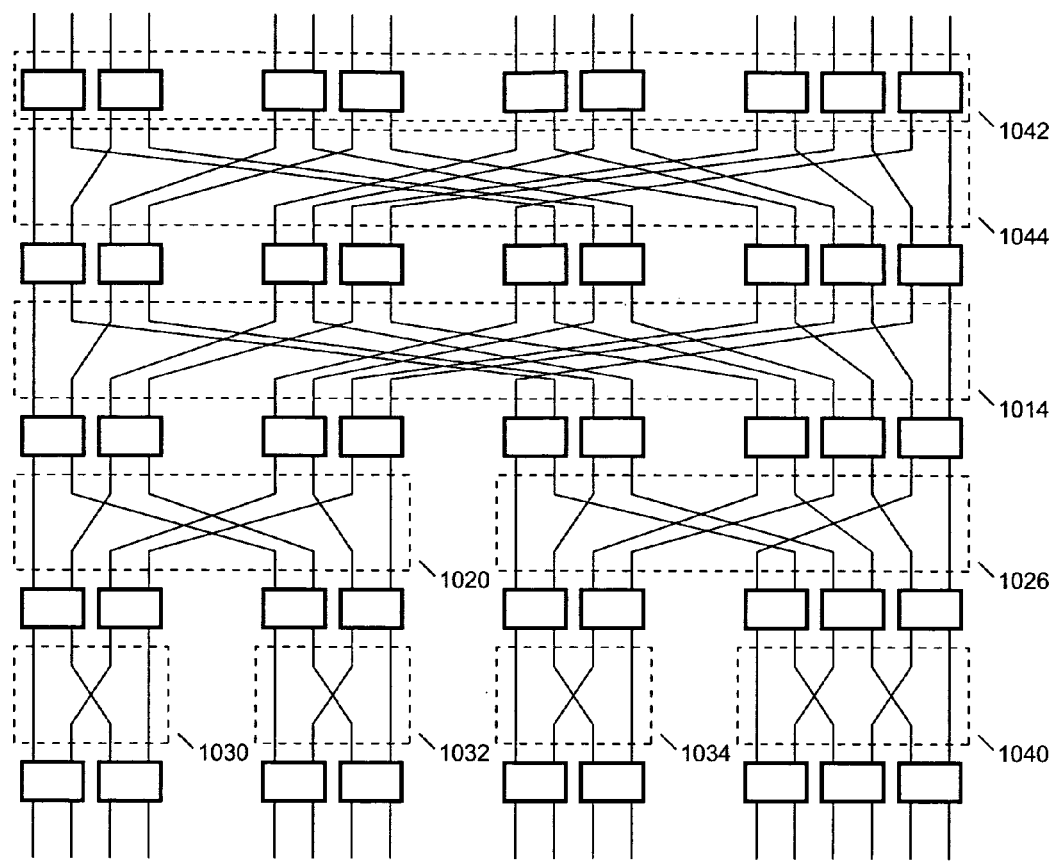
FIG. 15C shows a delta network modified to 36-ports comprising an extra CGISIC network stage.

FIG. 15C is a delta network modified to an increased width of 9. ISIC network 1010 of FIG. 15A is replaced by an inverted CGISIC network 1014 of width 9. ISIC network 1022 of FIG. 15A is replaced by an inverted CGISIC network 1026 of width 5. ISIC network 1036 of FIG. 15A is replaced by an inverted CGISIC network 1040 of width 3. Since the extension of the width would yield a network no longer functionally connected, an extra stage 1042 is added along with another inverted CGISIC network 1044 of width 9.

Unlike the hybrid architectures described above, the method of Cartesian product of switching networks is a design technique and is not intended to be used to alter preexisting network architectures, but rather to take one or more networks and their ISIC networks as a template for a more elaborate switching network design.

In one embodiment of the design method, more than one RBCCG networks are used as templates. According to Huang in U.S. Pat. No. 5,841,775, the ISIC networks are derived from various possible cyclic groups. Let $G_1$ be such a cyclic group used to generate ISIC networks for an RBCCG with width $W_1$, height H and fanout $F_1$ (henceforth notated as a $W_1 \times H \times F_1$ RBCCG network) and $G_2$ be such a cyclic group used to generate ISIC networks for an RBCCG with width $W_2$, height H and fanout $F_2$. Then the interconnections are given by the group action generated by the Cartesian product $G_1 \times G_2$ of the two groups. This can explicitly be designated mathematically as follows: If $p_1$ represents a port of the $W_1 \times H \times F_1$ RBCCG network, and $G_1$ is the cyclic group action, then $p_1$ is connected to $\pi_{G_1}(p_1)$, where $\pi_{G_1}$ denotes the interconnection mapping defined by the group $G_1$. Similarly, if $p_2$ represents a port of the $W_2 \times H \times F_2$ RBCCG network, and $G_2$ is the cyclic group action, then $p_2$ is connected to $\pi_{G_2}(p_2)$. The new connection mapping is defined for the two-dimensional extension as $\pi_{G_1 \times G_2}:(p_1,p_2) \rightarrow (\pi_{G_1}(p_1), \pi_{G_2}(p_2))$, where the port labeling is given by the ordered pair $(p_1, p_2)$.

Figure 16A:
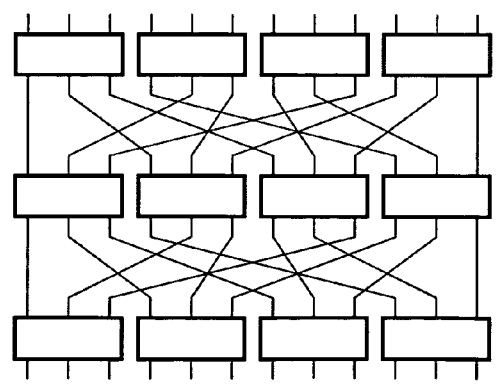
FIG. 16A and FIG. 16B show a 24-port RBBCG network and a 12-port RBCCG network, respectively with per switching element fan-outs of 3 and 2 respectively.
Figure 16B:
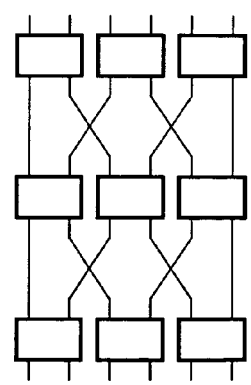

In an exemplary embodiment of multidimensional extensions of an RBCCG network, two balanced RBCCG networks depicted in FIG. 16A and FIG. 16B serve as templates. The balanced RBCCG network depicted in FIG. 16A has a fanout of 3 and a width of 4, which serves as the template in the $x_1$ direction, while the balanced RBCCG network depicted in FIG. 16B has a fanout of 2 and a width of 3, and servers as the template in the $x_2$ direction. Together they are used to constructed a two-dimensional RBCCG network with H=3, $W_1$=4, $F_1$=3, $W_2$=3, and $F_2$=3. In this example, the group generators are selected as such to generate a symmetric shuffle. FIG. 17A shows numerically the port mapping ($\pi_{G_1}$) from the bottom ports of one stage of switching elements to the top ports of the next stage of switching elements corresponding to the ISIC networks shown in FIG. 16A. For instance, as a result of the mapping, bottom port 7 should be connected to top port 10, bottom port 2 should be connected to top port 6, etc. Similarly FIG. 17B shows numerically the port mapping ($\pi_{G_2}$) from the bottom ports of one stage of switching elements to the top ports of the next stage of switching elements corresponding to the ISIC networks shown in FIG. 16B. The composite mapping ($\pi_{G_1 \times G_2}$) is shown in FIG. 17C. It should be noted that since the ISIC networks of both switching networks in FIG. 16A and FIG. 16B are identical between adjacent stages, the resultant Cartesian product network has identical ISIC networks between adjacent stages.

Furthermore, it should be noted that each component of the ordered pair is mapped independently. For example, according to FIG. 17A, bottom port 7 should map to top port 10 of the subsequent stage. Clearly, according to FIG. 17C, bottom port (7,*) maps to top port (10,) of the subsequent stage, regardless of the value of the second component of the ordered pair. Additionally, the second component need not be the same and in fact is mapped according to the mapping defined in FIG. 17B. For example, according to FIG. 17B, bottom port 3 should map to top port 1 of the following row. Clearly, according to FIG. 17C**, bottom port (*,3) maps to top port (,1**) of the following plane regardless of the value of the first component of the ordered pair.

FIGS. 18A-18G are intended to illustrate a three-dimensional rendering of the resultant network. Each subfigure represents a different perspective on the Cartesian product of the two RBCCG networks. Though the details can be difficult to discern from some of the detailed diagrams, the overall description of the resultant network should be clear to one of ordinary skill in the art through the perspective of all the subfigures.

Figure 18A:
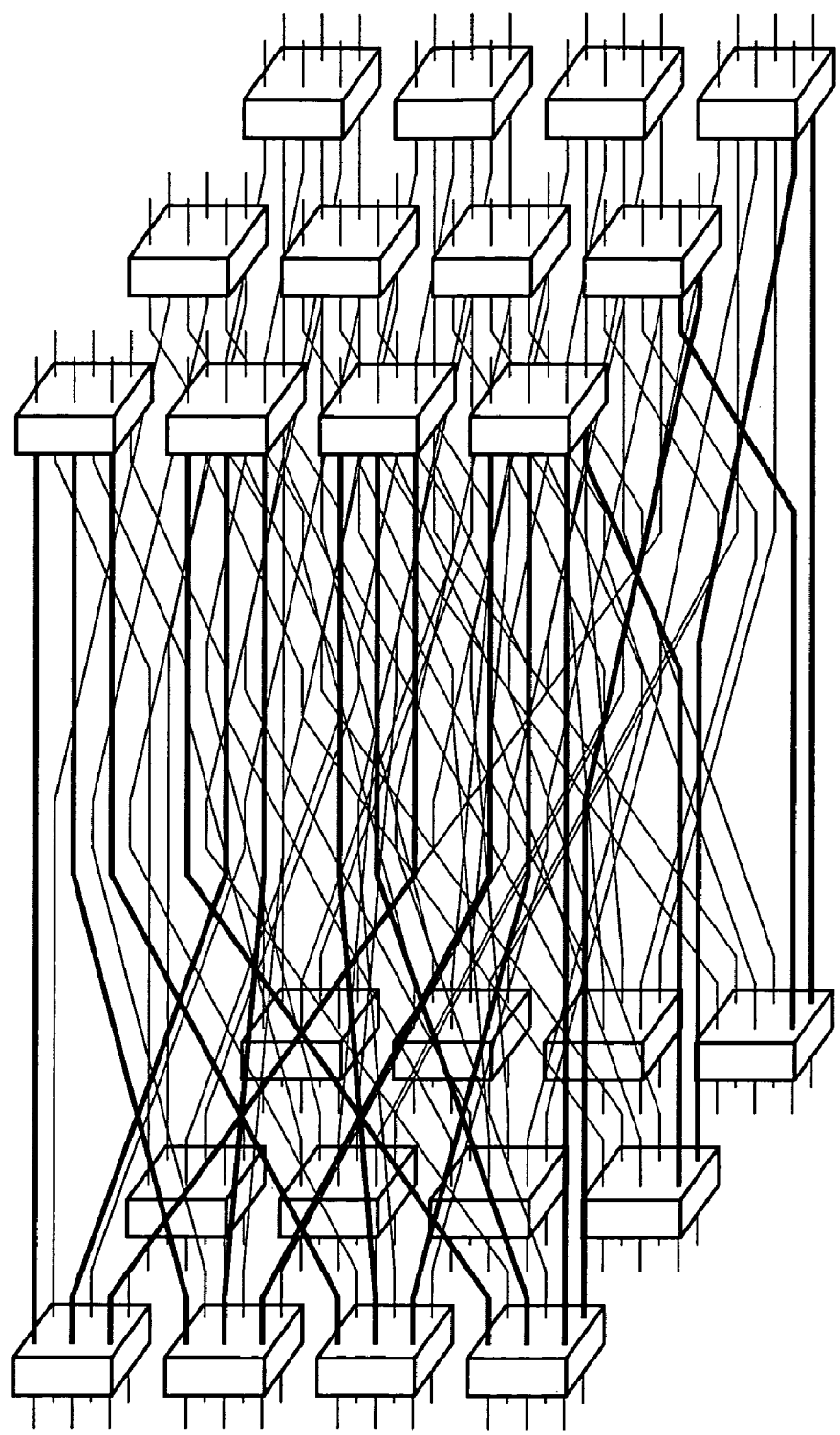
FIG. 18A shows one interconnection network from the Cartesian product RBCCG network with the $x_1$ interconnection separated from the $x_2$ interconnections in two stages.
Figure 18B:
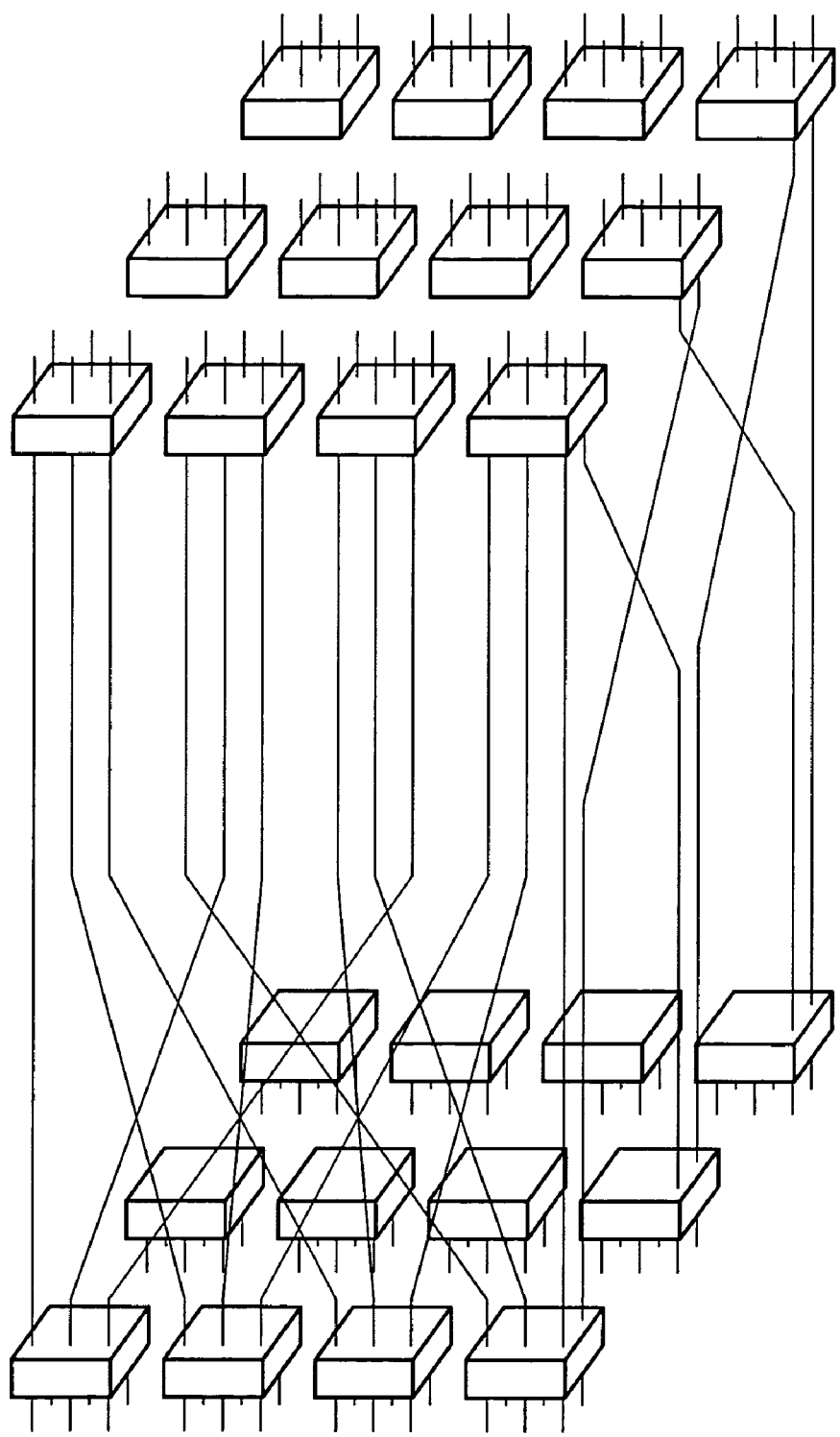
FIG. 18B shows the same interconnection network from the Cartesian product RBCCG network with only the near connections visible.
Figure 18C:
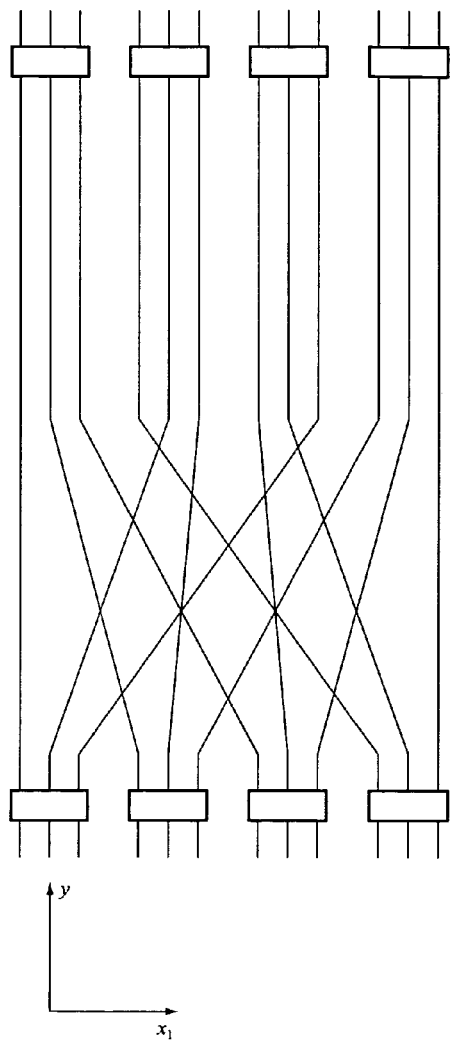
FIG. 18C and FIG. 18D shows the cross sectional view of the same interconnection network from the Cartesian product RBCCG network, with respect to the $x_1$-y plane and the $x_2$-y plane respectively.
Figure 18D:
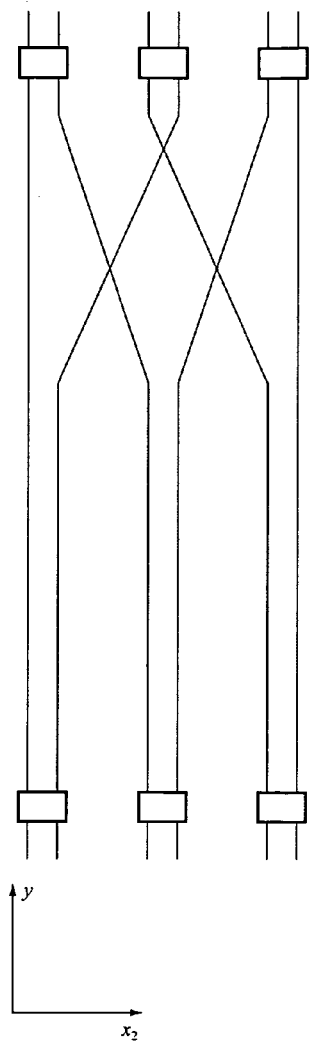
Figure 18E:
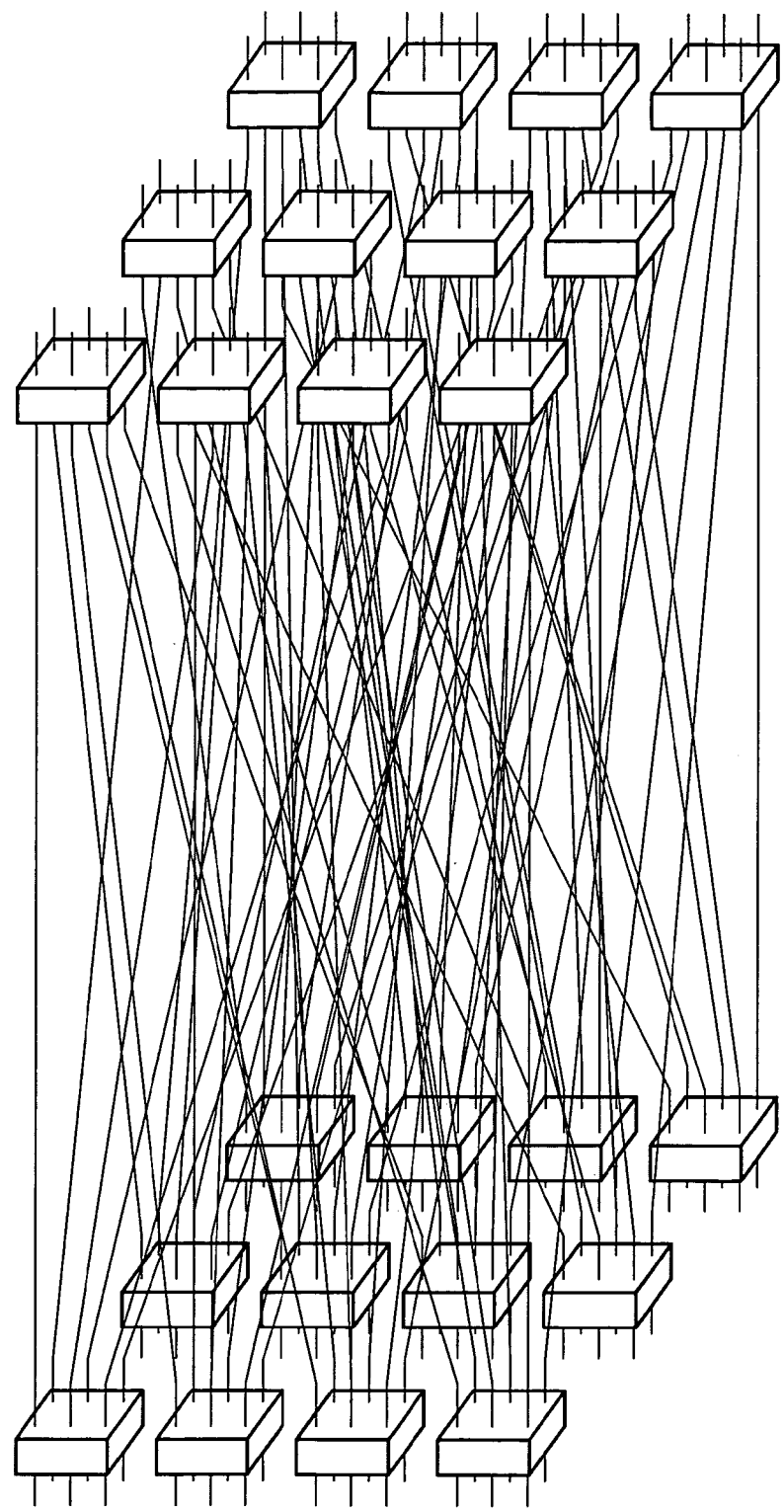
FIG. 18E shows one interconnection network from the Cartesian product RBCCG network, without separating the orthogonal mappings.
Figure 18F:
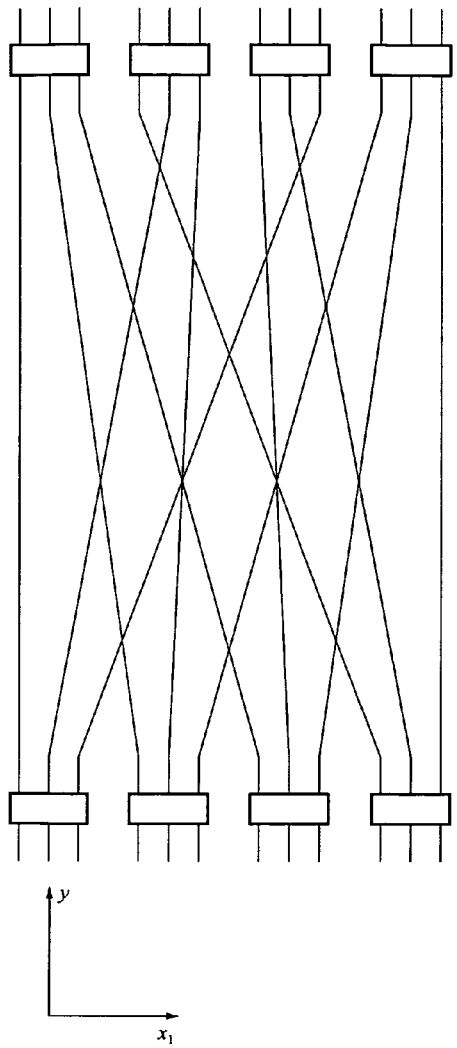
FIG. 18F and FIG. 18G shows the cross sectional view of the same interconnection network from the Cartesian product RBCCG network, with respect to the $x_1$-y plane and the $x_2$-y plane respectively.
Figure 18G:
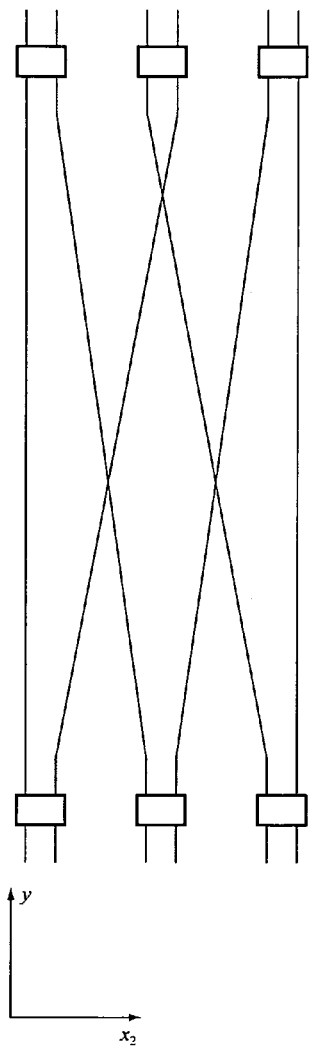
Figure 19:
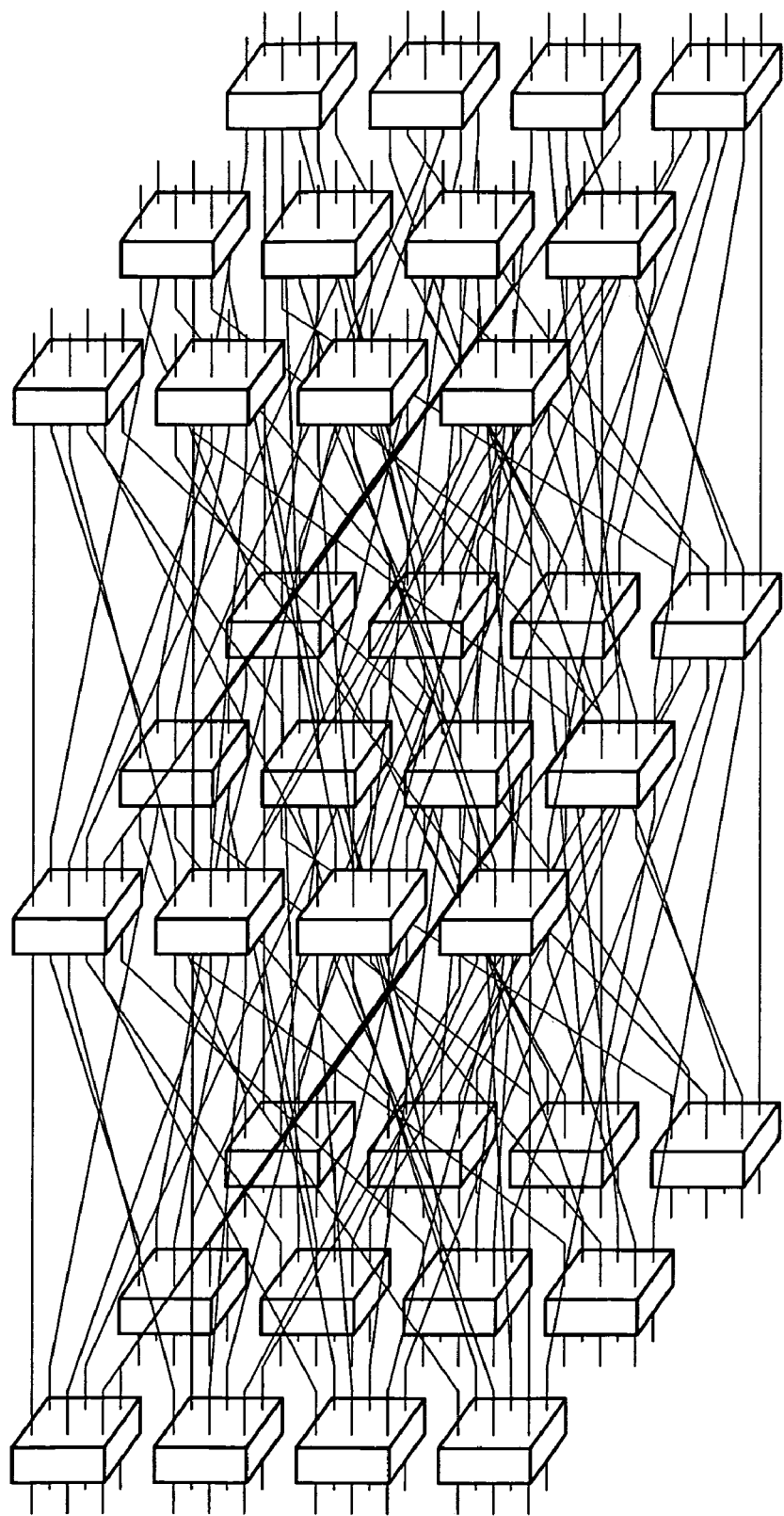
FIG. 19 shows the complete 144-port two-dimensional Cartesian product RBCCG network.
Figure 20A:
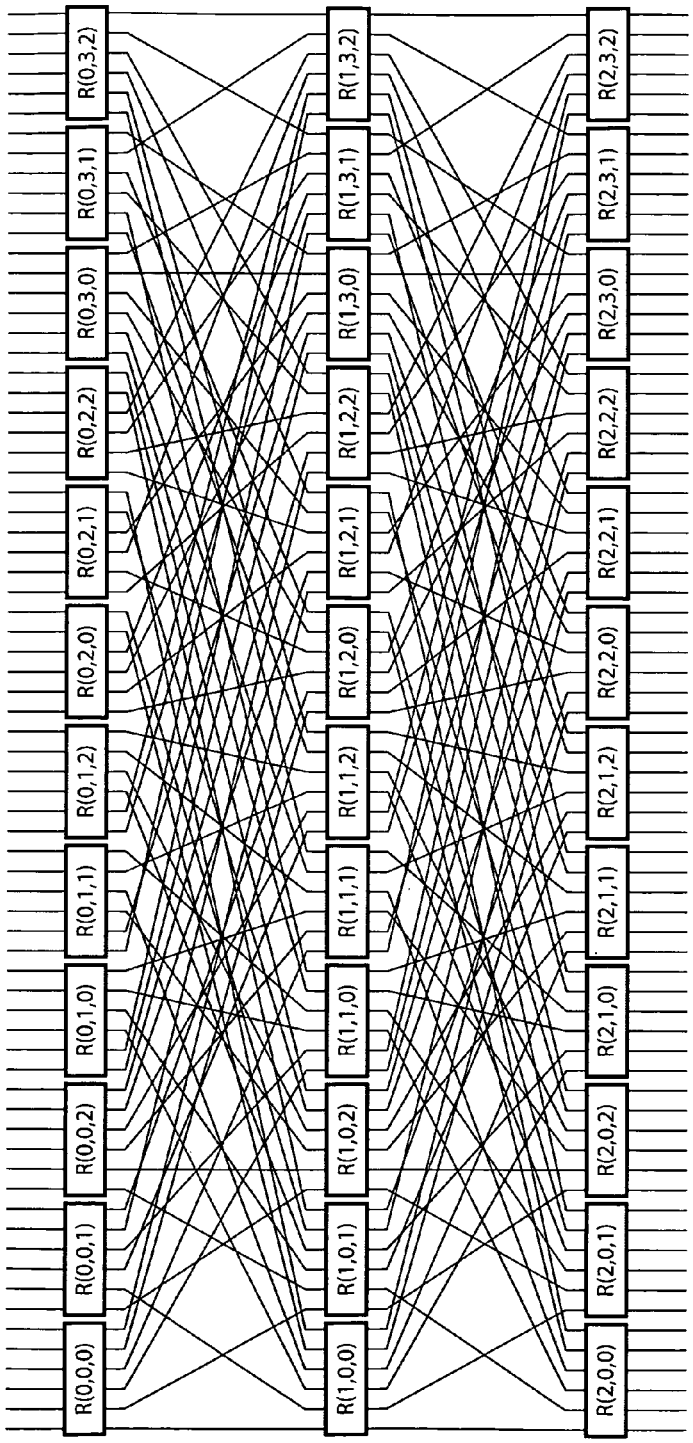
FIG. 20A shows a "flattened view of" the same complete 144-port two-dimensional Cartesian product RBCCG network, where all the ports and switching elements are drawn in raster scan order.
Figure 20B:
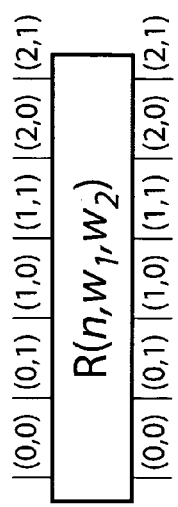
FIG. 20B shows a representative switching element which has been "flattened"

FIG. 18A shows all the connections between two adjacent stages of switching elements with those connections nearest the observation point highlighted with bolder lines. FIG. 18B shows the same interconnection network as FIG. 18A, except only those nearest the observation point are visible. In this particular depiction of the connections, they are broken up into two "phases." The upper phase represents the impact of applying the mapping of FIG. 16B to each $x_2$ component. The lower phase represents the impact of applying the mapping of FIG. 16A to each $x_1$ component. FIG. 18C and FIG. 18D show the side view of the interconnection; that is, FIG. 18C shows the interconnection network along the y-$x_1$ plane, and FIG. 18D shows the interconnection network along the y-$x_2$ plane. FIG. 18E shows the same interconnection network as in FIG. 18A, but without separating the mappings into the $x_1$ and $x_2$ phases. FIG. 18F and FIG. 18G show the interconnection networks along the y-$x_1$ plane and the y-$x_2$ plane, respectively. Finally, FIG. 19 shows the complete RBCCG network, resulting as the "Cartesian" product of the networks depicted in FIG. 16A and FIG. 16B. FIG. 20A shows a planar or "flattened" version of the network shown in FIG. 19. In this representation, the switching elements R(n, $w_1$, $w_2$) are depicted in a raster scan fashion as are their ports. The raster scan ordering of the ports is shown in a single exemplar shown in FIG. 20B. Though the intricacy of the details are already difficult to resolve in two dimensions, mathematically they are easy to implement.

The extension described above apply to even higher dimensions follow from this example. For an n-dimensional Cartesian product of RBCCG networks, it would have a height, H, and n widths, $W_1, W_2, \ldots, W_n$ with n corresponding fanouts $F_1, F_2, \ldots, F_n$. Functional connectivity requires $H \geq \max(\log_{F_1} W_1, \log_{F_2} W_2, \ldots, \log_{F_n} W_n)$ and fault tolerance requires $H \geq \max(\log_{F_1} W_1, \log_{F_2} W_2, \ldots, \log_{F_n} W_n)+1$. The mapping is given by the Cartesian product of the generating groups $G_i$ for the $W_i \times H \times F_i$ RBCCG networks from which they are based. Specifically, the mapping is given as $\pi_{G_1 \times G_2 \times \ldots \times G_n}:(p_1, p_2, \ldots, p_n) \rightarrow (\pi_{G_1}(p_1), \pi_{G_2}(p_2), \ldots, \pi_{G_n}(p_n))$.

The advantages of using a Cartesian product of RBCCG networks is that it reduces the lateral length that some connections take. In a RBCCG network with width $W_1 \times W_2$, some traffic can traverse a distance of up to $W_1 \times W_2$ switching elements. In a two-dimensional RBCCG with widths $W_1$ and $W_2$, which has the same number of switching elements as the $W_1 \times W_2$ width RBCCG network, the traffic would only traverse $\sqrt{W_1^2 + W_2^s}$, a distance which in general is much smaller.

Though described for RBCCG networks, the Cartesian product of two or more networks can be defined in much the same way. The Cartesian product of two networks of equal height is to take the Cartesian product of their respective interconnection mappings defining each ISIC network. As an example of this method, FIG. 21A depicts a balanced RBCCG network and FIG. 21B depicts a Banyan network. The mapping of the ISIC network of FIG. 21A is shown in FIG. 22A. The mapping of the upper ISIC network of the Banyan network shown in FIG. 21B is shown in FIG. 22B and the mapping of the lower ISIC network is shown in FIG. 22C. The mapping of the Cartesian product of the two networks is shown in FIG. 22D for the upper ISIC network and FIG. 22E for the lower ISIC network. For clarity sake, no additional diagrams or depictions are shown, but one of ordinary skill could easily render such a network.

Since the Banyan network has no fault tolerance, the resultant network is not uniformly fault tolerant. It should also be noted that as a result, upgrade of such a network can not be achieved without disruption of service.

Like the multidimensional design technique, the overlaying process of switching network design is intended to be a design process, and not a process to directly upgrade an existing infrastructure. However, it is possible if each switching element can be augmented with additional physical ports to use this method to reconfigure an existing network. A product of the overlaying process, a design can bolster the fault tolerance of a network and reduce latency in many cases. As is evident, the methods described herein can be applicable to more than two networks and in higher dimensions. For clarity, the embodiment of the overlaying process involving two networks is described in detail.

One embodiment of the overlaying process receives two multistage switching networks. One of the two networks is rotated by 90 degrees so that the top ports become left ports and the bottom ports become right ports (or equivalently top ports can become right ports and bottom ports can become left ports.) The two networks are registered so that wherever possible, switching elements are made to overlap. In an example where the first network has height H and width W, and the second network has height W and width H, the switching elements can be made to completely coincide. Once the two networks are registered and overlaid, whenever two switching elements overlap, a single switching element is defined at that location having the same ports as the two switching elements it replaces.

Figure 23:
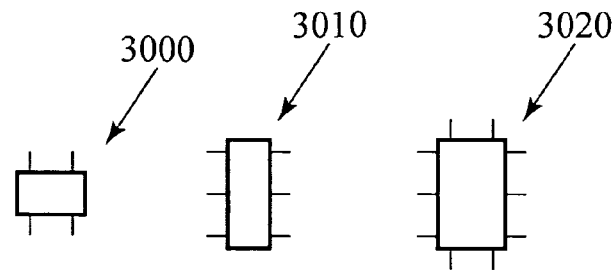
FIG. 23 shows how two switching elements that overlay in the overlay process are combined into one switching element.

FIG. 23 illustrates this process: switching element 3000 depicts a switching element with two top ports and two bottom ports. Switching element 3010 depicts a switching element from a rotated multistage interconnection network with three right ports and three left ports. If these two switching elements are overlaid, they are replaced by switching element 3020, which has two top ports, two bottom ports, three right ports and three left ports.

Furthermore, the ISIC networks of the first network become the IRIC networks of the resultant overlaid networks, and the ISIC networks of the second network become the ICIC networks of the resultant overlaid network.

In the example to follow, a first network and a second network are overlaid to form a resultant third network. In each situation, a variety of differing multistage interconnection networks are combined, illustrating the versatility of this technique.

Figure 24A:
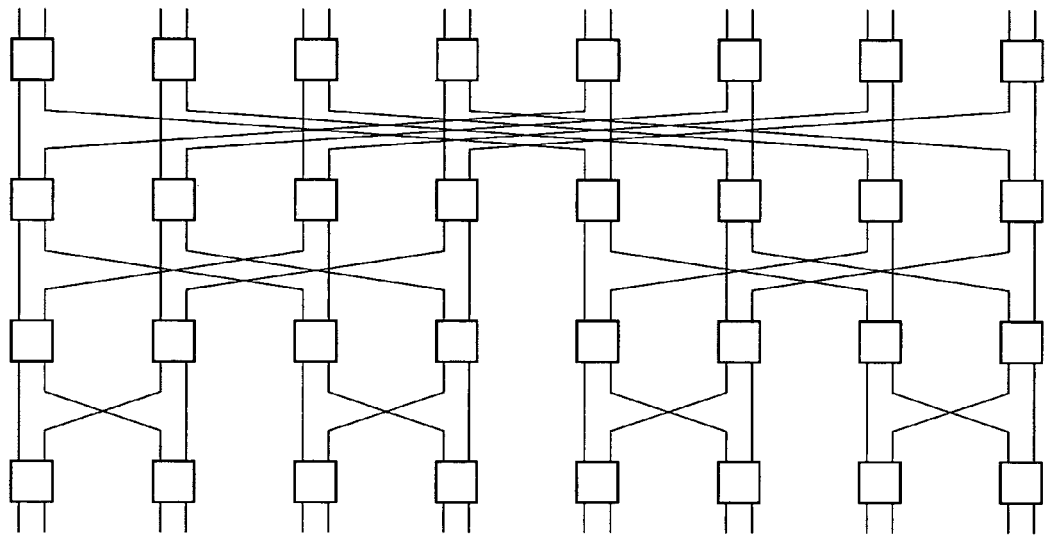
FIG. 24A, FIG. 24B and FIG. 24C show the process of a perpendicular overlay of a 32-port Banyan network and a 16-port, 8-stage RBCCG network.
Figure 24B:
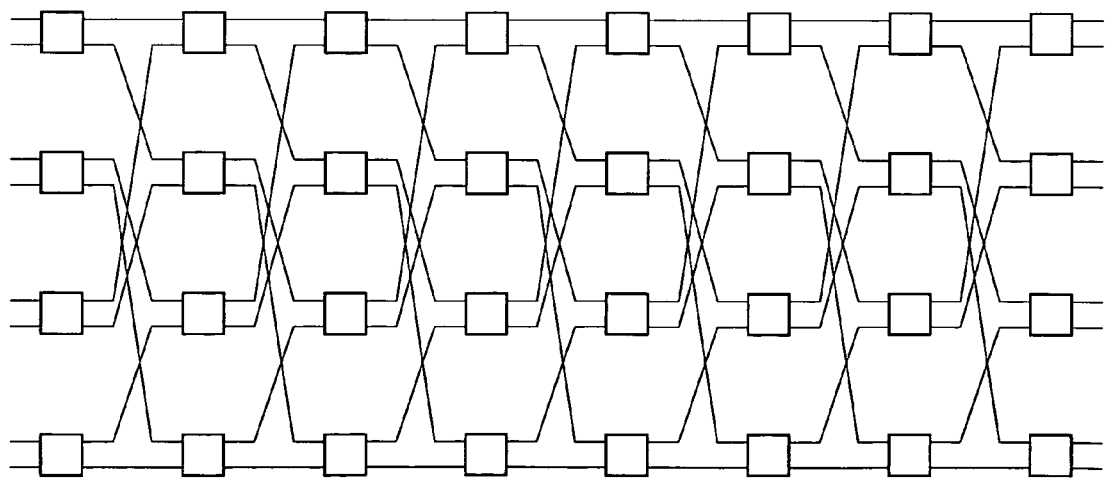
Figure 24C:
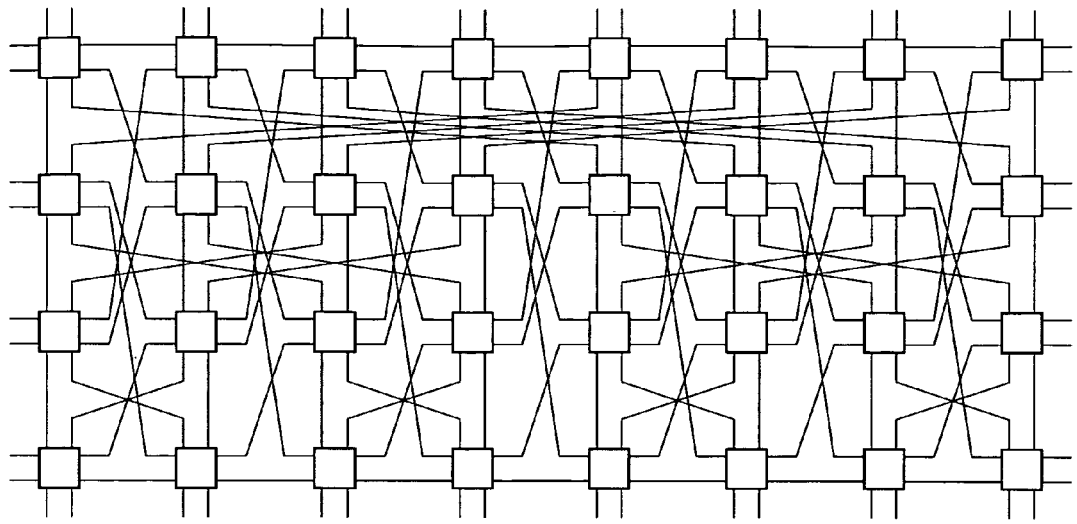
Figure 24D:
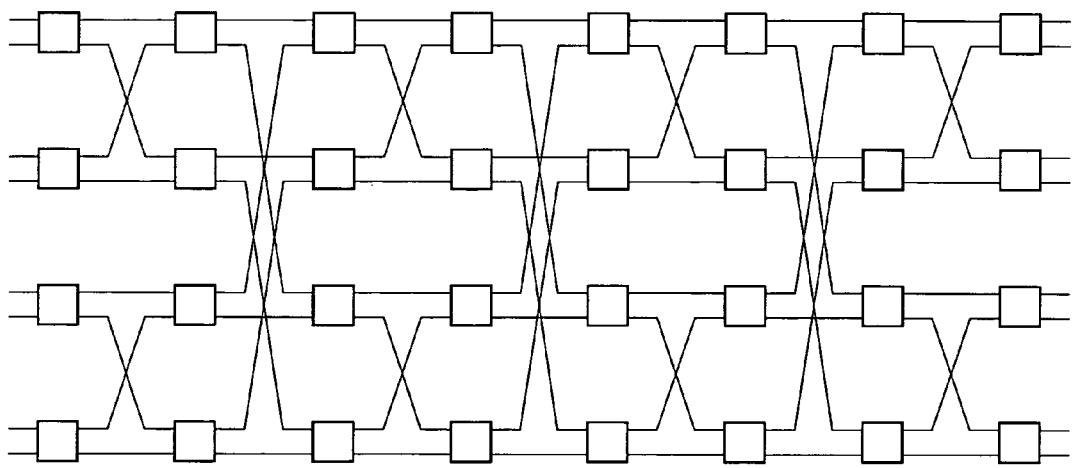
FIG. 24D and FIG. 24E show the process of a perpendicular overlay of a 32-port Banyan network and a 16-port, 8-stage multiple Banyan network.
Figure 24E:
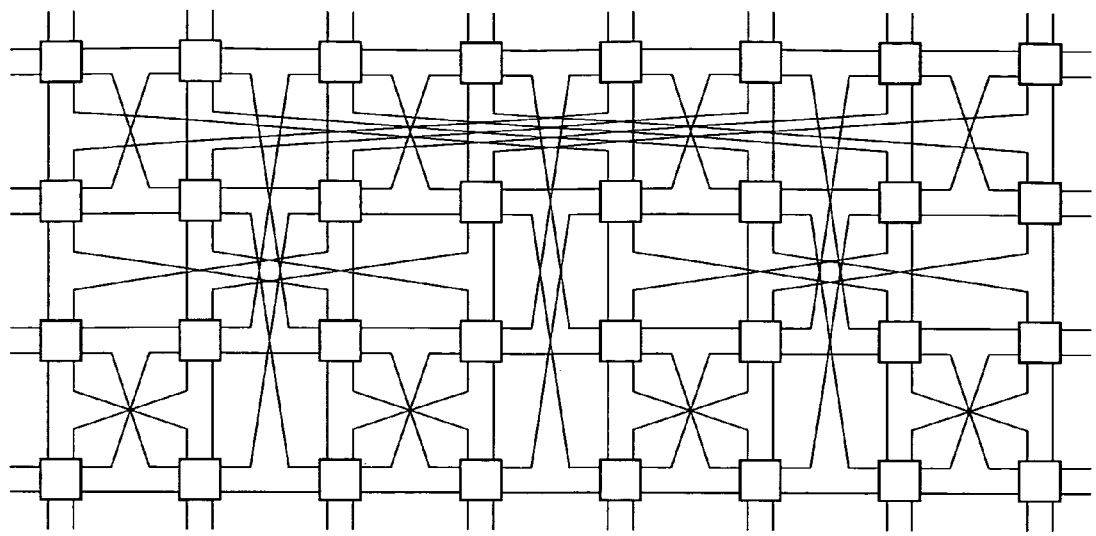

In one embodiment, the Banyan network shown in FIG. 24A with 4 rows and 8 columns is overlaid on the balanced RBCCG network shown in FIG. 24B with 8 rows and 4 columns and fanout per switching element of 2, resulting in the overlaid switching network shown in FIG. 24C. In another embodiment, the Banyan network shown in FIG. 24A with 4 rows and 8 columns is overlaid on the switching network shown in FIG. 24D comprising three Banyan networks coupled through a common stage of switching elements having 8 rows and 4 columns and fanout per switching element of 2, resulting in the overlaid switching network shown in FIG. 24E.

Figure 25A:
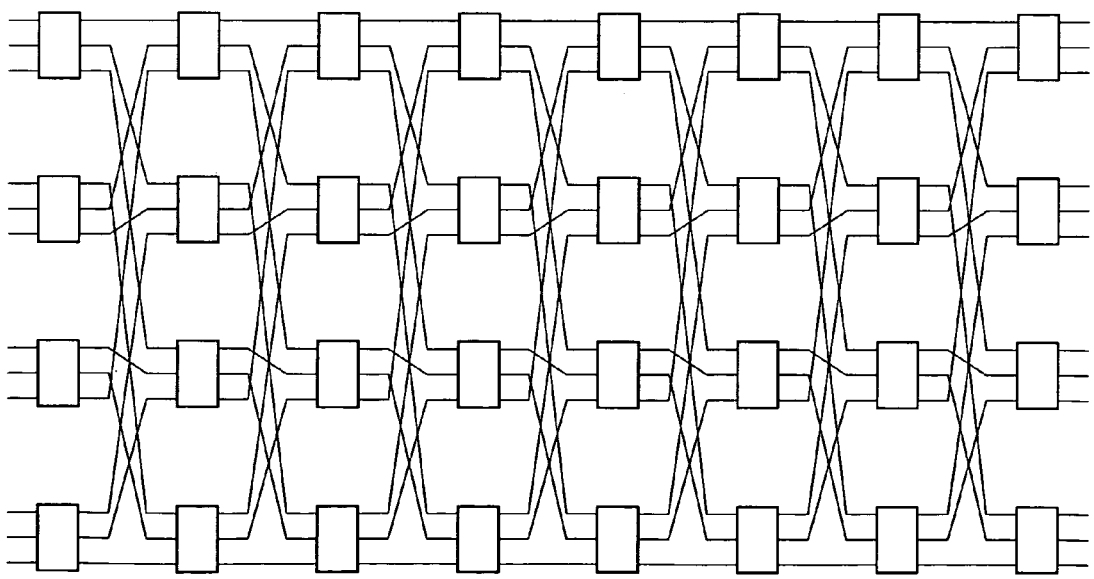
FIG. 25A and FIG. 25B show the process of a perpendicular overlay of a 32-port Banyan network and a 24-port, 8-stage RBCCG network.
Figure 25B:
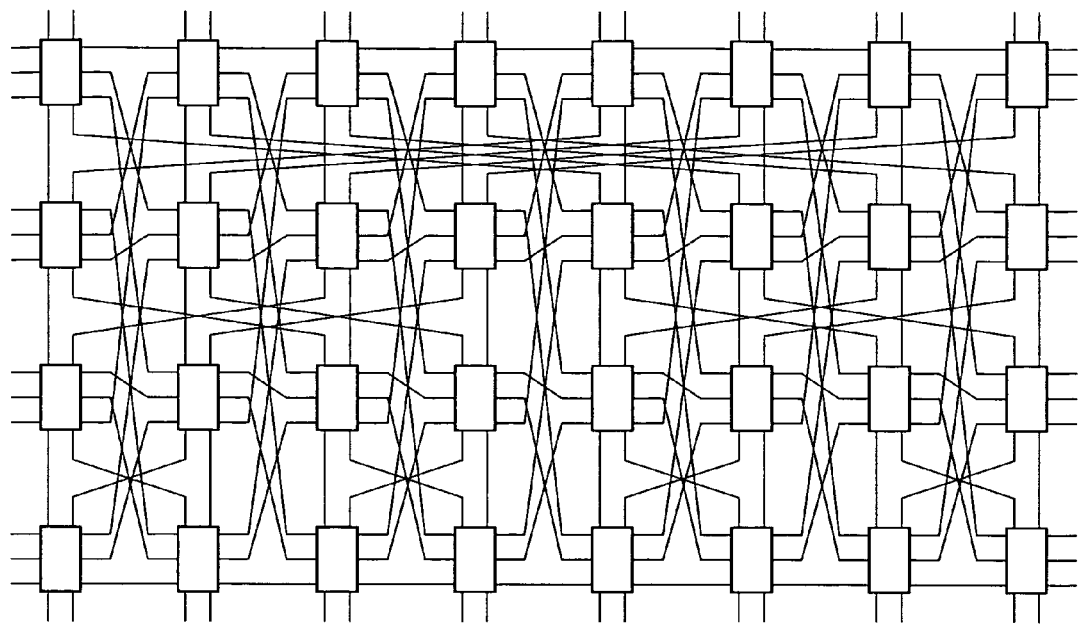
Figure 26A:
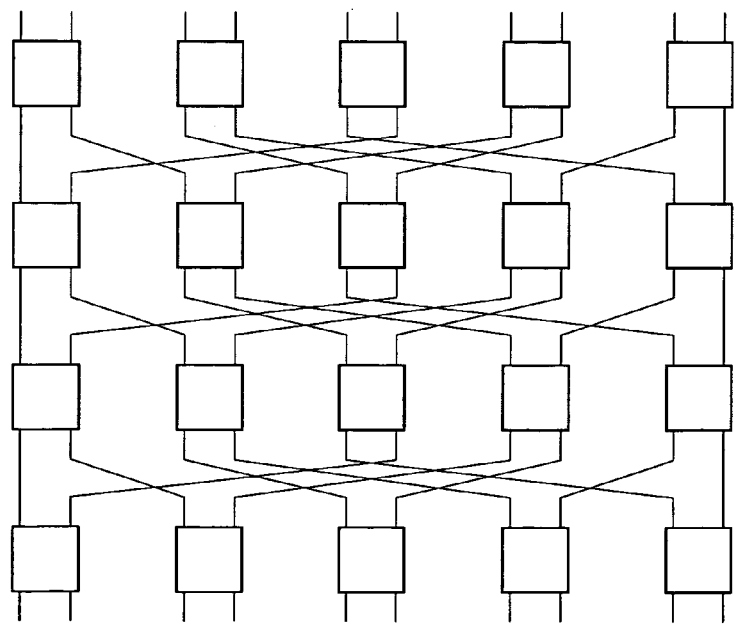
FIG. 26A, FIG. 26B and FIG. 26C show the process of a perpendicular overlay of a 20-port 4-stage RBCCG network and a 24-port, 5-stage RBCCG network.
Figure 26B:
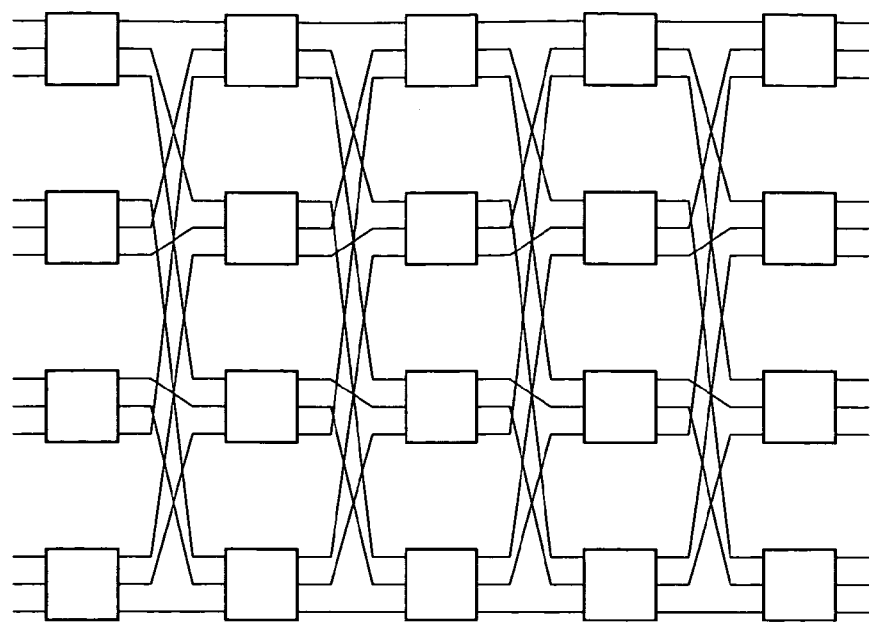
Figure 26C:
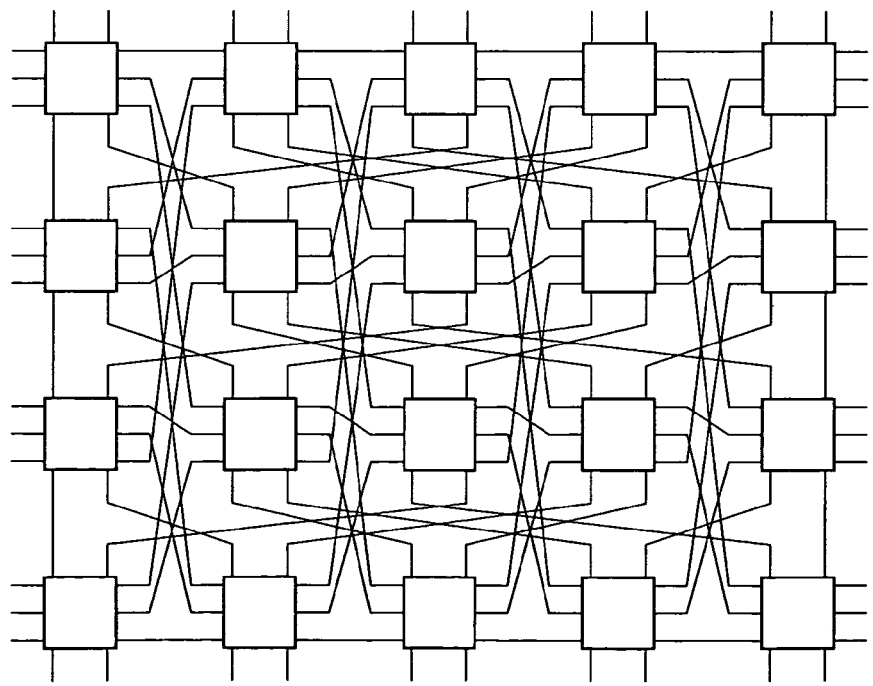
Figure 27A:
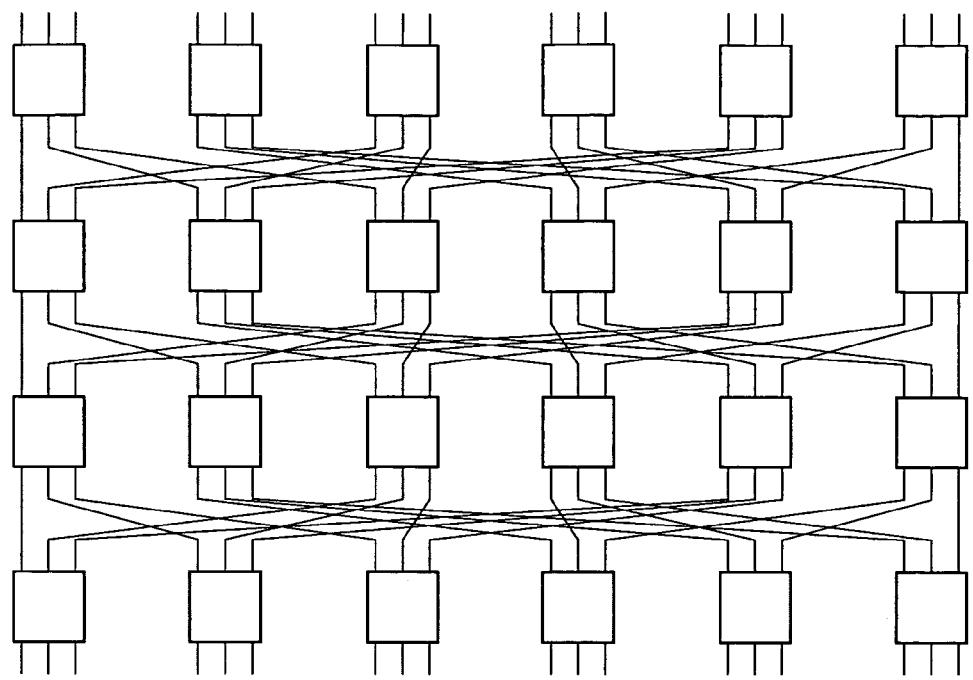
FIG. 27A, FIG. 27B and FIG. 27C show the process of a perpendicular overlay of a 36-port 4-stage RBCCG network and a 24-port, 6-stage RBCCG network.
Figure 27B:
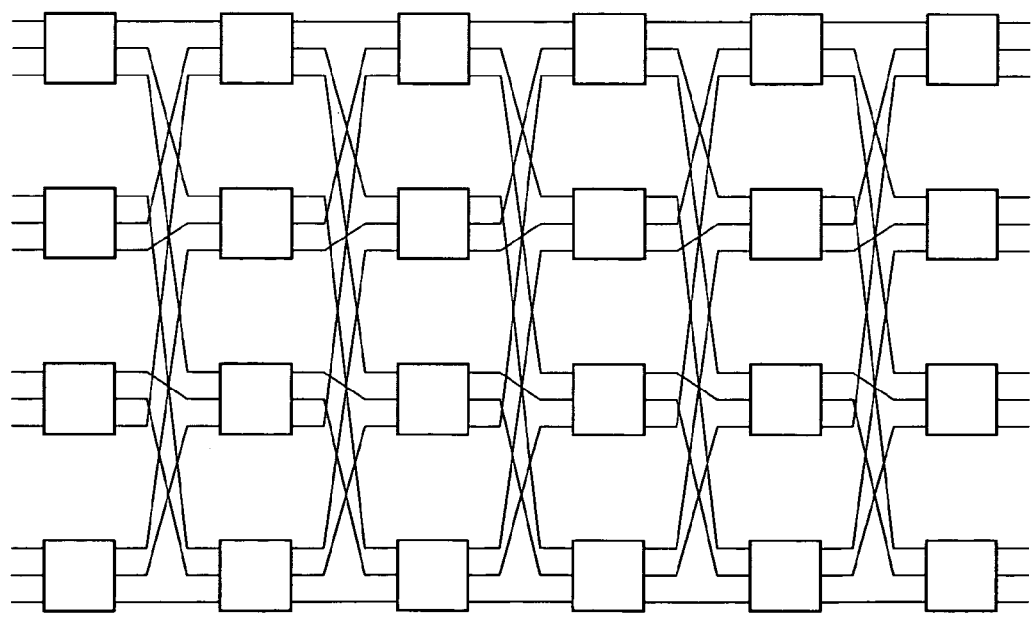
Figure 27C:
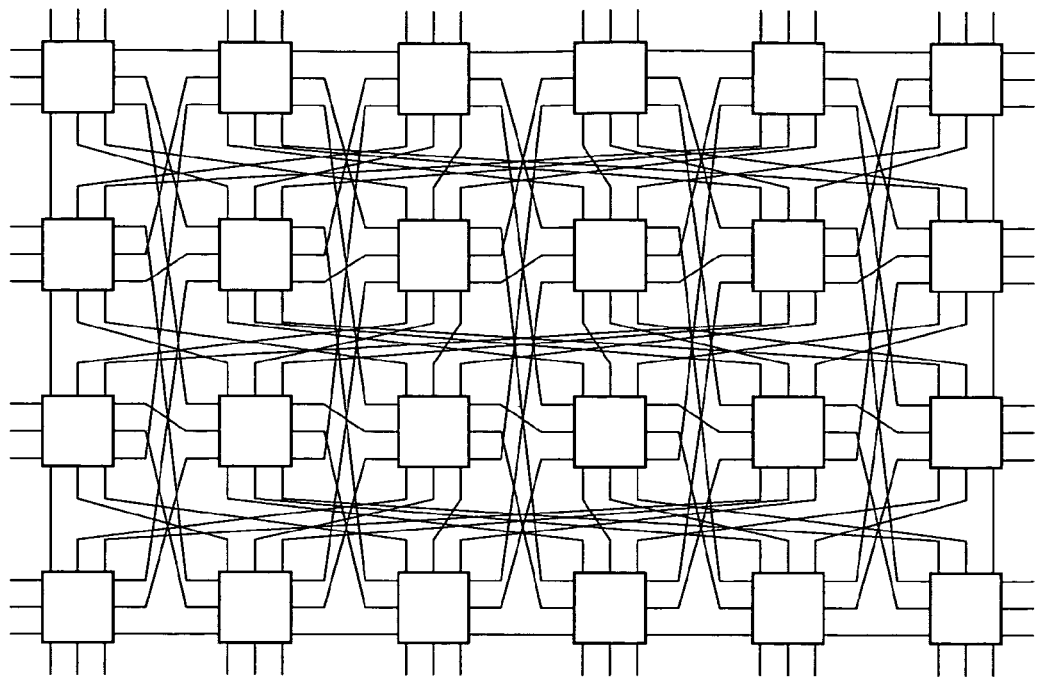
Figure 28A:
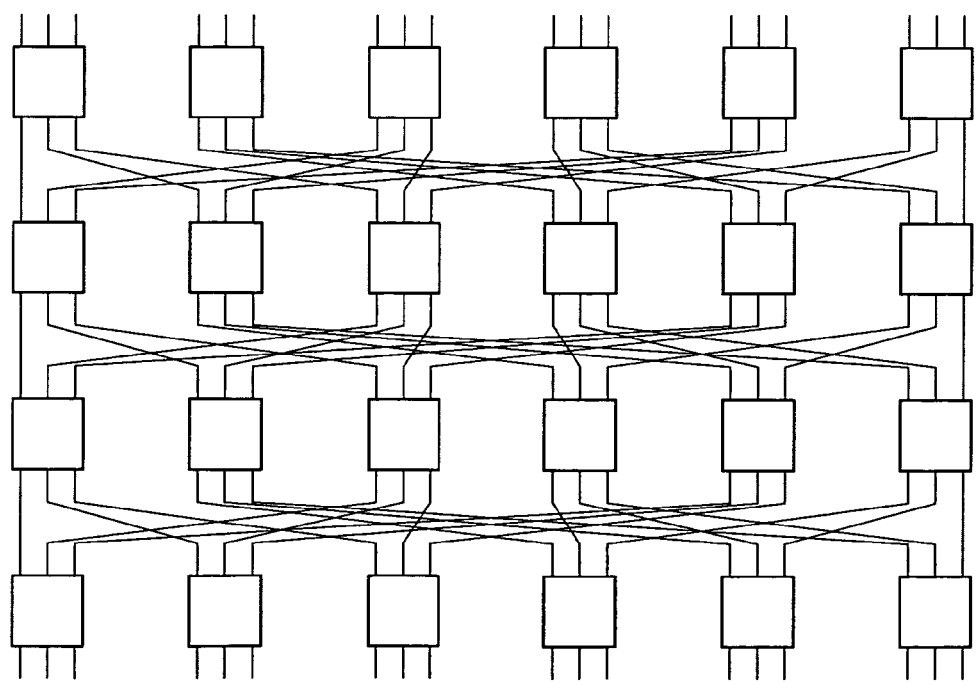
FIG. 28A, FIG. 28B and FIG. 28C show the process of a perpendicular overlay of a 36-port 4-stage RBCCG network and a 32-port, 6-stage RBCCG network.
Figure 28B:
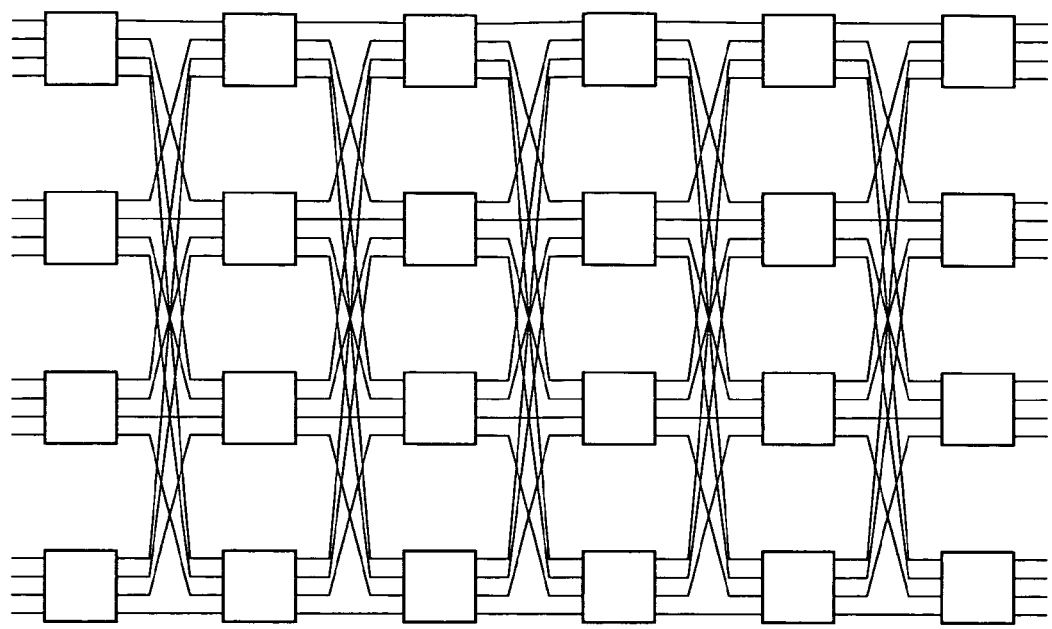
Figure 28C:
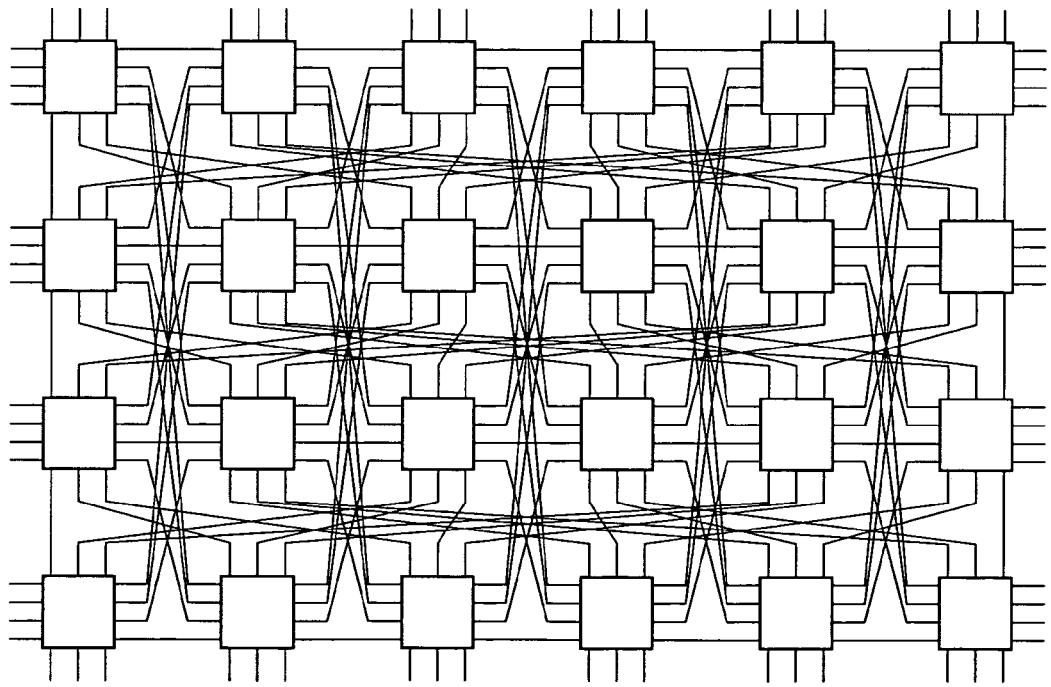
Figure 29A:
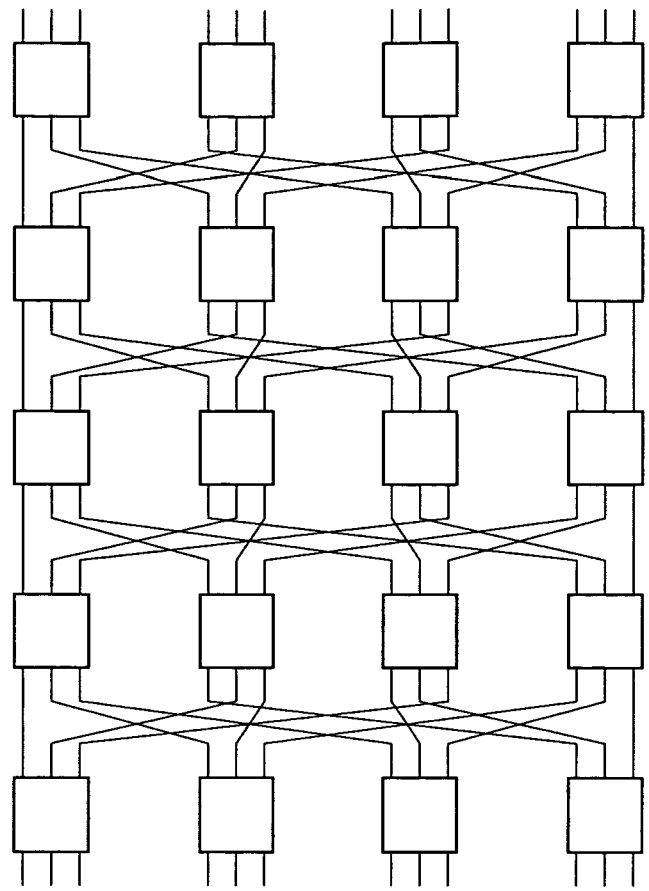
FIG. 29A, FIG. 29B, FIG. 29C, and FIG. 29D show the process of a perpendicular overlay of a 24-port 5-stage RBCCG network and an 18-port, 6-stage RBCCG network, with two types of registration FIG. 30A
Figure 29B:
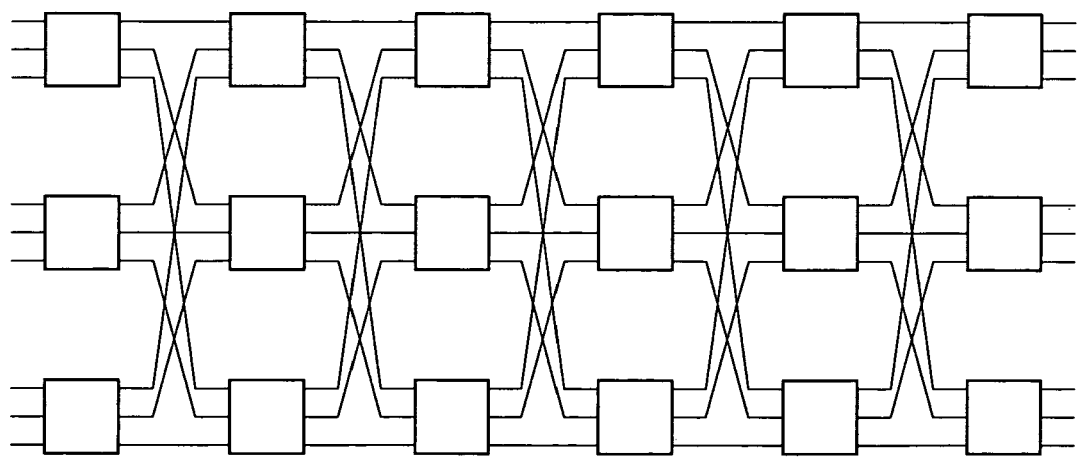
Figure 29C:
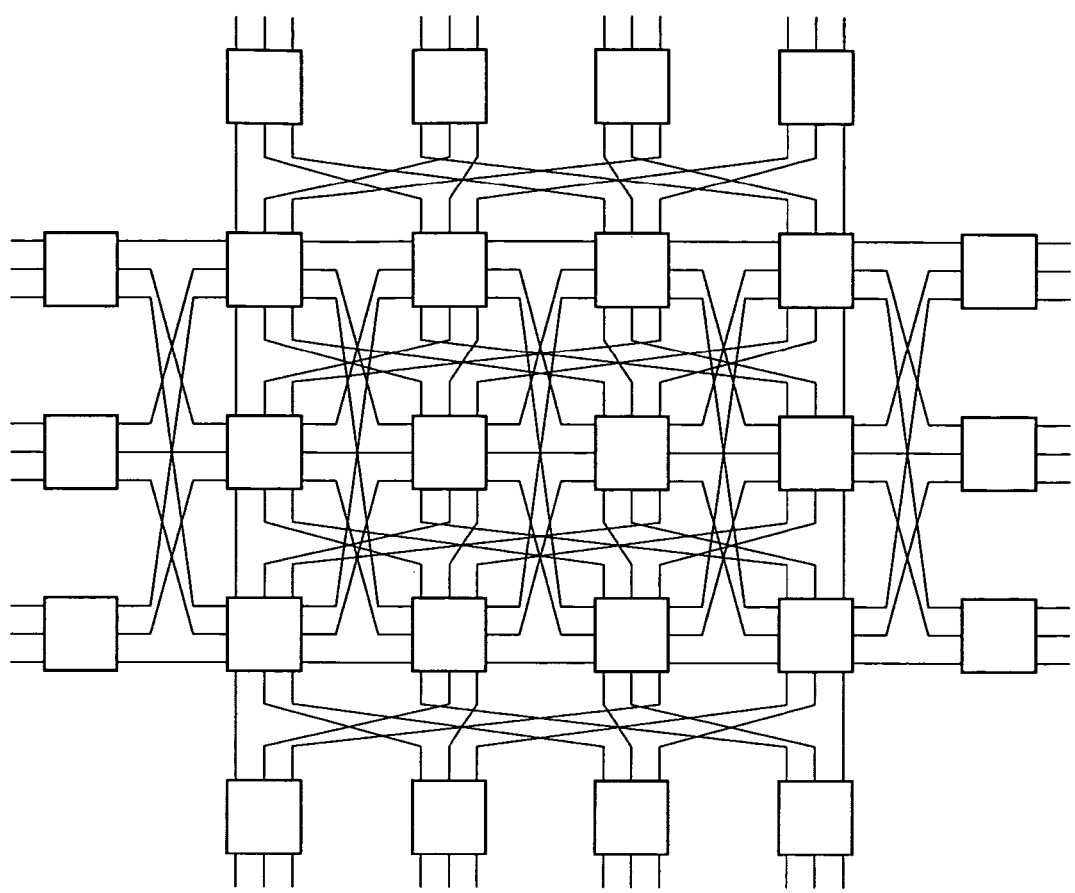
Figure 29D:
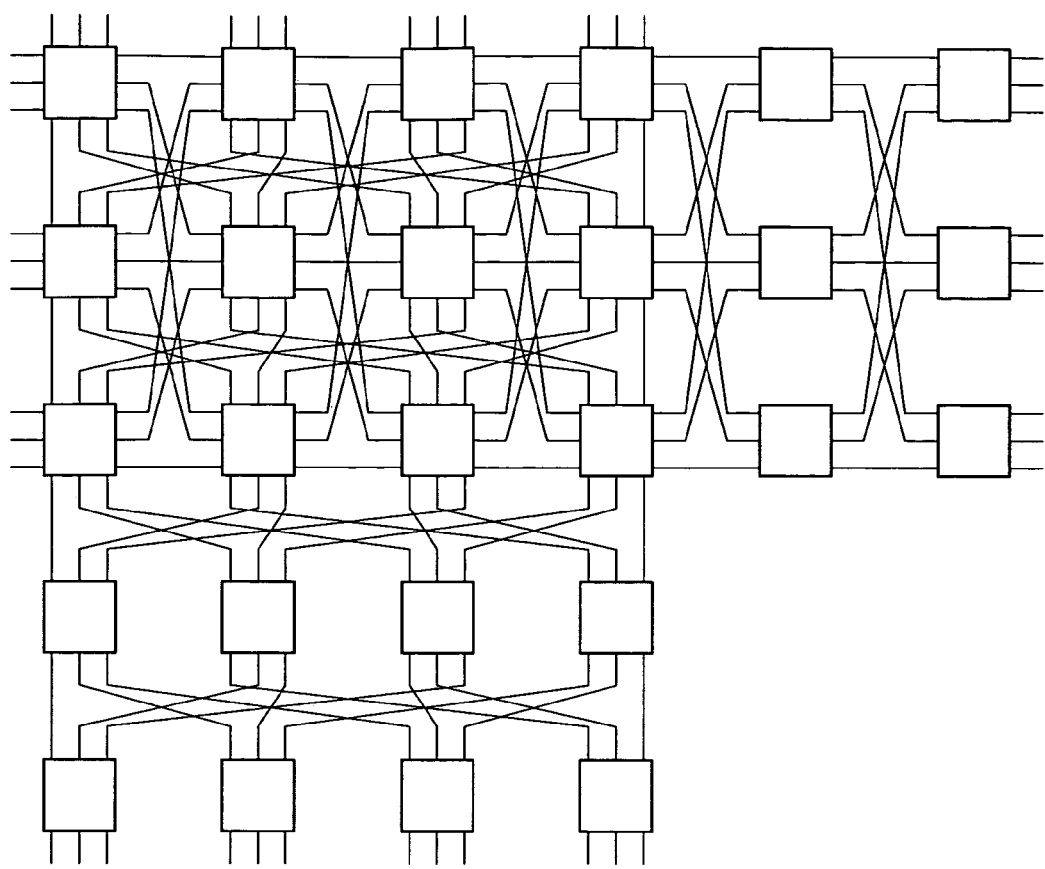

In another embodiment, the overlaying process is shown to be independent of the fanouts of the two networks being combined. For example, the Banyan network shown in FIG. 24A with 4 rows and 8 columns can be overlaid on the balanced RBCCG network shown in FIG. 25A having a different fanout to the Banyan network. The network having 8 rows and 4 columns and a fanout per switching element of 3. FIG. 25B illustrates the resultant overlaid switching network. In another embodiment, the balanced RBCCG network shown in FIG. 26A with 4 rows and 5 columns and fanout per switching element of 2 can be overlaid upon a 5 row, 4 column balanced RBCCG network with fanout per switching element of 3 as shown in FIG. 26B, resulting in the overlaid switching network of FIG. 26C. In another embodiment, the balanced RBCCG network shown in FIG. 27A with 4 rows and 6 columns and fanout per switching element of 3 can be overlaid upon a 6 row, 4 column balanced RBCCG network with fanout per switching element of 3 as shown in FIG. 27B, resulting in the overlaid switching network of FIG. 27C. In another embodiment, the balanced RBCCG network shown in FIG. 28A with 4 rows and 6 columns and fanout per switching element of 3 can be overlaid upon a 6 row, 4 column RBCCG network with fanout per switching element of 4 as shown in FIG. 28B, resulting in the overlaid switching network of FIG. 28C. In another embodiment, the balanced RBCCG network shown in FIG. 29A with 5 rows and 4 columns and fanout per router of 3 can be overlaid onto the balanced RBCCG network shown in FIG. 29B with 3 rows and 6 columns. Depending on the manner the two networks are registered, a variety of new switching network designs are possible. FIG. 29C illustrates the resultant overlaid switching network when the two networks are centered upon each other. FIG. 29D illustrates an alternate resultant overlaid switching network, based upon a different registration.

The many embodiments illustrated formed from the process of overlaying two RBCCG networks upon each other demonstrate the versatility of overlaying RBCCG networks upon a second RBCCG network. Clearly, unbalanced RBCCG networks could be utilized here for the first network, the second network or both networks. It is easy to find an RBCCG network with the proscribed height and width, and the selection of fanouts is arbitrary so that it can be selected to what suits the desired implementation best.

The product of the overlaying process results in switching networks that require more ports than either of the constituent switching network designs. However, the advantages gained include an overall reduction in latency. In the Banyan network, it requires four hops for traffic entering top port 0 of R(0,0) to exit bottom port 1 of R(3,1). In FIG. 24A, there is only one path, passing through R(0,0), R(1,0), R(2,0) and R(3,1). In FIG. 24C, there is a new path requiring only three hops, passing through R(0,0), R(1,0) and R(3,1). Though this savings is small, this is due to the fact that in this example there are not very many levels. However, looking at the RBCCG network in FIG. 24B, it requires eight hops for traffic moving left to right. For example, traffic entering left port 0 of R(0,0,) to exit right port 1 of R(1,7) must take eight hops, regardless of the path chosen. However, in FIG. 24C there is now a path requiring only four hops, passing through R(0,0), R(1,5), R(2,6) and R(1,7). This is a significant savings in latency.

Another advantage is the addition of fault tolerance. By adding new internal connections, the network can tolerate more failures in connections and routers. In the case of the Banyan network which has no redundancy, it is clear from the preceding example of traffic entering top port 0 of R(0,0) and exiting bottom port 1 of R(3,1) that in the resultant architecture, there are more paths made available for that traffic. With more paths available, the architecture also reduces blocking, improving efficiency for isochronous traffic.

Figure 30A:
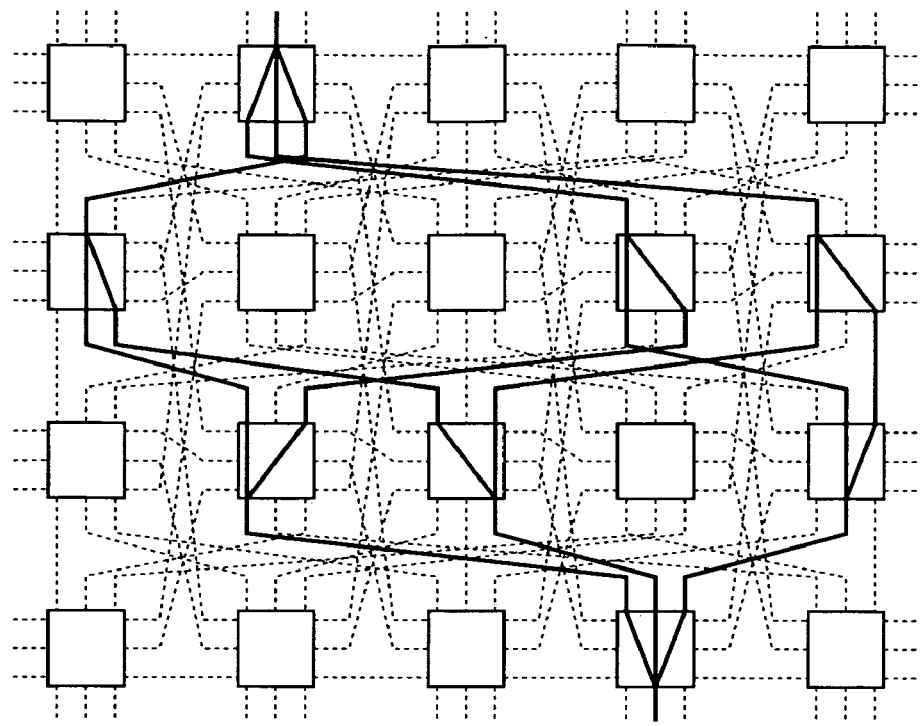
FIG. 30B shows paths between two external ports with latencies of 3 hops and two hops respectively.
Figure 30B:
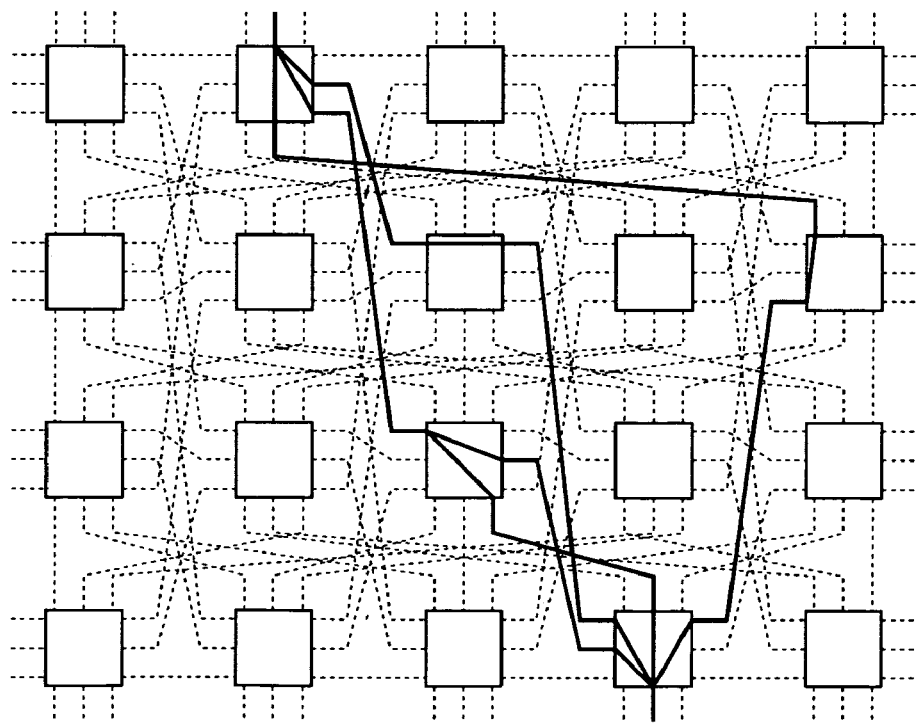

Furthermore, FIG. 30A and FIG. 30B further illustrate the advantages in improved latency and fault tolerance. FIG. 30A highlights the six paths from the two highlighted external ports that occur naturally as part of the IRIC networks flowing from top to bottom. FIG. 30B shows four additional paths which are shorter than the six "natural" paths. These four paths incorporate connections in the ICIC networks. The result is shorter latency options and additional paths. The added fault tolerance additionally facilitates the upgradeability of overlaid networks without disruption of service. Such upgrade methods are described below.

Another advantage is the number of external ports is related to the perimeter of the network rather than just the width alone, allowing the designer an extra degree of freedom in designing a network.

Figure 31A:
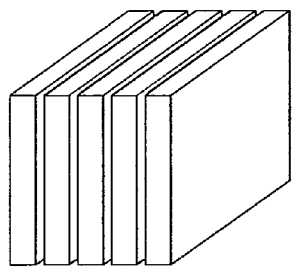
FIG. 31A, FIG. 31B, and FIG. 31C show three orientations of two-dimensional multistage interconnection networks for the purposes of overlaying networks.
Figure 31B:
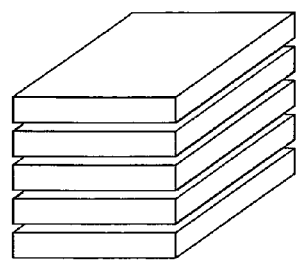
Figure 31C:
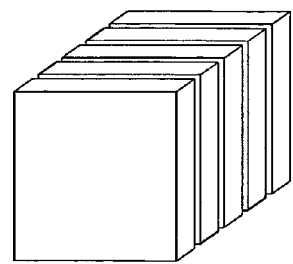

The perpendicular overlaid networks are fairly straightforward for planar designs such as those described above. The overlaying procedure can apply to higher dimensions as well. Additional degrees of freedom become available. FIG. 31A, FIG. 31B, and FIG. 31C show three orientations of two dimensional multistage switching networks with the interplane interconnection networks denoted in gray shading. Just as in the two dimensional overlaying, certain dimensions must match. For instance, the height, width and depth of a network must match the width, depth, and height of a second network or some other permutation of the three dimensions. There are too many degrees of freedom to enumerate all the possibilities here, but essentially two networks can be overlaid if there is some orientation for which the dimensions of the two "match." Since there are three orientations available in three dimensional space, two of the three networks could be overlaid as well as all three. As in the planar example, the fanouts of the respective two-dimensional multistage switching networks are independent of each other.

Figure 32A:
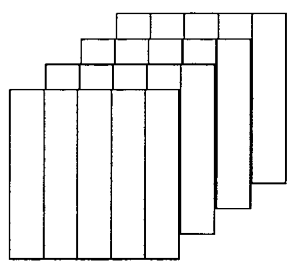
FIG. 32A, FIG. 32B, and FIG. 32C show how to combine one-dimensional multistage interconnections networks into a two-dimensional multistage interconnection network.
Figure 32B:
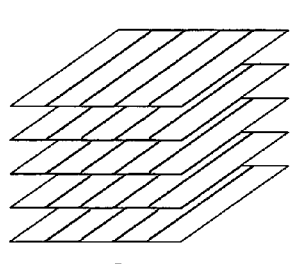
Figure 32C:
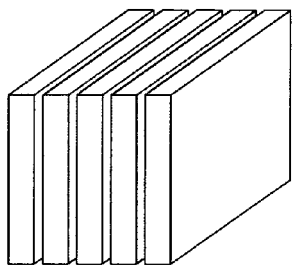

There are also techniques for generating a higher dimensional multistage interconnection network from a plurality of lower dimensional multistage interconnection network. FIG. 32A shows a 1-dimensional multistage interconnection network of height, H, width $W_1$ and per switching element fanout of $F_1$ being stacked with $N_1-1$ identical multistage interconnection networks, resulting in an rather uninteresting 2-dimensional multistage interconnection network of height H and widths $W_1$ and $N_1$, and fanouts per switching element of $F_1$ and 1. FIG. 32B shows a stack of $N_2$ multistage interconnection networks of height H and width $W_2$, and fanout per switching element of $F_2$. The two can be overlaid if $N_1=W_2\times F_2$ and $N_2=W_1\times F_1$. As shown in FIG. 32C. Again as in the preceding examples, the gray areas represent interconnection networks.

Figure 33A:
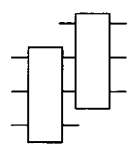
FIG. 33A, FIG. 33B and FIG. 33C show how to combine one-dimensional switching elements into two-dimensional switching elements.
Figure 33B:
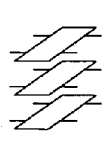
Figure 33C:
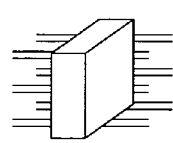

One detail is necessary to complete the overlay of the networks shown in FIG. 32A and FIG. 32B. FIG. 33A shows a stack of $F_2$ switching elements from the network in FIG. 32A. FIG. 33B shows a stack of $F_1$ switching elements from the network in FIG. 32B. In the overlaid result in FIG. 33C, those stacks of switching elements are replaced by a single two-dimensional switching element of total fanout of $2F_1F_2$. The actual distribution of the fanouts across can be somewhat arbitrary, especially if these are used to construct three-dimensional overlays as described above. The important factor is that the data flows along the y-axis.

This last technique can be applied to arbitrary dimensions. However, the stacking and higher dimensional overlays result in smaller diameter networks for the number of external ports significantly reducing latency and increasing fault-tolerance. However, the requirement in hardware is also greatly increased, but this allows additional flexibility to the network designer.

As suggested by Huang in U.S. Pat. No. 5,841,775, modern routing protocols can be used to direct signals through the switching networks described above, especially dynamic routing protocols such as Open Shortest Path First (OSPF). These protocols enable the switching network to automatically adapt to faults in the network, and also to adapt to the changing topology of the network, should it be altered. This is an important property when performing upgrades by the methods as discussed below. The use of dynamic routing protocols during the upgrade process enables these scalable switching networks to be upgraded while in switching operation. In addition, the use of such protocols can give the network designer the freedom to derive complex routing formula for each potential network design. In particular, these protocols can be used in any of the above described network designs.

However, the drawback is that most of these dynamic routing protocols are designed to operate on ad hoc networks where there is no semblance of regularity, as such are often implemented by using substantial memory and large tables. In contrast, routing in many traditional fixed radix networks, particularly the radix two networks, is based on mathematical or algorithmic calculations rather than the table lookup techniques. Since many of the fixed radix networks were designed from sorting algorithms, many of the routing formulas are based on sorting techniques. For example, a switching element in the third stage can look at the third bit of the destination address and route the signal to the right if the bit is set and to the left of the bit is not set.

Consider the balanced RBCCG switching network with a stride equal to the fanout, a height of H, a width of W switching elements per stage, and a fanout of F comprises a plurality if CGISIC networks. Specifically, each CGISIC is generated by the following mapping, bottom port s of stage n is connected to top port d of stage n+1, (recall that according to FIG. 9 these port numbers are numbered from 0 to WF−1) where $$d = \left((s \bmod W)F + \left(\frac{S}{W}\right)\right) \bmod(WF).$$

Traffic can be routed through this balanced RBCCG switching network using the following formula, $$p = \frac{(d - sF^{H-k}) \bmod W + iW}{F^{H-k-1}}$$

where p is the port on switching element R(k, s) to which the signal should be directed to reach switching element R(H, d) and i can be any integer value for which the resultant p makes sense (i.e. $0 \leq p < F$). The division operation in the preceding formula is integer division, that is division where the remainder is discarded. The power of this formula lies in that each switching element, knowing its location within the switching network and the destination of the signal, can decide which output port it must route the signal to without the need for tables or information from other switching elements.

Figure 34:
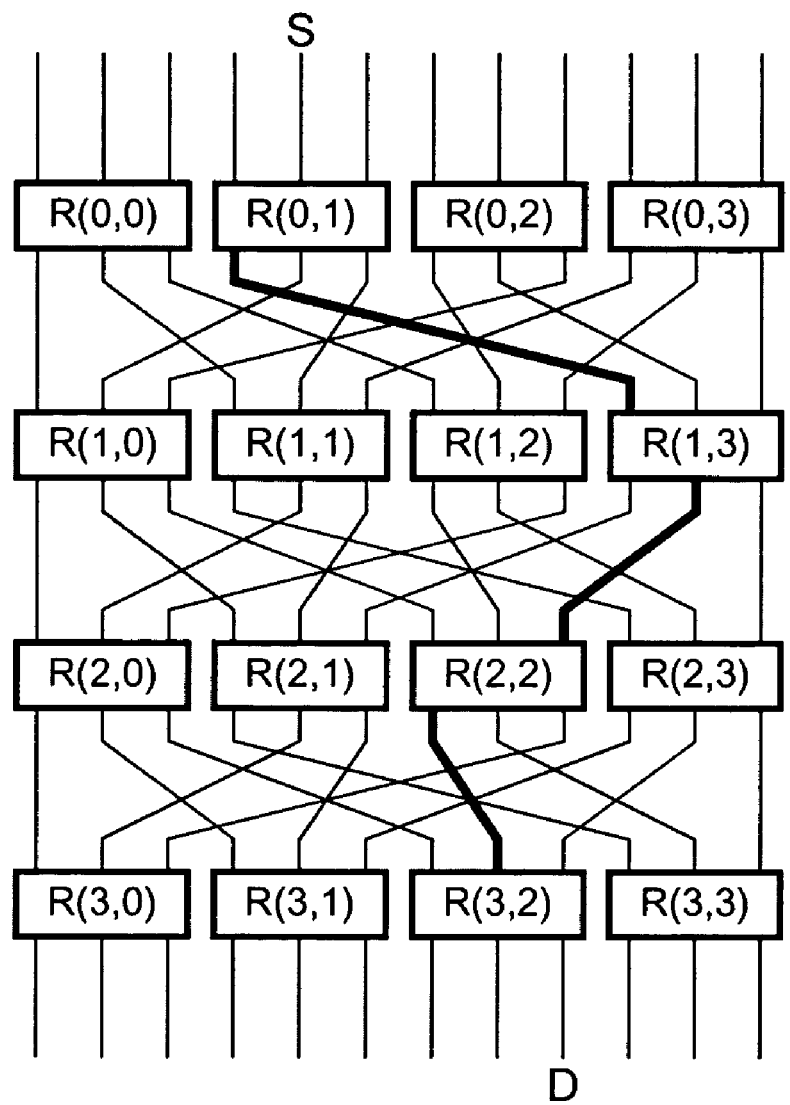
FIG. 34 shows an example path of a route from port S to port D

The following is an example of an application of this routing algorithm. Depicted in FIG. 34 is a 24-port RBCCG switching network, To traverse from port S to port D, the signal must be routed between R(0,1) to R(3,2). At router R(0,1), the routing formula yields a solution for p of either 0, 1, or 2 meaning that the signal could be routed through any of the output ports, all of which are equally valid. If the signal is routed through port 0, it arrives at R(1,3), according to the routing formula to route from R(1,3) to R(3,2) yields only one possible value for p that of 1, so the signal must be routed through output port 1 to R(2,2). To route from R(2,2) the routing formula from R(2,2) to R(3,2) yields only the value of p=0 so the signal must be routed through output port 0 to R(3,2) where it is finally conveyed through output port 2 to destination D.

In some instances of applying the routing formula, several solutions for the output port can result. In such situations, a routing algorithm is free to select any solutions and allow the switching element in the next stage to carry out the next calculation. Though FIG. 34 describes one path from S to D, there are in fact five paths, which derive from the different choices of when multiple solutions exist. The first path as described above has the signal passed from S to R(0,1) where it traverses through output port 0 to R(1,3) where it traverses through output port 1 to R(2,2) where it traverses through output port 0 to R(3,2) where it is finally conveyed through output port 2 to destination D.

A second path has the signal traverses through output port 1 to R(1,0) where it traverses through output port 0 to R(2,0) where it traverses through output port 2 to R(3,2) where it is finally conveyed through output port 2 to destination D A third path has the signal passed from S to R(0,1) where, like in the second path, it traverses through output port 1 to R(1,0) where, unlike the second path, it traverses through output port 2 to R(2,2) where it traverses through output port 0 to R(3,2) where it is finally conveyed through output port 2 to destination D.

A fourth path has the signal passed from S to R(0,1) where it traverses through output port 2 to R(1,1) where it traverses through output port 1 to R(2,0) where it traverses through output port 2 to R(3,2) where it is finally conveyed through output port 2 to destination D.

A fifth path has the signal passed from S to R(0,1) where like in the fourth path, it traverses through output port 2 to R(1,1) where unlike in the fourth path, it traverses through output port 0 to R(2,3) where it traverses through output port 1 to R(3,2) where it is finally conveyed through output port 2 to destination D.

This gives an alternative routing technique for the RBCCG switching networks, allowing these switching networks to be used in applications where the switches are constrained to simple logic. In addition, this formula can be used as part of a formulaic routings algorithm for the hybrid architectures mentioned above. Additionally, since the interconnection mappings of the Cartesian product networks are separable (that is, they are independent in the various $x_i$ directions), this routing formula can be used to route based on each component of the address. For example, if the $x_1$ direction shows a Banyan interconnection pattern, and the $x_2$ direction is a RBCCG switching network, a Banyan formula can be used to calculate the $x_1$ component, $p_1$, of output port based on the $x_1$ component of the destination address. The routing formula given above for the RBCCG switching network can be given be used to determine which the $x_2$ component, $p_2$, of output port based on the $x_2$ component of the destination address, thereby yielding a resultant output port of $(p_1,p_2)$. This formula can also be used in various combinations to route in any of the overlaid networks where one of the networks overlaid is an RBCCG switching network.

In any of the preceding architectures, if a dynamic routing algorithm as used by protocols, such as Routing Information Protocol (RIP), OSPF, Exterior Gateways Protocol (EGP), and Border Gateway Protocol (BGP) is employed, the redundancy of the networks can be exploited to provide fault tolerance. Once a fault is detected through non-response, perhaps using a network management protocol such as Simple Network Management Protocol (SNMP), the dynamic routing algorithm can remove the entry from its routing tables and all traffic can be routed around the defective switching element or connection. When the defective switching element or connection is repaired, the repair can be detected, perhaps through the same network management protocol, and the dynamic routing algorithm can reintroduce the formerly defective elements back to its routing table and traffic can resume through the formerly defective element(s).

Having path redundancy, detecting faults and the ability to dynamically route traffic leads to automatic fault tolerance. For example, FIG. 35A depicts a 30-port balanced RBCCG switching network with five paths (shown in bold) from port S to port D. With dynamic routing described above, switching element R(0,2) would determine three paths out of switching element R(0,2), and depending on the routing algorithm, any one of those three paths can be taken. Depending on which path is taken, the corresponding switching element in stage 1 detects the remaining paths available to port D. For example, if the traffic gets routed by switching element R(0,2) to switching element R(1,3) two paths are available, so switching element R(1,3) can select either path.

Figure 35B:
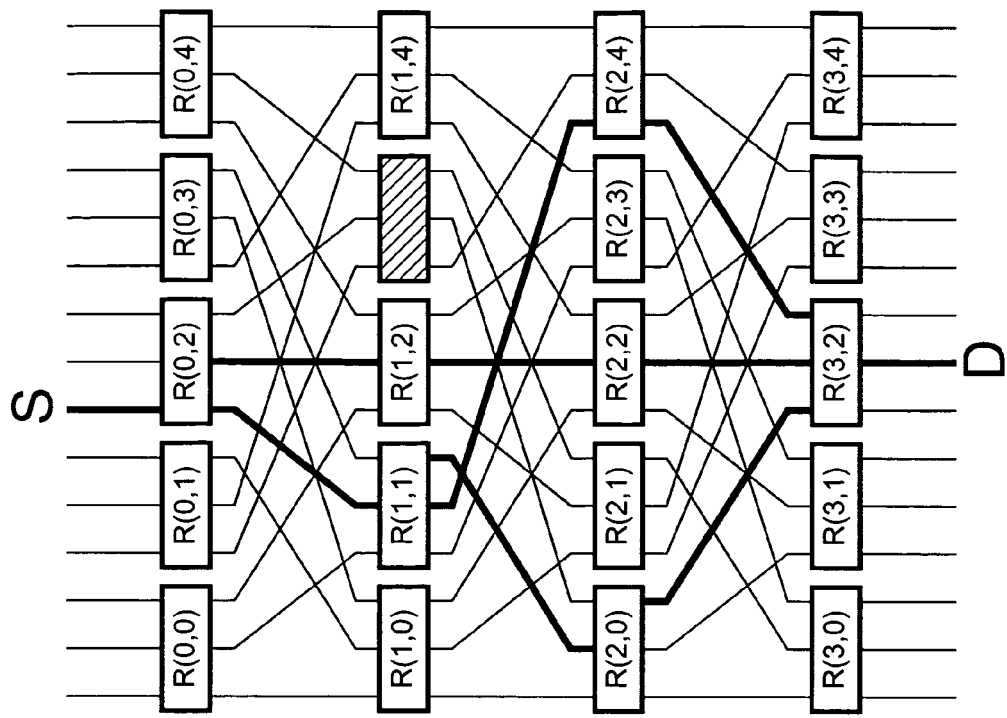
FIG. 35A and FIG. 35B shows how path redundancy in a scalable switching network leads to fault tolerance.
Figure 35A:
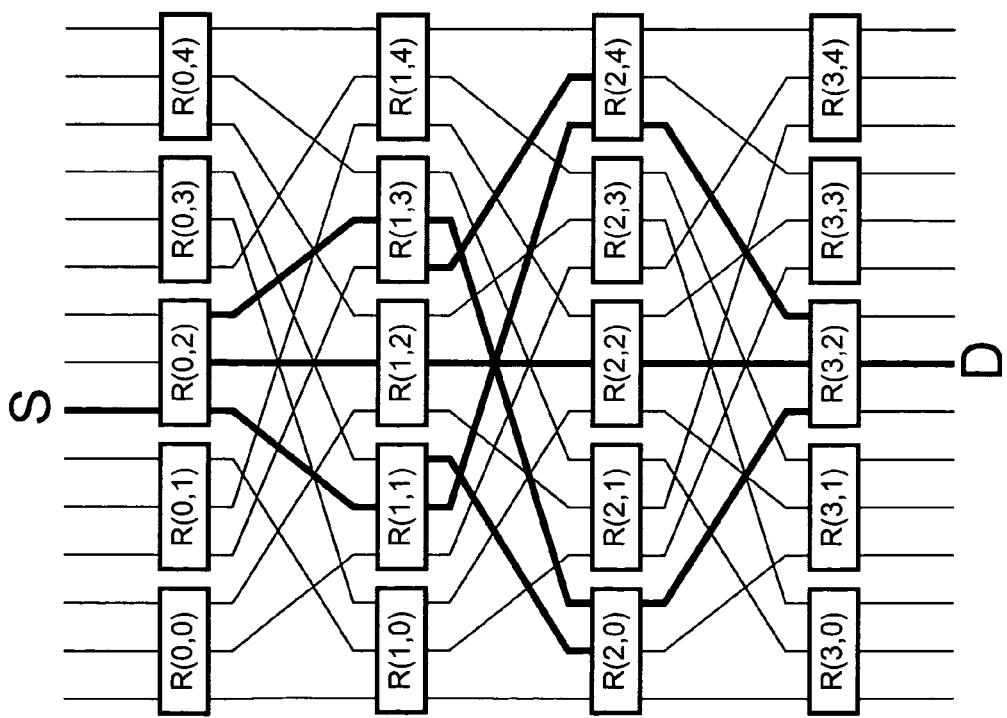

Suppose a breakdown occurs in switching element R(1,3) which is denoted by a hatched switching element in FIG. 35B. The neighboring switching elements R(0,1), R(0,2) and R(0,4) in stage 0, as well as switching elements R(2,0), R(2,1) and R(2,4) in stage 2, can become aware of the breakdown of switching element R(1,3) through a network management protocol. Once these switching elements remove R(1,3) from their own routing tables, the rest of the switching elements in the switching network become aware of the breakdown through the use of a dynamic routing protocol, which exchanges routing information with its neighbors. Using the example of FIG. 35B, there are now three paths (shown in bold) available from port S to port D. With the new updated routing information, switching element R(0,2) recognizes only two paths out of switching element R(0,2) that can reach port D.

Figure 36:
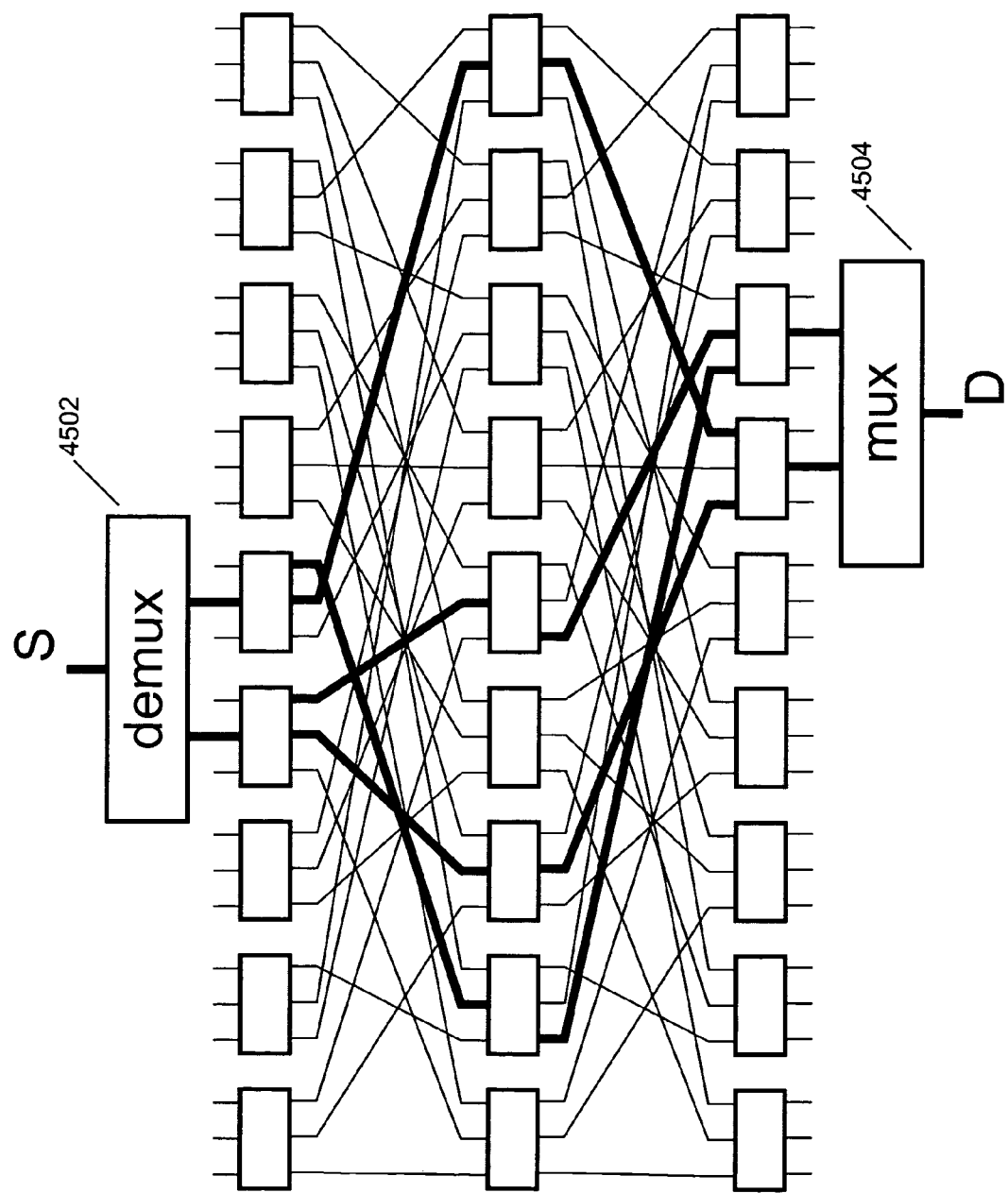
FIG. 36 shows a multiplexer demultiplexer scheme addressing faults in the switching elements at the edge of a switching network.

The difficulty arises when the fault occurs in a switching element at the perimeter of the switching network. For instance, in FIG. 35A, if switching element R(0,2) fails, no traffic can flow in from port S regardless of where the traffic is intended. Many embodiments of switching elements comprise a plurality of line cards which could fail individually. In other circumstances the switching elements themselves could fail. Huang suggests in U.S. Pat. No. 5,841,775 as depicted in FIG. 36 the use of a multiplexer 4502 and demultiplexer 4504 to distribute the traffic across multiple switching elements at the perimeter of the switching network. In another embodiment, access routers could be used in place of the multiplexers and demultiplexers which provide for a more responsive system to the occurrence of a fault. However, this merely pushes the single point of failure from the switching elements at the perimeter of the switching network to the access routers.

Another approach is the method described by Kumar in the background section, where an extra stage is added and can selectively be activated and deactivated. Though this approach can remedy the problems of faults encountered at perimeter switching elements, the deactivation of an entire stage when only one faulty switching element is detected leaves a number of fully functional switching elements completely inactive.

Figure 37:
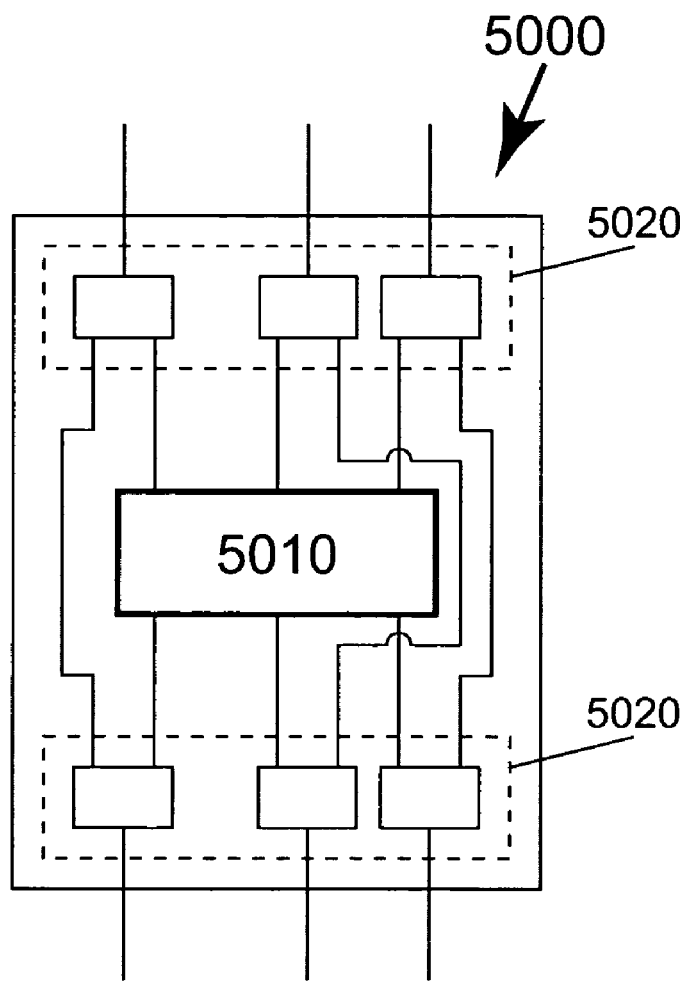
FIG. 37 shows a special switching element designed for use at the edge of a switching network.

FIG. 37 depicts a specially adapted switching element, comprising a central switching element 5010 and a switch pair 5000 through which a bypass is provided for each top port and bottom port. In some embodiments, this switch pair is a multiplexer-demultiplexer pair. In other embodiments, they could be "dead man switches" commonly used in optical networking. The dead man switches remain in a state which directs traffic to the central switching element, but when no signal such as a conventional "keep alive signal" is detected, the dead man switch switches to direct traffic to bypass the central switching element. These switches are known in the art and have been used for hot standbys in telecommunications for years. In one embodiment of the switching element, the switch pairs could be incorporated physically into a switching element. For example, a router could have line cards equipped with two ports, whereby traffic can bypass the router and flow between the two ports on the line card in the event of some failure on the part of the router.

Figure 38A:
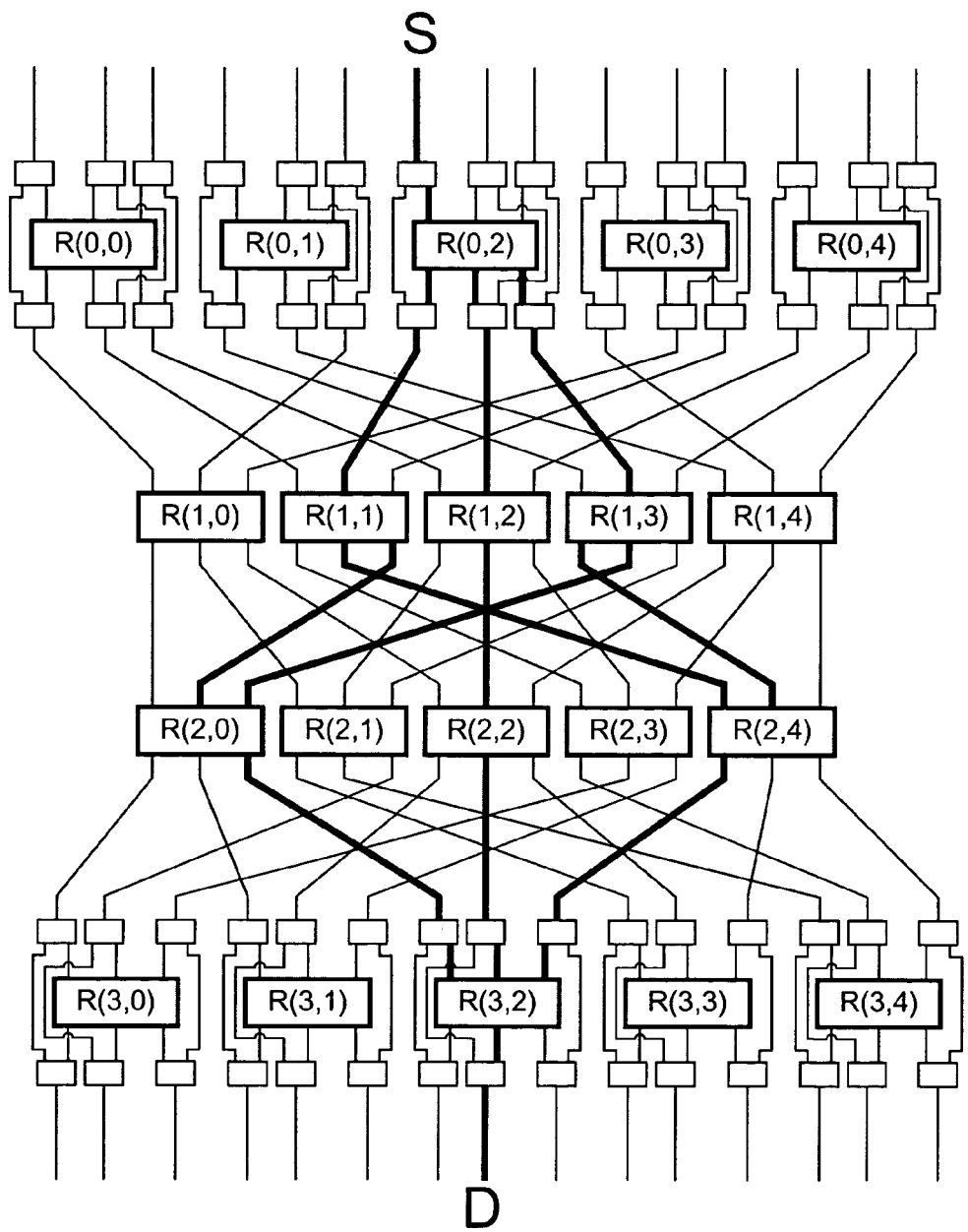
FIG. 38A and FIG. 38B shows the special switching element is used for fault tolerance in a scalable switching network.

FIG. 38A depicts the same 30-port RBCCG switching network as that of FIG. 35A except in the first and last stages, i.e. stage 0 and stage 3 in this example, the switching elements are the specially adapted switching elements of FIG. 37. Again, the five paths from port S to port D are highlighted in bold.

Figure 38B:
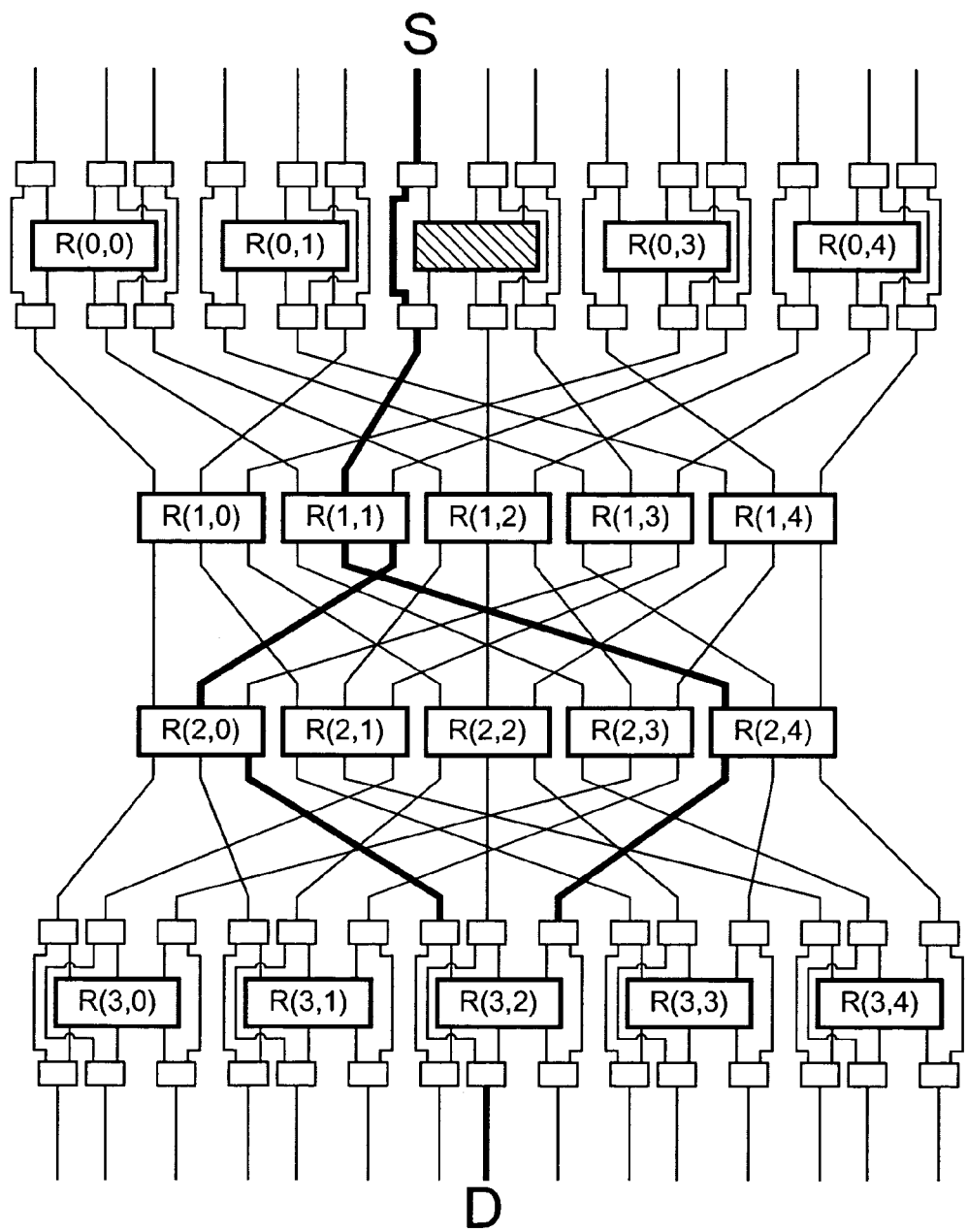

FIG. 38B illustrates the situation if switching element R(0, 2), denoted with crosshatching, fails. Traffic from top port 0 of switching element R(0,2) is automatically diverted out of bottom port 0 of switching element R(0,2) without passing through the central switching element within switching element R(0,2) and hence to top port 1 of switching element R(1,1). This leaves two remaining paths for the traffic to reach port D. With the specially adapted switching elements of FIG. 37, fault tolerance of a switching network to the failures of switching elements extends to all switching elements within the switching network.

This approach differs significantly from the extra stages used by Kumar, in that each switching element functions independently of any other switching element regarding the bypass capability, so that all switching elements not involved in a failure continue to relay traffic. Once a failure occurs in the system described by Kumar, the entire stage is bypassed, leaving any remaining switching element in the stage inactive even if it is still functioning.

Thus far, a variety of scalable switching networks have been described and methods of routing within these scalable switching networks and exploiting fault tolerance have been disclosed. The fault tolerance enables a dynamic upgrade to be performed while a scalable switching network is in operation.

When a multistage switching network such as a Banyan or crossover network is expanded, a new stage must be added as well as a doubling of its width. Adding a new stage requires that half of the external connections be disconnected in the process. This leads to an interruption in service.

Figure 39:
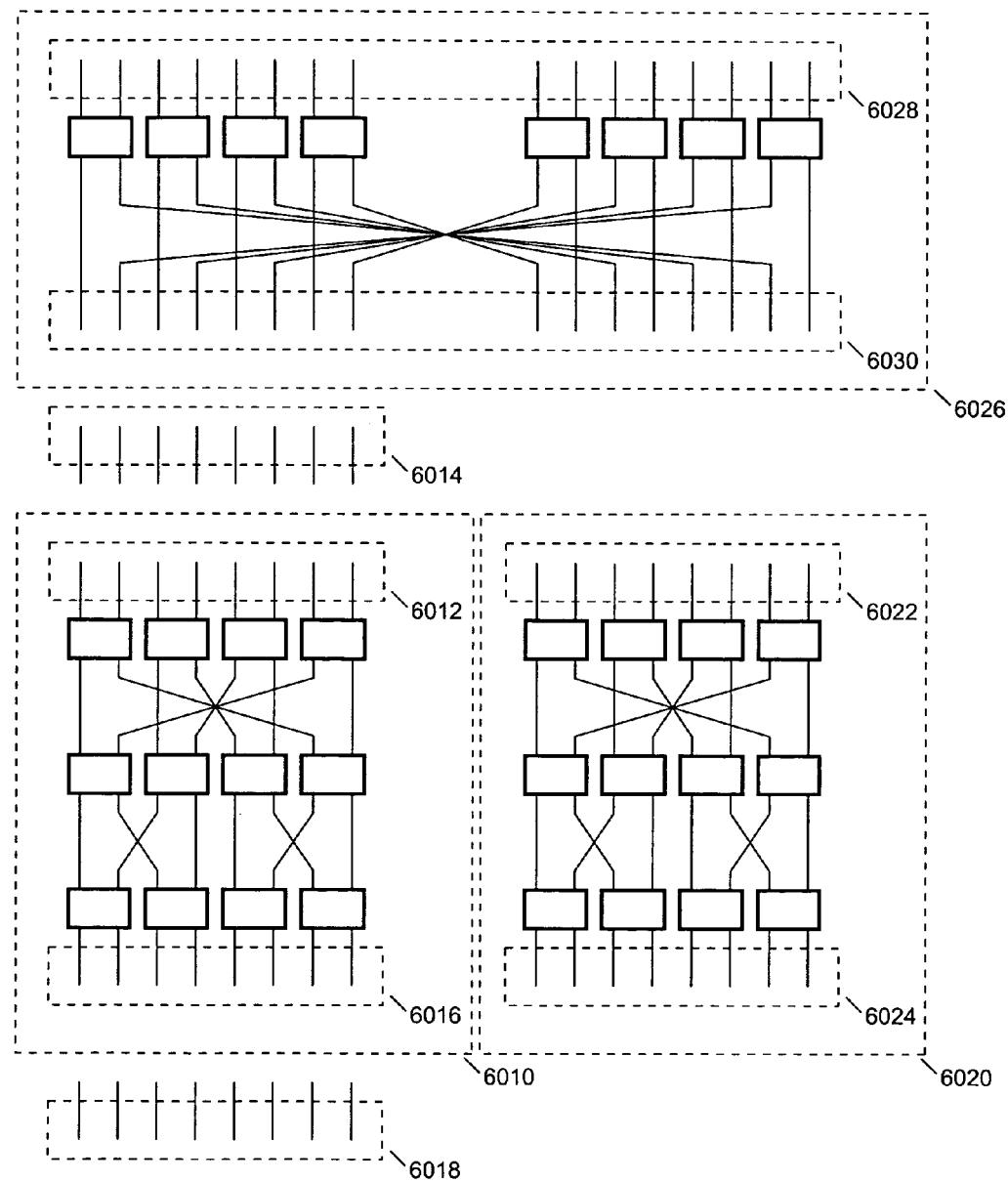
FIG. 39 shows a 32 port binary Butterfly multistage switching network with four stages.

A crossover network 6010 is shown in FIG. 39 with top ports 6012 connected to external connections 6014 and bottom ports 6016 connected to external connections 6018. A duplicate of this network 6020 with top ports 6022 and bottom ports 6024. A new stage 6026 with top ports 6028 and bottom ports 6030 are also shown.

In order to double number of external connections of the crossover network 6010, the connections between the top ports 6012 and external connections 6014 have to be broken and connected to the left half of new stage bottom ports 6030, and the external connections 6014 have to be connected to the left half of new stage top ports 6028. To complete the upgrade, the duplicate network top ports 6022 are connected to the right half of new stage bottom ports 6030. At this point, duplicate network bottom ports 6024 and right half of new stage top ports 6028 would be available for new external connections.

The problem is that the connections between the original network top ports 6012 and external connections 6014 have to be disconnected in the process. This leads to an interruption in service.

As indicated above, in order for a crossover network or other radix two network to be upgradeable by adding an extra stage, it must simultaneously be expanded by width. Though many multistage switching networks are defined as radix two, many of those networks, such as the Banyan and delta networks, have a generalized radix architecture leading to arbitrary fanouts. This leads to the question as to whether or how one would upgrade from one radix to another. For example, can a 16-port binary Banyan network such as the one depicted in FIG. 1A be upgraded to the 54-port trinary Banyan network depicted in FIG. 1C by increasing the fanout of the switching elements from two to three, since both networks have the same number of stages?

There is no known investigation of the process of upgrading the fanout of Banyan networks. There are two likely reasons why such an upgrade path is undesirable. First, most implementations of switching networks using the Banyan architecture employ specific binary sorting algorithms to route traffic. Second, an upgrade of an n-stage $2^{n+1}$-port binary network to an n-stage $2 \times 3^n$-port trinary network or n-stage $2 \times 4^n$-port quaternary network would entail an exponential growth in the number of ports required. For example, the 3-stage networks discussed above would involve an upgrade from a 16-port binary network to a 54-port trinary network to possibly the 128-port quaternary network. For a 4-stage network, this upgrade path would progress from a 32-port binary network to a 162-port trinary network to a 512-port quaternary network. For a 5-stage network, this upgrade path would progress from a 64-port binary network to a 486-port trinary network to an astronomical 2048-port quaternary network. Given that these are among the smallest upgrade scenarios, it is likely there would be little need for such upgrades. However, with the methods disclosed below and in prior U.S. Pat. No. 7,075,942, such an upgrade can be performed if desired.

There are many processes involving redundant multistage networks which require the rewiring of ISIC networks, including but not limited to upgrades (width, stage, fanout, and combination of these), downgrade (i.e. the reverse process of upgrades), and reconfiguration between architectures. With suitable redundancy, these processes can be performed without interruption of service and with minimal degradation of service during the upgrade/reconfiguration process. Rather than cite all occurrences of upgrade with the compound expression upgrade/reconfiguration the term upgrade and reconfiguration are used interchangeably. It should be understood that either term should be construed to include any combination of upgrading, downgrading and reconfiguring of a scalable switching network.

It should be noted that the use of a dynamic routing protocol such as those mentioned above, along with a network management protocol which can detect failures, can enable the reconfiguration procedures to be performed on switching networks with sufficient redundancy without loss of functional connectivity. In a practical setting, an upgrade or reconfiguration can be performed in a contemplative and deliberate manner, rather than rushing to perform and upgrade during a limited scheduled maintenance window.

As a prerequisite to the reconfiguration process, it is often useful to have a post-reconfiguration switching network design, also referred to as a post-reconfiguration architecture, already derived so that during the reconfiguration process, the implementer of the process is aware of where each port is connected to in the pre-reconfiguration switching network and the post-reconfiguration switching network. In the event that the reconfiguration involves the removal of a stage, an intermediate reconfiguration switching network design, also referred to as an intermediate reconfiguration architecture, should also be derived. The intermediate reconfiguration architecture is best described by working backwards from the post-reconfiguration architecture and "splicing in" the stage that is being removed with the splicing process is set forth below. In the description of the reconfiguration process, whenever the post-reconfiguration switching network is mentioned, it should be construed to also include the intermediate reconfiguration network unless explicitly excluded.

Furthermore, when discussing connectivity in the post-reconfiguration switching network (or the intermediate reconfiguration network depending on context), it is useful to refer to a given port's corresponding port as the port to which the given port is connected to in the post-reconfiguration switching network. That is, a bottom port's corresponding port is the top port which connects to that bottom port in the post-reconfiguration switching network. Similarly, a top port's corresponding port is the bottom port which connects to that top port in the post-reconfiguration switching network.

Figure 40:
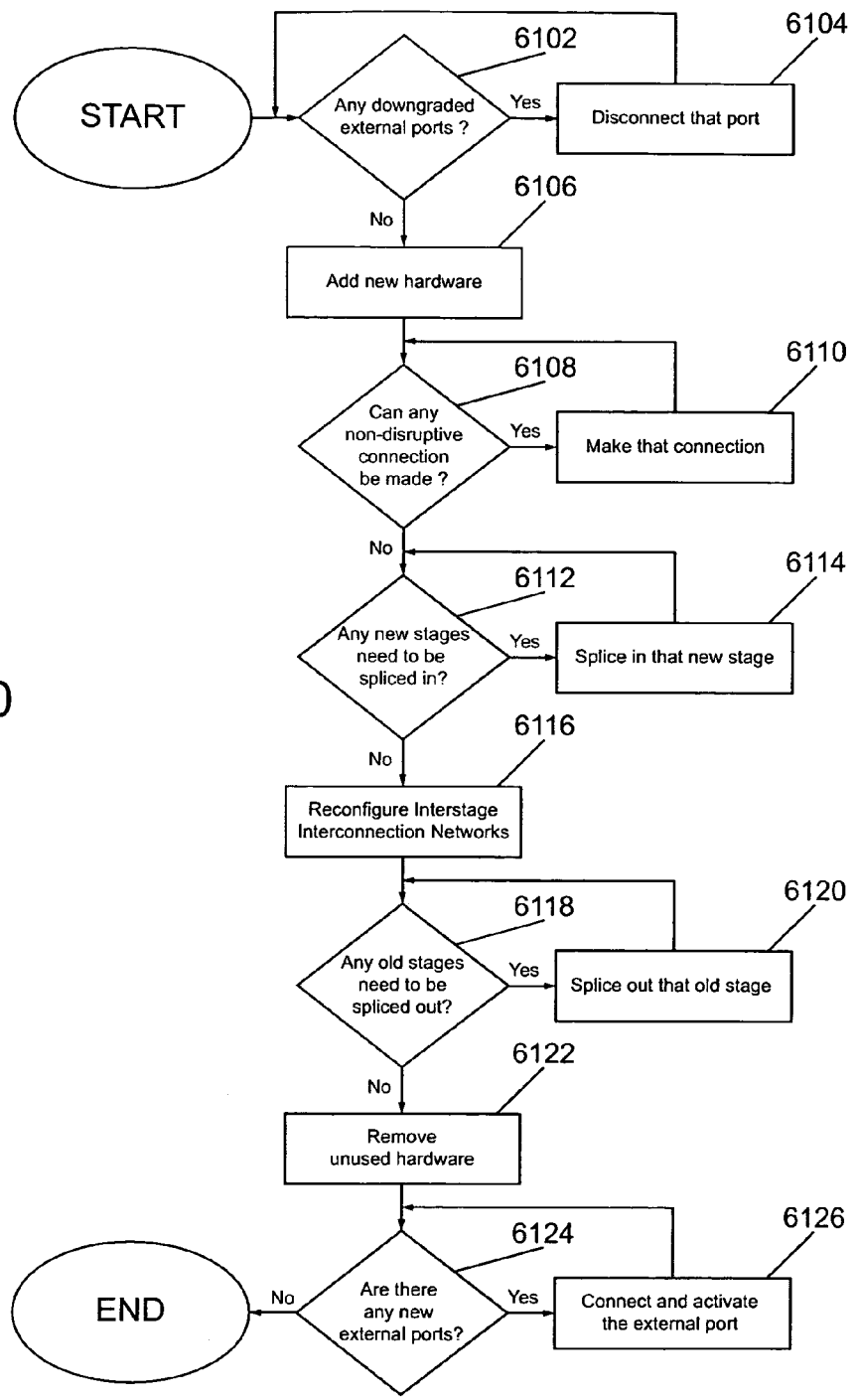
FIG. 40 shows flowchart for the reconfiguration process between a pre-reconfiguration architecture and a post-reconfiguration architecture.

Though the following embodiment depicts the process in a certain order, many of the steps can be interchanged in order. FIG. 40 depicts the overall reconfiguration process. The process begins by determining at step 6102 whether there are any of the external ports that are to be removed during the reconfiguration process; if so, they are deactivated and disconnected at step 6104. These "downgraded" external ports, for example, can be coupled to switching elements which are being removed, or they can be removed as part of a fanout downgrade.

Figure 41:
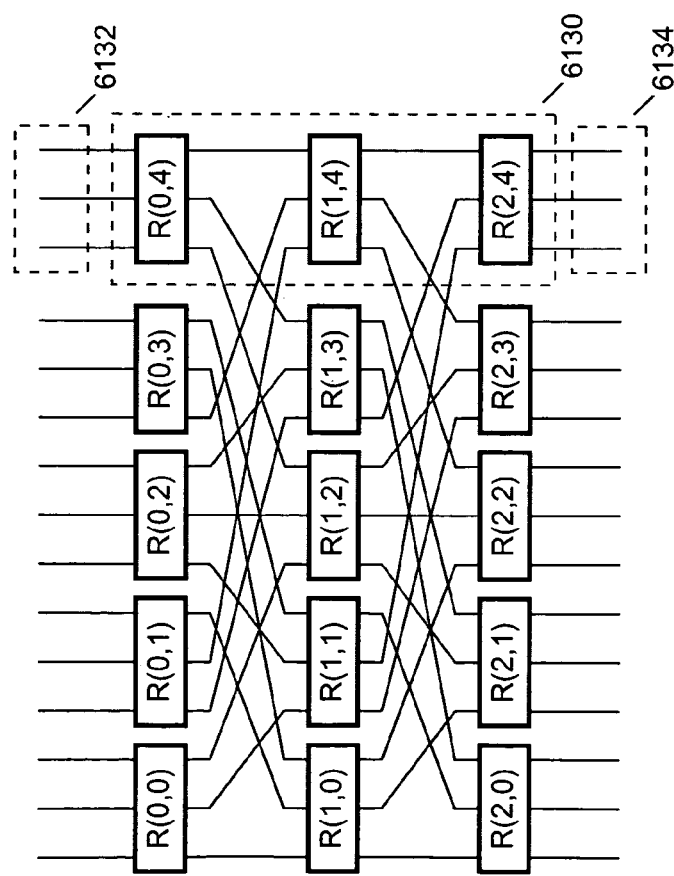
FIG. 41 shows a 30-port RBCCG switching network with 6 external ports attached to switching elements that are to removed as part of a downgrade process.

For example, FIG. 41 shows a balanced RBCCG switching network being downgraded from a width of 5 switching elements per stage to 4 switching elements per stage. Column 6130 is the column of switching elements to be removed. External connections 6132 and 6134 therefore must be disconnected from their external connections as dictated by this step.

After all the downgraded external ports have been deactivated and disconnected, add new hardware is added at step 6106. It is not necessary to add all new hardware at this point in the process and certainly hardware can be added as it is used. From the logical point of view, all hardware should be recognized as for where it is to be added in the post-reconfiguration switching network, that is, if the width is being upgraded, each switching element should be designated a position within each stage, or if the fanout is being downgraded which port is being ultimately removed should be designated. In one embodiment of the process, as soon as hardware is added to the switching network, it is activated so that traffic can be relayed by the new hardware even during the reconfiguration process.

Figure 42A:
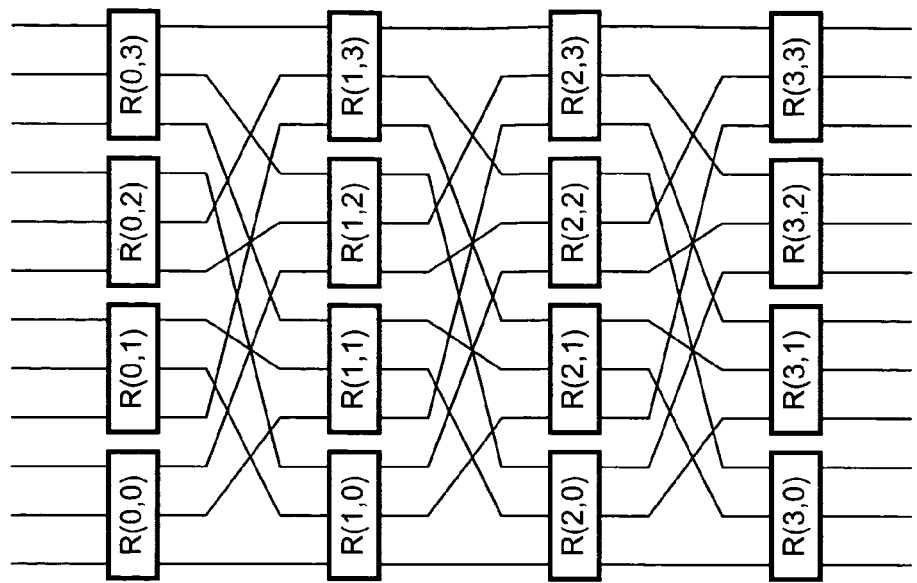
FIG. 42A, FIG. 42B, and FIG. 42C demonstrate the pre-configuration step while upgrading a 24-port RBCCG switching network to a 30-port RBBCG switching network
Figure 42C:
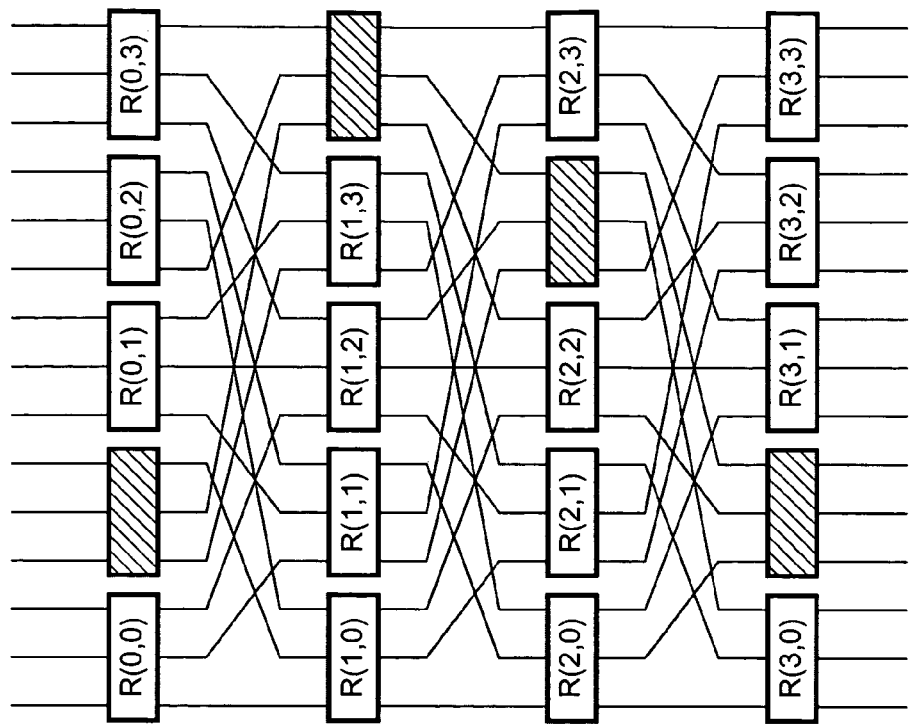
Figure 42B:
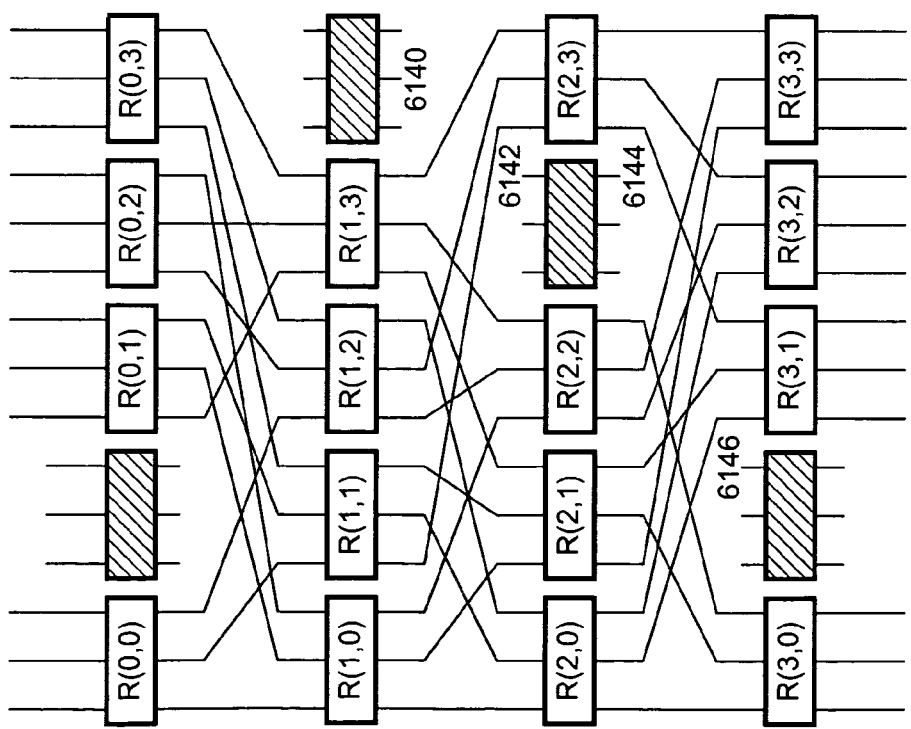

For example, FIG. 42A represents a 4 stage balanced RBCCG switching network that is to be upgraded from a width of 4 switching elements per stage to a width of 5. In accordance with this step, the hatched switching elements are inserted as shown in FIG. 42B. The post-reconfiguration switching network is shown in FIG. 42C.

Returning to FIG. 40, at step 6108 and step 6110, the optional step of pre-connecting unused ports is performed. At step 6108, a determination is made as to whether any of the unused ports can be connected to another unused port, that is, whether a port is unused as well as its corresponding port. Though optional, the pre-connection of these ports improves the path redundancy of the switching network, leading to better switching service during the reconfiguration process. The pre-connection step is described in greater detail below. Furthermore to bolster fault tolerance, one embodiment of this step connects an unused port to any other unused port.

At step 6112 and step 6114, any new stages that are added are spliced in. The splicing step is described in greater detail below.

At step 6116, all the ISIC networks are reconfigured, that is, they are rewired in accordance with the post-reconfiguration switching network or the intermediate reconfiguration switching network if the reconfiguration process involves a stage removal. During the rewiring step connections are described a broken, but in actuality it can be necessary to divert traffic away from the ports coupled to the connection. Often, the ports coupled to the connection can be shutdown or stopped. While decoupled from one port the connection can be moved to another port leaving the other end of the connection coupled to another port though the stage of the connection is that of being disconnected. Regardless the physical requirements, the rewiring process at the high level is described in terms of breaking connections and establishing connections. Additional steps are given at a lower level description of the process.

At step 6118 and step 6120, any stages that need to be removed are "spliced out." This operates in the reverse fashion as the splicing step described above.

At step 6122, all unused hardware can be removed. Regardless of physical removal, the unused hardware can no longer operate with the switching network.

At step 6124 and step 6126, any new external ports created through the reconfiguration process can be coupled to external connections and traffic is permitted to flow through them.

It should be noted that equivalences exist in the detail embodiments of reconfiguration process set forth below. For example, the mirror image of a network could be used or an upside down version, or other spatial transformation, rendering the choice of top or bottom, left or right somewhat arbitrary. For clarity in the embodiments below, a direction is selected so that the embodiments of the process can be demonstrated in detail.

Figure 43:
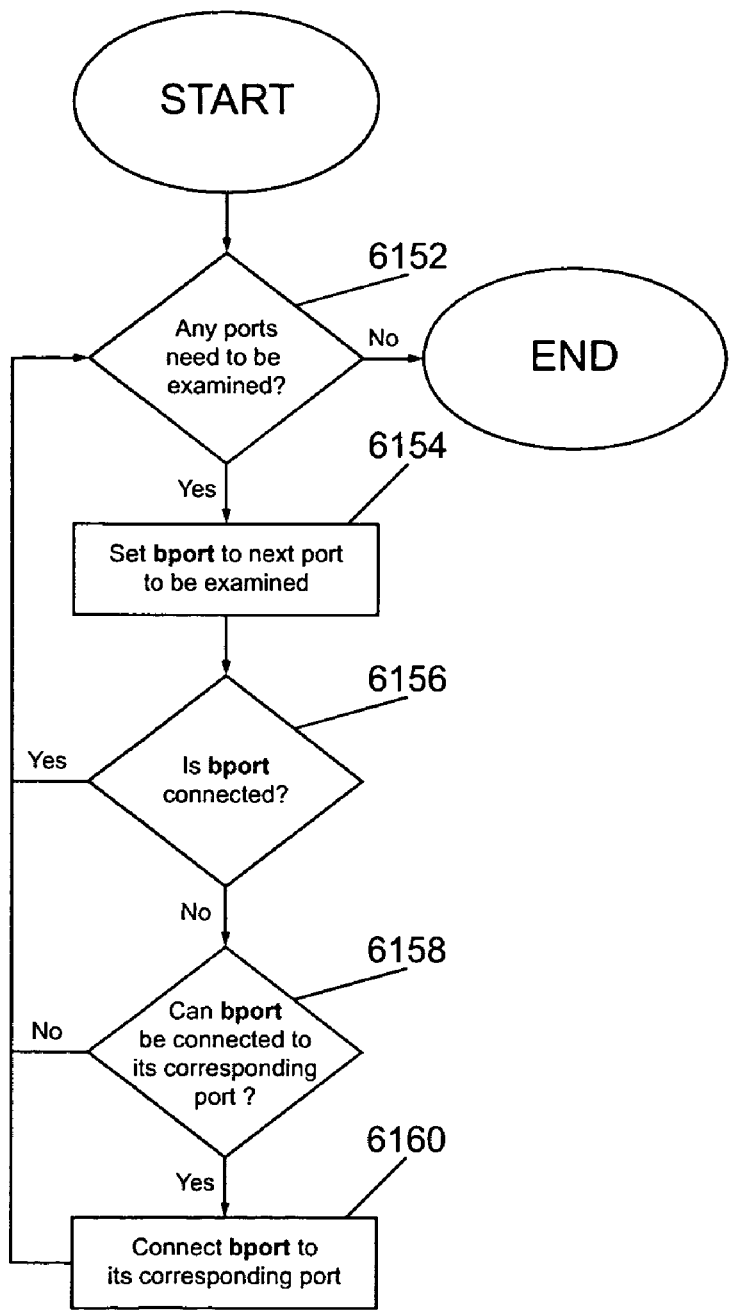
FIG. 43 shows flowchart for the pre-configuration step used in the reconfiguration process.

FIG. 43 illustrates in detail the pre-connection step. At step 6152, a determination is made as to whether all bottom ports have been examined. At step 6154, a bottom port bport is selected according to an ordering. If bport is not connected to anything as determined at step 6156 and if bport's corresponding port is not connected to anything as determined at step 6158, bport is connected to its corresponding port in step 6160. Basically, this process selects a bottom port (or equivalently a top port), and it determines whether a connection can be made without breaking an existing connection. If so, that connection is made, then the process repeats until every bottom port has been examined. A common method of ordering the bottom ports is a raster scan order, where the bottom ports of the stages from top to bottom are examined, and from left to right within each stage. Though raster scan order is given as an example, the order of examination is arbitrary.

For example, in the upgrade described above where a switching network shown in FIG. 42A is upgraded to the post-reconfiguration switching network shown in FIG. 42C. It can be determined that bottom port 6140 and its corresponding port 6142 are both unused; therefore, they can be connected without any negative impact on the switching network. It can also be determined that top port 6146 and its corresponding port 6144 are both unused; therefore, they can also be connected without any negative impact on the switching network. It should also be noted that no such determinations can be made between stage 0 and stage 1.

Figure 44:
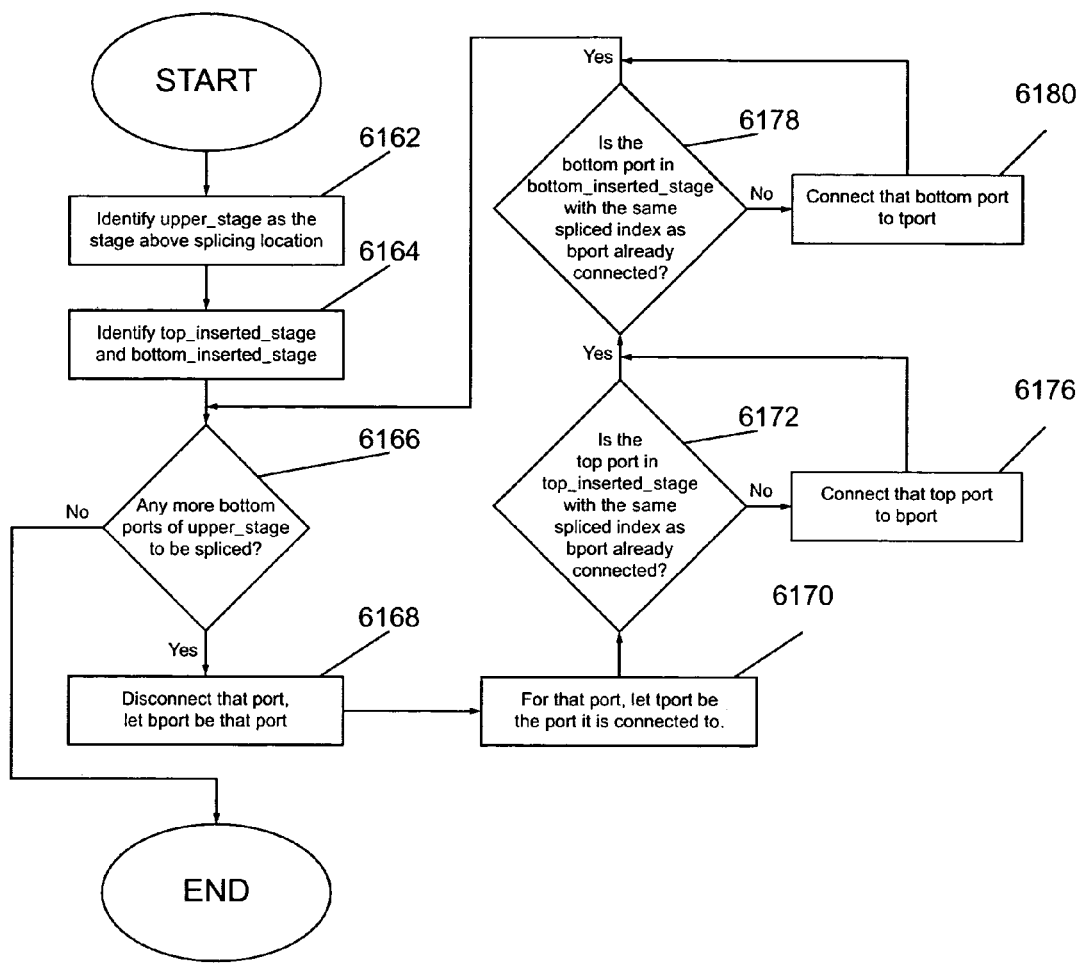
FIG. 44 shows flowchart for the splicing step used in the reconfiguration process.
Figure 45A:
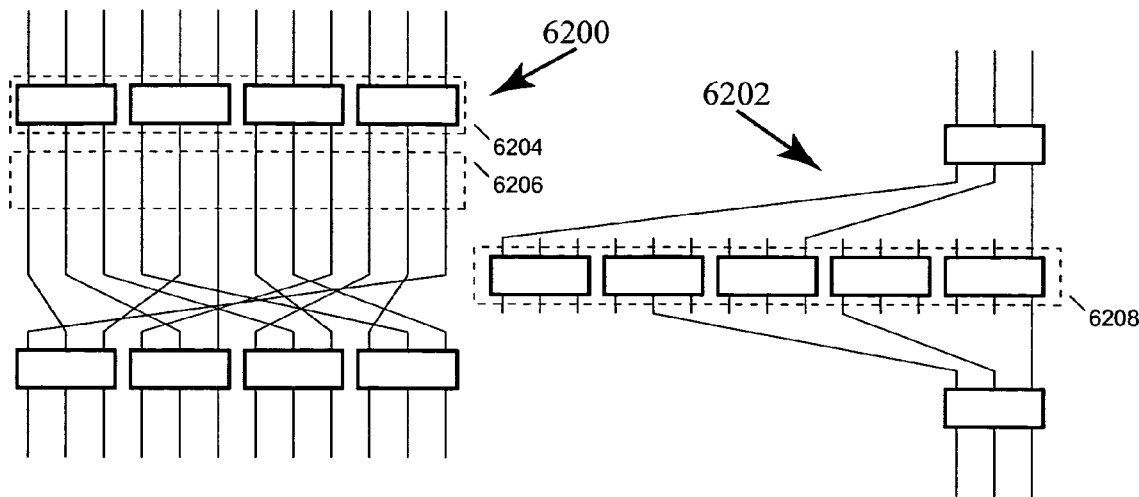
FIG. 45A, FIG. 45B, FIG. 45C, FIG. 45D shows the splicing step, where new stages of switching elements are inserted into an existing architecture.

FIG. 44 illustrates in detail the splicing step. At step 6162, the location of the splice is selected and the stage above the splice location is labeled upper_stage. In FIG. 45A, two stages of a multistage switching network 6200 with a collection of pre-connected switching elements 6202 are prepared for splicing into switching network 6200, whereby stage 6208 is the stage to be spliced. The splicing location is indicated at 6206, and stage 6204 is designated as upper_stage.

At step 6164, the top stage and bottom stage of the new switching elements are identified as top_inserted_stage and bottom_inserted_stage. In the example in FIG. 45A, only one extra stage is added, so top_inserted_stage and bottom_inserted_stage are identified with stage 6208. In a second example in FIG. 45C, a two stage switching network 6222 is spliced into switching network 6220 at the position indicated by 6224. Stage 6226 is designated as the upper_stage. In this example, stage 6228 is designated as the top_inserted_stage and stage 6230 is designated as the bottom_inserted_stage.

At step 6166, the bottom ports of upper_stage are each spliced in, and the splicing process is repeated until all bottom ports of the upper_stage are spliced. The order of operation is arbitrary, but can include splicing the bottom ports from left to right.

At step 6168, the bottom port being spliced is labeled bport and is disconnected, and at step 6170, the top port that bport is connected to is labeled tport. For the splicing process, it is useful to define the splice index of a port as its position in the stage. For example, port 2 of switching element 1 where the switching elements have a fanout of 3 has a splice index of 4.

At step 6172, a determination is made as to whether the top port in top_inserted_stage with the same splice index as bport is connected (possibly from the pre-connection step). If it is not, that top port is connected to bport in step 6176.

A determination is made as to whether the bottom port in bottom_inserted_stage with the same splice index as bport is connected (possibly from the pre-connection step) at step 6178. If it is not, that bottom port is connected to tport in step 6180.

Figure 45B:
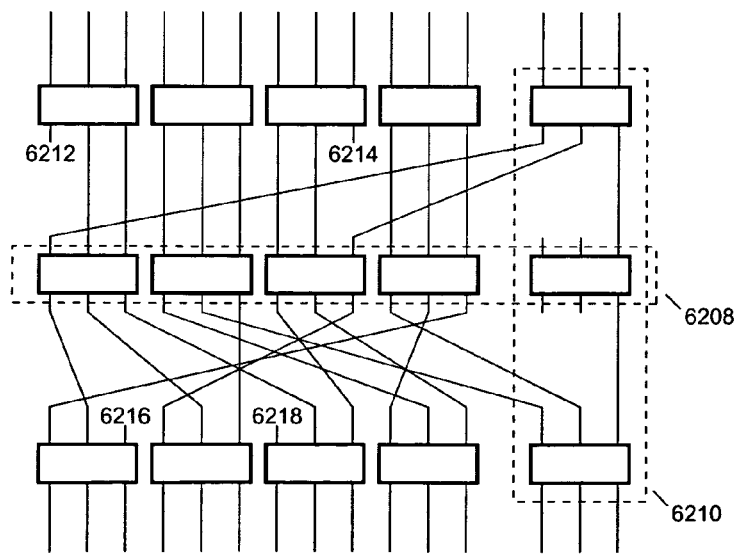
Figure 45C:
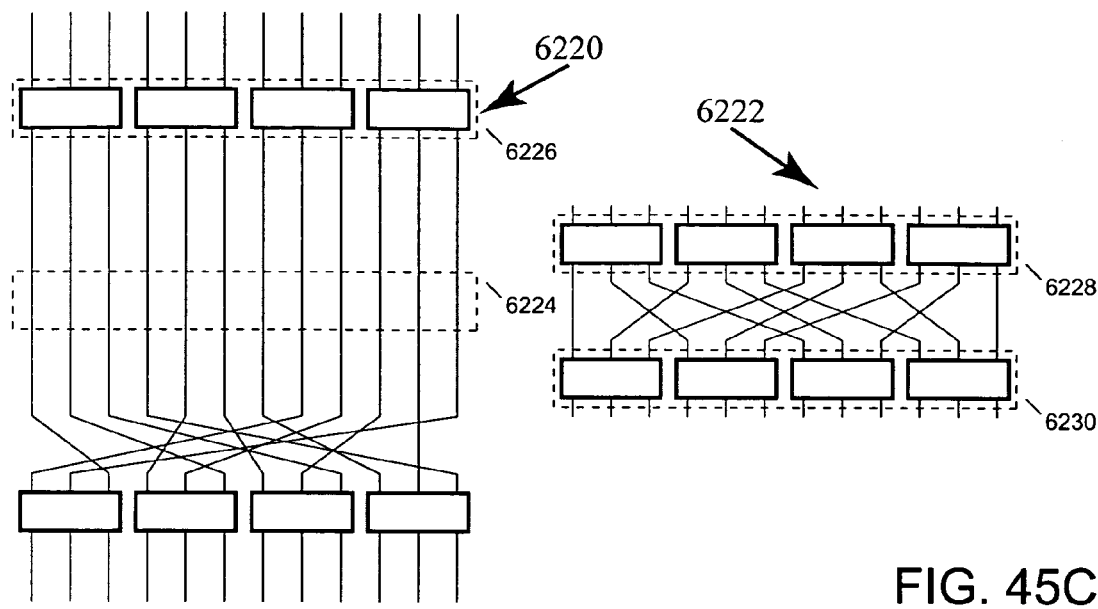

These steps are repeated until all bottom ports of upper_stage are spliced in. FIG. 45B shows the result of the completed splicing step. It should be noted that bottom ports 6212 and 6214 are not connected because port 6212 would have been connected to top port 0 of switching element 0 of stage 6208, which was connected previously in the pre-connection step. Likewise, port 6214 would have been connected, to top port 2 of switching element 2 of stage 6208 which was connected previously in the pre-connection step. In addition, top ports 6216 and 6218 are not connected, because top port 6216 would have been connected to bottom port 1 of switching element 1 of stage 6208, and top port 6218 would have been connected to bottom port 1 of switching element 3 of stage 6208, but both bottom ports were connected previously in the pre-connection step.

Figure 45D:
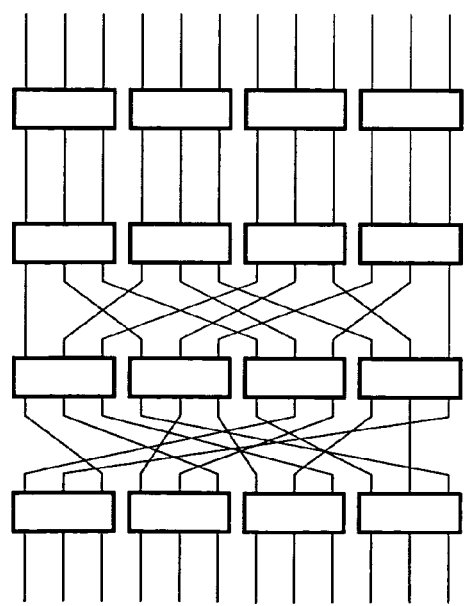

FIG. 45D shows the result of the complete splicing step into switching network 6220. In contrast, the result of this splicing is that all bottom ports in upper_stage are connected.

Figure 48A:
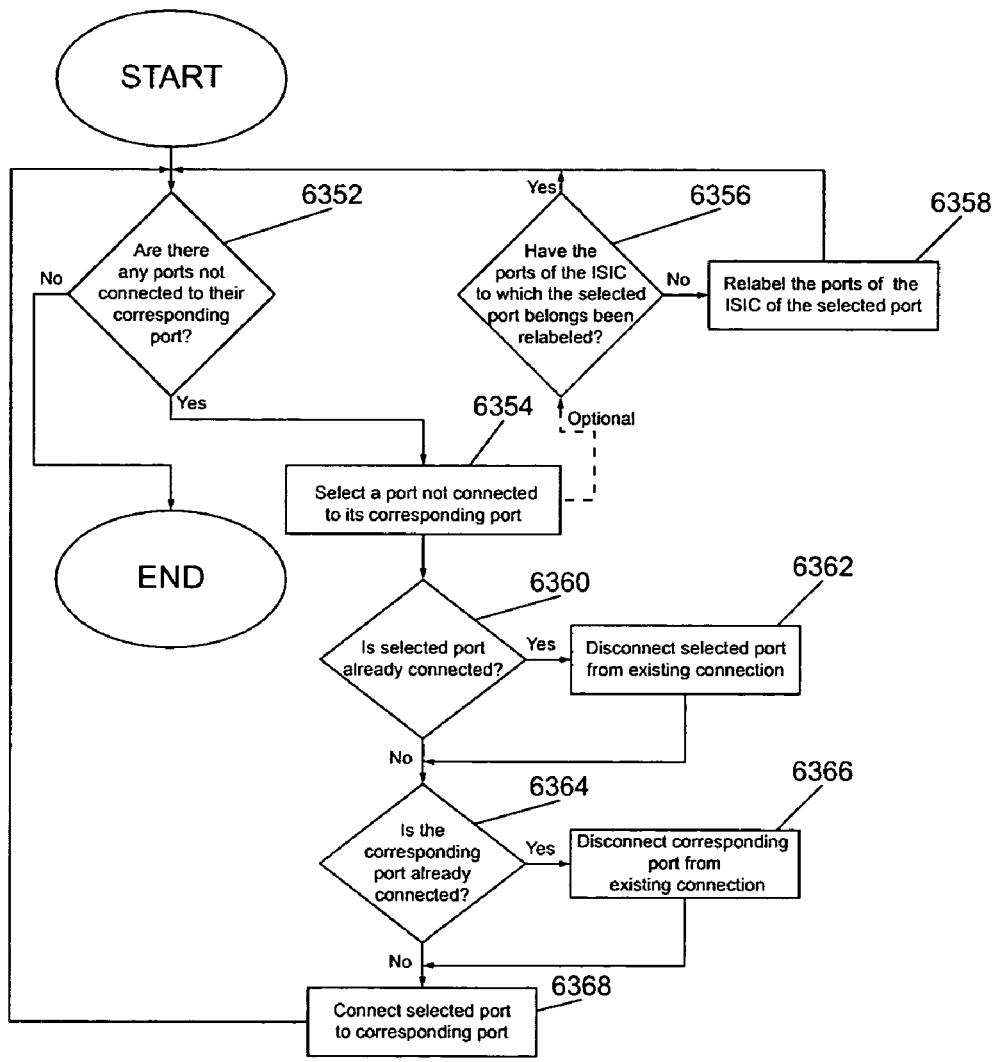
FIG. 48A and FIG. 48B show the flowcharts for the rewiring step used in the reconfiguration process.

The rewiring step which reconfigures all the ISIC networks to the post-reconfiguration architecture can be the most elaborate step in the reconfiguration process. There are many specific embodiments, some of which are disclosed here. FIG. 48A is a flow chart that diagrams the basic algorithm. At step 6352, a determination is made as to whether there are any ports not connected to their corresponding port; if none are found the rewiring step is complete. If there are such ports, one is selected at step 6354, and optionally, ports belonging to the ISIC network to which the selected port belong can be relabeled. In this context, a port belonging to the ISIC network to which a given port belongs means that if a given port is a bottom port, then all ports that are bottom ports of the same stage as the given port belong to the ISIC network; furthermore, all top ports of the stage below the stage to which the given port belongs also belong to the ISIC network. Similarly, if a given port is a top port, then all ports that are top ports of the same stage as the given port belong to the ISIC network; furthermore, all bottom ports of the stage above the stage to which the given port belongs also belong to the ISIC network. The relabeling step is described in detail below. In principle, the incremental substeps of the relabeling step can be interspersed with the incremental substeps of the remaining rewiring process. If no relabeling is performed, a determination is made at step 6360 as to whether the selected port is already connected; if so, it is disconnected in step 6362. Subsequently at step 6364, a determination is made as to whether the selected port's corresponding port is connected; if so, the corresponding port is disconnected at step 6366. Finally, the selected port is connected to its corresponding port, in effect rewiring the selected port. The process then repeats, until all ports are connected to their corresponding port. FIG. 48A details this rewiring process.

The selection of the port at each iteration can be accomplished by a variety of methods. For example, before the rewiring step, a list of all ports that are not connected to their corresponding port can be made, and the port selection follows that list by checking ports off as they are connected to their corresponding port.

Figure 48B:
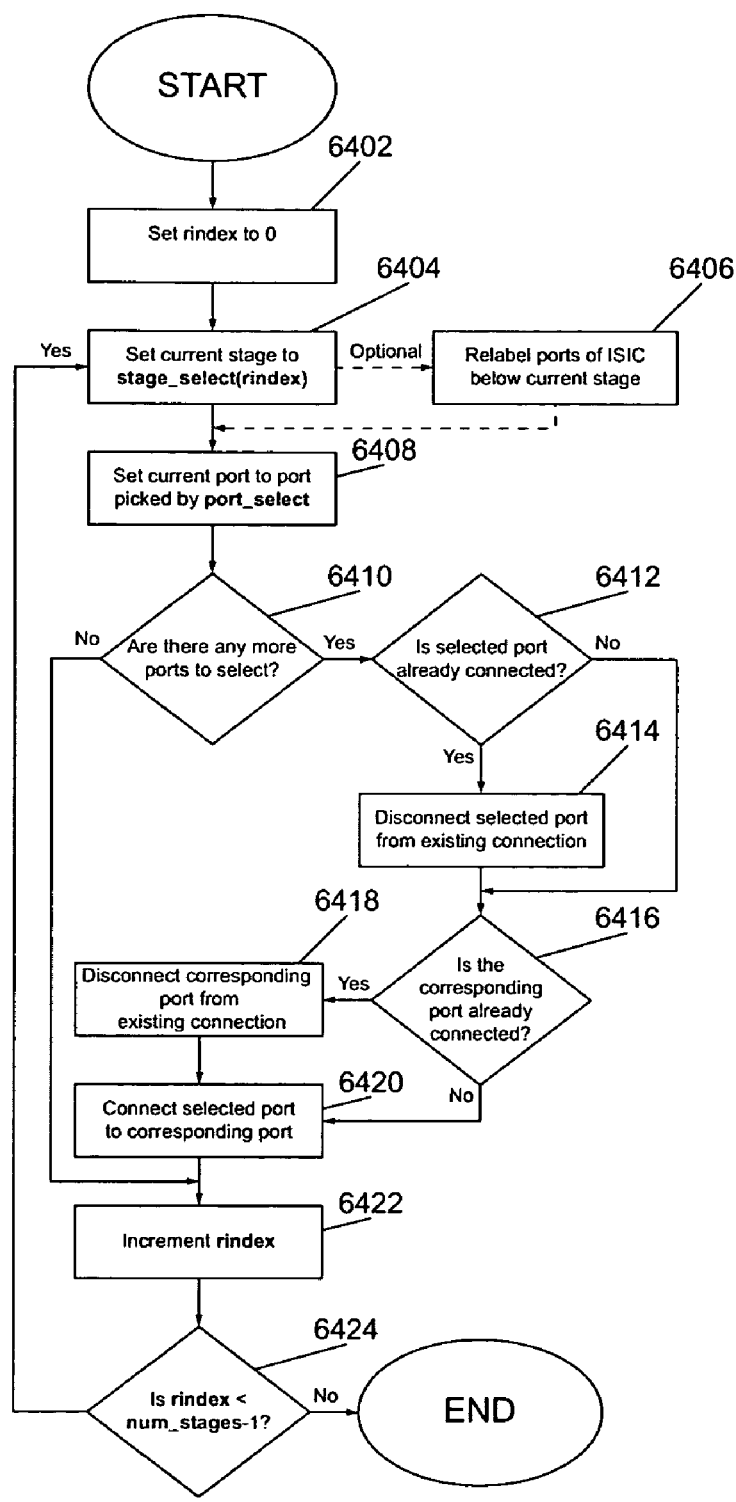

FIG. 48B breaks the process into a stage by stage rewiring. There is an index variable used to count the stages called rindex, which is initialized to zero at step 6402. At step 6404, a stage is selected by the function stage_select to be the current stage being rewired. Optionally, the ISIC network below the current stage is relabeled as set forth below. Next, at step 6408, the current port is selected by the function port_select. Typically the port_select function selects a bottom port of the current stage or a top port of the stage below the current stage. At step 6410, a determination is made as to whether there are any more bottom ports in the current stage or top ports in the stage below to select. If not, the rewiring step jumps ahead to step 6422. Otherwise, a determination is made at step 6412 as to whether the selected port is connected. If so, it is disconnected in step 6414. At step 6416, a determination is made as to whether the selected port's corresponding port is connected. If so, the corresponding port is disconnected at step 6418. At step 6420, the selected port is connected to its corresponding port. The process then repeats by returning to step 6404 until there are no more ports to be selected according to 6410. In this case, at step 6422, the rindex variable is incremented and the process repeats for another stage until all the stages have been selected as determined in step 6424. Since each iteration on rindex represents the rewiring between the current stage and the stage below the current stage, the bottom most stage is never selected and the rindex variable never exceeds num_stages−1.

The relabeling substep within the rewiring step logically rewires a switching element rather than physically rewiring a switching element when conditions permit. For example, if bottom port 0 of a switching element is supposed to be connected to another switching element in the stage below, but bottom port 1 actually is connected to that switching element, it would be convenient to swap the two ports. Since the port numbering is performed logically, renumbering can be performed logically.

Figure 47A:
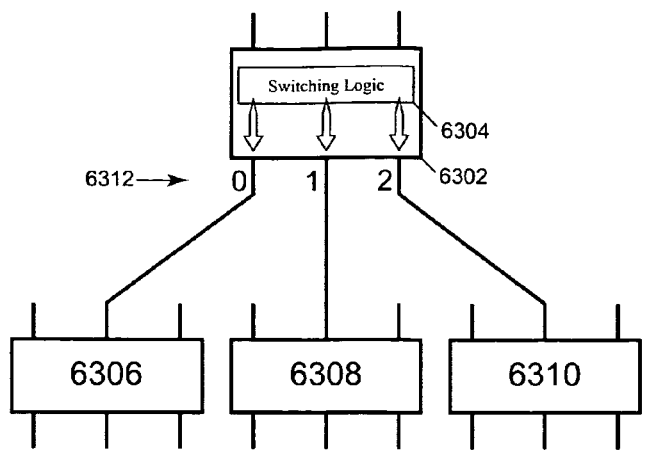
FIG. 47A, FIG. 47B shows conceptually how ports might be relabeled to form the effect of exchanging two ports on the same switching element.
Figure 47B:
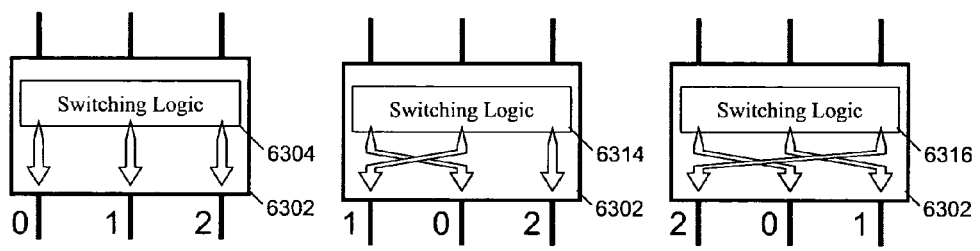
Figure 47C:
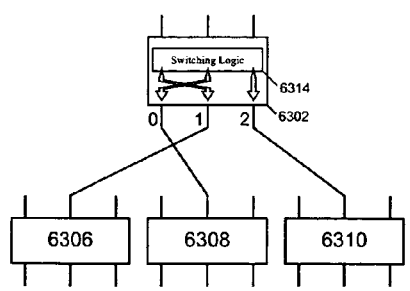
FIG. 47C, FIG. 47D shows the logical effect of conceptually how ports might be relabeled to form the effect of exchanging two ports on the same switching element.
Figure 47D:
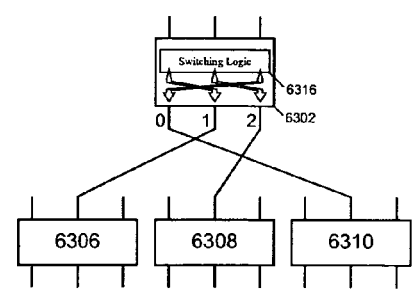

For example, FIG. 47A shows a switching element 6302 having switching logic 6304, and connected to switching elements 6306, 6308 and 6310. The logical port numbers are indicated at 6312. In FIG. 47B, the switching logic is reconfigured. For example, switching logic 6314 now reverses bottom port 0 and bottom port 1. Switching logic 6316 permutes all three bottom ports to the numbering indicated. By reconfiguring switching element 6302 to switching logic 6314, the logical connectivity of the four switching elements depicted in FIG. 47A becomes that depicted in FIG. 47C. Similarly, reconfiguring switching element 6302 to switching logic 6316 yields a logical connectivity as depicted in FIG. 47D.

Figure 46:
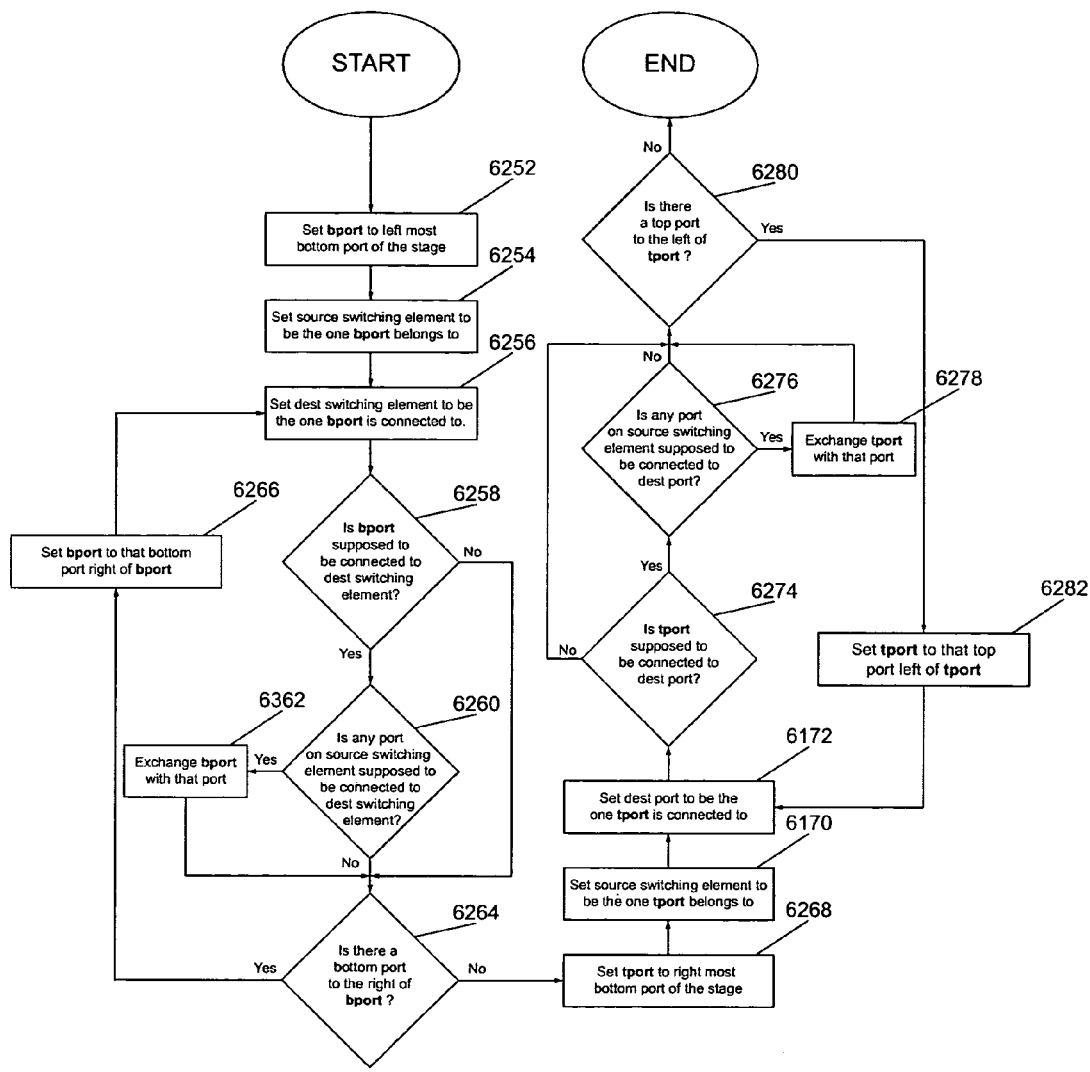
FIG. 46 shows flowchart for the relabeling phase used in the rewiring step.

This example illustrates the method of implementing a logical relabeling. FIG. 46 is a flowchart describing how it can be employed in relabeling the ports attached to an ISIC network. The relabeling step described in FIG. 46 applies only to a single ISIC network which is given by the stage attached directly above the ISIC network. At step 6252, bport is set to the leftmost bottom port of the stage. At step 6254, the source switching element is defined to be the switching element to which bport is attached. At step 6256, the destination switching element is defined to be the switching element to which bport is connected to, if connected at all. If bport is supposed to be connected to the destination switching element, i.e., its corresponding port belongs to the destination switching element as determined in step 6258, then no relabeling is performed, thereby ending this iteration. Otherwise, if any port on the sources switching network is supposed to be connected to the destination switching element as determined in step 6260, then that port is logically swapped with bport. At step 6264, the iteration ends and repeats by setting bport to the bottom port right of the old bport value at step 6266 unless bport is determined at step 6264 to be the rightmost bottom port of the stage. This concludes the first phase of the relabeling step. The second phase begins at step 6268, where tport is set to the rightmost top port of the stage below the one given to the relabeling method (call it the subsequent stage as a shorthand). At step 6170, the source switching element is set to be the switching element tport belongs to. At step 6172, the destination port is set to be the port tport is connected to. It should be noted here that the first phase insures that the bottom ports are connected to the correct switching element in the subsequent stage. Now, the objective is to insure the correct top port on the subsequent stage is connected to the correct port, i.e., its corresponding port. At 6274, a determination is made as to whether tport is supposed to be connected to its destination port, i.e., the destination port is tport's corresponding port. If so, that ends this iteration at step 6280. Otherwise, a determination is made as to whether any port on the source switching element has a corresponding port matching the destination port at step 6276. If so, that port is logically swapped with tport at step 6278. The iteration ends at step 6280, and repeats by setting tport to the top port left of the old tport value at step 6282 unless tport is determined at step 6280 to be the leftmost bottom port of the subsequent stage, in which case the relabeling phase for the stage is complete.

It should be noted that though scanning bottom ports from left to right and top ports from right to left is used in FIG. 46, the ordering is arbitrary. Linear scanning such as left to right and vice versa are simpler to implement in software.

Figure 49A:
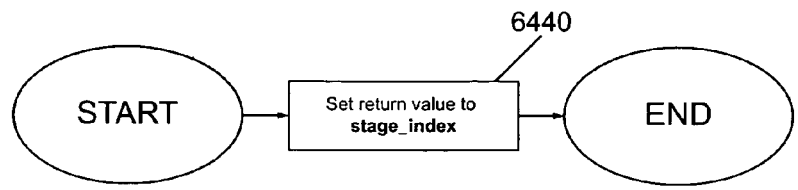
FIG. 49A and FIG. 49B show the flowcharts for two embodiments of the stage selection subroutines used in the rewiring step.
Figure 49B:
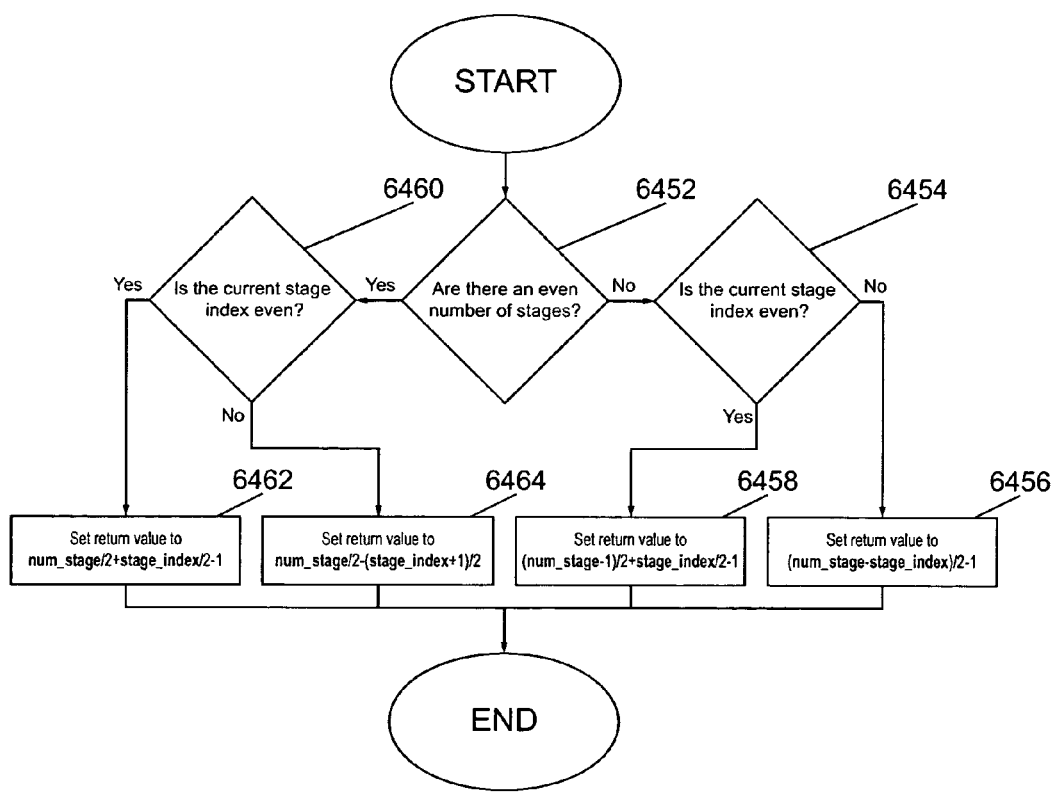

As described above, the embodiment of the rewiring step depicted in FIG. 48B requires two subroutines stage_select and port_select. The purpose of the stage_select subroutine is to offer an order of rewiring the ISIC networks. By convention, the term rewiring a stage actually refers to rewiring the ISIC network coupled directly below the stage, rather than specifying an ISIC network by referring to it as the ISIC network located between stage n and stage n+1. The purpose of the port_select subroutine is to select a port "within the ISIC network," that is more precisely to select from either the bottom ports of the selected stage or from the top ports of the stage immediately below the selected stage. FIG. 49A and FIG. 49B describe two embodiments of the stage_select subroutine. In FIG. 49A, the stages are selected according to their index, so the ISIC networks are rewired from top to bottom. In FIG. 49B, the stages are selected with the middlemost stage first, then alternating above and below the middlemost stage, progressively selecting a stage farther and farther away from the middlemost stage, until all stages are described. The latter generally exhibits better redundancy throughout the rewiring process. Many other embodiments of stage_selection can be employed as well.

Figure 50A:
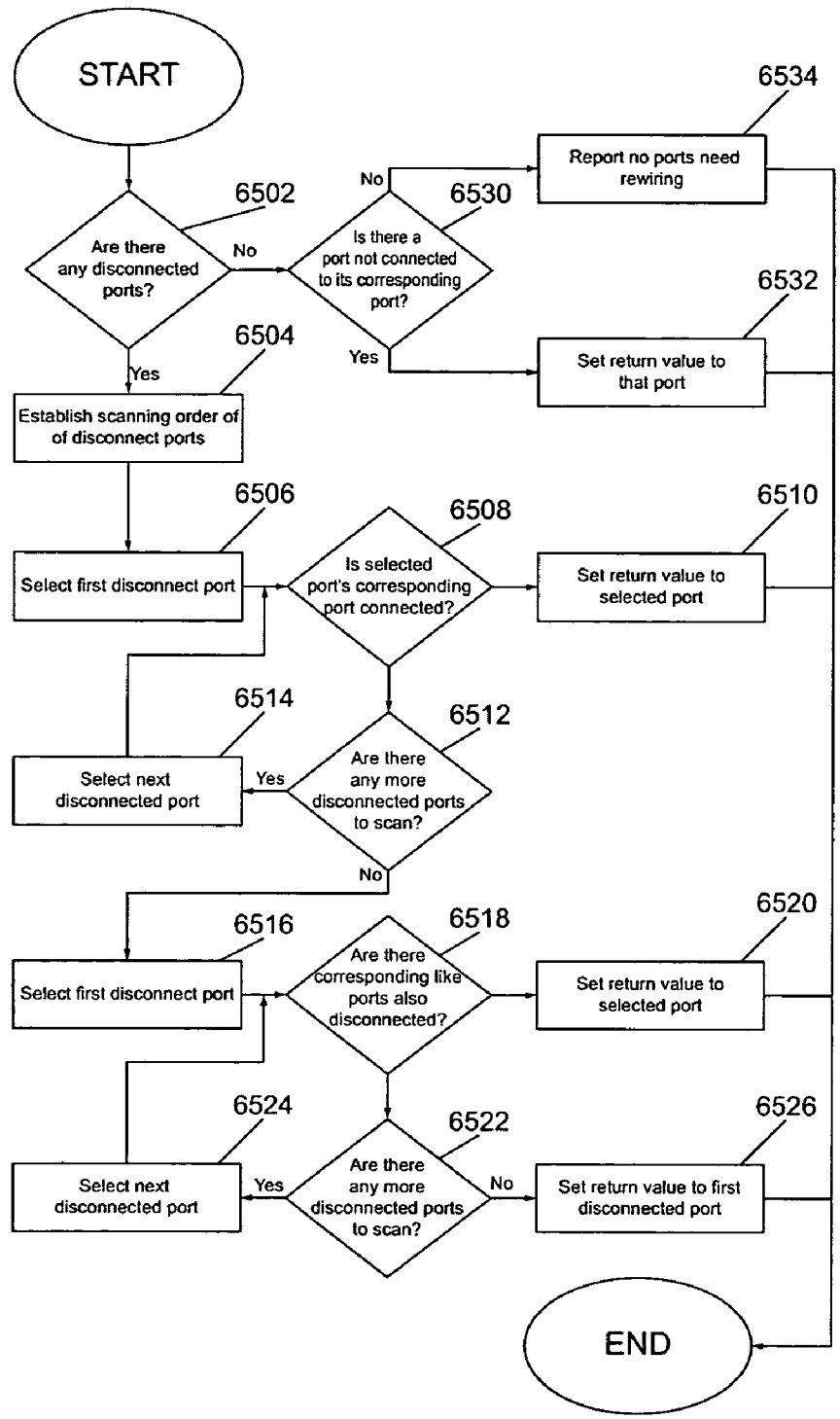
FIG. 50A, FIG. 50B and FIG. 50C show the flowcharts for three embodiments of the port selection subroutines used in the rewiring step.

There are an arbitrary number of port_select subroutines. Set forth here are three exemplars. FIG. 50A depicts one exemplary embodiment of the port_select subroutines. First, at step 6502, a determination is made as to whether there are any ports that are not connected. If none exist, the subroutine jumps to step 6530. At step 6504, a scanning order of all disconnected ports is established, for example, lexicographical ordering with top port before bottom port and left port before right port. The iteration is initialized in step 6506 by setting the test port to the first port in this ordering that is not connected. At step 6508, a determination is made as to whether the test port's corresponding port is connected; if not, the test port is selected in step 6510, ending the subroutine. Otherwise, the testing repeats for the next test port. If there are ports to be scanned as determined by 6512, the next port is selected in the scanning order that is not connected to its corresponding port in step 6514. If the there are no more ports to be scanned, the scan order is reset at 6516 by setting the test port to the first port in the scanning order that is not connected. At step 6518, a determination is made as to whether switching element to which the test port's corresponding port belongs already has a like port disconnected; that is, if test port is a bottom port, is there another bottom port disconnected, and likewise if test port is a top port. If not, then the test port is selected in step 6520 and the subroutine ends. Otherwise, the testing repeats for the next test port. If there are ports to be scanned as determined by 6522, the next port is selected in the scanning order that is not connected to its corresponding port in step 6524. If the there are no more ports to be scanned, then the first disconnected port in the scanning order is selected, and the subroutine ends. At step 6530, a determination is made as to whether there is a port not connected to its corresponding port. If so, the first one in the scanning order is selected at step 6532, and the subroutine ends. If not, there are no ports in need of rewiring, and the subroutine indicates that in step 6534.

Figure 50B:
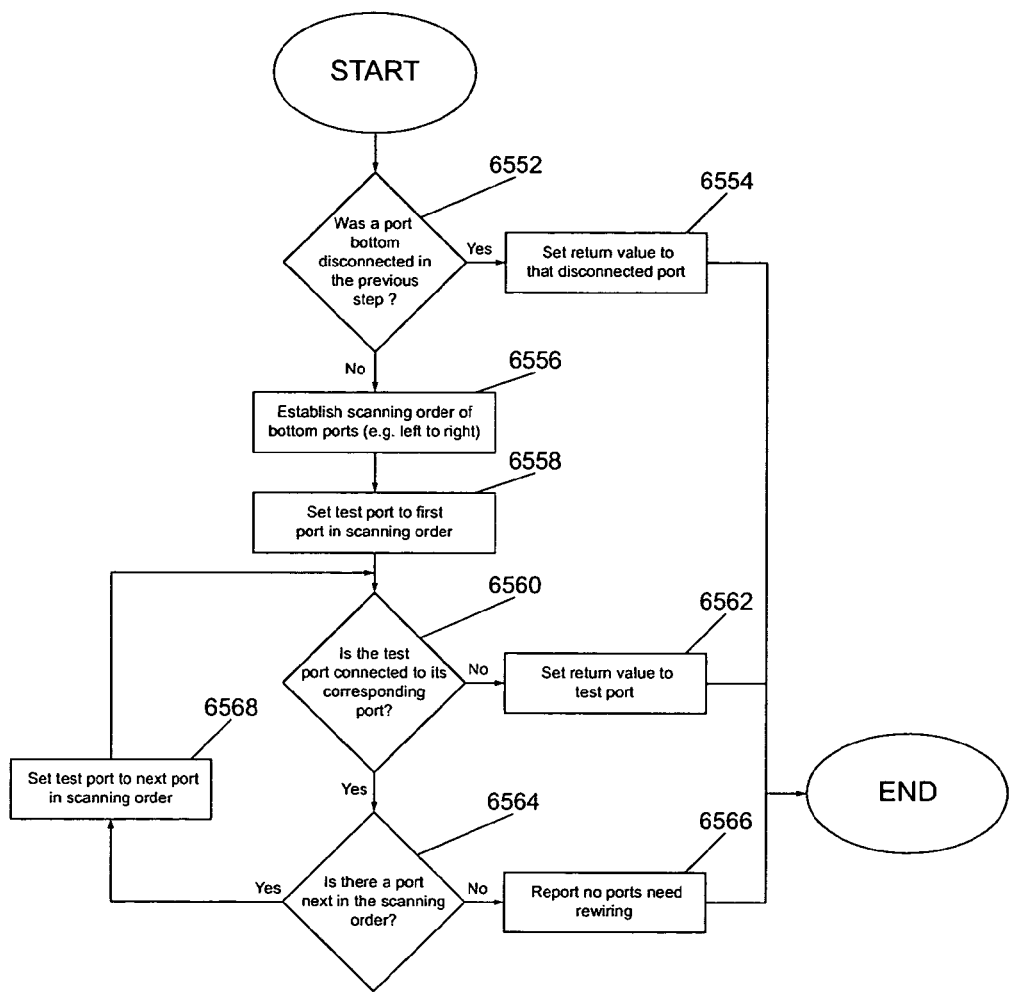

FIG. 50B depicts a simpler embodiment of the port_select subroutine. At step 6552, a determination is made as to whether there was a bottom port disconnected in the previous call to the subroutine (if there was one). If there was, at step 6554, the disconnected port is selected and possibly a new bottom port is disconnected as a result of rewiring the selected port. That disconnected port can be saved for the next call to the subroutine. If no bottom port was previously disconnected, or if this is the first call to the subroutine, a scanning order of bottom ports is established at step 6556. At step 6558, the test port is set to the first port in the scanning order. If the test port is not connected to its corresponding port, the test port is selected, and any bottom port that is disconnected as a result of the rewiring of the selected port is saved for the next call; otherwise, the iteration continues if at step 6560 it is determined that there is another port in the scanning order. If not, the subroutine ends at 6562, with the notification that there are no ports requiring rewiring. Otherwise, the iteration repeats by setting the test port to the next port in the scanning order.

Figure 50C:
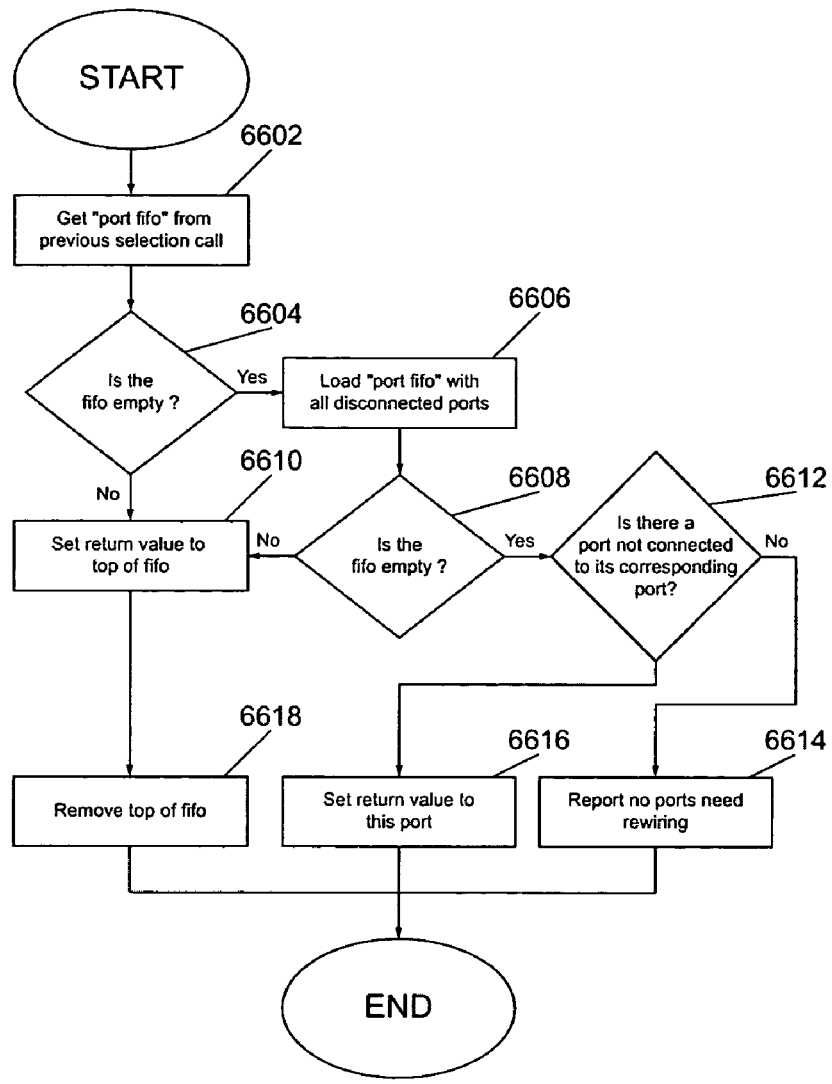

FIG. 50C depicts an elaborate embodiment of the port_select subroutine. In this embodiment, a first-in first-out (FIFO) queue is used. At step 6602, the FIFO is retrieved from possible previous calls to the subroutine. At step 6604, the FIFO is checked if it is empty. If it is empty, it is reloaded at step 6606 with all the ports that are disconnected. At step 6608, the FIFO is checked again. If it is still empty, a determination is made at step 6612 to determine if there is a port not connected to its corresponding port. If not, no ports require rewiring, and the subroutine issues a notification at step 6614. If there is a port not connected to its corresponding port, that port is selected at step 6616 and the subroutine ends. If the FIFO is not found to be empty at either 6604 or 6608, the port at the top of the FIFO is selected at step 6610. The top entry of the FIFO is removed at step 6618, and the subroutine ends.

As described above, the unsplicing or "splicing out" step is essentially the reverse of the splicing. This step is only used if there are unwanted stages that need to be downgraded out of the switching network. When this is the case, all the preceding steps employ the intermediate reconfiguration architecture as a guide for determining topological quantities, such as the corresponding ports, rather than the post-reconfiguration architecture.

Figure 51A:
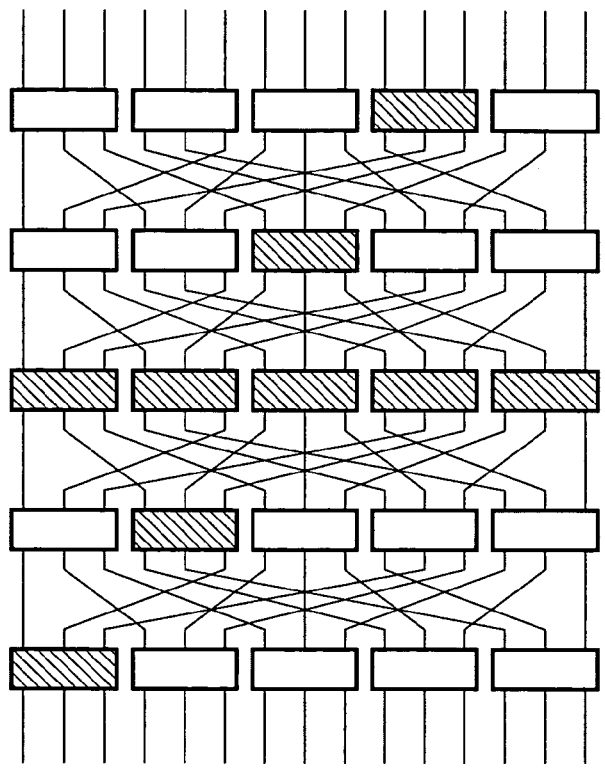
FIG. 51A depicts a 30-port 5-stage RBCCG switching network about the be down-graded.
Figure 51B:
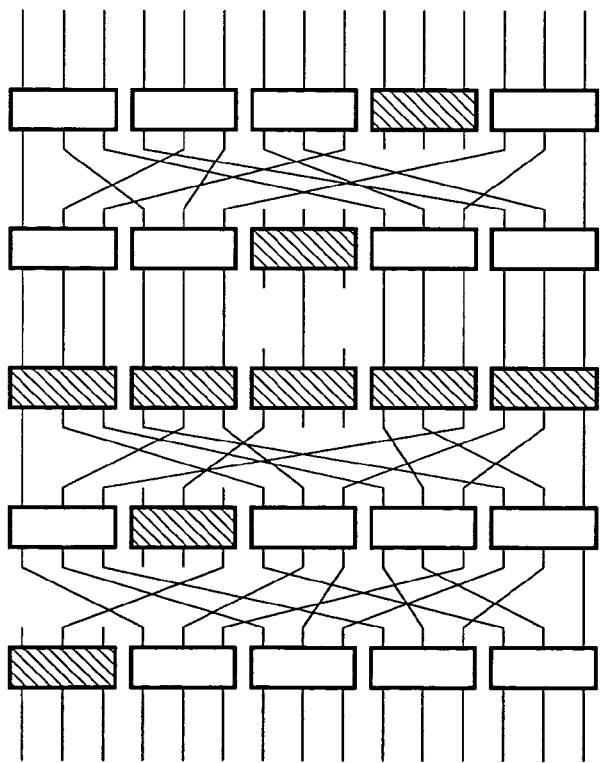
FIG. 51B depicts the intermediate architecture in the downgrade process.

FIG. 51A depicts a 30-port 5 stage balanced RBCCG switching network slated to be downgraded to a 24-port 4 stage balanced RBCCG switching network by removing the switching elements marked with hatching. Careful calculations show that FIG. 51B represents the intermediate reconfiguration switching network. This was determined essentially by taking the true post-reconfiguration architecture (not the intermediate one) and splicing in the switching elements that are being removed. Basically, this is derived from reversing the upgrade process.

The unsplicing operation is described as follows, if a proper intermediate reconfiguration switching network is derived. The top ports of the upper most stage being unspliced are iterated through perhaps using a left to right ordering. The matching bottom ports of the lower most stage being unspliced are also identified. If both top port i of the upper most stage and bottom port i of the lower most stage are both connected, both connections are broken and the bottom port to which top port i of the upper most stage is connected and the top port to which bottom port i of the lower most stage is connected should be connected together. If either top port i of the upper most stage or bottom port i of the lower most stage are not connected, the unsplicing for that i can be skipped. In this embodiment, the value of i runs through all values from 0 to W×F−1. The result of the unsplicing is shown in FIG. 51C.

The following three examples apply the reconfiguration process set forth above to the three basic modes of upgrading a multistage switching network: a stage or row upgrade, a width upgrade, and a fanout upgrade.

Figure 52B:
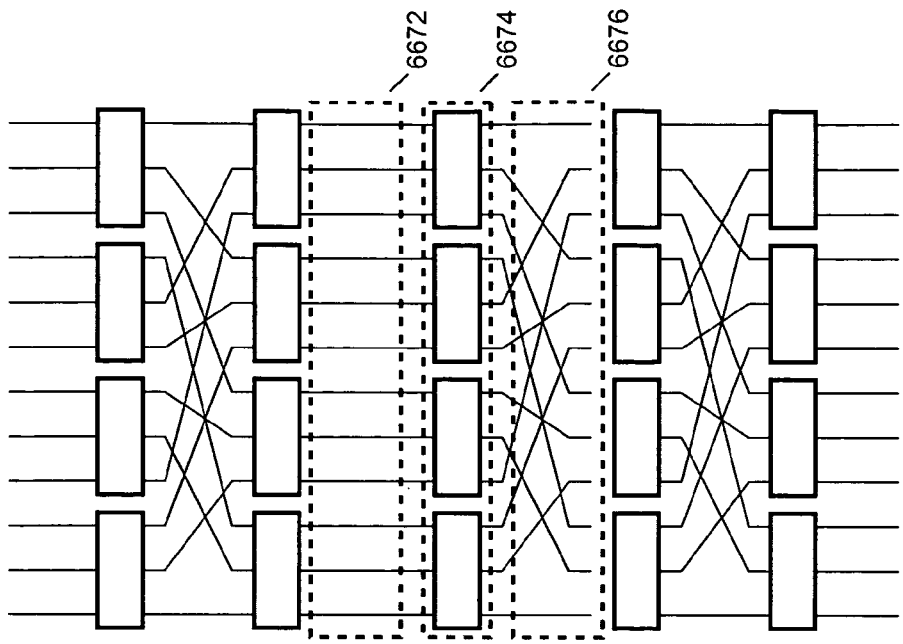
FIG. 52A, FIG. 52B, FIG. 52C shows a 24 port redundant blocking compensated cyclic group (RBCCG) multistage switching network with four stages upgraded to a 24-port RBCCG multistage switching network with five stages.
Figure 52A:
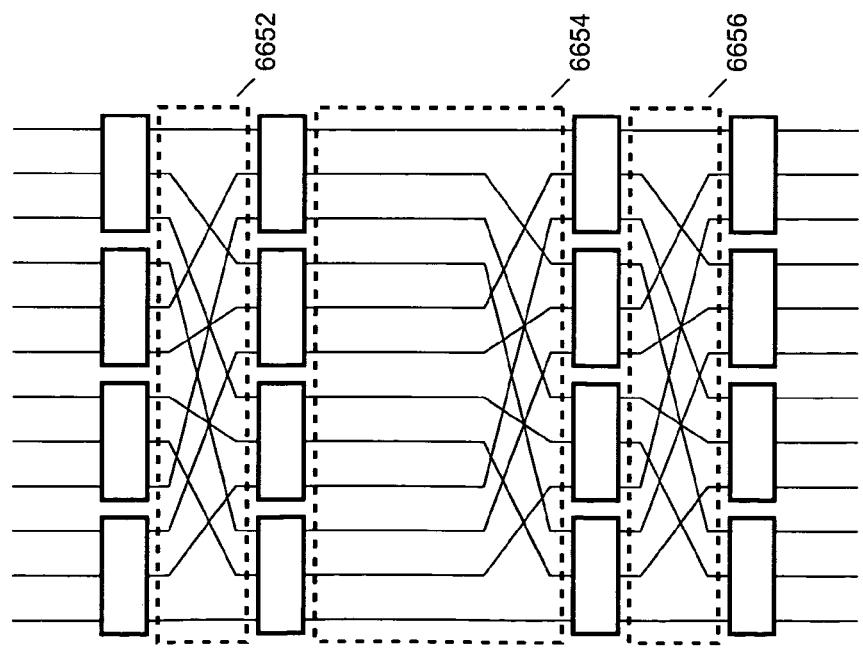
Figure 52C:
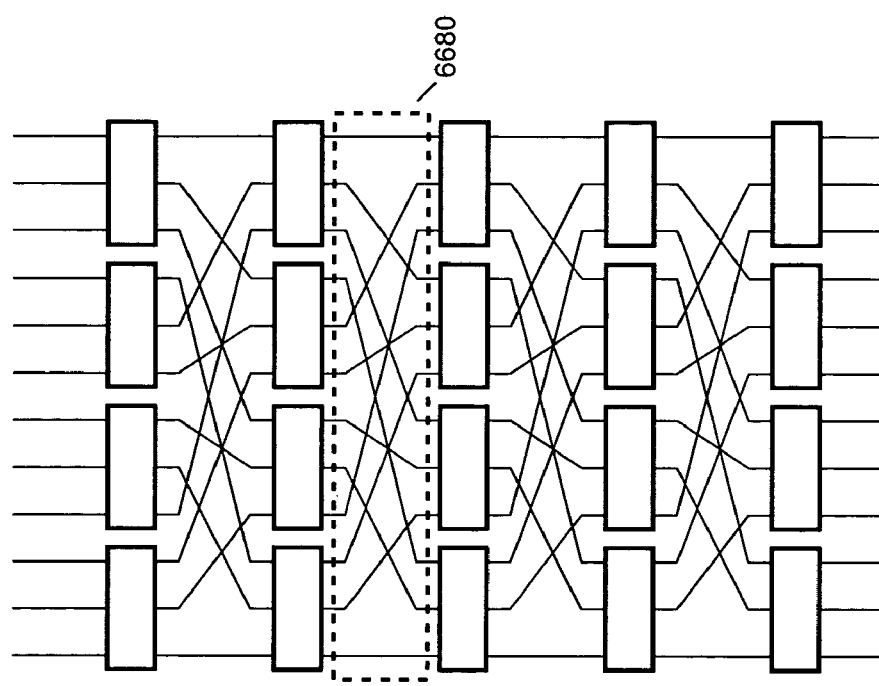

The first example is that of a stage upgrade, whereby an extra stage is added to a multistage switching network. FIG. 52A shows a pre-reconfiguration switching network, which is a 24-port 4 stage balanced RBCCG switching network with ISIC networks, 6552, 6554, and 6556. They are identical, but 6554 is drawn in an elongated manner for clarity when indicating where the new stage of switching elements is to be inserted. There are no external ports that need to be deactivated. There are no pre-connections that can be performed. The result of the network after the splicing step is shown in FIG. 52B, where ISIC network 6554 is systematically broken and reformed into new ISIC networks 6672 and 6676 in order to insert new stage 6674. After the rewiring step, the switching network matches its post-reconfiguration architecture as shown in FIG. 52C, where ISIC network 6672 is rewired to ISIC network 6680. The result is a 24-port 5 stage balanced RBCCG switching network. A stage upgrade process was also set forth in prior application, U.S. Pat. No. 6,901,071.

Figure 53A:
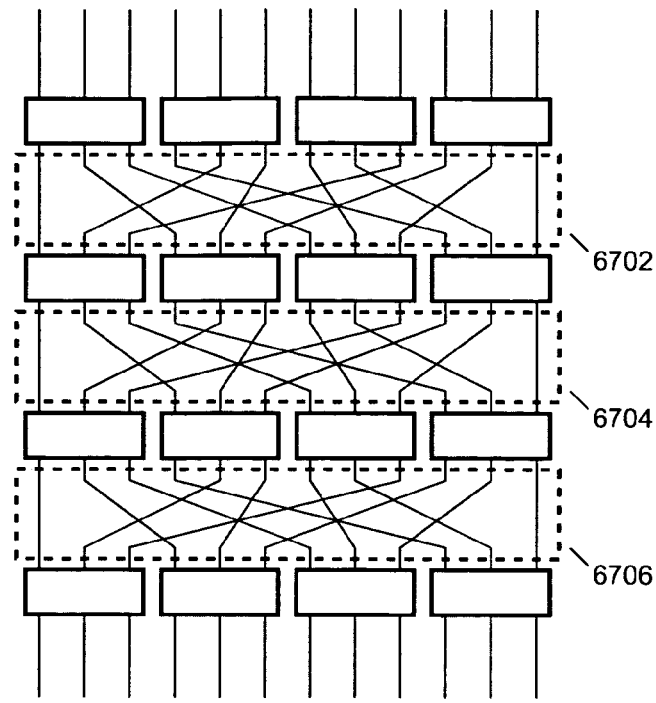
FIG. 53A, FIG. 53B shows a 24 port RBCCG multistage switching network with four switching elements per stage upgraded to a 30-port RBCCG multistage switching network with five switching elements per stage.
Figure 53B:
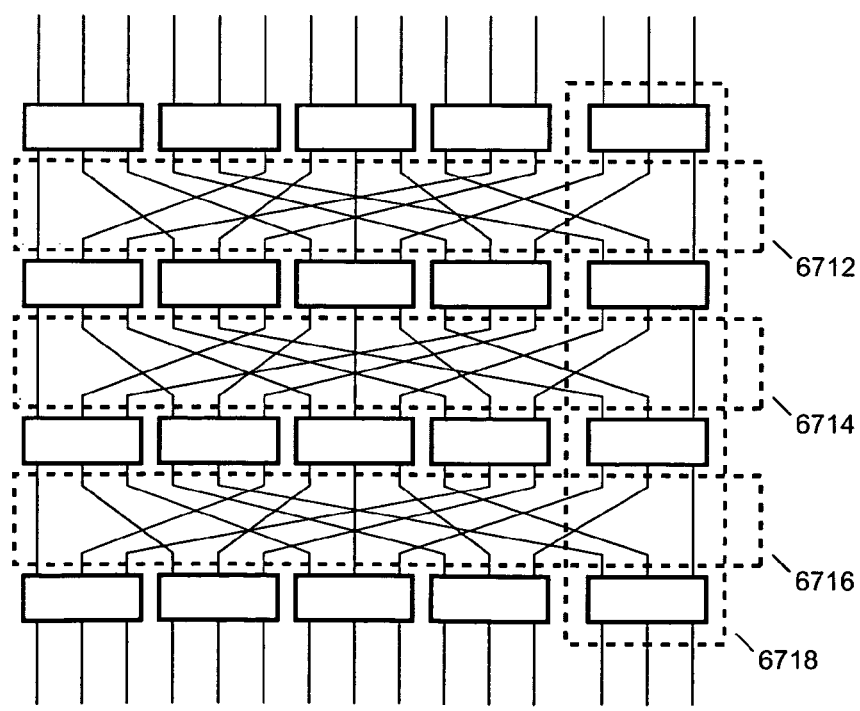

The next example is that of a width upgrade. FIG. 53A shows a pre-reconfiguration switching network of a 24-port 4 stage balanced RBCCG network with ISIC networks, 6702, 6704, and 6706. Through the process set forth above, the switching network is transformed into the wider post-reconfiguration 30-port 4 stage balanced RBCCG switching network depicted in FIG. 53B, where new switching elements 6718 are added and ISIC networks 6702, 6704, and 6706 are reconfigured into ISIC networks 6712, 6714, and 6716, respectively. A width upgrade process is also set forth in prior application, U.S. patent application Ser. No. 10/074,174.

Figure 54A:
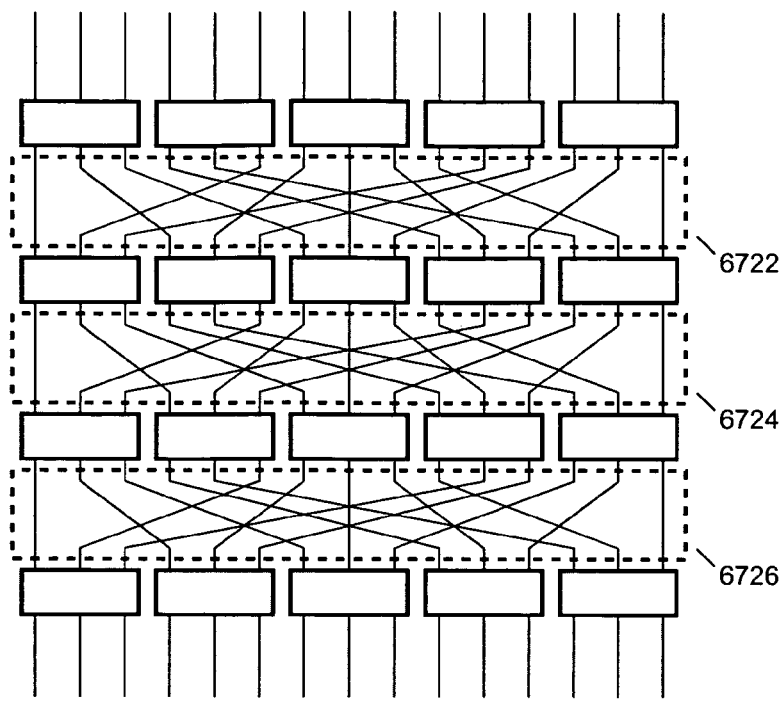
FIG. 54A, FIG. 54B shows a 30-port RBCCG multistage switching network with six ports per switching element upgraded to a 40-port RBCCG multistage switching network with eight ports per switching element.
Figure 54B:
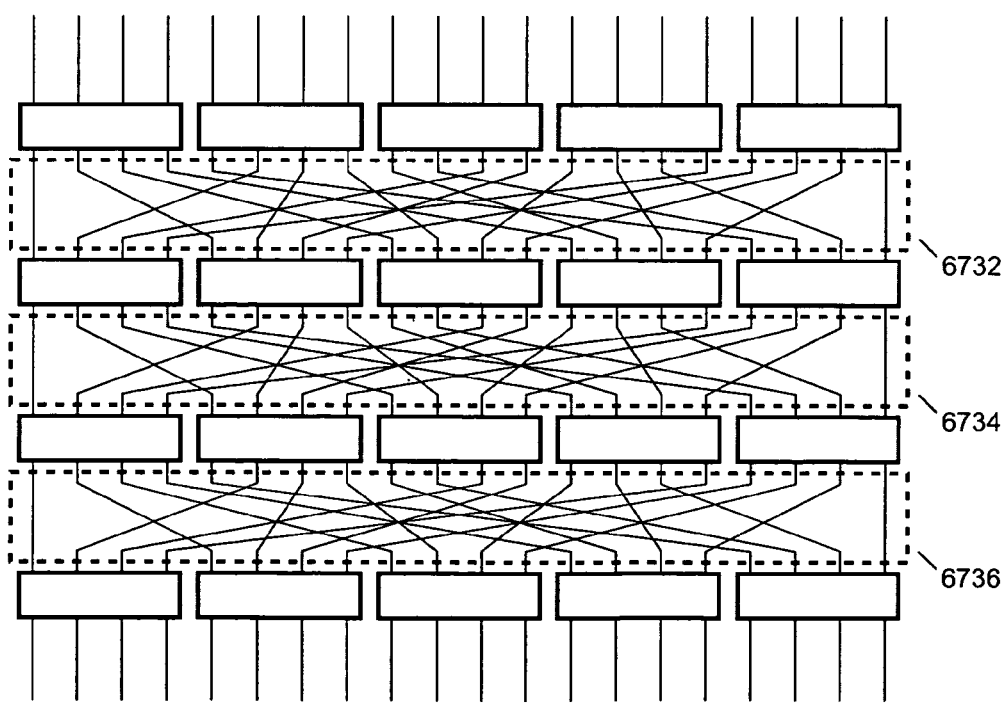

The next example is that of a fanout upgrade. FIG. 54A shows a pre-reconfiguration switching network of a 30-port 5 stage balanced RBCCG network with a per switching element fanout of 3. It comprises ISIC networks 6722, 6724, and 6726. Through the process set forth above, the switching network is transformed into the post-reconfiguration 40-port 4 stage balanced RBCCG switching network with a per switching element fanout of 4 depicted in FIG. 54B where ISIC networks 6722, 6724 and 6726 are reconfigured into ISIC networks 6732, 6734, and 6736, respectively. A fanout upgrade process is also set forth in prior application, U.S. patent application Ser. No. 10/075,086

The preceding examples were not given in very much detail. The forthcoming examples are presented in a high degree of detail to demonstrate the intricacies of the reconfiguration process set forth above. The next five examples represent common scenarios for architectural changes beyond the simple stage, width or fanout upgrades described above. The port_select subroutine depicted in FIG. 50C is employed in the first four examples.

Figure 55:
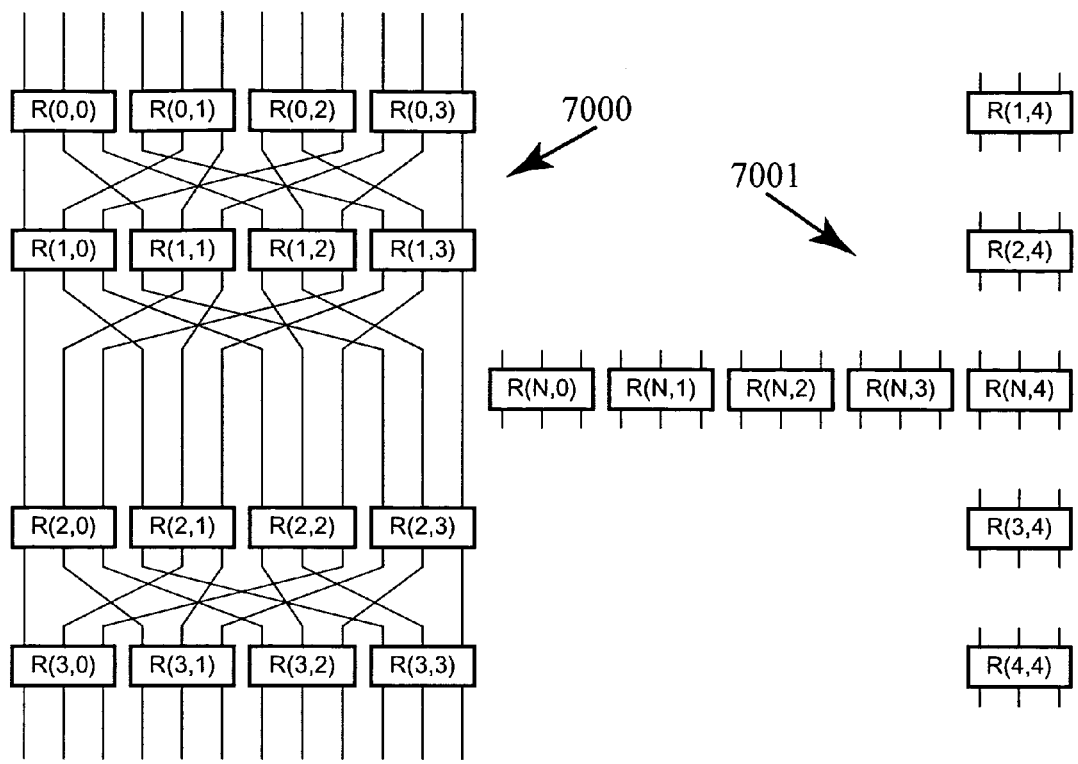
FIG. 55 shows a 24-port RBCCG multistage switching network with 4 stages. This architecture is to be upgraded to a 30-port RBCCG multistage switching network with 5 stages by the addition of an extra stage of switching elements and an extra column of switching elements.
Figure 56:
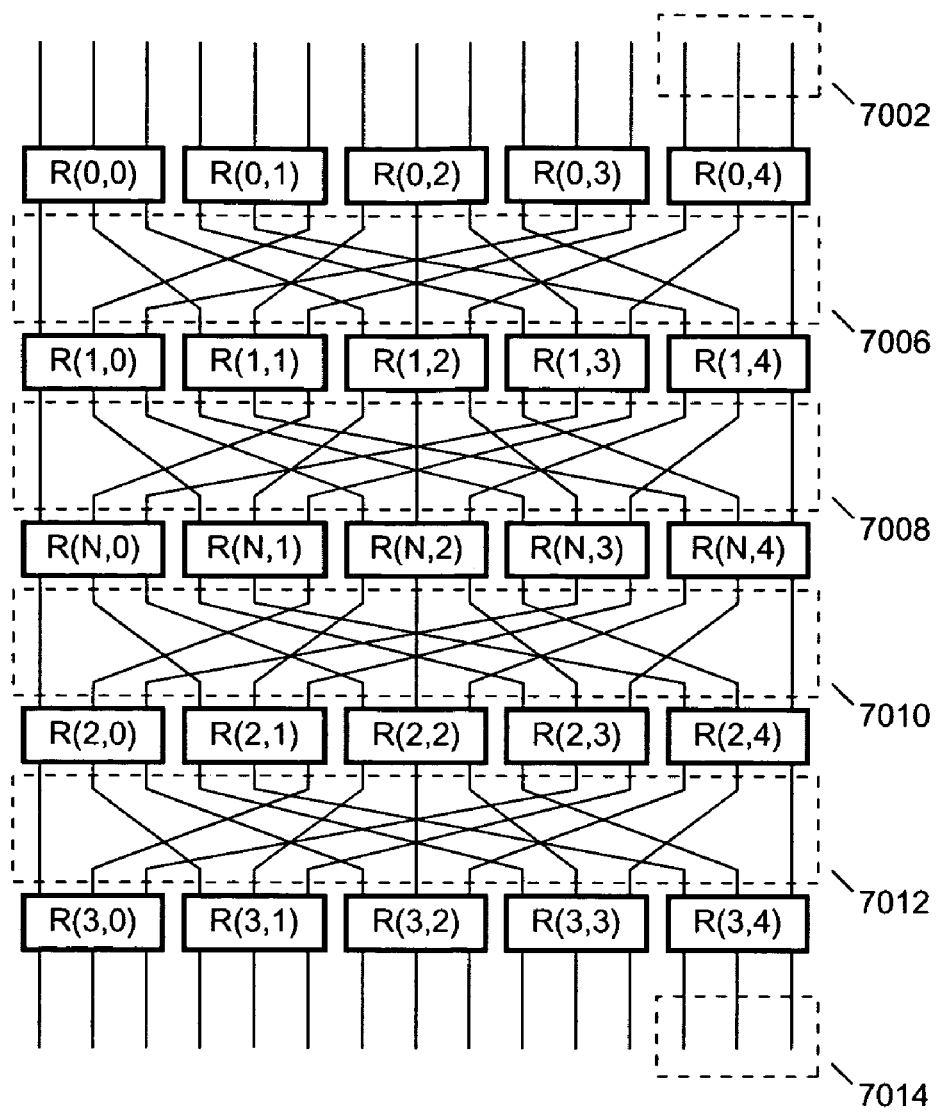

FIG. 55 shows a 24-port 4 stage pre-reconfiguration balanced RBCCG multistage switching network 7000 and additional switching elements 7001 to be added. Let switching elements R(N,*) represents the stage to be added. The switching elements R(*,4) represent a column to be added. Since this is an upgrade, there are no external ports that need to be disconnected. FIG. 56 shows the 30-port 5 stage post-reconfiguration balanced RBCCG multistage switching network.

Figure 57:
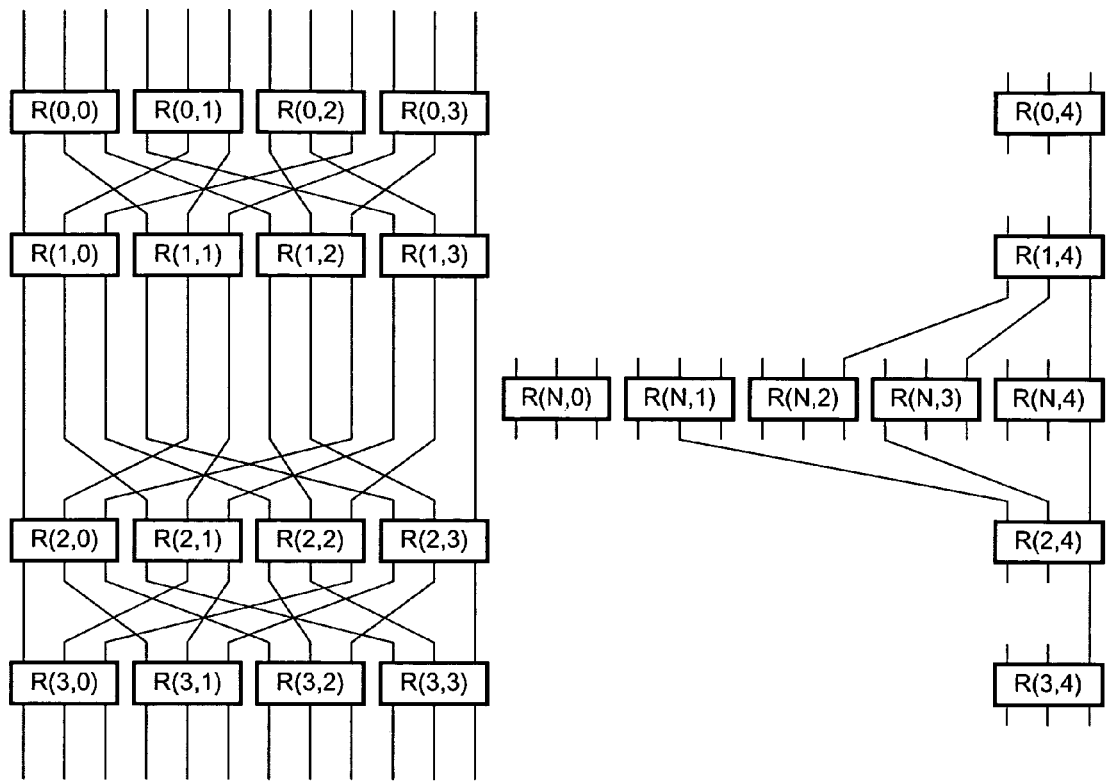
FIG. 57 shows the result of the non-disruptive addition of connections: bottom port 2 of switching element R(0,4) to top port 2 of switching element R(1,4), bottom port 2 of switching element R(1,4) to top port 2 of switching element R(N,4), bottom port 1 of switching element R(1,4) to top port 2 of switching element R(N,3), bottom port 0 of switching element R(1,4) to top port 2 of switching element R(N,2), bottom port 2 of switching element R(N,4) to top port 2 of switching element R(2,4), bottom port 0 of switching element R(N,3) to top port 1 of switching element R(2,4), bottom port 1 of switching element R(N,1) to top port 0 of switching element R(2,4), and bottom port 2 of switching element R(2, 4) to top port 2 of switching element R(3,4).

Proceeding to the pre-connection step, according to the post-reconfiguration architecture shown in FIG. 56, the following connections can be established without disrupting existing connections: bottom port 2 of switching element R(0,4) to top port 2 of switching element R(1,4); bottom port 2 of switching element R(1,4) to top port 2 of switching element R(N,4); bottom port 1 of switching element R(1,4) to top port 2 of switching element R(N,3); bottom port 0 of switching element R(1,4) to top port 2 of switching element R(N,2); bottom port 2 of switching element R(N,4) to top port 2 of switching element R(2,4); bottom port 0 of switching element R(N,3) to top port 1 of switching element R(2,4); bottom port 1 of switching element R(N,1) to top port 0 of switching element R(2,4); and bottom port 2 of switching element R(2,4) to top port 2 of switching element R(3,4). The result is shown in FIG. 57.

With the new connections in place, the upgrade process continues with the splicing step which splices in the new stage of switching elements.

Figure 58A:
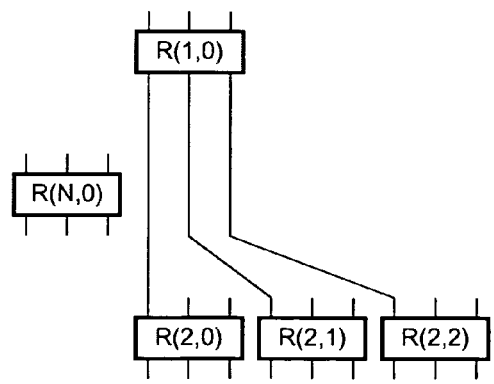
FIG. 58A shows the portion of a 24 port RBCCG multistage switching network into which switching element R(N, 0) is to be inserted.
Figure 58B:
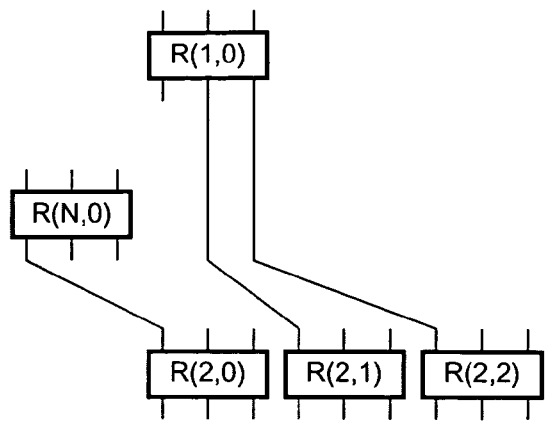
FIG. 58B, FIG. 58C, FIG. 58D and FIG. 58E show switching element R(N,0) being inserted by moving the connection from bottom port 0 of switching element R(1,0) to bottom port 0 of switching element R(N,0); adding a connection between bottom port 0 of switching element R(1,0) and top port 0 of switching element R(N,0); moving the connection from bottom port 1 of switching element R(1,0) to bottom port 1 of switching element R(N,0) and adding a connection between bottom port 1 of switching element R(1,0) and top port 1 of switching element R(N,0); and moving the connection from bottom port 2 of switching element R(1,0) to bottom port 2 of switching element R(N,0) and adding a connection between bottom port 2 of switching element R(1,0) and top port 2 of switching element R(N,0), respectively.
Figure 58C:
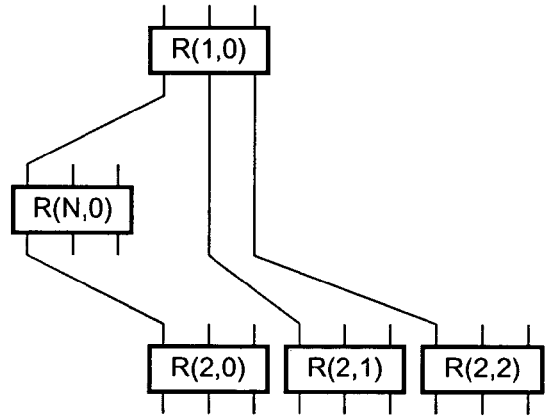

The insertion of switching element R(N,0) is isolated in FIG. 58A. The splicing step begins by: diverting traffic away from bottom port 0 of switching element R(1,0) and top port 0 of switching element R(2,0); shutting down bottom port 0 of switching element R(1,0) and top port 0 of switching element R(2,0); moving the connection at bottom port 0 of switching element R(1,0) to bottom port 0 of switching element R(N,0) as shown in FIG. 58B; starting bottom port 0 of switching element R(N,0) and top port 0 of switching element R(2,0); connecting bottom port 0 of switching element R(1,0) to top port 0 of switching element R(N,0) as shown in FIG. 58C; starting bottom port 0 of switching element R(1,0) and top port 0 of switching element R(N,0); and stop diverting traffic away from bottom port 0 of switching element R(1,0) and top port 0 of switching element R(2,0).

Figure 58D:
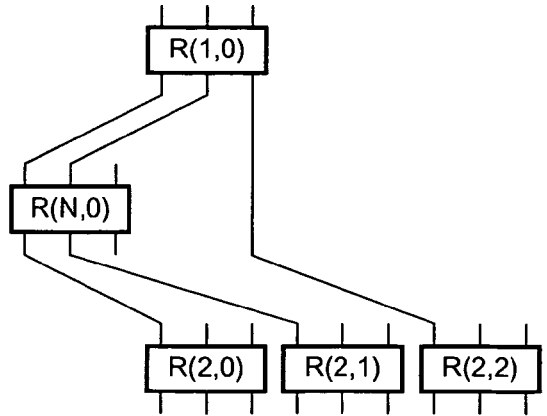

The splicing step continues by: diverting traffic away from bottom port 1 of switching element R(1,0) and top port 0 of switching element R(2,1); shutting down bottom port 1 of switching element R(1,0) and top port 0 of switching element R(2,1); moving the connection at bottom port 1 of switching element R(1,0) to bottom port 1 of switching element R(N,0) as shown in FIG. 58D; starting bottom port 1 of switching element R(N,0) and top port 0 of switching element R(2,1); connecting bottom port 1 of switching element R(1,0) to top port 1 of switching element R(N,0) as also shown in FIG. 58D; starting bottom port 1 of switching element R(1,0) and top port 1 of switching element R(N,0); and stop diverting traffic away from bottom port 1 of switching element R(1,0) and top port 0 of switching element R(2,1).

Figure 58E:
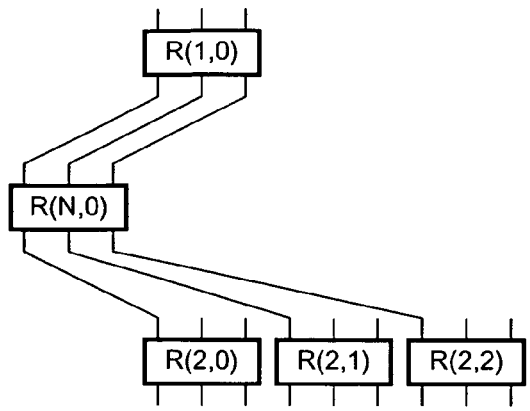

The splicing step continues by: diverting traffic away from bottom port 2 of switching element R(1,0) and top port 0 of switching element R(2,2); shutting down bottom port 2 of switching element R(1,0) and top port 0 of switching element R(2,2); moving the connection at bottom port 2 of switching element R(1,0) to bottom port 2 of switching element R(N,0) as shown in FIG. 58E; starting bottom port 2 of switching element R(N,0) and top port 0 of switching element R(2,2); connecting bottom port 2 of switching element R(1,0) to top port 2 of switching element R(N,0) as also shown in FIG. 58E; starting bottom port 2 of switching element R(1,0) and top port 2 of switching element R(N,0); and stop diverting traffic away from bottom port 2 of switching element R(1,0) and top port 0 of switching element R(2,2).

Figure 58F:
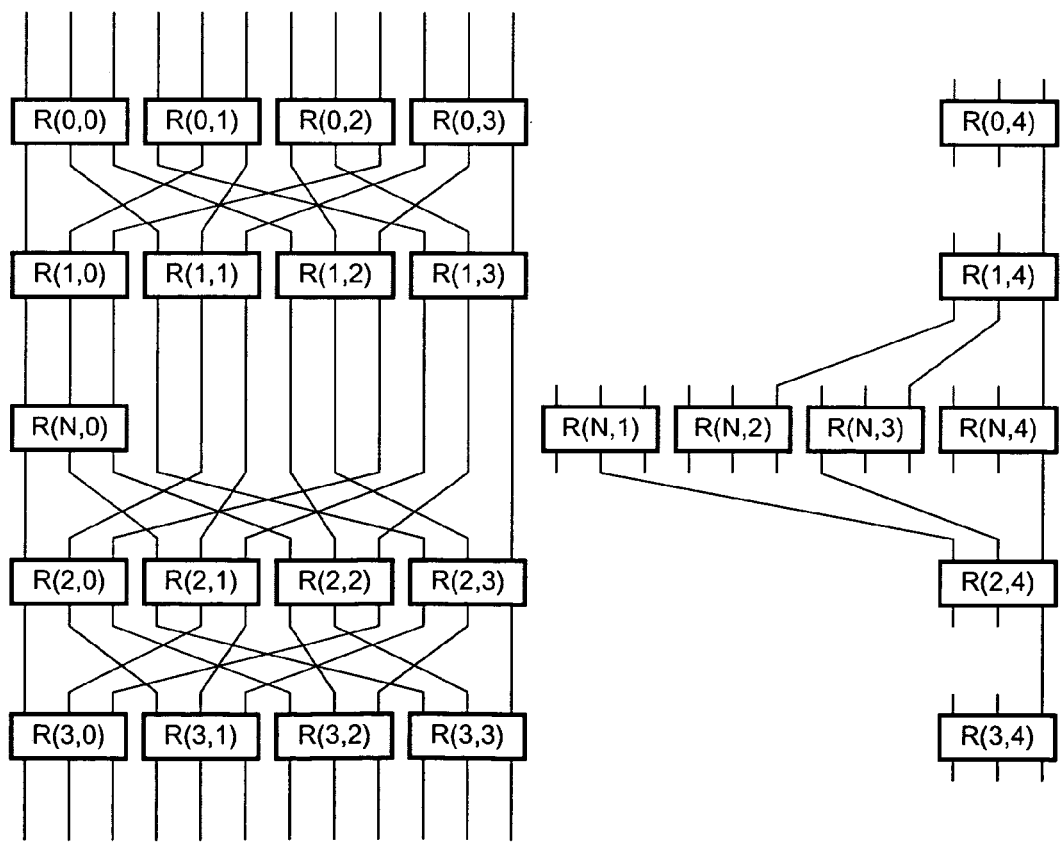
FIG. 58F shows switching element R(N,1) inserted into a 24 port RBCCG multistage switching network.
Figure 58G:
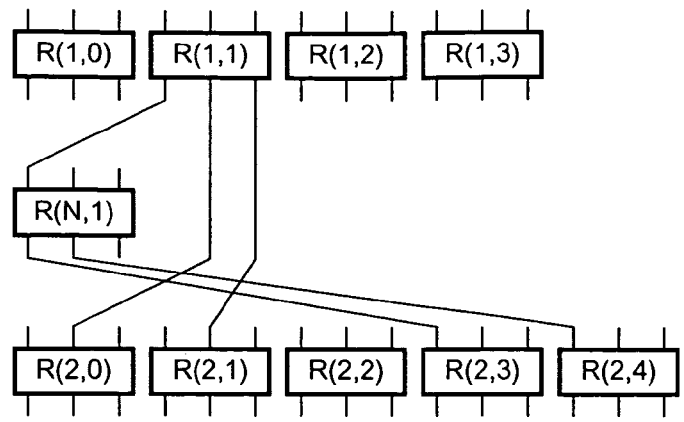
FIG. 58G, FIG. 58H and FIG. 58I show switching element R(N,1) being inserted by moving the connection from bottom port 0 of switching element R(1,1) to bottom port 0 of switching element R(N,1) and adding a connection between bottom port 0 of switching element R(1,1) and top port 0 of switching element R(N,1); moving the connection from top port 1 of switching element R(2,0) to top port 1 of switching element R(N,1); and moving the connection from bottom port 2 of switching element R(1,1) to bottom port 2 of switching element R(N,1) and adding a connection between bottom port 2 of switching element R(1,1) and top port 2 of switching element R(N,1), respectively.

Switching element R(N,1) as shown in FIG. 58F can be inserted by: diverting traffic away from bottom port 0 of switching element R(1,1) and top port 0 of switching element R(2,3); shutting down bottom port 0 of switching element R(1,1) and top port 0 of switching element R(2,3); moving the connection at bottom port 0 of switching element R(1,1) to bottom port 0 of switching element R(N,1) as shown in FIG. 58G; starting bottom port 0 of switching element R(N,1) and top port 0 of switching element R(2,3); connecting bottom port 0 of switching element R(1,1) to top port 0 of switching element R(N,1) as also shown in FIG. 58G; starting bottom port 0 of switching element R(1,1) and top port 0 of switching element R(N,1); and stop diverting traffic away from bottom port 0 of switching element R(1,1) and top port 0 of switching element R(2,3).

Figure 58H:
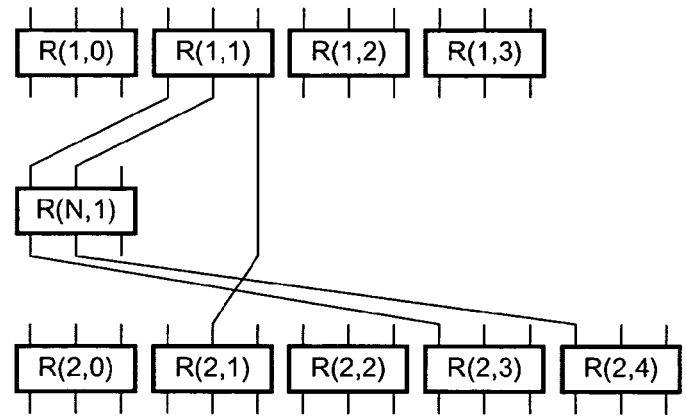

The splicing step continues by: diverting traffic away from bottom port 1 of switching element R(1,1) and top port 1 of switching element R(2,0); shutting down bottom port 1 of switching element R(1,1) and top port 1 of switching element R(2,0); moving the connection at top port 1 of switching element R(2,0) to top port 1 of switching element R(N,1) as shown in FIG. 58H; starting bottom port 1 of switching element R(1,1) and top port 1 of switching element R(N,1); and stop diverting traffic away from bottom port 1 of switching element R(1,1). No connection is made between bottom port 1 of switching element R(N,1) and top port 1 of switching element R(2,0), because bottom port 1 of switching element R(N,1) is already connected.

Figure 58I:
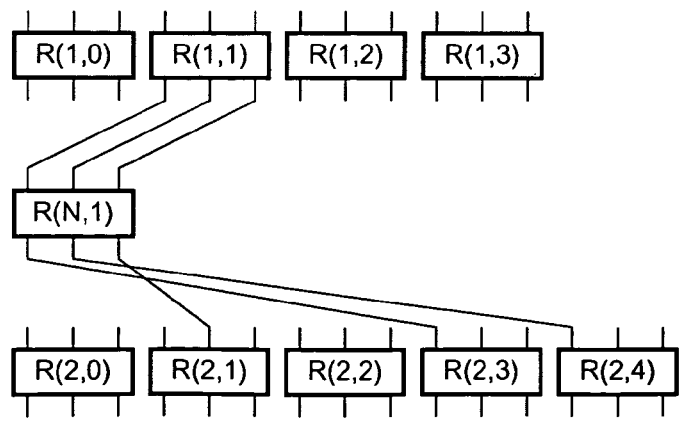

The splicing step continues by: diverting traffic away from bottom port 2 of switching element R(1,1) and top port 1 of switching element R(2,1); shutting down bottom port 2 of switching element R(1,1) and top port 1 of switching element R(2,1); moving the connection at bottom port 2 of switching element R(1,1) to bottom port 2 of switching element R(N,1) as shown in FIG. 58I; starting bottom port 2 of switching element R(N,1) and top port 1 of switching element R(2,1); connecting bottom port 2 of switching element R(1,1) to top port 2 of switching element R(N,1) as also shown in FIG. 58I; starting bottom port 2 of switching element R(1,1) and top port 2 of switching element R(N,1); and stop diverting traffic away from bottom port 2 of switching element R(1,1) and top port 1 of switching element R(2,1).

Figure 58J:
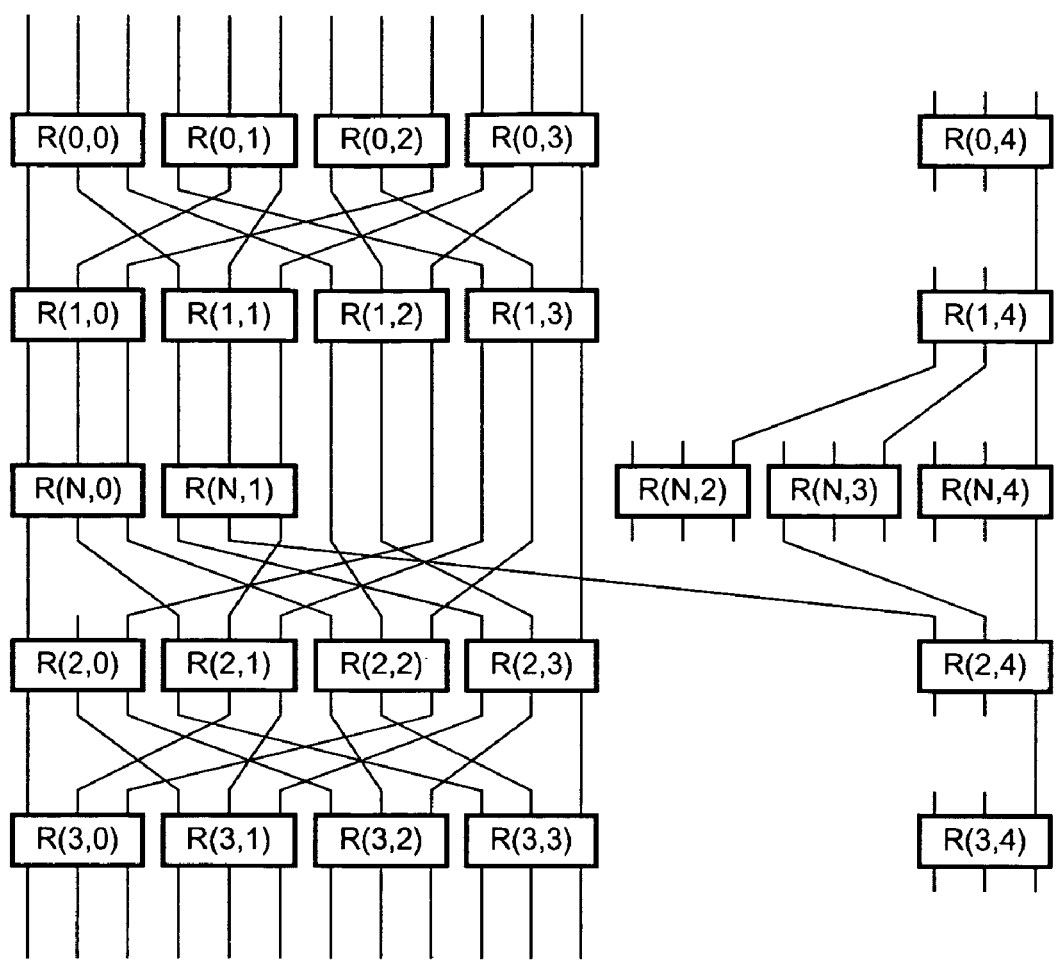
FIG. 58J shows switching element R(N,2) inserted into a 24 port RBCCG multistage switching network.
Figure 58K:
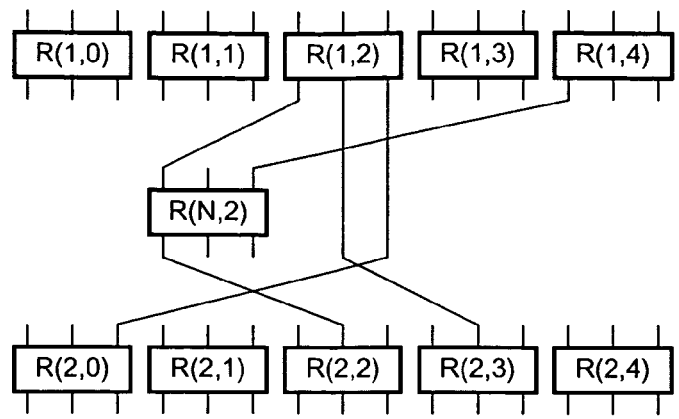
FIG. 58K, FIG. 58L and FIG. 58M show switching element R(N,2) being inserted by moving the connection from bottom port 0 of switching element R(1,2) to bottom port 0 of switching element R(N,2) and adding a connection between bottom port 0 of switching element R(1,2) and top port 0 of switching element R(N,2); moving the connection from bottom port 1 of switching element R(1,2) to bottom port 1 of switching element R(N,2) and adding a connection between bottom port 1 of switching element R(1,2) and top port 1 of switching element R(N,2); and moving the connection from bottom port 2 of switching element R(1,2) to bottom port 2 of switching element R(N,2), respectively.

Switching element R(N,2) as shown in FIG. 58J can be inserted by: diverting traffic away from bottom port 0 of switching element R(1,2) and top port 1 of switching element R(2,2); shutting down bottom port 0 of switching element R(1,2) and top port 1 of switching element R(2,2); moving the connection at bottom port 0 of switching element R(1,2) to bottom port 0 of switching element R(N,2) as shown in FIG. 58K; starting bottom port 0 of switching element R(N,2) and top port 1 of switching element R(2,2); connecting bottom port 0 of switching element R(1,2) to top port 0 of switching element R(N,2) as also shown in FIG. 58K; starting bottom port 0 of switching element R(1,2) and top port 0 of switching element R(N,2); and stop diverting traffic away from bottom port 0 of switching element R(1,2) and top port 1 of switching element R(2,2).

Figure 58L:
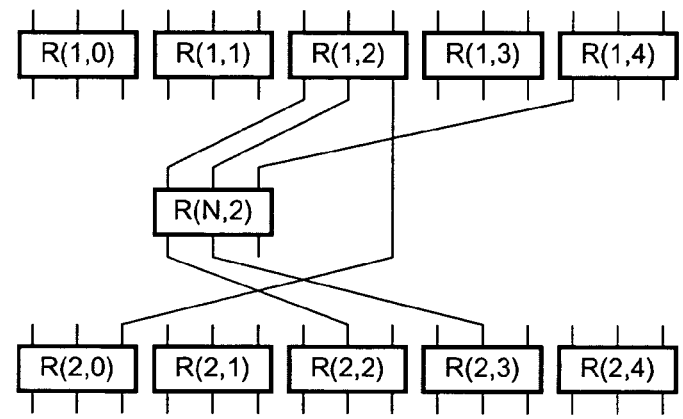

The splicing step continues by: diverting traffic away from bottom port 1 of switching element R(1,2) and top port 1 of switching element R(2,3); shutting down bottom port 1 of switching element R(1,2) and top port 1 of switching element R(2,3); moving the connection at bottom port 1 of switching element R(1,2) to bottom port 1 of switching element R(N,2) as shown in FIG. 58L; starting bottom port 1 of switching element R(N,2) and top port 1 of switching element R(2,3); connecting bottom port 1 of switching element R(1,2) to top port 1 of switching element R(N,2) as also shown in FIG. 58L; starting bottom port 1 of switching element R(1,2) and top port 1 of switching element R(N,2); and stop diverting traffic away from bottom port 1 of switching element R(1,2) and top port 1 of switching element R(2,3).

Figure 58M:
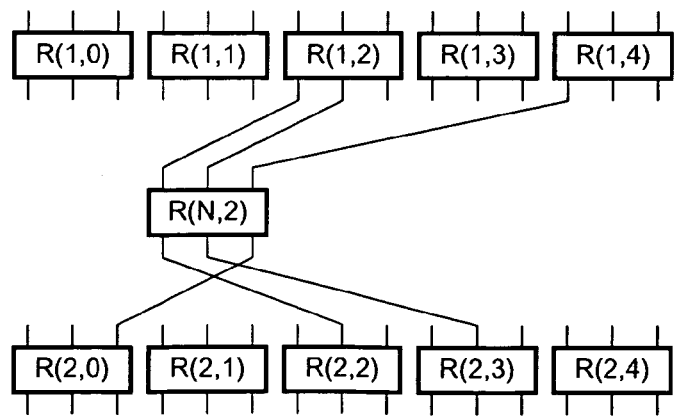

The splicing step continues by: diverting traffic away from bottom port 2 of switching element R(1,2) and top port 2 of switching element R(2,0); shutting down bottom port 2 of switching element R(1,2) and top port 2 of switching element R(2,0); moving the connection at bottom port 2 of switching element R(1,2) to bottom port 2 of switching element R(N,2) as shown in FIG. 58M; starting bottom port 2 of switching element R(N,2) and top port 2 of switching element R(2,0); not connecting bottom port 2 of switching element R(1,2) to top port 2 of switching element R(N,2) because top port 2 of switching element R(N,2) already has a connection, resulting in FIG. 58M; and stop diverting traffic away from top port 2 of switching element R(2,0).

Figure 58N:
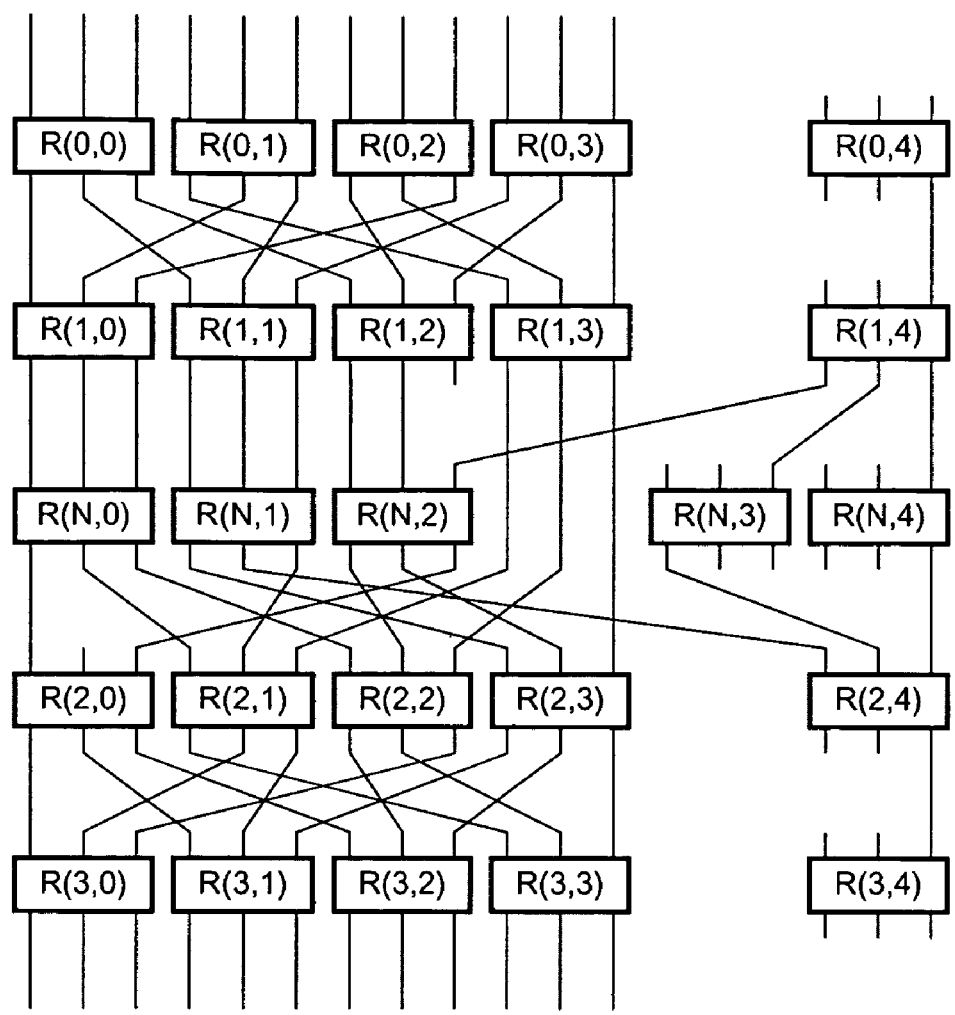
FIG. 58N shows switching element R(N,3) inserted into a 24 port RBCCG multistage switching network.
Figure 58O:
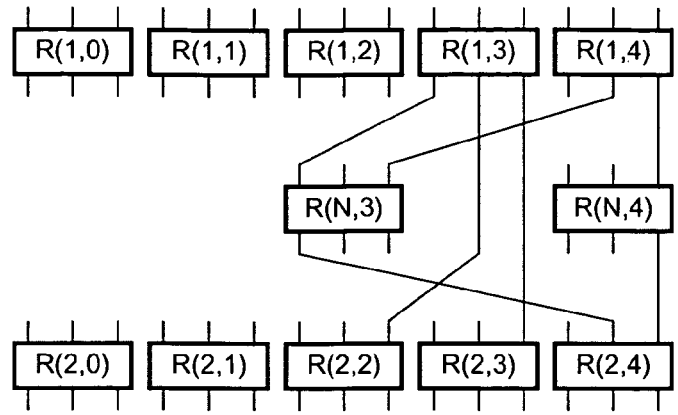
FIG. 58O, FIG. 58P and FIG. 58Q show switching element R(N,3) being inserted by moving the connection from top port 2 of switching element R(2,1) to top port 0 of switching element R(N,3); moving the connection from bottom port 1 of switching element R(1,3) to bottom port 1 of switching element R(N,3) and adding a connection between bottom port 1 of switching element R(1,3) and top port 1 of switching element R(N,3); and moving the connection from bottom port 2 of switching element R(1,3) to bottom port 2 of switching element R(N,3), respectively.

Switching element R(N,3) as shown in FIG. 58N can be inserted by: diverting traffic away from bottom port 0 of switching element R(1,3) and top port 2 of switching element R(2,1); shutting down bottom port 0 of switching element R(1,3) and top port 2 of switching element R(2,1); moving the connection at top port 2 of switching element R(2,1) to top port 0 of switching element R(N,3) as shown in FIG. 58O; starting bottom port 0 of switching element R(1,3) and top port 0 of switching element R(N,3); and stop diverting traffic away from bottom port 0 of switching element R(1,3). No connection is made between bottom port 0 of switching element R(N,3) and top port 2 of switching element R(2,1), because bottom port 0 of switching element R(N,3) is already connected.

Figure 58P:
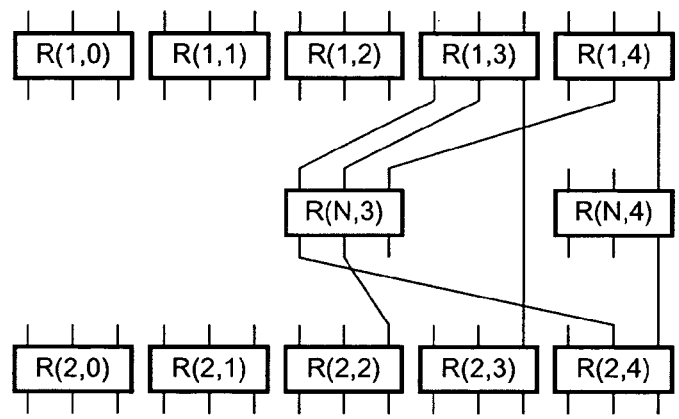

The splicing step continues by: diverting traffic away from bottom port 1 of switching element R(1,3) and top port 2 of switching element R(2,2); shutting down bottom port 1 of switching element R(1,3) and top port 2 of switching element R(2,2); moving the connection at bottom port 1 of switching element R(1,3) to bottom port 1 of switching element R(N,3) as shown in FIG. 58P; starting bottom port 1 of switching element R(N,3) and top port 2 of switching element R(2,2); connecting bottom port 1 of switching element R(1,3) to top port 1 of switching element R(N,3) as also shown in FIG. 58P; starting bottom port 1 of switching element R(1,3) and top port 1 of switching element R(N,3); and stop diverting traffic away from bottom port 1 of switching element R(1,3) and top port 2 of switching element R(2,2).

Figure 58Q:
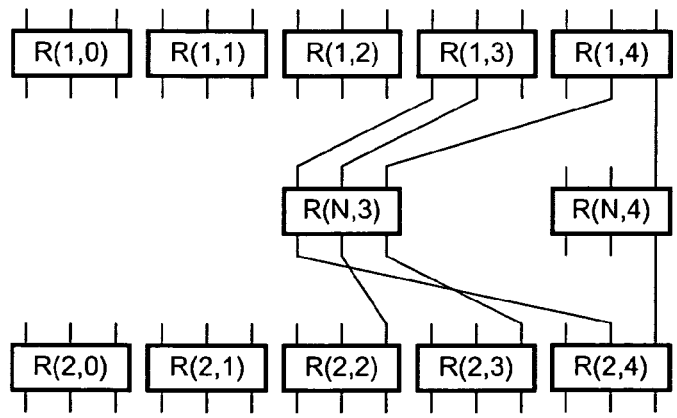

The splicing step continues by: diverting traffic away from bottom port 2 of switching element R(1,3) and top port 2 of switching element R(2,3); shutting down bottom port 2 of switching element R(1,3) and top port 2 of switching element R(2,3); moving the connection at bottom port 2 of switching element R(1,3) to bottom port 2 of switching element R(N,3) as shown in FIG. 58Q; starting bottom port 2 of switching element R(N,3) and top port 2 of switching element R(2,3); not connecting bottom port 2 of switching element R(1,3) to top port 2 of switching element R(N,3) because top port 2 of switching element R(N,3) already has a connection, resulting in FIG. 58Q; and stop diverting traffic away from top port 2 of switching element R(2,3).

Figure 58R:
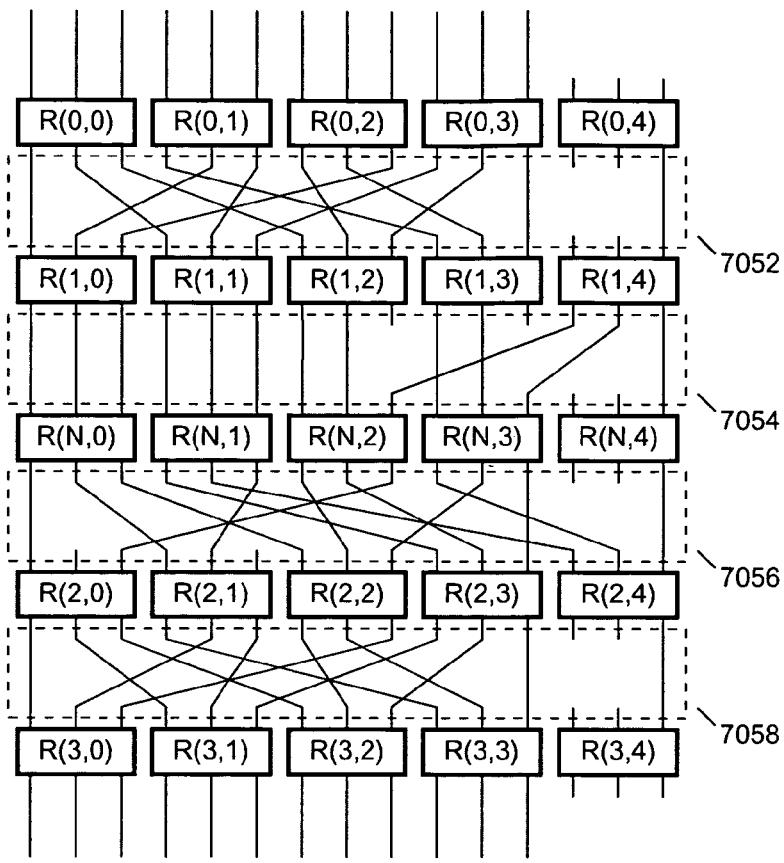
FIG. 58R shows switching element R(N,3) inserted into a 24 port RBCCG multistage switching network.

This completes the splicing step for this example. FIG. 58R shows the new stage integrated into a multistage switching network. Clearly, none of the ISIC networks, 7052, 7054, 7056 and 7058 match their counterparts, 7006, 7008, 7010, and 7012 in FIG. 56. The rewiring step is first applied to ISIC network 7054, since it is the ISIC network least like its counterpart, 7008. Though any ISIC network can be selected first, the selection of this one bolsters the fault tolerance of the overall network.

Relabeling is applied to ISIC network 7054, but no swapping is needed. The rewiring step continues by the following port section and resultant rewiring of the selected ports.

Scanning from right to left, no port, top or bottom, has a corresponding port which is not connected. Again, scanning from right to left, top port 1 of switching element R(N,4) is not connected to anything and has, according to FIG. 56, a corresponding port of bottom port 0 of switching element R(1,3). Bottom port 0 of switching element R(1,3) is currently connected to top port 0 of switching element R(N,3). The breaking this connection introduces a second broken connection to R(1,3), so top port 1 of switching element R(N,4) is not selected. Continuing to scan from right to left, top port 0 of switching element R(N,4) is not connected to anything and has, according to FIG. 56, a corresponding port of bottom port 1 of switching element R(1,1). Bottom port 1 of switching element R(1,1) is currently connected to top port 1 of switching element R(N,1). The breaking of this connection does not leave switching element R(1,1) or switching element R(N,1) with more than one broken connection. This completes the selection process for this step.

Figure 59A:
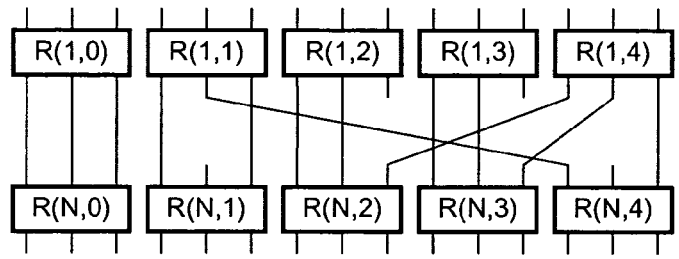

With top port 0 of switching element R(N,4) selected and recalling that its corresponding port, bottom port 1 of switching element R(1,1), is connected to top port 1 of switching element R(N,1), the rewiring step continues by diverting traffic from bottom port 1 of switching element R(1,1) and top port 1 of switching element R(N,1); stopping bottom port 1 of switching element R(1,1) and top port 1 of switching element R(N,1); disconnecting bottom port 1 of switching element R(1,1) and top port 1 of switching element R(N,1) and moving the disconnected connection to top port 0 of switching element R(N,4) as shown in FIG. 59A; starting top port 0 of switching element R(N,4) and bottom port 1 of switching element R(1,1); and stop diverting the traffic from top port 0 of switching element R(N,4) and bottom port 1 of switching element R(1,1).

Scanning from right to left, no port, top or bottom, has a corresponding port which is not connected. Again, scanning from right to left, top port 1 of switching element R(N,4) is not connected to anything and has, according to FIG. 56, a corresponding port of bottom port 0 of switching element R(1,3). Bottom port 0 of switching element R(1,3) is currently connected to top port 0 of switching element R(N,3). The breaking this connection introduces a second broken connection to R(1,3), so top port 1 of switching element R(N,4) is not selected. Continuing to scan from right to left, bottom port 2 of switching element R(1,3) is not connected to anything and has, according to FIG. 56, a corresponding port of top port 2 of switching element R(N,1). Top port 2 of switching element R(N,1) is currently connected to bottom port 2 of switching element R(1,1). The breaking this connection introduces a second broken connection to R(N,1), so bottom port 2 of switching element R(1,3) is not selected. Continuing to scan from right to left, bottom port 2 of switching element R(1,2) is not connected to anything and has, according to FIG. 56, a corresponding port of top port 1 of switching element R(N,3). Top port 1 of switching element R(N,3) is currently connected to bottom port 1 of switching element R(1,3). The breaking this connection introduces a second broken connection to R(1,3), so bottom port 2 of switching element R(1,2) is not selected. Continuing to scan from right to left, top port 1 of switching element R(N,1) is not connected to anything and has, according to FIG. 56, a corresponding port of bottom port 0 of switching element R(1,2). Bottom port 0 of switching element R(1,2) is currently connected to top port 0 of switching element R(N,2). The breaking this connection introduces a second broken connection to R(1,2), so top port 1 of switching element R(N,1) is not selected. Since none of the ports that are not connected satisfy the second port selection criterion, the selection process continues by selecting the rightmost port not connected to anything, that is top port 1 of switching element R(N,4).

Figure 59B:
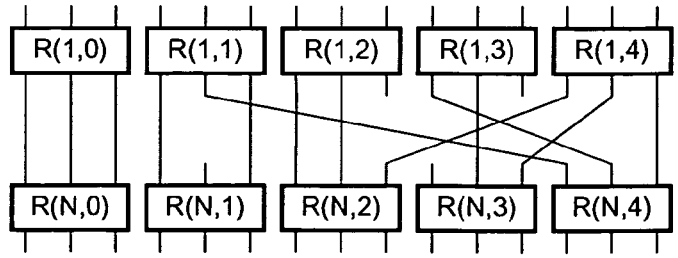

With top port 1 of switching element R(N,4) selected and recalling that its corresponding port, bottom port 0 of switching element R(1,3), is connected to top port 0 of switching element R(N,3), the rewiring step continues by diverting traffic from bottom port 0 of switching element R(1,3) and top port 0 of switching element R(N,3); stopping bottom port 0 of switching element R(1,3) and top port 0 of switching element R(N,3); disconnecting bottom port 0 of switching element R(1,3) and top port 0 of switching element R(N,3) and moving the disconnected connection to top port 1 of switching element R(N,4) as shown in FIG. 59B; starting top port 1 of switching element R(N,4) and bottom port 0 of switching element R(1,3); and stop diverting the traffic from top port 1 of switching element R(N,4) and bottom port 0 of switching element R(1,3).

Scanning from right to left, no port, top or bottom, has a corresponding port which is not connected. Again, scanning from right to left, bottom port 2 of switching element R(1,3) is not connected to anything and has, according to FIG. 56, a corresponding port of top port 2 of switching element R(N,1). Top port 2 of switching element R(N,1) is currently connected to bottom port 2 of switching element R(1,1). The breaking this connection introduces a second broken connection to R(N,1), so bottom port 2 of switching element R(1,3) is not selected. Continuing to scan from right to left, top port 0 of switching element R(N,3) is not connected to anything and has, according to FIG. 56, a corresponding port of bottom port 0 of switching element R(1,1). Bottom port 0 of switching element R(1,1) is currently connected to top port 0 of switching element R(N,1). The breaking this connection introduces a second broken connection to R(N,1), so top port 0 of switching element R(N,3) is not selected. Continuing to scan from right to left, bottom port 2 of switching element R(1,2) is not connected to anything and has, according to FIG. 56, a corresponding port of top port 1 of switching element R(N,3). Top port 1 of switching element R(N,3) is currently connected to bottom port 1 of switching element R(1,3). The breaking this connection introduces a second broken connection to R(1,3), so bottom port 2 of switching element R(1,2) is not selected. Continuing to scan from right to left, top port 1 of switching element R(N,1) is not connected to anything and has, according to FIG. 56, a corresponding port of bottom port 0 of switching element R(1,2). Bottom port 0 of switching element R(1,2) is currently connected to top port 0 of switching element R(N,2). The breaking this connection introduces a second broken connection to R(1,2), so top port 1 of switching element R(N,1) is not selected. Since none of the ports that are not connected satisfy the second port selection criterion, the selection process continues by selecting the rightmost port not connected to anything, that is bottom port 2 of switching element R(1,3).

Figure 59C:
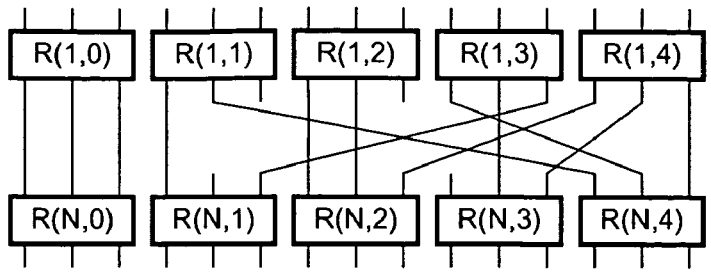

With bottom port 2 of switching element R(1,3) selected and recalling that its corresponding port, top port 2 of switching element R(N,1), is connected to bottom port 2 of switching element R(1,1), the rewiring step continues by diverting traffic from top port 2 of switching element R(N,1) and bottom port 2 of switching element R(1,1); stopping top port 2 of switching element R(N,1) and bottom port 2 of switching element R(,1); disconnecting top port 2 of switching element R(N,1) and bottom port 2 of switching element R(1,1) and moving the disconnected connection to bottom port 2 of switching element R(1,3) as shown in FIG. 59C; starting bottom port 2 of switching element R(1,3) and top port 2 of switching element R(N,1); and stop diverting the traffic from bottom port 2 of switching element R(1,3) and top port 2 of switching element R(N,1).

Scanning from right to left, no port, top or bottom, has a corresponding port which is not connected. Again, scanning from right to left, top port 0 of switching element R(N,3) is not connected to anything and has, according to FIG. 56, a corresponding port of bottom port 0 of switching element R(1,1). Bottom port 0 of switching element R(1,1) is currently connected to top port 0 of switching element R(N,1). The breaking this connection introduces a second broken connection to R(1,1), so top port 0 of switching element R(N,3) is not selected. Continuing to scan from right to left, bottom port 2 of switching element R(1,2) is not connected to anything and has, according to FIG. 56, a corresponding port of top port 1 of switching element R(N,3). Top port 1 of switching element R(N,3) is currently connected to bottom port 1 of switching element R(1,3). The breaking this connection introduces a second broken connection to R(N,3), so bottom port 2 of switching element R(1,2) is not selected. Continuing to scan from right to left, bottom port 2 of switching element R(1,1) is not connected to anything and has, according to FIG. 56, a corresponding port of top port 1 of switching element R(N,0). Top port 1 of switching element R(N,0) is currently connected to bottom port 1 of switching element R(1,0). The breaking of this connection does not leave switching element R(1,0) or switching element R(N,0) with more than one broken connection. This completes the selection process for this step.

Figure 59D:
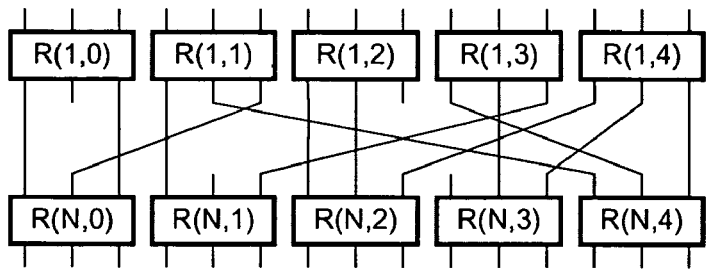

With bottom port 2 of switching element R(1,1) selected and recalling that its corresponding port, top port 1 of switching element R(N,0), is connected to bottom port 1 of switching element R(1,0), the rewiring step continues by diverting traffic from top port 1 of switching element R(N,0) and bottom port 1 of switching element R(1,0); stopping top port 1 of switching element R(N,0) and bottom port 1 of switching element R(1,0); disconnecting top port 1 of switching element R(N,0) and bottom port 1 of switching element R(1,0) and moving the disconnected connection to bottom port 2 of switching element R(1,1) as shown in FIG. 59D; starting bottom port 2 of switching element R(1,1) and top port 1 of switching element R(N,0); and stop diverting the traffic from bottom port 2 of switching element R(1,1) and top port 1 of switching element R(N,0).

Scanning from right to left, no port, top or bottom, has a corresponding port which is not connected. Again, scanning from right to left, top port 0 of switching element R(N,3) is not connected to anything and has, according to FIG. 56, a corresponding port of bottom port 0 of switching element R(1,1). Bottom port 0 of switching element R(1,1) is currently connected to top port 0 of switching element R(N,1). The breaking this connection introduces a second broken connection to R(N,1), so top port 0 of switching element R(N,3) is not selected. Continuing to scan from right to left, bottom port 2 of switching element R(1,2) is not connected to anything and has, according to FIG. 56, a corresponding port of top port 1 of switching element R(N,3). Top port 1 of switching element R(N,3) is currently connected to bottom port 1 of switching element R(1,3). The breaking this connection introduces a second broken connection to R(N,3), so bottom port 2 of switching element R(1,2) is not selected. Continuing to scan from right to left, top port 1 of switching element R(N,1) is not connected to anything and has, according to FIG. 56, a corresponding port of bottom port 0 of switching element R(1,2). Bottom port 0 of switching element R(1,2) is currently connected to top port 0 of switching element R(N,2). The breaking this connection introduces a second broken connection to R(1,2), so top port 1 of switching element R(N,1) is not selected. Continuing to scan from right to left, bottom port 1 of switching element R(1,0) is not connected to anything and has, according to FIG. 56, a corresponding port of top port 0 of switching element R(N,1). Top port 0 of switching element R(N,1) is currently connected to bottom port 0 of switching element R(1,1). The breaking this connection introduces a second broken connection to R(N,1), so bottom port 1 of switching element R(1,0) is not selected. Since none of the ports that are not connected satisfy the second port selection criterion, the selection process continues by selecting the rightmost port not connected to anything, that is top port 0 of switching element R(N,3).

Figure 59E:
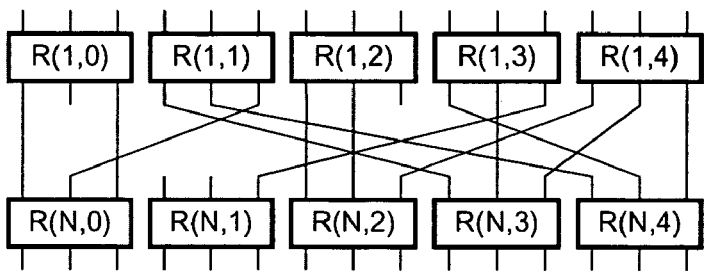

With top port 0 of switching element R(N,3) selected and recalling that its corresponding port, bottom port 0 of switching element R(1,1), is connected to top port 0 of switching element R(N,1), the rewiring step continues by diverting traffic from bottom port 0 of switching element R(1,1) and top port 0 of switching element R(N,1); stopping bottom port 0 of switching element R(1,1) and top port 0 of switching element R(N,1); disconnecting bottom port 0 of switching element R(1,1) and top port 0 of switching element R(N,1) and moving the disconnected connection to top port 0 of switching element R(N,3) as shown in FIG. 59E; starting top port 0 of switching element R(N,3) and bottom port 0 of switching element R(1,1); and stop diverting the traffic from top port 0 of switching element R(N,3) and bottom port 0 of switching element R(1,1).

Figure 59F:
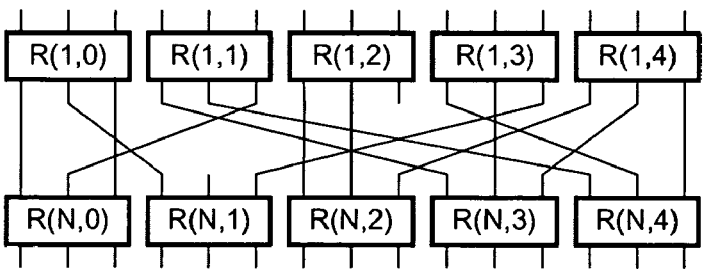

The rewiring step continues by selecting top port 0 of switching element R(N,1) because scanning from right to left, it is the first port bottom or top not connected to anything and whose corresponding port (according to FIG. 56) is also not connected to anything; establishing a new connection between top port 0 of switching element R(N,1) and bottom port 1 of switching element R(1,0) as shown in FIG. 59F; starting top port 0 of switching element R(N,1) and bottom port 1 of switching element R(1,0); and stop diverting the traffic from top port 0 of switching element R(N,1) and bottom port 1 of switching element R(1,0).

Scanning from right to left, no port, top or bottom, has a corresponding port which is not connected. Again, scanning from right to left, bottom port 2 of switching element R(1,2) is not connected to anything and has, according to FIG. 56, a corresponding port of top port 1 of switching element R(N,3). Top port 1 of switching element R(N,3) is currently connected to bottom port 1 of switching element R(1,3). The breaking of this connection does not leave switching element R(1,3) or switching element R(N,3) with more than one broken connection. This completes the selection process for this step.

Figure 59G:
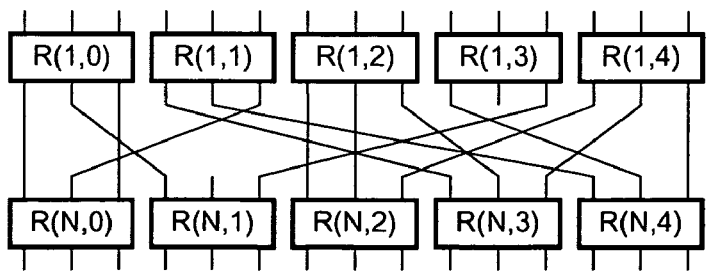

With bottom port 2 of switching element R(1,2) selected and recalling that its corresponding port, top port 1 of switching element R(N,3), is connected to bottom port 1 of switching element R(1,3), the rewiring step continues by diverting traffic from top port 1 of switching element R(N,3) and bottom port 1 of switching element R(1,3); stopping top port 1 of switching element R(N,3) and bottom port 1 of switching element R(1,3); disconnecting top port 1 of switching element R(N,3) and bottom port 1 of switching element R(1,3) and moving the disconnected connection to bottom port 2 of switching element R(1,2) as shown in FIG. 59G; starting bottom port 2 of switching element R(1,2) and top port 1 of switching element R(N,3); and stop diverting the traffic from bottom port 2 of switching element R(1,2) and top port 1 of switching element R(N,3).

Scanning from right to left, no port, top or bottom, has a corresponding port which is not connected. Again, scanning from right to left, bottom port 1 of switching element R(1,3) is not connected to anything and has, according to FIG. 56, a corresponding port of top port 2 of switching element R(N,0). Top port 2 of switching element R(N,0) is currently connected to bottom port 2 of switching element R(1,0). The breaking of this connection does not leave switching element R(1,0) or switching element R(N,0) with more than one broken connection. This completes the selection process for this step.

With bottom port 1 of switching element R(1,3) selected and recalling that its corresponding port, top port 2 of switching element R(N,0), is connected to bottom port 2 of switching element R(1,0), the rewiring step continues by diverting traffic from top port 2 of switching element R(N,0) and bottom port 2 of switching element R(1,0); stopping top port 2 of switching element R(N,0) and bottom port 2 of switching element R(1,0); disconnecting top port 2 of switching element R(N,0) and bottom port 2 of switching element R(1,0) and moving the disconnected connection to bottom port 1 of switching element R(1,3) as shown in FIG. 59H; starting bottom port 1 of switching element R(1,3) and top port 2 of switching element R(N,0); and stop diverting the traffic from bottom port 1 of switching element R(1,3) and top port 2 of switching element R(N,0).

Scanning from right to left, no port, top or bottom, has a corresponding port which is not connected. Again, scanning from right to left, top port 1 of switching element R(N,1) is not connected to anything and has, according to FIG. 56, a corresponding port of bottom port 0 of switching element R(1,2). Bottom port 0 of switching element R(1,2) is currently connected to top port 0 of switching element R(N,2). The breaking of this connection does not leave switching element R(1,2) or switching element R(N,2) with more than one broken connection. This completes the selection process for this step.

With top port 1 of switching element R(N,1) selected and recalling that its corresponding port, bottom port 0 of switching element R(1,2), is connected to top port 0 of switching element R(N,2), the rewiring step continues by diverting traffic from bottom port 0 of switching element R(1,2) and top port 0 of switching element R(N,2); stopping bottom port 0 of switching element R(1,2) and top port 0 of switching element R(N,2); disconnecting bottom port 0 of switching element R(1,2) and top port 0 of switching element R(N,2) and moving the disconnected connection to top port 1 of switching element R(N,1) as shown in FIG. 59I; starting top port 1 of switching element R(N,1) and bottom port 6 of switching element R(1,2); and stop diverting the traffic from top port 1 of switching element R(N,1) and bottom port 0 of switching element R(1,2).

The rewiring step continues by selecting top port 0 of switching element R(N,2) because scanning from right to left, it is the first port bottom or top not connected to anything and whose corresponding port (according to FIG. 56) is also not connected to anything; establishing a new connection between top port 0 of switching element R(N,2) and bottom port 2 of switching element R(1,0) as shown in FIG. 59J; starting top port 0 of switching element R(N,2) and bottom port 2 of switching element R(1,0); and stop diverting the traffic from top port 0 of switching element R(N,2) and bottom port 2 of switching element R(1,0).

This completes the rewiring of ISIC network 7054. Since the remaining ISIC networks are roughly as "close" to their counterparts in the post-reconfiguration switching network, the stage selection process goes back to the traditional "select the inner most stage" algorithm of FIG. 49B. Again, the order need not be taken in this manner, but it is believed that this method minimizes the disruption of switching capability.

As a result, the rewiring step is performed next on ISIC network 7056. First, ISIC network 7056 is examined for relabeling purposes.

Figure 60A:
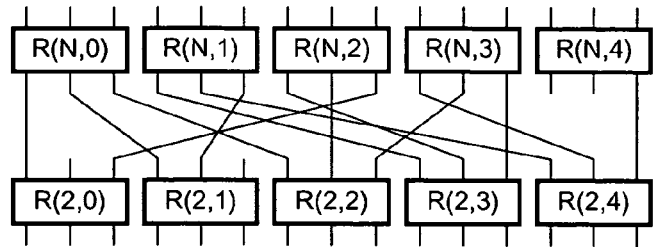
FIG. 60A, FIG. 60B, FIG. 60C, FIG. 60D, FIG. 60E, FIG. 60F and FIG. 60G show the ISIC networks between stages R(N,*) and R(2,*) being rewired into a post-reconfiguration CGISIC network by swapping bottom ports 0 and 1 of switching element R(N,2); swapping bottom ports 0 and 2 of switching element R(N,2); moving the connection from bottom port 2 of switching element R(N,3) to bottom port 1 of switching element R(N,4); adding a connection between bottom port 2 of switching element R(N,3) and top port 2 of switching element R(2,1); moving the connection from bottom port 1 of switching element R(N,3) to bottom port 0 of switching element R(N,4); moving the connection from top port 1 of switching element R(2,1) to top port 1 of switching element R(2,0); and moving the connection from bottom port 0 of switching element R(N,2) to bottom port 1 of switching element R(N,3), respectively.

The relabeling phase begins by scanning bottom ports from left to right. Switching element R(N,2) is connected to R(2,2), but according to FIG. 56, bottom port 1 should be connected to R(2,2) instead of bottom port 0. The connections to those ports are swapped as shown in FIG. 60A.

Figure 60B:
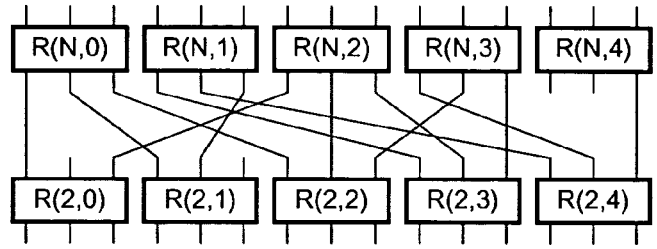

The relabeling phase continues by scanning bottom ports from left to right. Switching element R(N,2) is connected to R(2,3), but according to FIG. 56, bottom port 2 should be connected to R(2,3) instead of bottom port 0. The connections to those ports are swapped as shown in FIG. 60B.

This completes the relabeling phase for ISIC network 7056. The rewiring step continues by the following port section and resultant rewiring of the selected ports.

Scanning from right to left, no port, top or bottom, has a corresponding port which is not connected. Again, scanning from right to left, bottom port 1 of switching element R(N,4) is not connected to anything and has, according to FIG. 56, a corresponding port of top port 2 of switching element R(2,3). Top port 2 of switching element R(2,3) is currently connected to bottom port 2 of switching element R(N,3). The breaking of this connection does not leave switching element R(N,3) or switching element R(2,3) with more than one broken connection. This completes the selection process for this step.

Figure 60C:
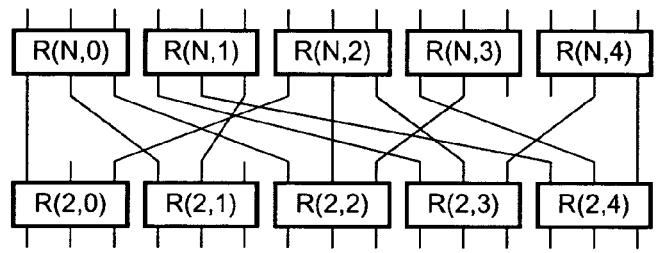

With bottom port 1 of switching element R(N,4) selected and recalling that its corresponding port, top port 2 of switching element R(2,3), is connected to bottom port 2 of switching element R(N,3), the rewiring step continues by diverting traffic from top port 2 of switching element R(2,3) and bottom port 2 of switching element R(N,3); stopping top port 2 of switching element R(2,3) and bottom port 2 of switching element R(N,3); disconnecting top port 2 of switching element R(2,3) and bottom port 2 of switching element R(N,3) and moving the disconnected connection to bottom port 1 of switching element R(N,4) as shown in FIG. 60C; starting bottom port 1 of switching element R(N,4) and top port 2 of switching element R(2,3); and stop diverting the traffic from bottom port 1 of switching element R(N,4) and top port 2 of switching element R(2,3).

Figure 60D:
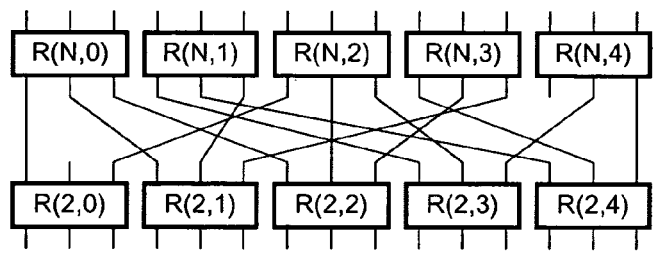

The rewiring step continues by selecting bottom port 2 of switching element R(N,3) because scanning from right to left, it is the first port bottom or top not connected to anything and whose corresponding port (according to FIG. 56) is also not connected to anything; establishing a new connection between bottom port 2 of switching element R(N,3) and top port 2 of switching element R(2,1) as shown in FIG. 60D; starting bottom port 2 of switching element R(N,3) and top port 2 of switching element R(2,1); and stop diverting the traffic from bottom port 2 of switching element R(N,3) and top port 2 of switching element R(2,1).

Scanning from right to left, no port, top or bottom, has a corresponding port which is not connected. Again, scanning from right to left, bottom port 0 of switching element R(N,4) is not connected to anything and has, according to FIG. 56, a corresponding port of top port 2 of switching element R(2,2). Top port 2 of switching element R(2,2) is currently connected to bottom port 1 of switching element R(N,3). The breaking of this connection does not leave switching element R(N,3) or switching element R(2,2) with more than one broken connection. This completes the selection process for this step.

Figure 60E:
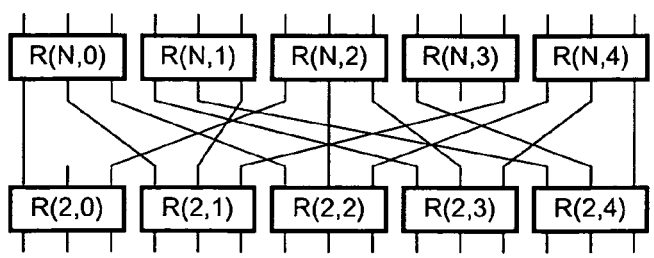

With bottom port 0 of switching element R(N,4) selected and recalling that its corresponding port, top port 2 of switching element R(2,2), is connected to bottom port 1 of switching element R(N,3), the rewiring step continues by diverting traffic from top port 2 of switching element R(2,2) and bottom port 1 of switching element R(N,3); stopping top port 2 of switching element R(2,2) and bottom port 1 of switching element R(N,3); disconnecting top port 2 of switching element R(2,2) and bottom port 1 of switching element R(N,3) and moving the disconnected connection to bottom port 0 of switching element R(N,4) as shown in FIG. 60E; starting bottom port 0 of switching element R(N,4) and top port 2 of switching element R(2,2); and stop diverting the traffic from bottom port 0 of switching element R(N,4) and top port 2 of switching element R(2,2).

Scanning from right to left, no port, top or bottom, has a corresponding port which is not connected. Again, scanning from right to left, bottom port 1 of switching element R(N,3) is not connected to anything and has, according to FIG. 56, a corresponding port of top port 2 of switching element R(2,0). Top port 2 of switching element R(2,0) is currently connected to bottom port 0 of switching element R(N,2). The breaking this connection introduces a second broken connection to R(2,0), so bottom port 1 of switching element R(N,3) is not selected. Continuing to scan from right to left, top port 1 of switching element R(2,0) is not connected to anything and has, according to FIG. 56, a corresponding port of bottom port 2 of switching element R(N,1). Bottom port 2 of switching element R(N,1) is currently connected to top port 1 of switching element R(2,1). The breaking of this connection does not leave switching element R(N,1) or switching element R(2,1) with more than one broken connection. This completes the selection process for this step.

Figure 60F:
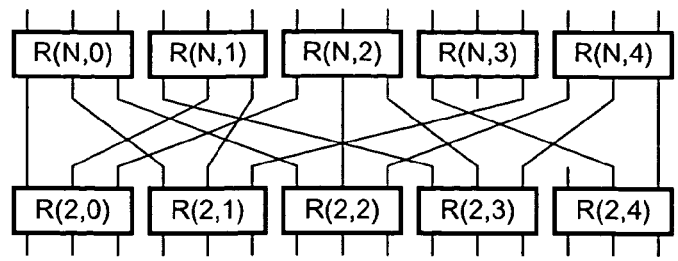

With top port 1 of switching element R(2,0) selected and recalling that its corresponding port, bottom port 2 of switching element R(N,1), is connected to top port 1 of switching element R(2,1), the rewiring step continues by diverting traffic from bottom port 2 of switching element R(N,1) and top port 1 of switching element R(2,1); stopping bottom port 2 of switching element R(N,1) and top port 1 of switching element R(2,1); disconnecting bottom port 2 of switching element R(N,1) and top port 1 of switching element R(2,1) and moving the disconnected connection to top port 1 of switching element R(2,0) as shown in FIG. 60F; starting top port 1 of switching element R(2,0) and bottom port 2 of switching element R(N,1); and stop diverting the traffic from top port 1 of switching element R(2,0) and bottom port 2 of switching element R(N,1).

Scanning from right to left, no port, top or bottom, has a corresponding port which is not connected. Again, scanning from right to left, bottom port 1 of switching element R(N,3) is not connected to anything and has, according to FIG. 56, a corresponding port of top port 2 of switching element R(2,0). Top port 2 of switching element R(2,0) is currently connected to bottom port 0 of switching element R(N,2). The breaking of this connection does not leave switching element R(N,2) or switching element R(2,0) with more than one broken connection. This completes the selection process for this step.

Figure 60G:
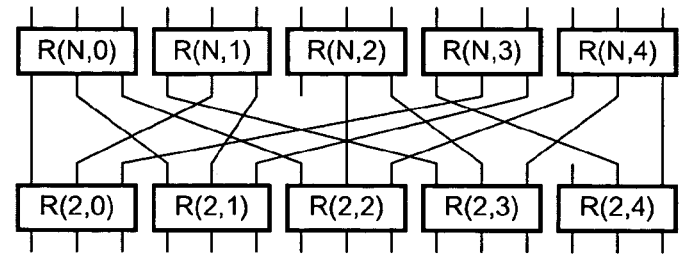

With bottom port 1 of switching element R(N,3) selected and recalling that its corresponding port, top port 2 of switching element R(2,0), is connected to bottom port 0 of switching element R(N,2), the rewiring step continues by diverting traffic from top port 2 of switching element R(2,0) and bottom port 0 of switching element R(N,2); stopping top port 2 of switching element R(2,0) and bottom port 0 of switching element R(N,2); disconnecting top port 2 of switching element R(2,0) and bottom port 0 of switching element R(N,2) and moving the disconnected connection to bottom port 1 of switching element R(N,3) as shown in FIG. 60G; starting bottom port 1 of switching element R(N,3) and top port 2 of switching element R(2,0); and stop diverting the traffic from bottom port 1 of switching element R(N,3) and top port 2 of switching element R(2,0).

Figure 60H:
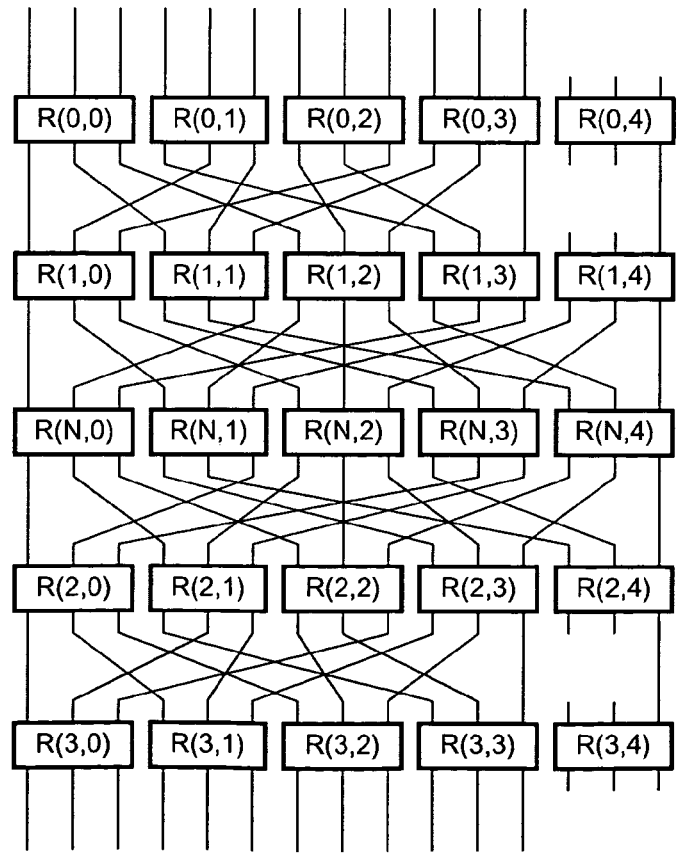
FIG. 60H shows an upgraded 30 port RBCCG multistage switching network with a completed rewire of the ISIC networks between stages R(N,*) and R(2,*) after adding a connection between bottom port 0 of switching element R(N,2) and top port 1 of switching element R(2,1).

The rewiring step continues by selecting bottom port 0 of switching element R(N,2) because scanning from right to left, it is the first port bottom or top not connected to anything and whose corresponding port (according to FIG. 56) is also not connected to anything; establishing a new connection between bottom port 0 of switching element R(N,2) and top port 1 of switching element R(2,1) as shown in FIG. 60H; starting bottom port 0 of switching element R(N,2) and top port 1 of switching element R(2,1); and stop diverting the traffic from bottom port 0 of switching element R(N,2) and top port 1 of switching element R(2,1).

This completes the rewiring of ISIC 7056. Since the remaining ISIC networks are identical and both are equally distant from the "middle" of the switching network, the choice is completely arbitrary. Since they are identical, examples are given with and without the optional relabeling step. First, ISIC network 7058 is selected and is rewired without the benefit of relabeling.

Scanning from right to left, no port, top or bottom, has a corresponding port which is not connected. Again, scanning from right to left, bottom port 1 of switching element R(2,4) is not connected to anything and has, according to FIG. 56, a corresponding port of top port 2 of switching element R(3,3). Top port 2 of switching element R(3,3) is currently connected to bottom port 2 of switching element R(2,3). The breaking of this connection does not leave switching element R(2,3) or switching element R(3,3) with more than one broken connection. This completes the selection process for this step.

Figure 61A:
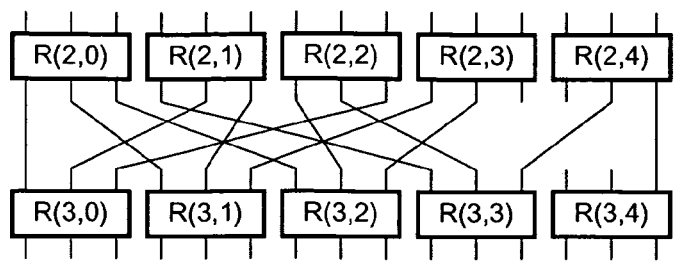
FIG. 61A, FIG. 61B, FIG. 61C, FIG. 61D, FIG. 61E, FIG. 61F, FIG. 61G, FIG. 61H and FIG. 61I show the ISIC network between stages R(2,*) and R(3,*) being rewired into a post-reconfiguration CGISIC network by moving the connection from bottom port 2 of switching element R(2,3) to bottom port 1 of switching element R(2,4); moving the connection from top port 1 of switching element R(3,0) to top port 0 of switching element R(3,4); moving the connection from top port 1 of switching element R(3,1) to top port 1 of switching element R(3,0); moving the connection from top port 1 of switching element R(3,2) to top port 1 of switching element R(3,1); moving the connection from top port 1 of switching element R(3,3) to top port 1 of switching element R(3,2); moving the connection from top port 2 of switching element R(3,0) to top port 1 of switching element R(3,3); moving the connection from top port 2 of switching element R(3,1) to top port 1 of switching element R(3,4); adding a connection between bottom port 2 of switching element R(2,3) and top port 2 of switching element R(3,1); and moving the connection from bottom port 1 of switching element R(2,3) to bottom port 0 of switching element R(2,4), respectively.

With bottom port 1 of switching element R(2,4) selected and recalling that its corresponding port, top port 2 of switching element R(3,3), is connected to bottom port 2 of switching element R(2,3), the rewiring step continues by diverting traffic from top port 2 of switching element R(3,3) and bottom port 2 of switching element R(2,3); stopping top port 2 of switching element R(3,3) and bottom port 2 of switching element R(2,3); disconnecting top port 2 of switching element R(3,3) and bottom port 2 of switching element R(2,3) and moving the disconnected connection to bottom port 1 of switching element R(2,4) as shown in FIG. 61A; starting bottom port 1 of switching element R(2,4) and top port 2 of switching element R(3,3); and stop diverting the traffic from bottom port 1 of switching element R(2,4) and top port 2 of switching element R(3,3).

Scanning from right to left, no port, top or bottom, has a corresponding port which is not connected. Again, scanning from right to left, top port 1 of switching element R(3,4) is not connected to anything and has, according to FIG. 56, a corresponding port of bottom port 0 of switching element R(2,3). Bottom port 0 of switching element R(2,3) is currently connected to top port 2 of switching element R(3,1). The breaking this connection introduces a second broken connection to R(2,3), so top port 1 of switching element R(3,4) is not selected. Continuing to scan from right to left, bottom port 0 of switching element R(2,4) is not connected to anything and has, according to FIG. 56, a corresponding port of top port 2 of switching element R(3,2). Top port 2 of switching element R(3,2) is currently connected to bottom port 1 of switching element R(2,3). The breaking this connection introduces a second broken connection to R(2,3), so bottom port 0 of switching element R(2,4) is not selected. Continuing to scan from right to left, top port 0 of switching element R(3,4) is not connected to anything and has, according to FIG. 56, a corresponding port of bottom port 1 of switching element R(2,1). Bottom port 1 of switching element R(2,1) is currently connected to top port 1 of switching element R(3,0). The breaking of this connection does not leave switching element R(2,1) or switching element R(3,0) with more than one broken connection. This completes the selection process for this step.

Figure 61B:
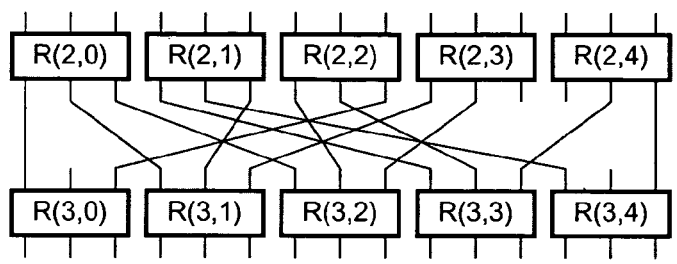

With top port 0 of switching element R(3,4) selected and recalling that its corresponding port, bottom port 1 of switching element R(2,1), is connected to top port 1 of switching element R(3,0), the rewiring step continues by diverting traffic from bottom port 1 of switching element R(2,1) and top port 1 of switching element R(3,0); stopping bottom port 1 of switching element R(2,1) and top port 1 of switching element R(3,0); disconnecting bottom port 1 of switching element R(2,1) and top port 1 of switching element R(3,0) and moving the disconnected connection to top port 0 of switching element R(3,4) as shown in FIG. 61B; starting top port 0 of switching element R(3,4) and bottom port 1 of switching element R(2,1); and stop diverting the traffic from top port 0 of switching element R(3,4) and bottom port 1 of switching element R(2,1).

Scanning from right to left, no port, top or bottom, has a corresponding port which is not connected. Again, scanning from right to left, top port 1 of switching element R(3,4) is not connected to anything and has, according to FIG. 56, a corresponding port of bottom port 0 of switching element R(2,3). Bottom port 0 of switching element R(2,3) is currently connected to top port 2 of switching element R(3,1). The breaking this connection introduces a second broken connection to R(2,3), so top port 1 of switching element R(3,4) is not selected. Continuing to scan from right to left, bottom port 0 of switching element R(2,4) is not connected to anything and has, according to FIG. 56, a corresponding port of top port 2 of switching element R(3,2). Top port 2 of switching element R(3,2) is currently connected to bottom port 1 of switching element R(2,3). The breaking this connection introduces a second broken connection to R(2,3), so bottom port 0 of switching element R(2,4) is not selected. Continuing to scan from right to left, bottom port 2 of switching element R(2,3) is not connected to anything and has, according to FIG. 56, a corresponding port of top port 2 of switching element R(3,1). Top port 2 of switching element R(3,1) is currently connected to bottom port 0 of switching element R(2,3). The breaking this connection introduces a second broken connection to R(2,3), so bottom port 2 of switching element R(2,3) is not selected. Continuing to scan from right to left, top port 1 of switching element R(3,0) is not connected to anything and has, according to FIG. 56, a corresponding port of bottom port 2 of switching element R(2,1). Bottom port 2 of switching element R(2,1) is currently connected to top port 1 of switching element R(3,1). The breaking of this connection does not leave switching element R(2,1) or switching element R(3,1) with more than one broken connection. This completes the selection process for this step.

Figure 61C:
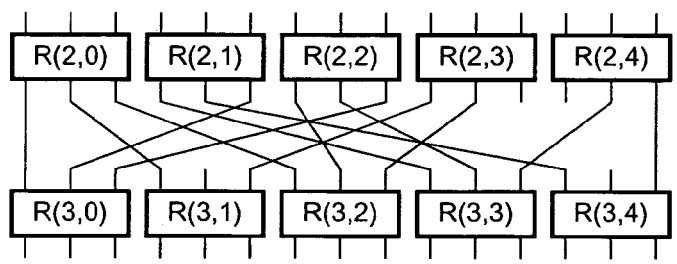

With top port 1 of switching element R(3,0) selected and recalling that its corresponding port, bottom port 2 of switching element R(2,1), is connected to top port 1 of switching element R(3,1), the rewiring step continues by diverting traffic from bottom port 2 of switching element R(2,1) and top port 1 of switching element R(3,1); stopping bottom port 2 of switching element R(2,1) and top port 1 of switching element R(3,1); disconnecting bottom port 2 of switching element R(2,1) and top port 1 of switching element R(3,1) and moving the disconnected connection to top port 1 of switching element R(3,0) as shown in FIG. 61C; starting top port 1 of switching element R(3,0) and bottom port 2 of switching element R(2,1); and stop diverting the traffic from top port 1 of switching element R(3,0) and bottom port 2 of switching element R(2,1).

Scanning from right to left, no port, top or bottom, has a corresponding port which is not connected. Again, scanning from right to left, top port 1 of switching element R(3,4) is not connected to anything and has, according to FIG. 56, a corresponding port of bottom port 0 of switching element R(2,3). Bottom port 0 of switching element R(2,3) is currently connected to top port 2 of switching element R(3,1). The breaking this connection introduces a second broken connection to R(2,3), so top port 1 of switching element R(3,4) is not selected. Continuing to scan from right to left, bottom port 0 of switching element R(2,4) is not connected to anything and has, according to FIG. 56, a corresponding port of top port 2 of switching element R(3,2). Top port 2 of switching element R(3,2) is currently connected to bottom port 1 of switching element R(2,3). The breaking this connection introduces a second broken connection to R(2,3), so bottom port 0 of switching element R(2,4) is not selected. Continuing to scan from right to left, bottom port 2 of switching element R(2,3) is not connected to anything and has, according to FIG. 56, a corresponding port of top port 2 of switching element R(3,1). Top port 2 of switching element R(3,1) is currently connected to bottom port 0 of switching element R(2,3). The breaking this connection introduces a second broken connection to R(2,3), so bottom port 2 of switching element R(2,3) is not selected. Continuing to scan from right to left, top port 1 of switching element R(3,1) is not connected to anything and has, according to FIG. 56, a corresponding port of bottom port 0 of switching element R(2,2). Bottom port 0 of switching element R(2,2) is currently connected to top port 1 of switching element R(3,2). The breaking of this connection does not leave switching element R(2,2) or switching element R(3,2) with more than one broken connection. This completes the selection process for this step.

Figure 61D:
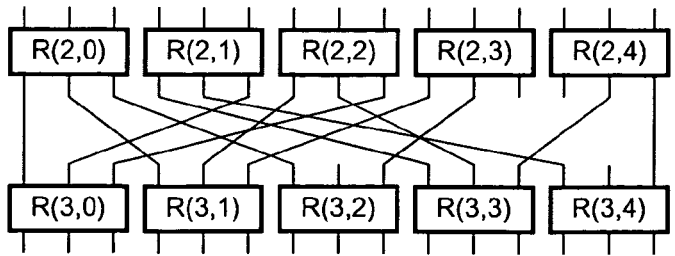

With top port 1 of switching element R(3,1) selected and recalling that its corresponding port, bottom port 0 of switching element R(2,2), is connected to top port 1 of switching element R(3,2), the rewiring step continues by diverting traffic from bottom port 0 of switching element R(2,2) and top port 1 of switching element R(3,2); stopping bottom port 0 of switching element R(2,2) and top port 1 of switching element R(3,2); disconnecting bottom port 0 of switching element R(2,2) and top port 1 of switching element R(3,2) and moving the disconnected connection to top port 1 of switching element R(3,1) as shown in FIG. 61D; starting top port 1 of switching element R(3,1) and bottom port 0 of switching element R(2,2); and stop diverting the traffic from top port 1 of switching element R(3,1) and bottom port 0 of switching element R(2,2).

Scanning from right to left, no port, top or bottom, has a corresponding port which is not connected. Again, scanning from right to left, top port 1 of switching element R(3,4) is not connected to anything and has, according to FIG. 56, a corresponding port of bottom port 0 of switching element R(2,3). Bottom port 0 of switching element R(2,3) is currently connected to top port 2 of switching element R(3,1). The breaking this connection introduces a second broken connection to R(2,3), so top port 1 of switching element R(3,4) is not selected. Continuing to scan from right to left, bottom port 0 of switching element R(2,4) is not connected to anything and has, according to FIG. 56, a corresponding port of top port 2 of switching element R(3,2). Top port 2 of switching element R(3,2) is currently connected to bottom port 1 of switching element R(2,3). The breaking this connection introduces a second broken connection to R(2,3), so bottom port 0 of switching element R(2,4) is not selected. Continuing to scan from right to left, bottom port 2 of switching element R(2,3) is not connected to anything and has, according to FIG. 56, a corresponding port of top port 2 of switching element R(3,1). Top port 2 of switching element R(3,1) is currently connected to bottom port 0 of switching element R(2,3). The breaking this connection introduces a second broken connection to R(2,3), so bottom port 2 of switching element R(2,3) is not selected. Continuing to scan from right to left, top port 1 of switching element R(3,2) is not connected to anything and has, according to FIG. 56, a corresponding port of bottom port 1 of switching element R(2,2). Bottom port 1 of switching element R(2,2) is currently connected to top port 1 of switching element R(3,3). The breaking of this connection does not leave switching element R(2,2) or switching element R(3,3) with more than one broken connection. This completes the selection process for this step.

Figure 61E:
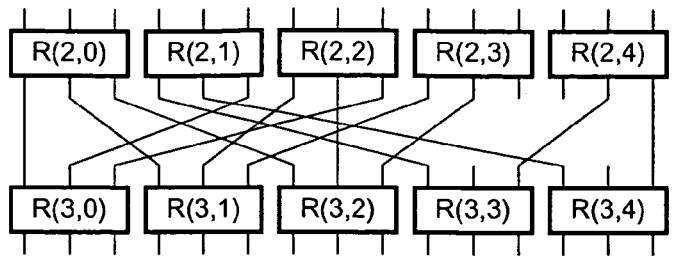

With top port 1 of switching element R(3,2) selected and recalling that its corresponding port, bottom port 1 of switching element R(2,2), is connected to top port 1 of switching element R(3,3), the rewiring step continues by diverting traffic from bottom port 1 of switching element R(2,2) and top port 1 of switching element R(3,3); stopping bottom port 1 of switching element R(2,2) and top port 1 of switching element R(3,3); disconnecting bottom port 1 of switching element R(2,2) and top port 1 of switching element R(3,3) and moving the disconnected connection to top port 1 of switching element R(3,2) as shown in FIG. 61E; starting top port 1 of switching element R(3,2) and bottom port 1 of switching element R(2,2); and stop diverting the traffic from top port 1 of switching element R(3,2) and bottom port 1 of switching element R(2,2).

Scanning from right to left, no port, top or bottom, has a corresponding port which is not connected. Again, scanning from right to left, top port 1 of switching element R(3,4) is not connected to anything and has, according to FIG. 56, a corresponding port of bottom port 0 of switching element R(2,3). Bottom port 0 of switching element R(2,3) is currently connected to top port 2 of switching element R(3,1). The breaking this connection introduces a second broken connection to R(2,3), so top port 1 of switching element R(3,4) is not selected. Continuing to scan from right to left, bottom port 0 of switching element R(2,4) is not connected to anything and has, according to FIG. 56, a corresponding port of top port 2 of switching element R(3,2). Top port 2 of switching element R(3,2) is currently connected to bottom port 1 of switching element R(2,3). The breaking this connection introduces a second broken connection to R(2,3), so bottom port 0 of switching element R(2,4) is not selected. Continuing to scan from right to left, bottom port 2 of switching element R(2,3) is not connected to anything and has, according to FIG. 56, a corresponding port of top port 2 of switching element R(3,1). Top port 2 of switching element R(3,1) is currently connected to bottom port 0 of switching element R(2,3). The breaking this connection introduces a second broken connection to R(2,3), so bottom port 2 of switching element R(2,3) is not selected. Continuing to scan from right to left, top port 1 of switching element R(3,3) is not connected to anything and has, according to FIG. 56, a corresponding port of bottom port 2 of switching element R(2,2). Bottom port 2 of switching element R(2,2) is currently connected to top port 2 of switching element R(3,0). The breaking of this connection does not leave switching element R(2,2) or switching element R(3,0) with more than one broken connection. This completes the selection process for this step.

Figure 61F:
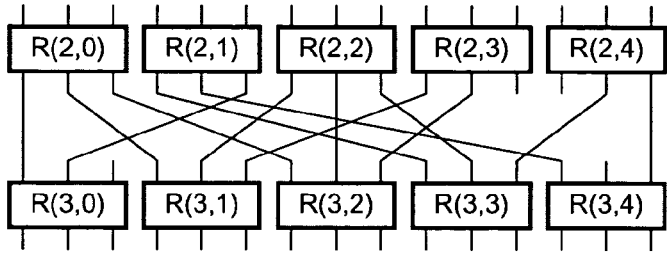

With top port 1 of switching element R(3,3) selected and recalling that its corresponding port, bottom port 2 of switching element R(2,2), is connected to top port 2 of switching element R(3,0), the rewiring step continues by diverting traffic from bottom port 2 of switching element R(2,2) and top port 2 of switching element R(3,0); stopping bottom port 2 of switching element R(2,2) and top port 2 of switching element R(3,0); disconnecting bottom port 2 of switching element R(2,2) and top port 2 of switching element R(3,0) and moving the disconnected connection to top port 1 of switching element R(3,3) as shown in FIG. 61F; starting top port 1 of switching element R(3,3) and bottom port 2 of switching element R(2,2); and stop diverting the traffic from top port 1 of switching element R(3,3) and bottom port 2 of switching element R(2,2).

Scanning from right to left, no port, top or bottom, has a corresponding port which is not connected. Again, scanning from right to left, top port 1 of switching element R(3,4) is not connected to anything and has, according to FIG. 56, a corresponding port of bottom port 0 of switching element R(2,3). Bottom port 0 of switching element R(2,3) is currently connected to top port 2 of switching element R(3,1). The breaking this connection introduces a second broken connection to R(2,3), so top port 1 of switching element R(3,4) is not selected. Continuing to scan from right to left, bottom port 0 of switching element R(2,4) is not connected to anything and has, according to FIG. 56, a corresponding port of top port 2 of switching element R(3,2). Top port 2 of switching element R(3,2) is currently connected to bottom port 1 of switching element R(2,3). The breaking this connection introduces a second broken connection to R(2,3), so bottom port 0 of switching element R(2,4) is not selected. Continuing to scan from right to left, bottom port 2 of switching element R(2,3) is not connected to anything and has, according to FIG. 56, a corresponding port of top port 2 of switching element R(3,1). Top port 2 of switching element R(3,1) is currently connected to bottom port 0 of switching element R(2,3). The breaking this connection introduces a second broken connection to R(2,3), so bottom port 2 of switching element R(2,3) is not selected. Continuing to scan from right to left, top port 2 of switching element R(3,0) is not connected to anything and has, according to FIG. 56, a corresponding port of bottom port 1 of switching element R(2,3). Bottom port 1 of switching element R(2,3) is currently connected to top port 2 of switching element R(3,2). The breaking this connection introduces a second broken connection to R(2,3), so top port 2 of switching element R(3,0) is not selected. Since none of the ports that are not connected satisfy the second port selection criterion, the selection process continues by selecting the rightmost port not connected to anything, that is top port 1 of switching element R(3,4).

Figure 61G:
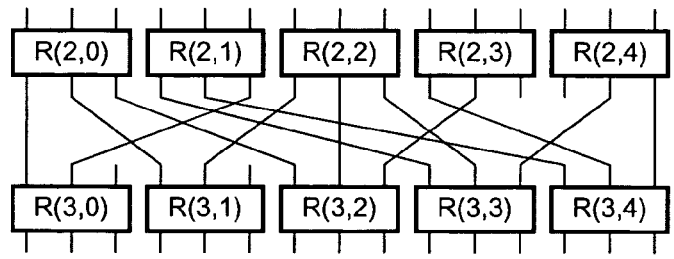

With top port 1 of switching element R(3,4) selected and recalling that its corresponding port, bottom port 0 of switching element R(2,3), is connected to top port 2 of switching element R(3,1), the rewiring step continues by diverting traffic from bottom port 0 of switching element R(2,3) and top port 2 of switching element R(3,1); stopping bottom port 0 of switching element R(2,3) and top port 2 of switching element R(3,1); disconnecting bottom port 0 of switching element R(2,3) and top port 2 of switching element R(3,1) and moving the disconnected connection to top port 1 of switching element R(3,4) as shown in FIG. 61G; starting top port 1 of switching element R(3,4) and bottom port 0 of switching element R(2,3); and stop diverting the traffic from top port 1 of switching element R(3,4) and bottom port 0 of switching element R(2,3).

Figure 61H:
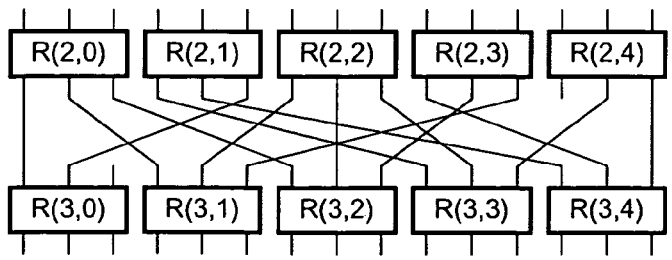

The rewiring step continues by selecting bottom port 2 of switching element R(2,3) because scanning from right to left, it is the first port bottom or top not connected to anything and whose corresponding port (according to FIG. 56) is also not connected to anything; establishing a new connection between bottom port 2 of switching element R(2,3) and top port 2 of switching element R(3,1) as shown in FIG. 61H; starting bottom port 2 of switching element R(2,3) and top port 2 of switching element R(3,1); and stop diverting the traffic from bottom port 2 of switching element R(2,3) and top port 2 of switching element R(3,1).

Scanning from right to left, no port, top or bottom, has a corresponding port which is not connected. Again, scanning from right to left, bottom port 0 of switching element R(2,4) is not connected to anything and has, according to FIG. 56, a corresponding port of top port 2 of switching element R(3,2). Top port 2 of switching element R(3,2) is currently connected to bottom port 1 of switching element R(2,3). The breaking of this connection does not leave switching element R(2,3) or switching element R(3,2) with more than one broken connection. This completes the selection process for this step.

Figure 61I:
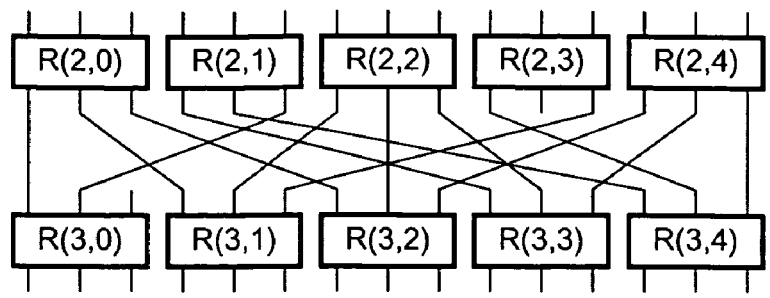

With bottom port 0 of switching element R(2,4) selected and recalling that its corresponding port, top port 2 of switching element R(3,2), is connected to bottom port 1 of switching element R(2,3), the rewiring step continues by diverting traffic from top port 2 of switching element R(3,2) and bottom port 1 of switching element R(2,3); stopping top port 2 of switching element R(3,2) and bottom port 1 of switching element R(2,3); disconnecting top port 2 of switching element R(3,2) and bottom port 1 of switching element R(2,3) and moving the disconnected connection to bottom port 0 of switching element R(2,4) as shown in FIG. 61I; starting bottom port 0 of switching element R(2,4) and top port 2 of switching element R(3,2); and stop diverting the traffic from bottom port 0 of switching element R(2,4) and top port 2 of switching element R(3,2).

Figure 61J:
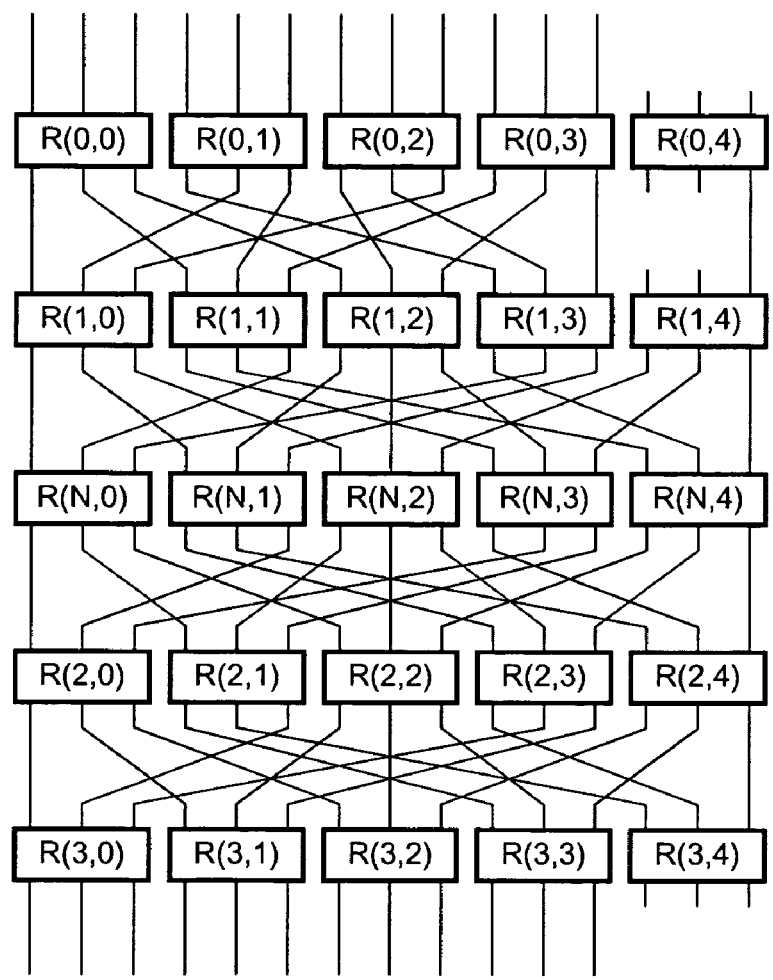
FIG. 61J shows a partially upgraded 30 port RBCCG multistage switching network with a completed rewire of the ISIC networks between stages R(2,*) and R(3,*) after adding a connection between bottom port 1 of switching element R(2, 3) and top port 2 of switching element R(3,0).

The rewiring step continues by selecting bottom port 1 of switching element R(2,3) because scanning from right to left, it is the first port bottom or top not connected to anything and whose corresponding port (according to FIG. 56) is also not connected to anything; establishing a new connection between bottom port 1 of switching element R(2,3) and top port 2 of switching element R(3,0) as shown in FIG. 61J; starting bottom port 1 of switching element R(2,3) and top port 2 of switching element R(3,0); and stop diverting the traffic from bottom port 1 of switching element R(2,3) and top port 2 of switching element R(3,0).

This completes the rewriting of ISIC network 7058. Now, ISIC network 7052, which was identical to ISIC network 7058, is rewired. However, in this case, ISIC network 7052 is examined for relabeling purposes.

Figure 62A:
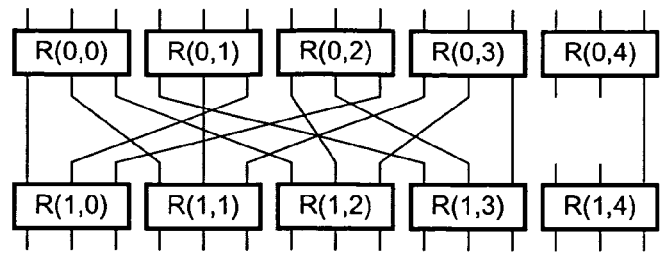
FIG. 62A, FIG. 62B, FIG. 62C, FIG. 62D, FIG. 62E, FIG. 62F, FIG. 62G, FIG. 62H and FIG. 62I show the ISIC network between stages R(0,*) and R(1,*) being rewired into a post-reconfiguration CGISIC network by swapping bottom ports 1 and 2 of switching element R(0,1); swapping bottom ports 0 and 1 of switching element R(0,2); swapping bottom ports 0 and 2 of switching element R(0,2); swapping bottom ports 0 and 2 of switching element R(0,3); moving the connection from bottom port 0 of switching element R(0,3) to bottom port 1 of switching element R(0,4); adding a connection between top port 1 of switching element R(1,4) and bottom port 0 of switching element R(0,3); moving the connection from bottom port 1 of switching element R(0,3) to bottom port 0 of switching element R(0,4); moving the connection from top port 1 of switching element R(1,1) to top port 0 of switching element R(1,4); and moving the connection from bottom port 0 of switching element R(0,2) to bottom port 1 of switching element R(0,3), respectively.

The relabeling phase begins by scanning bottom ports from left to right. Switching element R(0,1) is connected to R(1,0), but according to FIG. 56, bottom port 2 should be connected to R(1,0) instead of bottom port 1. The connections to those ports are swapped as shown in FIG. 62A.

Figure 62B:
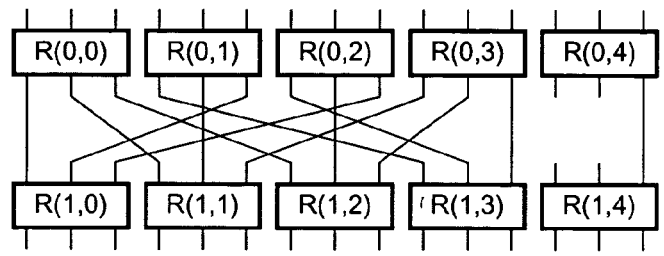

The relabeling phase continues by scanning bottom ports from left to right. Switching element R(0,2) is connected to R(1,2), but according to FIG. 56, bottom port 1 should be connected to R(1,2) instead of bottom port 0. The connections to those ports are swapped as shown in FIG. 62B.

Figure 62C:
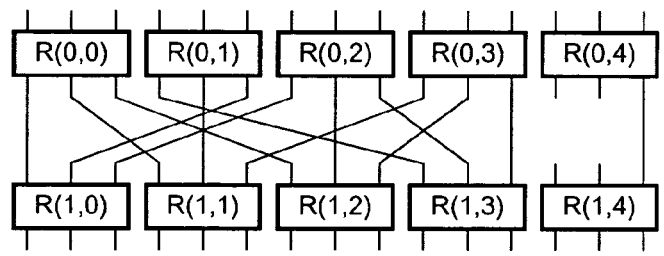

The relabeling phase continues by scanning bottom ports from left to right. Switching element R(0,2) is connected to R(1,3), but according to FIG. 56, bottom port 2 should be connected to R(1,3) instead of bottom port 0. The connections to those ports are swapped as shown in FIG. 62C.

Figure 62D:
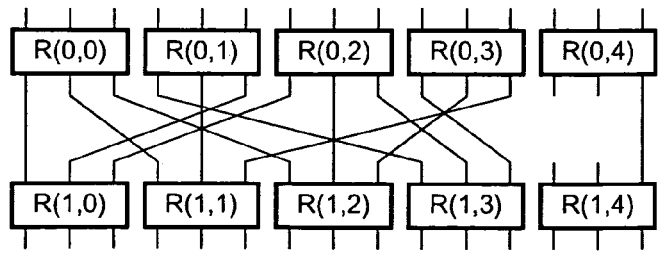

The relabeling phase continues by scanning bottom ports from left to right. Switching element R(0,3) is connected to R(1,1), but according to FIG. 56, bottom port 2 should be connected to R(1,1) instead of bottom port 0. The connections to those ports are swapped as shown in FIG. 62D.

This completes the relabeling phase for ISIC network 7052. The rewiring step continues by the following port section and resultant rewiring of the selected ports.

Scanning from right to left, no port, top or bottom, has a corresponding port which is not connected. Again, scanning from right to left, bottom port 1 of switching element R(0,4) is not connected to anything and has, according to FIG. 56, a corresponding port of top port 2 of switching element R(1,3). Top port 2 of switching element R(1,3) is currently connected to bottom port 0 of switching element R(0,3). The breaking of this connection does not leave switching element R(0,3) or switching element R(1,3) with more than one broken connection. This completes the selection process for this step.

Figure 62E:
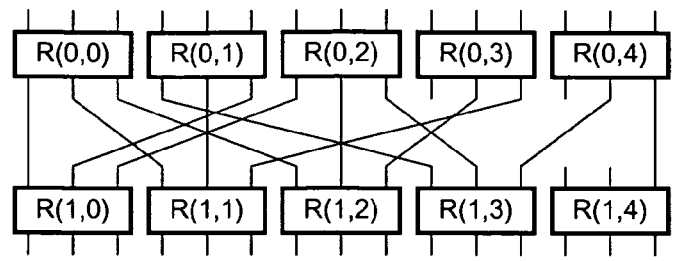

With bottom port 1 of switching element R(0,4) selected and recalling that its corresponding port, top port 2 of switching element R(1,3), is connected to bottom port 0 of switching element R(0,3), the rewiring step continues by diverting traffic from top port 2 of switching element R(1,3) and bottom port 0 of switching element R(0,3); stopping top port 2 of switching element R(1,3) and bottom port 0 of switching element R(0,3); disconnecting top port 2 of switching element R(1,3) and bottom port 0 of switching element R(0,3) and moving the disconnected connection to bottom port 1 of switching element R(0,4) as shown in FIG. 62E; starting bottom port 1 of switching element R(0,4) and top port 2 of switching element R(1,3); and stop diverting the traffic from bottom port 1 of switching element R(0,4) and top port 2 of switching element R(1,3).

Figure 62F:
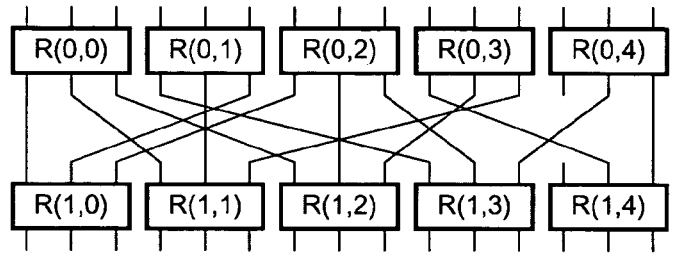

The rewiring step continues by selecting top port 1 of switching element R(1,4) because scanning from right to left, it is the first port bottom or top not connected to anything and whose corresponding port (according to FIG. 56) is also not connected to anything; establishing a new connection between top port 1 of switching element R(1,4) and bottom port 0 of switching element R(0,3) as shown in FIG. 62F; starting top port 1 of switching element R(1,4) and bottom port 0 of switching element R(0,3); and stop diverting the traffic from top port 1 of switching element R(1,4) and bottom port 0 of switching element R(0,3).

Scanning from right to left, no port, top or bottom, has a corresponding port which is not connected. Again, scanning from right to left, bottom port 0 of switching element R(0,4) is not connected to anything and has, according to FIG. 56, a corresponding port of top port 2 of switching element R(1,2). Top port 2 of switching element R(1,2) is currently connected to bottom port 1 of switching element R(0,3). The breaking of this connection does not leave switching element R(0,3) or switching element R(1,2) with more than one broken connection. This completes the selection process for this step.

Figure 62G:
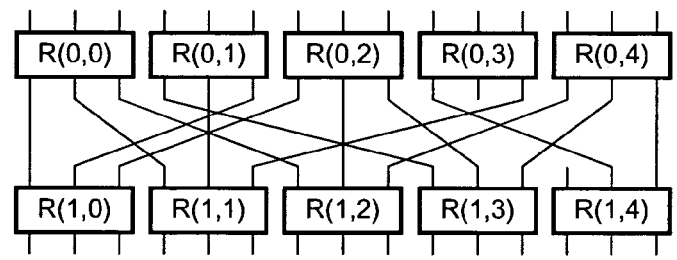

With bottom port 0 of switching element R(0,4) selected and recalling that its corresponding port, top port 2 of switching element R(1,2), is connected to bottom port 1 of switching element R(0,3), the rewiring step continues by diverting traffic from top port 2 of switching element R(1,2) and bottom port 1 of switching element R(0,3); stopping top port 2 of switching element R(1,2) and bottom port 1 of switching element R(0,3); disconnecting top port 2 of switching element R(1,2) and bottom port 1 of switching element R(0,3) and moving the disconnected connection to bottom port 0 of switching element R(0,4) as shown in FIG. 62G; starting bottom port 0 of switching element R(0,4) and top port 2 of switching element R(1,2); and stop diverting the traffic from bottom port 0 of switching element R(0,4) and top port 2 of switching element R(1,2).

Scanning from right to left, no port, top or bottom, has a corresponding port which is not connected. Again, scanning from right to left, top port 0 of switching element R(1,4) is not connected to anything and has, according to FIG. 56, a corresponding port of bottom port 1 of switching element R(0,1). Bottom port 1 of switching element R(0,1) is currently connected to top port 1 of switching element R(1,1). The breaking of this connection does not leave switching element R(0,1) or switching element R(1,1) with more than one broken connection. This completes the selection process for this step.

Figure 62H:
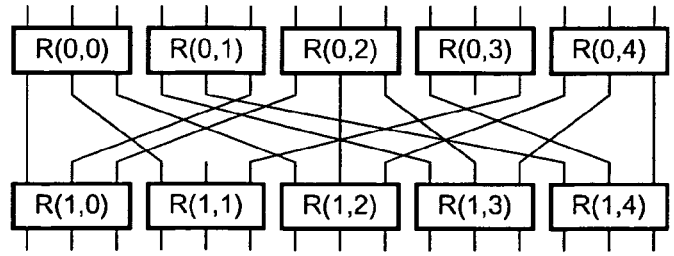

With top port 0 of switching element R(1,4) selected and recalling that its corresponding port, bottom port 1 of switching element R(0,1), is connected to top port 1 of switching element R(1,1), the rewiring step continues by diverting traffic from bottom port 1 of switching element R(0,1) and top port 1 of switching element R(1,1); stopping bottom port 1 of switching element R(0,1) and top port 1 of switching element R(1,1); disconnecting bottom port 1 of switching element R(0,1) and top port 1 of switching element R(1,1) and moving the disconnected connection to top port 0 of switching element R(1,4) as shown in FIG. 62H; starting top port 0 of switching element R(1,4) and bottom port 1 of switching element R(0,1) and stop diverting the traffic from top port 0 of switching element R(1,4) and bottom port 1 of switching element R(0,1).

Scanning from right to left, no port, top or bottom, has a corresponding port which is not connected. Again, scanning from right to left, bottom port 1 of switching element R(0,3) is not connected to anything and has, according to FIG. 56, a corresponding port of top port 2 of switching element R(1,0). Top port 2 of switching element R(1,0) is currently connected to bottom port 0 of switching element R(0,2). The breaking of this connection does not leave switching element R(0,2) or switching element R(1,0) with more than one broken connection. This completes the selection process for this step.

Figure 62I:
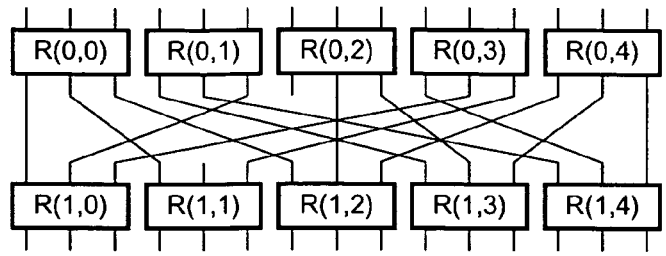

With bottom port 1 of switching element R(0,3) selected and recalling that its corresponding port, top port 2 of switching element R(1,0), is connected to bottom port 0 of switching element R(0,2), the rewiring step continues by diverting traffic from top port 2 of switching element R(1,0) and bottom port 0 of switching element R(0,2); stopping top port 2 of switching element R(1,0) and bottom port 0 of switching element R(0,2); disconnecting top port 2 of switching element R(1,0) and bottom port 0 of switching element R(0,2) and moving the disconnected connection to bottom port 1 of switching element R(0,3) as shown in FIG. 62I; starting bottom port 1 of switching element R(0,3) and top port 2 of switching element R(1,0); and stop diverting the traffic from bottom port 1 of switching element R(0,3) and top port 2 of switching element R(1,0).

Figure 62J:
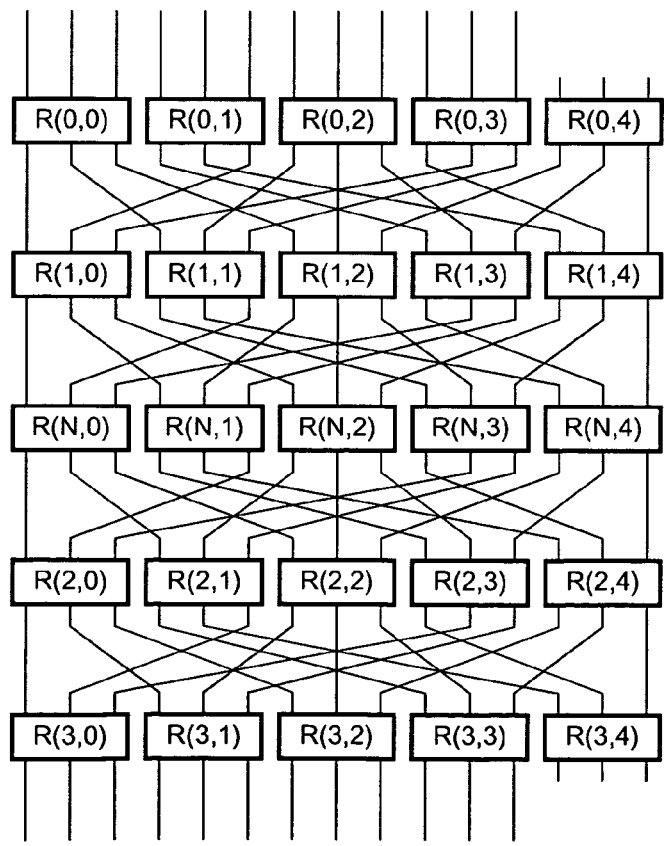
FIG. 62J shows a partially upgraded 30 port RBCCG multistage switching network with a completed rewire of the ISIC network between stages R(0,*) and R(1,*) after adding a connection between bottom port 0 of switching element R(0, 2) and top port 1 of switching element R(1,1).

The rewiring step continues by selecting bottom port 0 of switching element R(0,2) because scanning from right to left, it is the first port bottom or top not connected to anything and whose corresponding port (according to FIG. 56) is also not connected to anything; establishing a new connection between bottom port 0 of switching element R(0,2) and top port 1 of switching element R(1,1) as shown in FIG. 62J; starting bottom port 0 of switching element R(0,2) and top port 1 of switching element R(1,1); and stop diverting the traffic from bottom port 0 of switching element R(0,2) and top port 1 of switching element R(1,1).

This completes the rewiring process. The upgrade to the post-reconfiguration switching network depicted in FIG. 56 is completed when external ports 7002 and 7014 are activated and traffic is guided through them.

Figure 63:
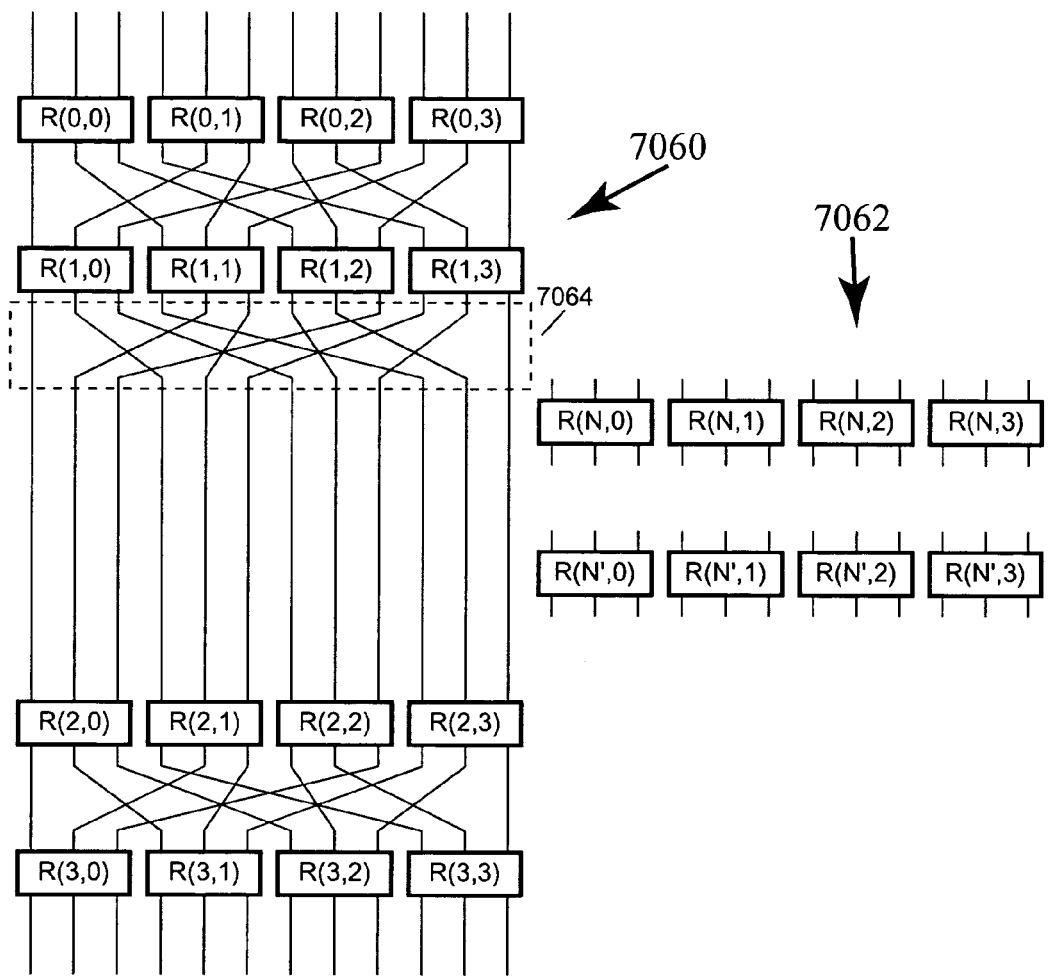
FIG. 63 shows a 24-port RBCCG multistage switching network with stages. This architecture is to be upgraded to a 24-port RBCCG multistage switching network with 6 stages by the addition of two extra stages of switching elements.
Figure 64:
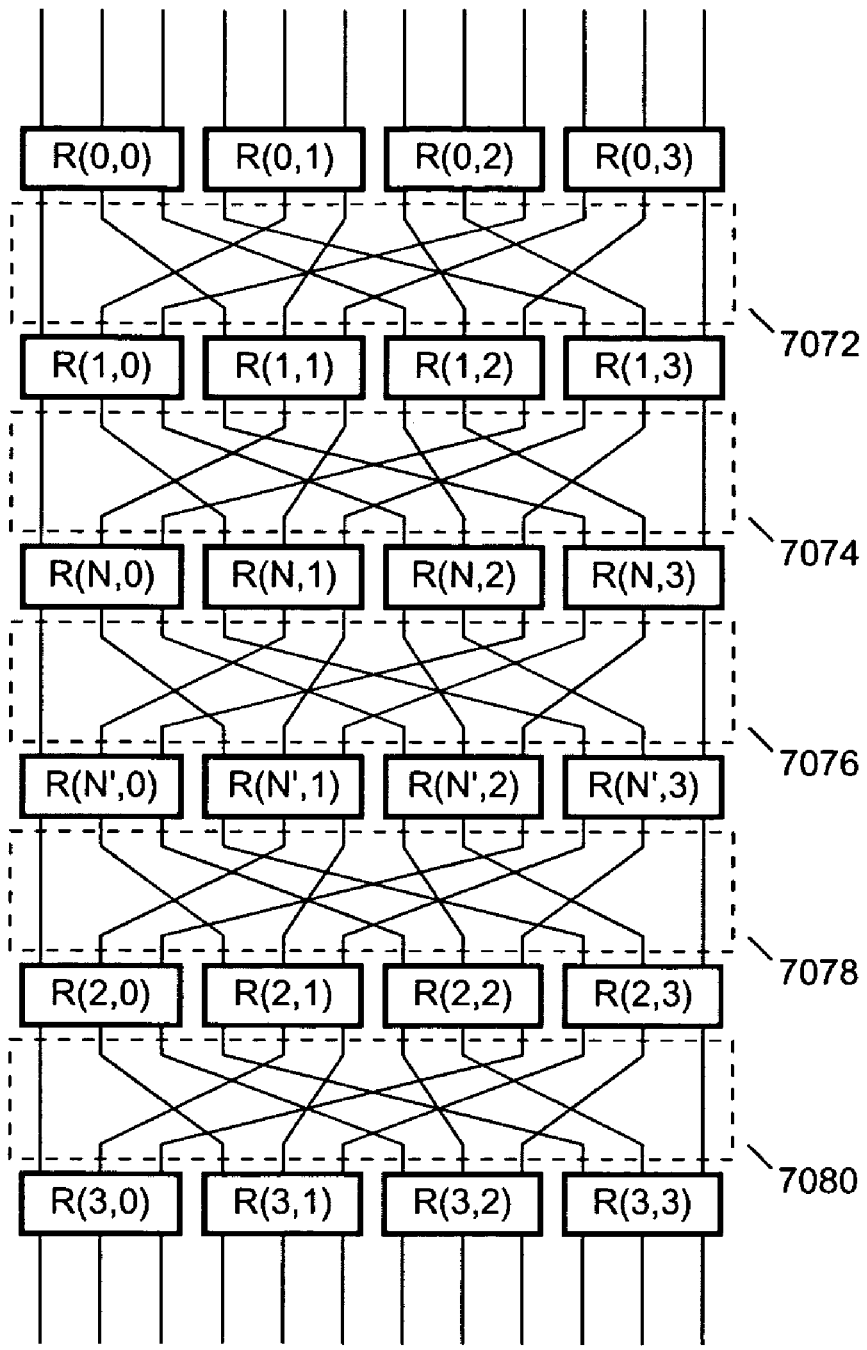

FIG. 63 shows a 24-port 4 stage pre-reconfiguration balanced RBCCG multistage switching network 7060 and two additional stages of switching elements 7062 to be added. Switching elements R(N,*) represent the upper row to be added, and switching elements R(N',*) represent the lower row to be added. Using the stage upgrade procedure illustrated in FIGS. 52A-52C, one can first add switching elements R(N,*), and then when that stage of switching elements has been added, switching elements R(N',*) can be added, or vice versa. Instead, using the process set forth below, both rows can be added simultaneously, minimizing the number of operations performed while still providing a functionally connected switching network during the upgrade process. Since there is no change in the number of external ports in this procedure, no external ports need to be shutdown. FIG. 64 shows the 24-port 6 stage post-reconfiguration balanced RBCCG multistage switching network.

Proceeding to the pre-connection step, according to the post-reconfiguration architecture shown in FIG. 64, the following connections can be established without disrupting existing connections: bottom port 2 of switching element R(N,3) to top port 2 of switching element R(N',3); bottom port 1 of switching element R(N,3) to top port 2 of switching element R(N',2); bottom port 0 of switching element R(N,3) to top port 2 of switching element R(N',1); bottom port 2 of switching element R(N,2) to top port 2 of switching element R(N',0); bottom port 1 of switching element R(N,2) to top port 1 of switching element R(N',3); bottom port 0 of switching element R(N,2) to top port 1 of switching element R(N',2); bottom port 2 of switching element R(N,1) to top port 1 of switching element R(N',1); bottom port 1 of switching element R(N,1) to top port 1 of switching element R(N',0); bottom port 0 of switching element R(N,1) to top port 0 of switching element R(N',3); bottom port 2 of switching element R(N,0) to top port 0 of switching element R(N',2); bottom port 1 of switching element R(N,0) to top port 0 of switching element R(N',1); and bottom port 0 of switching element R(N,0) to top port 0 of switching element R(N',0). The result is shown in FIG. 65.

It should be noted here that the new connections 7082 added by the pre-connection step form the ISIC network 7076 of FIG. 64, which is a general characteristic of the splicing step whenever a plurality of new stages of switching elements, regardless of whether the width or fanout is also expanded (or contracted). With the new connections in place, the upgrade process continues with the splicing step, which splices in the new stage of switching elements. In this embodiment of the splice step, the top ports used to splice the new stage of switching elements are those of switching element R(N,*), and the bottom ports used come from switching elements R(N',*). In addition, in this example, the new stages are inserted below the selected, ISIC network 7064 of FIG. 63. Additionally, the order of splicing each individual connection is different than the previous example.

The splicing step begin by: diverting traffic away from bottom port 0 of switching element R(1,0) and top port 0 of switching element R(2,0); shutting down bottom port 0 of switching element R(1,0) and top port 0 of switching element R(2,0); moving the connection at bottom port 0 of switching element R(1,0) to bottom port 0 of switching element R(N',0) as shown in FIG. 66A; starting bottom port 0 of switching element R(N',0) and top port 0 of switching element R(2,0); connecting bottom port 0 of switching element R(1,0) to top port 0 of switching element R(N,0) as also shown in FIG. 66A; starting bottom port 0 of switching element R(1,0) and top port 0 of switching element R(N,0); and stop diverting traffic away from bottom port 0 of switching element R(1,0) and top port 0 of switching element R(2,0).

The splicing step continues by: diverting traffic away from bottom port 1 of switching element R(1,0) and top port 0 of switching element R(2,1); shutting down bottom port 1 of switching element R(1,0) and top port 0 of switching element R(2,1); moving the connection at bottom port 1 of switching element R(1,0) to bottom port 0 of switching element R(N',1) as shown in FIG. 66B; starting bottom port 0 of switching element R(N',1) and top port 0 of switching element R(2,1); connecting bottom port 1 of switching element R(1,0) to top port 0 of switching element R(N,1) as also shown in FIG. 66B; starting bottom port 1 of switching element R(1,0) and top port 0 of switching element R(N,1); and stop diverting traffic away from bottom port 1 of switching element R(1,0) and top port 0 of switching element R(2,1).

The splicing step continues by: diverting traffic away from bottom port 2 of switching element R(1,0) and top port 0 of switching element R(2,2); shutting down bottom port 2 of switching element R(1,0) and top port 0 of switching element R(2,2); moving the connection at bottom port 2 of switching element R(1,0) to bottom port 0 of switching element R(N',2) as shown in FIG. 66C; starting bottom port 0 of switching element R(N',2) and top port 0 of switching element R(2,2); connecting bottom port 2 of switching element R(1,0) to top port 0 of switching element R(N,2) as also shown in FIG. 66C; starting bottom port 2 of switching element R(1,0) and top port 0 of switching element R(N,2); and stop diverting traffic away from bottom port 2 of switching element R(1,0) and top port 0 of switching element R(2,2).

The splicing step continues by: diverting traffic away from bottom port 0 of switching element R(1,1) and top port 0 of switching element R(2,3); shutting down bottom port 0 of switching element R(1,1) and top port 0 of switching element R(2,3); moving the connection at bottom port 0 of switching element R(1,1) to bottom port 0 of switching element R(N',3) as shown in FIG. 66D; starting bottom port 0 of switching element R(N',3) and top port 0 of switching element R(2,3); connecting bottom port 0 of switching element R(1,1) to top port 0 of switching element R(N,3) as also shown in FIG. 66D; starting bottom port 0 of switching element R(1,1) and top port 0 of switching element R(N,3); and stop diverting traffic away from bottom port 0 of switching element R(1,1) and top port 0 of switching element R(2,3).

The splicing step continues by: diverting traffic away from bottom port 1 of switching element R(1,1) and top port 1 of switching element R(2,0); shutting down bottom port 1 of switching element R(1,1) and top port 1 of switching element R(2,0); moving the connection at bottom port 1 of switching element R(1,1) to bottom port 1 of switching element R(N',0) as shown in FIG. 66E; starting bottom port 1 of switching element R(N',0) and top port 1 of switching element R(2,0); connecting bottom port 1 of switching element R(1,1) to top port 1 of switching element R(N,0) as also shown in FIG. 66E; starting bottom port 1 of switching element R(1,1) and top port 1 of switching element R(N,0); and stop diverting traffic away from bottom port 1 of switching element R(1,1) and top port 1 of switching element R(2,0).

The splicing step continues by: diverting traffic away from bottom port 2 of switching element R(1,1) and top port 1 of switching element R(2,1); shutting down bottom port 2 of switching element R(1,1) and top port 1 of switching element R(2,1); moving the connection at bottom port 2 of switching element R(1,1) to bottom port 1 of switching element R(N',1) as shown in FIG. 66F; starting bottom port 1 of switching element R(N',1) and top port 1 of switching element R(2,1); connecting bottom port 2 of switching element R(1,1) to top port 1 of switching element R(N,1) as also shown in FIG. 66F; starting bottom port 2 of switching element R(1,1) and top port 1 of switching element R(N,1); and stop diverting traffic away from bottom port 2 of switching element R(1,1) and top port 1 of switching element R(2,1).

The splicing step continues by: diverting traffic away from bottom port 0 of switching element R(1,2) and top port 1 of switching element R(2,2); shutting down bottom port 0 of switching element R(1,2) and top port 1 of switching element R(2,2); moving the connection at bottom port 0 of switching element R(1,2) to bottom port 1 of switching element R(N',2) as shown in FIG. 66G; starting bottom port 1 of switching element R(N',2) and top port 1 of switching element R(2,2); connecting bottom port 0 of switching element R(1,2) to top port 1 of switching element R(N,2) as also shown in FIG. 66G; starting bottom port 0 of switching element R(1,2) and top port 1 of switching element R(N,2); and stop diverting traffic away from bottom port 0 of switching element R(1,2) and top port 1 of switching element R(2,2).

The splicing step continues by: diverting traffic away from bottom port 1 of switching element R(1,2) and top port 1 of switching element R(2,3); shutting down bottom port 1 of switching element R(1,2) and top port 1 of switching element R(2,3); moving the connection at bottom port 1 of switching element R(1,2) to bottom port 1 of switching element R(N',3) as shown in FIG. 66H; starting bottom port 1 of switching element R(N',3) and top port 1 of switching element R(2,3); connecting bottom port 1 of switching element R(1,2) to top port 1 of switching element R(N,3) as also shown in FIG. 66H; starting bottom port 1 of switching element R(1,2) and top port 1 of switching element R(N,3); and stop diverting traffic away from bottom port 1 of switching element R(1,2) and top port 1 of switching element R(2,3).

The splicing step continues by: diverting traffic away from bottom port 2 of switching element R(1,2) and top port 2 of switching element R(2,0); shutting down bottom port 2 of switching element R(1,2) and top port 2 of switching element R(2,0); moving the connection at bottom port 2 of switching element R(1,2) to bottom port 2 of switching element R(N',0) as shown in FIG. 66I; starting bottom port 2 of switching element R(N',0) and top port 2 of switching element R(2,0); connecting bottom port 2 of switching element R(1,2) to top port 2 of switching element R(N,0) as also shown in FIG. 66I; starting bottom port 2 of switching element R(1,2) and top port 2 of switching element R(N,0); and stop diverting traffic away from bottom port 2 of switching element R(1,2) and top port 2 of switching element R(2,0).

The splicing step continues by: diverting traffic away from bottom port 0 of switching element R(1,3) and top port 2 of switching element R(2,1); shutting down bottom port 0 of switching element R(1,3) and top port 2 of switching element R(2,1); moving the connection at bottom port 0 of switching element R(1,3) to bottom port 2 of switching element R(N',1) as shown in FIG. 66J; starting bottom port 2 of switching element R(N',1) and top port 2 of switching element R(2,1); connecting bottom port 0 of switching element R(1,3) to top port 2 of switching element R(N,1) as also shown in FIG. 66J; starting bottom port 0 of switching element R(1,3) and top port 2 of switching element R(N,1); and stop diverting traffic away from bottom port 0 of switching element R(1,3) and top port 2 of switching element R(2,1).

The splicing step continues by: diverting traffic away from bottom port 1 of switching element R(1,3) and top port 2 of switching element R(2,2); shutting down bottom port 1 of switching element R(1,3) and top port 2 of switching element R(2,2); moving the connection at bottom port 1 of switching element R(1,3) to bottom port 2 of switching element R(N',2) as shown in FIG. 66K; starting bottom port 2 of switching element R(N',2) and top port 2 of switching element R(2,2); connecting bottom port 1 of switching element R(1,3) to top port 2 of switching element R(N,2) as also shown in FIG. 66K; starting bottom port 1 of switching element R(1,3) and top port 2 of switching element R(N,2); and stop diverting traffic away from bottom port 1 of switching element R(1,3) and top port 2 of switching element R(2,2).

The splicing step continues by: diverting traffic away from bottom port 2 of switching element R(1,3) and top port 2 of switching element R(2,3); shutting down bottom port 2 of switching element R(1,3) and top port 2 of switching element R(2,3); moving the connection at bottom port 2 of switching element R(1,3) to bottom port 2 of switching element R(N',3) as shown in FIG. 66L; starting bottom port 2 of switching element R(N',3) and top port 2 of switching element R(2,3); connecting bottom port 2 of switching element R(1,3) to top port 2 of switching element R(N,3) as also shown in FIG. 66L; starting bottom port 2 of switching element R(1,3) and top port 2 of switching element R(N,3); and stop diverting traffic away from bottom port 2 of switching element R(1,3) and top port 2 of switching element R(2,3).

With the splicing step completed, the switching network resultant from the upgrade process so far as shown in FIG. 66M is compared to the post-reconfiguration switching network. The comparison reveals that ISIC networks 7084, 7086, 7088, and 7092 are identical to the post-reconfiguration networks 7072, 7074, 7078, and 7080, respectively. Only ISIC network 7090 differs from the post-reconfiguration ISIC network shown in 7078, therefore rewiring need only be applied to ISIC network 7090. In this embodiment, the rewiring step begins with the relabeling phase.

The relabeling phase begins by scanning top ports from right to left. Switching element R(2,2) is connected to bottom port 0 of switching element R(N',2), but according to FIG. 64, top port 1 should be connected to bottom port 0 of switching element R(N',2) instead of top port 0. The connections to those ports are swapped as shown in FIG. 67A.

The relabeling continues by scanning top ports from right to left Switching element R(2,1) is connected to bottom port 2 of switching element R(N',1), but according to FIG. 64, top port 1 should be connected to bottom port 2 of switching element R(N',1) instead of top port 2. The connections to those ports are swapped as shown in FIG. 67B.

This completes the relabeling phase for ISIC network 7090. The upgrade process now continues with the port selection phase of the rewiring step.

Since all ports are connected, connected ports are checked. Scanning from right to left, bottom port 1 of switching element R(N',3) is selected because it is not connected to its corresponding port (according to FIG. 64), top port 2 of switching element R(2,2). Bottom port 1 of switching element R(N',3) is connected to top port 1 of switching element R(2,3), and top port 2 of switching element R(2,2) is connected to bottom port 2 of switching element R(N',2). The process continues by diverting traffic from bottom port 1 of switching element R(N',3) and top port 1 of switching element R(2,3); stopping bottom port 1 of switching element R(N',3) and top port 1 of switching element R(2,3); disconnecting bottom port 1 of switching element R(N',3) and top port 1 of switching element R(2,3); diverting traffic from top port 2 of switching element R(2,2) and bottom port 2 of switching element R(N',2); stopping top port 2 of switching element R(2,2) and bottom port 2 of switching element R(N', 2); disconnecting top port 2 of switching element R(2,2) and bottom port 2 of switching element R(N',2) and moving the disconnected connection to bottom port 1 of switching element R(N',3) as shown in FIG. 67C; starting bottom port 1 of switching element R(N',3) and top port 2 of switching element R(2,2); and stop diverting the traffic from bottom port 1 of switching element R(N',3) and top port 2 of switching element R(2,2). Scanning from right to left, no port, top or bottom, has a corresponding port which is not connected. Again, scanning from right to left, top port 1 of switching element R(2,3) is not connected to anything and has, according to FIG. 64, a corresponding port of bottom port 1 of switching element R(N',2). Bottom port 1 of switching element R(N',2) is currently connected to top port 0 of switching element R(2,2). The breaking this connection introduces a second broken connection to R(N',2), so top port 1 of switching element R(2,3) is not selected. Continuing to scan from right to left, bottom port 2 of switching element R(N',2) is not connected to anything and has, according to FIG. 64, a corresponding port of top port 2 of switching element R(2,0). Top port 2 of switching element R(2,0) is currently connected to bottom port 2 of switching element R(N',0). The breaking of this connection does not leave switching element R(N',0) or switching element R(2,0) with more than one broken connection. This completes the selection process for this step.

With bottom port 2 of switching element R(N',2) selected and recalling that its corresponding port, top port 2 of switching element R(2,0), is connected to bottom port 2 of switching element R(N',0), the rewiring step by diverting traffic from top port 2 of switching element R(2,0) and bottom port 2 of switching element R(N',0); stopping top port 2 of switching element R(2,0) and bottom port 2 of switching element R(N', 0); disconnecting top port 2 of switching element R(2,0) and bottom port 2 of switching element R(N',0) and moving the disconnected connection to bottom port 2 of switching element R(N',2) as shown in FIG. 67D; starting bottom port 2 of switching element R(N',2) and top port 2 of switching element R(2,0); and stop diverting the traffic from bottom port 2 of switching element R(N',2) and top port 2 of switching element R(2,0).

Scanning from right to left, no port, top or bottom, has a corresponding port which is not connected. Again, scanning from right to left, top port 1 of switching element R(2,3) is not connected to anything and has, according to FIG. 64, a corresponding port of bottom port 1 of switching element R(N', 2). Bottom port 1 of switching element R(N',2) is currently connected to top port 0 of switching element R(2,2). The breaking of this connection does not leave switching element R(N',2) or switching element R(2,2) with more than one broken connection. This completes the selection process for this step.

With top port 1 of switching element R(2,3) selected and recalling that its corresponding port, bottom port 1 of switching element R(N',2), is connected to top port 0 of switching element R(2,2), the rewiring step by diverting traffic from bottom port 1 of switching element R(N',2) and top port 0 of switching element R(2,2); stopping bottom port 1 of switching element R(N',2) and top port 0 of switching element R(2,2); disconnecting bottom port 1 of switching element R(N',2) and top port 0 of switching element R(2,2) and moving the disconnected connection to top port 1 of switching element R(2,3) as shown in FIG. 67E; starting top port 1 of switching element R(2,3) and bottom port 1 of switching element R(N',2); and stop diverting the traffic from top port 1 of switching element R(2,3) and bottom port 1 of switching element R(N',2).

The process continues by selecting top port 0 of switching element R(2,2) because scanning from right to left, it is the first port bottom or top not connected to anything and whose corresponding port (according to FIG. 64) is also not connected to anything; establishing a new connection between top port 0 of switching element R(2,2) and bottom port 2 of switching element R(N',0) as shown in FIG. 67F; starting top port 0 of switching element R(2,2) and bottom port 2 of switching element R(N',0); and stop diverting the traffic from top port 0 of switching element R(2,2) and bottom port 2 of switching element R(N',0).

Since all ports are connected, connected ports are checked. Scanning from right to left, bottom port 0 of switching element R(N',3) is selected because it is not connected to its corresponding port (according to FIG. 64), top port 2 of switching element R(2,1). Bottom port 0 of switching element R(N',3) is connected to top port 0 of switching element R(2,3), and top port 2 of switching element R(2,1) is connected to bottom port 1 of switching element R(N',1). The process continues by diverting traffic from bottom port 0 of switching element R(N',3) and top port 0 of switching element R(2,3); stopping bottom port 0 of switching element R(N',3) and top port 0 of switching element R(2,3); disconnecting bottom port 0 of switching element R(N',3) and top port 0 of switching element R(2,3); diverting traffic from top port 2 of switching element R(2,1) and bottom port 1 of switching element R(N',1); stopping top port 2 of switching element R(2,1) and bottom port 1 of switching element R(N', 1); disconnecting top port 2 of switching element R(2,1) and bottom port 1 of switching element R(N',1) and moving the disconnected connection to bottom port 0 of switching element R(N',3) as shown in FIG. 67G; starting bottom port 0 of switching element R(N',3) and top port 2 of switching element R(2,1); and stop diverting the traffic from bottom port 0 of switching element R(N',3) and top port 2 of switching element R(2,1). Scanning from right to left, no port, top or bottom, has a corresponding port which is not connected. Again, scanning from right to left, top port 0 of switching element R(2,3) is not connected to anything and has, according to FIG. 64, a corresponding port of bottom port 0 of switching element R(N',1). Bottom port 0 of switching element R(N',1) is currently connected to top port 0 of switching element R(2,1). The breaking this connection introduces a second broken connection to R(N',1), so top port 0 of switching element R(2,3) is not selected. Continuing to scan from right to left, bottom port 1 of switching element R(N',1) is not connected to anything and has, according to FIG. 64, a corresponding port of top port 1 of switching element R(2,0). Top port 1 of switching element R(2,0) is currently connected to bottom port 1 of switching element R(N',0). The breaking of this connection does not leave switching element R(N',0) or switching element R(2,0) with more than one broken connection. This completes the selection process for this step.

With bottom port 1 of switching element R(N',1) selected and recalling that its corresponding port, top port 1 of switching element R(2,0), is connected to bottom port 1 of switching element R(N',0), the rewiring step by diverting traffic from top port 1 of switching element R(2,0) and bottom port 1 of switching element R(N',0); stopping top port 1 of switching element R(2,0) and bottom port 1 of switching element R(N', 0); disconnecting top port 1 of switching element R(2,0) and bottom port 1 of switching element R(N',0) and moving the disconnected connection to bottom port 1 of switching element R(N',1) as shown in FIG. 67H; starting bottom port 1 of switching element R(N',1) and top port 1 of switching element R(2,0); and stop diverting the traffic from bottom port 1 of switching element R(N',1) and top port 1 of switching element R(2,0).

Scanning from right to left, no port, top or bottom, has a corresponding port which is not connected. Again, scanning from right to left, top port 0 of switching element R(2,3) is not connected to anything and has, according to FIG. 64, a corresponding port of bottom port 0 of switching element R(N', 1). Bottom port 0 of switching element R(N',1) is currently connected to top port 0 of switching element R(2,1). The breaking of this connection does not leave switching element R(N',1) or switching element R(2,1) with more than one broken connection. This completes the selection process for this step.

With top port 0 of switching element R(2,3) selected and recalling that its corresponding port, bottom port 0 of switching element R(N',1), is connected to top port 0 of switching element R(2,1), the rewiring step by diverting traffic from bottom port 0 of switching element R(N',1) and top port 0 of switching element R(2,1); stopping bottom port 0 of switching element R(N',1) and top port 0 of switching element R(2,1); disconnecting bottom port 0 of switching element R(N',1) and top port 0 of switching element R(2,1) and moving the disconnected connection to top port 0 of switching element R(2,3) as shown in FIG. 67I; starting top port 0 of switching element R(2,3) and bottom port 0 of switching element R(N',1); and stop diverting the traffic from top port 0 of switching element R(2,3) and bottom port 0 of switching element R(N',1).

The process continues by selecting top port 0 of switching element R(2,1) because scanning from right to left, it is the first port bottom or top not connected to anything and whose corresponding port (according to FIG. 64) is also not connected to anything; establishing a new connection between top port 0 of switching element R(2,1) and bottom port 1 of switching element R(N',0) as shown in FIG. 67J; starting top port 0 of switching element R(2,1) and bottom port 1 of switching element R(N',0); and stop diverting the traffic from top port 0 of switching element R(2,1) and bottom port 1 of switching element R(N',0).

This completes the rewiring step. Since this upgrade example does not introduce additional external ports, this also completes the upgrade process.

FIG. 68 shows a 30-port 4 stage pre-reconfiguration balanced RBCCG multistage switching network 7100. The hatched areas represent the location on each switching element where new ports that can be added. For example, one embodiment of the addition of ports is through the addition of new line cards to a router. In addition, the width is also expanded by the addition of a new column 7101 of switching elements, R(*,5). FIG. 69 shows the 48-port 4 stage post-reconfiguration balanced RBCCG multistage switching network. Since the reconfiguration process is an upgrade process, no external ports are disconnected during this process.

Proceeding to the pre-connection step, according to the post-reconfiguration architecture shown in FIG. 69, the following connections can be established without disrupting existing connections: bottom port 3 of switching element R(0,5) to top port 3 of switching element R(1,5); bottom port 2 of switching element R(0,5) to top port 3 of switching element R(1,4); bottom port 1 of switching element R(0,5) to top port 3 of switching element R(1,3); bottom port 0 of switching element R(0,5) to top port 3 of switching element R(1,2); bottom port 3 of switching element R(0,4) to top port 3 of switching element R(1,1); bottom port 3 of switching element R(0,2) to top port 1 of switching element R(1,5); bottom port 3 of switching element R(1,5) to top port 3 of switching element R(2,5); bottom port 2 of switching element R(1,5) to top port 3 of switching element R(2,4); bottom port 1 of switching element R(1,5) to top port 3 of switching element R(2,3); bottom port 0 of switching element R(1,5) to top port 3 of switching element R(2,2); bottom port 3 of switching element R(1,4) to top port 3 of switching element R(2,1); bottom port 3 of switching element R(1,2) to top port 1 of switching element R(2,5); bottom port 3 of switching element R(2,5) to top port 3 of switching element R(3,5); bottom port 2 of switching element R(2,5) to top port 3 of switching element R(3,4); bottom port 1 of switching element R(2,5) to top port 3 of switching element R(3,3); bottom port 0 of switching element R(2,5) to top port 3 of switching element R(3,2); bottom port 3 of switching element R(2,4) to top port 3 of switching element R(3,1); and bottom port 3 of switching element R(2,2) to top port 1 of switching element R(3,5). The result is shown in FIG. 70.

With the new connection in place the upgrade process moves to the rewiring step, because there are no new stages of switching elements that require splicing, the splicing step is skipped.

Before proceeding to the rewiring step, it should be noted that ISIC networks 7112, 7114, and 7116 are identical in the pre-reconfiguration switching network shown in FIG. 69. Also, ISIC networks 7102, 7104, and 7106 are identical in the post-reconfiguration switching network shown in FIG. 70. Because they are identical, one normally would apply the identical rewiring procedure to each of the ISIC networks. However, for the purposes of illustrating the variety of options the reconfiguration process set forth here affords, ISIC network 7114 is rewired without the benefit of relabeling, whereas ISIC network 7112 is rewired with the benefit of rewiring.

To begin with, the middlemost ISIC network 7114 is selected and is rewired without the benefit of relabeling. The upgrade process now continues with the port selection phase of the rewiring step.

Scanning from right to left, no port, top or bottom, has a corresponding port which is not connected. Again, scanning from right to left, top port 2 of switching element R(2,5) is not connected to anything and has, according to FIG. 69, a corresponding port of bottom port 1 of switching element R(1,4). Bottom port 1 of switching element R(1,4) is currently connected to top port 2 of switching element R(2,3). The breaking of this connection does not leave switching element R(1,4) or switching element R(2,3) with more than one broken connection. This completes the selection process for this step.

With top port 2 of switching element R(2,5) selected and recalling that its corresponding port, bottom port 1 of switching element R(1,4), is connected to top port 2 of switching element R(2,3), the rewiring step continues by diverting traffic from bottom port 1 of switching element R(1,4) and top port 2 of switching element R(2,3); stopping bottom port 1 of switching element R(1,4) and top port 2 of switching element R(2,3); disconnecting bottom port 1 of switching element R(1,4) and top port 2 of switching element R(2,3) and moving the disconnected connection to top port 2 of switching element R(2,5) as shown in FIG. 71A; starting top port 2 of switching element R(2,5) and bottom port 1 of switching element R(1,4); and stop diverting the traffic from top port 2 of switching element R(2,5) and bottom port 1 of switching element R(1,4).

The rewiring step continues by selecting bottom port 3 of switching element R(1,3) because scanning from right to left, it is the first port bottom or top not connected to anything and whose corresponding port (according to FIG. 69) is also not connected to anything; establishing a new connection between bottom port 3 of switching element R(1,3) and top port 2 of switching element R(2,3) as shown in FIG. 71B; starting bottom port 3 of switching element R(1,3) and top port 2 of switching element R(2,3); and stop diverting the traffic from bottom port 3 of switching element R(1,3) and top port 2 of switching element R(2,3).

Scanning from right to left, no port, top or bottom, has a corresponding port which is not connected. Again, scanning from right to left, top port 0 of switching element R(2,5) is not connected to anything and has, according to FIG. 69, a corresponding port of bottom port 1 of switching element R(1,1). Bottom port 1 of switching element R(1,1) is currently connected to top port 0 of switching element R(2,4). The breaking this connection introduces a second broken connection to R(1,1), so top port 0 of switching element R(2,5) is not selected. Continuing to scan from right to left, bottom port 3 of switching element R(1,1) is not connected to anything and has, according to FIG. 69, a corresponding port of top port 1 of switching element R(2,1). Top port 1 of switching element R(2,1) is currently connected to bottom port 0 of switching element R(1,2). The breaking of this connection does not leave switching element R(1,2) or switching element R(2,1) with more than one broken connection. This completes the selection process for this step.

With bottom port 3 of switching element R(1,1) selected and recalling that its corresponding port, top port 1 of switching element R(2,1), is connected to bottom port 0 of switching element R(1,2), the rewiring step continues by diverting traffic from top port 1 of switching element R(2,1) and bottom port 0 of switching element R(1,2); stopping top port 1 of switching element R(2,1) and bottom port 0 of switching element R(1,2); disconnecting top port 1 of switching element R(2,1) and bottom port 0 of switching element R(1,2)

and moving the disconnected connection to bottom port 3 of switching element R(1,1) as shown in FIG. 71C; starting bottom port 3 of switching element R(1,1) and top port 1 of switching element R(2,1); and stop diverting the traffic from bottom port 3 of switching element R(1,1) and top port 1 of switching element R(2,1).

Scanning from right to left, no port, top or bottom, has a corresponding port which is not connected. Again, scanning from right to left, top port 0 of switching element R(2,5) is not connected to anything and has, according to FIG. 69, a corresponding port of bottom port 1 of switching element R(1,1). Bottom port 1 of switching element R(1,1) is currently connected to top port 0 of switching element R(2,4). The breaking of this connection does not leave switching element R(1,1) or switching element R(2,4) with more than one broken connection. This completes the selection process for this step.

With top port 0 of switching element R(2,5) selected and recalling that its corresponding port, bottom port 1 of switching element R(1,1), is connected to top port 0 of switching element R(2,4), the rewiring step continues by diverting traffic from bottom port 1 of switching element R(1,1) and top port 0 of switching element R(2,4); stopping bottom port 1 of switching element R(1,1) and top port 0 of switching element R(2,4); disconnecting bottom port 1 of switching element R(1,1) and top port 0 of switching element R(2,4) and moving the disconnected connection to top port 0 of switching element R(2,5) as shown in FIG. 71D; starting top port 0 of switching element R(2,5) and bottom port 1 of switching element R(1,1); and stop diverting the traffic from top port 0 of switching element R(2,5) and bottom port 1 of switching element R(1,1).

Scanning from right to left, no port, top or bottom, has a corresponding port which is not connected. Again, scanning from right to left, top port 0 of switching element R(2,4) is not connected to anything and has, according to FIG. 69, a corresponding port of bottom port 0 of switching element R(1,1). Bottom port 0 of switching element R(1,1) is currently connected to top port 0 of switching element R(2,3). The breaking of this connection does not leave switching element R(1,1) or switching element R(2,3) with more than one broken connection. This completes the selection process for this step.

With top port 0 of switching element R(2,4) selected and recalling that its corresponding port, bottom port 0 of switching element R(1,1), is connected to top port 0 of switching element R(2,3), the rewiring step continues by diverting traffic from bottom port 0 of switching element R(1,1) and top port 0 of switching element R(2,3); stopping bottom port 0 of switching element R(1,1) and top port 0 of switching element R(2,3); disconnecting bottom port 0 of switching element R(1,1) and top port 0 of switching element R(2,3) and moving the disconnected connection to top port 0 of switching element R(2,4) as shown in FIG. 71E; starting top port 0 of switching element R(2,4) and bottom port 0 of switching element R(1,1); and stop diverting the traffic from top port 0 of switching element R(2,4) and bottom port 0 of switching element R(1,1).

The rewiring step continues by selecting top port 0 of switching element R(2,3) because scanning from right to left, it is the first port bottom or top not connected to anything and whose corresponding port (according to FIG. 69) is also not connected to anything; establishing a new connection between top port 0 of switching element R(2,3) and bottom port 3 of switching element R(1,0) as shown in FIG. 71F; starting top port 0 of switching element R(2,3) and bottom port 3 of switching element R(1,0); and stop diverting the traffic from top port 0 of switching element R(2,3) and bottom port 3 of switching element R(1,0).

Scanning from right to left, no port, top or bottom, has a corresponding port which is not connected. Again, scanning from right to left, bottom port 0 of switching element R(1,2) is not connected to anything and has, according to FIG. 69, a corresponding port of top port 1 of switching element R(2,2). Top port 1 of switching element R(2,2) is currently connected to bottom port 1 of switching element R(1,2). The breaking this connection introduces a second broken connection to R(1,2), so bottom port 0 of switching element R(1,2) is not selected. Continuing to scan from right to left, top port 3 of switching element R(2,0) is not connected to anything and has, according to FIG. 69, a corresponding port of bottom port 2 of switching element R(1,4). Bottom port 2 of switching element R(1,4) is currently connected to top port 2 of switching element R(2,4). The breaking of this connection does not leave switching element R(1,4) or switching element R(2,4) with more than one broken connection. This completes the selection process for this step.

With top port 3 of switching element R(2,0) selected and recalling that its corresponding port, bottom port 2 of switching element R(1,4), is connected to top port 2 of switching element R(2,4), the rewiring step continues by diverting traffic from bottom port 2 of switching element R(1,4) and top port 2 of switching element R(2,4); stopping bottom port 2 of switching element R(1,4) and top port 2 of switching element R(2,4); disconnecting bottom port 2 of switching element R(1,4) and top port 2 of switching element R(2,4) and moving the disconnected connection to top port 3 of switching element R(2,0) as shown in FIG. 71G; starting top port 3 of switching element R(2,0) and bottom port 2 of switching element R(1,4); and stop diverting the traffic from top port 3 of switching element R(2,0) and bottom port 2 of switching element R(1,4).

Scanning from right to left, no port, top or bottom, has a corresponding port which is not connected. Again, scanning from right to left, top port 2 of switching element R(2,4) is not connected to anything and has, according to FIG. 69, a corresponding port of bottom port 0 of switching element R(1,4). Bottom port 0 of switching element R(1,4) is currently connected to top port 2 of switching element R(2,2). The breaking of this connection does not leave switching element R(1,4) or switching element R(2,2) with more than one broken connection. This completes the selection process for this step.

With top port 2 of switching element R(2,4) selected and recalling that its corresponding port, bottom port 0 of switching element R(1,4), is connected to top port 2 of switching element R(2,2), the rewiring step continues by diverting traffic from bottom port 0 of switching element R(1,4) and top port 2 of switching element R(2,2); stopping bottom port 0 of switching element R(1,4) and top port 2 of switching element R(2,2); disconnecting bottom port 0 of switching element R(1,4) and top port 2 of switching element R(2,2) and moving the disconnected connection to top port 2 of switching element R(2,4) as shown in FIG. 71H; starting top port 2 of switching element R(2,4) and bottom port 0 of switching element R(1,4); and stop diverting the traffic from top port 2 of switching element R(2,4) and bottom port 0 of switching element R(1,4).

Scanning from right to left, no port, top or bottom, has a corresponding port which is not connected. Again, scanning from right to left, top port 2 of switching element R(2,2) is not connected to anything and has, according to FIG. 69, a corresponding port of bottom port 2 of switching element R(1,3). Bottom port 2 of switching element R(1,3) is currently connected to top port 2 of switching element R(2,1). The breaking of this connection does not leave switching element R(1,

3) or switching element R(2,1) with more than one broken connection. This completes the selection process for this step.

With top port 2 of switching element R(2,2) selected and recalling that its corresponding port, bottom port 2 of switching element R(1,3), is connected to top port 2 of switching element R(2,1), the rewiring step continues by diverting traffic from bottom port 2 of switching element R(1,3) and top port 2 of switching element R(2,1); stopping bottom port 2 of switching element R(1,3) and top port 2 of switching element R(2,1); disconnecting bottom port 2 of switching element R(1,3) and top port 2 of switching element R(2,1) and moving the disconnected connection to top port 2 of switching element R(2,2) as shown in FIG. 71I; starting top port 2 of switching element R(2,2) and bottom port 2 of switching element R(1,3); and stop diverting the traffic from top port 2 of switching element R(2,2) and bottom port 2 of switching element R(1,3).

Scanning from right to left, no port, top or bottom, has a corresponding port which is not connected. Again, scanning from right to left, bottom port 0 of switching element R(1,2) is not connected to anything and has, according to FIG. 69, a corresponding port of top port 1 of switching element R(2,2). Top port 1 of switching element R(2,2) is currently connected to bottom port 1 of switching element R(1,2). The breaking this connection introduces a second broken connection to R(1,2), so bottom port 0 of switching element R(1,2) is not selected. Continuing to scan from right to left, top port 2 of switching element R(2,1) is not connected to anything and has, according to FIG. 69, a corresponding port of bottom port 1 of switching element R(1,3). Bottom port 1 of switching element R(1,3) is currently connected to top port 2 of switching element R(2,0). The breaking of this connection does not leave switching element R(1,3) or switching element R(2,0) with more than one broken connection. This completes the selection process for this step.

With top port 2 of switching element R(2,1) selected and recalling that its corresponding port, bottom port 1 of switching element R(1,3), is connected to top port 2 of switching element R(2,0), the rewiring step continues by diverting traffic from bottom port 1 of switching element R(1,3) and top port 2 of switching element R(2,0); stopping bottom port 1 of switching element R(1,3) and top port 2 of switching element R(2,0); disconnecting bottom port 1 of switching element R(1,3) and top port 2 of switching element R(2,0) and moving the disconnected connection to top port 2 of switching element R(2,1) as shown in FIG. 71J; starting top port 2 of switching element R(2,1) and bottom port 1 of switching element R(1,3); and stop diverting the traffic from top port 2 of switching element R(2,1) and bottom port 1 of switching element R(1,3).

Scanning from right to left, no port, top or bottom, has a corresponding port which is not connected. Again, scanning from right to left, bottom port 0 of switching element R(1,2) is not connected to anything and has, according to FIG. 69, a corresponding port of top port 1 of switching element R(2,2). Top port 1 of switching element R(2,2) is currently connected to bottom port 1 of switching element R(1,2). The breaking this connection introduces a second broken connection to R(1,2), so bottom port 0 of switching element R(1,2) is not selected. Continuing to scan from right to left, top port 2 of switching element R(2,0) is not connected to anything and has, according to FIG. 69, a corresponding port of bottom port 0 of switching element R(1,3). Bottom port 0 of switching element R(1,3) is currently connected to top port 1 of switching element R(2,4). The breaking of this connection does not leave switching element R(1,3) or switching element R(2,4) with more than one broken connection. This completes the selection process for this step.

With top port 2 of switching element R(2,0) selected and recalling that its corresponding port, bottom port 0 of switching element R(1,3), is connected to top port 1 of switching element R(2,4), the rewiring step continues by diverting traffic from bottom port 0 of switching element R(1,3) and top port 1 of switching element R(2,4); stopping bottom port 0 of switching element R(1,3) and top port 1 of switching element R(2,4); disconnecting bottom port 0 of switching element R(1,3) and top port 1 of switching element R(2,4) and moving the disconnected connection to top port 2 of switching element R(2,0) as shown in FIG. 71K; starting top port 2 of switching element R(2,0) and bottom port 0 of switching element R(1,3); and stop diverting the traffic from top port 2 of switching element R(2,0) and bottom port 0 of switching element R(1,3).

Scanning from right to left, no port, top or bottom, has a corresponding port which is not connected. Again, scanning from right to left, top port 1 of switching element R(2,4) is not connected to anything and has, according to FIG. 69, a corresponding port of bottom port 2 of switching element R(1,2). Bottom port 2 of switching element R(1,2) is currently connected to top port 1 of switching element R(2,3). The breaking this connection introduces a second broken connection to R(1,2), so top port 1 of switching element R(2,4) is not selected. Continuing to scan from right to left, bottom port 0 of switching element R(1,2) is not connected to anything and has, according to FIG. 69, a corresponding port of top port 1 of switching element R(2,2). Top port 1 of switching element R(2,2) is currently connected to bottom port 1 of switching element R(1,2). The breaking this connection introduces a second broken connection to R(1,2), so bottom port 0 of switching element R(1,2) is not selected. Since none of the ports that are not connected satisfy the second port selection criterion, the selection process continues by selecting the rightmost port not connected to anything, that is top port 1 of switching element R(2,4).

With top port 1 of switching element R(2,4) selected and recalling that its corresponding port, bottom port 2 of switching element R(1,2), is connected to top port 1 of switching element R(2,3), the rewiring step continues by diverting traffic from bottom port 2 of switching element R(1,2) and top port 1 of switching element R(2,3); stopping bottom port 2 of switching element R(1,2) and top port 1 of switching element R(2,3); disconnecting bottom port 2 of switching element R(1,2) and top port 1 of switching element R(2,3) and moving the disconnected connection to top port 1 of switching element R(2,4) as shown in FIG. 71L; starting top port 1 of switching element R(2,4) and bottom port 2 of switching element R(1,2); and stop diverting the traffic from top port 1 of switching element R(2,4) and bottom port 2 of switching element R(1,2).

Scanning from right to left, no port, top or bottom, has a corresponding port which is not connected. Again, scanning from right to left, top port 1 of switching element R(2,3) is not connected to anything and has, according to FIG. 69, a corresponding port of bottom port 1 of switching element R(1,2). Bottom port 1 of switching element R(1,2) is currently connected to top port 1 of switching element R(2,2). The breaking this connection introduces a second broken connection to R(1,2), so top port 1 of switching element R(2,3) is not selected. Continuing to scan from right to left, bottom port 0 of switching element R(1,2) is not connected to anything and has, according to FIG. 69, a corresponding port of top port 1 of switching element R(2,2). Top port 1 of switching element R(2,2) is currently connected to bottom port 1 of switching element R(1,2). The breaking this connection introduces a second broken connection to R(1,2), so bottom port 0 of switching element R(1,2) is not selected. Since none of the ports that are not connected satisfy the second port selection criterion, the selection process continues by selecting the rightmost port not connected to anything, that is top port 1 of switching element R(2,3).

With top port 1 of switching element R(2,3) selected and recalling that its corresponding port, bottom port 1 of switching element R(1,2), is connected to top port 1 of switching element R(2,2), the rewiring step continues by diverting traffic from bottom port 1 of switching element R(1,2) and top port 1 of switching element R(2,2); stopping bottom port 1 of switching element R(1,2) and top port 1 of switching element R(2,2); disconnecting bottom port 1 of switching element R(1,2) and top port 1 of switching element R(2,2) and moving the disconnected connection to top port 1 of switching element R(2,3) as shown in FIG. 71M; starting top port 1 of switching element R(2,3) and bottom port 1 of switching element R(1,2); and stop diverting the traffic from top port 1 of switching element R(2,3) and bottom port 1 of switching element R(1,2).

The rewiring step continues by selecting top port 1 of switching element R(2,2) because scanning from right to left, it is the first port bottom or top not connected to anything and whose corresponding port (according to FIG. 69) is also not connected to anything; establishing a new connection between top port 1 of switching element R(2,2) and bottom port 0 of switching element R(1,2) as shown in FIG. 71N; starting top port 1 of switching element R(2,2) and bottom port 0 of switching element R(1,2); and stop diverting the traffic from top port 1 of switching element R(2,2) and bottom port 0 of switching element R(1,2).

With the rewiring of ISIC network 7114 complete, the upgrade process continues to the next ISIC network. Since both ISIC networks 7112 and 7114 are equally distant from the middle, either one can be selected. For the purposes here, ISIC network 7112 is arbitrarily selected for rewiring. For ISIC network 7112, the relabeling phase of the rewiring process is performed first.

The relabeling phase begins by scanning bottom ports from left to right. Switching element R(0,1) is connected to R(1,4), but according to FIG. 69, bottom port 0 should be connected to R(1,4) instead of bottom port 1. The connections to those ports are swapped as shown in FIG. 72A.

The relabeling phase continues by scanning bottom ports from left to right. Switching element R(0,2) is connected to R(1,2), but according to FIG. 69, bottom port 0 should be connected to R(1,2) instead of bottom port 1. The connections to those ports are swapped as shown in FIG. 72B.

The relabeling phase continues by scanning bottom ports from left to right. Switching element R(0,2) is connected to R(1,3), but according to FIG. 69, bottom port 1 should be connected to R(1,3) instead of bottom port 2. The connections to those ports are swapped as shown in FIG. 72C.

The relabeling phase continues by scanning bottom ports from left to right. Switching element R(0,3) is connected to R(1,0), but according to FIG. 69, bottom port 0 should be connected to R(1,0) instead of bottom port 1. The connections to those ports are swapped as shown in FIG. 72D.

The relabeling phase continues by scanning bottom ports from left to right. Switching element R(0,3) is connected to R(1,1), but according to FIG. 69, bottom port 1 should be connected to R(1,1) instead of bottom port 2. The connections to those ports are swapped as shown in FIG. 72E.

The relabeling phase continues by scanning bottom ports from left to right. Switching element R(0,4) is connected to R(1,4), but according to FIG. 69, bottom port 0 should be connected to R(1,4) instead of bottom port 2. The connections to those ports are swapped as shown in FIG. 72F.

This completes the relabeling phase for ISIC 7112. The upgrade process now continues with the port selection phase of the rewiring step.

Scanning from right to left, no port, top or bottom, has a corresponding port which is not connected. Again, scanning from right to left, top port 2 of switching element R(1,5) is not connected to anything and has, according to FIG. 69, a corresponding port of bottom port 1 of switching element R(0,4). Bottom port 1 of switching element R(0,4) is currently connected to top port 2 of switching element R(1,3). The breaking of this connection does not leave switching element R(0,4) or switching element R(1,3) with more than one broken connection. This completes the selection process for this step.

With top port 2 of switching element R(1,5) selected and recalling that its corresponding port, bottom port 1 of switching element R(0,4), is connected to top port 2 of switching element R(1,3), the rewiring step continues by diverting traffic from bottom port 1 of switching element R(0,4) and top port 2 of switching element R(1,3); stopping bottom port 1 of switching element R(0,4) and top port 2 of switching element R(1,3); disconnecting bottom port 1 of switching element R(0,4) and top port 2 of switching element R(1,3) and moving the disconnected connection to top port 2 of switching element R(1,5) as shown in FIG. 72G; starting top port 2 of switching element R(1,5) and bottom port 1 of switching element R(0,4); and stop diverting the traffic from top port 2 of switching element R(1,5) and bottom port 1 of switching element R(0,4).

The rewiring step continues by selecting bottom port 3 of switching element R(0,3) because scanning from right to left, it is the first port bottom or top not connected to anything and whose corresponding port (according to FIG. 69) is also not connected to anything; establishing a new connection between bottom port 3 of switching element R(0,3) and top port 2 of switching element R(1,3) as shown in FIG. 72H; starting bottom port 3 of switching element R(0,3) and top port 2 of switching element R(1,3); and stop diverting the traffic from bottom port 3 of switching element R(0,3) and top port 2 of switching element R(1,3).

Scanning from right to left, no port, top or bottom, has a corresponding port which is not connected. Again, scanning from right to left, top port 0 of switching element R(1,5) is not connected to anything and has, according to FIG. 69, a corresponding port of bottom port 1 of switching element R(0,1). Bottom port 1 of switching element R(0,1) is currently connected to top port 0 of switching element R(1,3). The breaking this connection introduces a second broken connection to R(0,1), so top port 0 of switching element R(1,5) is not selected. Continuing to scan from right to left, bottom port 3 of switching element R(0,1) is not connected to anything and has, according to FIG. 69, a corresponding port of top port 1 of switching element R(1,1). Top port 1 of switching element R(1,1) is currently connected to bottom port 2 of switching element R(0,2). The breaking of this connection does not leave switching element R(0,2) or switching element R(1,1) with more than one broken connection. This completes the selection process for this step.

With bottom port 3 of switching element R(0,1) selected and recalling that its corresponding port, top port 1 of switching element R(1,1), is connected to bottom port 2 of switching element R(0,2), the rewiring step continues by diverting traffic from top port 1 of switching element R(1,1) and bottom port 2 of switching element R(0,2); stopping top port 1 of switching element R(1,1) and bottom port 2 of switching element R(0,2); disconnecting top port 1 of switching element R(1,1) and bottom port 2 of switching element R(0,2) and moving the disconnected connection to bottom port 3 of switching element R(0,1) as shown in FIG. 72I; starting bottom port 3 of switching element R(0,1) and top port 1 of switching element R(1,1); and stop diverting the traffic from bottom port 3 of switching element R(0,1) and top port 1 of switching element R(1,1).

Scanning from right to left, no port, top or bottom, has a corresponding port which is not connected. Again, scanning from right to left, top port 0 of switching element R(1,5) is not connected to anything and has, according to FIG. 69, a corresponding port of bottom port 1 of switching element R(0,1). Bottom port 1 of switching element R(0,1) is currently connected to top port 0 of switching element R(1,3). The breaking of this connection does not leave switching element R(0, 1) or switching element R(1,3) with more than one broken connection. This completes the selection process for this step.

With top port 0 of switching element R(1,5) selected and recalling that its corresponding port, bottom port 1 of switching element R(0,1), is connected to top port 0 of switching element R(1,3), the rewiring step continues by diverting traffic from bottom port 1 of switching element R(0,1) and top port 0 of switching element R(1,3); stopping bottom port 1 of switching element R(0,1) and top port 0 of switching element R(1,3); disconnecting bottom port 1 of switching element R(0,1) and top port 0 of switching element R(1,3) and moving the disconnected connection to top port 0 of switching element R(1,5) as shown in FIG. 72J; starting top port 0 of switching element R(1,5) and bottom port 1 of switching element R(0,1); and stop diverting the traffic from top port 0 of switching element R(1,5) and bottom port 1 of switching element R(0,1).

The rewiring step continues by selecting top port 0 of switching element R(1,3) because scanning from right to left, it is the first port bottom or top not connected to anything and whose corresponding port (according to FIG. 69) is also not connected to anything; establishing a new connection between top port 0 of switching element R(1,3) and bottom port 3 of switching element R(0,0) as shown in FIG. 72K; starting top port 0 of switching element R(1,3) and bottom port 3 of switching element R(0,0); and stop diverting the traffic from top port 0 of switching element R(1,3) and bottom port 3 of switching element R(0,0).

Scanning from right to left, no port, top or bottom, has a corresponding port which is not connected. Again, scanning from right to left, bottom port 2 of switching element R(0,2) is not connected to anything and has, according to FIG. 69, a corresponding port of top port 1 of switching element R(1,4). Top port 1 of switching element R(1,4) is currently connected to bottom port 2 of switching element R(0,3). The breaking of this connection does not leave switching element R(0,3) or switching element R(1,4) with more than one broken connection. This completes the selection process for this step.

With bottom port 2 of switching element R(0,2) selected and recalling that its corresponding port, top port 1 of switching element R(1,4), is connected to bottom port 2 of switching element R(0,3), the rewiring step continues by diverting traffic from top port 1 of switching element R(1,4) and bottom port 2 of switching element R(0,3); stopping top port 1 of switching element R(1,4) and bottom port 2 of switching element R(0,3); disconnecting top port 1 of switching element R(1,4) and bottom port 2 of switching element R(0,3) and moving the disconnected connection to bottom port 2 of switching element R(0,2) as shown in FIG. 72L; starting bottom port 2 of switching element R(0,2) and top port 1 of switching element R(1,4); and stop diverting the traffic from bottom port 2 of switching element R(0,2) and top port 1 of switching element R(1,4).

Scanning from right to left, no port, top or bottom, has a corresponding port which is not connected. Again, scanning from right to left, bottom port 2 of switching element R(0,3) is not connected to anything and has, according to FIG. 69, a corresponding port of top port 2 of switching element R(1,2). Top port 2 of switching element R(1,2) is currently connected to bottom port 2 of switching element R(0,4). The breaking of this connection does not leave switching element R(0,4) or switching element R(1,2) with more than one broken connection. This completes the selection process for this step.

With bottom port 2 of switching element R(0,3) selected and recalling that its corresponding port, top port 2 of switching element R(1,2), is connected to bottom port 2 of switching element R(0,4), the rewiring step continues by diverting traffic from top port 2 of switching element R(1,2) and bottom port 2 of switching element R(0,4); stopping top port 2 of switching element R(1,2) and bottom port 2 of switching element R(0,4); disconnecting top port 2 of switching element R(1,2) and bottom port 2 of switching element R(0,4) and moving the disconnected connection to bottom port 2 of switching element R(0,3) as shown in FIG. 72M; starting bottom port 2 of switching element R(0,3) and top port 2 of switching element R(1,2); and stop diverting the traffic from bottom port 2 of switching element R(0,3) and top port 2 of switching element R(1,2).

The rewiring step continues by selecting bottom port 2 of switching element R(0,4) because scanning from right to left, it is the first port bottom or top not connected to anything and whose corresponding port (according to FIG. 69) is also not connected to anything; establishing a new connection between bottom port 2 of switching element R(0,4) and top port 3 of switching element R(1,0) as shown in FIG. 72N; starting bottom port 2 of switching element R(0,4) and top port 3 of switching element R(1,0); and stop diverting the traffic from bottom port 2 of switching element R(0,4) and top port 3 of switching element R(1,0).

With the rewiring of ISIC network 7112 completed, the remaining ISIC network 7116 is to be rewired next. Since it is identical to ISIC network 7112 and 7114, either rewiring procedure can be employed as well as other variations offered by the reconfiguration process set forth above. The result of applying either rewiring procedure or another embodiment of the rewiring step for a single ISIC network results in the switching network shown in FIG. 72O. With the rewiring complete, the new external port 7220, 7222, 7224, 7226, 7228, 7230, 7232, 7234, 7236, 7238, 7240, and 7242 can now be activated and new traffic can be diverted to them.

FIG. 73 shows a 36-port 4 stage pre-reconfiguration balanced RBCCG multistage switching network. The hatched areas represent the location on each switching elements where new ports that can be added. For example, one embodiment of the addition of ports is through the addition of new line cards to a router. These are typically the addition of new line cards of routers, but can be any equivalent mechanism. Additionally, a column 7152 of switching elements is to be removed. The example set forth here shows a realistic reconfiguration scenario, wherein the fanout is increased and the width is reduced. Furthermore, the hardware enabling the ports in switching elements R(*,5) which are being removed can be reused as part of the fanout upgrade. FIG. 74 shows the 40-port 4 stage post-reconfiguration balanced RBCCG multistage switching network. Since switching elements R(*,5) are to be removed, the first step is to disconnect the external ports 7154 and 7156 as indicated in FIG. 73. The result of the disconnection is shown in FIG. 75.

Proceeding to the pre-connection step, according to the post-reconfiguration architecture shown in FIG. 74, the following connections can be established without disrupting existing connections: bottom port 3 of switching element R(0,4) to top port 3 of switching element R(1,4); bottom port 3 of switching element R(0,3) to top port 3 of switching element R(1,0); bottom port 3 of switching element R(1,4) to top port 3 of switching element R(2,4); bottom port 3 of switching element R(1,3) to top port 3 of switching element R(2,0); bottom port 3 of switching element R(2,4) to top port 3 of switching element R(3,4); and bottom port 3 of switching element R(2,3) to top port 3 of switching element R(3,0). The result is shown in FIG. 75.

With the new connection in place the upgrade process moves to the rewiring step, because there are no new stages of switching elements that require splicing, the splicing step is skipped.

Although in rewiring, the same port selection algorithm is used here as in all examples. It should be noted that in this example minimal disruption of service may not be the top priority. A higher priority could be assigned to disconnecting ports in R(*,5), because the associated line cards to those ports might be reused as part of the fanout upgrade. In FIG. 75, ISIC networks 7172, 7174 and 7176 are identical. Furthermore, as seen in FIG. 74, ISIC networks 7162, 7164, and 7166 are identical. Since the ISIC networks are identical, this example employs ISIC relabeling in some cases and not in others to better illustrate the diversity of the reconfiguration process. Using the stage_select subroutine defined in FIG. 49B, ISIC 7174 is selected first and is rewired without the benefit of relabeling. The reconfiguration process now continues with the port selection phase of the rewiring step.

Scanning from right to left, no port, top or bottom, has a corresponding port which is not connected. Again, scanning from right to left, top port 3 of switching element R(2,3) is not connected to anything and has, according to FIG. 74, a corresponding port of bottom port 2 of switching element R(1,4). Bottom port 2 of switching element R(1,4) is currently connected to top port 2 of switching element R(2,2). The breaking this connection introduces a second broken connection to R(2,2), so top port 3 of switching element R(2,3) is not selected. Continuing to scan from right to left, bottom port 3 of switching element R(1,2) is not connected to anything and has, according to FIG. 74, a corresponding port of top port 2 of switching element R(2,1). Top port 2 of switching element R(2,1) is currently connected to bottom port 1 of switching element R(1,4). The breaking this connection introduces a second broken connection to R(2,1), so bottom port 3 of switching element R(1,2) is not selected. Continuing to scan from right to left, top port 3 of switching element R(2,2) is not connected to anything and has, according to FIG. 74, a corresponding port of bottom port 1 of switching element R(1,4). Bottom port 1 of switching element R(1,4) is currently connected to top port 2 of switching element R(2,1). The breaking this connection introduces a second broken connection to R(2,1), so top port 3 of switching element R(2,2) is not selected. Continuing to scan from right to left, bottom port 3 of switching element R(1,1) is not connected to anything and has, according to FIG. 74, a corresponding port of top port 1 of switching element R(2,2). Top port 1 of switching element R(2,2) is currently connected to bottom port 2 of switching element R(1,2). The breaking this connection introduces a second broken connection to R(1,2), so bottom port 3 of switching element R(1,1) is not selected. Continuing to scan from right to left, top port 3 of switching element R(2,1) is not connected to anything and has, according to FIG. 74, a corresponding port of bottom port 0 of switching element R(1,4). Bottom port 0 of switching element R(1,4) is currently connected to top port 2 of switching element R(2,0). The breaking of this connection does not leave switching element R(1,4) or switching element R(2,0) with more than one broken connection. This completes the selection process for this step.

With top port 3 of switching element R(2,1) selected and recalling that its corresponding port, bottom port 0 of switching element R(1,4), is connected to top port 2 of switching element R(2,0), the rewiring step continues by diverting traffic from bottom port 0 of switching element R(1,4) and top port 2 of switching element R(2,0); stopping bottom port 0 of switching element R(1,4) and top port 2 of switching element R(2,0); disconnecting bottom port 0 of switching element R(1,4) and top port 2 of switching element R(2,0) and moving the disconnected connection to top port 3 of switching element R(2,1) as shown in FIG. 76A; starting top port 3 of switching element R(2,1) and bottom port 0 of switching element R(1,4); and stop diverting the traffic from top port 3 of switching element R(2,1) and bottom port 0 of switching element R(1,4).

Scanning from right to left, no port, top or bottom, has a corresponding port which is not connected. Again, scanning from right to left, top port 3 of switching element R(2,3) is not connected to anything and has, according to FIG. 74, a corresponding port of bottom port 2 of switching element R(1,4). Bottom port 2 of switching element R(1,4) is currently connected to top port 2 of switching element R(2,2). The breaking this connection introduces a second broken connection to R(2,2), so top port 3 of switching element R(2,3) is not selected. Continuing to scan from right to left, bottom port 3 of switching element R(1,2) is not connected to anything and has, according to FIG. 74, a corresponding port of top port 2 of switching element R(2,1). Top port 2 of switching element R(2,1) is currently connected to bottom port 1 of switching element R(1,4). The breaking of this connection does not leave switching element R(1,4) or switching element R(2,1) with more than one broken connection. This completes the selection process for this step.

With bottom port 3 of switching element R(1,2) selected and recalling that its corresponding port, top port 2 of switching element R(2,1), is connected to bottom port 1 of switching element R(1,4), the rewiring step continues by diverting traffic from top port 2 of switching element R(2,1) and bottom port 1 of switching element R(1,4); stopping top port 2 of switching element R(2,1) and bottom port 1 of switching element R(1,4); disconnecting top port 2 of switching element R(2,1) and bottom port 1 of switching element R(1,4) and moving the disconnected connection to bottom port 3 of switching element R(1,2) as shown in FIG. 76B; starting bottom port 3 of switching element R(1,2) and top port 2 of switching element R(2,1); and stop diverting the traffic from bottom port 3 of switching element R(1,2) and top port 2 of switching element R(2,1).

The rewiring step continues by selecting bottom port 1 of switching element R(1,4) because scanning from right to left, it is the first port bottom or top not connected to anything and whose corresponding port (according to FIG. 74) is also not connected to anything; establishing a new connection between bottom port 1 of switching element R(1,4) and top port 3 of switching element R(2,2) as shown in FIG. 76C; starting bottom port 1 of switching element R(1,4) and top port 3 of switching element R(2,2); and stop diverting the traffic from bottom port 1 of switching element R(1,4) and top port 3 of switching element R(2,2).

Scanning from right to left, no port, top or bottom, has a corresponding port which is not connected. Again, scanning from right to left, top port 3 of switching element R(2,3) is not connected to anything and has, according to FIG. 74, a corresponding port of bottom port 2 of switching element R(1,4). Bottom port 2 of switching element R(1,4) is currently connected to top port 2 of switching element R(2,2). The breaking of this connection does not leave switching element R(1, 4) or switching element R(2,2) with more than one broken connection. This completes the selection process for this step.

With top port 3 of switching element R(2,3) selected and recalling that its corresponding port, bottom port 2 of switching element R(1,4), is connected to top port 2 of switching element R(2,2), the rewiring step continues by diverting traffic from bottom port 2 of switching element R(1,4) and top port 2 of switching element R(2,2); stopping bottom port 2 of switching element R(1,4) and top port 2 of switching element R(2,2); disconnecting bottom port 2 of switching element R(1,4) and top port 2 of switching element R(2,2) and moving the disconnected connection to top port 3 of switching element R(2,3) as shown in FIG. 76D; starting top port 3 of switching element R(2,3) and bottom port 2 of switching element R(1,4); and stop diverting the traffic from top port 3 of switching element R(2,3) and bottom port 2 of switching element R(1,4).

Scanning from right to left, no port, top or bottom, has a corresponding port which is not connected. Again, scanning from right to left, top port 2 of switching element R(2,2) is not connected to anything and has, according to FIG. 74, a corresponding port of bottom port 0 of switching element R(1,3). Bottom port 0 of switching element R(1,3) is currently connected to top port 1 of switching element R(2,3). The breaking of this connection does not leave switching element R(1, 3) or switching element R(2,3) with more than one broken connection. This completes the selection process for this step.

With top port 2 of switching element R(2,2) selected and recalling that its corresponding port, bottom port 0 of switching element R(1,3), is connected to top port 1 of switching element R(2,3), the rewiring step continues by diverting traffic from bottom port 0 of switching element R(1,3) and top port 1 of switching element R(2,3); stopping bottom port 0 of switching element R(1,3) and top port 1 of switching element R(2,3); disconnecting bottom port 0 of switching element R(1,3) and top port 1 of switching element R(2,3) and moving the disconnected connection to top port 2 of switching element R(2,2) as shown in FIG. 76E; starting top port 2 of switching element R(2,2) and bottom port 0 of switching element R(1,3); and stop diverting the traffic from top port 2 of switching element R(2,2) and bottom port 0 of switching element R(1,3).

Scanning from right to left, no port, top or bottom, has a corresponding port which is not connected. Again, scanning from right to left, top port 1 of switching element R(2,3) is not connected to anything and has, according to FIG. 74, a corresponding port of bottom port 0 of switching element R(1,2). Bottom port 0 of switching element R(1,2) is currently connected to top port 1 of switching element R(2,0). The breaking this connection introduces a second broken connection to R(2,0), so top port 1 of switching element R(2,3) is not selected. Continuing to scan from right to left, bottom port 3 of switching element R(1,1) is not connected to anything and has, according to FIG. 74, a corresponding port of top port 1 of switching element R(2,2). Top port 1 of switching element R(2,2) is currently connected to bottom port 2 of switching element R(1,2). The breaking of this connection does not leave switching element R(1,2) or switching element R(2,2) with more than one broken connection. This completes the selection process for this step.

With bottom port 3 of switching element R(1,1) selected and recalling that its corresponding port, top port 1 of switching element R(2,2), is connected to bottom port 2 of switching element R(1,2), the rewiring step continues by diverting traffic from top port 1 of switching element R(2,2) and bottom port 2 of switching element R(1,2); stopping top port 1 of switching element R(2,2) and bottom port 2 of switching element R(1,2); disconnecting top port 1 of switching element R(2,2) and bottom port 2 of switching element R(1,2) and moving the disconnected connection to bottom port 3 of switching element R(1,1) as shown in FIG. 76F; starting bottom port 3 of switching element R(1,1) and top port 1 of switching element R(2,2); and stop diverting the traffic from bottom port 3 of switching element R(1,1) and top port 1 of switching element R(2,2).

The rewiring step continues by selecting bottom port 2 of switching element R(1,2) because scanning from right to left, it is the first port bottom or top not connected to anything and whose corresponding port (according to FIG. 74) is also not connected to anything; establishing a new connection between bottom port 2 of switching element R(1,2) and top port 2 of switching element R(2,0) as shown in FIG. 76G; starting bottom port 2 of switching element R(1,2) and top port 2 of switching element R(2,0); and stop diverting the traffic from bottom port 2 of switching element R(1,2) and top port 2 of switching element R(2,0).

Scanning from right to left, no port, top or bottom, has a corresponding port which is not connected. Again, scanning from right to left, top port 1 of switching element R(2,3) is not connected to anything and has, according to FIG. 74, a corresponding port of bottom port 0 of switching element R(1,2). Bottom port 0 of switching element R(1,2) is currently connected to top port 1 of switching element R(2,0). The breaking of this connection does not leave switching element R(1, 2) or switching element R(2,0) with more than one broken connection. This completes the selection process for this step.

With top port 1 of switching element R(2,3) selected and recalling that its corresponding port, bottom port 0 of switching element R(1,2), is connected to top port 1 of switching element R(2,0), the rewiring step continues by diverting traffic from bottom port 0 of switching element R(1,2) and top port 1 of switching element R(2,0); stopping bottom port 0 of switching element R(1,2) and top port 1 of switching element R(2,0); disconnecting bottom port 0 of switching element R(1,2) and top port 1 of switching element R(2,0) and moving the disconnected connection to top port 1 of switching element R(2,3) as shown in FIG. 76H; starting top port 1 of switching element R(2,3) and bottom port 0 of switching element R(1,2); and stop diverting the traffic from top port 1 of switching element R(2,3) and bottom port 0 of switching element R(1,2).

Scanning from right to left, no port, top or bottom, has a corresponding port which is not connected. Again, scanning from right to left, bottom port 3 of switching element R(1,0) is not connected to anything and has, according to FIG. 74, a corresponding port of top port 0 of switching element R(2,3). Top port 0 of switching element R(2,3) is currently connected to bottom port 0 of switching element R(1,1). The breaking of this connection does not leave switching element R(1,1) or switching element R(2,3) with more than one broken connection. This completes the selection process for this step.

With bottom port 3 of switching element R(1,0) selected and recalling that its corresponding port, top port 0 of switching element R(2,3), is connected to bottom port 0 of switching element R(1,1), the rewiring step continues by diverting traffic from top port 0 of switching element R(2,3) and bottom port 0 of switching element R(1,1); stopping top port 0 of switching element R(2,3) and bottom port 0 of switching element R(1,1); disconnecting top port 0 of switching element R(2,3) and bottom port 0 of switching element R(1,1) and moving the disconnected connection to bottom port 3 of switching element R(1,0) as shown in FIG. 76I; starting bottom port 3 of switching element R(1,0) and top port 0 of switching element R(2,3); and stop diverting the traffic from bottom port 3 of switching element R(1,0) and top port 0 of switching element R(2,3).

Scanning from right to left, no port, top or bottom, has a corresponding port which is not connected. Again, scanning from right to left, bottom port 0 of switching element R(1,1) is not connected to anything and has, according to FIG. 74, a corresponding port of top port 0 of switching element R(2,4). Top port 0 of switching element R(2,4) is currently connected to bottom port 1 of switching element R(1,1). The breaking this connection introduces a second broken connection to R(1,1), so bottom port 0 of switching element R(1,1) is not selected. Continuing to scan from right to left, top port 1 of switching element R(2,0) is not connected to anything and has, according to FIG. 74, a corresponding port of bottom port 1 of switching element R(1,1). Bottom port 1 of switching element R(1,1) is currently connected to top port 0 of switching element R(2,4). The breaking this connection introduces a second broken connection to R(1,1), so top port 1 of switching element R(2,0) is not selected. Since none of the ports that are not connected satisfy the second port selection criterion, the selection process continues by selecting the rightmost port not connected to anything, that is bottom port 0 of switching element R(1,1).

With bottom port 0 of switching element R(1,1) selected and recalling that its corresponding port, top port 0 of switching element R(2,4), is connected to bottom port 1 of switching element R(1,1), the rewiring step continues by diverting traffic from top port 0 of switching element R(2,4) and bottom port 1 of switching element R(1,1); stopping top port 0 of switching element R(2,4) and bottom port 1 of switching element R(1,1); disconnecting top port 0 of switching element R(2,4) and bottom port 1 of switching element R(1,1) and moving the disconnected connection to bottom port 0 of switching element R(1,1) as shown in FIG. 76J; starting bottom port 0 of switching element R(1,1) and top port 0 of switching element R(2,4); and stop diverting the traffic from bottom port 0 of switching element R(1,1) and top port 0 of switching element R(2,4).

The rewiring step continues by selecting bottom port 1 of switching element R(1,1) because scanning from right to left, it is the first port bottom or top not connected to anything and whose corresponding port (according to FIG. 74) is also not connected to anything; establishing a new connection between bottom port 1 of switching element R(1,1) and top port 1 of switching element R(2,0) as shown in FIG. 76K; starting bottom port 1 of switching element R(1,1) and top port 1 of switching element R(2,0); and stop diverting the traffic from bottom port 1 of switching element R(1,1) and top port 1 of switching element R(2,0).

Since all ports are connected, connected ports are checked. Scanning from right to left, top port 2 of switching element R(2,4) is selected because it is not connected to its corresponding port (according to FIG. 74), bottom port 2 of switching element R(1,3). Top port 2 of switching element R(2,4) is connected to bottom port 1 of switching element R(1,5), and bottom port 2 of switching element R(1,3) is connected to top port 1 of switching element R(2,5). The rewiring step continues by diverting traffic from top port 2 of switching element R(2,4) and bottom port 1 of switching element R(1,5); stopping top port 2 of switching element R(2,4) and bottom port 1 of switching element R(1,5); disconnecting top port 2 of switching element R(2,4) and bottom port 1 of switching element R(1,5); diverting traffic from bottom port 2 of switching element R(1,3) and top port 1 of switching element R(2,5); stopping bottom port 2 of switching element R(1,3) and top port 1 of switching element R(2,5); disconnecting bottom port 2 of switching element R(1,3) and top port 1 of switching element R(2,5) and moving the disconnected connection to top port 2 of switching element R(2,4) as shown in FIG. 76L; starting top port 2 of switching element R(2,4) and bottom port 2 of switching element R(1,3); and stop diverting the traffic from top port 2 of switching element R(2,4) and bottom port 2 of switching element R(1,3). Since all ports are connected, connected ports are checked. Scanning from right to left, top port 1 of switching element R(2,4) is selected because it is not connected to its corresponding port (according to FIG. 74), bottom port 1 of switching element R(1,2). Top port 1 of switching element R(2,4) is connected to bottom port 1 of switching element R(1,3), and bottom port 1 of switching element R(1,2) is connected to top port 1 of switching element R(2,1). The rewiring step continues by diverting traffic from top port 1 of switching element R(2,4) and bottom port 1 of switching element R(1,3); stopping top port 1 of switching element R(2,4) and bottom port 1 of switching element R(1,3); disconnecting top port 1 of switching element R(2,4) and bottom port 1 of switching element R(1,3); diverting traffic from bottom port 1 of switching element R(1,2) and top port 1 of switching element R(2,1); stopping bottom port 1 of switching element R(1,2) and top port 1 of switching element R(2,1); disconnecting bottom port 1 of switching element R(1,2) and top port 1 of switching element R(2,1) and moving the disconnected connection to top port 1 of switching element R(2,4) as shown in FIG. 76M; starting top port 1 of switching element R(2,4) and bottom port 1 of switching element R(1,2); and stop diverting the traffic from top port 1 of switching element R(2,4) and bottom port 1 of switching element R(1,2). Scanning from right to left, no port, top or bottom, has a corresponding port which is not connected. Again, scanning from right to left, bottom port 1 of switching element R(1,3) is not connected to anything and has, according to FIG. 74, a corresponding port of top port 2 of switching element R(2,3). Top port 2 of switching element R(2,3) is currently connected to bottom port 0 of switching element R(1,5). The breaking this connection introduces a second broken connection to R(1,5), so bottom port 1 of switching element R(1,3) is not selected. Continuing to scan from right to left, top port 1 of switching element R(2,1) is not connected to anything and has, according to FIG. 74, a corresponding port of bottom port 2 of switching element R(1,1). Bottom port 2 of switching element R(1,1) is currently connected to top port 0 of switching element R(2,5). The breaking this connection introduces a second broken connection to R(2,5), so top port 1 of switching element R(2,1) is not selected. Since none of the ports that are not connected satisfy the second port selection criterion, the selection process continues by selecting the rightmost port not connected to anything, that is bottom port 1 of switching element R(1,3).

With bottom port 1 of switching element R(1,3) selected and recalling that its corresponding port, top port 2 of switching element R(,2,3), is connected to bottom port 0 of switching element R(1,5), the rewiring step continues by diverting traffic from top port 2 of switching element R(2,3) and bottom port 0 of switching element R(1,5); stopping top port 2 of switching element R(2,3) and bottom port 0 of switching element R(1,5); disconnecting top port 2 of switching element R(2,3) and bottom port 0 of switching element R(1,5) and moving the disconnected connection to bottom port 1 of switching element R(1,3) as shown in FIG. 76N; starting bottom port 1 of switching element R(1,3) and top port 2 of switching element R(2,3); and stop diverting the traffic from bottom port 1 of switching element R(1,3) and top port 2 of switching element R(2,3).

Scanning from right to left, no port, top or bottom, has a corresponding port which is not connected. Again, scanning from right to left, top port 1 of switching element R(2,1) is not connected to anything and has, according to FIG. 74, a corresponding port of bottom port 2 of switching element R(1,1). Bottom port 2 of switching element R(1,1) is currently connected to top port 0 of switching element R(2,5). The breaking this connection introduces a second broken connection to R(2,5), so top port 1 of switching element R(2,1) is not selected. Since none of the ports that are not connected satisfy the second port selection criterion, the selection process continues by selecting the rightmost port not connected to anything, that is top port 1 of switching element R(2,1).

With top port 1 of switching element R(2,1) selected and recalling that its corresponding port, bottom port 2 of switching element R(1,1), is connected to top port 0 of switching element R(2,5), the rewiring step continues by diverting traffic from bottom port 2 of switching element R(1,1) and top port 0 of switching element R(2,5); stopping bottom port 2 of switching element R(1,1) and top port 0 of switching element R(2,5); disconnecting bottom port 2 of switching element R(1,1) and top port 0 of switching element R(2,5) and moving the disconnected connection to top port 1 of switching element R(2,1) as shown in FIG. 76O; starting top port 1 of switching element R(2,1) and bottom port 2 of switching element R(1,1); and stop diverting the traffic from top port 1 of switching element R(2,1) and bottom port 2 of switching element R(1,1).

With the completion of the rewiring of ISIC network 7174, the next ISIC network selected by the stage_select subroutine is ISIC 7172. In this case ISIC network 7172 is rewired by employing the relabeling phase first.

The relabeling phase begins by scanning bottom ports from left to right. Switching element R(0,1) is connected to R(1,4), but according to FIG. 74, bottom port 0 should be connected to R(1,4) instead of bottom port 1. The connections to those ports are swapped as shown in FIG. 77A.

The relabeling phase continues by scanning bottom ports from left to right. Switching element R(0,2) is connected to R(1,0), but according to FIG. 74, bottom port 2 should be connected to R(1,0) instead of bottom port 0. The connections to those ports are swapped as shown in FIG. 77B.

The relabeling phase continues by scanning bottom ports from left to right. Switching element R(0,2) is connected to R(1,1), but according to FIG. 74, bottom port 3 should be connected to R(1,1) instead of bottom port 1. The connections to those ports are swapped as shown in FIG. 77C.

The relabeling phase continues by scanning bottom ports from left to right. Switching element R(0,3) is connected to R(1,3), but according to FIG. 74, bottom port 1 should be connected to R(1,3) instead of bottom port 0. The connections to those ports are swapped as shown in FIG. 77D.

The relabeling phase continues by scanning bottom ports from left to right. Switching element R(0,3) is connected to R(1,4), but according to FIG. 74, bottom port 2 should be connected to R(1,4) instead of bottom port 0. The connections to those ports are swapped as shown in FIG. 77E.

The relabeling phase continues by scanning bottom ports from left to right. Switching element R(0,4) is connected to R(1,1), but according to FIG. 74, bottom port 0 should be connected to R(1,1) instead of bottom port 1. The connections to those ports are swapped as shown in FIG. 77F.

The relabeling phase continues by scanning bottom ports from left to right. Switching element R(0,4) is connected to R(1,2), but according to FIG. 74, bottom port 1 should be connected to R(1,2) instead of bottom port 2. The connections to those ports are swapped as shown in FIG. 77G.

The relabeling phase continues by scanning top ports from right to left. Switching element R(1,4) is connected to bottom port 2 of switching element R(0,3), but according to FIG. 74, top port 2 should be connected to bottom port 2 of switching element R(0,3) instead of top port 1. The connections to those ports are swapped as shown in FIG. 77H.

The relabeling phase continues by scanning top ports from right to left. Switching element R(1,3) is connected to bottom port 1 of switching element R(0,3), but according to FIG. 74, top port 2 should be connected to bottom port 1 of switching element R(0,3) instead of top port 1. The connections to those ports are swapped as shown in FIG. 77I.

The relabeling phase continues by scanning top ports from right to left. Switching element R(1,2) is connected to bottom port 1 of switching element R(0,4), but according to FIG. 74, top port 3 should be connected to bottom port 1 of switching element R(0,4) instead of top port 2. The connections to those ports are swapped as shown in FIG. 77J.

The relabeling phase continues by scanning top ports from right to left. Switching element R(1,1) is connected to bottom port 0 of switching element R(0,4), but according to FIG. 74, top port 3 should be connected to bottom port 0 of switching element R(0,4) instead of top port 2. The connections to those ports are swapped as shown in FIG. 77K.

The relabeling phase continues by scanning top ports from right to left. Switching element R(1,1) is connected to bottom port 3 of switching element R(0,2), but according to FIG. 74, top port 2 should be connected to bottom port 3 of switching element R(0,2) instead of top port 1. The connections to those ports are swapped as shown in FIG. 77L.

The relabeling phase continues by scanning top ports from right to left. Switching element R(1,0) is connected to bottom port 2 of switching element R(0,2), but according to FIG. 74, top port 2 should be connected to bottom port 2 of switching element R(0,2) instead of top port 1. The connections to those ports are swapped as shown in FIG. 77M.

With the completion of the relabeling phase of ISIC network 7172, the reconfiguration process now continues with the port selection phase of the rewiring step.

Scanning from right to left, no port, top or bottom, has a corresponding port which is not connected. Again, scanning from right to left, top port 3 of switching element R(1,3) is not connected to anything and has, according to FIG. 74, a corresponding port of bottom port 2 of switching element R(0,4). Bottom port 2 of switching element R(0,4) is currently connected to top port 1 of switching element R(1,0). The breaking of this connection does not leave switching element R(0,4) or switching element R(1,0) with more than one broken connection. This completes the selection process for this step.

With top port 3 of switching element R(1,3) selected and recalling that its corresponding port, bottom port 2 of switching element R(0,4), is connected to top port 1 of switching element R(1,0), the rewiring step continues by diverting traffic from bottom port 2 of switching element R(0,4) and top port 1 of switching element R(1,0); stopping bottom port 2 of switching element R(0,4) and top port 1 of switching element R(1,0); disconnecting bottom port 2 of switching element R(0,4) and top port 1 of switching element R(1,0) and moving the disconnected connection to top port 3 of switching element R(1,3) as shown in FIG. 77N; starting top port 3 of switching element R(1,3) and bottom port 2 of switching element R(0,4); and stop diverting the traffic from top port 3 of switching element R(1,3) and bottom port 2 of switching element R(0,4).

Scanning from right to left, no port, top or bottom, has a corresponding port which is not connected. Again, scanning from right to left, top port 2 of switching element R(1,2) is not connected to anything and has, according to FIG. 74, a corresponding port of bottom port 0 of switching element R(0,3). Bottom port 0 of switching element R(0,3) is currently connected to top port 1 of switching element R(1,5). The breaking this connection introduces a second broken connection to R(1,5), so top port 2 of switching element R(1,2) is not selected. Continuing to scan from right to left, bottom port 1 of switching element R(0,2) is not connected to anything and has, according to FIG. 74, a corresponding port of top port 1 of switching element R(1,4). Top port 1 of switching element R(1,4) is currently connected to bottom port 1 of switching element R(0,5). The breaking this connection introduces a second broken connection to R(0,5), so bottom port 1 of switching element R(0,2) is not selected. Continuing to scan from right to left, bottom port 3 of switching element R(0,1) is not connected to anything and has, according to FIG. 74, a corresponding port of top port 1 of switching element R(1,2). Top port 1 of switching element R(1,2) is currently connected to bottom port 0 of switching element R(0,2). The breaking this connection introduces a second broken connection to R(0,2), so bottom port 3 of switching element R(0,1) is not selected. Continuing to scan from right to left, top port 1 of switching element R(1,1) is not connected to anything and has, according to FIG. 74, a corresponding port of bottom port 2 of switching element R(0,1). Bottom port 2 of switching element R(0,1) is currently connected to top port 0 of switching element R(1,5). The breaking this connection introduces a second broken connection to R(0,1), so top port 1 of switching element R(1,1) is not selected. Continuing to scan from right to left, bottom port 3 of switching element R(0,0) is not connected to anything and has, according to FIG. 74, a corresponding port of top port 0 of switching element R(1,3). Top port 0 of switching element R(1,3) is currently connected to bottom port 1 of switching element R(0,1). The breaking this connection introduces a second broken connection to R(0,1), so bottom port 3 of switching element R(0,0) is not selected. Continuing to scan from right to left, top port 1 of switching element R(1,0) is not connected to anything and has, according to FIG. 74, a corresponding port of bottom port 1 of switching element R(0,1). Bottom port 1 of switching element R(0,1) is currently connected to top port 0 of switching element R(1,3). The breaking this connection introduces a second broken connection to R(0,1), so top port 1 of switching element R(1,0) is not selected. Since none of the ports that are not connected satisfy the second port selection criterion, the selection process continues by selecting the rightmost port not connected to anything, that is top port 2 of switching element R(1,2).

With top port 2 of switching element R(1,2) selected and recalling that its corresponding port, bottom port 0 of switching element R(0,3), is connected to top port 1 of switching element R(1,5), the rewiring step continues by diverting traffic from bottom port 0 of switching element R(0,3) and top port 1 of switching element R(1,5); stopping bottom port 0 of switching element R(0,3) and top port 1 of switching element R(1,5); disconnecting bottom port 0 of switching element R(0,3) and top port 1 of switching element R(1,5) and moving the disconnected connection to top port 2 of switching element R(1,2) as shown in FIG. 77O; starting top port 2 of switching element R(1,2) and bottom port 0 of switching element R(0,3); and stop diverting the traffic from top port 2 of switching element R(1,2) and bottom port 0 of switching element R(0,3).

Scanning from right to left, no port, top or bottom, has a corresponding port which is not connected. Again, scanning from right to left, bottom port 1 of switching element R(0,2) is not connected to anything and has, according to FIG. 74, a corresponding port of top port 1 of switching element R(1,4). Top port 1 of switching element R(1,4) is currently connected to bottom port 1 of switching element R(0,5). The breaking this connection introduces a second broken connection to R(0,5), so bottom port 1 of switching element R(0,2) is not selected. Continuing to scan from right to left, bottom port 3 of switching element R(0,1) is not connected to anything and has, according to FIG. 74, a corresponding port of top port 1 of switching element R(1,2). Top port 1 of switching element R(1,2) is currently connected to bottom port 0 of switching element R(0,2). The breaking this connection introduces a second broken connection to R(0,2), so bottom port 3 of switching element R(0,1) is not selected. Continuing to scan from right to left, top port 1 of switching element R(1,1) is not connected to anything and has, according to FIG. 74, a corresponding port of bottom port 2 of switching element R(0,1). Bottom port 2 of switching element R(0,1) is currently connected to top port 0 of switching element R(1,5). The breaking this connection introduces a second broken connection to R(0,1), so top port 1 of switching element R(1,1) is not selected. Continuing to scan from right to left, bottom port 3 of switching element R(0,0) is not connected to anything and has, according to FIG. 74, a corresponding port of top port 0 of switching element R(1,3). Top port 0 of switching element R(1,3) is currently connected to bottom port 1 of switching element R(0,1). The breaking this connection introduces a second broken connection to R(0,1), so bottom port 3 of switching element R(0,0) is not selected. Continuing to scan from right to left, top port 1 of switching element R(1,0) is not connected to anything and has, according to FIG. 74, a corresponding port of bottom port 1 of switching element R(0,1). Bottom port 1 of switching element R(0,1) is currently connected to top port 0 of switching element R(1,3). The breaking this connection introduces a second broken connection to R(0,1), so top port 1 of switching element R(1,0) is not selected. Since none of the ports that are not connected satisfy the second port selection criterion, the selection process continues by selecting the rightmost port not connected to anything, that is bottom port 1 of switching element R(0,2).

With bottom port 1 of switching element R(0,2) selected and recalling that its corresponding port, top port 1 of switching element R(1,4), is connected to bottom port 1 of switching element R(0,5), the rewiring step continues by diverting traffic from top port 1 of switching element R(1,4) and bottom port 1 of switching element R(0,5); stopping top port 1 of switching element R(1,4) and bottom port 1 of switching element R(0,5); disconnecting top port 1 of switching element R(1,4) and bottom port 1 of switching element R(0,5) and moving the disconnected connection to bottom port 1 of switching element R(0,2) as shown in FIG. 77P; starting bottom port 1 of switching element R(0,2) and top port 1 of switching element R(1,4); and stop diverting the traffic from bottom port 1 of switching element R(0,2) and top port 1 of switching element R(1,4).

Scanning from right to left, no port, top or bottom, has a corresponding port which is not connected. Again, scanning from right to left, bottom port 3 of switching element R(0,1) is not connected to anything and has, according to FIG. 74, a corresponding port of top port 1 of switching element R(1,2). Top port 1 of switching element R(1,2) is currently connected to bottom port 0 of switching element R(0,2). The breaking of this connection does not leave switching element R(0,2) or switching element R(1,2) with more than one broken connection. This completes the selection process for this step.

With bottom port 3 of switching element R(0,1) selected and recalling that its corresponding port, top port 1 of switching element R(1,2), is connected to bottom port 0 of switching element R(0,2), the rewiring step continues by diverting traffic from top port 1 of switching element R(1,2) and bottom port 0 of switching element R(0,2); stopping top port 1 of switching element R(1,2) and bottom port 0 of switching element R(0,2); disconnecting top port 1 of switching element R(1,2) and bottom port 0 of switching element R(0,2) and moving the disconnected connection to bottom port 3 of switching element R(0,1) as shown in FIG. 77Q; starting bottom port 3 of switching element R(0,1) and top port 1 of switching element R(1,2); and stop diverting the traffic from bottom port 3 of switching element R(0,1) and top port 1 of switching element R(1,2).

Scanning from right to left, no port, top or bottom, has a corresponding port which is not connected. Again, scanning from right to left, bottom port 0 of switching element R(0,2) is not connected to anything and has, according to FIG. 74, a corresponding port of top port 1 of switching element R(1,3). Top port 1 of switching element R(1,3) is currently connected to bottom port 0 of switching element R(0,5). The breaking this connection introduces a second broken connection to R(0,5), so bottom port 0 of switching element R(0,2) is not selected. Continuing to scan from right to left, top port 1 of switching element R(1,1) is not connected to anything and has, according to FIG. 74, a corresponding port of bottom port 2 of switching element R(0,1). Bottom port 2 of switching element R(0,1) is currently connected to top port 0 of switching element R(1,5). The breaking this connection introduces a second broken connection to R(1,5), so top port 1 of switching element R(1,1) is not selected. Continuing to scan from right to left, bottom port 3 of switching element R(0,0) is not connected to anything and has, according to FIG. 74, a corresponding port of top port 0 of switching element R(1,3). Top port 0 of switching element R(1,3) is currently connected to bottom port 1 of switching element R(0,1). The breaking of this connection does not leave switching element R(0,1) or switching element R(1,3) with more than one broken connection. This completes the selection process for this step.

With bottom port 3 of switching element R(0,0) selected and recalling that its corresponding port, top port 0 of switching element R(1,3), is connected to bottom port 1 of switching element R(0,1), the rewiring step continues by diverting traffic from top port 0 of switching element R(1,3) and bottom port 1 of switching element R(0,1); stopping top port 0 of switching element R(1,3) and bottom port 1 of switching element R(0,1); disconnecting top port 0 of switching element R(1,3) and bottom port 1 of switching element R(0,1) and moving the disconnected connection to bottom port 3 of switching element R(0,0) as shown in FIG. 77R; starting bottom port 3 of switching element R(0,0) and top port 0 of switching element R(1,3); and stop diverting the traffic from bottom port 3 of switching element R(0,0) and top port 0 of switching element R(1,3).

The rewiring step continues by selecting bottom port 1 of switching element R(0,1) because scanning from right to left, it is the first port bottom or top not connected to anything and whose corresponding port (according to FIG. 74) is also not connected to anything; establishing a new connection between bottom port 1 of switching element R(0,1) and top port 1 of switching element R(1,0) as shown in FIG. 77S; starting bottom port 1 of switching element R(0,1) and top port 1 of switching element R(1,0); and stop diverting the traffic from bottom port 1 of switching element R(0,1) and top port 1 of switching element R(1,0).

Scanning from right to left, no port, top or bottom, has a corresponding port which is not connected. Again, scanning from right to left, bottom port 0 of switching element R(0,2) is not connected to anything and has, according to FIG. 74, a corresponding port of top port 1 of switching element R(1,3). Top port 1 of switching element R(1,3) is currently connected to bottom port 0 of switching element R(0,5). The breaking this connection introduces a second broken connection to R(0,5), so bottom port 0 of switching element R(0,2) is not selected. Continuing to scan from right to left, top port 1 of switching element R(1,1) is not connected to anything and has, according to FIG. 74, a corresponding port of bottom port 2 of switching element R(0,1). Bottom port 2 of switching element R(0,1) is currently connected to top port 0 of switching element R(1,5). The breaking this connection introduces a second broken connection to R(1,5), so top port 1 of switching element R(1,1) is not selected. Since none of the ports that are not connected satisfy the second port selection criterion, the selection process continues by selecting the rightmost port not connected to anything, that is bottom port 0 of switching element R(0,2).

With bottom port 0 of switching element R(0,2) selected and recalling that its corresponding port, top port 1 of switching element R(1,3), is connected to bottom port 0 of switching element R(0,5), the rewiring step continues by diverting traffic from top port 1 of switching element R(1,3) and bottom port 0 of switching element R(0,5); stopping top port 1 of switching element R(1,3) and bottom port 0 of switching element R(0,5); disconnecting top port 1 of switching element R(1,3) and bottom port 0 of switching element R(0,5) and moving the disconnected connection to bottom port 0 of switching element R(0,2) as shown in FIG. 77T; starting bottom port 0 of switching element R(0,2) and top port 1 of switching element R(1,3); and stop diverting the traffic from bottom port 0 of switching element R(0,2) and top port 1 of switching element R(1,3).

Scanning from right to left, no port, top or bottom, has a corresponding port which is not connected. Again, scanning from right to left, top port 1 of switching element R(1,1) is not connected to anything and has, according to FIG. 74, a corresponding port of bottom port 2 of switching element R(0,1). Bottom port 2 of switching element R(0,1) is currently connected to top port 0 of switching element R(1,5). The breaking this connection introduces a second broken connection to R(1,5), so top port 1 of switching element R(1,1) is not selected. Since none of the ports that are not connected satisfy the second port selection criterion, the selection process continues by selecting the rightmost port not connected to anything, that is top port 1 of switching element R(1,1).

With top port 1 of switching element R(1,1) selected and recalling that its corresponding port, bottom port 2 of switching element R(0,1), is connected to top port 0 of switching element R(1,5), the rewiring step continues by diverting traffic from bottom port 2 of switching element R(0,1) and top port 0 of switching element R(1,5); stopping bottom port 2 of switching element R(0,1) and top port 0 of switching element R(1,5); disconnecting bottom port 2 of switching element R(0,1) and top port 0 of switching element R(1,5) and moving the disconnected connection to top port 1 of switching element R(1,1) as shown in FIG. 77U; starting top port 1 of switching element R(1,1) and bottom port 2 of switching element R(0,1); and stop diverting the traffic from top port 1 of switching element R(1,1) and bottom port 2 of switching element R(0,1).

With the rewiring of ISIC network 7172 completed, the remaining ISIC network 7176 is to be rewired next. Since it is identical to ISIC network 7172 and 7174, either rewiring procedure can be employed as well as other variations offered by the reconfiguration process set forth above. The result of applying either rewiring procedure or another embodiment of the rewiring step for a single ISIC network results in the switching network shown in FIG. 77V. With the rewiring complete, the new external ports 7180, 7182, 7184, 7186, 7188, 7190, 7192, 7194, 7196, and 7198 can now be activated and new traffic can be diverted to them. Also, at this point, the unused switching elements R(*,5) can be removed if not already removed.

FIG. 78 shows a 24-port 4 stage pre-reconfiguration balanced RBCCG multistage switching network 7200. In addition to a width upgrade by adding the column 7201 of switching elements R(*,4), the network is also reconfigured to an unbalanced RBCCG multistage switching network. FIG. 79 shows the 30-port 4 stage post-reconfiguration unbalanced RBCCG multistage switching network, wherein the CGISIC networks used in FIG. 79 are shifted variants of balanced CGISIC networks. Since this is an upgrade, no external ports are disconnected during this process.

Proceeding to the pre-connection step, according to the post-reconfiguration architecture shown in FIG. 79, the following connections can be established without disrupting existing connections: bottom port 1 of switching element R(0,4) to top port 2 of switching element R(1,4); and bottom port 0 of switching element R(1,4) to top port 2 of switching element R(2,4). The result is shown in FIG. 80.

With the new connection in place the upgrade process moves to the rewiring step. Because there are no new stages of switching elements that require splicing, the splicing step is skipped. The reconfiguration process then moves to the rewiring step. To illustrate how arbitrary the choices are in the rewiring process, the order of the operations in this example is quite different that the previous examples. For instance, this process begins with the relabeling of ISIC networks 7224 and 7226 before any rewiring is performed. ISIC network 7222 is not relabeled.

Moving on to the relabeling of ISIC network 7224, the relabeling phase begins by scanning bottom ports from left to right. Switching element R(1,0) is connected to R(2,2), but according to FIG. 79, bottom port 0 should be connected to R(2,2) instead of bottom port 2. The connections to those ports are swapped as shown in FIG. 81A.

The relabeling phase continues by scanning bottom ports from left to right. Switching element R(1,1) is connected to R(2,0), but according to FIG. 79, bottom port 0 should be connected to R(2,0) instead of bottom port 1. The connections to those ports are swapped as shown in FIG. 81B.

The relabeling phase continues by scanning bottom ports from left to right. Switching element R(1,1) is connected to R(2,1), but according to FIG. 79, bottom port 1 should be connected to R(2,1) instead of bottom port 2. The connections to those ports are swapped as shown in FIG. 81C.

The relabeling phase continues by scanning bottom ports from left to right. Switching element R(1,2) is connected to R(2,3), but according to FIG. 79, bottom port 0 should be connected to R(2,3) instead of bottom port 1. The connections to those ports are swapped as shown in FIG. 81D.

This completes the relabeling of ISIC network 7224. The procedure moves to the relabeling of ISIC network 7226.

The relabeling phase continues by scanning bottom ports from left to right. Switching element R(2,0) is connected to R(3,0), but according to FIG. 79, bottom port 2 should be connected to R(3,0) instead of bottom port 0. The connections to those ports are swapped as shown in FIG. 81E.

The relabeling phase continues by scanning bottom ports from left to right. Switching element R(2,1) is connected to R(3,3), but according to FIG. 79, bottom port 2 should be connected to R(3,3) instead of bottom port 0. The connections to those ports are swapped as shown in FIG. 81F.

The relabeling phase continues by scanning bottom ports from left to right. Switching element R(2,2) is connected to R(3,0), but according to FIG. 79, bottom port 1 should be connected to R(3,0) instead of bottom port 2. The connections to those ports are swapped as shown in FIG. 81G.

The relabeling phase continues by scanning bottom ports from left to right. Switching element R(2,3) is connected to R(3,2), but according to FIG. 79, bottom port 0 should be connected to R(3,2) instead of bottom port 1. The connections to those ports are swapped as shown in FIG. 81H.

The relabeling phase continues by scanning bottom ports from left to right. Switching element R(2,3) is connected to R(3,3), but according to FIG. 79, bottom port 1 should be connected to R(3,3) instead of bottom port 2. The connections to those ports are swapped as shown in FIG. 81I.

The relabeling phase continues by scanning top ports from right to left. Switching element R(3,3) is connected to bottom port 2 of switching element R(2,1), but according to FIG. 79, top port 1 should be connected to bottom port 2 of switching element R(2,1) instead of top port 0. The connections to those ports are swapped as shown in FIG. 81J.

The relabeling phase continues by scanning top ports from right to left. Switching element R(3,0) is connected to bottom port 2 of switching element R(2,0), but according to FIG. 79, top port 1 should be connected to bottom port 2 of switching element R(2,0) instead of top port 0. The connections to those ports are swapped as shown in FIG. 81K.

This completes the relabeling portion of the rewiring step for ISIC network 7224. Following the analogous relabeling steps described for ISIC network 7224, ISIC network 7226 is relabeled, resulting in the switching network depicted in FIG. 81L.

With all the ISIC networks marked for relabeling completed, the procedure moves to the port selection phase of the rewiring step. Unlike the previous examples, the rewiring is not performed on one ISIC network until it is completely rewired. In this example, ports are selected from any internal ports in the switching network.

The rewiring step begins with ISIC 7224. Scanning from right to left, no port, top or bottom, has a corresponding port which is not connected. Again, scanning from right to left, bottom port 2 of switching element R(1,4) is not connected to anything with corresponding port according to FIG. 79, top port 0 of switching element R(2,1). Top port 0 of switching element R(2,1) is currently connected to bottom port 1 of switching element R(1,0). The breaking of this connection does not leave switching element R(1,0) or switching element R(2,1) with more than one broken connection. This completes the selection process for this step.

With bottom port 2 of switching element R(1,4) selected and recalling that its corresponding port, top port 0 of switching element R(2,1), is connected to bottom port 1 of switching element R(1,0), the rewiring step continues by diverting traffic from top port 0 of switching element R(2,1) and bottom port 1 of switching element R(1,0); stopping top port 0 of switching element R(2,1) and bottom port 1 of switching element R(1,0); disconnecting top port 0 of switching element R(2,1) and bottom port 1 of switching element R(1,0) and moving the disconnected connection to bottom port 2 of switching element R(1,4) as shown in FIG. 82A; starting bottom port 2 of switching element R(1,4) and top port 0 of switching element R(2,1); and stop diverting the traffic from bottom port 2 of switching element R(1,4) and top port 0 of switching element R(2,1).

Scanning from right to left, no port, top or bottom, has a corresponding port which is not connected. Again, scanning from right to left, bottom port 1 of switching element R(1,4) is not connected to anything with corresponding port according to FIG. 79, top port 0 of switching element R(2,0). Top port 0 of switching element R(2,0) is currently connected to bottom port 2 of switching element R(1,0). The breaking this connection introduces a second broken connection to R(1,0), so bottom port 1 of switching element R(1,4) is not selected. Continuing to scan from right to left, top port 1 of switching element R(2,4) is not connected to anything with corresponding port according to FIG. 79, bottom port 1 of switching element R(1,2). Bottom port 1 of switching element R(1,2) is currently connected to top port 1 of switching element R(2,2). The breaking of this connection does not leave switching element R(1,2) or switching element R(2,2) with more than one broken connection. This completes the selection process for this step.

With top port 1 of switching element R(2,4) selected and recalling that its corresponding port, bottom port 1 of switching element R(1,2), is connected to top port 1 of switching element R(2,2), the rewiring step continues by diverting traffic from bottom port 1 of switching element R(1,2) and top port 1 of switching element R(2,2); stopping bottom port 1 of switching element R(1,2) and top port 1 of switching element R(2,2); disconnecting bottom port 1 of switching element R(1,2) and top port 1 of switching element R(2,2) and moving the disconnected connection to top port 1 of switching element R(2,4) as shown in FIG. 82B; starting top port 1 of switching element R(2,4) and bottom port 1 of switching element R(1,2); and stop diverting the traffic from top port 1 of switching element R(2,4) and bottom port 1 of switching element R(1,2).

Now, the rewiring step switches to ISIC network 7222. Scanning from right to left, no port, top or bottom, has a corresponding port which is not connected. Again, scanning from right to left, bottom port 2 of switching element R(0,4) is not connected to anything with corresponding port according to FIG. 79, top port 0 of switching element R(1,0). Top port 0 of switching element R(1,0) is currently connected to bottom port 0 of switching element R(0,0). The breaking of this connection does not leave switching element R(0,0) or switching element R(1,0) with more than one broken connection. This completes the selection process for this step.

With bottom port 2 of switching element R(0,4) selected and recalling that its corresponding port, top port 0 of switching element R(1,0), is connected to bottom port 0 of switching element R(0,0), the rewiring step continues by diverting traffic from top port 0 of switching element R(1,0) and bottom port 0 of switching element R(0,0); stopping top port 0 of switching element R(1,0) and bottom port 0 of switching element R(0,0); disconnecting top port 0 of switching element R(1,0) and bottom port 0 of switching element R(0,0) and moving the disconnected connection to bottom port 2 of switching element R(0,4) as shown in FIG. 82C; starting bottom port 2 of switching element R(0,4) and top port 0 of switching element R(1,0); and stop diverting the traffic from bottom port 2 of switching element R(0,4) and top port 0 of switching element R(1,0).

Now, the rewiring step switches to ISIC network 7226. Scanning from right to left, no port, top or bottom, has a corresponding port which is not connected. Again, scanning from right to left, bottom port 2 of switching element R(2,4) is not connected to anything with corresponding port according to FIG. 79, top port 0 of switching element R(3,2). Top port 0 of switching element R(3,2) is currently connected to bottom port 0 of switching element R(2,0). The breaking of this connection does not leave switching element R(2,0) or switching element R(3,2) with more than one broken connection. This completes the selection process for this step.

With bottom port 2 of switching element R(2,4) selected and recalling that its corresponding port, top port 0 of switching element R(3,2), is connected to bottom port 0 of switching element R(2,0), the rewiring step continues by diverting traffic from top port 0 of switching element R(3,2) and bottom port 0 of switching element R(2,0); stopping top port 0 of switching element R(3,2) and bottom port 0 of switching element R(2,0); disconnecting top port 0 of switching element R(3,2) and bottom port 0 of switching element R(2,0) and moving the disconnected connection to bottom port 2 of switching element R(2,4) as shown in FIG. 82D; starting bottom port 2 of switching element R(2,4) and top port 0 of switching element R(3,2); and stop diverting the traffic from bottom port 2 of switching element R(2,4) and top port 0 of switching element R(3,2).

Scanning from right to left, no port, top or bottom, has a corresponding port which is not connected. Again, scanning from right to left, top port 2 of switching element R(3,4) is not connected to anything with corresponding port according to FIG. 79, bottom port 2 of switching element R(2,3). Bottom port 2 of switching element R(2,3) is currently connected to top port 2 of switching element R(3,1). The breaking of this connection does not leave switching element R(2,3) or switching element R(3,1) with more than one broken connection. This completes the selection process for this step.

With top port 2 of switching element R(3,4) selected and recalling that its corresponding port, bottom port 2 of switching element R(2,3), is connected to top port 2 of switching element R(3,1), the rewiring step continues by diverting traffic from bottom port 2 of switching element R(2,3) and top port 2 of switching element R(3,1); stopping bottom port 2 of switching element R(2,3) and top port 2 of switching element R(3,1); disconnecting bottom port 2 of switching element R(2,3) and top port 2 of switching element R(3,1) and moving the disconnected connection to top port 2 of switching element R(3,4) as shown in FIG. 82E; starting top port 2 of switching element R(3,4) and bottom port 2 of switching element R(2,3); and stop diverting the traffic from top port 2 of switching element R(3,4) and bottom port 2 of switching element R(2,3).

Scanning from right to left, no port, top or bottom, has a corresponding port which is hot connected. Again, scanning from right to left, bottom port 1 of switching element R(2,4) is not connected to anything with corresponding port according to FIG. 79, top port 0 of switching element R(3,1). Top port 0 of switching element R(3,1) is currently connected to bottom port 1 of switching element R(2,0). The breaking this connection introduces a second broken connection to R(2,0), so bottom port 1 of switching element R(2,4) is not selected. Continuing to scan from right to left, top port 1 of switching element R(3,4) is not connected to anything with corresponding port according to FIG. 79, bottom port 0 of switching element R(2,2). Bottom port 0 of switching element R(2,2) is currently connected to top port 1 of switching element R(3,2). The breaking of this connection does not leave switching element R(2,2) or switching element R(3,2) with more than one broken connection. This completes the selection process for this step.

With top port 1 of switching element R(3,4) selected and recalling that its corresponding port, bottom port 0 of switching element R(2,2), is connected to top port 1 of switching element R(3,2), the rewiring step continues by diverting traffic from bottom port 0 of switching element R(2,2) and top port 1 of switching element R(3,2); stopping bottom port 0 of switching element R(2,2) and top port 1 of switching element R(3,2); disconnecting bottom port 0 of switching element R(2,2) and top port 1 of switching element R(3,2) and moving the disconnected connection to top port 1 of switching element R(3,4) as shown in FIG. 82F; starting top port 1 of switching element R(3,4) and bottom port 0 of switching element R(2,2); and stop diverting the traffic from top port 1 of switching element R(3,4) and bottom port 0 of switching element R(2,2).

Now, the rewiring step switches to ISIC network 7224. Scanning from right to left, no port, top or bottom, has a corresponding port which is not connected. Again, scanning from right to left, bottom port 1 of switching element R(1,4) is not connected to anything with corresponding port according to FIG. 79, top port 0 of switching element R(2,0). Top port 0 of switching element R(2,0) is currently connected to bottom port 2 of switching element R(1,0). The breaking this connection introduces a second broken connection to R(1,0), so bottom port 1 of switching element R(1,4) is not selected. Continuing to scan from right to left, top port 0 of switching element R(2,4) is not connected to anything with corresponding port according to FIG. 79, bottom port 2 of switching element R(1,0). Bottom port 2 of switching element R(1,0) is currently connected to top port 0 of switching element R(2,0). The breaking this connection introduces a second broken connection to R(1,0), so top port 0 of switching element R(2,4) is not selected. Continuing to scan from right to left, top port 1 of switching element R(2,2) is not connected to anything with corresponding port according to FIG. 79, bottom port 2 of switching element R(1,1). Bottom port 2 of switching element R(1,1) is currently connected to top port 0 of switching element R(2,3). The breaking of this connection does not leave switching element R(1,1) or switching element R(2,3) with more than one broken connection. This completes the selection process for this step.

With top port 1 of switching element R(2,2) selected and recalling that its corresponding port, bottom port 2 of switching element R(1,1), is connected to top port 0 of switching element R(2,3), the rewiring step continues by diverting traffic from bottom port 2 of switching element R(1,1) and top port 0 of switching element R(2,3); stopping bottom port 2 of switching element R(1,1) and top port 0 of switching element R(2,3); disconnecting bottom port 2 of switching element R(1,1) and top port 0 of switching element R(2,3) and moving the disconnected connection to top port 1 of switching element R(2,2) as shown in FIG. 82G; starting top port 1 of switching element R(2,2) and bottom port 2 of switching element R(1,1); and stop diverting the traffic from top port 1 of switching element R(2,2) and bottom port 2 of switching element R(1,1).

Now, the rewiring step switches to ISIC network 7222. Scanning from right to left, no port, top or bottom, has a corresponding port which is not connected. Again, scanning from right to left, top port 1 of switching element R(1,4) is not connected to anything with corresponding port according to FIG. 79, bottom port 2 of switching element R(0,2). Bottom port 2 of switching element R(0,2) is currently connected to top port 2 of switching element R(1,0). The breaking of this connection does not leave switching element R(0,2) or switching element R(1,0) with more than one broken connection. This completes the selection process for this step.

With top port 1 of switching element R(1,4) selected and recalling that its corresponding port, bottom port 2 of switching element R(0,2), is connected to top port 2 of switching element R(1,0), the rewiring step continues by diverting traffic from bottom port 2 of switching element R(0,2) and top port 2 of switching element R(1,0); stopping bottom port 2 of switching element R(0,2) and top port 2 of switching element R(1,0); disconnecting bottom port 2 of switching element R(0,2) and top port 2 of switching element R(1,0) and moving the disconnected connection to top port 1 of switching element R(1,4) as shown in FIG. 82H; starting top port 1 of switching element R(1,4) and bottom port 2 of switching element R(0,2); and stop diverting the traffic from top port 1 of switching element R(1,4) and bottom port 2 of switching element R(0,2).

Scanning from right to left, no port, top or bottom, has a corresponding port which is not connected. Again, scanning from right to left, bottom port 0 of switching element R(0,4) is not connected to anything with corresponding port according to FIG. 79, top port 2 of switching element R(1,3). Top port 2 of switching element R(1,3) is currently connected to bottom port 2 of switching element R(0,3). The breaking of this connection does not leave switching element R(0,3) or switching element R(1,3) with more than one broken connection. This completes the selection process for this step.

With bottom port 0 of switching element R(0,4) selected and recalling that its corresponding port, top port 2 of switching element R(1,3), is connected to bottom port 2 of switching element R(0,3), the rewiring step continues by diverting traffic from top port 2 of switching element R(1,3) and bottom port 2 of switching element R(0,3); stopping top port 2 of switching element R(1,3) and bottom port 2 of switching element R(0,3); disconnecting top port 2 of switching element R(1,3) and bottom port 2 of switching element R(0,3) and moving the disconnected connection to bottom port 0 of switching element R(0,4) as shown in FIG. 82I; starting bottom port 0 of switching element R(0,4) and top port 2 of switching element R(1,3); and stop diverting the traffic from bottom port 0 of switching element R(0,4) and top port 2 of switching element R(1,3).

Scanning from right to left, no port, top or bottom, has a corresponding port which is not connected. Again, scanning from right to left, top port 0 of switching element R(1;4) is not connected to anything with corresponding port according to FIG. 79, bottom port 0 of switching element R(0,1). Bottom port 0 of switching element R(0,1) is currently connected to top port 0 of switching element R(1,3). The breaking of this connection does not leave switching element R(0,1) or switching element R(1,3) with more than one broken connection. This completes the selection process for this step.

With top port 0 of switching element R(1,4) selected and recalling that its corresponding port, bottom port 0 of switching element R(0,1), is connected to top port 0 of switching element R(1,3), the rewiring step continues by diverting traffic from bottom port 0 of switching element R(0,1) and top port 0 of switching element R(1,3); stopping bottom port 0 of switching element R(0,1) and top port 0 of switching element R(1,3); disconnecting bottom port 0 of switching element R(0,1) and top port 0 of switching element R(1,3) and moving the disconnected connection to top port 0 of switching element R(1,4) as shown in FIG. 82J; starting top port 0 of switching element R(1,4) and bottom port 0 of switching element R(0,1); and stop diverting the traffic from top port 0 of switching element R(1,4) and bottom port 0 of switching element R(0,1).

It should be noted that in FIG. 82J, the rewiring step of moving the connection from top port 0 of switching element R(0,3) to top port 0 of switching element R(0,4), while the connection is temporarily broken, there is no path between R(0,1) and R(2,2). As a result any communications between the external top ports of switching element R(0,1) and, the external bottom ports of switching element R(2,2) is unavailable. This shows the importance of thorough analysis. Though many choices are arbitrary, not all choices work as well. It should be further noted that had ISIC network 7222 been relabeled along with ISIC networks 7224 and 7226, this would not have occurred.

Now, the rewiring step switches to ISIC network 7224. The rewiring step continues by selecting top port 0 of switching element R(2,3) because scanning from right to left, it is the first port bottom or top not connected to anything and whose corresponding port (according to FIG. 79) is also not connected to anything; establishing a new connection between top port 0 of switching element R(2,3) and bottom port 1 of switching element R(1,0) as shown in FIG. 82K; starting top port 0 of switching element R(2,3) and bottom port 1 of switching element R(1,0); and stop diverting the traffic from top port 0 of switching element R(2,3) and bottom port 1 of switching element R(1,0).

Now, the rewiring step switches to ISIC network 7226. Scanning from right to left, no port, top or bottom, has a corresponding port which is not connected. Again, scanning from right to left, bottom port 1 of switching element R(2,4) is not connected to anything with corresponding port according to FIG. 79, top port 0 of switching element R(3,1). Top port 0 of switching element R(3,1) is currently connected to bottom port 1 of switching element R(2,0). The breaking this connection introduces a second broken connection to R(2,0), so bottom port 1 of switching element R(2,4) is not selected. Continuing to scan from right to left, bottom port 0 of switching element R(2,4) is not connected to anything with corresponding port according to FIG. 79, top port 0 of switching element R(3,0). Top port 0 of switching element R(3,0) is currently connected to bottom port 1 of switching element R(2,1). The breaking of this connection does not leave switching element R(2,1) or switching element R(3,0) with more than one broken connection. This completes the selection process for this step.

With bottom port 0 of switching element R(2,4) selected and recalling that its corresponding port, top port 0 of switching element R(3,0), is connected to bottom port 1 of switching element R(2,1), the rewiring step continues by diverting traffic from top port 0 of switching element R(3,0) and bottom port 1 of switching element R(2,1); stopping top port 0 of switching element R(3,0) and bottom port 1 of switching element R(2,1); disconnecting top port 0 of switching element R(3,0) and bottom port 1 of switching element R(2,1) and moving the disconnected connection to bottom port 0 of switching element R(2,4) as shown in FIG. 82L; starting bottom port 0 of switching element R(2,4) and top port 0 of switching element R(3,0); and stop diverting the traffic from bottom port 0 of switching element R(2,4) and top port 0 of switching element R(3,0).

Now, the rewiring step switches to ISIC network 7224. Scanning from right to left, no port, top or bottom, has a corresponding port which is not connected. Again, scanning from right to left, bottom port 1 of switching element R(1,4) is not connected to anything with corresponding port according to FIG. 79, top port 0 of switching element R(2,0). Top port 0 of switching element R(2,0) is currently connected to bottom port 2 of switching element R(1,0). The breaking of this connection does not leave switching element R(1,0) or switching element R(2,0) with more than one broken connection. This completes the selection process for this step.

With bottom port 1 of switching element R(1,4) selected and recalling that its corresponding port, top port 0 of switching element R(2,0), is connected to bottom port 2 of switching element R(1,0), the rewiring step continues by diverting traffic from top port 0 of switching element R(2,0) and bottom port 2 of switching element R(1,0); stopping top port 0 of switching element R(2,0) and bottom port 2 of switching element R(1,0); disconnecting top port 0 of switching element R(2,0) and bottom port 2 of switching element R(1,0) and moving the disconnected connection to bottom port 1 of switching element R(1,4) as shown in FIG. 82M; starting bottom port 1 of switching element R(1,4) and top port 0 of switching element R(2,0); and stop diverting the traffic from bottom port 1 of switching element R(1,4) and top port 0 of switching element R(2,0).

The rewiring step continues by selecting top port 0 of switching element R(2,4) because scanning from right to left, it is the first port bottom or top not connected to anything and whose corresponding port (according to FIG. 79) is also not connected to anything; establishing a new connection between top port 0 of switching element R(2,4) and bottom port 2 of switching element R(1,0) as shown in FIG. 82N; starting top port 0 of switching element R(2,4) and bottom port 2 of switching element R(1,0); and stop diverting the traffic from top port 0 of switching element R(2,4) and bottom port 2 of switching element R(1,0). This completes the rewiring of ISIC network 7224.

Now, the rewiring step switches to ISIC network 7222. Scanning from right to left, no port, top or bottom, has a corresponding port which is not connected. Again, scanning from right to left, bottom port 2 of switching element R(0,3) is not connected to anything with corresponding port according to FIG. 79, top port 2 of switching element R(1,2). Top port 2 of switching element R(1,2) is currently connected to bottom port 1 of switching element R(0,3). The breaking this connection introduces a second broken connection to R(0,3), so bottom port 2 of switching element R(0,3) is not selected. Continuing to scan from right to left, top port 0 of switching element R(1,3) is not connected to anything with corresponding port according to FIG. 79, bottom port 2 of switching element R(0,0). Bottom port 2 of switching element R(0,0) is currently connected to top port 0 of switching element R(1,2). The breaking this connection introduces a second broken connection to R(0,0), so top port 0 of switching element R(1,3) is not selected. Continuing to scan from right to left, top port 2 of switching element R(1,0) is not connected to anything with corresponding port according to FIG. 79, bottom port 0 of switching element R(0,3). Bottom port 0 of switching element R(0,3) is currently connected to top port 2 of switching element R(1,1). The breaking this connection introduces a second broken connection to R(0,3), so top port 2 of switching element R(1,0) is not selected. Continuing to scan from right to left, bottom port 0 of switching element R(0,0) is not connected to anything with corresponding port according to FIG. 79, top port 0 of switching element R(1,1). Top port 0 of switching element R(1,1) is currently connected to bottom port 1 of switching element R(0,0). The breaking this connection introduces a second broken connection to R(0,0), so bottom port 0 of switching element R(0,0) is not selected. Since none of the ports that are not connected satisfy the second port selection criterion, the selection process continues by selecting the rightmost port not connected to anything, that is bottom port 2 of switching element R(0,3).

With bottom port 2 of switching element R(0,3) selected and recalling that its corresponding port, top port 2 of switching element R(1,2), is connected to bottom port 1 of switching element R(0,3), the rewiring step continues by diverting traffic from top port 2 of switching element R(1,2) and bottom port 1 of switching element R(0,3); stopping top port 2 of switching element R(1,2) and bottom port 1 of switching element R(0,3); disconnecting top port 2 of switching element R(1,2) and bottom port 1 of switching element R(0,3) and moving the disconnected connection to bottom port 2 of switching element R(0,3) as shown in FIG. 82O; starting bottom port 2 of switching element R(0,3) and top port 2 of switching element R(1,2); and stop diverting the traffic from bottom port 2 of switching element R(0,3) and top port 2 of switching element R(1,2).

It should be noted that in FIG. 82O, the rewiring step of moving the connection from bottom port 1 of switching element R(0,3) to top port 1 of switching element R(0,3), while the connection is temporarily broken, there is no path between R(0,3) and R(2,2). As a result any communications between the external top ports of switching element R(0,3) and the external bottom ports of switching element R(2,2) is unavailable. In this case, it is clear that the moving of the connection is actually a swapping operation, so clearly relabeling ISIC network 7222 would have remedied this unavailability.

Now, the rewiring step switches to ISIC network 7226. The rewiring step continues by selecting top port 1 of switching element R(3,2) because scanning from right to left, it is the first port bottom or top not connected to anything and whose corresponding port (according to FIG. 79) is also not connected to anything; establishing a new connection between top port 1 of switching element R(3,2) and bottom port 1 of switching element R(2,1) as shown in FIG. 82P; starting top port 1 of switching element R(3,2) and bottom port 1 of switching element R(2,1); and stop diverting the traffic from top port 1 of switching element R(3,2) and bottom port 1 of switching element R(2,1).

Scanning from right to left, no port, top or bottom, has a corresponding port which is not connected. Again, scanning from right to left, bottom port 1 of switching element R(2,4) is not connected to anything with corresponding port according to FIG. 79, top port 0 of switching element R(3,1). Top port 0 of switching element R(3,1) is currently connected to bottom port 1 of switching element R(2,0). The breaking this connection introduces a second broken connection to R(2,0), so bottom port 1 of switching element R(2,4) is not selected. Continuing to scan from right to left, top port 0 of switching element R(3,4) is not connected to anything with corresponding port according to FIG. 79, bottom port 1 of switching element R(2,0). Bottom port 1 of switching element R(2,0) is currently connected to top port 0 of switching element R(3,1). The breaking this connection introduces a second broken connection to R(2,0), so top port 0 of switching element R(3,4) is not selected. Continuing to scan from right to left, top port 2 of switching element R(3,1) is not connected to anything with corresponding port according to FIG. 79, bottom port 2 of switching element R(2,2). Bottom port 2 of switching element R(2,2) is currently connected to top port 0 of switching element R(3,3). The breaking of this connection does not leave switching element R(2,2) or switching element R(3,3) with more than one broken connection. This completes the selection process for this step.

With top port 2 of switching element R(3,1) selected and recalling that its corresponding port, bottom port 2 of switching element R(2,2), is connected to top port 0 of switching element R(3,3), the rewiring step continues by diverting traffic from bottom port 2 of switching element R(2,2) and top port 0 of switching element R(3,3); stopping bottom port 2 of switching element R(2,2) and top port 0 of switching element R(3,3); disconnecting bottom port 2 of switching element R(2,2) and top port 0 of switching element R(3,3) and moving the disconnected connection to top port 2 of switching element R(3,1) as shown in FIG. 82Q; starting top port 2 of switching element R(3,1) and bottom port 2 of switching element R(2,2); and stop diverting the traffic from top port 2 of switching element R(3,1) and bottom port 2 of switching element R(2,2).

The rewiring step continues by selecting top port 0 of switching element R(3,3) because scanning from right to left, it is the first port bottom or top not connected to anything and whose corresponding port (according to FIG. 79) is also not connected to anything; establishing a new connection between top port 0 of switching element R(3,3) and bottom port 0 of switching element R(2,0) as shown in FIG. 82R; starting top port 0 of switching element R(3,3) and bottom port 0 of switching element R(2,0); and stop diverting the traffic from top port 0 of switching element R(3,3) and bottom port 0 of switching element R(2,0).

Now, the rewiring step switches to ISIC network 7222. Scanning from right to left, no port, top or bottom, has a corresponding port which is not connected. Again, scanning from right to left, bottom port 1 of switching element R(0,3) is not connected to anything with corresponding port according to FIG. 79, top port 2 of switching element R(1,1). Top port 2 of switching element R(1,1) is currently connected to bottom port 0 of switching element R(0,3). The breaking this connection introduces a second broken connection to R(0,3), so bottom port 1 of switching element R(0,3) is not selected. Continuing to scan from right to left, top port 0 of switching element R(1,3) is not connected to anything with corresponding port according to FIG. 79, bottom port 2 of switching element R(0,0). Bottom port 2 of switching element R(0,0) is currently connected to top port 0 of switching element R(1,2). The breaking this connection introduces a second broken connection to R(0,0), so top port 0 of switching element R(1,3) is not selected. Continuing to scan from right to left, top port 2 of switching element R(1,0) is not connected to anything with corresponding port according to FIG. 79, bottom port 0 of switching element R(0,3). Bottom port 0 of switching element R(0,3) is currently connected to top port 2 of switching element R(1,1). The breaking this connection introduces a second broken connection to R(0,3), so top port 2 of switching element R(1,0) is not selected. Continuing to scan from right to left, bottom port 0 of switching element R(0,0) is not connected to anything with corresponding port according to FIG. 79, top port 0 of switching element R(1,1). Top port 0 of switching element R(1,1) is currently connected to bottom port 1 of switching element R(0,0,). The breaking this connection introduces a second broken connection to R(0,0,), so bottom port 0 of switching element R(0,0) is not selected. Since none of the ports that are not connected satisfy the second port selection criterion, the selection process continues by selecting the rightmost port not connected to anything, that is bottom port 1 of switching element R(0,3).

With bottom port 1 of switching element R(0,3) selected and recalling that its corresponding port, top port 2 of switching element R(1,1), is connected to bottom port 0 of switching element R(0,3), the rewiring step continues by diverting traffic from top port 2 of switching element R(1,1) and bottom port 0 of switching element R(0,3); stopping top port 2 of switching element R(1,1) and bottom port 0 of switching element R(0,3); disconnecting top port 2 of switching element R(1,1) and bottom port 0 of switching element R(0,3) and moving the disconnected connection to bottom port 1 of switching element R(0,3) as shown in FIG. 82S; starting bottom port 1 of switching element R(0,3) and top port 2 of switching element R(1,1); and stop diverting the traffic from bottom port 1 of switching element R(0,3) and top port 2 of switching element R(1,1).

The rewiring step continues by selecting bottom port 0 of switching element R(0,3) because scanning from right to left, it is the first port bottom or top not connected to anything and whose corresponding port (according to FIG. 79) is also not connected to anything; establishing a new connection between bottom port 0 of switching element R(0,3) and top port 2 of switching element R(1,0) as shown in FIG. 82T; starting bottom port 0 of switching element R(0,3) and top port 2 of switching element R(1,0); and stop diverting the traffic from bottom port 0 of switching element R(0,3) and top port 2 of switching element R(1,0).

Scanning from right to left, no port, top or bottom, has a corresponding port which is not connected. Again, scanning from right to left, top port 0 of switching element R(1,3) is not connected to anything with corresponding port according to FIG. 79, bottom port 2 of switching element R(0,0). Bottom port 2 of switching element R(0,0) is currently connected to top port 0 of switching element R(1,2). The breaking this connection introduces a second broken connection to R(0,0), so top port 0 of switching element R(1,3) is not selected. Continuing to scan from right to left, bottom port 0 of switching element R(0,0) is not connected to anything with corresponding port according to FIG. 79, top port 0 of switching element R(1,1). Top port 0 of switching element R(1,1) is currently connected to bottom port 1 of switching element R(0,0). The breaking this connection introduces a second broken connection to R(0,0), so bottom port 0 of switching element R(0,0) is not selected. Since none of the ports that are not connected satisfy the second port selection criterion, the selection process continues by selecting the rightmost port not connected to anything, that is top port 0 of switching element R(1,3).

With top port 0 of switching element R(1,3) selected and recalling that its corresponding port, bottom port 2 of switching element R(0,0), is connected to top port 0 of switching element R(1,2), the rewiring step continues by diverting traffic from bottom port 2 of switching element R(0,0) and top port 0 of switching element R(1,2); stopping bottom port 2 of switching element R(0,0) and top port 0 of switching element R(1,2); disconnecting bottom port 2 of switching element R(0,0) and top port 0 of switching element R(1,2) and moving the disconnected connection to top port 0 of switching element R(1,3) as shown in FIG. 82U; starting top port 0 of switching element R(1,3) and bottom port 2 of switching element R(0,0); and stop diverting the traffic from top port 0 of switching element R(1,3) and bottom port 2 of switching element R(0,0).

Now, the rewiring step switches to ISIC network 7226. Scanning from right to left, no port, top or bottom, has a corresponding port which is not connected. Again, scanning from right to left, bottom port 1 of switching element R(2,4) is not connected to anything with corresponding port according to FIG. 79, top port 0 of switching element R(3,1). Top port 0 of switching element R(3,1) is currently connected to bottom port 1 of switching element R(2,0). The breaking of this connection does not leave switching element R(2,0) or switching element R(3,1) with more than one broken connection. This completes the selection process for this step.

With bottom port 1 of switching element R(2,4) selected and recalling that its corresponding port, top port 0 of switching element R(3,1), is connected to bottom port 1 of switching element R(2,0), the rewiring step continues by diverting traffic from top port 0 of switching element R(3,1) and bottom port 1 of switching element R(2,0); stopping top port 0 of switching element R(3,1) and bottom port 1 of switching element R(2,0); disconnecting top port 0 of switching element R(3,1) and bottom port 1 of switching element R(2,0) and moving the disconnected connection to bottom port 1 of switching element R(2,4) as shown in FIG. 82V; starting bottom port 1 of switching element R(2,4) and top port 0 of switching element R(3,1); and stop diverting the traffic from bottom port 1 of switching element R(2,4) and top port 0 of switching element R(3,1).

Now, the rewiring step switches to ISIC network 7222. Scanning from right to left, no port, top or bottom, has a corresponding port which is not connected. Again, scanning from right to left, top port 0 of switching element R(1,2) is not connected to anything with corresponding port according to FIG. 79, bottom port 1 of switching element R(0,0). Bottom port 1 of switching element R(0,0) is currently connected to top port 0 of switching element R(1,1). The breaking this connection introduces a second broken connection to R(0,0), so top port 0 of switching element R(1,2) is not selected. Continuing to scan from right to left, bottom port 0 of switching element R(0,0) is not connected to anything with corresponding port according to FIG. 79, top port 0 of switching element R(1,1). Top port 0 of switching element R(1,1) is currently connected to bottom port 1 of switching element R(0,0). The breaking this connection introduces a second broken connection to R(0,0), so bottom port 0 of switching element R(0,0) is not selected. Since none of the ports that are not connected satisfy the second port selection criterion, the selection process continues by selecting the rightmost port not connected to anything, that is top port 0 of switching element R(1,2).

With top port 0 of switching element R(1,2) selected and recalling that its corresponding port, bottom port 1 of switching element R(0,0), is connected to top port 0 of switching element R(1,1), the rewiring step continues by diverting traffic from bottom port 1 of switching element R(0,0) and top port 0 of switching element R(1,1); stopping bottom port 1 of switching element R(0,0) and top port 0 of switching element R(1,1); disconnecting bottom port 1 of switching element R(0,0) and top port 0 of switching element R(1,1) and moving the disconnected connection to top port 0 of switching element R(1,2) as shown in FIG. 82W; starting top port 0 of switching element R(1,2) and bottom port 1 of switching element R(0,0); and stop diverting the traffic from top port 0 of switching element R(1,2) and bottom port 1 of switching element R(0,0).

Now, the rewiring step switches to ISIC network 7226. The rewiring step continues by selecting top port 0 of switching element R(3,4) because scanning from right to left, it is the first port bottom or top not connected to anything and whose corresponding port (according to FIG. 79) is also not connected to anything; establishing a new connection between top port 0 of switching element R(3,4) and bottom port 1 of switching element R(2,0) as shown in FIG. 82X; starting top port 0 of switching element R(3,4) and bottom port 1 of switching element R(2,0); and stop diverting the traffic from top port 0 of switching element R(3,4) and bottom port 1 of switching element R(2,0). This completes the rewiring of ISIC network 7226.

Now, the rewiring step switches to ISIC network 7222. The rewiring step continues by selecting top port 0 of switching element R(1,1) because scanning from right to left, it is the first port bottom or top not connected to anything and whose corresponding port (according to FIG. 79) is also not connected to anything; establishing a new connection between top port 0 of switching element R(1,1) and bottom port 0 of switching element R(0,0) as shown in FIG. 82Y; starting top port 0 of switching element R(1,1) and bottom port 0 of switching element R(0,0); and stop diverting the traffic from top port 0 of switching element R(1,1) and bottom port 0 of switching element R(0,0). This completes the rewiring of ISIC network 7222.

This completes the reconfiguring process. The upgrade to the architecture depicted in FIG. 79 is completed when external ports 7202 and 7204, are activated and traffic is guided through them.

Thus far the examples given reconfigure RBCCG switching networks. The reconfiguration process can apply in the same manner for other multistage interconnection networks, provided that sufficient fault tolerance exists and a routing algorithm is implemented that accounts for the change of the architecture during the upgrade process.

As with any reconfiguration process, the post-reconfiguration architecture must be a viable switching network architecture. For example, it is known that the insertion of an extra stage with an extra ISIC network into a functionally connected Banyan network such as the one depicted in FIG. 1B can destroy the functionally connected property of the network, despite the fact that an extra stage usually gives path redundancy. FIG. 83 depicts a Banyan network with an extra stage 7304 and an extra ISIC network 7302 which is a CGISIC network. Though the Banyan network from which this network is derived from is functionally connected, the hybrid network is not, as proof, one should note there is no path from port S to port D. All paths originating from port S to the external ports on the last stage are shown in bold, clearly, port D is not one that can be reached.

As a general rule, for a switching network that is a hybrid switching network, having additional stages coupled with CGISIC networks such as those depicted in FIGS. 13A-13H, where the extra stage is added to either the top or bottom of the network are upgradeable. In such a hybrid switching network, such as the one depicted in FIG. 84A, an extra stage can be inserted anywhere adjacent to the CGISIC network 7402 used for augmentation as indicated by arrow 7406. In the splicing process, the connections can be broken by disconnecting the top ports or bottom ports of switching elements in stage 7404, depending on the embodiment of the splicing algorithm used.

Figure 84B:
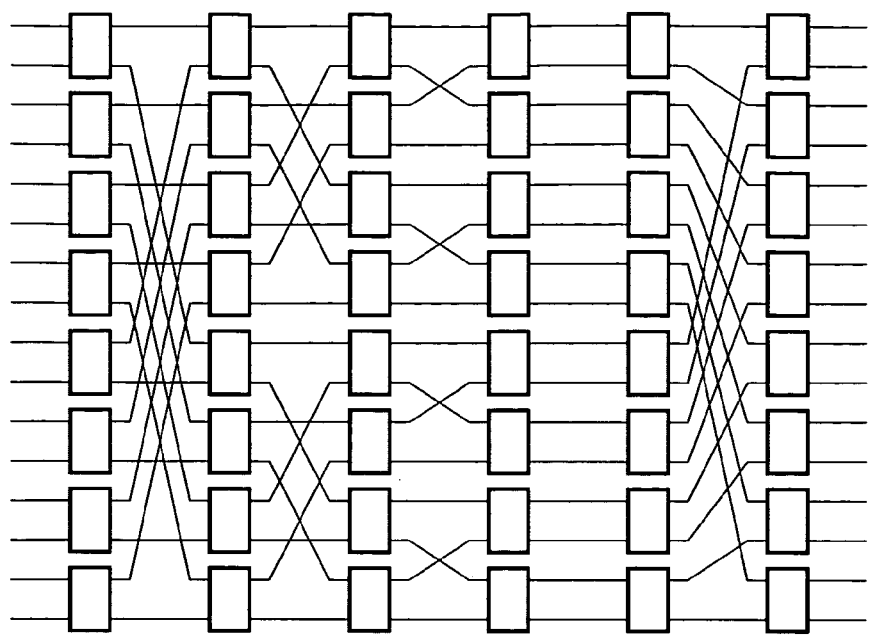
Figure 84A:
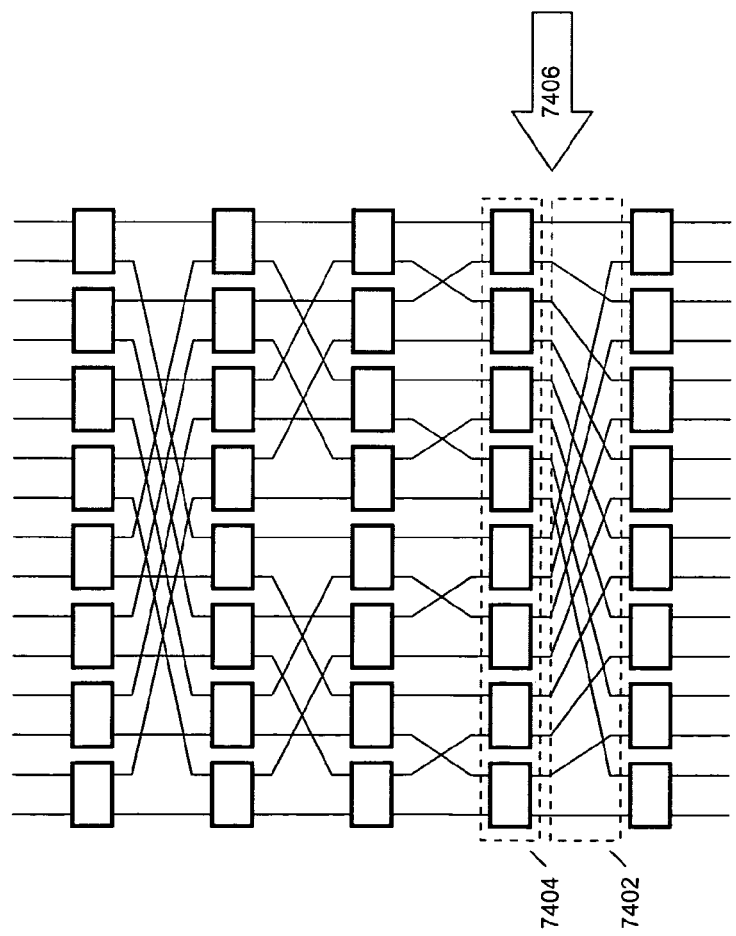
Figure 84C:
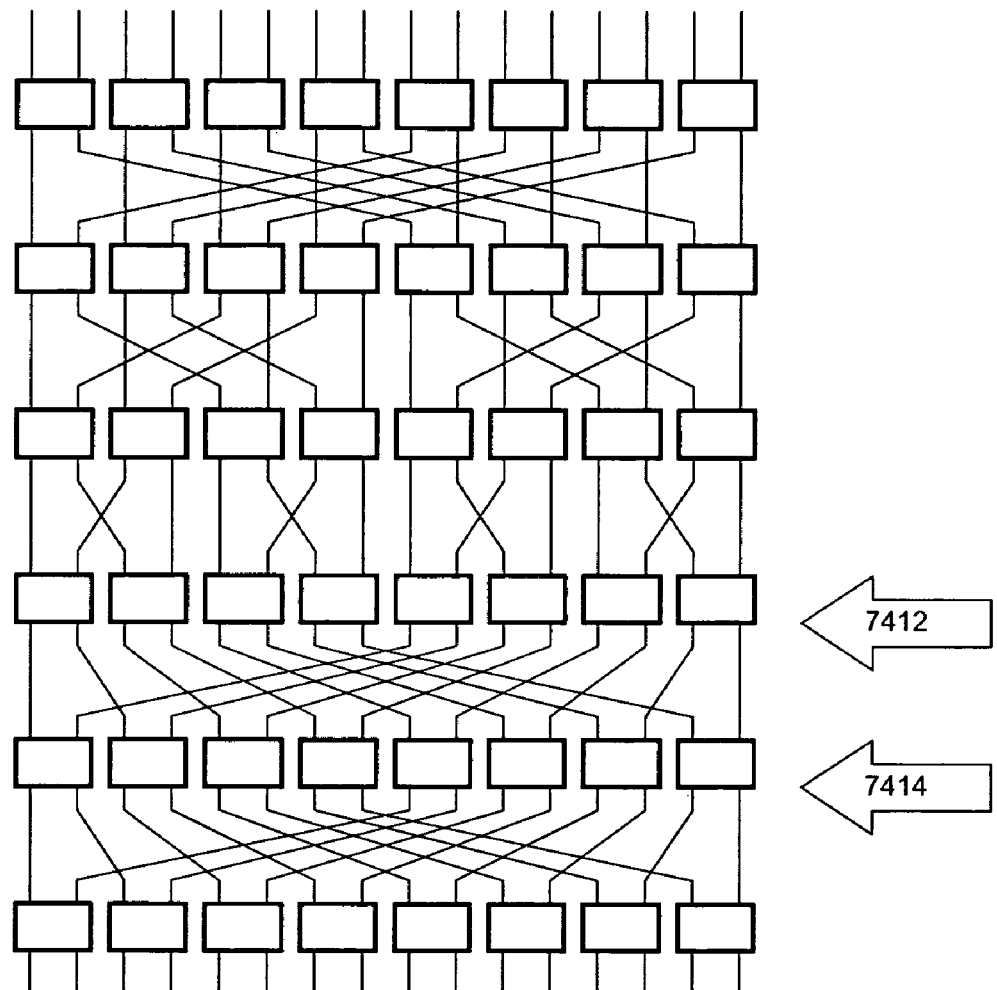
Figure 84D:
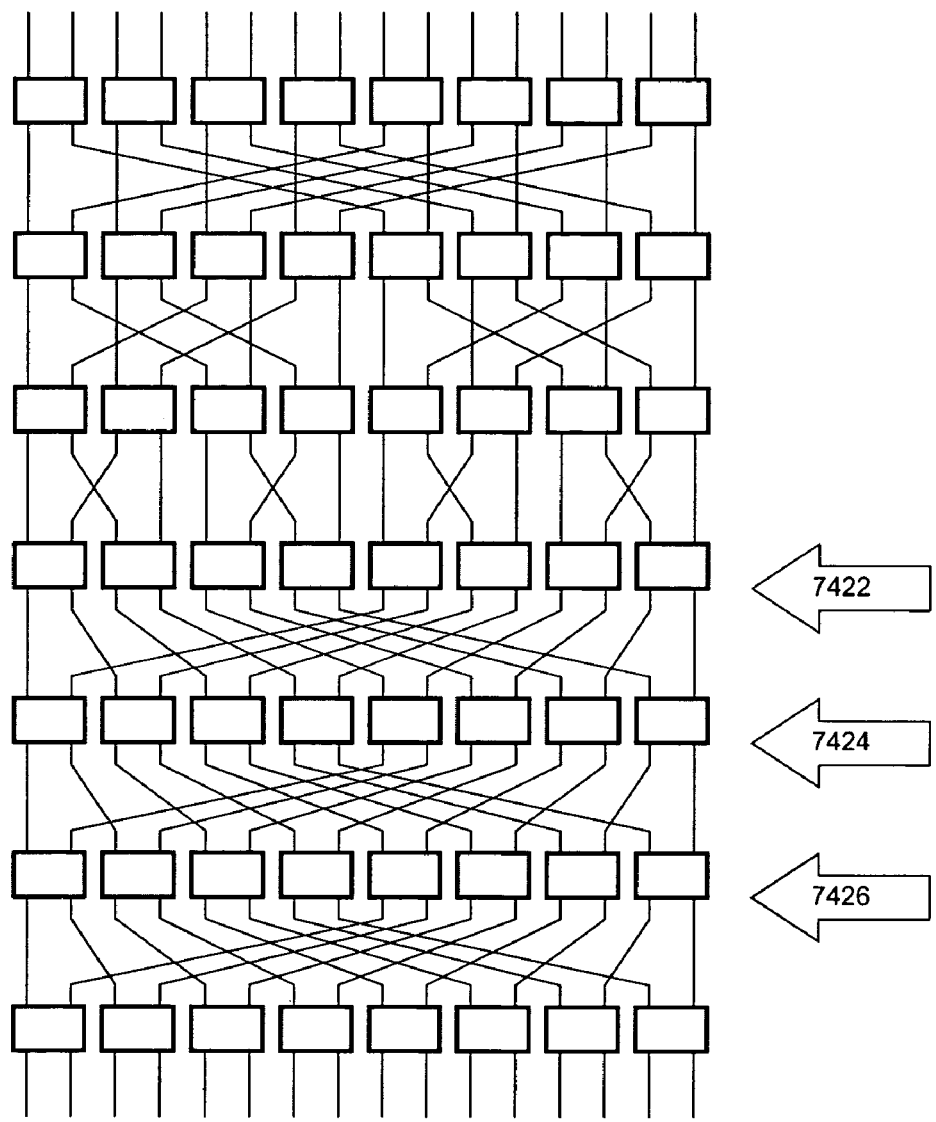

FIG. 84B shows the result after the splicing operation in accordance with the description above. FIG. 84C shows the resultant switching network after the upgrade process is complete; in particular, after the rewiring operation is completed. The rewiring operation can be performed based on the descriptions set forth above.

Arrows 7412 and 7414 in FIG. 84C indicate insertion locations for the addition of still another stage. The result would be the switching network depicted in FIG. 84D where arrows 7422, 7424, and 7426 indicate insertion locations for the further addition of another stage.

As for changes in fanout or width, the reconfiguration process set forth above can be applied, provided there is sufficient fault tolerance. For example, the delta network of FIG. 15A can be reconfigured to either the switching network of FIG. 15B or FIG. 15C. However, the switching network FIG. 15C is not functionally connected, and FIG. 15A does not have sufficient fault tolerance to guarantee no interruption of service during the reconfiguration process; that is, during the reconfiguration process, the switching network can fail to be functionally connected. Nonetheless, the reconfiguration process set forth above tends to minimize the impact of the lack of functional connectivity. Furthermore, if the switching networks depicted in FIG. 15A, FIG. 15B and FIG. 15C were augmented by an extra stage and a CGISIC network, the reconfiguration process set forth above can be used to make the transformation between any two of those switching networks without interruption of service.

Naturally, another use of the reconfiguration process would be to transform a hybrid switching network, which lacks symmetry and is more cumbersome to design and describe, into a RBCCG switching network, which is easier to describe and possesses greater symmetry, which can lead to a much more manageable upgrade path.

The reconfiguration process set forth above can also be applied to the Cartesian product of any of the scalable switching networks described above, provided there is sufficient fault tolerance in the pre-reconfiguration and post-reconfiguration switching networks.

The reconfiguration Cartesian product networks can be described in terms of changing the various fanouts and widths of the network, as well as the number of stages. For example in the two dimensional RBCCG networks set forth above, the fanouts $F_1$ and $F_2$, the widths $W_1$ and $W_2$ as well as the height H, can be changed. The reconfiguration process is as set forth above, except the specific embodiments regarding port selection should be adapted for the context. For example, in selecting the port in the one-dimensional RBCCG network, the ports are scanned from left to right to find the best candidate port to manipulate first. With a two-dimensional (or higher dimensional) multistage switching network, this description does not fit. Any systematic scanning method can be used, including but not limited to, raster scanning, serpentine scanning, and zig-zag scanning, shown in FIG. 85A, FIG. 85B and FIG. 85C respectively.

For clarity, the ISIC networks are omitted from the diagrams to follow, but should be assumed to included as part of the switching networks described. FIG. 86A shows an expansion by a single vertical slice analogous to a column expansion in a one-dimensional RBCCG. This causes an increase in the number of switching elements in the $x_1$ direction. Though not shown, the same kind of expansion could also be implemented in the $x_2$ direction. FIG. 86B shows a more arbitrary width expansion where the $W_1$ width is expanded by one but the placements are completely arbitrary; similarly, this could be applied to expansion to the $W_2$ width. FIG. 86C shows an expansion in both the $W_1$ and $W_2$ widths using a method analogous to column upgrades. FIG. 86D shows an expansion in both the $W_1$ and $W_2$ widths, but in a more arbitrary fashion. In FIG. 86A, FIG. 86B, FIG. 86C and FIG. 86D, the ISIC networks are not shown to simplify the diagram and the new switching elements are highlighted by hatching.

FIG. 87A and FIG. 87B show a simultaneous upgrade in fanout, width, and height. FIG. 87A shows the pre-reconfiguration switching network architecture, and FIG. 87B shows the post-reconfiguration architecture. In particular, the width is increased by one in the $x_1$ direction, and the fanout is increased by a fixed amount (no value is specifically shown, but any increase is legitimate) in the $x_2$ direction. Additionally, an extra stage of switching elements is inserted between stages 2 and 3. In FIG. 87B, the increased fanout is denoted by hatching and added switching elements are highlighted by hatching.

Furthermore, when considered in its flattened form like that depicted in FIG. 20A, a Cartesian product network can be treated as a one-dimensional multistage switching network, and it can be transformed with the reconfiguration process set forth above to any other viable one-dimensional multistage switching network.

The overlaid switching networks can be reconfigured using the process set forth above. The fault tolerance requirements are more relaxed in this architecture. Because of the alternate paths that exploit connections in both the IRIC and ICIC networks, fault tolerance of the switching network is magnified over that of the source multistage switching network. An overlaid switching network with its IRIC derived from the ISIC network of a Banyan such as the one shown in FIG. 24C can be upgraded in width, though there is insufficient fault tolerance in a Banyan network to upgrade a Banyan network as a multistage switching network, because the overlaid network draws additional fault tolerance from connections in the ICIC networks.

In order to simply the description, an exemplar depicting a simple upgrade in width is presented. To properly apply the process set forth above for multistage switching networks to overlaid switching networks, it should be noted that in upgrading the multistage switching networks, after the preliminary shuffling of hardware, focus is on the rewiring of the ISIC networks. In an overlaid switching network, after initial shuffling of hardware, the focus of the upgrade process is on rewiring the IRIC and ICIC networks.

Figure 88A:
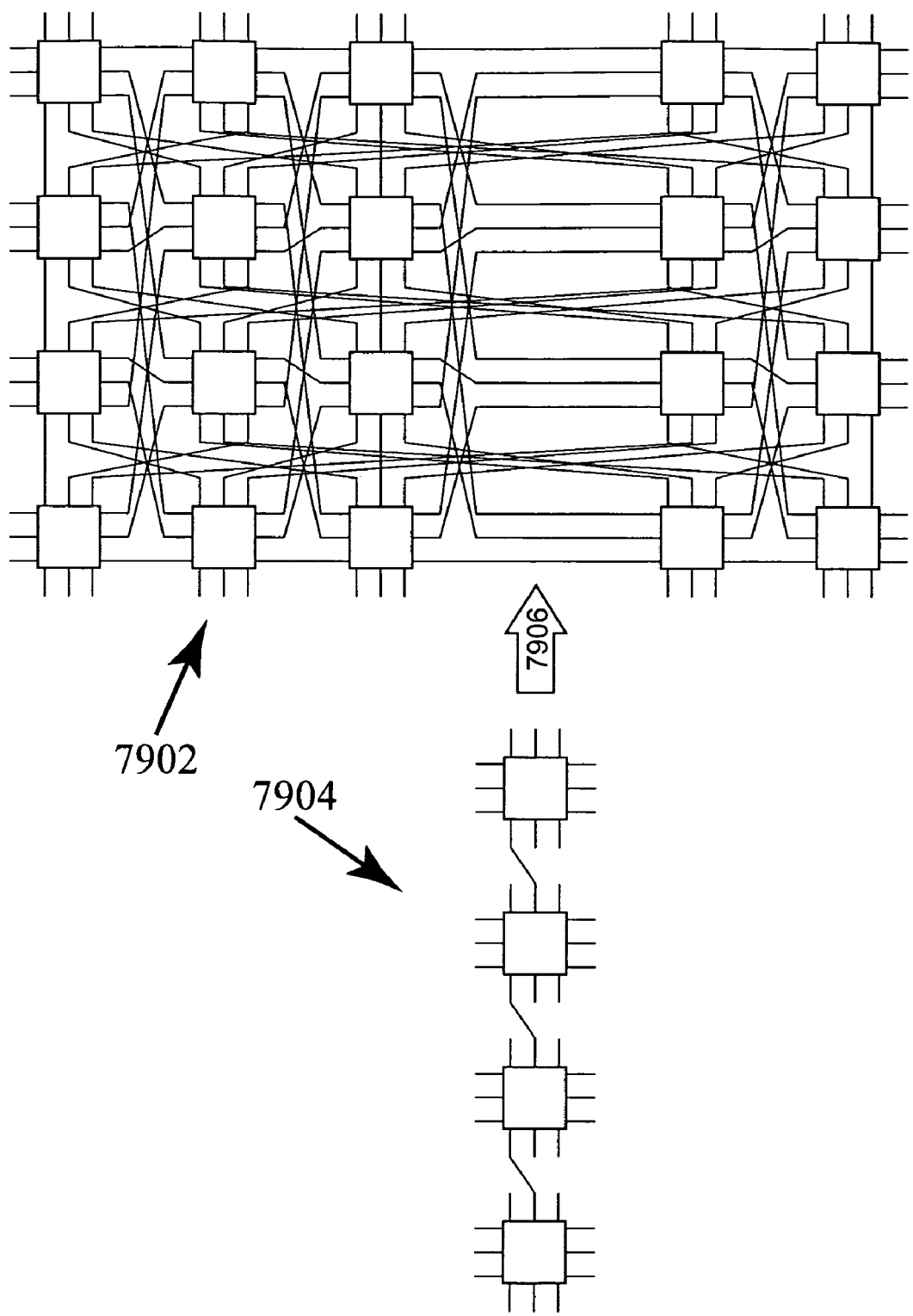
Figure 88B:
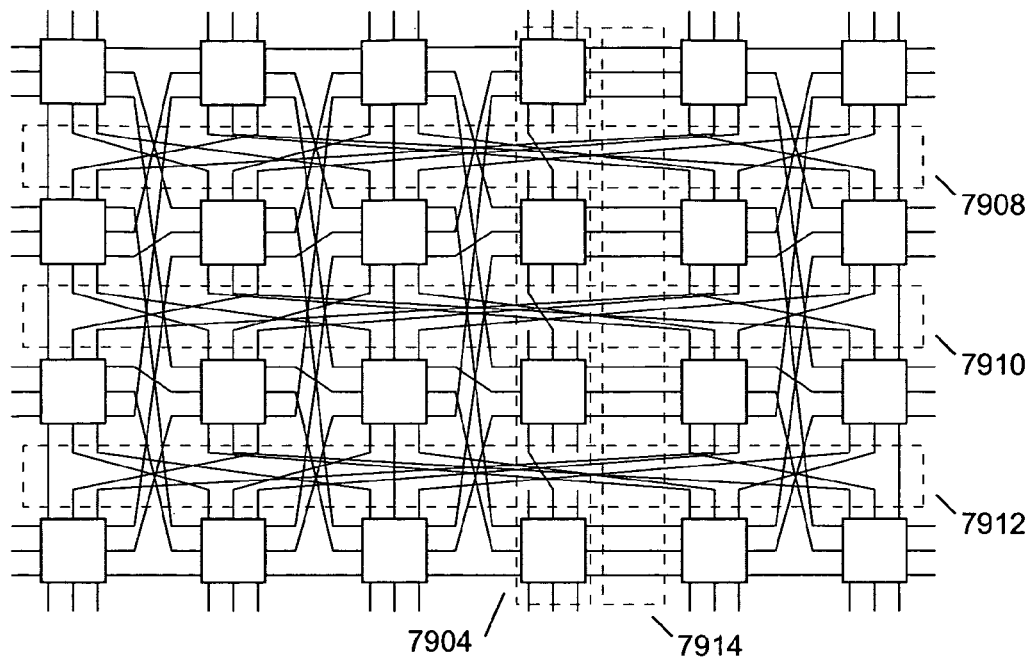

FIG. 88A shows an overlaid switching network 7902 formed by overlaying an RBCCG network with 5 columns and 4 rows onto an RBCCG network with 4 columns and 5 rows, both with a fanout per switching element of 3. Since this is an upgrade, there are no external ports that need to be deactivated. Next, a column 7904 of switching elements is prepared for insertion, by making any connections between them that are to be made in the post-reconfiguration switching network. Thus far, the process matches that performed if one were to upgrade by width with respect to the IRIC networks.

Since both the IRIC and ICIC networks require reconfiguration, one could simply perform a width upgrade, considering the overlaid network as multistage switching networks, with the rows as the stages and the IRIC networks as ISIC networks. Then, perform a stage upgrade, considering the overlaid network as a multistage switching network, with the columns as the stages and the ICIC networks as the ISIC networks. In either order as proscribed, the process set forth for reconfiguring a multistage switching network. In that regard, the stage upgrade is recommended to be performed first because typically a stage upgrade tends to increase redundancy in the switching network, while a width upgrade tends to decrease redundancy and increase throughput.

In the example of FIG. 88A, a different tactic is adopted. To increase the overall redundancy of the network, column 7904 is spliced into the network at the location indicated by arrow 7906 in accordance with the splicing step set forth above, resulting in FIG. 88B.

At this point, the general description of the rewiring step set forth above could be broadened. The step for a multistage switching network is to select a port that needs rewiring, break any existing connection, and connect the port to the corresponding port in accordance with the post-reconfiguration switching network, where the specific embodiments break the port selection into organized steps. This description now applies to left ports and right ports in addition to the top ports and bottom ports of a multistage switching network. The example given here first rewires the ICIC networks, selecting the center-most ICIC network 7910 first, and then proceeds outward to the other ICIC networks 7908 and 7912, then the IRIC network 7914. The reason for selecting the ICIC networks first is that some of the switching elements have top and bottom ports that are disconnected. By connecting them properly by rewiring the ICIC networks first, the network increases its redundancy. When such redundancy during the upgrade process is not critical, another order of rewiring can be used.

Figure 88C:
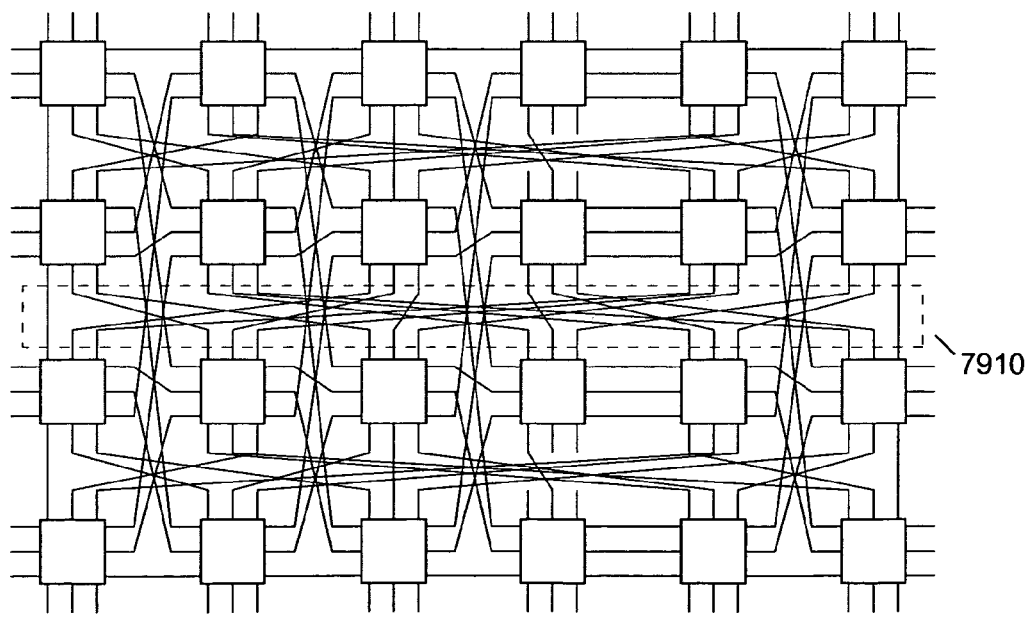
Figure 88D:
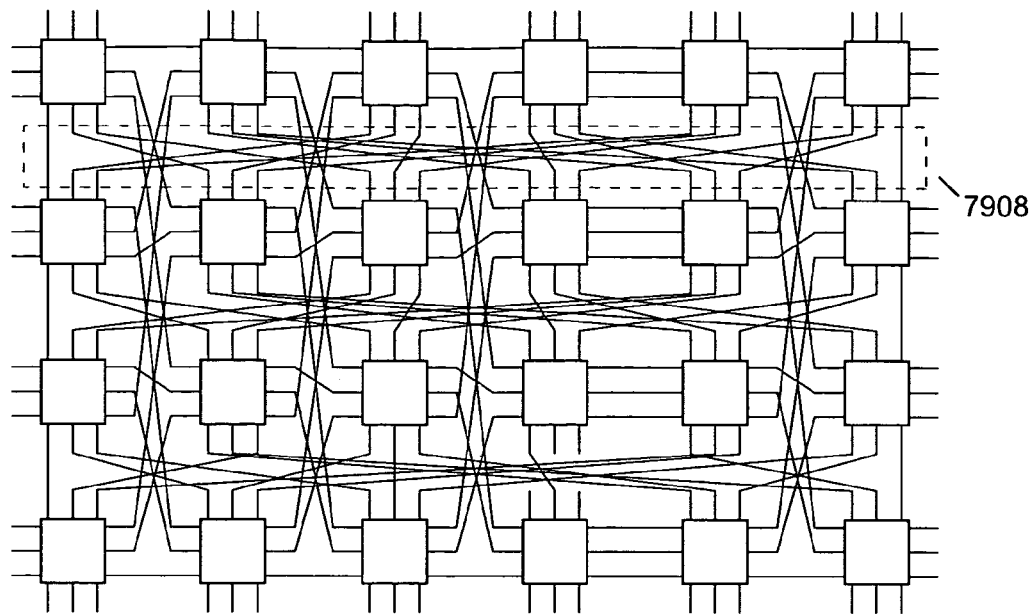
Figure 88E:
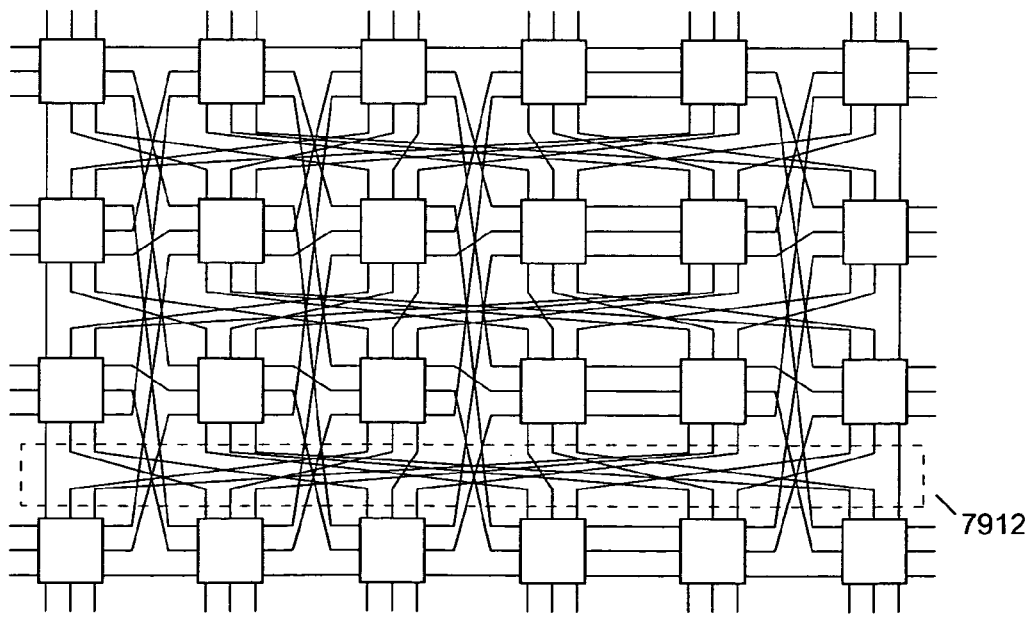
Figure 88F:
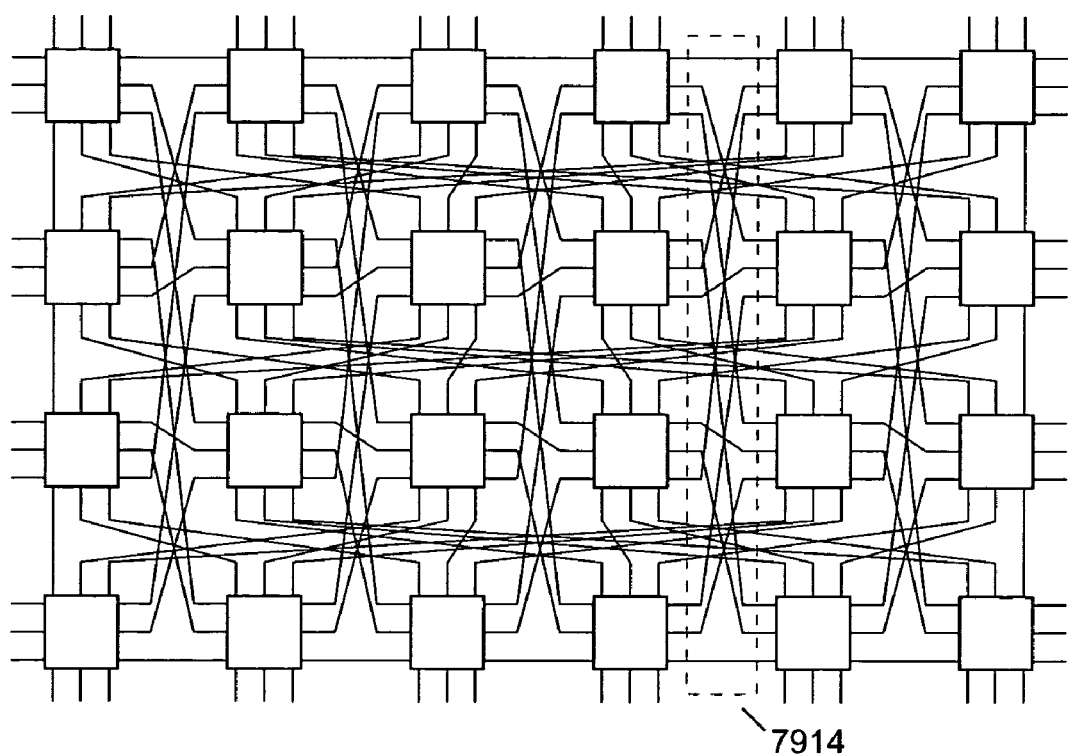

FIG. 88C shows the switching network after ICIC network 7910 is rewired. FIG. 88D shows the switching network after ICIC 7908 is rewired. FIG. 88E shows the switching network after ICIC 7912 is rewired. FIG. 88F shows the switching network after IRIC 7914 is rewired. Connecting and activating the external ports introduced by column 7904 and allowing traffic to flow through them completes the upgrade process.

Figure 89A:
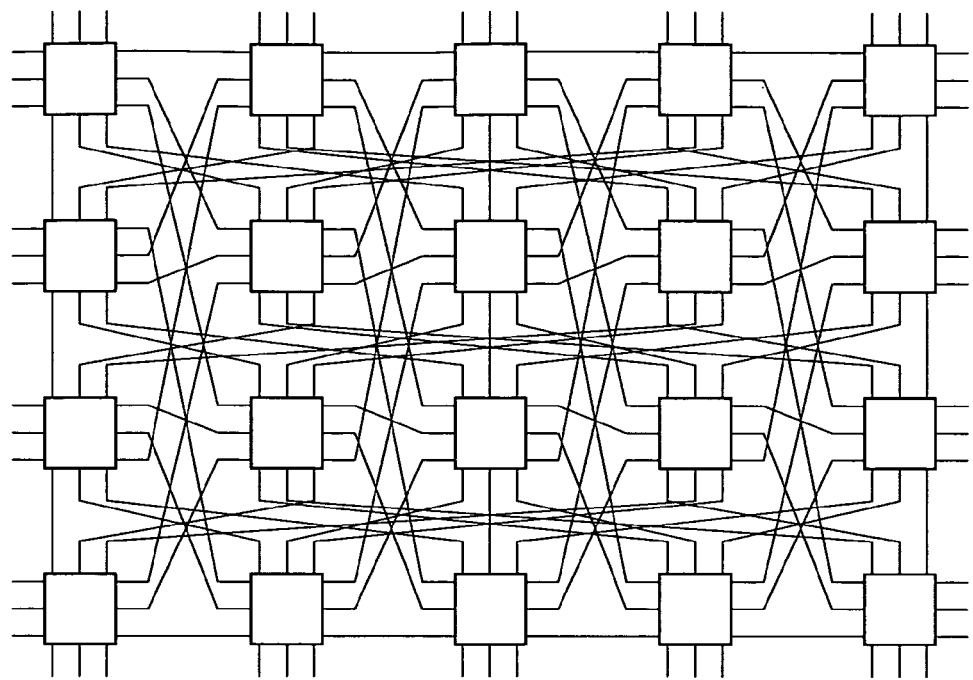
Figure 89B:
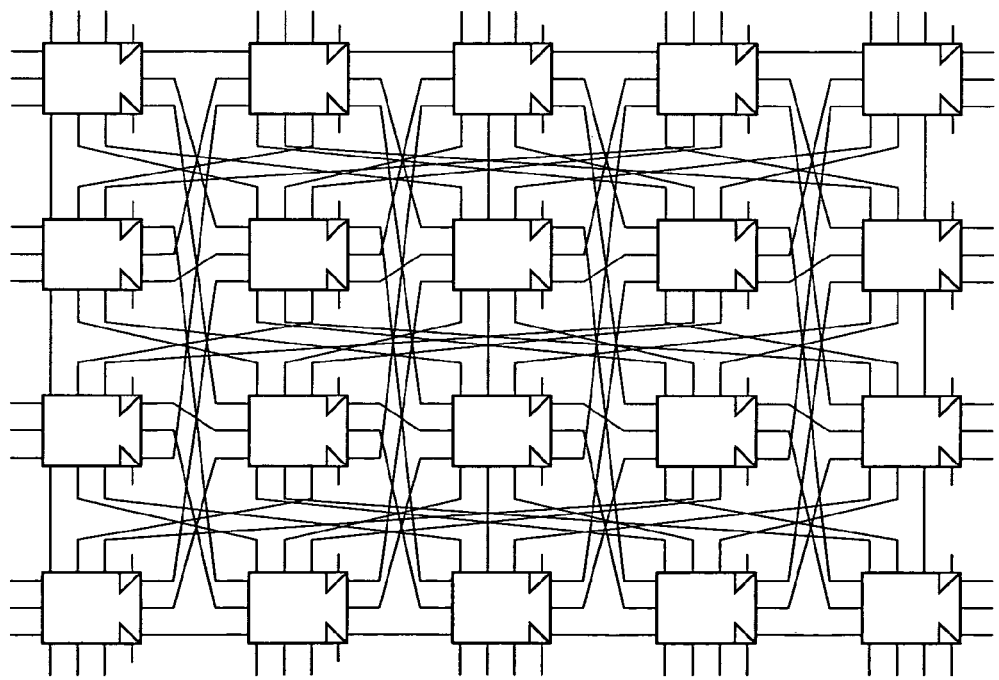
Figure 89C:
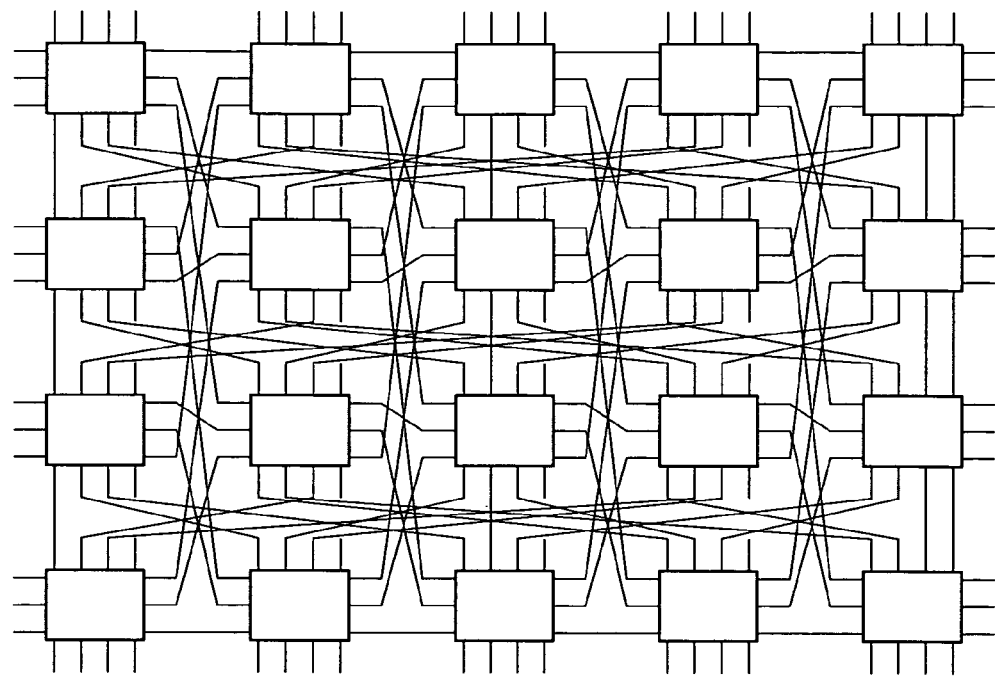
Figure 89D:
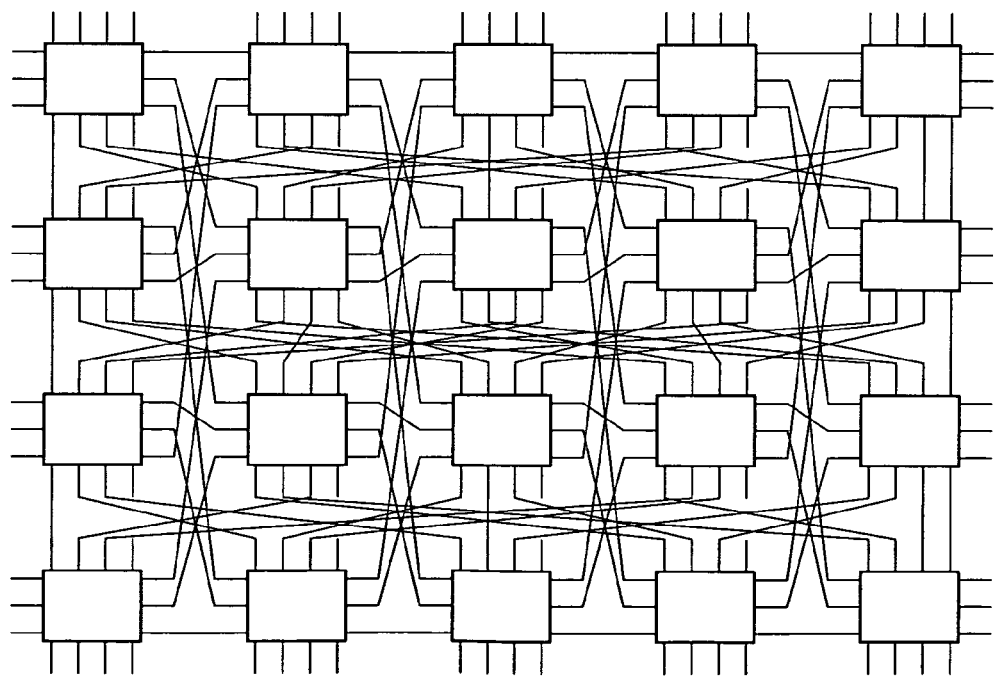
Figure 89E:
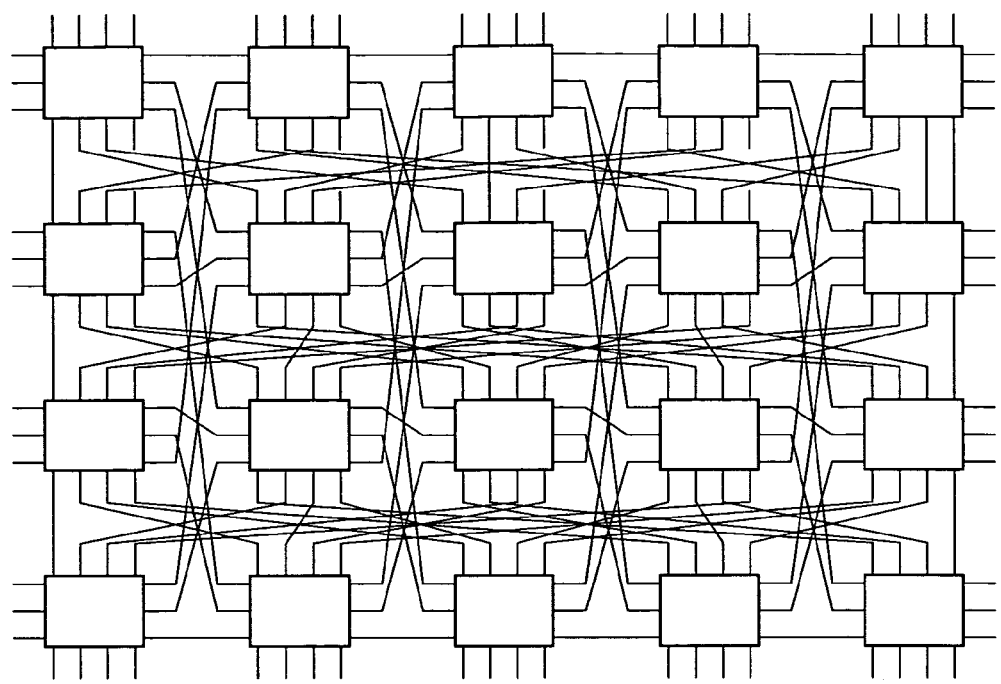
Figure 89F:
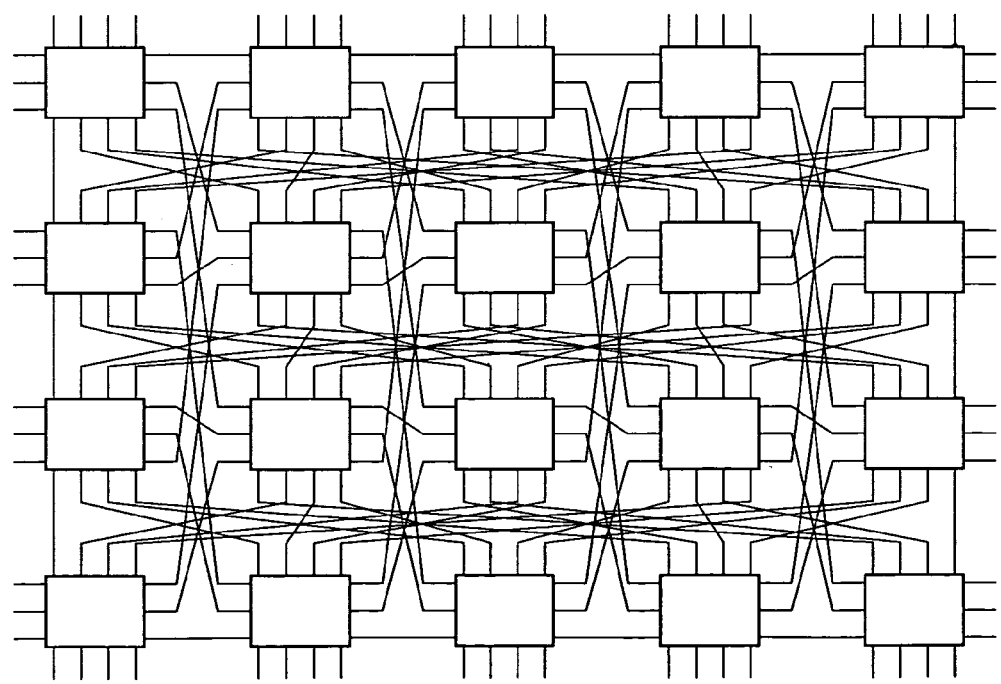

A few additional examples of reconfiguration of overlaid switching networks are given. FIG. 89A shows the same RBCCG network as in FIG. 88A. FIG. 89B shows the addition of new top and bottom ports to each switching element in preparation for a fanout upgrade. FIG. 89C shows the forming of all connections, in accordance with the post-reconfiguration switching network, which can be made without breaking existing connections; specifically the rightmost top and bottom ports of the rightmost switching elements are connected to the adjacent row's switching element. Only the IRIC networks need to be rewired, so the step follows identically the rewiring step as set forth above. For simplicity's sake, the optional relabeling is not performed here. FIG. 89D shows the result of rewiring the IRIC network between row 1 and row 2. FIG. 89E shows the result of rewiring the IRIC network between row 0 and row 1. FIG. 89F shows the result of rewiring the row 2 and row 3. Upon connecting and activating the new external ports introduced by the upgrade so that traffic is allowed to flow through them, the upgrade process is completed. It should be noted that the switching element rows are numbered from the 0 to 3 with row 0 at the top.

Due to the two dimensional layout of the overlaid architecture, it can be desirable to "take the fanout" from one direction and "give it to another." More precisely stated, if an RBCCG network of per switching element fanout $F_1$ is overlaid on an RBCCG network of per switching element fanout $F_2$, this network can be converted without addition of hardware to a network with the same dimensions except with per switching element fanouts of $F_1+1$ and $F_2-1$.

Figure 90A:
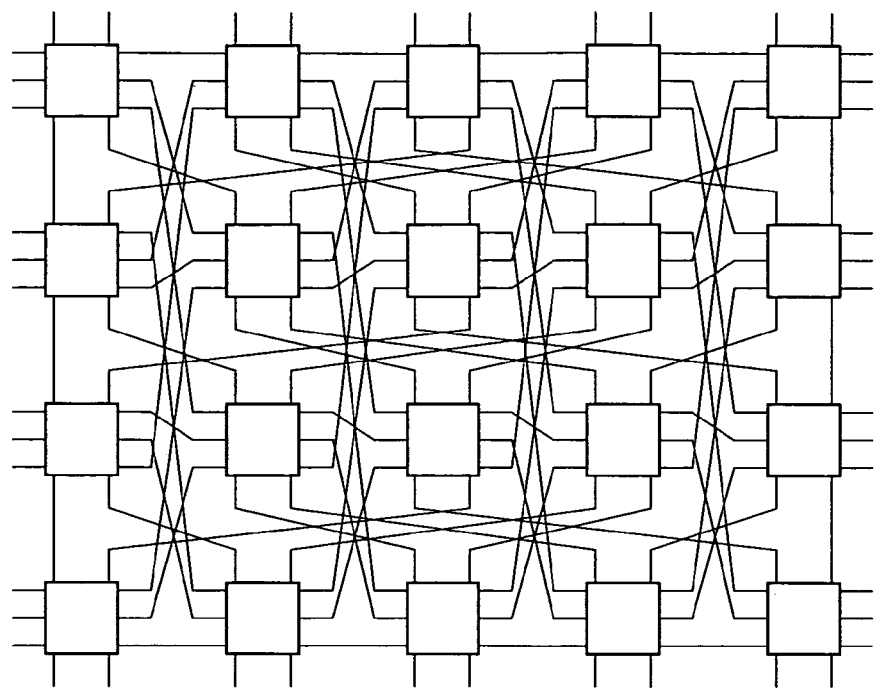

FIG. 90A shows an overlaid switching network formed from a 5 column 4 row RBCCG network with a fanout of 2, overlaid on a 5 column 4 row RBCCG network with a fanout of 3. The reconfiguration is to convert it to an overlaid switching network formed from a 5 column 4 row RBCCG network with a fanout of 3, overlaid onto a 5 column 4 row RBCCG network with a fanout of 2.

Figure 90B:
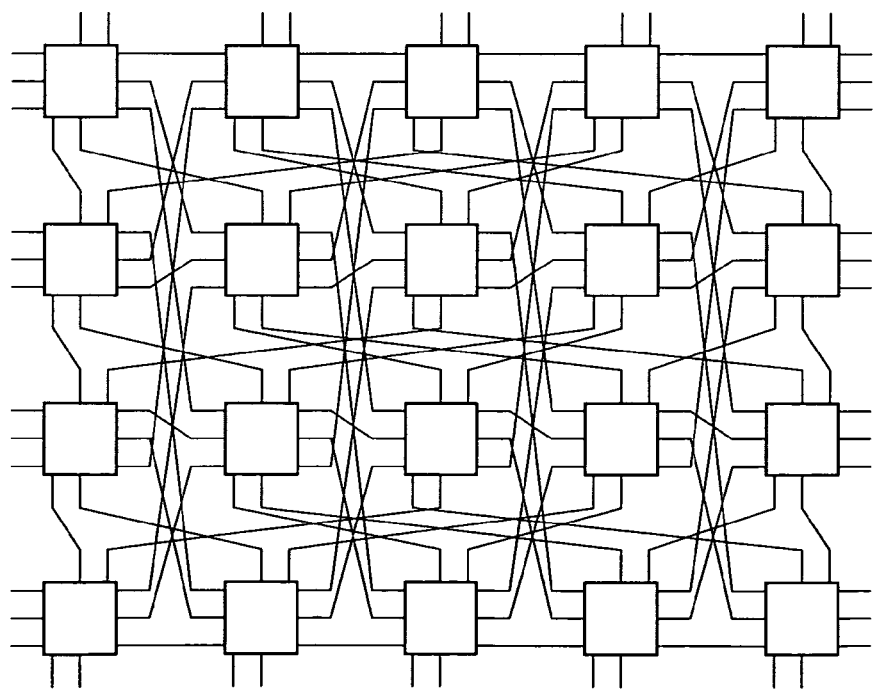
Figure 90C:
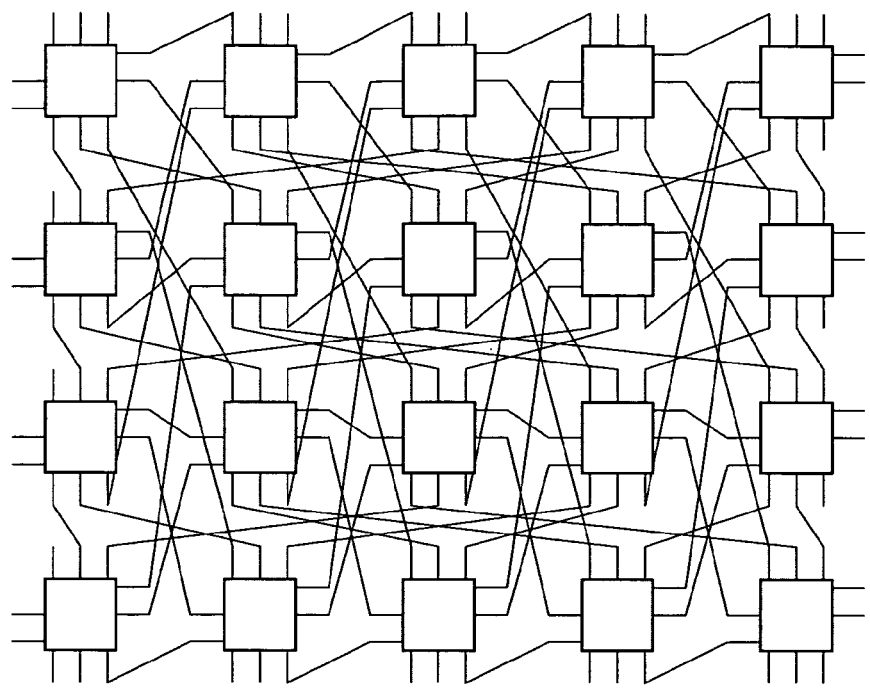
Figure 90D:
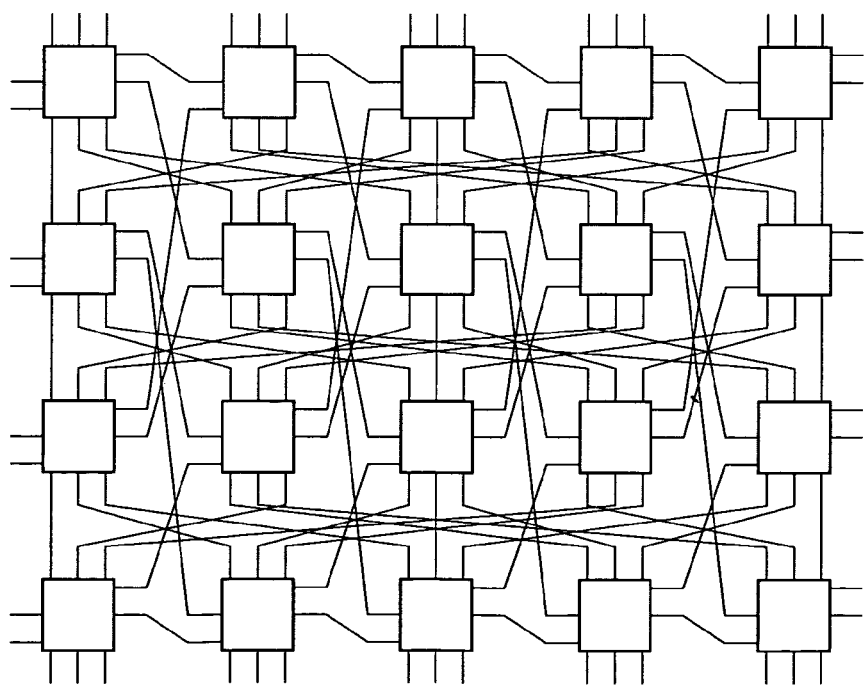

FIG. 90B shows the same switching network shown in FIG. 90A, but drawn a little differently. FIG. 90C shows a left port for each switching element reassigned as a top port, and a right port for each switching element reassigned as a bottom port. Before proceeding to the rewiring step, traffic to ports that were originally external but will cease to be should be shut off, traffic should be diverted from them, and the ports should be disconnected. The rewiring step set forth above can be applied with some modification. Generally, the upgrade procedure comprises the steps of selecting a port not correctly connected to its corresponding port, as defined by the post-reconfiguration architecture, and rewiring it to the corresponding port, breaking any existing connection when necessary. The choice of which port to select depends of various factors. Most commonly, the desire to minimize service disruption takes precedence, so one could select a port which doesn't require the breaking of an existing connection, or, failing that, select a port that is available due to breaking a connection on the previous iteration. The resultant rewired switching network is shown in FIG. 90D. Any former internal ports that have become external ports in this process can become active, wired to external sources, and have traffic flow through them.

The scalable switching networks described above can be upgraded in a non-stop manner; however this upgrade must be done in a certain order to minimize the affect on the traffic carrying capacity of the network. Although the systems and methods set forth below are given in terms of an upgrade procedure, it should be understood that these systems and methods can be applied to the general reconfiguration processes described above.

Several methods are described which either facilitate or implement these upgrade procedures. All the techniques below employ common software elements to work effectively. First, the software needs to detect the current architecture, and generate the upgraded target architecture and from that, derive the set of steps required for the non-disruptive upgrade, for example, as derived from the post-reconfiguration architecture.

Second, the software needs to monitor the process of the upgrade procedure. Current software such as OpenView by HP and NetCool performs this functionality using the SNMP or other supervisory protocols.

Third, the software needs to poll and verify individual connections. One method is to instruct the specific switching element to check the status of a connection associated with a particular port. This check can be done at the physical level by testing to see if there is any light on an optical connection. This can also be done at the protocol level by checking to see if point-to-point protocol (PPP) is running. The switching element can then either report directly back to the software or include the information in a supervisory protocol message. Another method for the software to verify the individual connection is to trace traffic through specific routes in the scalable switching network with a program similar to the UNIX™ traceroute program.

Fourth, as an optional enhancement, the software could further comprise a module which instructs a switching element to divert traffic flow to the line card or port associated with the connection to be broken, and to terminate the traffic flow from the line card or port associated with the connection to be broken. Similarly, it can instruct a switching element to resume traffic flow to and from a line card or port associated with a connection to be established. Though not necessary, this would further limit disruption to the service during the upgrade process.

Using the software described above, one could monitor the progress of an upgrade, as well as receive instructions for what connection to move. For instance, a technician running the software could be instructed to disconnect port 1 on switching element 5, and reconnect that fiber to vacant port 2 on switching element 3. Then the software can check to see if that connection was properly made, and indicate that to the technician.

FIG. 91 shows a physical implementation of a scalable switching network. The switching elements 9300 are connected via some cables (most likely optical fiber) 9302 to a patch panel 9304. The patch panel is connected to a series of (optical fiber) jumpers 9306. These jumpers are connected back to the patch panel. For one switching element to connect to another switching element, it must connect through a cable to the patch panel, then through a jumper back to the patch panel, and finally through another cable to the second switching element. Clearly, in such a scheme, one need only change the jumpers to rewire the connections between the switching elements.

FIG. 92 shows a schematic of a patch panel. The patch panel comprises connectors to the switching elements (not shown) in the rear, connectors 9400 for the jumpers in front, and indicator lights 9402. These lights are connected to some kind of central driver which can be addressed by a computer. Each connector 9400 has a light associated with it. Such a patch panel is commercially available from vendors such as Siemens.

The software described above can further comprise a module, which can drive these lights which serves as a guide to instruct the technician which connection to move during the upgrade process. Some convention should be established in order to instruct the technician of the actions. This can be accomplished if the lights have colors, or by varying the lighting states of the light such as a steady light, a fast blinking light, and a slow blinking light. If colors are available, additional states can be created by alternating colors in a blinking mode. An indication convention should be established to indicate a "disconnect me," "connect me" and "error in connection."

The technician can be directed through the upgrade or reconfiguration through the process described in FIG. 94. The order of operation can be determined by a computer configured to operate the process in FIG. 94. For example, the connection to be manipulated in the step "determine next connection to be established" can be determined by a computer with the pre-reconfiguration architecture and post-reconfiguration architecture programmed. From those two switching networks and the current state of the present switching network, the computer can determine based on the reconfiguration process set forth above, the next connection to be established. Furthermore, this computer can be in communication with the switching network and can monitor whether the correct connection is made. In one embodiment, the computer can back a technician out of an erroneous connection being established or broken.

In a typical operation of an embodiment of this method, a technician invokes the software application described and then proceeds to the patch panel. An indicator light instructs him to make a connection or to disconnect a port. Once each step is successfully completed, he can receive acknowledgment that the step was successfully undertaken. After the entire upgrade is complete, there could be a convention indicating all is successful, such as all the lights on all ports blinking for 10 seconds.

In the previous embodiment of upgrade assistance, the technician performs a rather mechanical operation. Due to the length and perhaps tedium of such a procedure, it can be desirable to replace the technician in the procedure with a robot.

Without going into any extreme detail in robotics, a robotic arm could be attached to each patch panel and be controlled by the same central software which was guiding the technician in the previous embodiment. So rather than indicating to the technician which connection to make or break, a robotic arm is instructed which changes to make. There should also be a location on the patch panel to store "spare" jumpers. In that during some of the upgrade process, completely new connections are made or old connections are completely broken.

The robotic technology to implement this has been around for over twenty years, dating back to graphic plotters by Hewlett-Packard that would grab different colored ink pens and manipulate them to certain locations on a plotting package. Such a device has the essential ingredients to perform the upgrade. This type of robotic arm may encounter problems arising from interference with the other jumper cables. However, modern robotics has evolved much further and modern robotics used in mass production manufacturing has devices which can deal with this.

Though the robotic method of the preceding can eliminate much of the human error that can occur in the upgrade process, mechanical processes such as robotics are prone to breakdown, compared to a purely solid state processes. The embodiments described below employ addressable latching switches to perform upgrade processes.

In the first embodiment, the network comprises switching elements for which each port is augmented with a latching switch. For example, FIG. 93 depicts a router comprising latching switches coupled to each port. In alternative embodiments of this enhancement, the latching switch could be built into the router's line cards and addressable by the router, or the latching switch could be appended to the router ports and addressable through a connection directly to the latching switch. The router depicted can be any router or more generally any of the switching elements described. The latching switch can be directed into its switching states by a signal. In this particular embodiment, the latching switch is a single pole double throw switch and can be set to one of two states, referred to as the first state and the second state. Each state directs traffic to one of two ports. It is also desirable, for error checking purposes, for the latching switches to be pollable, that is, with a proper communications module in the software, the current state of a switch is obtainable.

During normal operations, only the first set of ports of the latching switches are connected to the other first set of ports of latching switches corresponding to other routers in such a fashion as to implemented the interconnection networks of the scalable switching architectures described. Though not required, these connections could be implemented through the use of a patch panel as described above. During this normal operation, the second set of ports on all the latching switches are all idle and need not have any connections to them.

During the upgrade process, the first step is to wire the second set of ports on the latching switches to the other second set of ports on other routers in the manner of the interconnection network to be upgraded to. Connections can then be broken and established in accordance with the upgrade procedures under the control of the software described above.

FIG. 95A depicts a pre-upgrade picture where router 9600 is connected through a latching switch 9602, through a connection 9604, to another latching switch 9606 to router 9608. Suppose during the upgrade process router 9600 should be connected to router 9610, then the second ports on latching switch 9602 and 9612 should be connected. When it is necessary to make this connection change, latching switch 9602 is thrown to break connection 9604 and latching switch 9612 is thrown to establish the new connection. It should be noted that now the port connected to latching switch 9606 is now broken as a result, but is presumably repaired later in the upgrade process. FIG. 95B depicts a post-upgrade picture when router 9600 is connected to 9610.

After the upgrade process is complete, the interconnections now operate through the second set of ports for each latching switch. Upon the next upgrade, the new network can be wired to the first set of ports for each latching switch.

Another embodiment uses a prepackaged interconnection box. FIG. 96 depicts the overall architecture of this switching network, where routers are all connected to the prepackaged interconnection box. If a router is to communicate with another it must pass into the interconnection box. In this particular design, the need for a patch panel is eliminated, although for practical purpose the connection from the routers through to the interconnection box can pass through a patch panel to simplify the physical layout of the devices.

FIG. 97 shows a diagram of the prepackaged interconnection box. It comprises external ports to switching elements, latching switches, internal connectors, and prepackaged interconnections on printed circuit boards. In addition, the latching switches are connected to a communications port so that maintenance and upgrade software can query and manipulate the latching switches. Each external port is connected to a latching switch. The internal connectors are divided into two sets; each set is designed to interface with one interconnection board. Each latching switch is connected to two internal connectors, one in each of the two sets described above.

In operation, the interconnection boards can be inserted into the interconnection box. Current practice is to have slots for the boards to be inserted. Locking safeguards can be implemented to ensure an interconnection board cannot be removed while the system is running. During normal operation, traffic would travel from one switching element to the interconnection box; depending on the current state, it would then traverse one set of connectors to an interconnection board, and back from the interconnection board through the same set of connectors out to another switching element.

During the upgrade process, a second interconnection board representing the upgraded interconnection pattern, which can be an ISIC network for a given post-reconfiguration architecture, is inserted into the inactive slot in the interconnection box. At this point, switching elements are connected through latching switches to a current and upgraded interconnection pattern, so the software triggered switching of the latches switches can proceed in the same manner as the above embodiment. After the upgrade process is complete, the original interconnection board can be removed.

Using the interconnection box, to the technician performing the upgrade, the process should appear as follows: The software is invoked. A second interconnection board is inserted into the interconnection box. The technician can trigger the upgrade process or the board insertion could trigger the upgrade process, at which the software redirects traffic, according to the upgrade steps generated one connection at a time, to the second interconnection board. Upon completion, the technician is notified that the process is complete, and the first interconnection board can be removed.

FIG. 98 shows a sample embodiment of an interconnection board implemented in optical fiber. Often, optical fiber has restrictions on the turning radii allowed before significant loss of signal occurs. Each fiber is coupled to a pair of connectors by which the interconnection board can be coupled to the interconnection box.

Though the preceding embodiments are directed towards the use of high-speed routers with optical interconnections, latching switches are also available for high speed electronic connections and interconnection boards implemented as simple printed circuit boards are also readily available. Both the preceding embodiments can also be implemented as electronic devices as well as optical.

Latching switches are described above so that no power is required in the first embodiment or in the interconnection box except during the process of upgrading. This also ensures stability during a power outage of the interconnection box. Though latching switches are described for both embodiments, powered switches, that is, switches that require power to maintain a second switching state, can be employed instead. It is far more cumbersome, but in both embodiments the use of powered switches can be substituted by first assembling an identical interconnection pattern connected to the second port on the switches. After the identical interconnection pattern is connected, each connection is transitioned over to the second set of interconnections by a powered switch. Once all the traffic is diverted to the redundant interconnection network, the first set of interconnections is reconfigured to the new upgrade pattern. From this point, the upgrade process is applied in the same manner as described above with the finished architecture wired through the first set of interconnections, at which point, no power need be applied to the switches.

As previously discussed, the scalable switching network can be upgraded by controlling and monitoring single pole double throw switches associated with the internal switching element ports. The upgrade procedure can also be accomplished by electronically controlled optical cross-bars as shown in FIG. 99. All the bottom ports associated with a particular stage of the scalable switching network can be connected to the inputs of an optical crossbar. All the top ports associated with the subsequent stage of the scalable switching network can be connected to the outputs of the optical crossbar. The electronically controlled optical crossbar can thus connect any bottom port associated with a particular stage of the scalable switching network with any top port associated with the subsequent stage of the scalable switching network. This electronically controlled optical crossbar can be controlled by the same algorithm used to control the patch panel in FIG. 92.

FIG. 100A shows a typical competitive local exchange carrier (CLEC) for a metropolitan switching network. Add/drop nodes are connected in a ring topology with optical fiber. The CLEC is analogous to a freeway beltway that encircles many cities. The Add/Drop nodes are analogous to the freeway on/off ramps. Long distance telecommunications providers such as MCI and AT&T, long distance data communications providers such as UUNET and MCI, local telecommunications access providers such as cellular telephone providers and RBOC's (regional Bell operating companies), data access providers such as digital subscriber line (DSL) providers, Internet Service Providers (ISP), cable modem providers, service providers such as AT&T, Cingular, and Cox Networks, and content providers such as Time Warner and Disney are or will be connected to the CLEC to provide communication based services.

The optical fibers carry Synchronous Optical Networking (SONET) circuits such as Optical Carrier-12 (OC-12) and Optical Carrier (OC-48). The nodes use SONET add/drop multiplexers to add and drop various SONET circuits. The dropped SONET circuits can be connected to either telecommunications or data switching equipment. Operationally, a typical packet from an access subscriber is sent to an access provider. The access provider routes this packet onto one of the SONET Add/Drop circuits. The SONET circuit is connected another SONET Add/Drop on the CLEC. This SONET Add/Drop is connected to another router that routes the packet to either an access subscriber or to a network backbone provider.

FIG. 100B shows an alternate configuration for a metropolitan switching network. In this configuration, all access to the metropolitan network is directed through a central switching router network. The ring topology is replaced with a star topology. Each service provider is connected directly to this central switching router network. In this particular embodiment a RBCCG switching network is depicted, but any of the scalable switching networks described here can be used depending on the requirements of the metropolitan area. The advantages of this configuration include the elimination of the need for Add/Drop hardware, and the assumption of large access routers into the central router network. The current preference towards the CLEC architecture lies in the fact that a very large switching capability is required, and that conventional clustering of routers is ad hoc in nature with the drawback of not adequately supporting isochronous traffic such as voice and video. In addition, ad hoc clustering of routers is not designed for any semblance of fault tolerance, and any redundancy is accidental.

However, by employing large internet protocol (IP) routers such as the Cisco 12000, a network of IP routers can be constructed which has a high capacity to switch asynchronous and isochronous traffic simultaneously. In addition, any level of fault tolerance can be designed in. This configuration has the advantage that it can also be upgraded without disruption of service. In order to best preserve fault tolerance, even at the edges, service providers with multiple connections to the router network should connect their connections to different routers whenever possible.

The centralized RBCCG network shown in FIG. 100B can also be implemented in a distributed manner on top of a ring topology. The individual switching elements of the RBCCG, which as shorthand are called RBCCG routers, can be distributed among various CLEC nodes and these routers can be interconnected by CLEC circuits.

There is an advantage to locating certain RBCCG routers in certain locations. As mentioned previously, all the routers in a column of RBCCG routers as shown in FIG. 100C can malfunction or be disconnected and the remaining columns of RBCCG routers will continue to function. It would thus be advantageous to locate all the routers associated with a column of RBCCG routers at the same CLEC node. CLEC communications bandwidth is thus used to increase the fault tolerance of the CLEC.

Traditionally, the Add/Drop multiplexers are circuit based and not packet based. A new generation of packet based Add/Drop multiplexers is being developed which combine the functionality of a circuit based Add/Drop multiplexer and a packet based router. A RBCCG network can also be used to accomplish this. Each column of routers of an RBCCG network can be located at different CLEC node. The connections from the top of the top column router and the bottom of the bottom column router are connected to either an access provider, a communication provider, a content provider, or a service provider. The connections from the internal column routers are either connected to other routers in the column are remotely connected by the CLEC to the internal column routers associated with other nodes. The RBCCG routers thus separate the local traffic from the CLEC traffic and also help route the packets to their final destination.

The preceding section describes how scalable switching networks such as RBCCG networks can be used to connect content providers, access providers, communications providers, and service providers on a metropolitan scale. This model can also be applied on a smaller scale. FIG. 101 shows a typical "server complex" utilizing a high bandwidth scalable switching core much in the same way as the metropolitan switching network shown in FIG. 100A. This network comprises a plurality of external connections 8810 as well as a plurality servers 8812. Furthermore, this embodiment comprises local access points 8814. In addition to these components, this embodiment incorporates storage units such as a tape drive 8816 and a disk drive (or array of disk drives) 8818. A networked storage disk or tape drive could be considered a server, such as 8812. Here a server is any computer or device which provides any kind of service on the network. Typical servers include audio servers, video servers, web servers, databases, networked storage, or compute servers (a server dedicated to providing computation services for a network).

The switching network depicted in this embodiment is a basic 24-port 4-stage RBCCG network. Each switching element can be a variety of routers from large IP routers to Ethernet switches. In the latter case of Ethernet switches, some features such as fault coverage and upgradeability become more difficult. For instance, while running standard protocols such as OSPF for routing, an outage of a line card, connection, or complete router will automatically trigger a rerouting around the defective part of the network. With simple switches, detection and rerouting can need to be handled by a central server monitoring status, which it can do using a standard protocol such as SNMP. Similarly, during an upgrade, a system with dynamic routing such as OSPF can automatically adapt to the changing topology inherent in the upgrade process. While still feasible, a central server may be required to manage the individual routing tables of the switches during the upgrade process.

When all the servers in such a complex are used strictly for networked storage, this architecture becomes a network attached storage (NAS) unit. FIG. 102A shows a typical NAS configuration. In this embodiment, a tape drive unit is depicted for the purposes of backing up the storage units. It should also be noted that the external connections and the storage devices are intermingled rather than grouped together. This provides an extra degree of fault tolerance in the event of an outage on an external switching element or connection.

Though subtly different, a storage area network (SAN) is defined to be a network array of storage devices interfaced to servers which communicate externally to the end user, whereas a NAS does not require such servers. In typical embodiments of SANs, the networking employed to connect the storage units is often a much simpler protocol. But since such networks still require switching, and when properly configured such switching also requires some form of routing, the scalable switching networks described above can be applied to the design of SANs. FIG. 102B shows a typical SAN design using the same 24-port 4-stage RBCCG. FIG. 102C shows another SAN design where larger servers with higher networking capacities are employed.

FIG. 103 depicts an embodiment of a server complex where most of the servers are computer servers with some monitoring stations, and with some storage and some backup services, such as in a Beowulf cluster. In this specific embodiment, there are a very limited number of external connections. The purpose of this architecture is to create a very large computing unit. Processor farms of this type have often been used in the world computer animation. This architecture supplies an arbitrary expandable design for creating very large computing devices.

Using an RBCCG network as part of a server complex as shown in FIG. 101, an NAS as shown in FIG. 102A, a SAN as shown in FIG. 102B and FIG. 102C, or a server complex as shown in FIG. 103 reduces the cost, increases the fault tolerance, and reduces the blocking of isochronous traffic.

The previous section shows a progression of using a scalable switching network as the core to various application clusters. The scale progressed from metropolitan, to wide area, to local area, and even to smaller applications such as a processor farm.

Scalable switching networks can be applied on even a smaller scale. Consumer grade connectivity starts to rival internal bus speeds in the interior of computers. In addition, the construction of routers with chips such as the IXP1200 processor allow for simpler routers, simpler protocols, and faster small scale communications. It is natural to next look at replacing the various buses in a computer system with a scalable switching network.

FIG. 104A shows a schematic of a simple computer and its communications buses such Peripheral Component Interconnect (PCI), Small Computer System Interface (SCSI), Universal Serial Bus (USB), and FireWire. FIG. 104B shows the same computer system with these buses replaced by a switching network. It assumes that the peripheral devices are designed to communicate in a packet protocol such as Ethernet. This is not unreasonable since many devices, such as printers, disk drives, and tape drives already have interface variations that allow them to sit independently on a network.

FIG. 105A shows a natural progression towards even smaller applications where the system bus of a computer is replaced by a scalable switching network. FIG. 105B shows both the system bus and peripheral buses replaced by a single scalable switching network. Depicted in both examples is a simple balanced RBCCG network.

In a standard bus, only one device can assert a signal onto it, though many devices can read it. With a scalable switching network, as many devices as needed can communicate to any desired device. This eliminates many bottlenecks. In the case of the replacement of the system bus, this architecture can alleviate the VonNeumann bottleneck, which occurs between a processor and memory. Furthermore, this naturally enables communications between many processors and between as many devices as desired, such as memory or I/O.

The incorporation of scalable switching networks takes interconnection networks full circle. Originally, multistage interconnection networks were investigated as a means of linking parallel processors. Now, processors, peripherals, memory, storage, and communications devices can employ the descendants of the multistage interconnection networks.

As discussed previously, scalable switching networks such as RBCCG networks can be used by communication providers as shown in FIG. 100B; by access providers as shown in FIG. 100B; by the content providers as shown in FIG. 101, FIG. 102A, FIG. 102B, and FIG. 102C; by a server complex as shown in FIG. 103; by computer peripherals as shown in FIG. 104B; or by a computers systems bus as shown in FIG. 105B. It is also possible to use the same RBCCG network for any combination of these applications if the communications protocols are compatible. Some of the communications access points in FIG. 103 could be for a communications provider; some of the computers could be part of a server complex; some of the disk units could be part of a storage array; and some of the monitors and disk units could be peripherals to a computer, or the computers and disks could part of a multiple central processing units (CPU) and distributed memory computer. The advantage of using the same RBCCG network for these applications is that the larger an RBCCG network is, the more efficient it is in terms of cost, routing, and fault tolerance relative to other networks.

While certain embodiments of the inventions have been described above, it will be understood that the embodiments described are by way of example only. Accordingly, the inventions should not be limited based on the described embodiments. Thus, the scope of the inventions described herein should only be limited in light of the claims that follow when taken in conjunction with the above description and accompanying drawings.

What is claimed:

1. A method of upgrading a multistage scalable switching network, wherein the scalable switching network comprises N stages of switching elements, a plurality of internal ports, a plurality for external ports, and a plurality of internal connections, wherein the internal ports and external ports are coupled to one of the switching elements and the internal connections are coupled to two of the internal ports, comprising:

a) providing a post-reconfiguration architecture comprising N stages of switching elements;

b) adding new hardware comprising a plurality of internal ports as defined by the post-reconfiguration architecture;
c) assigning to each internal port a corresponding port defined by the post-reconfiguration architecture;
d) selecting an open port of the plurality of internal ports that is not coupled to a connection;
e) breaking a first connection coupled to the corresponding port assigned to the open port, if the corresponding port assigned to the open port is coupled to said first connection;
f) connecting the open port to the corresponding port assigned to the open port by coupling a second connection to the open port and to the corresponding port assigned to the open port;
g) repeating steps (d), (e) and (f) until each of the plurality of internal ports is coupled to a connection;
h) selecting a selected port of the plurality of internal ports that is not coupled to the corresponding port assigned to said selected port;
i) breaking a second connection coupled to the selected port;
j) breaking a third connection coupled to the corresponding port assigned to the selected port, if the corresponding port assigned to the selected port is coupled to said third connection;
k) connecting the selected port to the corresponding port assigned to the selected port by coupling a fourth connection to the selected port and to the corresponding port assigned to the selected port; and
l) repeating steps (h), (i), (j), (k) until each port of the plurality of internal ports is connected to the corresponding port assigned to each port.

2. The method claim 1 wherein said new hardware further comprises a plurality of new external ports and further comprising:
m) activating the plurality of new external ports.

3. The method of claim 1 wherein said new hardware comprises either at least one new stage of switching elements, at least one new switching element or at least one new port to at least one of the switching elements.

4. The method of claim 1 further comprising:
n) selecting a pre-connection port of the plurality of internal ports that is not coupled to any connection and having assigned a corresponding port that is not coupled to any connection;
o) connecting the pre-connection port to the corresponding port assigned to the pre-connection port by coupling a fifth connection to the pre-connection port and to the corresponding port assigned to the pre-connection port; and
p) repeating steps (n) and (o) until there are no ports in the plurality of internal ports that are not coupled to any connections and having assigned a corresponding port that is not coupled to any connection.

5. A method of reconfiguring comprising:
designating a scalable switching network having a plurality of stages of switching elements, a plurality of internal ports, a plurality for external ports, and a plurality of internal connections, wherein the internal ports and external ports are coupled to one of the switching elements and the internal connections are coupled to two of the internal ports;
providing a post-reconfiguration architecture;
adding new hardware comprising a plurality of internal ports as defined by the post-reconfiguration architecture;
deactivating any external ports connected to any hardware not present in the post-reconfiguration architecture;
assigning to each internal port a corresponding port defined by the post-reconfiguration architecture;
rewiring any internal port on the basis of the post-reconfiguration architecture; and
removing any hardware not present in the post-reconfiguration architectures wherein the rewiring comprises:
selecting a selected port of the plurality of internal ports that is not coupled to the corresponding port assigned to said selected port;
breaking a first connection coupled to the selected port, if the selected port is coupled to a first connection;
breaking a second connection coupled to the corresponding port assigned to the selected port, if the corresponding port assigned to the selected port is coupled to said second connection; and
connecting the selected port to the corresponding port assigned to the selected port by coupling a third connection to the selected port and to the corresponding port assigned to the selected port.

6. The method claim 5 wherein said new hardware further comprises a plurality of new external ports and further comprising:
activating the plurality of new external ports.

7. The method of claim 5 wherein said new hardware comprises at least one new stage of switching elements.

8. The method of claim 5 wherein said new hardware comprises at least one new switching element.

9. The method of claim 5 wherein said new hardware comprises at least one new port to at least one of the switching elements.

10. The method of claim 5 wherein any hardware not present in the post-reconfiguration architecture comprises either at least one switching element or at least one new port to at least one of the switching elements.

11. The method of claim 5 further comprising:
pre-connecting any internal port on the basis of the post-reconfiguration architecture.

12. The method of claim 11 wherein the pre-connecting comprises:
selecting a pre-connection port of the plurality of internal ports that is not coupled to any connection and having assigned a corresponding port that is not coupled to any connection; and
connecting the pre-connection port to the corresponding port assigned to the pre-connection port by coupling a first connection to the pre-connection port and to the corresponding port assigned to the pre-connection port.

13. The method of claim 5 further comprising:
relabeling any internal ports on the basis of the post-configuration architecture.

14. The method of claim 13 wherein the relabeling comprises:
selecting a pair of internal ports having a first port and a second port wherein the second port is connected to a switching element containing the corresponding port assigned to the first port or; and
logically exchanging the labels of the first port and the second port whereby traffic intended for the first port is routed to the second port and traffic intended for the second port is routed to the first port.

15. The method of claim 13 wherein the relabeling comprises:
selecting a pair of internal ports having a first port and a second port wherein the second port is connected to the corresponding port assigned to the first port; and
logically exchanging the labels of the first port and the second port whereby traffic intended for the first port is routed to the second port and traffic intended for the second port is routed to the first port.

16. The method of claim 5, wherein the scalable switching network is a redundant blocking compensated cyclic group multi-stage network.

17. The method of claim 5, wherein the scalable switching network is a multi-stage interconnection network.

18. The method of claim 5, wherein the scalable switching network comprises a plurality of columns wherein each switching element belongs to one of the plurality of stages and one of the plurality of columns, and wherein internal connections either couple ports in adjacent stages or couple ports in adjacent columns.

19. A method of reconfiguring comprising:
designating a scalable switching network for downgrading having a plurality of stages of switching elements, a plurality of internal ports, a plurality for external ports, and a plurality of internal connections, wherein the internal ports and external ports are coupled to one of the switching elements and the internal connections are coupled to two of the internal ports;
providing a post-reconfiguration architecture;
deactivating any external ports connected to any hardware not present in the post-reconfiguration architecture;
assigning to each internal port a corresponding port defined by the post-reconfiguration architecture;
rewiring any internal port on the basis of the post-reconfiguration architecture; and
removing any hardware not present in the post-reconfiguration architectures wherein the rewiring comprises:
selecting a selected port of the plurality of internal ports that is not coupled to the corresponding port assigned to said selected port;
breaking a first connection coupled to the selected port, if the selected port is coupled to a first connection;
breaking a second connection coupled to the corresponding port assigned to the selected port, if the corresponding port assigned to the selected port is coupled to said second connection; and
connecting the selected port to the corresponding port assigned to the selected port by coupling a third connection to the selected port and to the corresponding port assigned to the selected port.

20. The method of claim 19, further comprising:
adding new hardware comprising a plurality of internal ports and a plurality of new external ports as defined by the post-reconfiguration architecture;
activating the plurality of new external ports.

21. The method of claim 19, further comprising:
pre-connecting any internal port on the basis of the post-reconfiguration architecture.

* * * * *

UNITED STATES PATENT AND TRADEMARK OFFICE
CERTIFICATE OF CORRECTION

PATENT NO. : 7,440,448 B1 Page 1 of 1
APPLICATION NO. : 10/786874
DATED : October 21, 2008
INVENTOR(S) : Lu It is certified that error appears in the above-identified patent and that said Letters Patent is hereby corrected as shown below:

Title page,
Item [12], delete "et al."
Item [76], delete "; Alan Huang, 682 Sixteenth Ave., Menlo Park, CA (US) 94025"

Signed and Sealed this

Third Day of March, 2009

JOHN DOLL
*Acting Director of the United States Patent and Trademark Office*